US007353232B1

(12) United States Patent
Kalucha et al.

(10) Patent No.: US 7,353,232 B1
(45) Date of Patent: Apr. 1, 2008

(54) COMPUTER ASSISTED AND/OR IMPLEMENTED METHOD AND SYSTEM FOR LAYERED ACCESS AND/OR SUPERVISORY CONTROL OF PROJECTS AND ITEMS INCORPORATING ELECTRONIC INFORMATION

(75) Inventors: Vineet Kalucha, Washington, DC (US); Joseph Geaney, Hamilton (BM); David K. Rensin, Waterford, VA (US); Michael S. Riemer, McLean, VA (US); Gregory C. Visalli, Ashburn, CA (US); Jason D. Skeen, Ashburn, VA (US)

(73) Assignee: Q. Know Technologies, Inc., Reston, VA (US)

( * ) Notice: Subject to any disclaimer, the term of this patent is extended or adjusted under 35 U.S.C. 154(b) by 285 days.

(21) Appl. No.: 10/674,890

(22) Filed: Oct. 1, 2003

Related U.S. Application Data

(60) Provisional application No. 60/415,103, filed on Oct. 2, 2002.

(51) Int. Cl.
*G06F 17/30* (2006.01)

(52) U.S. Cl. .......................................... 707/100; 707/9

(58) Field of Classification Search .................... 707/9, 707/104.1, 1, 100, 10
See application file for complete search history.

(56) References Cited

U.S. PATENT DOCUMENTS 5,377,354 A 12/1994 Scannell et al.
6,014,135 A 1/2000 Fernandes
6,430,575 B1 8/2002 Dourish et al.
6,484,196 B1 * 11/2002 Maurille ..................... 709/206
6,507,865 B1 * 1/2003 Hanson et al. ............ 705/36 R
6,556,982 B1 4/2003 McGaffey et al.
6,708,205 B2 * 3/2004 Sheldon et al. ............. 709/206
6,778,972 B2 * 8/2004 Leonardos ..................... 707/1
7,035,821 B1 * 4/2006 Smith et al. .................. 705/39

* cited by examiner

*Primary Examiner*—Cheryl Lewis
(74) *Attorney, Agent, or Firm*—Irah H. Donner; Wilmer Cutler Pickering Hale and Dorr LLP

(57) ABSTRACT

A method, system, and computer program device provides layered access and/or supervisory oversight and management of projects and items, and the projects incorporate associatively filed electronic information. Optionally, layered access includes peer groups of individual users, with access across multiple projects. A plurality of items incorporate the electronic information, and are associated with a project, and optionally the items have different corresponding native applications.

21 Claims, 232 Drawing Sheets

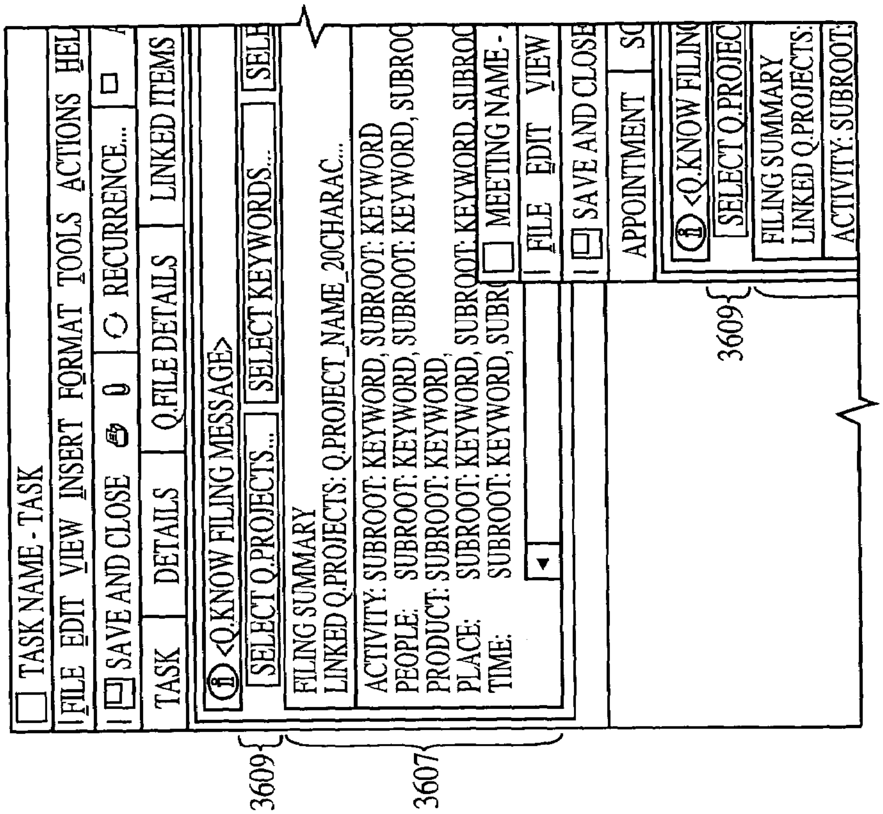
FIG. 36A
FIG. 36
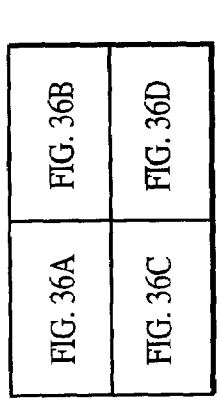

10605

10607

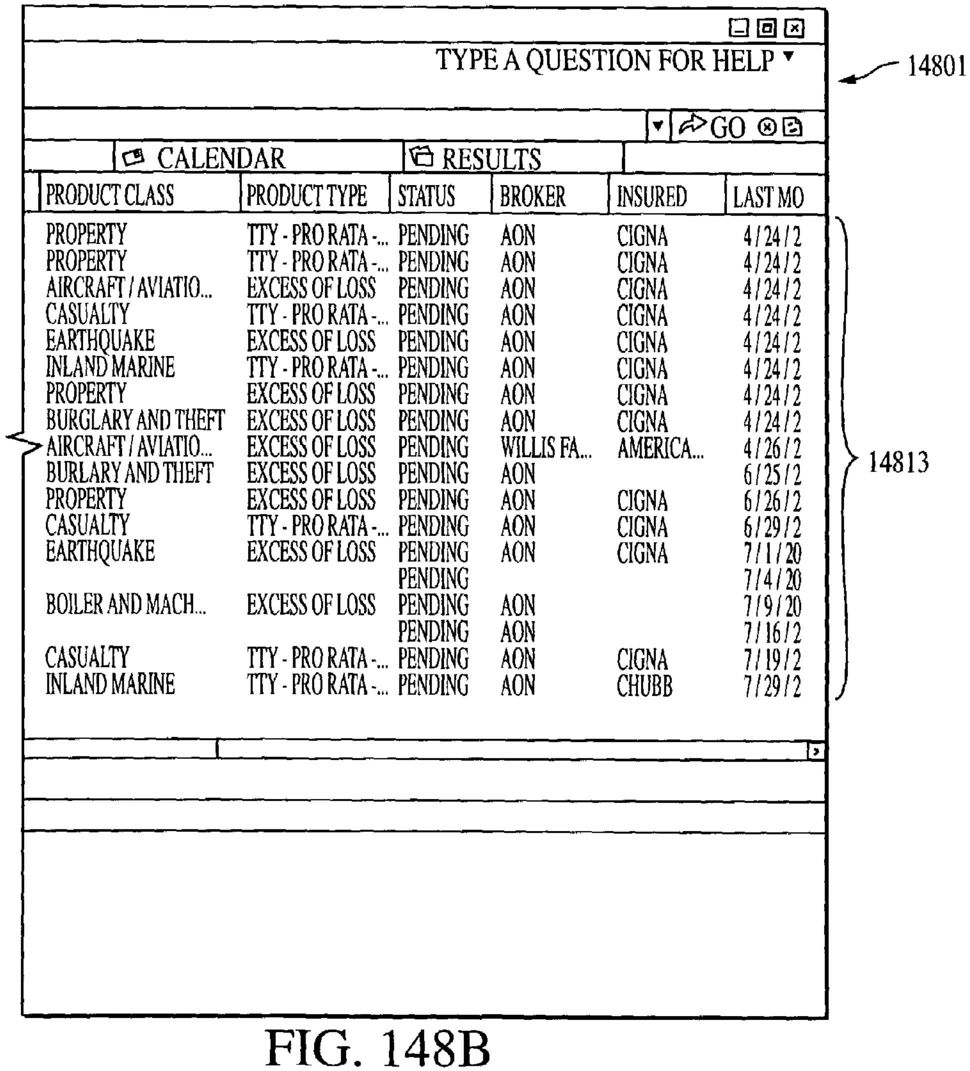

| PRODUCT CLASS | PRODUCT TYPE | STATUS | BROKER | INSURED | LAST MO |
|---|---|---|---|---|---|
| PROPERTY | TTY - PRO RATA -... | PENDING | AON | CIGNA | 4/24/2 |
| PROPERTY | TTY - PRO RATA -... | PENDING | AON | CIGNA | 4/24/2 |
| AIRCRAFT / AVIATIO... | EXCESS OF LOSS | PENDING | AON | CIGNA | 4/24/2 |
| CASUALTY | TTY - PRO RATA -... | PENDING | AON | CIGNA | 4/24/2 |
| EARTHQUAKE | EXCESS OF LOSS | PENDING | AON | CIGNA | 4/24/2 |
| INLAND MARINE | TTY - PRO RATA -... | PENDING | AON | CIGNA | 4/24/2 |
| PROPERTY | EXCESS OF LOSS | PENDING | AON | CIGNA | 4/24/2 |
| BURGLARY AND THEFT | EXCESS OF LOSS | PENDING | AON | CIGNA | 4/24/2 |
| AIRCRAFT / AVIATIO... | EXCESS OF LOSS | PENDING | WILLIS FA... | AMERICA... | 4/26/2 |
| BURLARY AND THEFT | EXCESS OF LOSS | PENDING | AON | | 6/25/2 |
| PROPERTY | EXCESS OF LOSS | PENDING | AON | CIGNA | 6/26/2 |
| CASUALTY | TTY - PRO RATA -... | PENDING | AON | CIGNA | 6/29/2 |
| EARTHQUAKE | EXCESS OF LOSS | PENDING | AON | CIGNA | 7/1/20 |
| | | PENDING | | | 7/4/20 |
| BOILER AND MACH... | EXCESS OF LOSS | PENDING | AON | | 7/9/20 |
| | | PENDING | AON | | 7/16/2 |
| CASUALTY | TTY - PRO RATA -... | PENDING | AON | CIGNA | 7/19/2 |
| INLAND MARINE | TTY - PRO RATA -... | PENDING | AON | CHUBB | 7/29/2 |

FIG. 148B

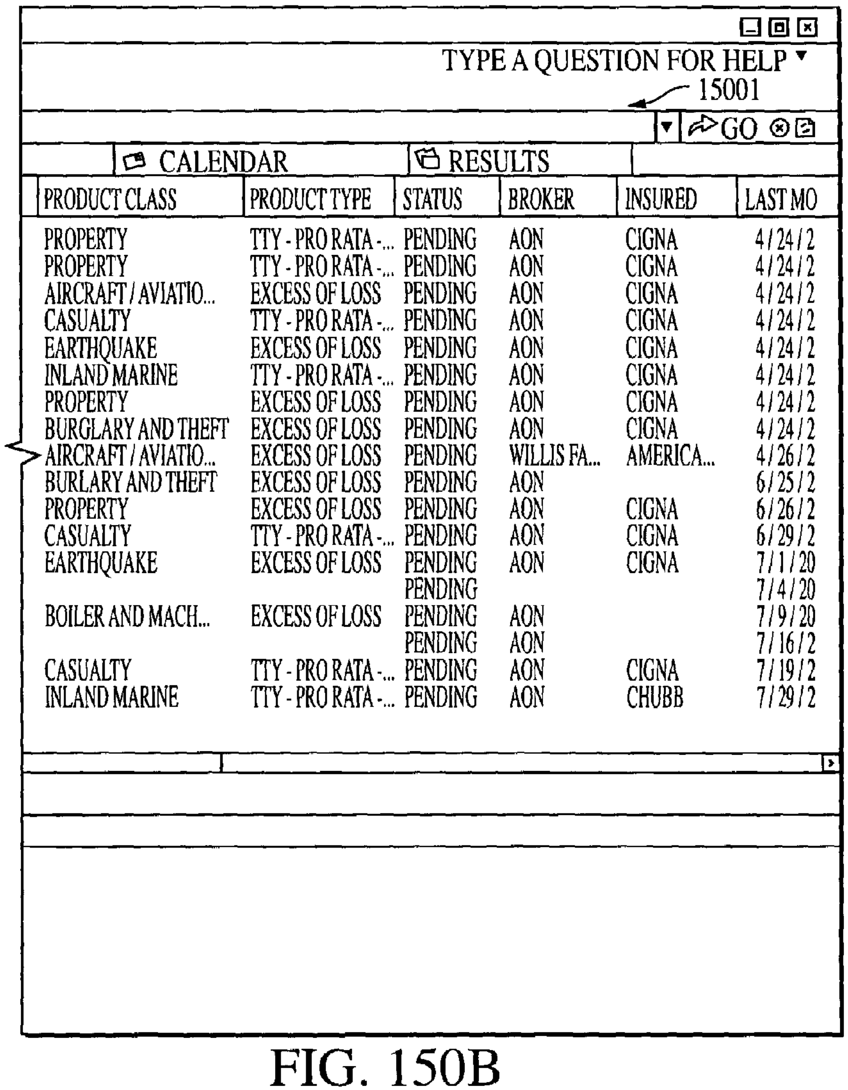

| PRODUCT CLASS | PRODUCT TYPE | STATUS | BROKER | INSURED | LAST MO |
|---|---|---|---|---|---|
| PROPERTY | TTY - PRO RATA -... | PENDING | AON | CIGNA | 4/24/2 |
| PROPERTY | TTY - PRO RATA -... | PENDING | AON | CIGNA | 4/24/2 |
| AIRCRAFT / AVIATIO... | EXCESS OF LOSS | PENDING | AON | CIGNA | 4/24/2 |
| CASUALTY | TTY - PRO RATA -... | PENDING | AON | CIGNA | 4/24/2 |
| EARTHQUAKE | EXCESS OF LOSS | PENDING | AON | CIGNA | 4/24/2 |
| INLAND MARINE | TTY - PRO RATA -... | PENDING | AON | CIGNA | 4/24/2 |
| PROPERTY | EXCESS OF LOSS | PENDING | AON | CIGNA | 4/24/2 |
| BURGLARY AND THEFT | EXCESS OF LOSS | PENDING | AON | CIGNA | 4/24/2 |
| AIRCRAFT / AVIATIO... | EXCESS OF LOSS | PENDING | WILLIS FA... | AMERICA... | 4/26/2 |
| BURLARY AND THEFT | EXCESS OF LOSS | PENDING | AON | | 6/25/2 |
| PROPERTY | EXCESS OF LOSS | PENDING | AON | CIGNA | 6/26/2 |
| CASUALTY | TTY - PRO RATA -... | PENDING | AON | CIGNA | 6/29/2 |
| EARTHQUAKE | EXCESS OF LOSS | PENDING | AON | CIGNA | 7/1/20 |
| | | PENDING | | | 7/4/20 |
| BOILER AND MACH... | EXCESS OF LOSS | PENDING | AON | | 7/9/20 |
| | | PENDING | AON | | 7/16/2 |
| CASUALTY | TTY - PRO RATA -... | PENDING | AON | CIGNA | 7/19/2 |
| INLAND MARINE | TTY - PRO RATA -... | PENDING | AON | CHUBB | 7/29/2 |

FIG. 150B

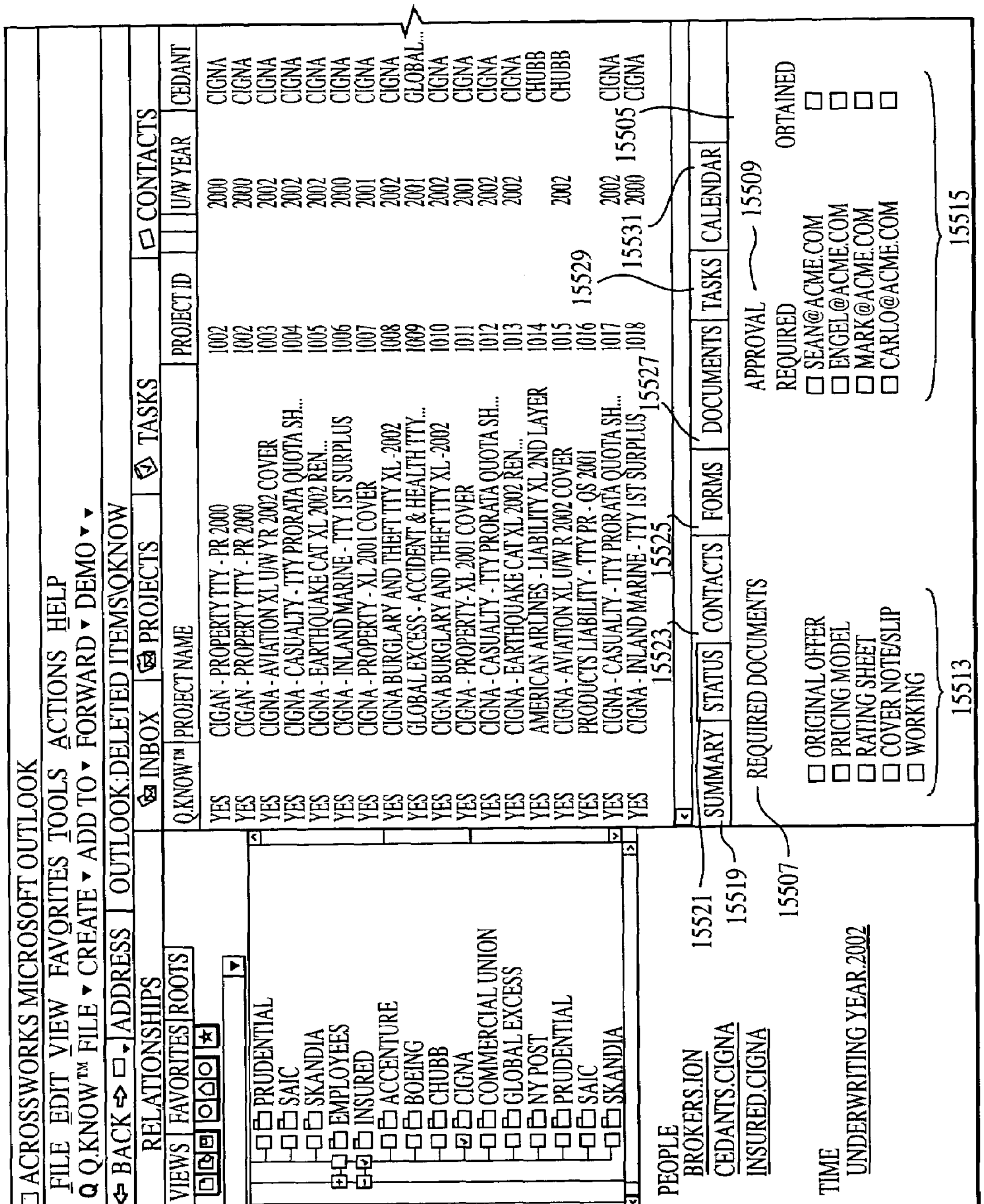
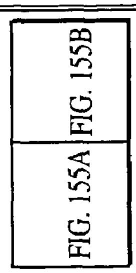
FIG. 155
FIG. 155A

| | |
|---|---|
| FIG. 156A | FIG. 156B |
| FIG. 156C | FIG. 156D |

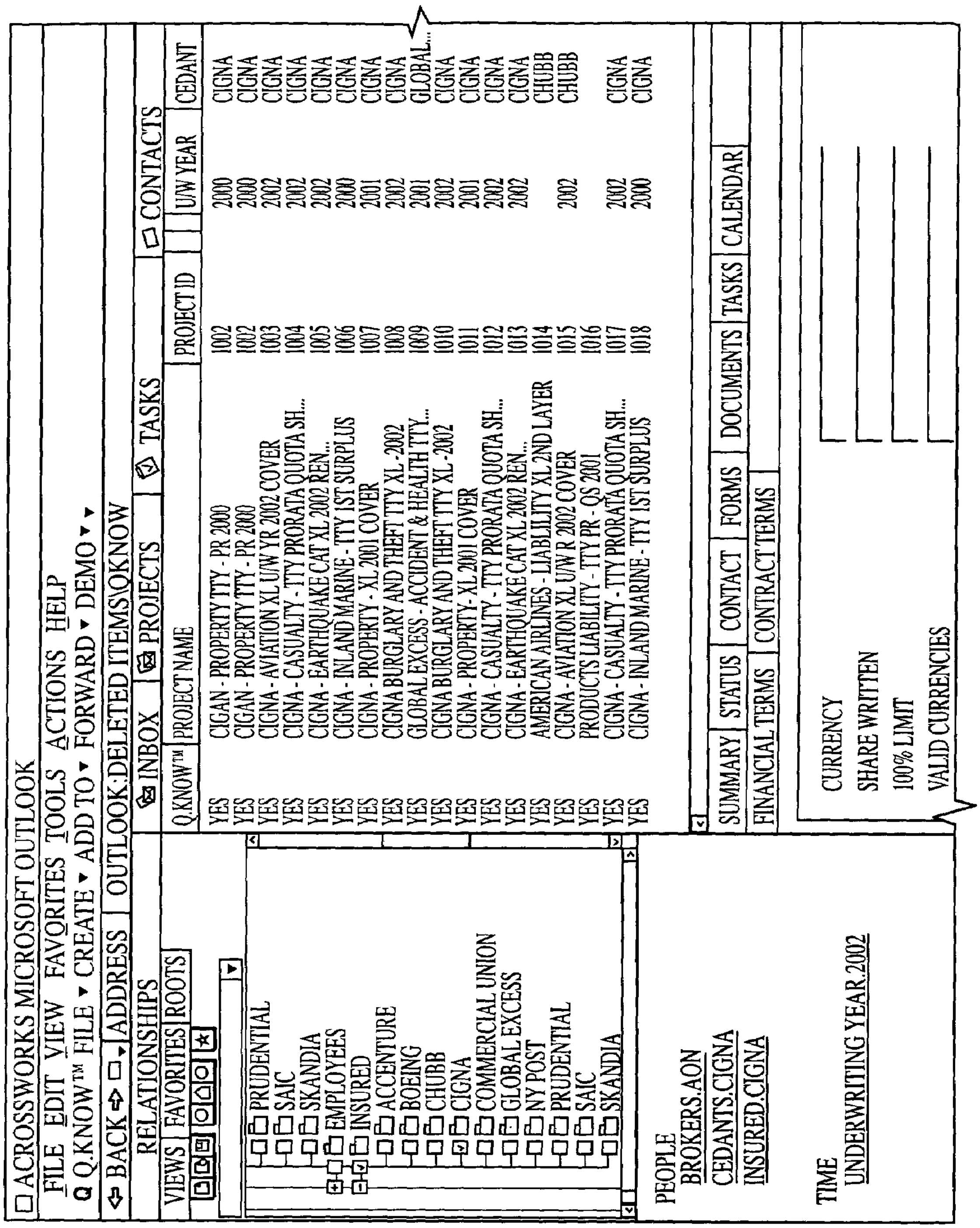
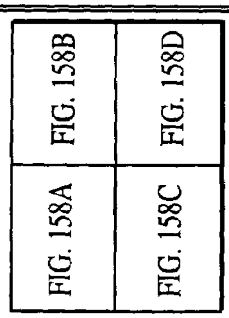
FIG. 158
FIG. 158A

COMPUTER ASSISTED AND/OR IMPLEMENTED METHOD AND SYSTEM FOR LAYERED ACCESS AND/OR SUPERVISORY CONTROL OF PROJECTS AND ITEMS INCORPORATING ELECTRONIC INFORMATION

RELATED APPLICATIONS

This application claims priority to U.S. Provisional Patent Application No. 60/415,103, "METHOD AND SYSTEM FOR INFORMATION SUPPLY CHAIN MANAGEMENT" filed Oct. 2, 2002, incorporated herein by reference.

BACKGROUND OF THE INVENTION

1. Field of the Invention

The present invention is directed to computer related and/or assisted systems, methods, and computer program devices for layered access and/or supervisory control of all types of electronic information and content. More particularly, the present invention relates to layered access by, for example, peer groups and/or supervisory control over projects and items incorporating electronic information, and managing business decisions dependent thereon through, for example, associative filing of items incorporating the electronic information, in association with, for example, projects. The electronic information optionally is associatively filed and is manipulated via at least one native application.

2. Description of the Related Art

In today's environment, business and user productivity is lost under a growing pile of electronic information. Instead of facilitating decision making and the managing of myriad businesses and transactions, the speed and volume of electronic communication exacerbates the amount of time spent searching for and organizing the information exchanged.

The result has been a growing inability on the part of business personnel, individually and within work groups, and across geographic locations, to organize, access and share this information quickly and efficiently. Failure to access the right information at the right time increases business risk and negatively affects companies' bottom lines.

Electronic information that users need to organize include e-Mail (which can be particularly numerous), documents, spreadsheets, tasks, calendar entries, and various other content. Most of this content is responsive to one native application and not readily accessible via another native application. Moreover, some of this content is "lost" due to inconsistent filing patterns within an organization.

The problem is exacerbated further in particular industries. For example, in financial services, there is often significant transaction risk, and increasingly heightened compliance concerns.

Over the last decade, the financial services industry has spent millions of dollars looking for a solution, such as document and content management, work-flow and knowledge management, and, more recently, corporate portals. These have not adequately addressed users' needs for managing their mission critical information, and therefore have seen limited adoption. Some examples of companies offering such solutions include Documentum, FileNet, Vignette, Stellant, Autonomy, RiskClick, Groove, and Xerox.

Users want to improve the quality of transactions; reduce losses from bad deals, increase revenue by improving efficiency, lower hedging and risk mitigation expenses; and improve customer service and renewal rates. Users want to spend less time looking for deal documents and other critical information. Productivity would improve if information could be shared in real time regardless of location. Moreover, users do not want to change the way they work, and want to keep existing information technology.

A user searching for a necessary document often does not know whether it is on the user's hard drive, in a directory on the network, or perhaps in Outlook attached to a received e-mail message. Furthermore, a user involved in a project or deal needs to know where all documents, messages and other files related to the project or deal are located. Yet another problem is determining where to file a document so that it can be readily located for later use by the same user or others.

Some aspects of conventional systems are illustrated by way of example in FIG. 1, also described in U.S. Pat. No. 6,430,575, Dourish et al. incorporated herein by reference. Dourish provides an example of a prior art collaborative document management system with customizable filing structures. An operating environment 102 is used to define a collaborative document management system that includes a network server 104 accessed by client computers 106 over network 108. A program interface 110 accesses an application program 112, which then incorporates a document store 114 and a filing structure store 116 to provide customizable filing structures. The document store 114 is a shared repository of documents that stores documents independent from the filing structure store 116 that records different categories in which documents 115 in the document store are organized. The filing structure store 116 has defined therein a core filing structure 118 and one or more levels of customized filing structures 120. This category schema is a directory structure that is used to classify the documents 115 in document store 114 so that they can be readily located by a plurality of users. In effect, the category schema is a shared resource that defines the use of the documents categorized thereby. Once a filing structure is defined in the filing structure store 116, documents 115 stored in the document store 114 can be categorized therein. The act of categorizing documents in the filing structure involves the assignment of unique values to one or more predefined document properties (e.g., document filing location). These document properties can be used to individually categorize the collection of documents. After documents are categorized using the category manager 122, the context in which that document was filed can be mapped to other customized filing structures in a manner that is transparent to users operating the application program interfaces. A structure translator 124 computes a mapping between different levels of customization to provide different interpretations of the shared repository of documents.

Another aspect of conventional systems is illustrated in the example of FIG. 2, described in U.S. Pat. No. 6,556,982, McGaffey et al., incorporated herein by reference. McGaffey discloses a prior art data analysis and classification system 200 that operates in two modes: a cognitive (or real-time) processing mode 220 and a learning loop (or non real-time) processing mode 240. The data analysis and classification system performs the steps displayed in the cognitive processing mode 220 directly, while a human expert or team of human experts performs the steps comprising the learning loop 240. The cognitive processing loop 220 comprises four steps. First, the data analysis and classification system reads a dictionary file of all known terms and creates a hash table in step 222. Second, in step 224 the data analysis and classification system reads the list of all relationships and connects them to form the association and classification net (ACN) by applying the relationships, both logical and output to the concepts located within the hash table. In step 224, the data analysis and classification system recognizes three types of logical relationships, e.g., equivalence, implied relationships, etc. Third, the data analysis and classification system reads electronic information and parses it into its component concepts in the electronic information input phase 226. Once the data analysis and classification system has executed the classification phase 228, the data analysis and classification system generates a report 212. Following the report generation, the cognitive processing loop 220 terminates. After the data analysis and classification system has executed the classification phase 228, the data analysis and classification completes the cognitive processing loop 220, the learning loop 240 is entered. In the learning loop 240 a human expert updates the data analysis and classification system's dictionary file and relationship set (the set of all relationships structuring the ACN) in a non-real-time fashion. Initially, an expert reviews an unprocessed terms list 242 (if any) and enter these into the dictionary file in order to insure that all concepts are processed in the future by the cognitive processing loop 220. Once the expert enters any unprocessed concepts into the ACN as part of the unprocessed terms phase 242, he may review the performance of the data analysis and classification system in the expert analysis phase 244. In the expert analysis phase 244, the human expert may critique the performance of the data analysis and classification system by reviewing the report 212. Essentially, the expert double-checks the results generated by the data analysis and classification system, and independently determines whether the report is correct. If the expert agrees with the data analysis and classification system's interpretation result 212 in the expert analysis phase 244, then the learning loop 240 ends. Otherwise, the expert may update the data analysis and classification system in the update phase 246 by instituting new relationships. The data analysis and classification system will apply these new relationships the next time it attempts to process electronic information.

Yet another aspect of conventional systems is described in U.S. Pat. No. 6,014,135, Fernandes, incorporated herein by reference, shown in FIG. 3. Fernandes is an example of a prior art collaboration centric document processing environment. Referring to FIG. 3, there is shown a display 350, which is the output of the monitor, and which interfaces with a user. The display has a plurality of first icons 340 (A-C). Each of the first plurality of icons is a graphical representation of an individual. Each of the first icons 340 has a set of objects, which can be inherited, if the creator of the first icon 340 so desired. Thus, for example, a first icon 340 can be from the Internet published by a user, in which the user has published his desk top view, which can be inherited, by the user of the system. When the user of the system selects the objects associated with the selected first icon 340, which the creator of that first icon 340 has permitted to be published, the user of the system will also see the desk top that the publisher created. As a result, a creator of a first icon with inheritable objects can easily maintain and update objects that are far from the publication location. Moreover, the objects created by the publisher can be inherited in part or in total. Thus, if a publisher has created a first set of objects relating to a desk top, and a second set of objects relating to favorite web sites, a user of the system can choose to inherit one or both types of objects. The display 350 also has a plurality of second icons 342 (A-B), which are graphical representations of information. The information can be of any type. They can include but are not limited to: spread sheet files, text files, images, sound, reference to URL sites on the Internet, etc. Finally, the display 350 has a third icon 344 which is a graphical representation of time. In addition, the display 350 comprises a number of fourth icons 346 (A-F). The fourth icon 346A is the icon of the desktop, which is activated to the display 350. The fourth icon 346B, when activated, is for the creation of documents representing information. The fourth icon 346C, when activated, brings up the display for an inbox containing documents received and sent by the user. The fourth icon 346D, when activated, connects the user to contact various individuals. The fourth icon 346E, when activated, permits printing. Finally, the fourth icon 346F, when activated, undoes the previous action. A number of functions will now be described with regard to the display 350. When the user desires to create a document, the user activates or clicks the fourth icon 346B. The intended document can be an e-mail, text, spreadsheet, database or any other type of input from the user. When the fourth icon 346B is activated, the display 350 changes to show the composition of a document. When the user desires to enter alphanumeric text, an appropriate button is activated and the display 350 is then adapted for entering alphanumeric text for e-mail, HTML creation, word processing or the like. If the user desires to input spreadsheet-type data, a similar button (not shown) would be activated and the screen or display 350 would change into one suitable for spreadsheet data input, including borders for rows and columns.

An example of a conventional method and system for sorting and prioritizing electronic e-mail messages is illustrated in FIG. 4, U.S. Pat. No. 5,377,354, Scannell et al., incorporated herein by reference. Scannell discloses a method and apparatus for prioritizing incoming electronic mail messages 425 for a user using a user created and modified rules-control which is stored in a rules-store 412. Incoming messages 425 are stored in a message store 411 and are screened individually by a rules-test unit 413. The rules-test unit has a comparator 452 which matches keywords chosen by the user while creating the rules, and supplies signals to an action list unit 454. By applying the user created rules for deciding which messages constitute the priority messages for the user, a priority assigning unit 445 within an action portion 435 of the rules-store 412 assigns a priority number (say from 1 to 5, 1 being the highest priority for example) to each screened message. Responsive to the assigned priority number of the screened message, the message is sent to a main folder store or forwarded or put away as appropriate. The user created rules can be modified by the user using a conventional keyboard.

The above prior art references and other conventional systems, however, fail to meet the needs of various industries to efficiently search for and organize the ever-increasing amount of electronic information needed to conduct their businesses, including, for example, e-Mail (which can be particularly numerous); documents, spreadsheets, tasks, calendar entries, and various other content. Moreover, none of these conventional systems provide for content made available from different applications. Users are still looking for a solution to provide the right information at the right time and to manage all types of information, from daily e-mail to mission critical data.

SUMMARY OF THE INVENTION

The present invention alleviates the deficiencies of conventional techniques and systems described above in the various alternate embodiments described herein. The present invention responds to the need for efficient and effective filing and retrieval of enterprise-wide electronic information, with integrated project management functionality. One or more aspects of the present invention provide for dynamically managing the relationships among multiple items of electronic information by allowing users to quickly identify the business context of documents and other content, and to store the information within its proper context, optionally automatically linking the content to other related items.

Furthermore, one or more aspects of the present invention provide for project management functionality directly within the filing system, producing dynamic workspaces. Hence, individuals working on a specific project or transaction may have "real time" access to all relevant information.

Moreover, the invention is optionally integrated into conventional primary communication or information creation platforms, like e-mail or Word, etc., with all of the product's capabilities being delivered from within the familiar setting of a typical user interface, such as Microsoft Outlook.

The present invention provides visibility to mission-critical transactions, status can be easily checked, and compliance is no longer an extra step but the result of an organization's normal work processes. By managing the entire life-cycle of a transaction, the invention may provide the ability to:

Improve the average quality of a transaction
Reduce losses from bad deals
Increase revenue by improving efficiency
Lower hedging and risk mitigation expenses
Improve customer service and renewals Accordingly, one or more embodiments of the present invention provide a computer-implemented method, system, and computer readable medium with instructions for controlling access, overseeing, and/or managing electronic information including structured and/or unstructured electronic data, documentation, and/or other information, the items comprising the electronic information, and projects comprising at least a portion of the items. One or more embodiments of the present invention provides for associating one or more users with one or more references, wherein the user(s) is (are) indicated as having one or more access levels of a plurality of access levels. Also, one or more embodiments of the present invention provides for associating the reference(s) with one or more of item(s) and/or project(s). Further, one or more embodiments of the present invention includes associating users, including the foregoing user, with one or more groups, and assigning the group(s) access level(s) to the item(s) and/or the project(s). Also, one or more embodiments of the present invention provides for, responsive, e.g. to the user(s), providing information representative of the item(s) and/or the items in the project(s) associated with the reference(s) and/or the group(s). Also, one or more embodiments of the present invention includes providing the item(s) to the user(s) with the access level(s) corresponding to the reference(s) associated therewith.

Optionally, the access levels including at least two of: read access, read-write access, and no access.

Optionally, the at least one access level corresponds to a most restrictive access of the reference(s).

According to one or more embodiments of the present invention, the reference(s) includes one or more of: a keyword, a root term, a portion of a keyword, and/or words.

Optionally, the project(s) further includes one or more owners, and one or more user(s) is (are) assigned as the owner(s), wherein the owner(s) is (are) provided access to the item(s) in the project(s) regardless of the access level.

Optionally, the items are classified in classes, and the present invention provides for determining retrieval criteria including the reference(s) for at least one class of interest selected from the classes, and retrieving one of the item(s) and/or project(s) associated with the reference(s).

One or more embodiments of the present invention provide for denying access to one or more other user(s) wherein at least one of the reference(s) and/or the project(s) are not associated with the other user(s).

The present invention optionally provides for displaying at least a portion of the representative information.

One or more embodiments of the present invention provide for re-associating the user(s) with the reference(s), wherein the re-associating further includes one or more of: removing the user(s) from the reference(s), adding the user(s) to the reference(s), and reassigning one or more users in one or more group associated with the project(s).

One or more embodiments of the present invention provide for at least one of selecting the project(s) and listing the items in the project(s), and responsive to a selection of at least one of the items, displaying information characterizing the item, via a native application cooperating therewith.

Optionally, the item(s) is (are) one or more of: a communication, a document, a transaction, an e-mail, a task, a meeting, a contact, a message, an image, music, Outlook Notes, video, a multimedia file, an other native application content, and/or a project. Optionally, the document is one or more of: a text document, an image document, a resolved universal resource locator (URL), a bitmap document, and/or a digitized document.

One or more embodiments of the present invention provide that the items cooperate with one or more native applications associated therewith. According to one or more embodiments of the present invention, the native application(s) includes one or more of: Outlook®, PowerPoint®, Excel®, Word®, Windows® Explorer, Internet Explorer®, Adobe® Acrobat, and/or WinZip®.

Optionally, the project(s) is (are) assigned to one of multiple project types, and classes are associated with items, wherein at least one of the items have different corresponding native applications; the present invention further optionally includes determining one or more reference for one or more classes, associating the reference(s) with the class(es) for at least one item, associating the item(s) with the project(s), displaying information characterizing the project(s) and the item(s) associated therewith, selecting the item(s) thereof and opening the item(s) in a native application corresponding thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which.

Figure 1:
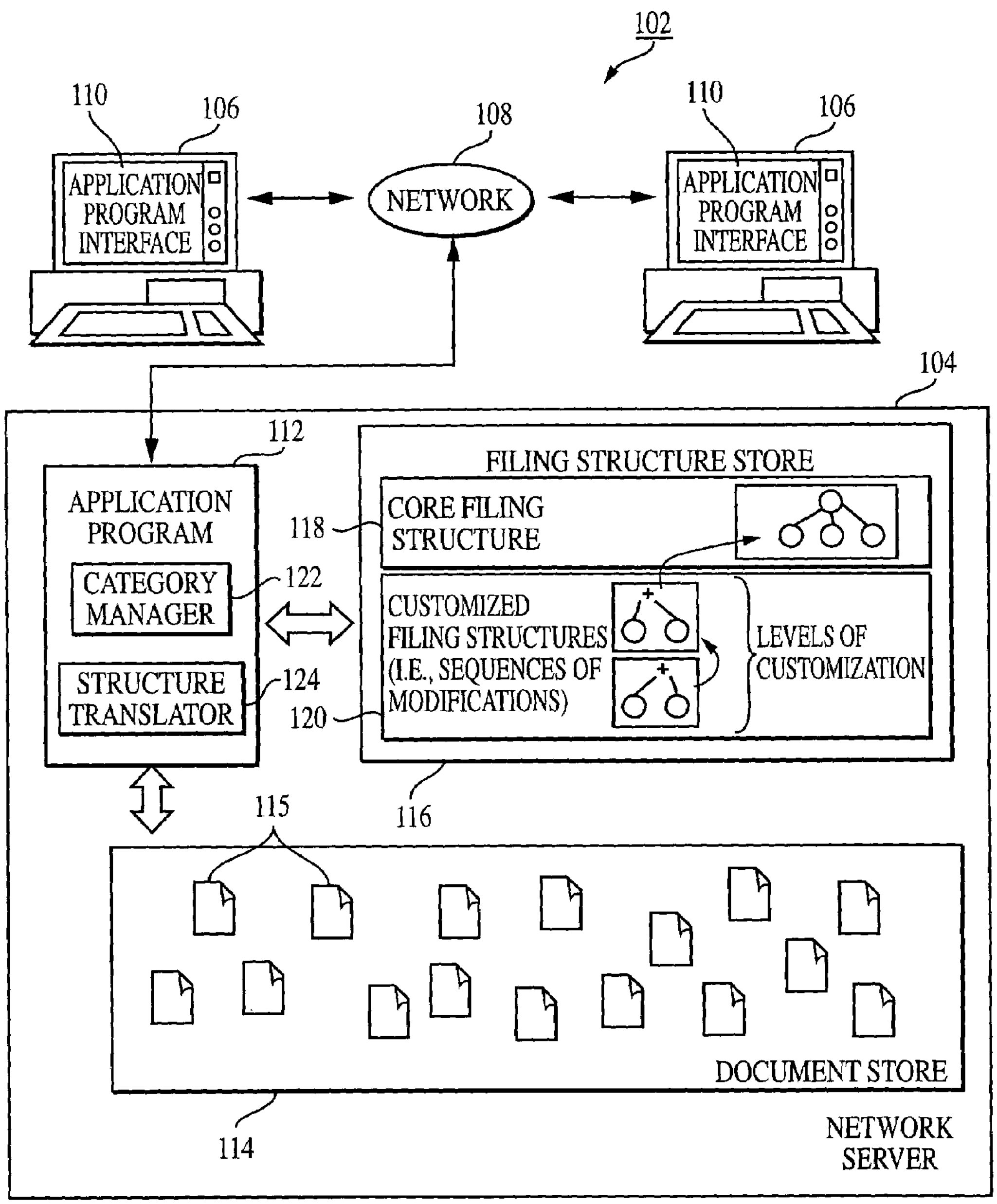
FIG. 1 is a block diagram of an example of a prior art collaborative document management system with customizable filing structures.
Figure 2:
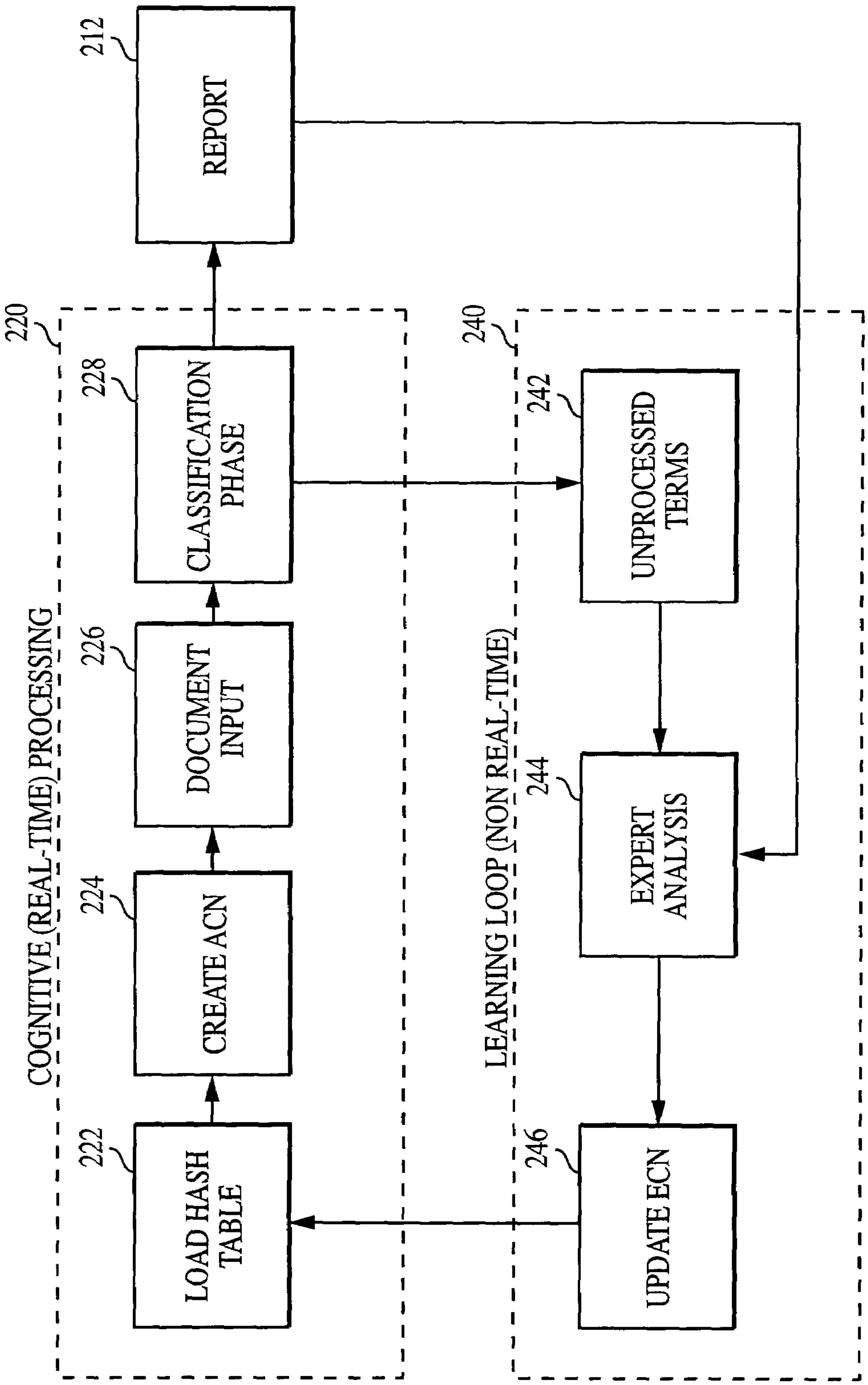
FIG. 2 is a block diagram of an example of a prior art method and system for analyzing and classifying electronic information.
Figure 3:
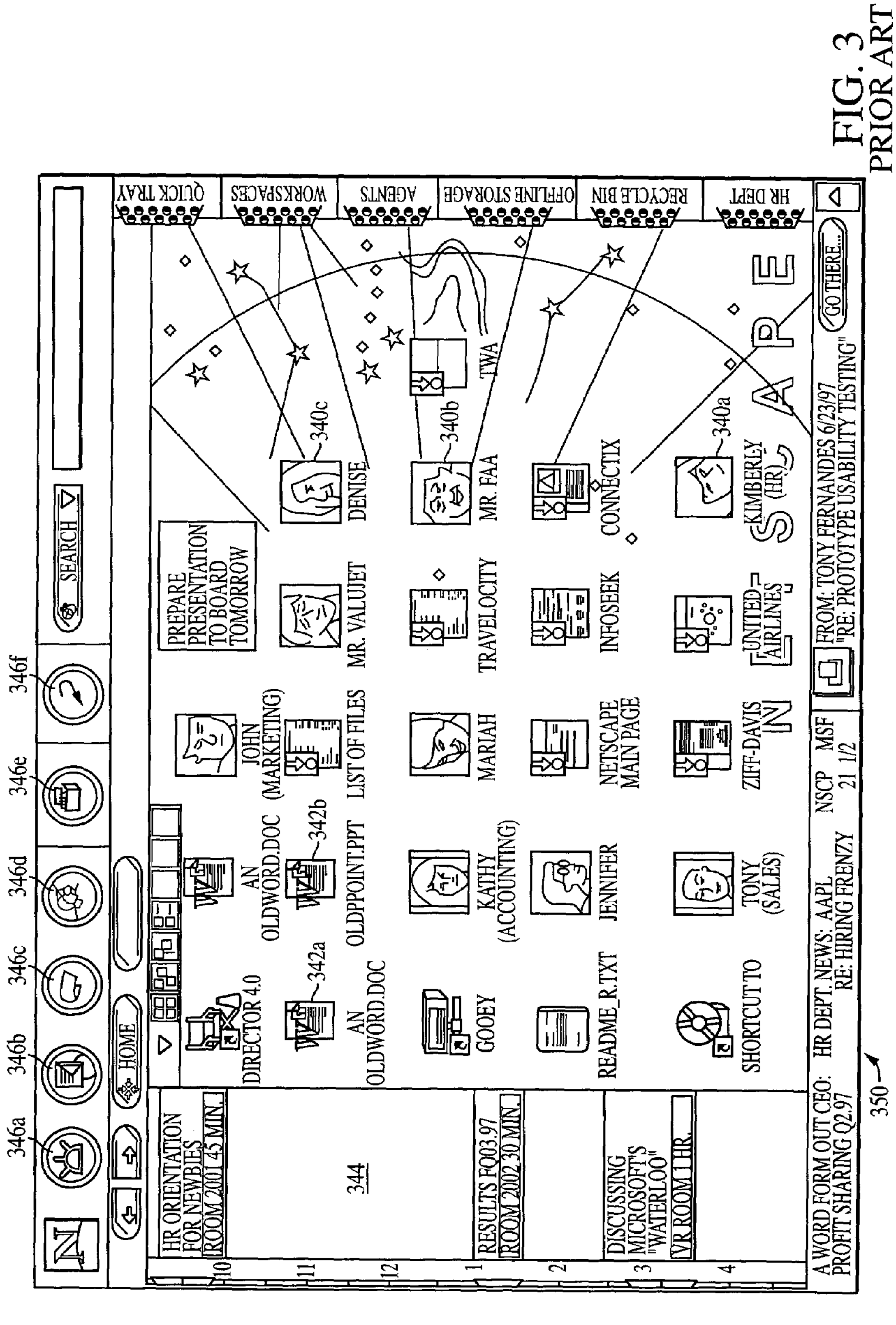
FIG. 3 is an exemplary user interface for an example of a prior art collaboration centric document processing environment.
Figure 4:
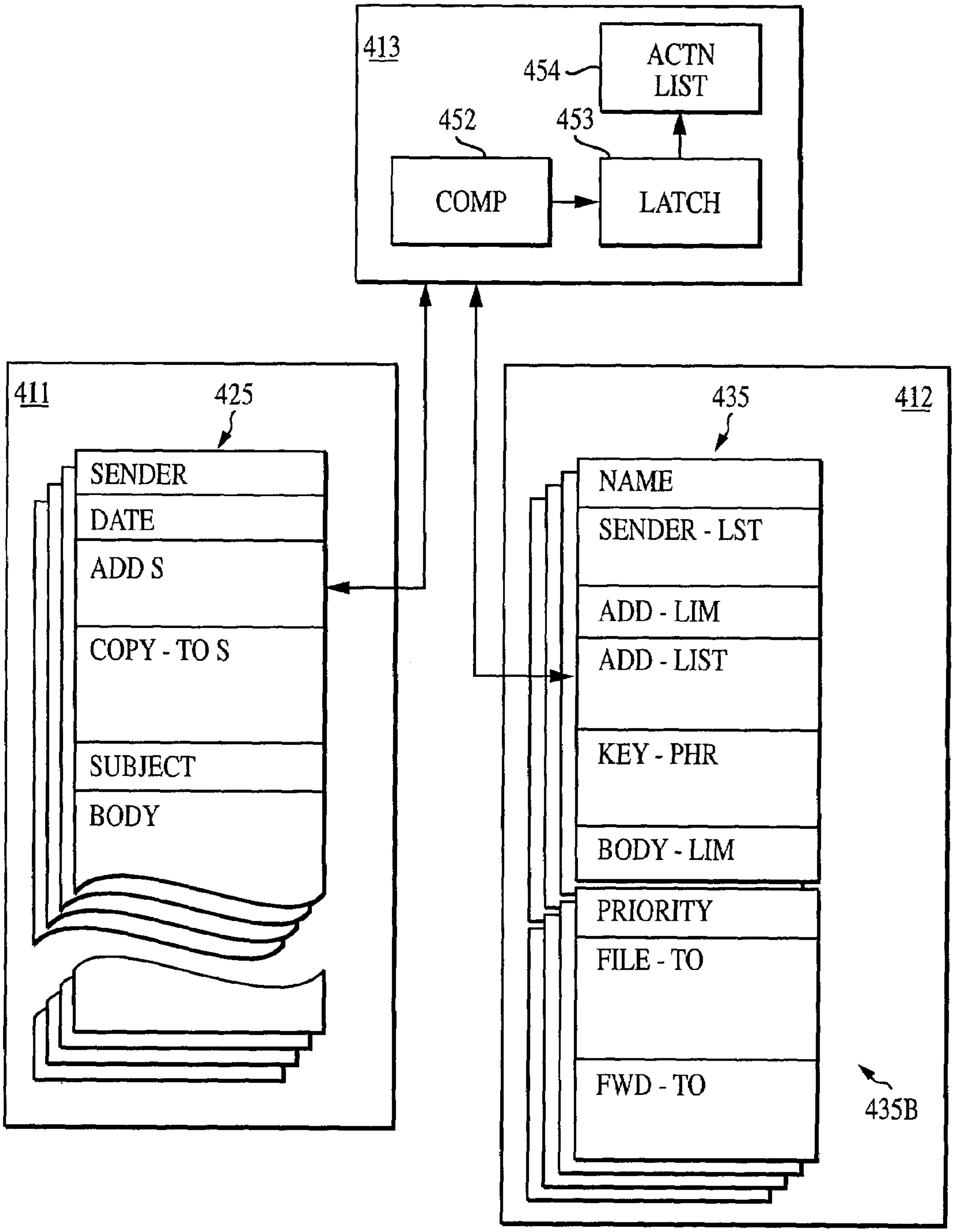
FIG. 4 is a block diagram of an example of a method and system for sorting and prioritizing electronic e-mail messages.
Figure 5:
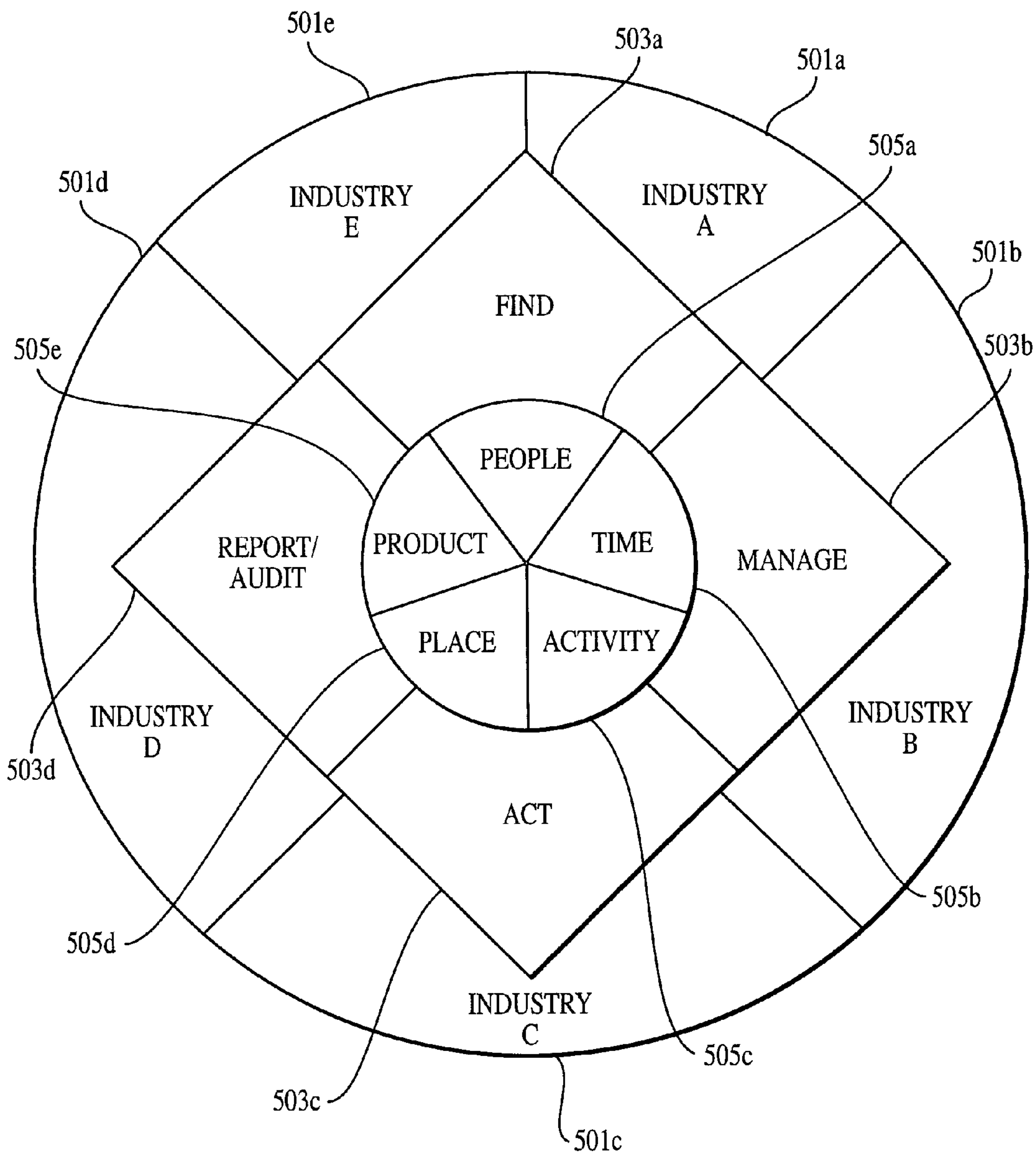

FIG. 5 provides a functional illustration of exemplary associative filing according to one or more aspects of the present invention.

Figure 6:
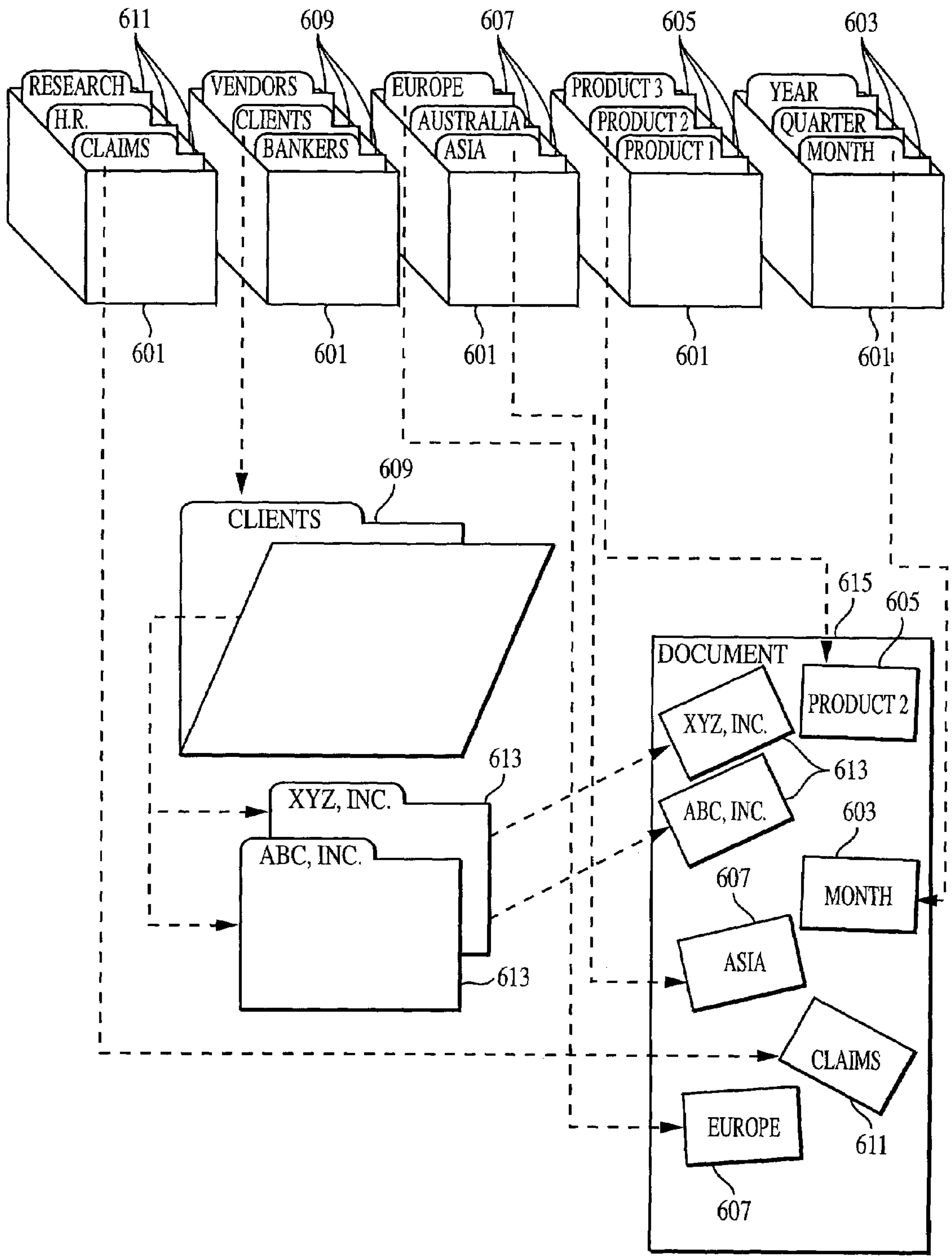

FIG. 6 provides a functional illustration of manually organizing information for retrieval across multiple categories.

Figure 7:
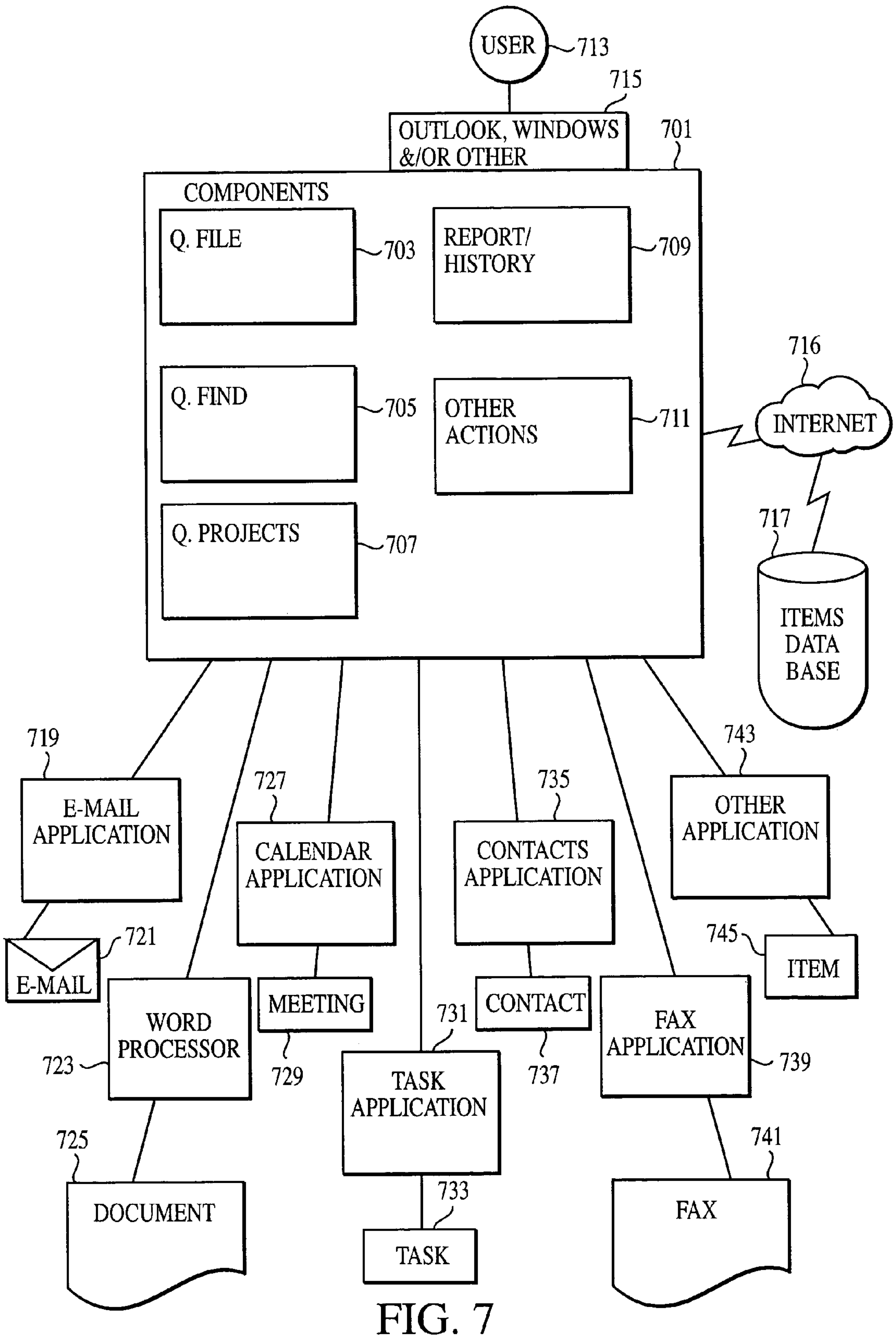

FIG. 7 is a functional block diagram illustrating a system for use in connection with classifying, indexing or retrieving a communication or project through associative filing, in accordance with one or more embodiments of the present invention.

Figure 8:
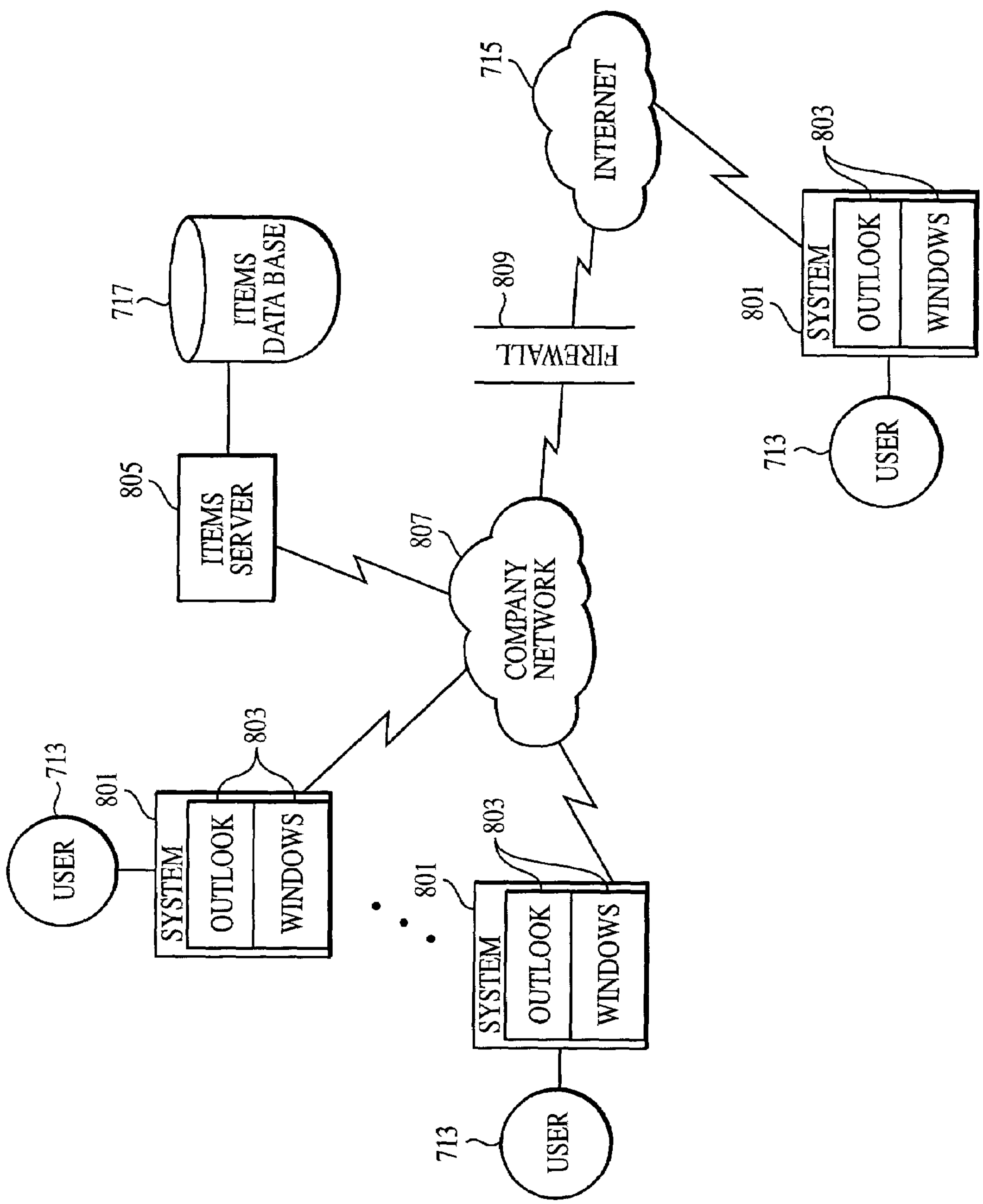

FIG. 8 is a block diagram illustrating a network for use in connection with the associative filing of the previous figure, for use in operation of one or more embodiments of the present invention.

Figure 9:
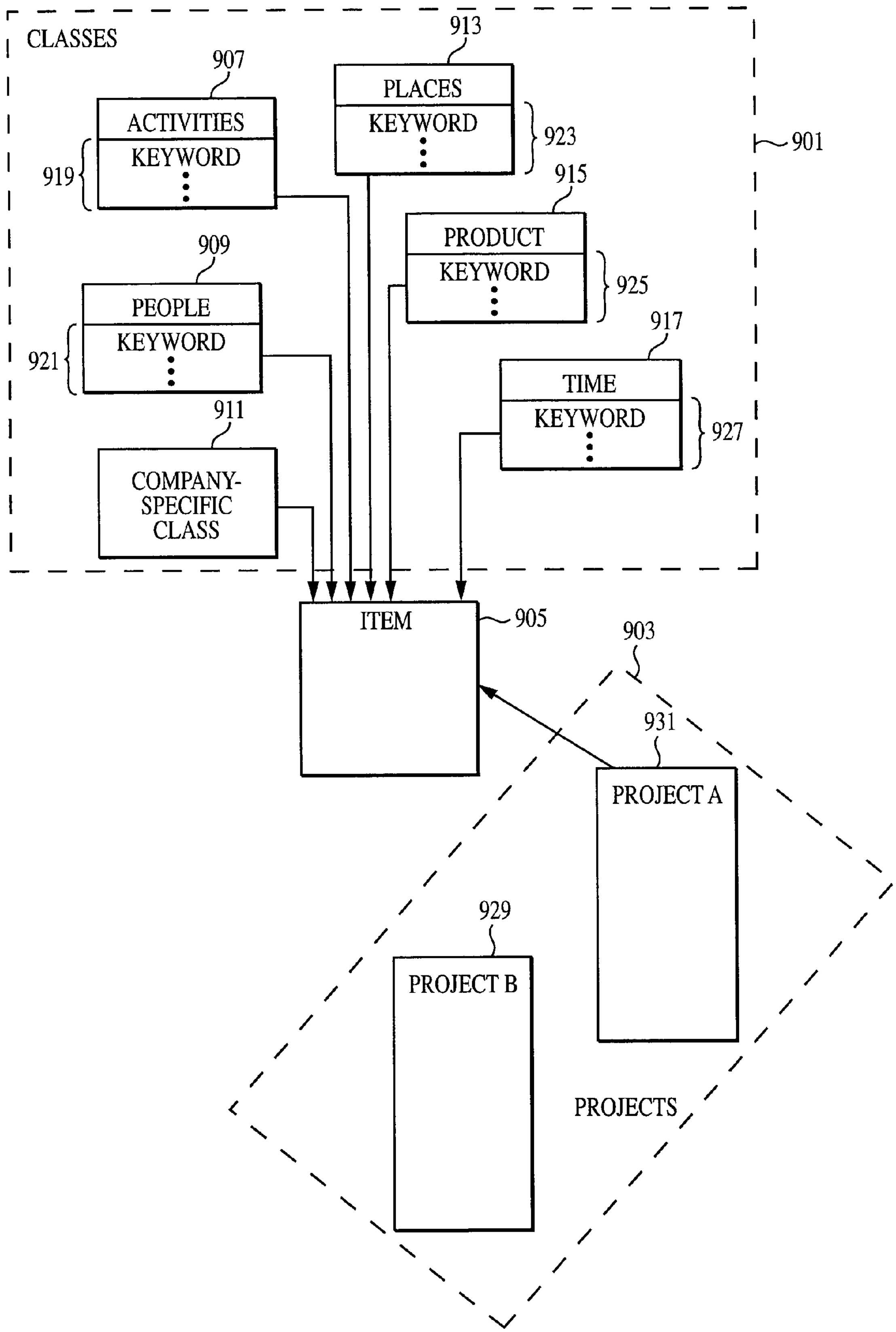

FIG. 9 is a block diagram illustrating assigning classes, projects, keywords, and/or references to an item, in accordance with one or more embodiments of the present invention.

Figure 10A:
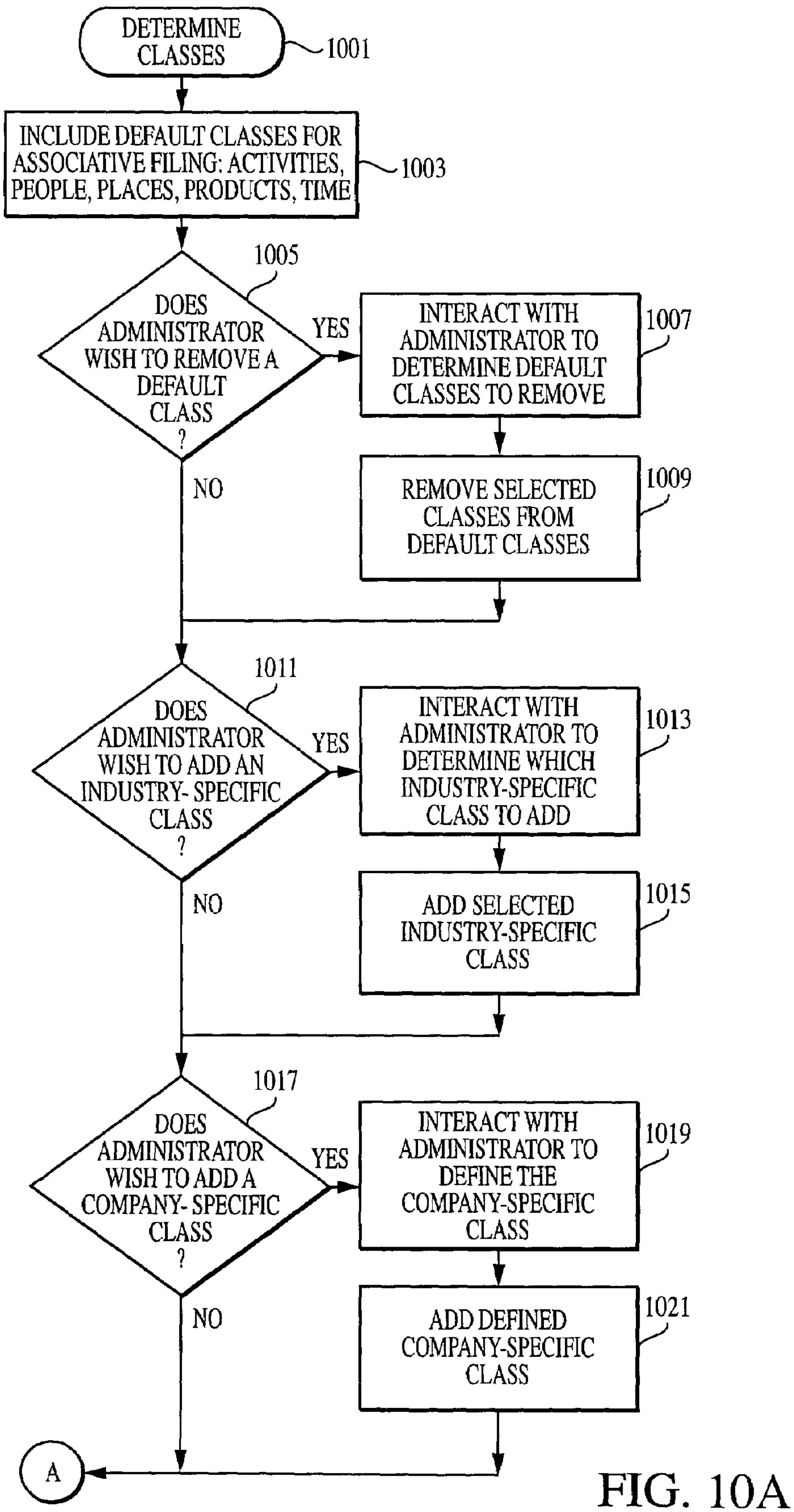
Figure 10B:
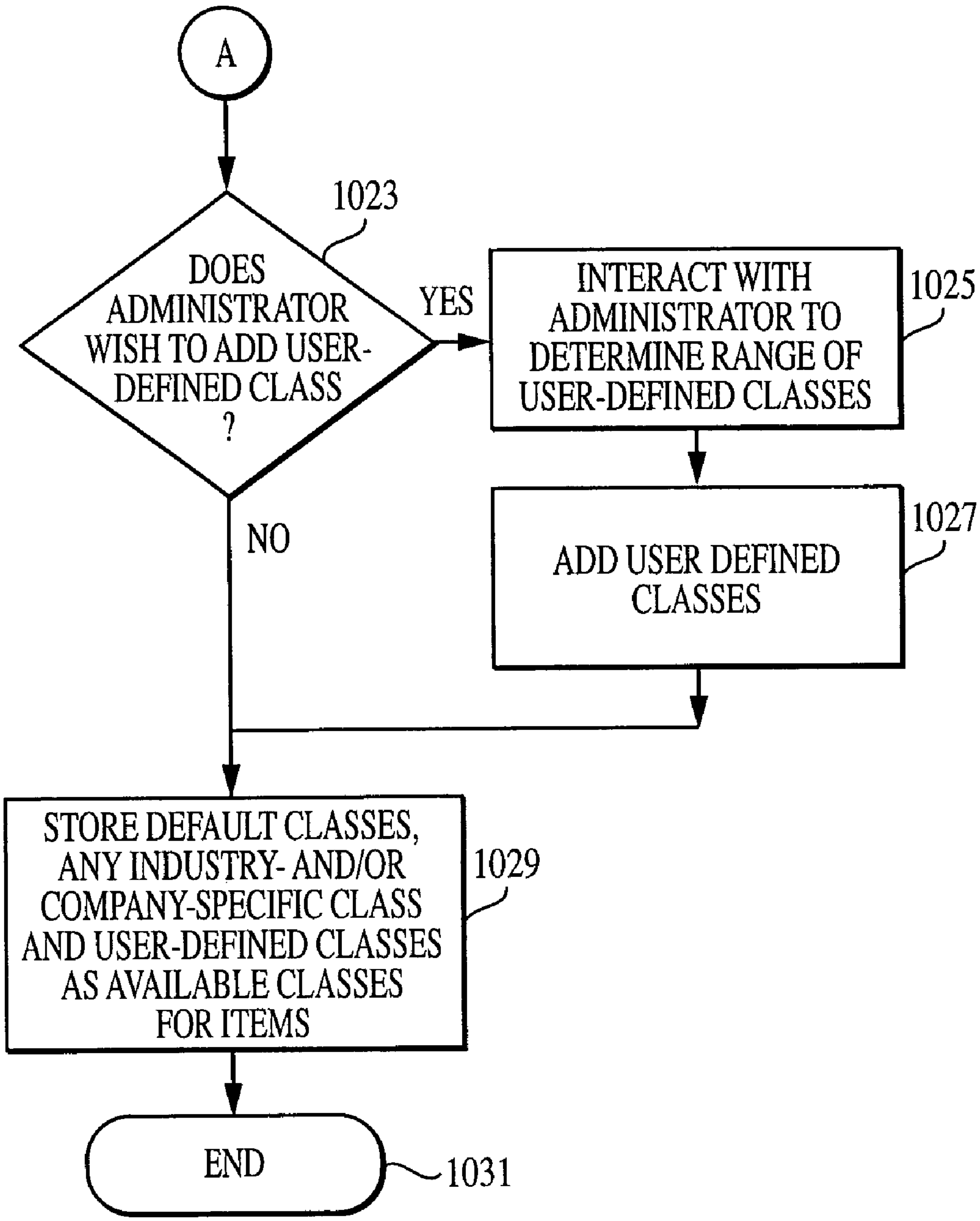

FIGS. 10A-B are a flow chart illustrating an example process for initially determining classes to be assigned to items in the system, according to one or more embodiments of the present invention.

Figure 11:
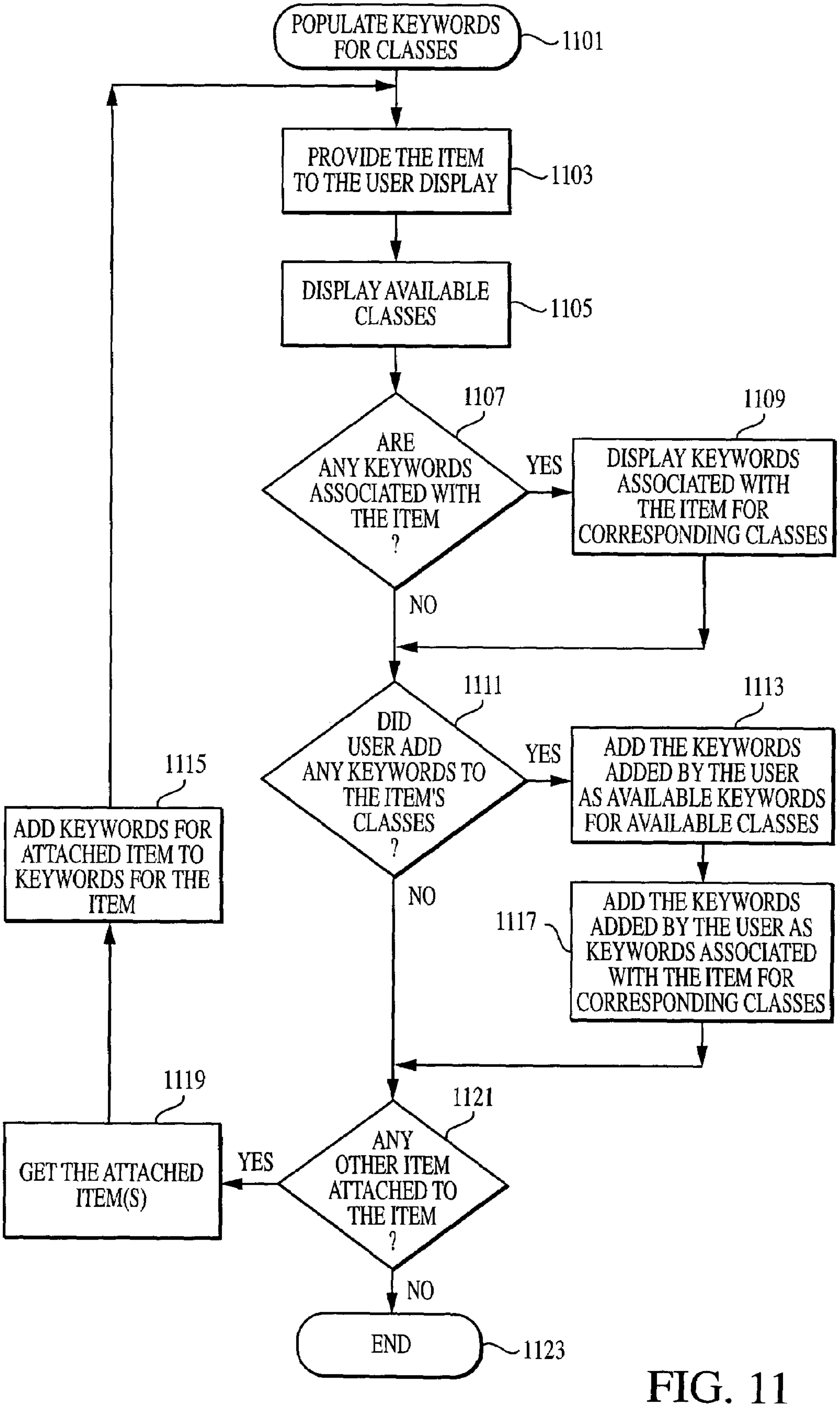

FIG. 11 is a flow chart illustrating an example process of populating candidate keywords for classes, according to one or more embodiments of the present invention.

Figure 12:
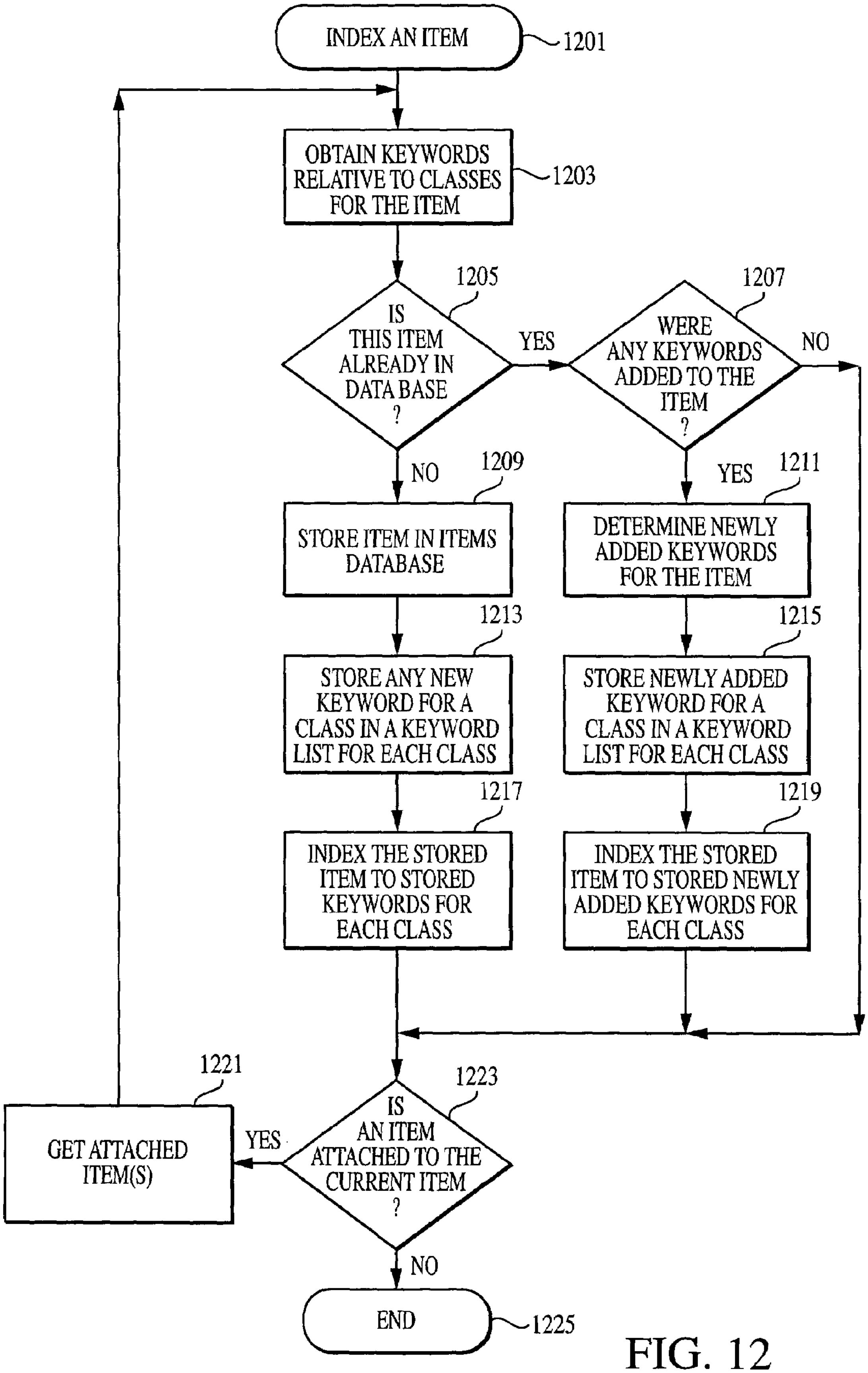

FIG. 12 is a flow chart illustrating an example process of indexing an item relative to classes associated with the item, according to one or more embodiments of the present invention.

Figure 13:
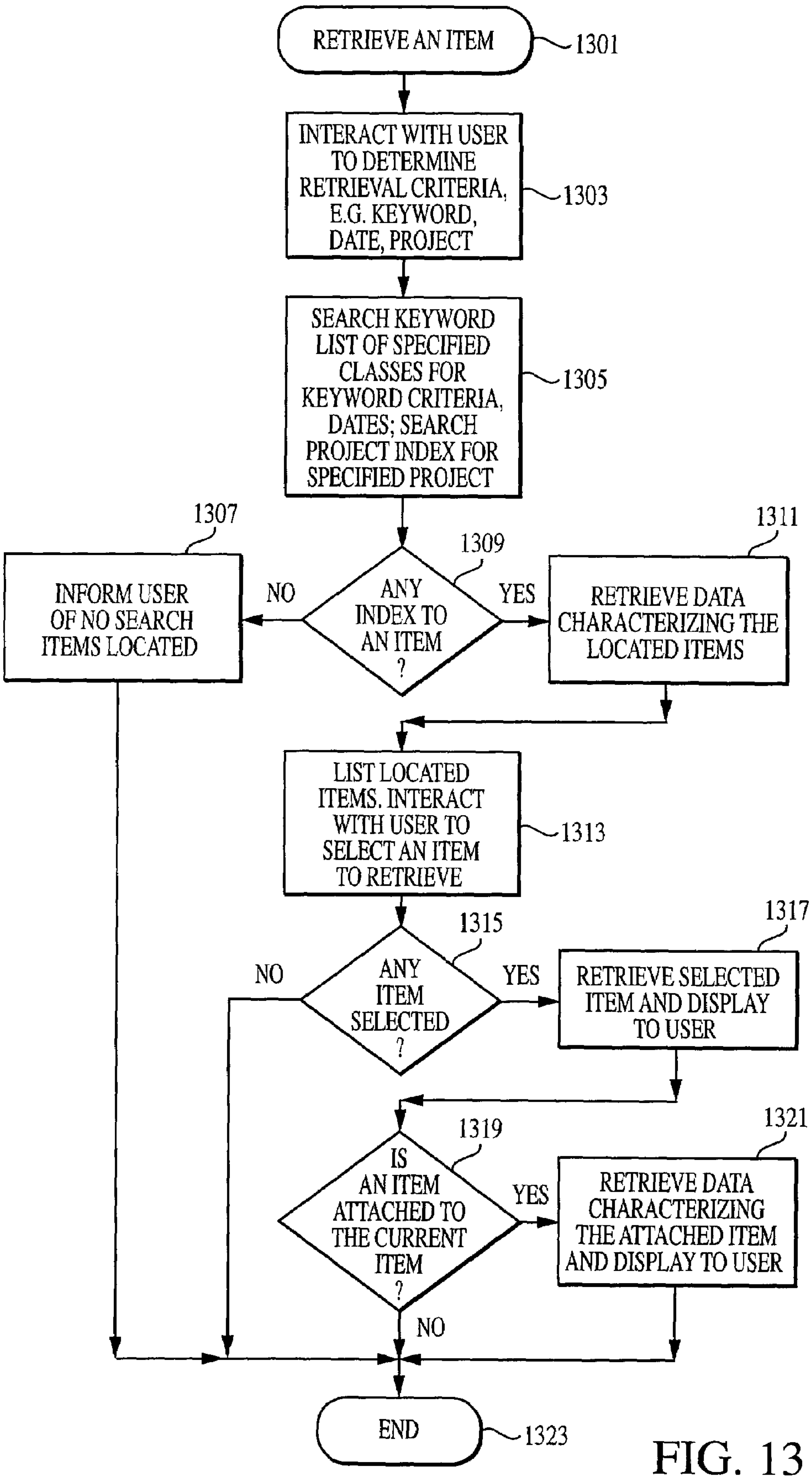

FIG. 13 is a flow chart illustrating an example process of retrieving items based on retrieval criteria such as classes, date, project, and/or keywords according to one or more embodiments of the present invention.

Figure 14:
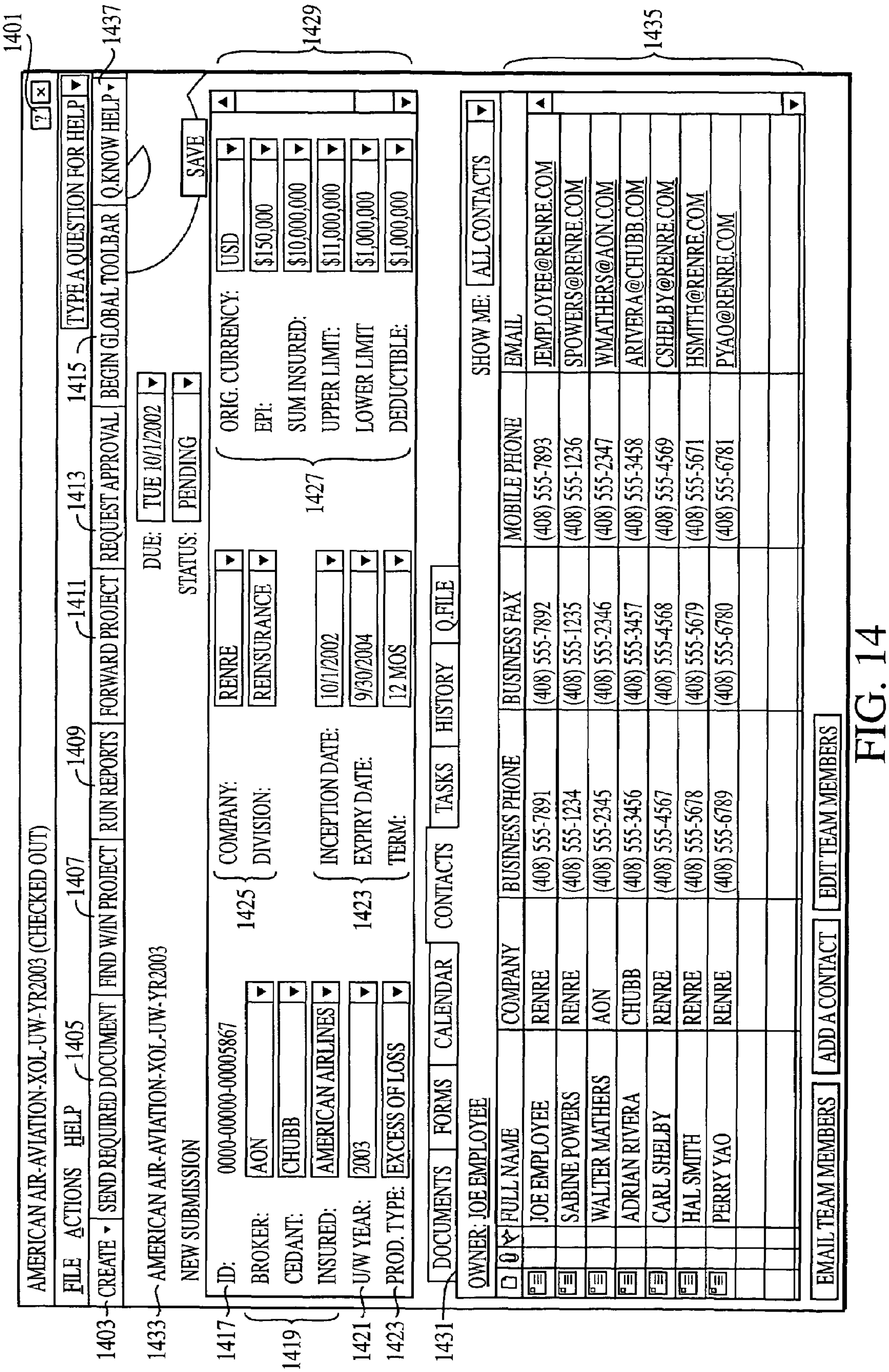

FIG. 14 is an illustration of one example of a user interface for classifying, indexing or retrieving a communication, document, item or project through associative filing, according to one or more embodiments of the present invention.

Figure 15A:
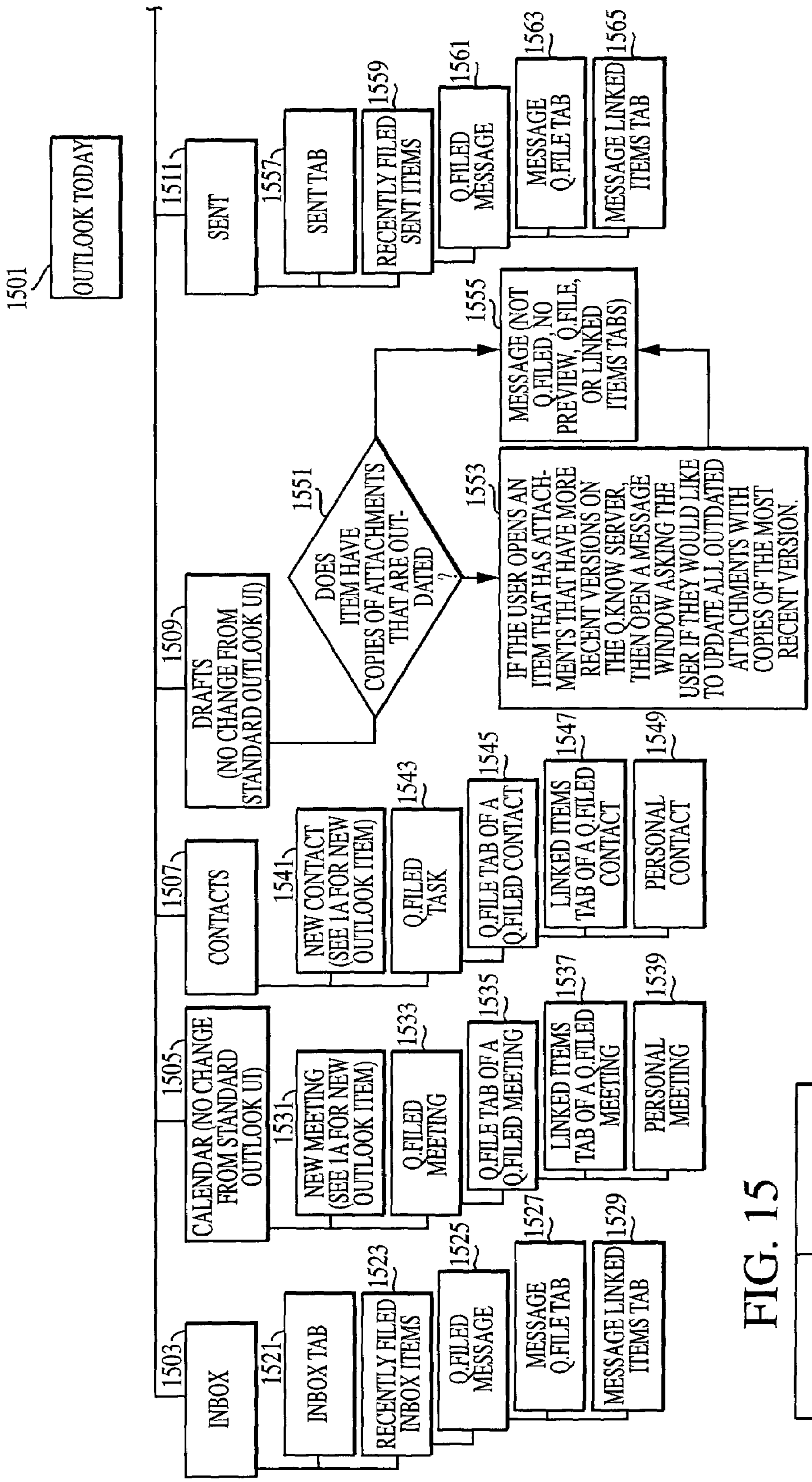
Figure 15:
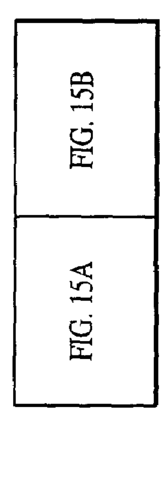
Figure 15B:
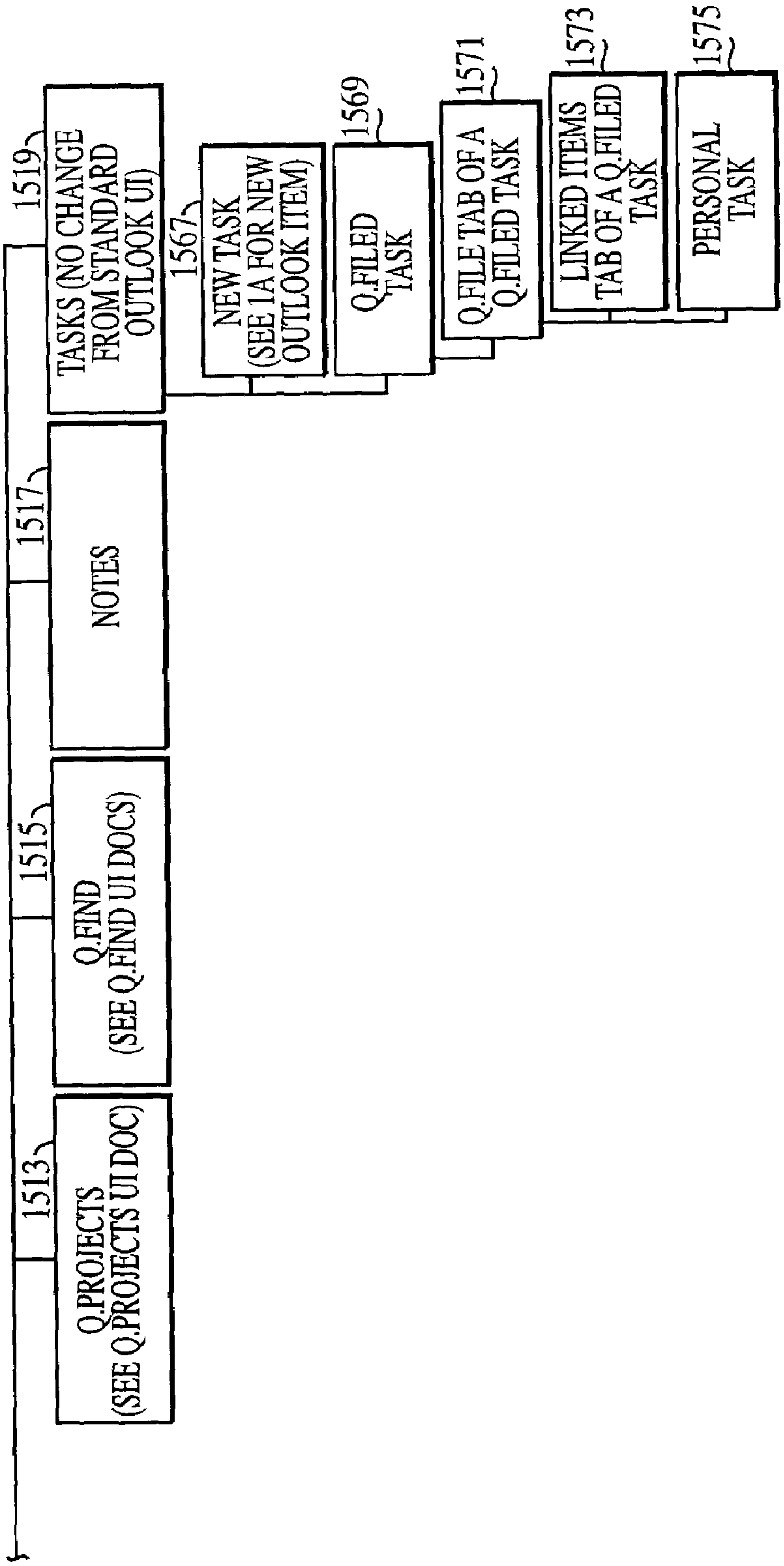

FIG. 15 is a flow chart illustrating an extension of Outlook to allow the user to interface via their native application interface, with one or more embodiments of the present invention.

Figure 16:
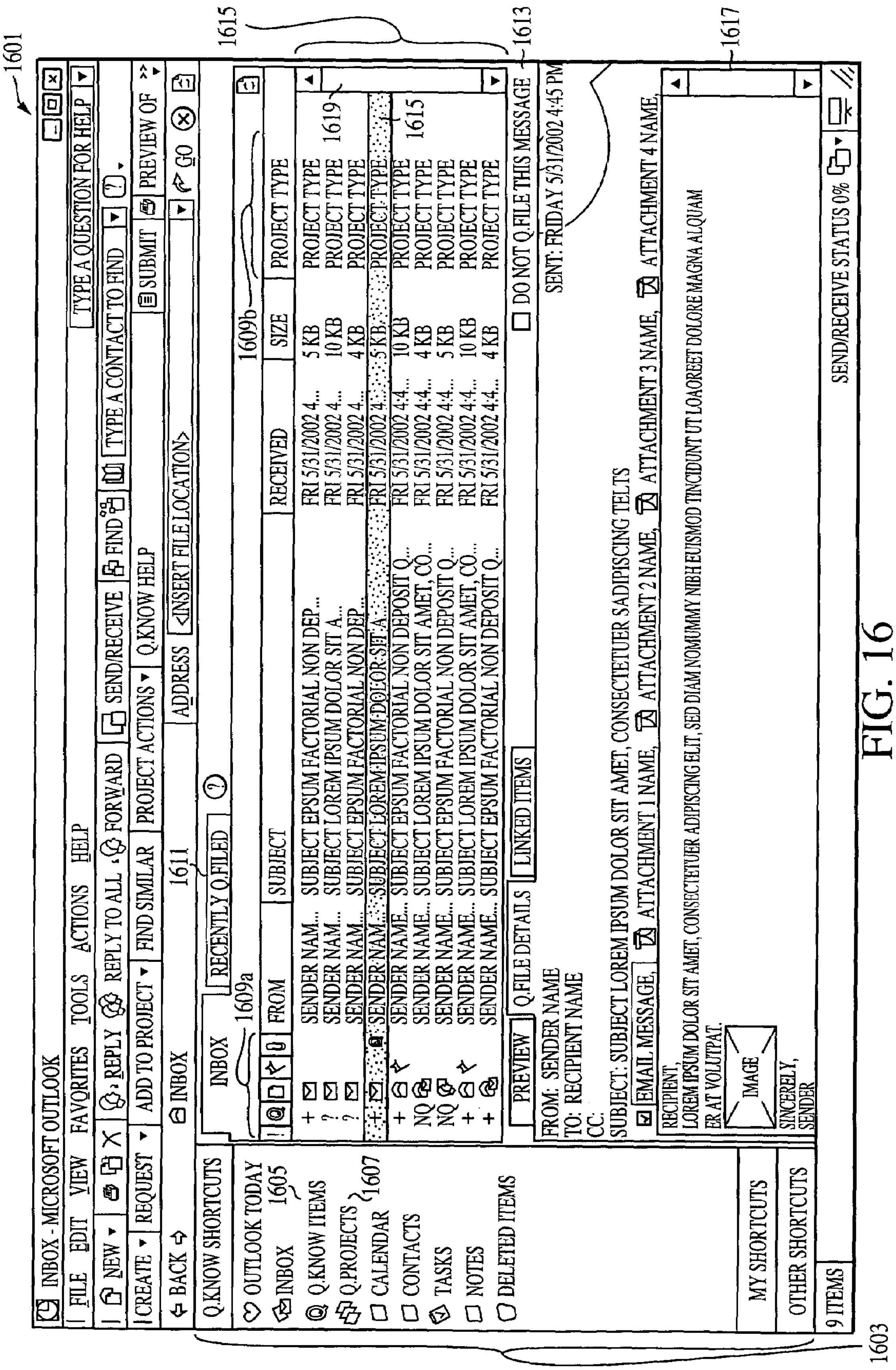

FIG. 16 illustrates an example user interface showing an email in an Outlook inbox to be used as an item, according to one or more embodiments of the present invention.

Figure 17:
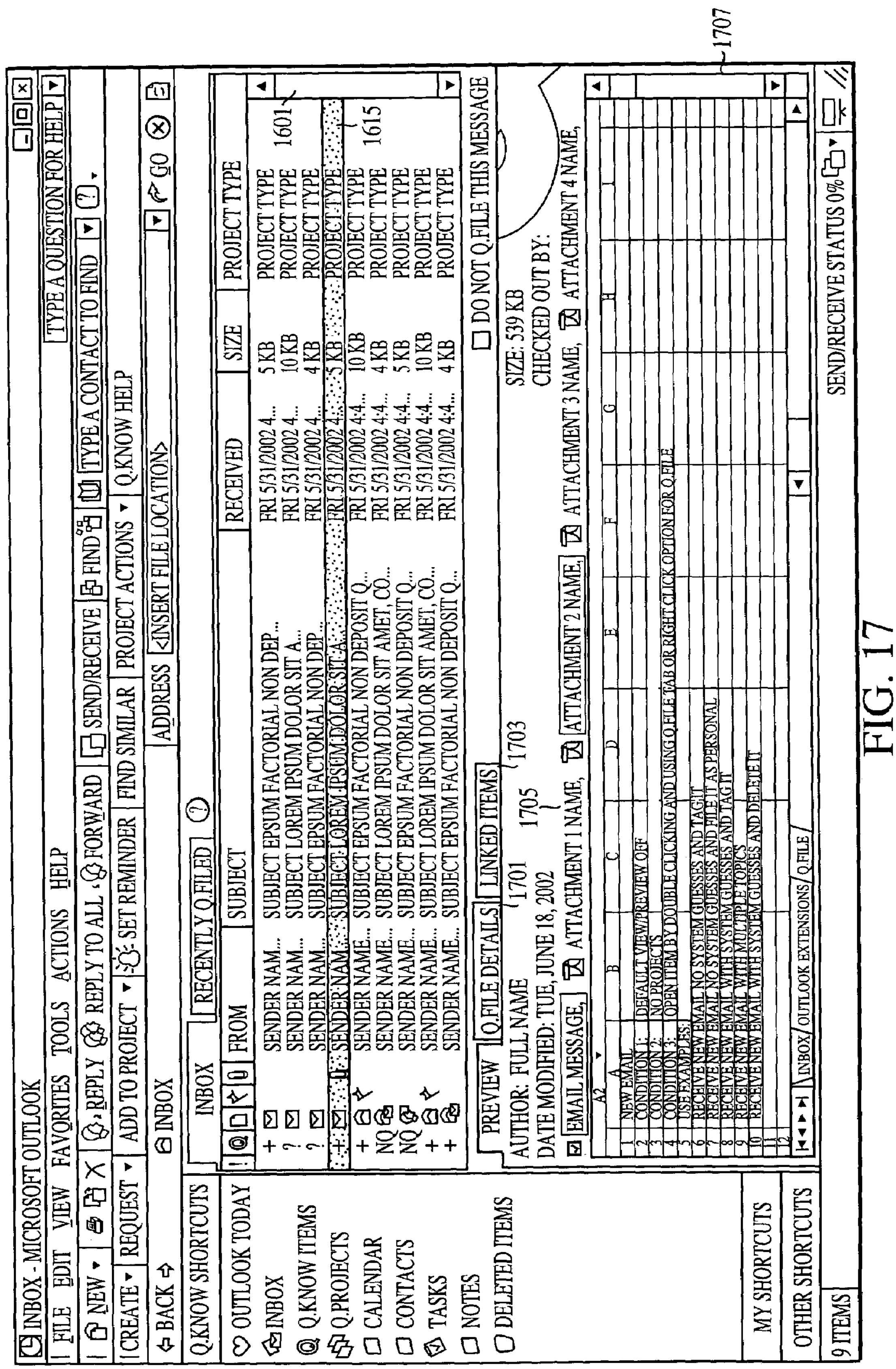

FIG. 17 illustrates an example user interface showing an attachment to the item of FIG. 16, according to one or more embodiments of the present invention.

Figure 18:
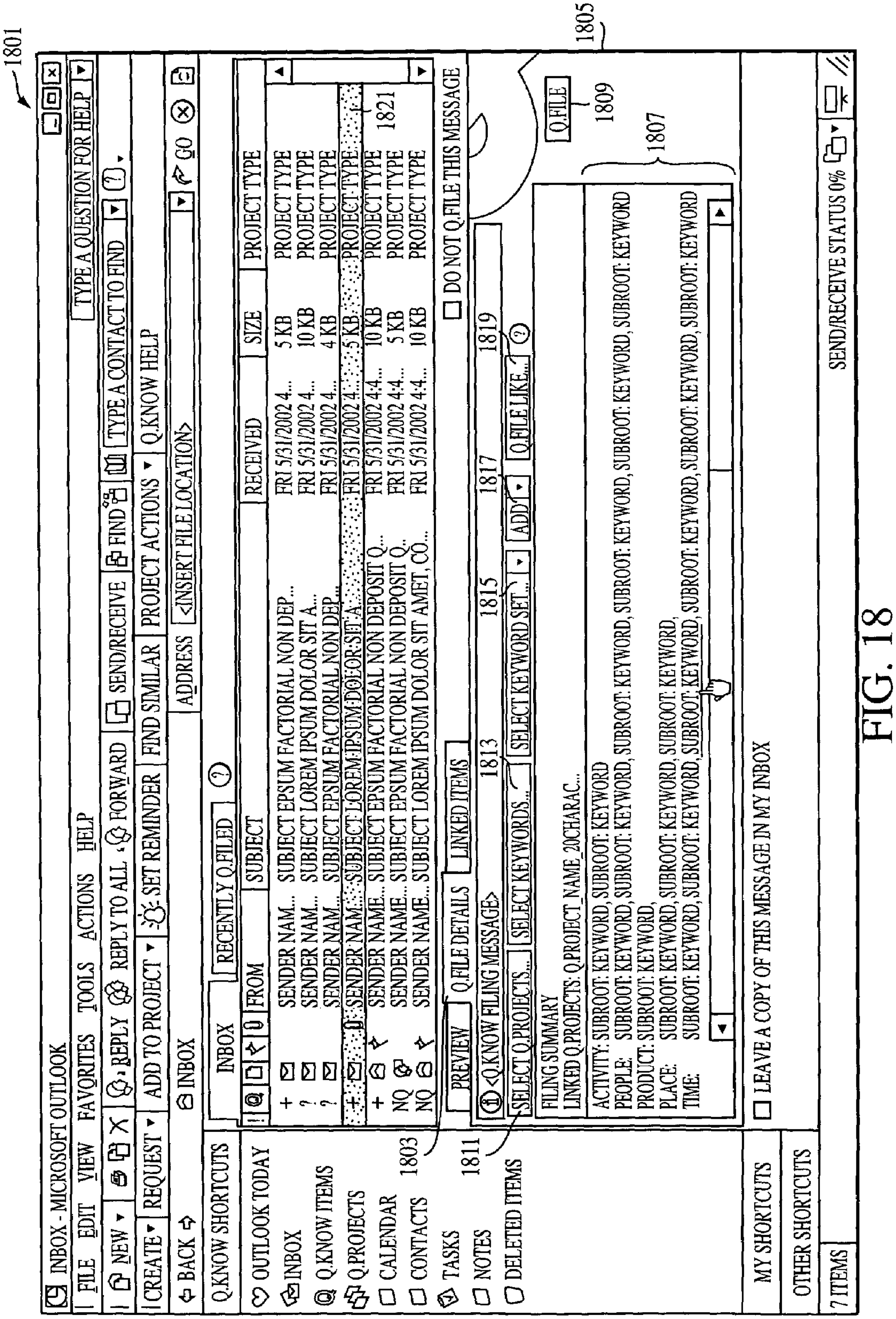

FIG. 18 illustrates an example user interface showing classes and keywords assigned to the item of the previous FIG. 16, according to one or more embodiments of the present invention.

Figure 19:
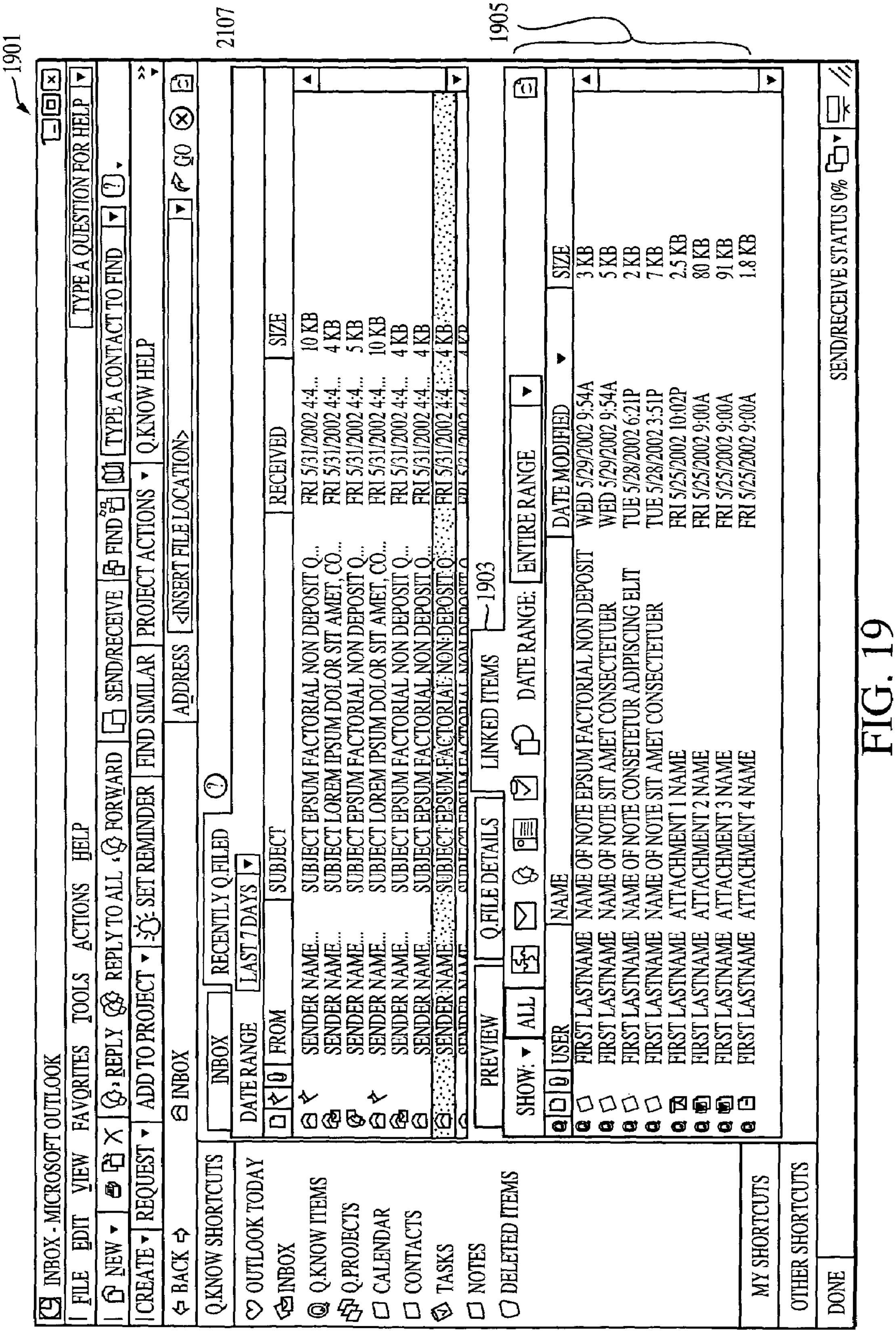

FIG. 19 illustrates an example user interface showing a summary of items attached to the item of FIG. 16, according to one or more embodiments of the present invention.

Figure 20:
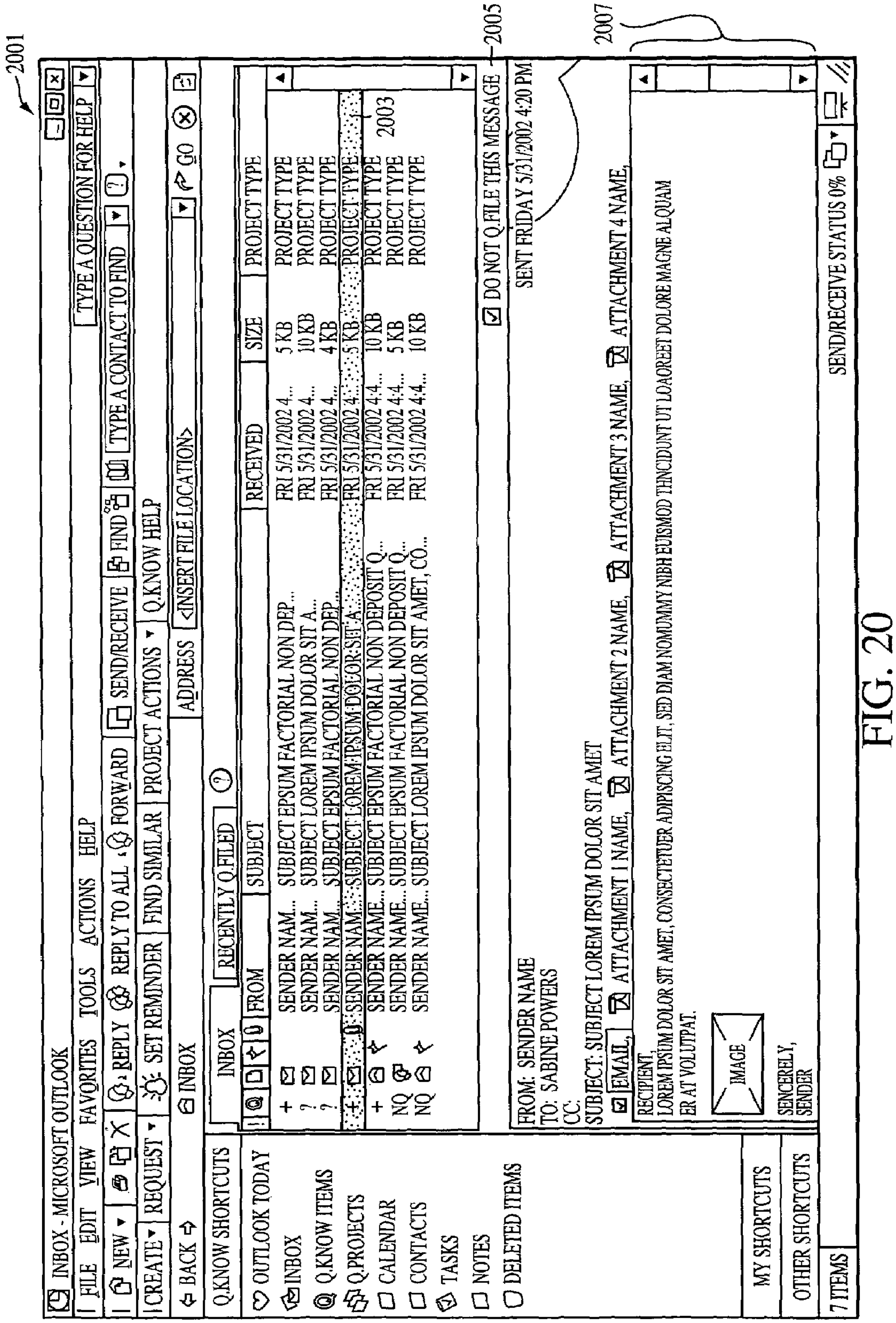

FIG. 20 illustrates an example user interface showing handling of the e-mail as an item, according to one or more embodiments of the present invention.

Figure 21:
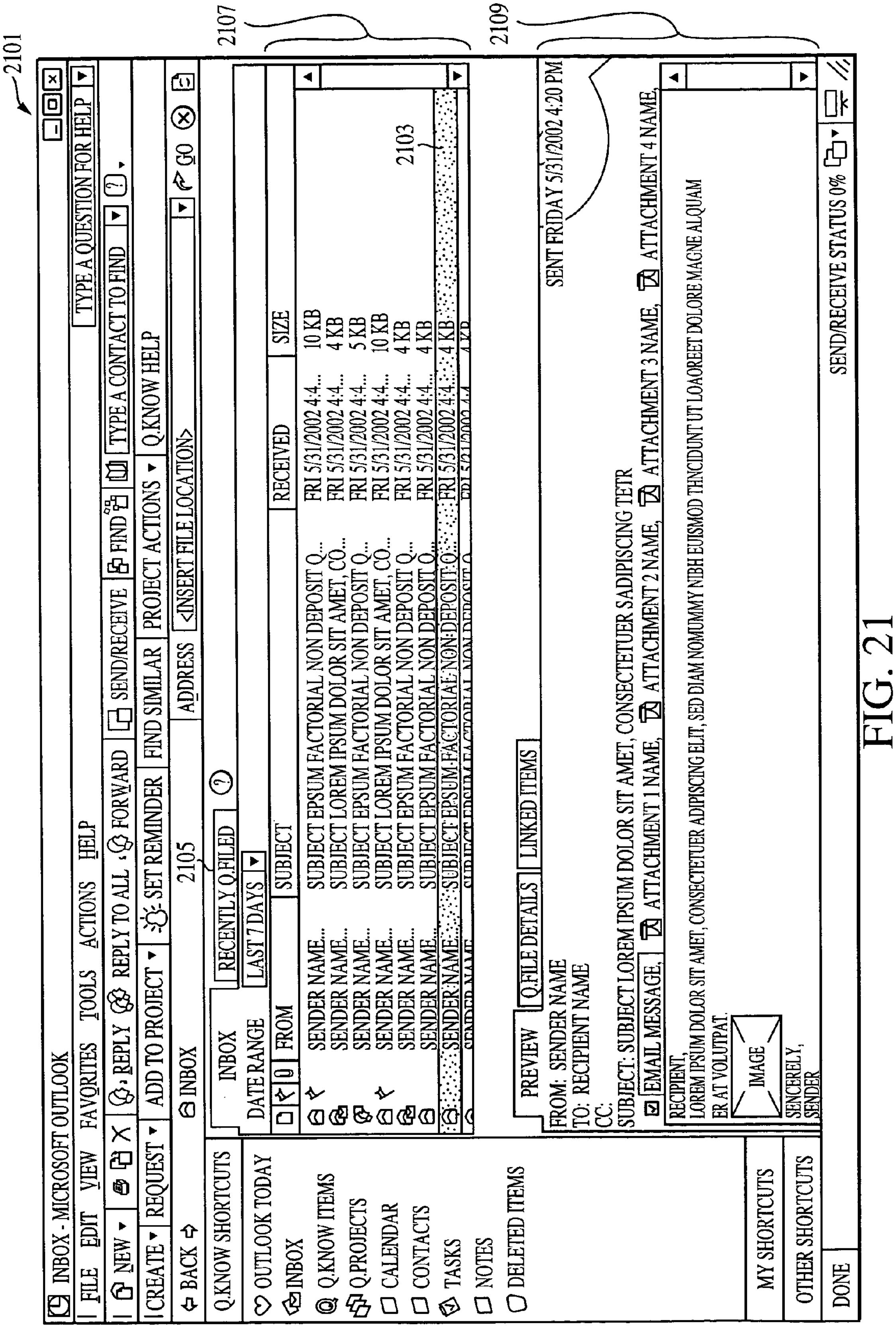

FIG. 21 illustrates an example user interface showing a preview of the e-mail as an item, according to one or more embodiments of the present invention.

Figure 22:
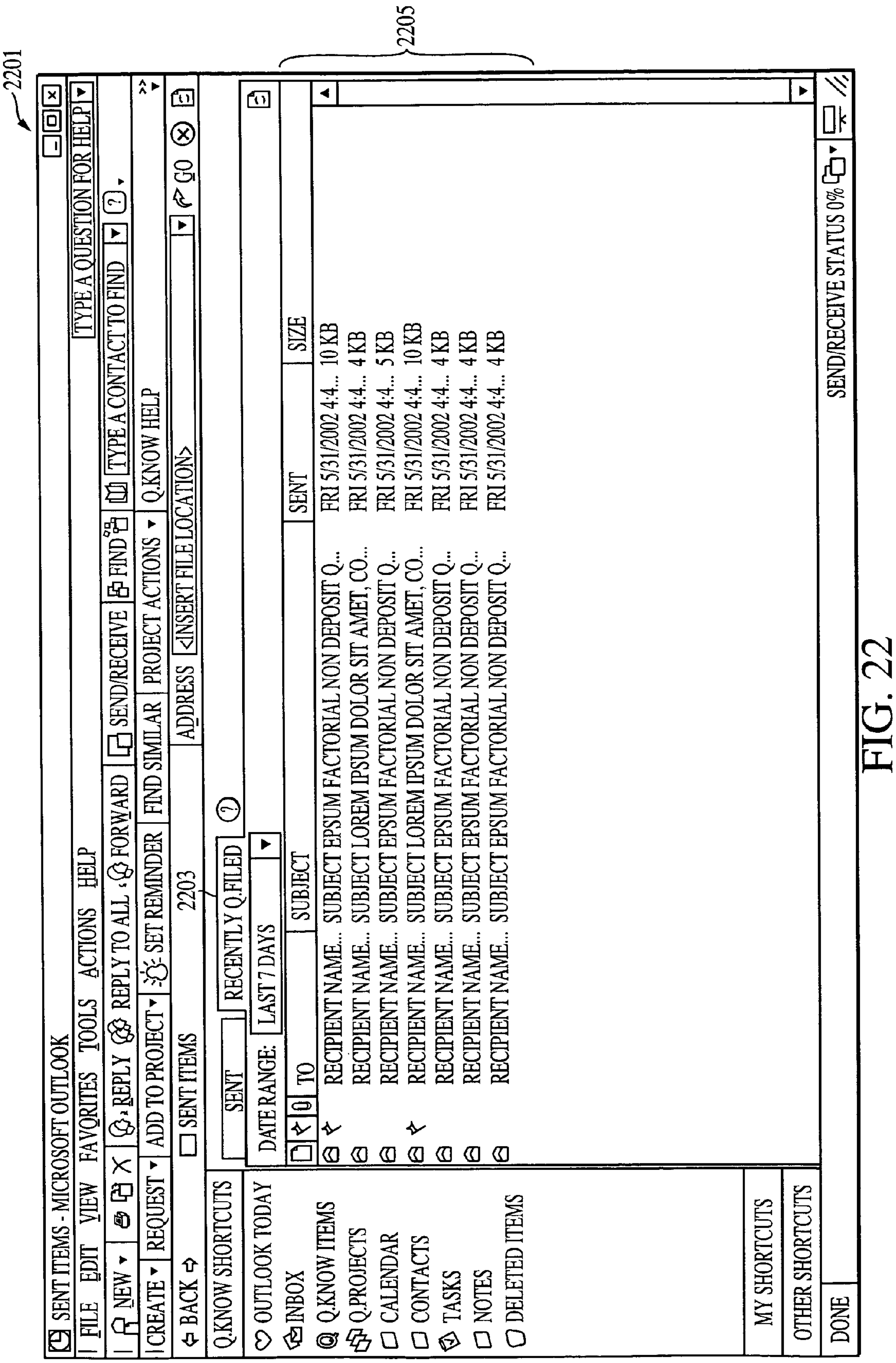

FIG. 22 illustrates an example user interface showing a history of recently filed items, according to one or more embodiments of the present invention.

Figure 23:
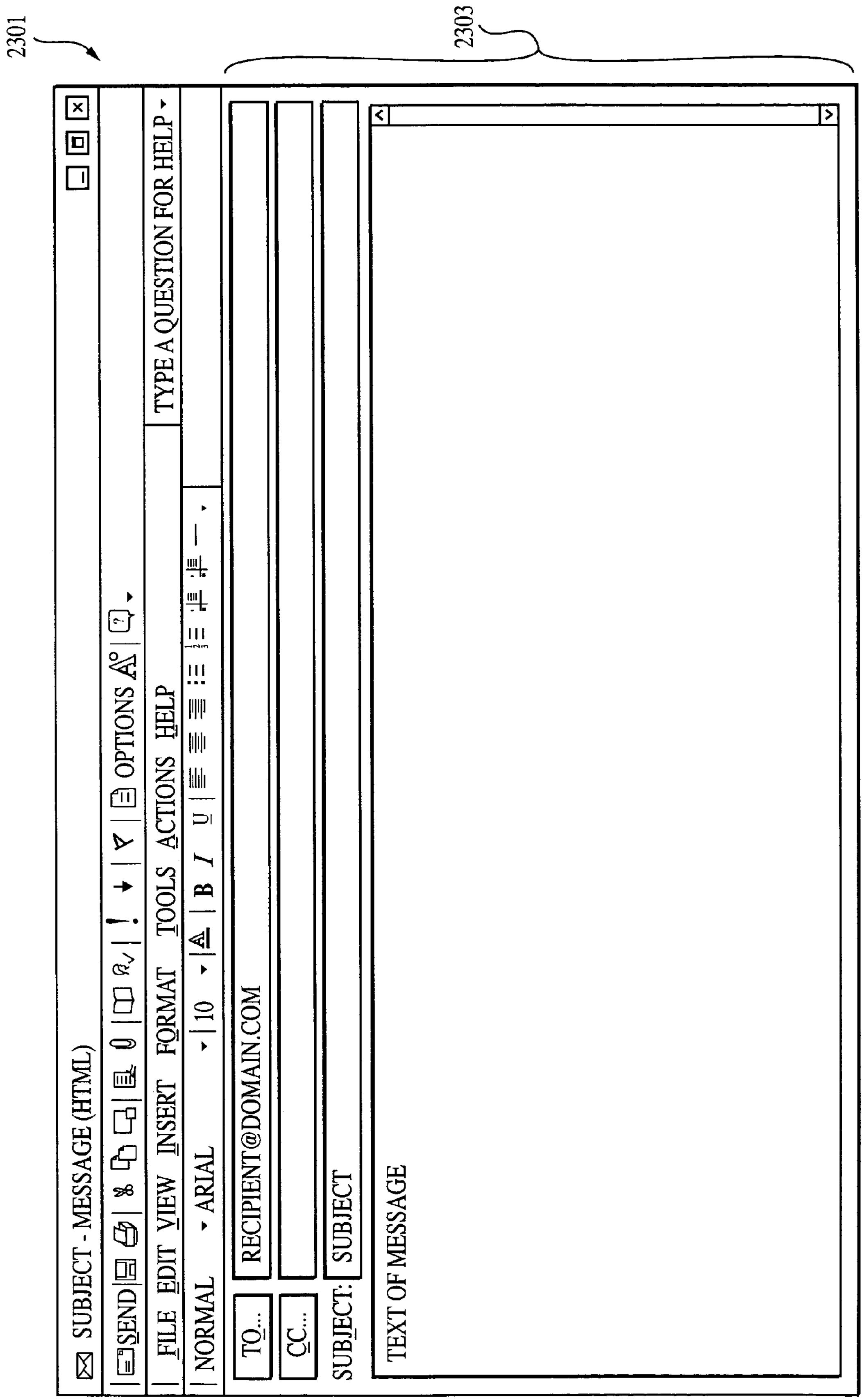

FIG. 23 illustrates an example user interface showing creation of a new e-mail in connection with one or more embodiments of the present invention.

Figure 24:
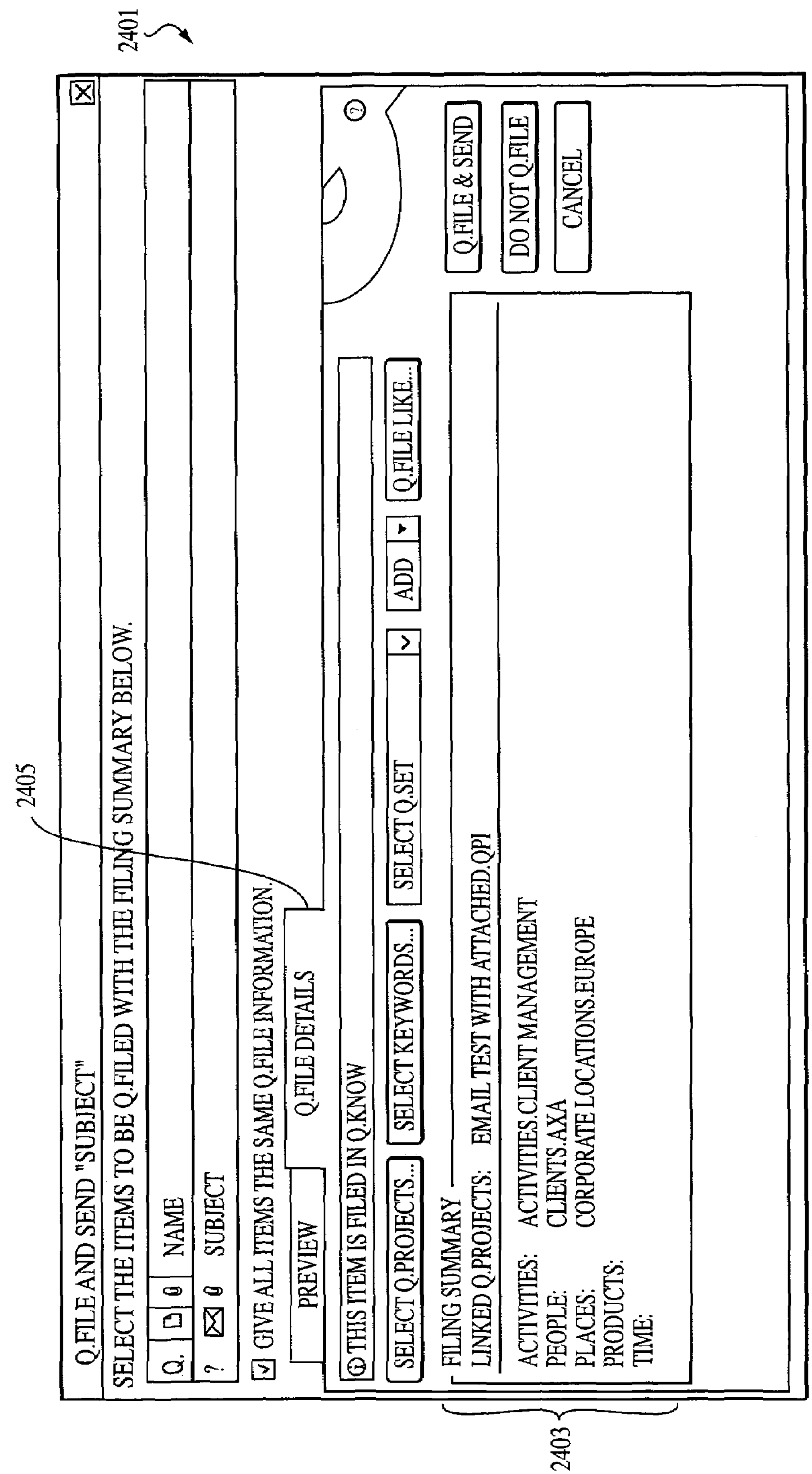

FIG. 24 illustrates an example user interface showing a summary of the classes assigned to the e-mail as an item, according to one or more embodiments of the present invention.

Figure 25:
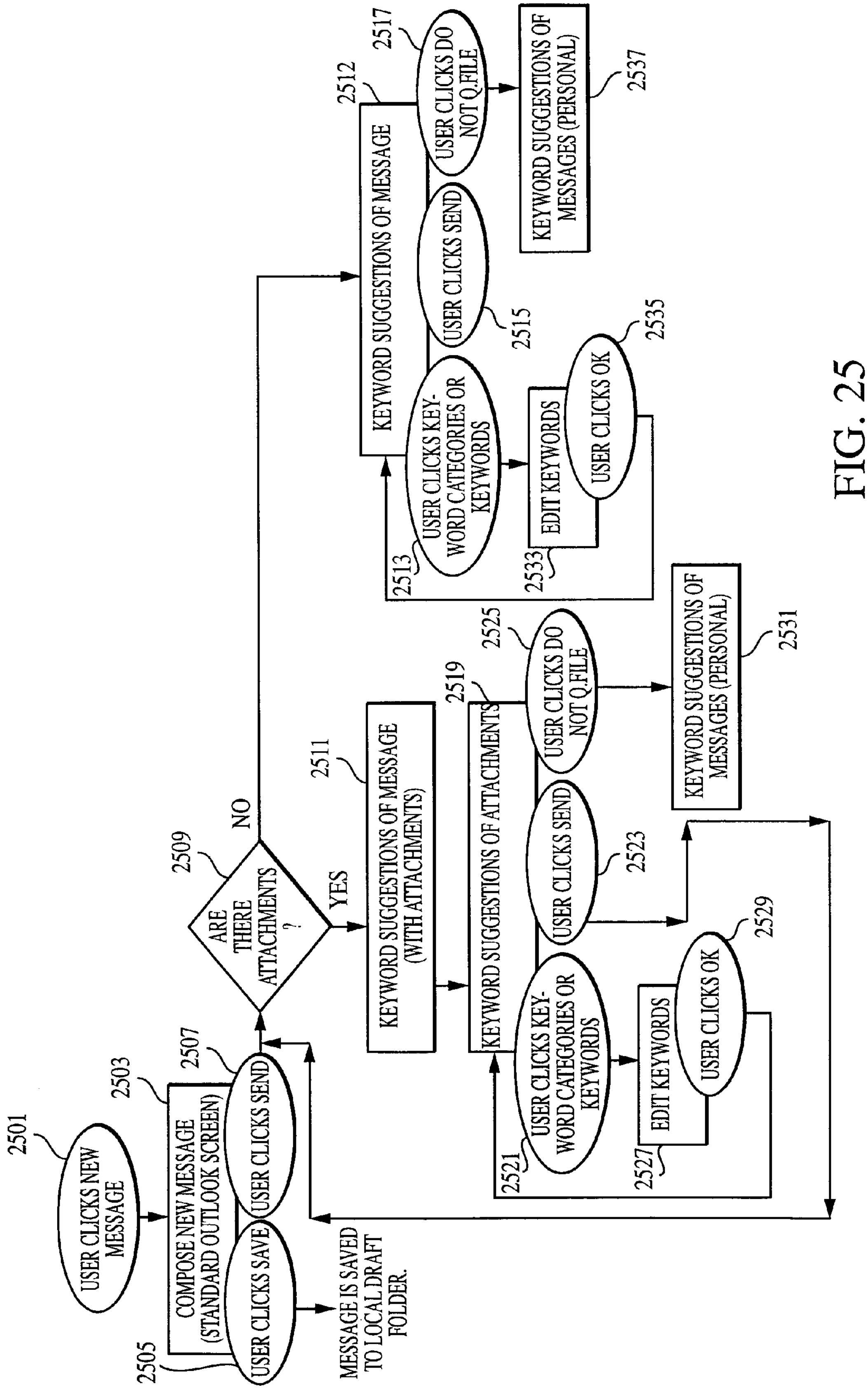

FIG. 25 is a flow chart illustrating one example of composing a new message as an item via a standard Outlook interface, according to one or more embodiments of the present invention.

Figure 26:
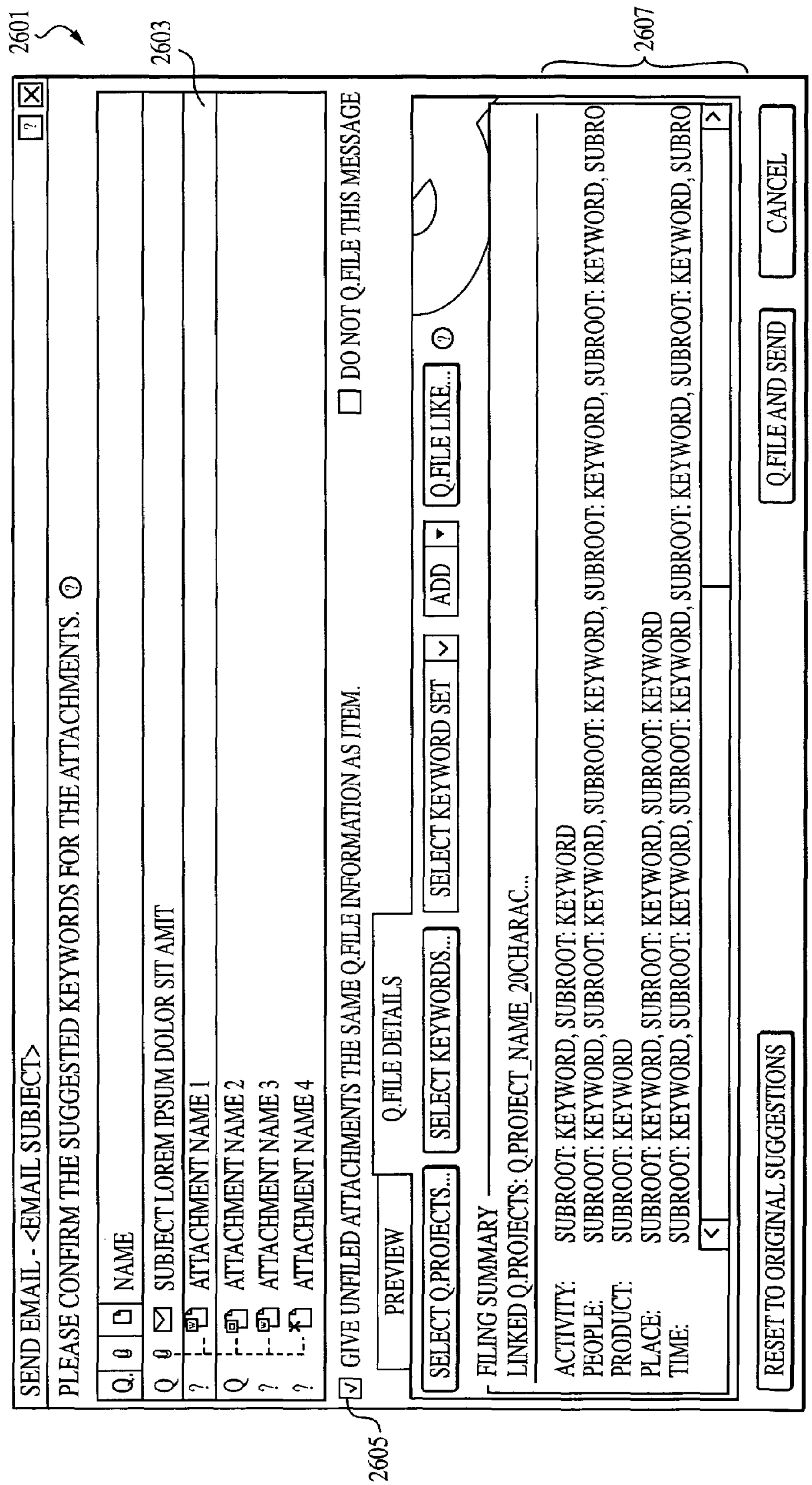

FIG. 26 illustrates an example user interface showing presenting candidate keywords to a user for assigning to classes for the new message (as an item), in accordance with one or more embodiments of the present invention.

Figure 27:
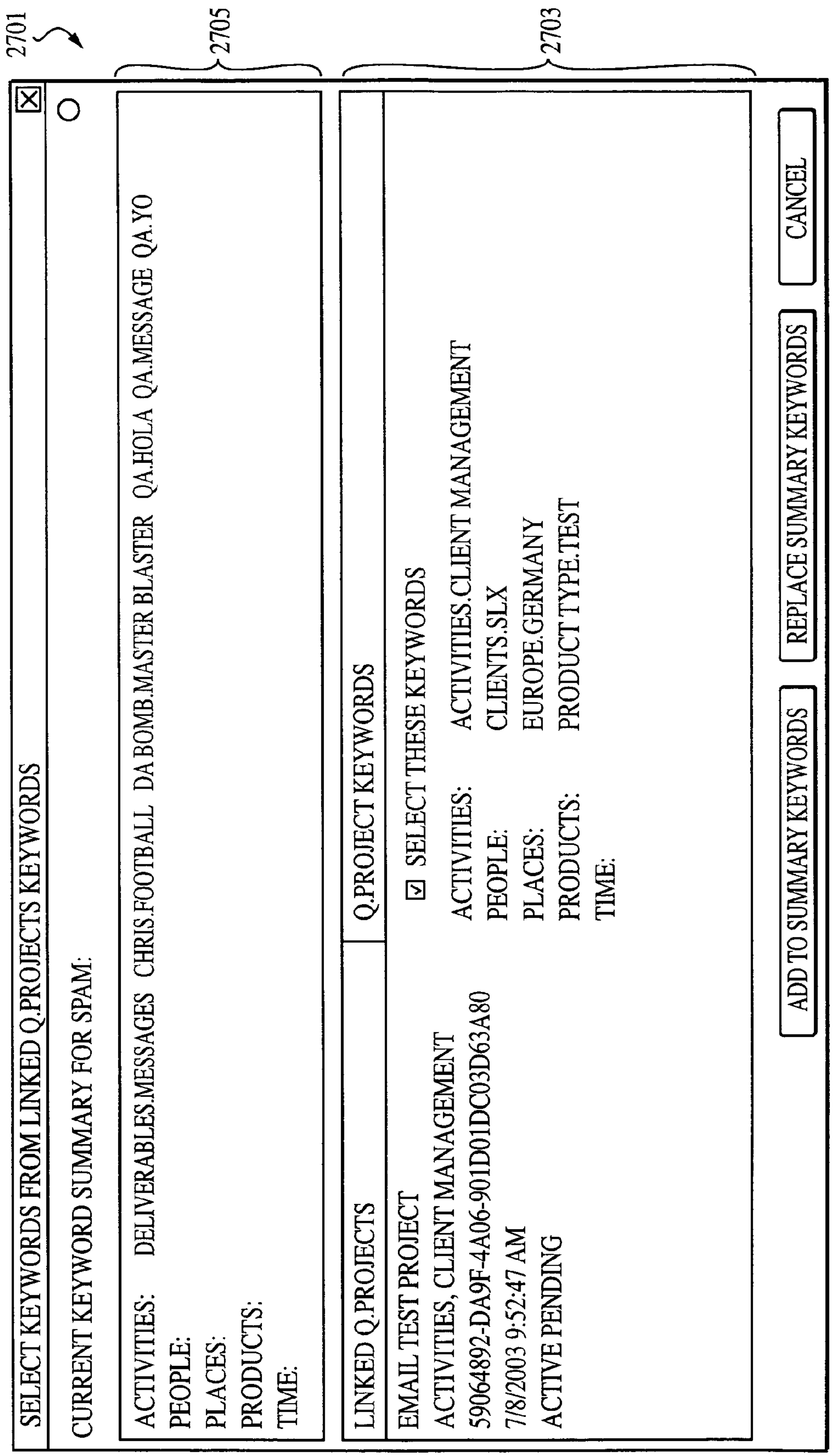

FIG. 27 illustrates an example user interface showing a confirmation of keywords selected via a project assignment for the new message, according to one or more embodiments of the present invention.

Figure 28:
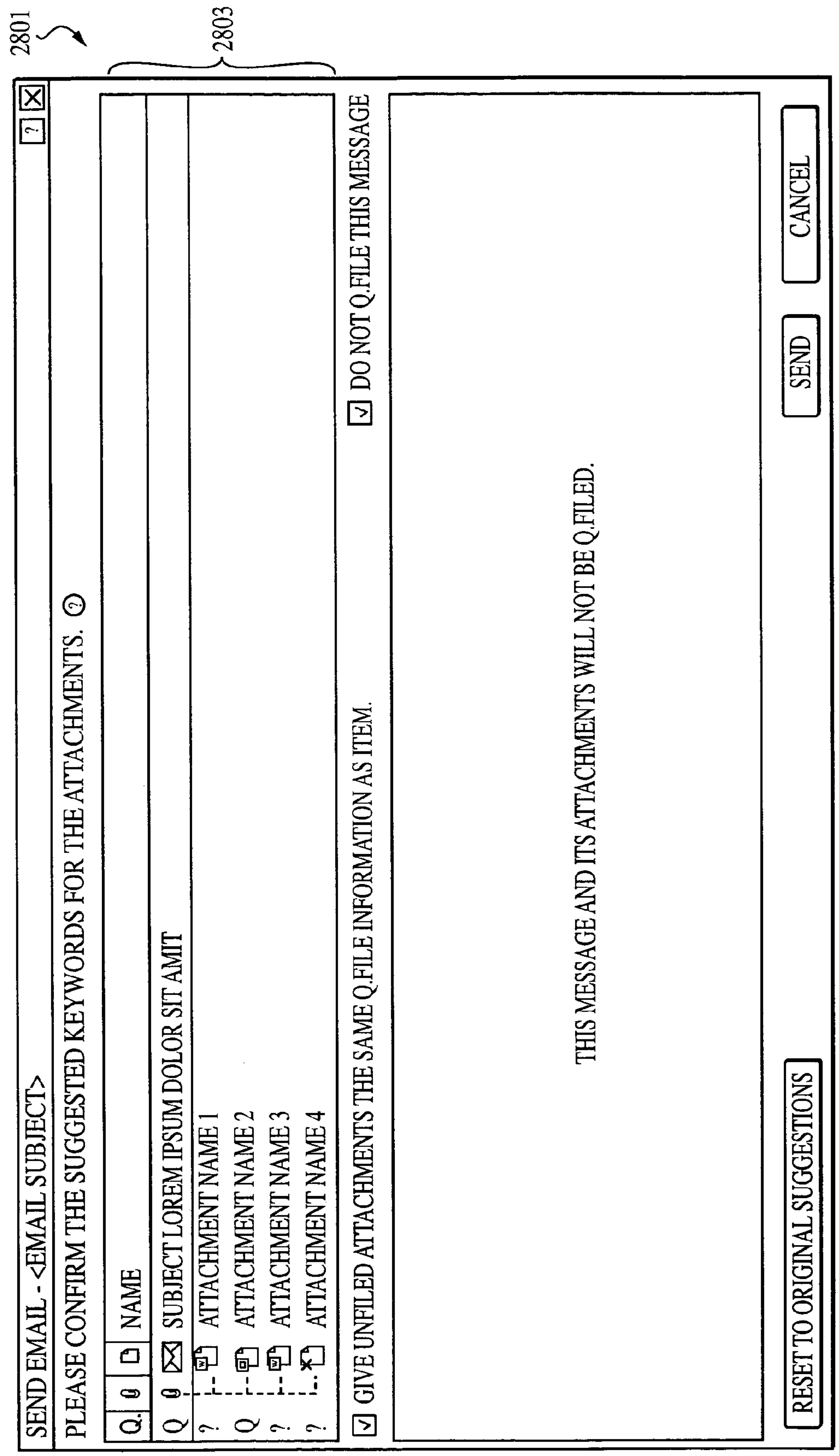

FIG. 28 illustrates an example user interface showing a top level confirmation of suggested keywords for items attached to the new message, according to one or more embodiments of the present invention.

Figure 29:
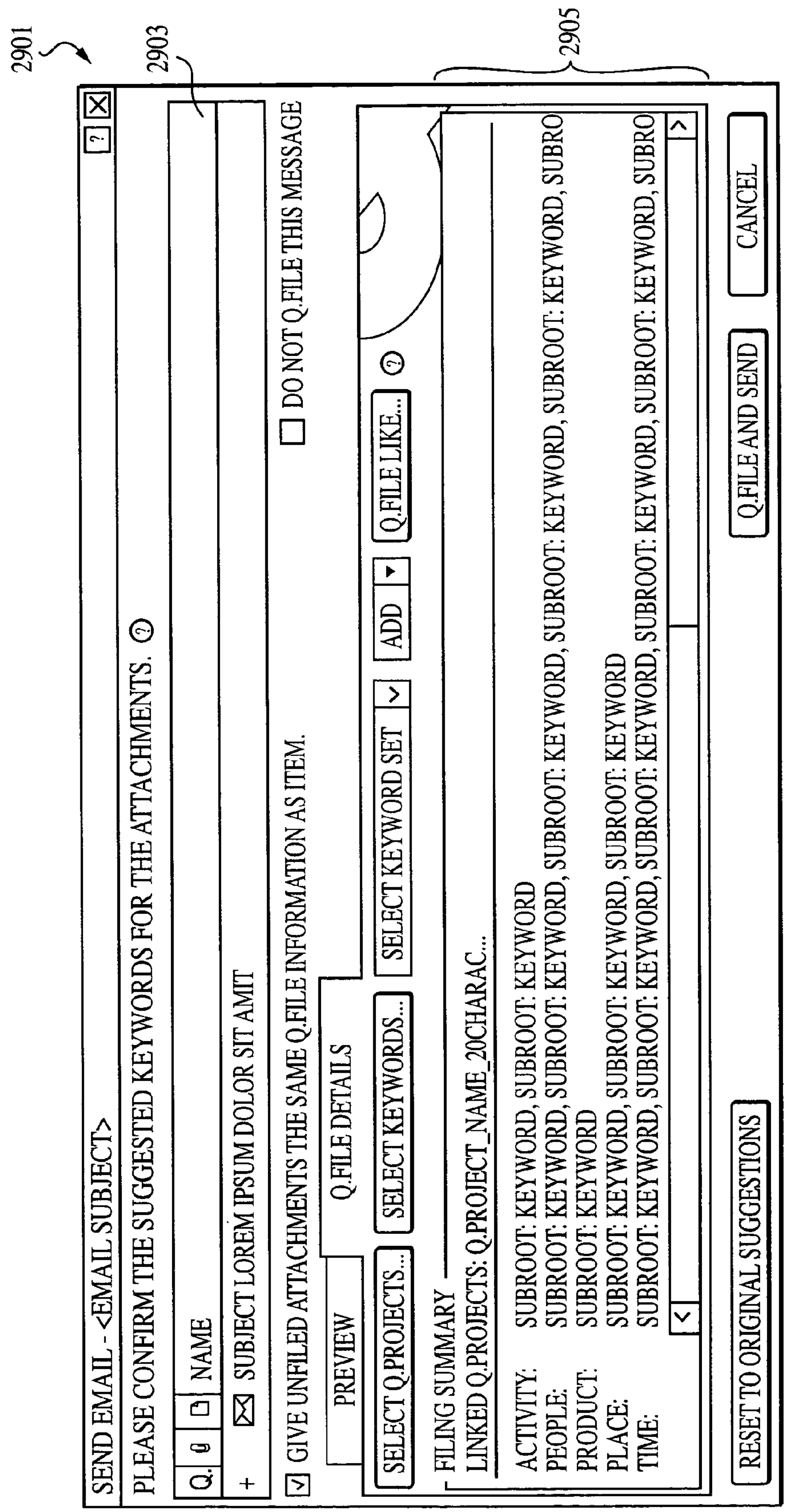

FIG. 29 illustrates an example user interface showing a confirmation of the suggested keywords for an individual item attached to the new message, according to one or more embodiments of the present invention.

Figure 30:
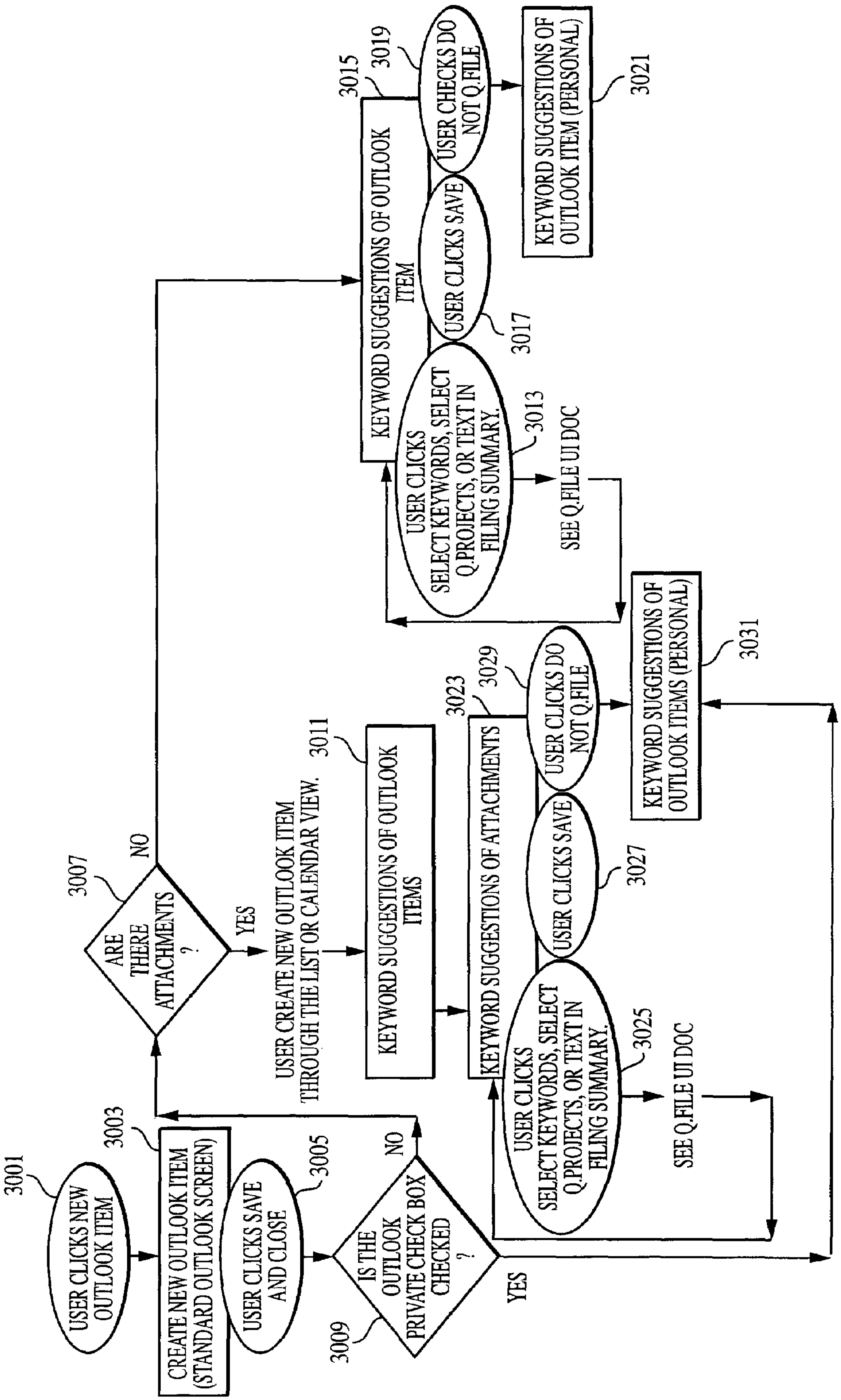

FIG. 30 illustrates a flow chart illustrating one example of a process for creating a new item via Outlook, with keyword suggestions, according to one or more embodiments of the present invention.

Figure 31:
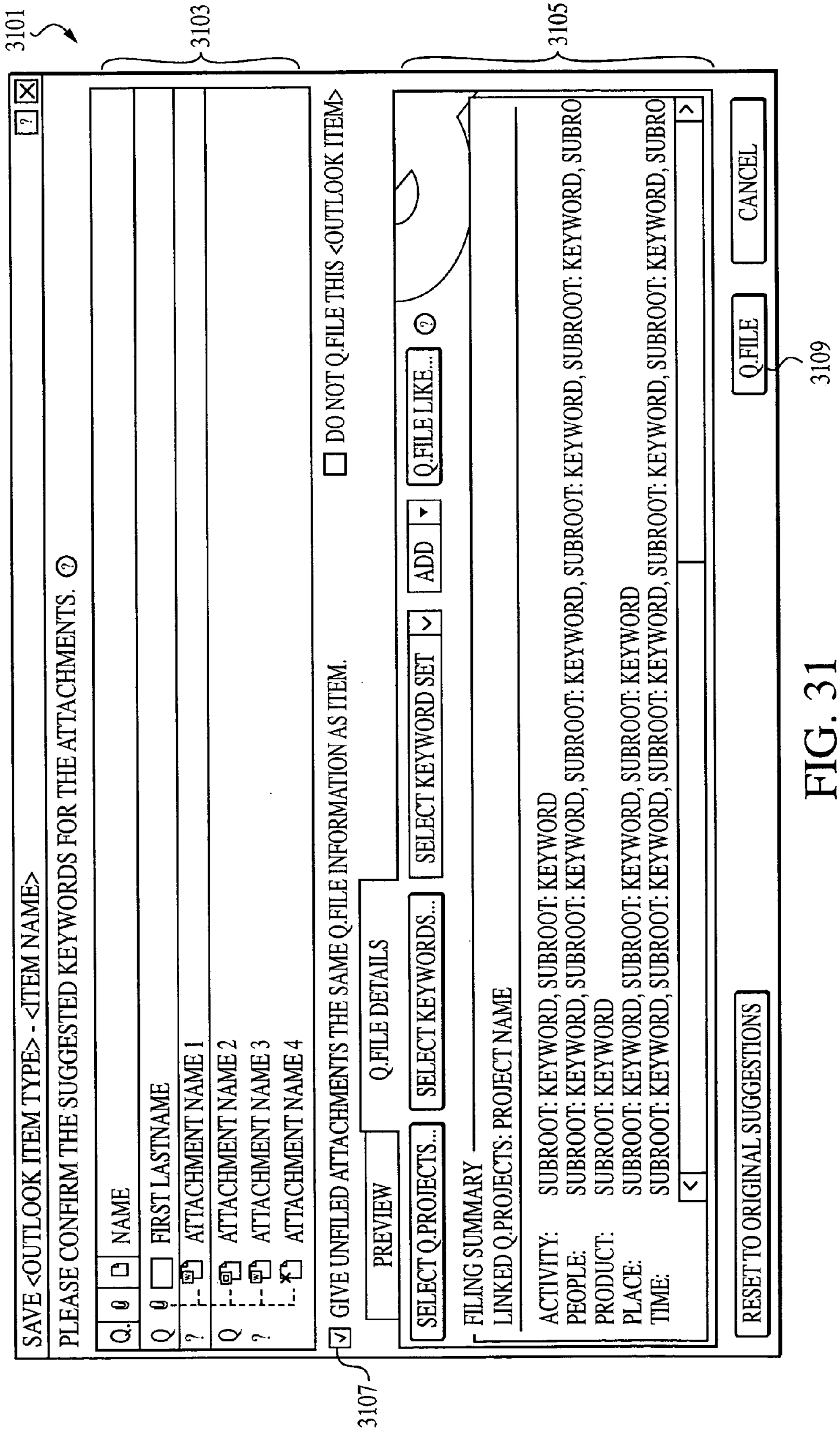

FIG. 31 illustrates an example user interface showing a presentation of candidate keywords to a user for assigning to classes for the new Outlook item, according to one or more embodiments of the present invention.

Figure 32:
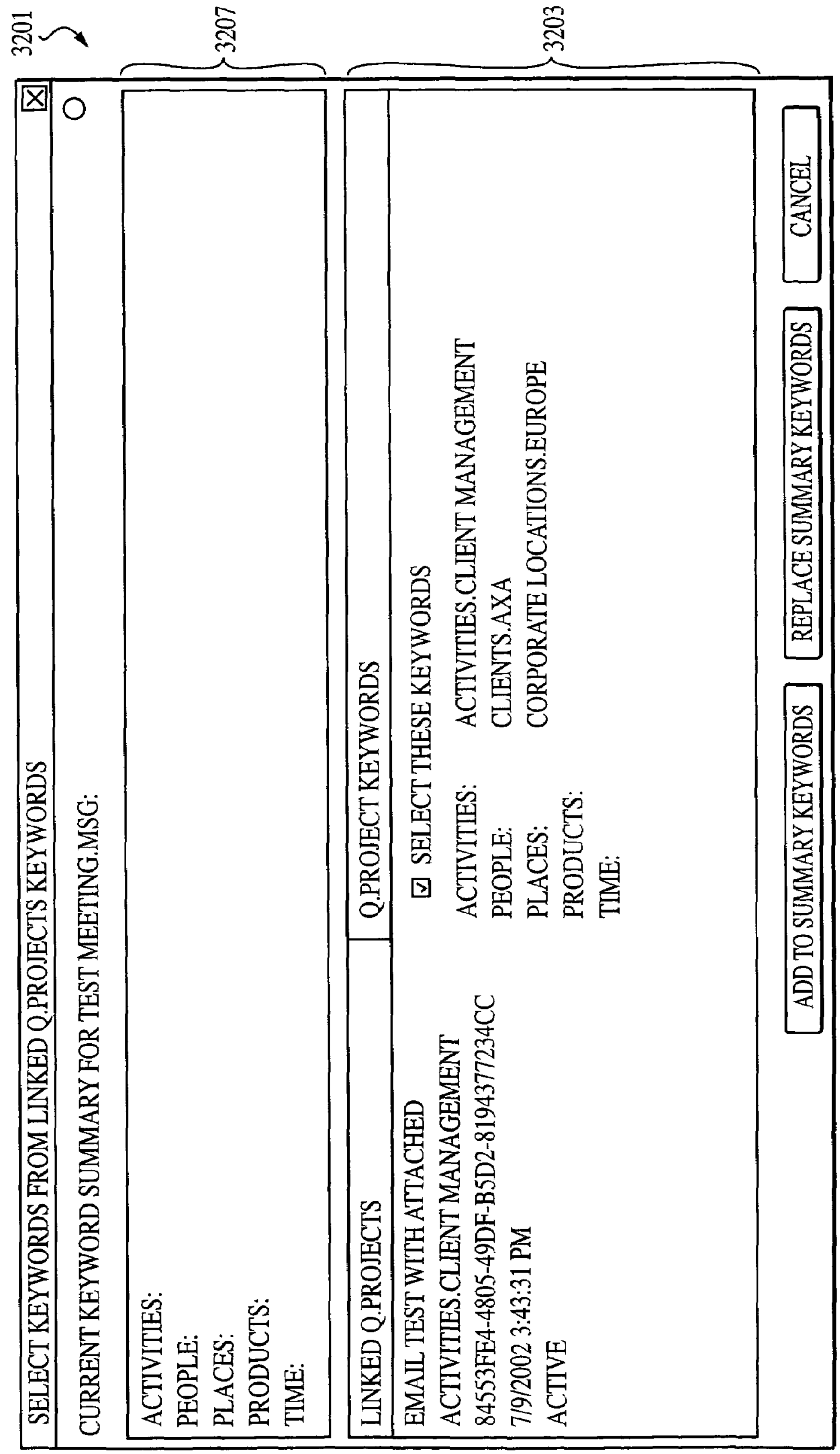

FIG. 32 illustrates an example user interface showing a confirmation of keywords for attachments to the item, according to one or more embodiments of the present invention.

Figure 33:
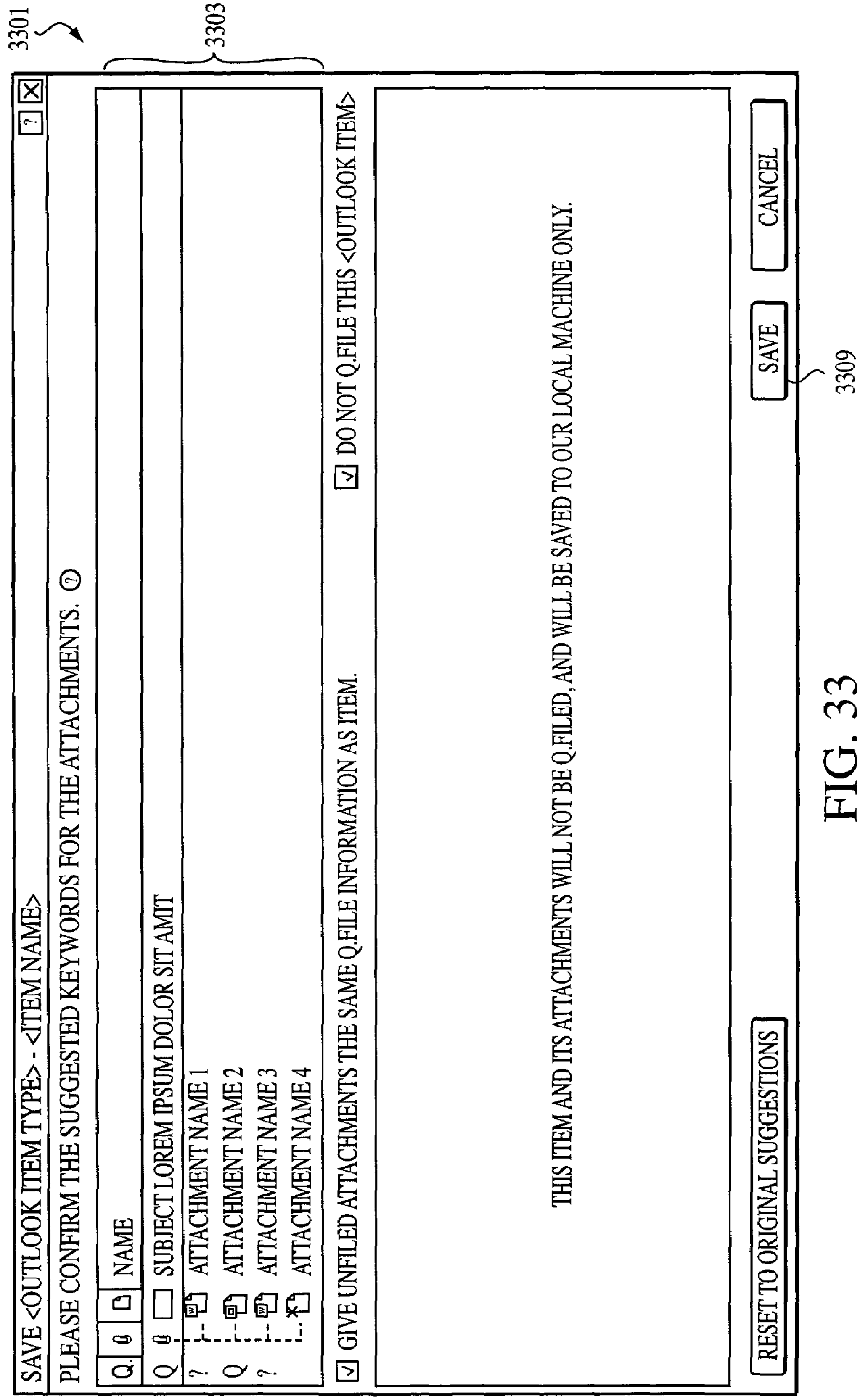

FIG. 33 illustrates an example user interface showing a top level confirmation of suggested keywords for items attached to the new item, according to one or more embodiments of the present invention.

Figure 34:
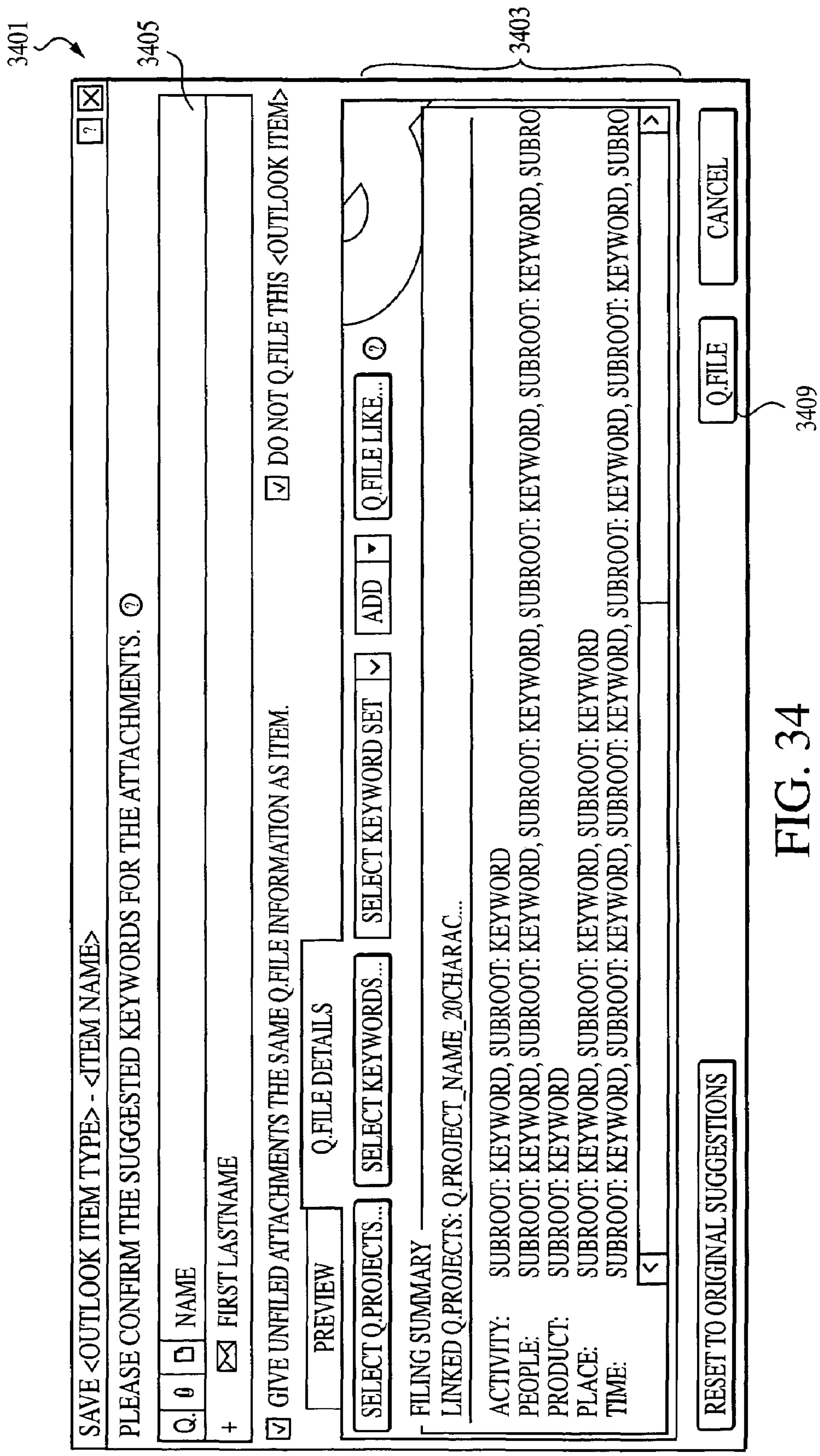

FIG. 34 illustrates an example user interface showing a confirmation of the suggested keywords for an individual item attached to the new item, according to one or more embodiments of the present invention.

Figure 35A:
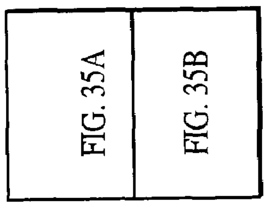
Figure 35A:
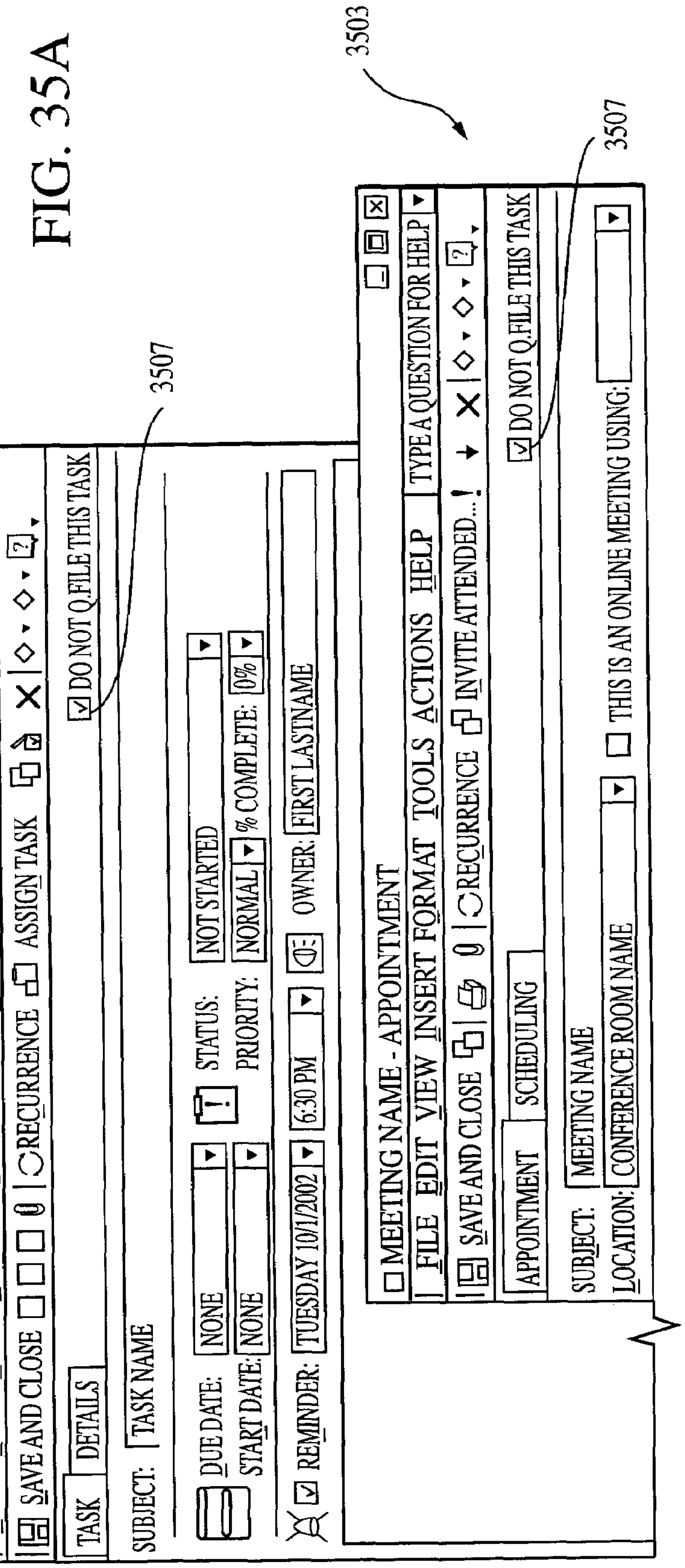
Figure 35B:
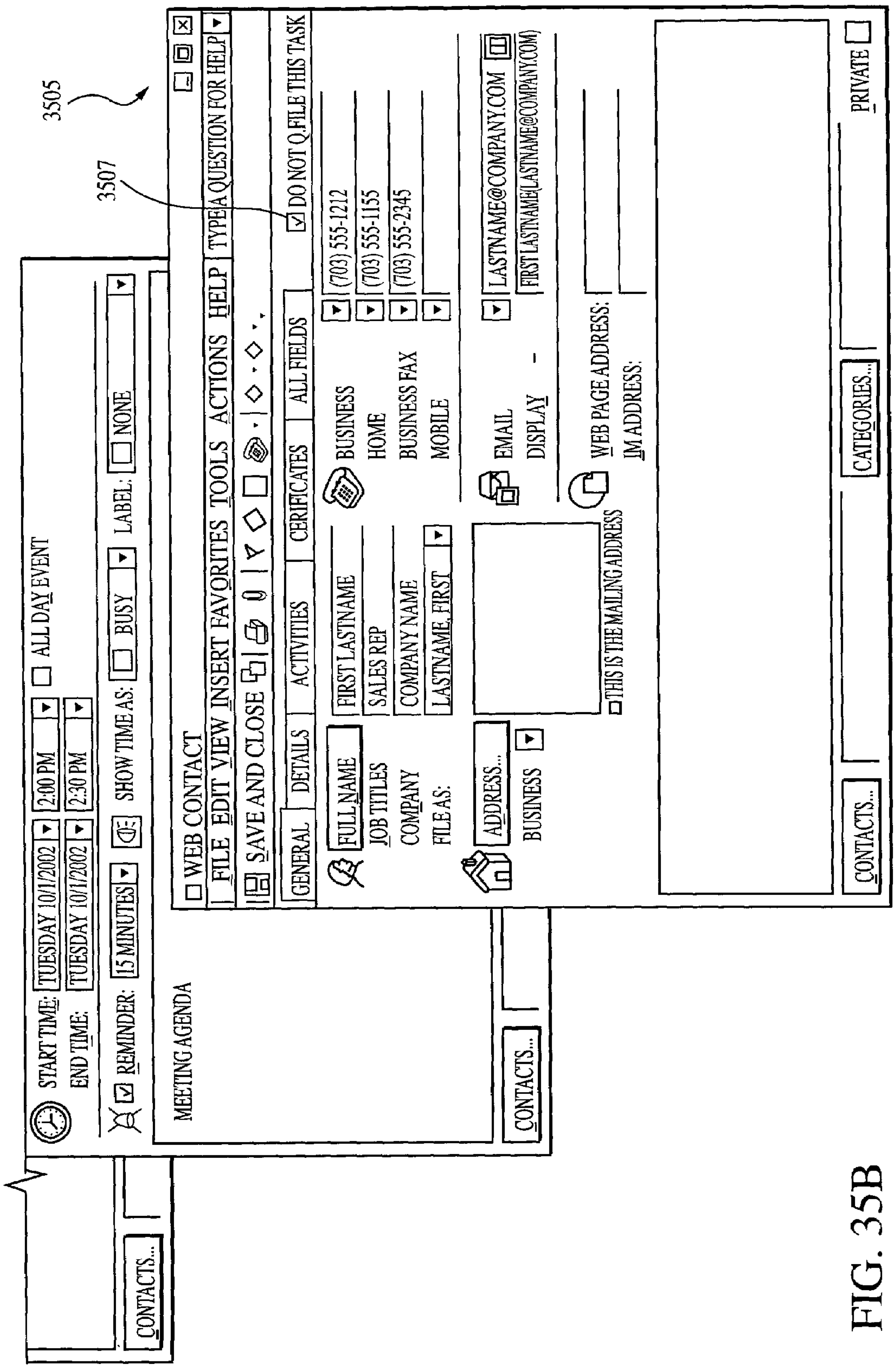

FIG. 35 illustrates example user interfaces illustrating an Outlook task which is not to be treated as an item, according to one or more embodiments of the present invention.

Figure 36B:
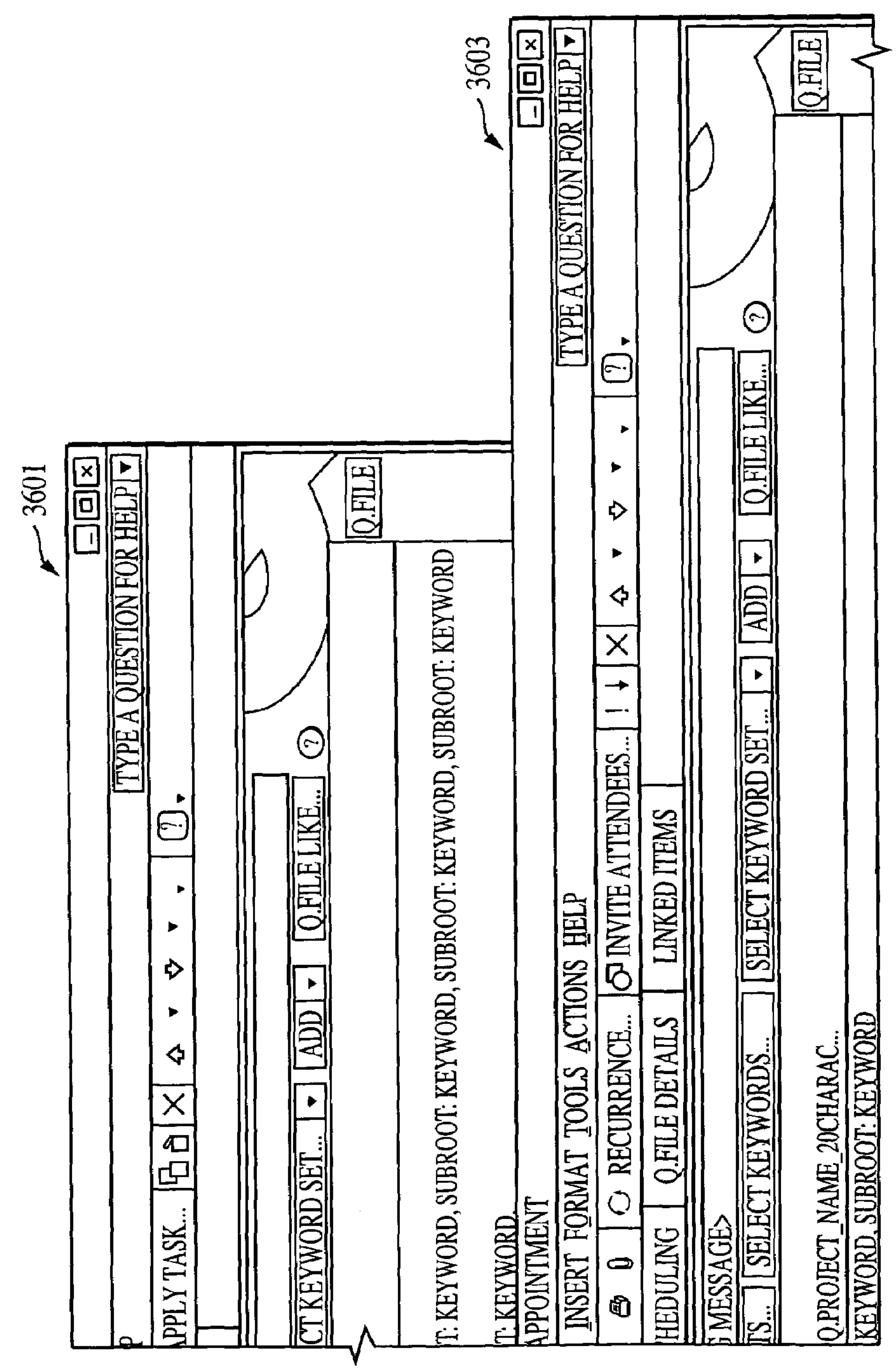
Figure 36C:
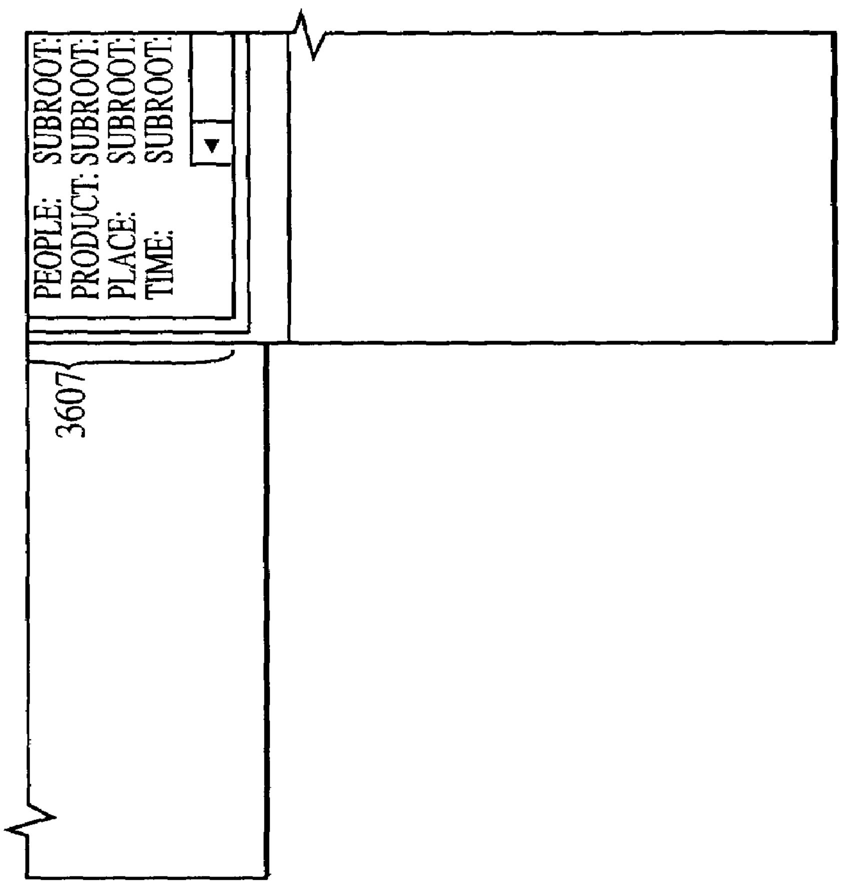
Figure 36D:
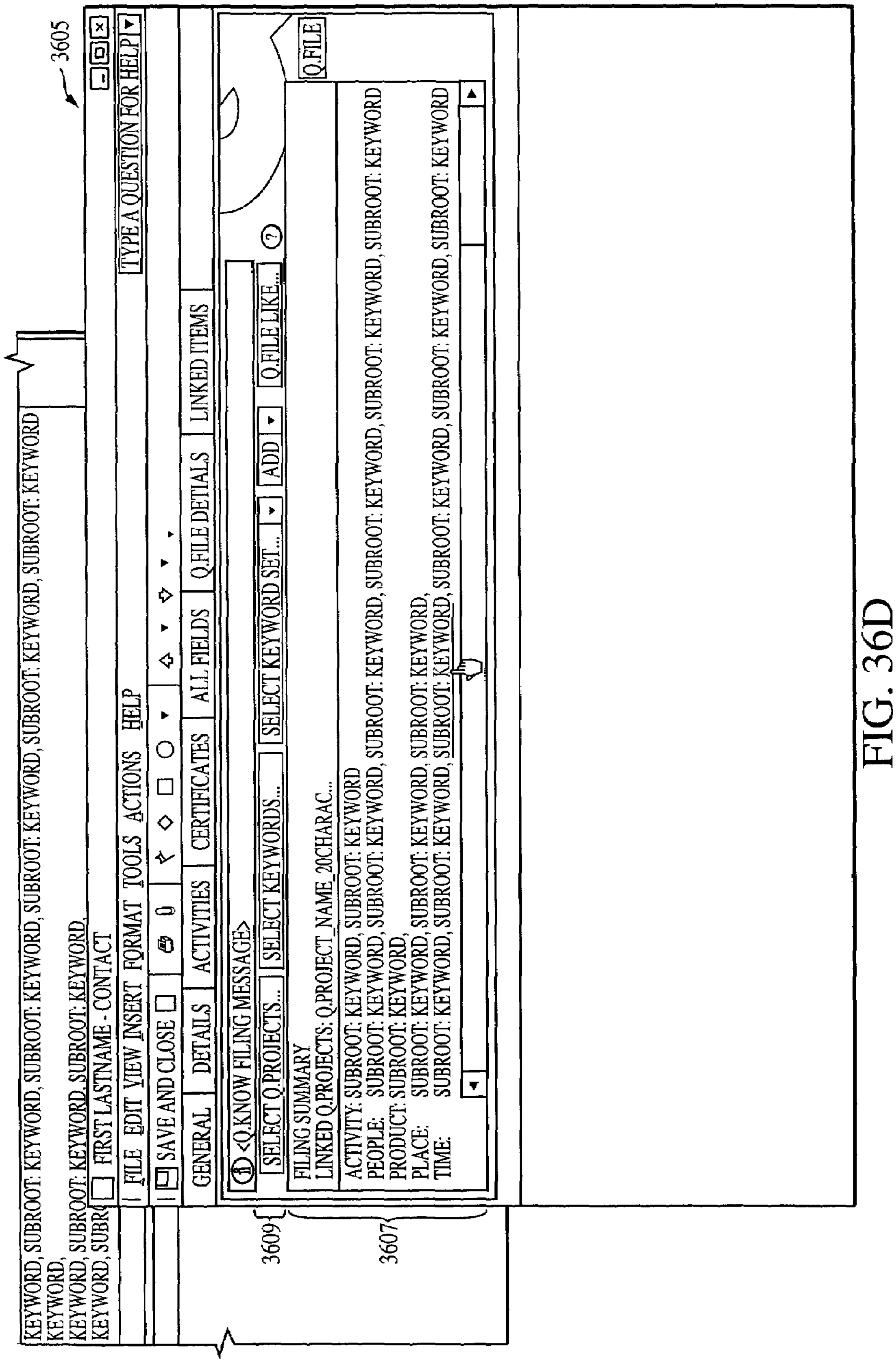

FIG. 36 illustrates an example of user interfaces illustrating an Outlook task that is to be treated as an item, including specification of project and keywords, according to one or more embodiments of the present invention.

Figure 37:
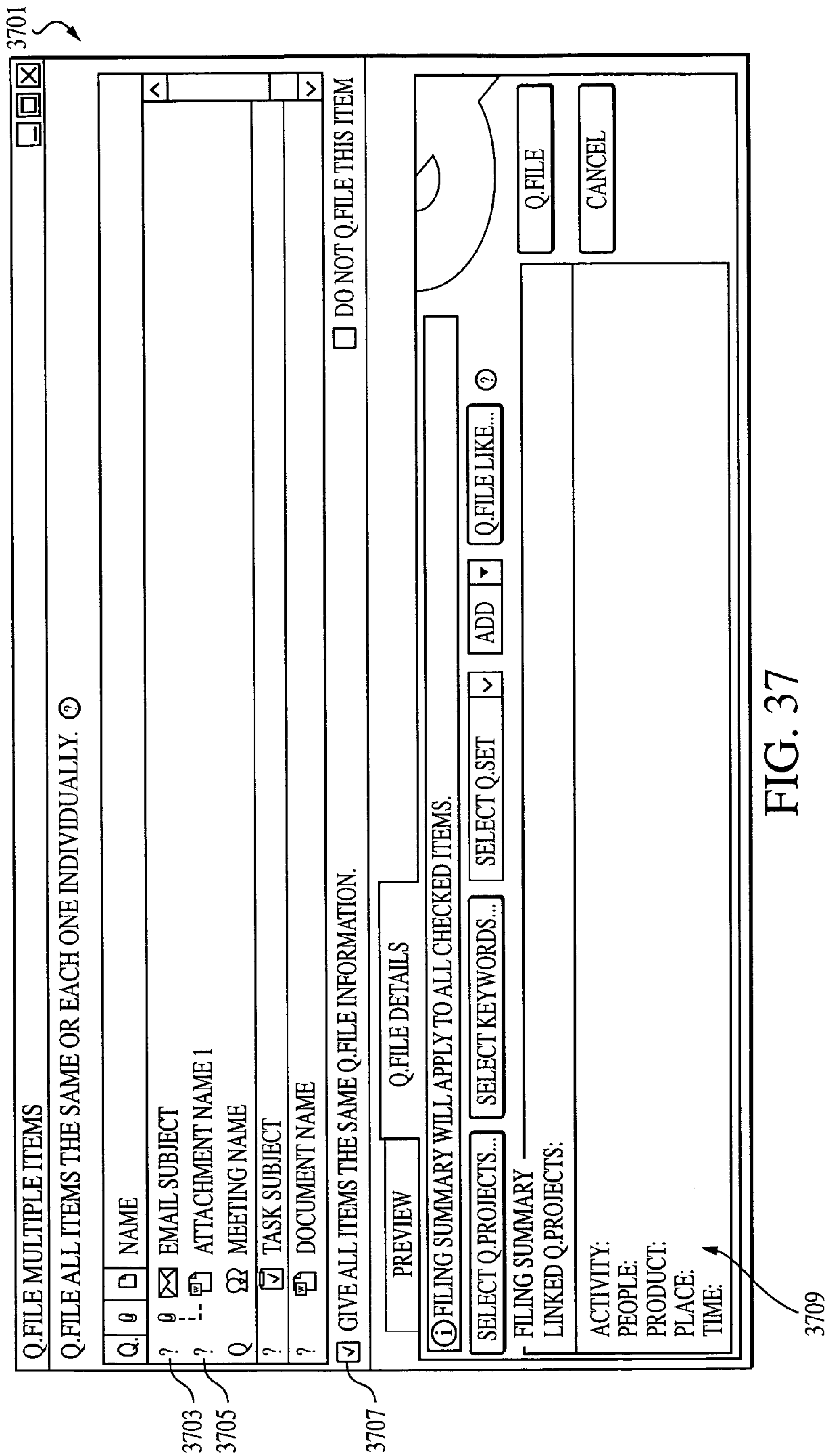

FIG. 37 illustrates an example user interface showing the selection of class information in the filing of multiple items (optionally the same) or individual items, in accordance with one or more embodiments of the present invention.

Figure 38:
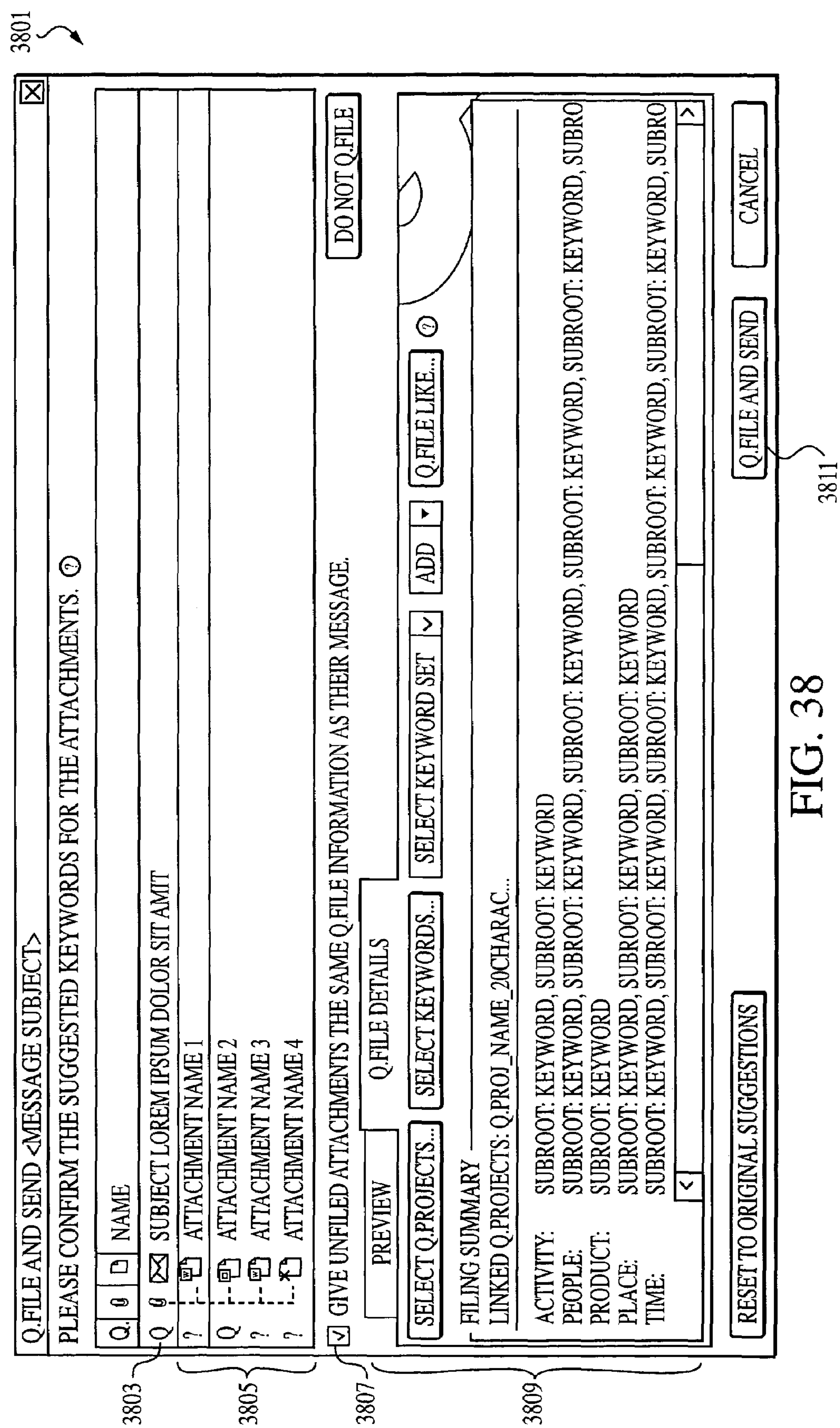

FIG. 38 illustrates an example user interface showing the filing of multiple items optionally giving unfiled attachments the same information as the item to which they are attached, an optionally sending the item, in accordance with one or more embodiments of the present invention.

Figure 39:
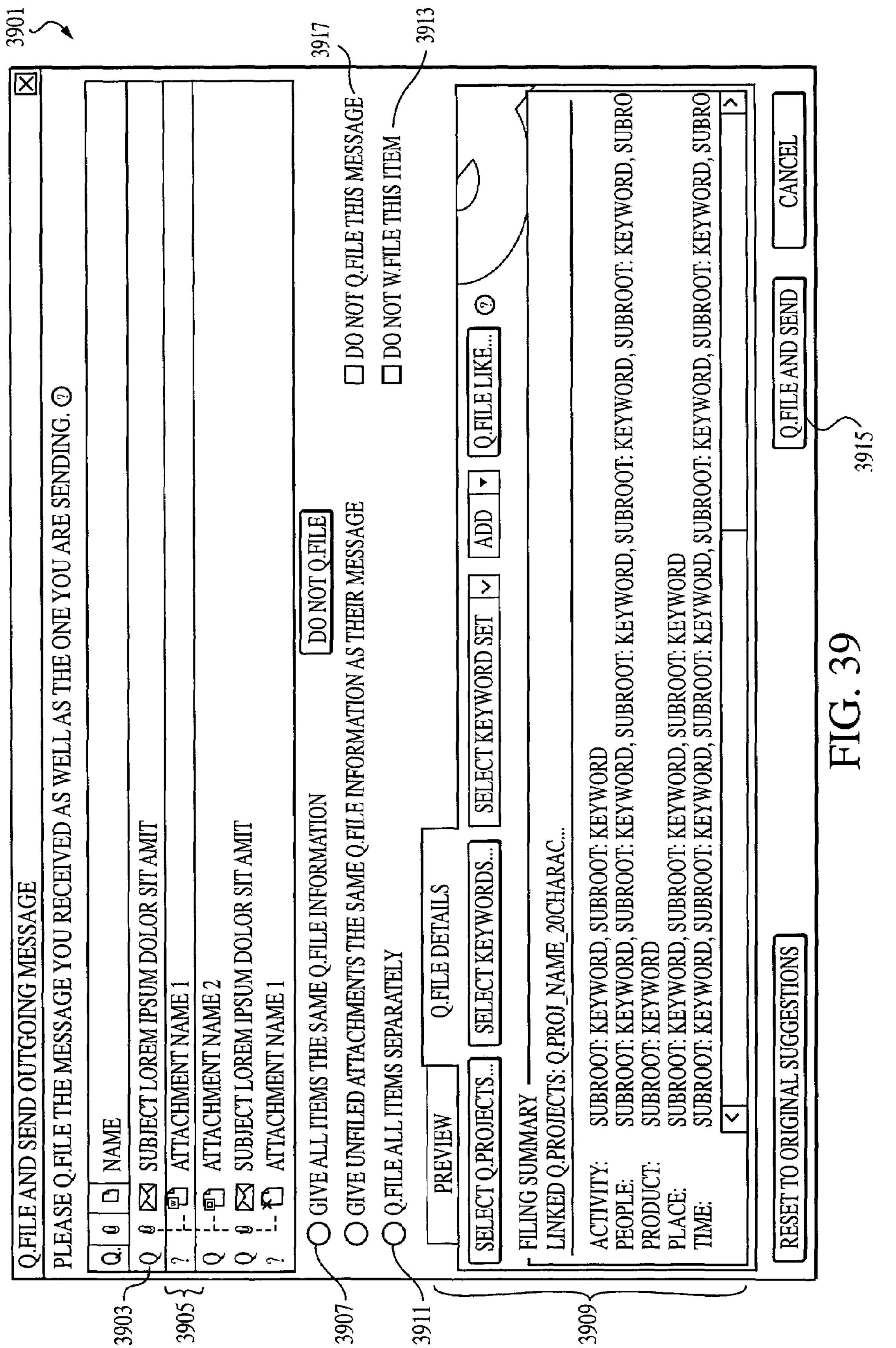

FIG. 39 illustrates an example user interface showing the filing of multiple items optionally filing all attached items separately, and optionally sending the item, in accordance with one or more embodiments of the present invention.

Figure 40:
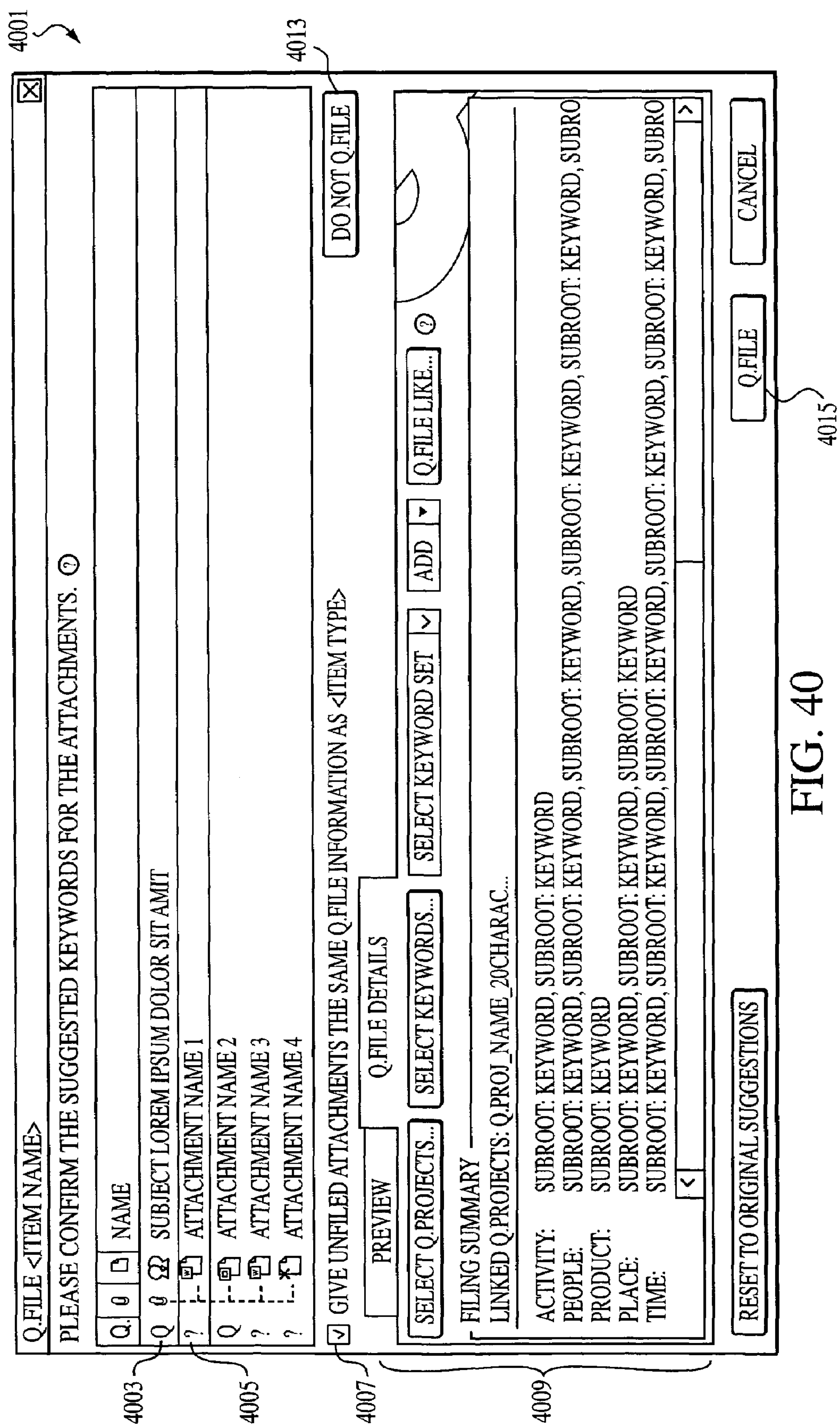

FIG. 40 illustrates an example user interface showing the filing of multiple items as in FIG. 38, according to one or more embodiments of the present invention.

Figure 41:
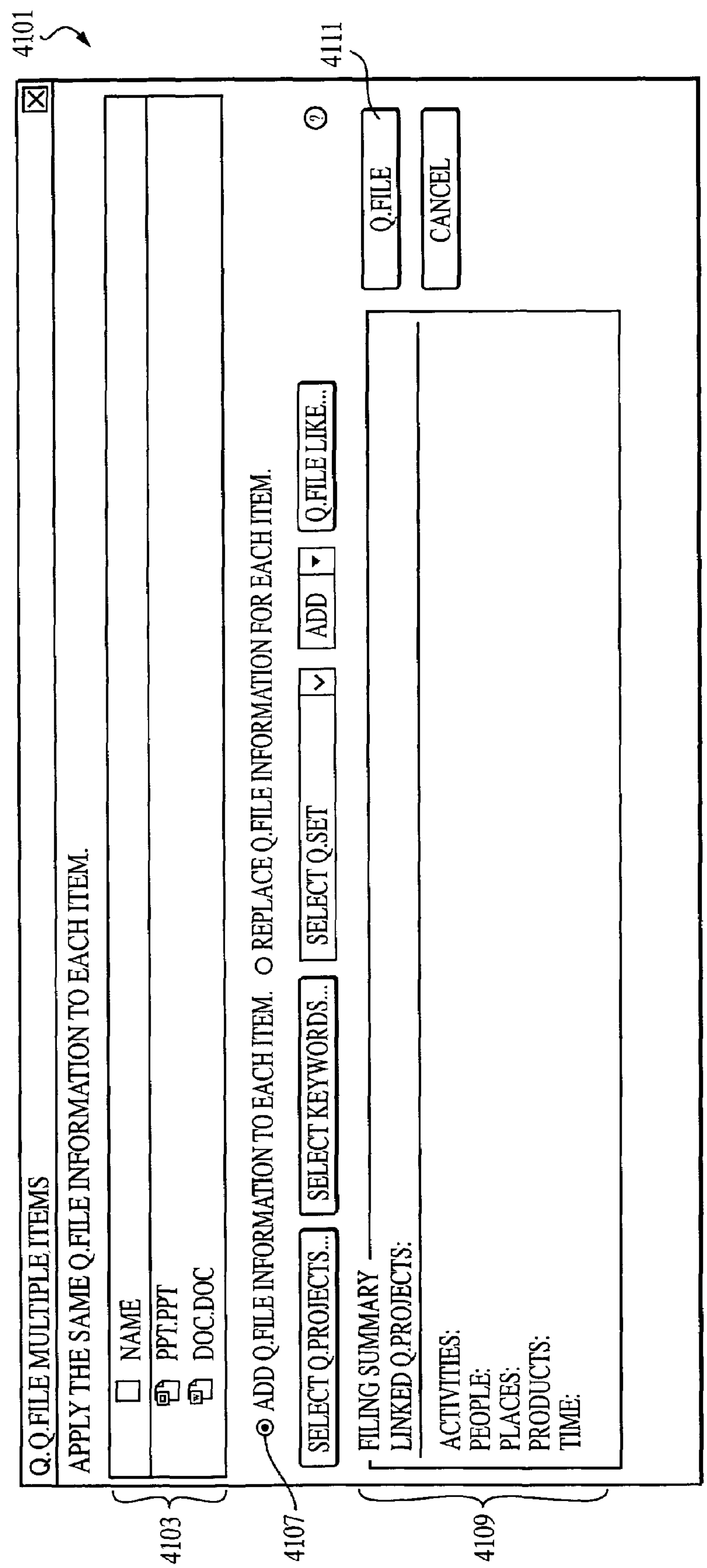

FIG. 41 illustrates an alternative example user interface showing the filing of multiple items optionally to have the same attributes, in accordance with one or more embodiments of the present invention.

Figures 42, 42A:
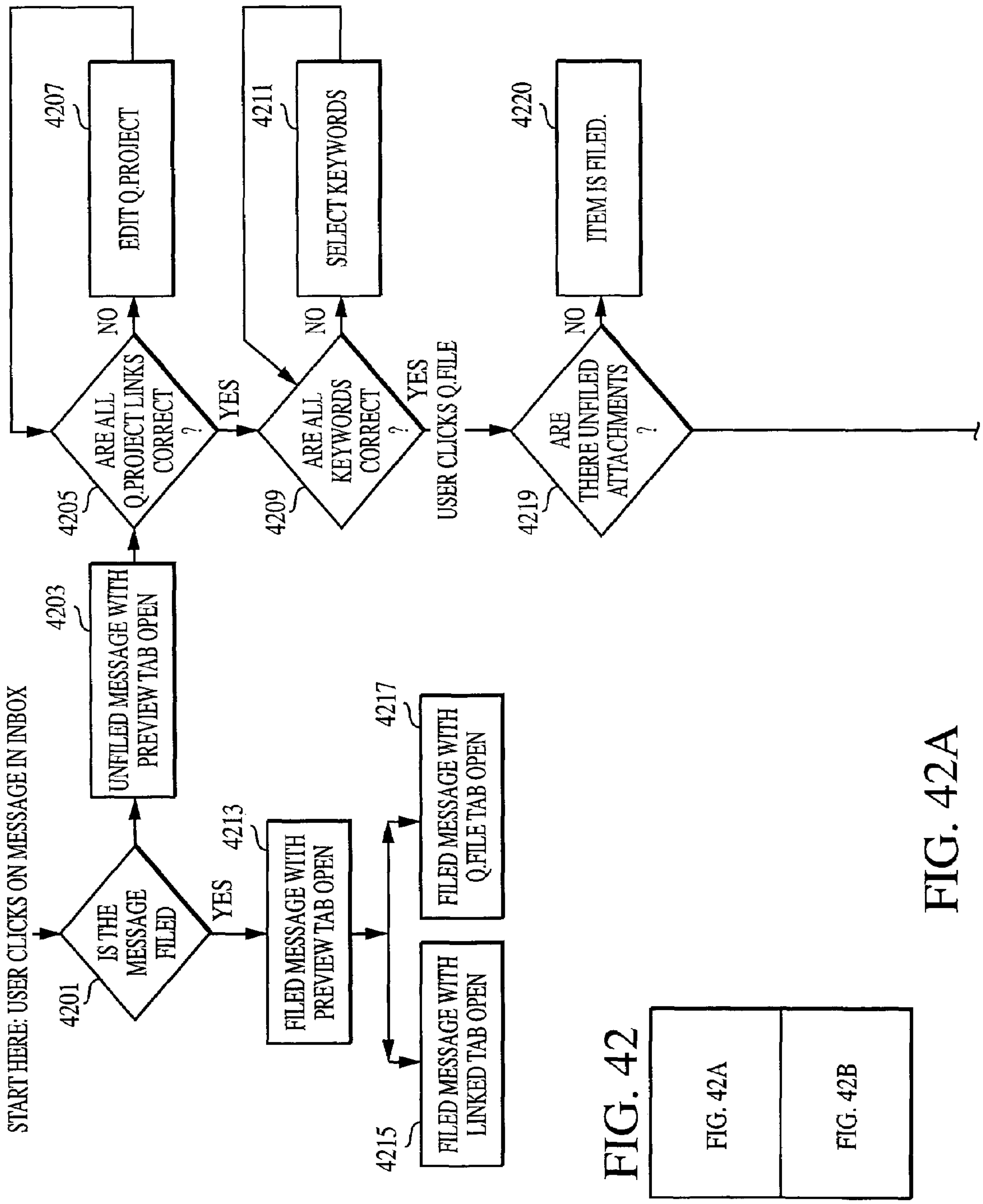
Figure 42B:
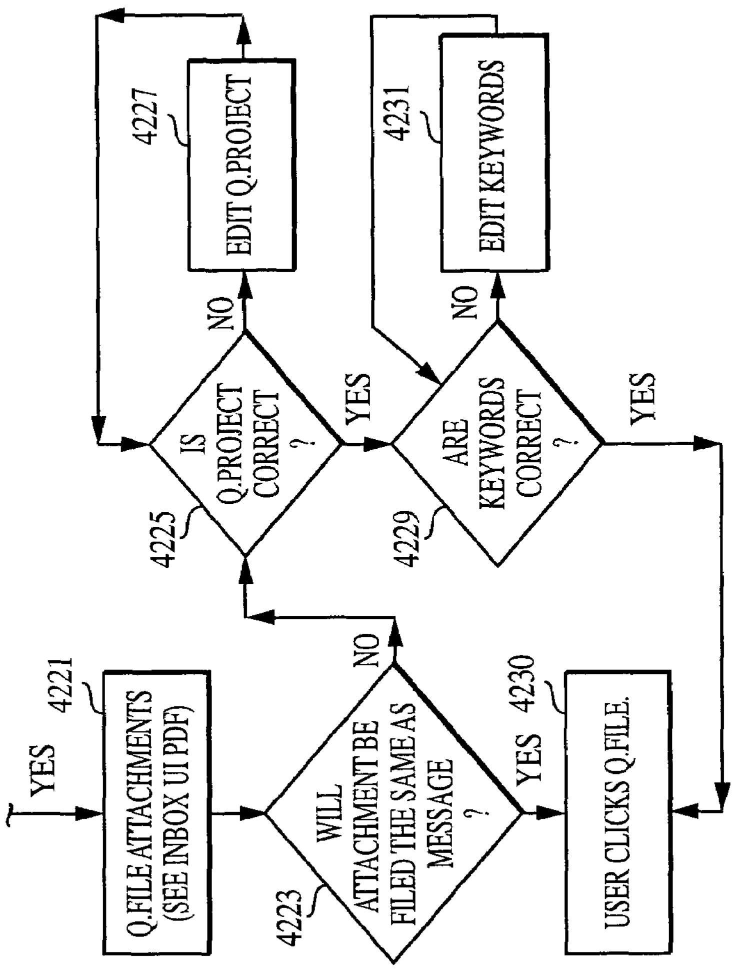

FIG. 42 is a flow chart illustrating an example process of filing of an item via Q.File, according to one or more embodiments of the present invention.

Figure 43:
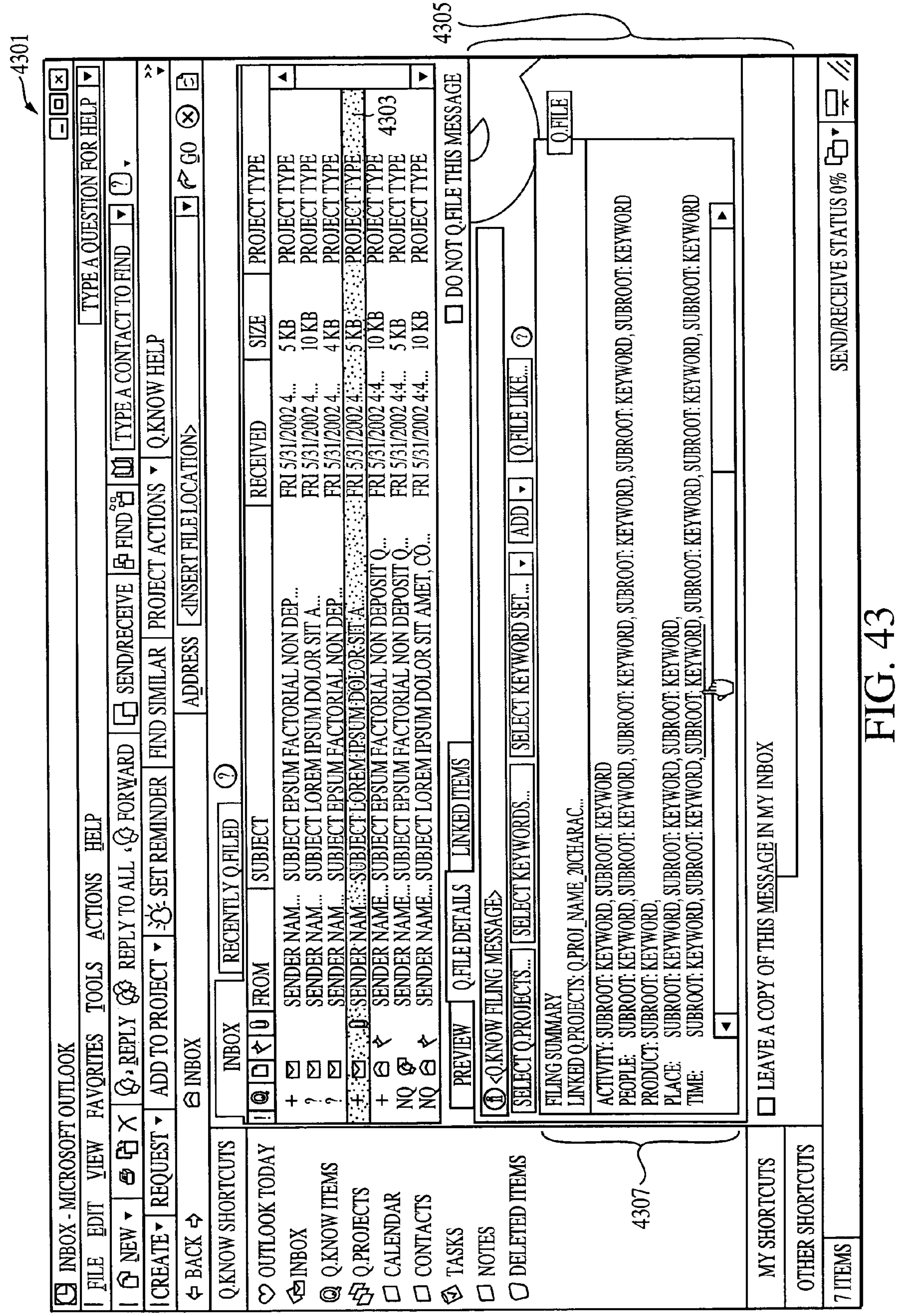

FIG. 43 illustrates an example user interface for filing of an otherwise unfiled item, according to one or more embodiments of the present invention.

Figure 44:
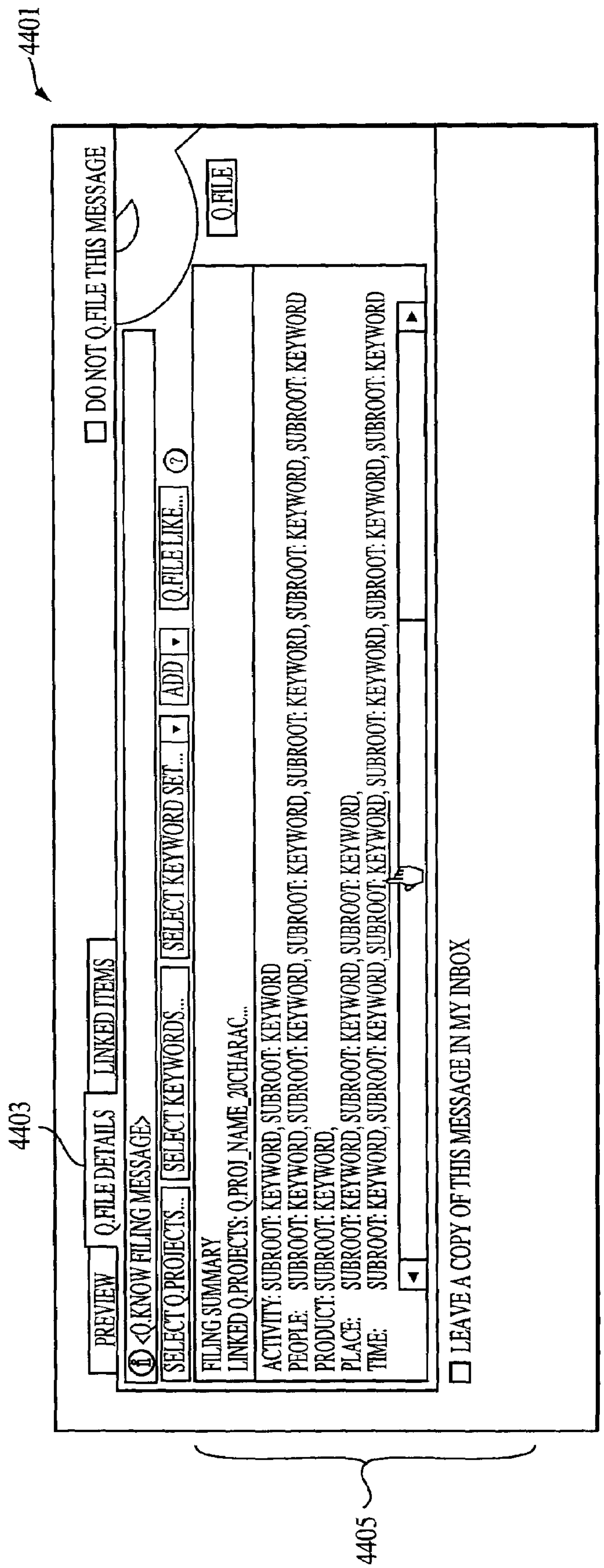

FIG. 44 illustrates an example user interface for showing Q.File details, according to one or more embodiments of the present invention.

Figure 45:
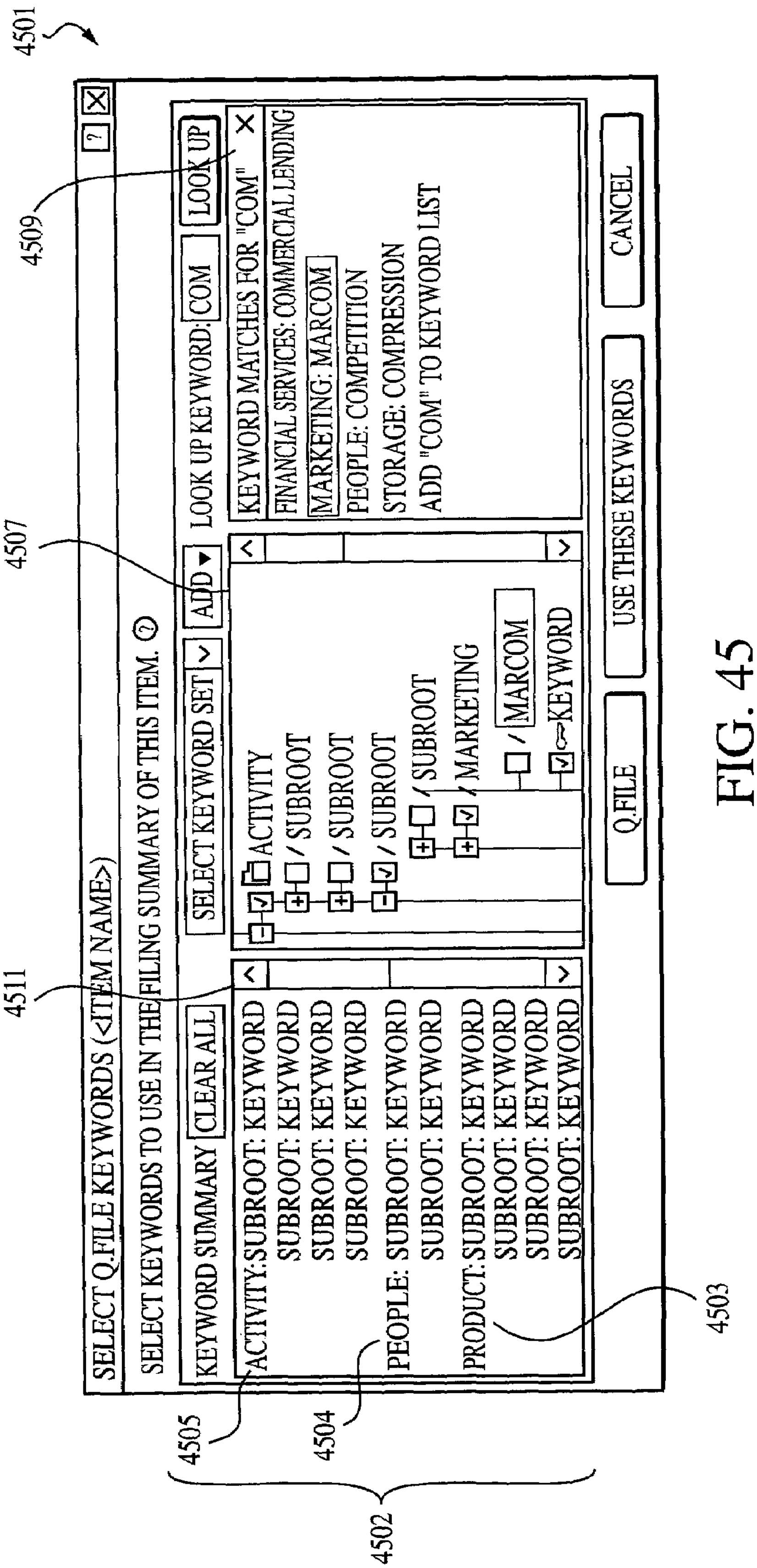

FIG. 45 illustrates an example user interface for selecting and/or editing keywords in a keyword summary for a selected item, according to one or more embodiments of the present invention.

Figure 46:
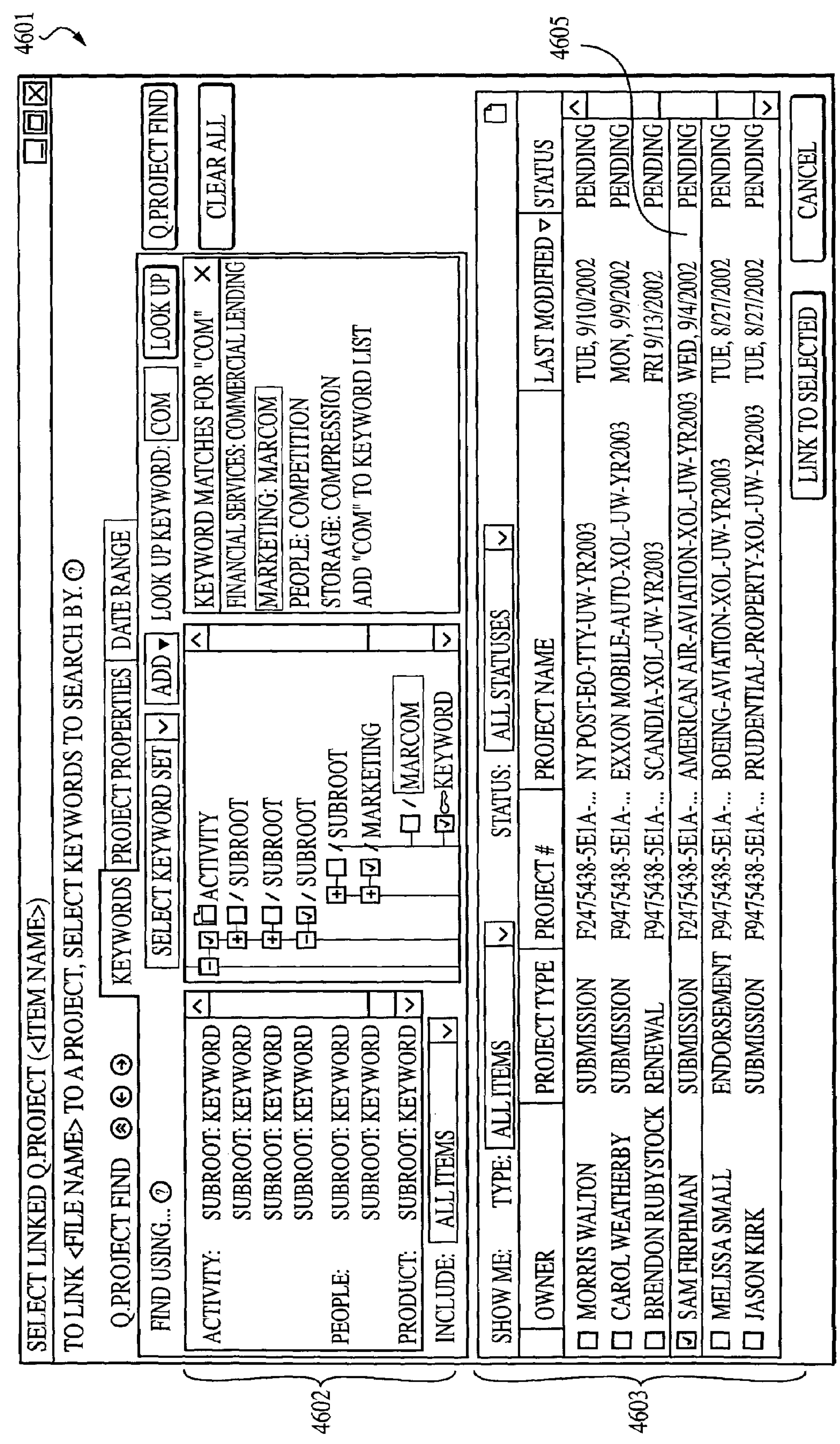

FIG. 46 illustrates an example user interface for selecting a project to which to link the item, according to one or more embodiments of the present invention.

Figure 47:
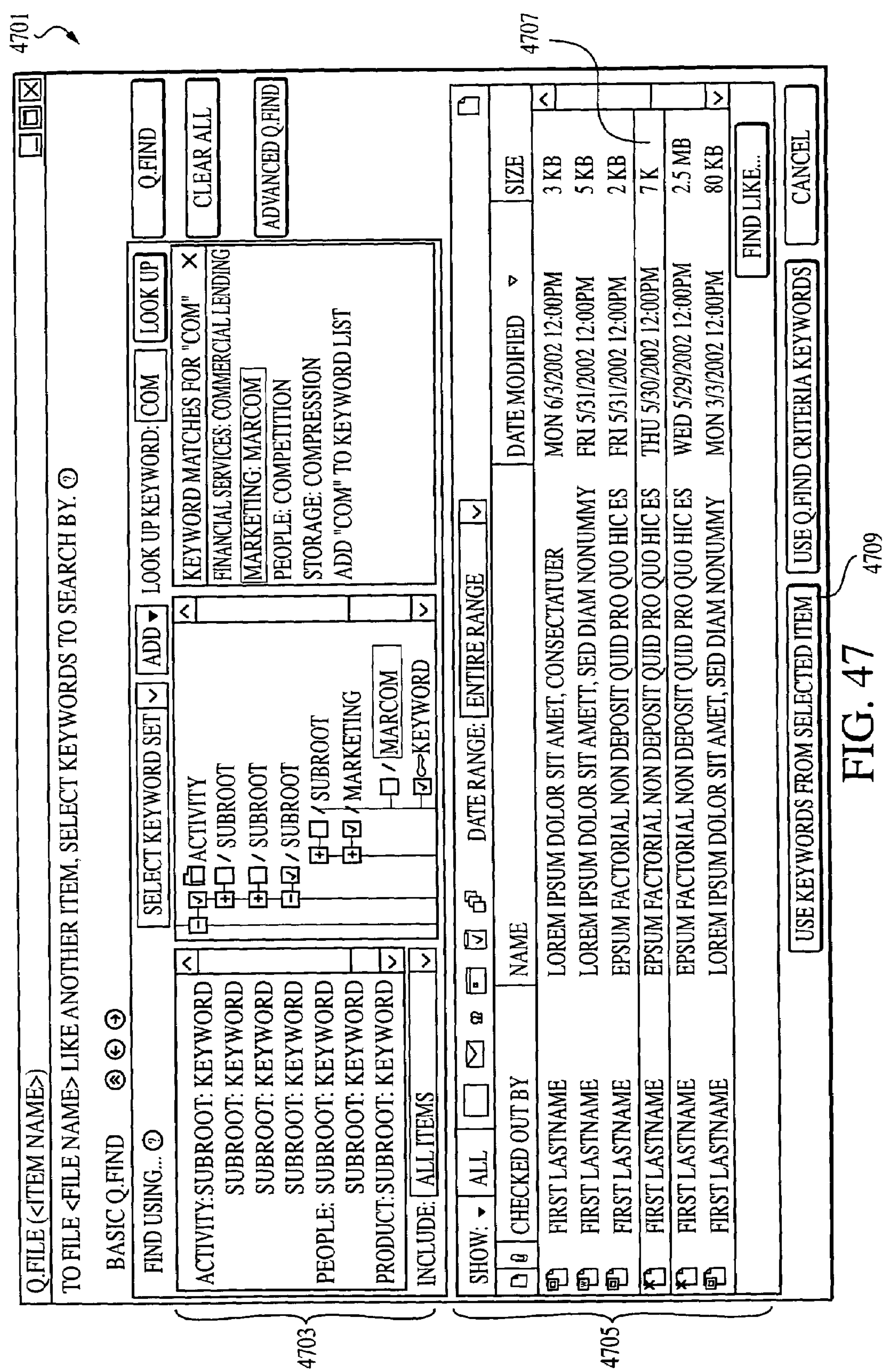

FIG. 47 illustrates an example user interface for selecting keywords to assign to an item, via the project to which the item is linked, according to one or more embodiments of the present invention.

Figure 48:
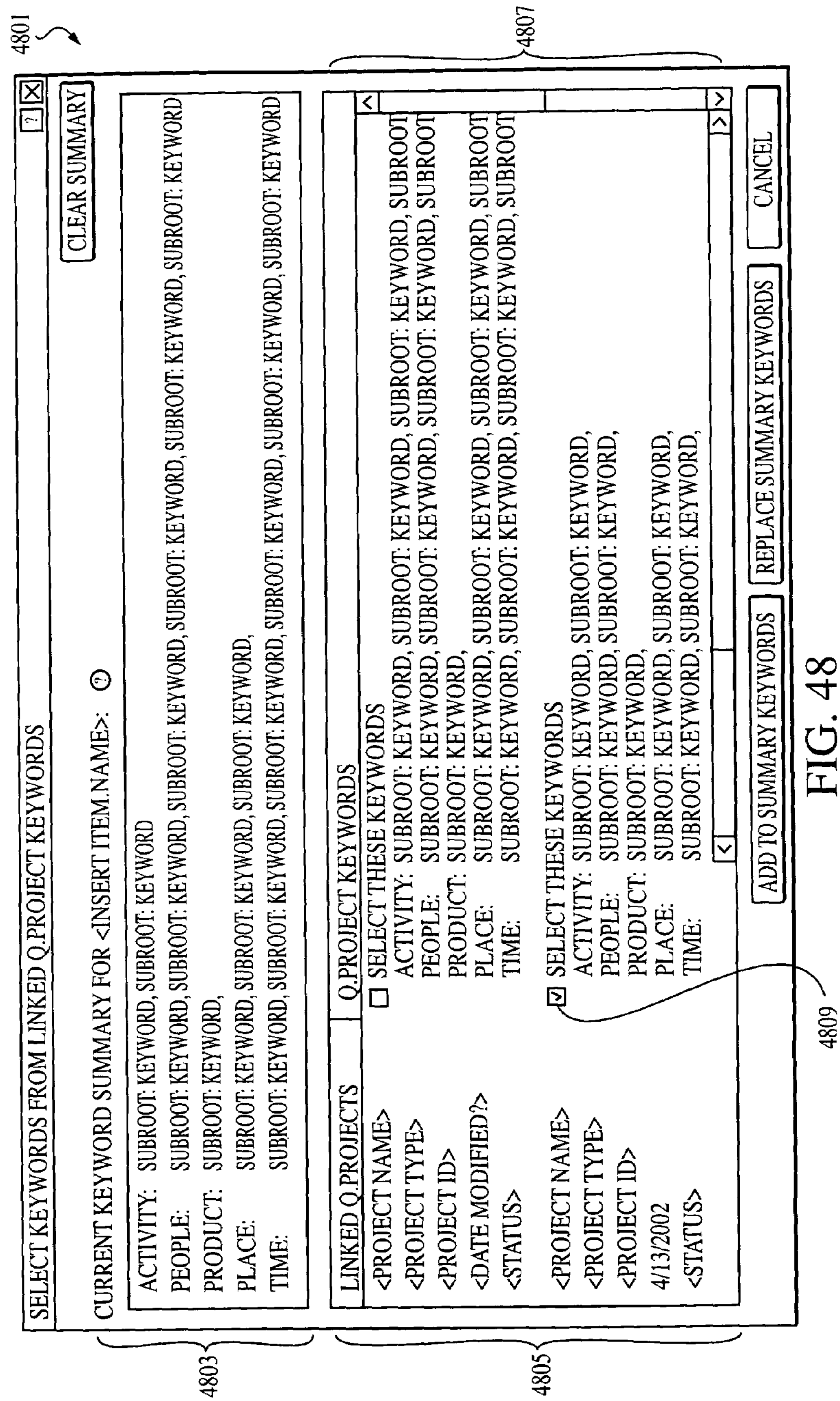

FIG. 48 illustrates an example user interface for selecting keywords from a linked project and filing the item, in accordance with one or more embodiments of the present invention.

Figure 49:
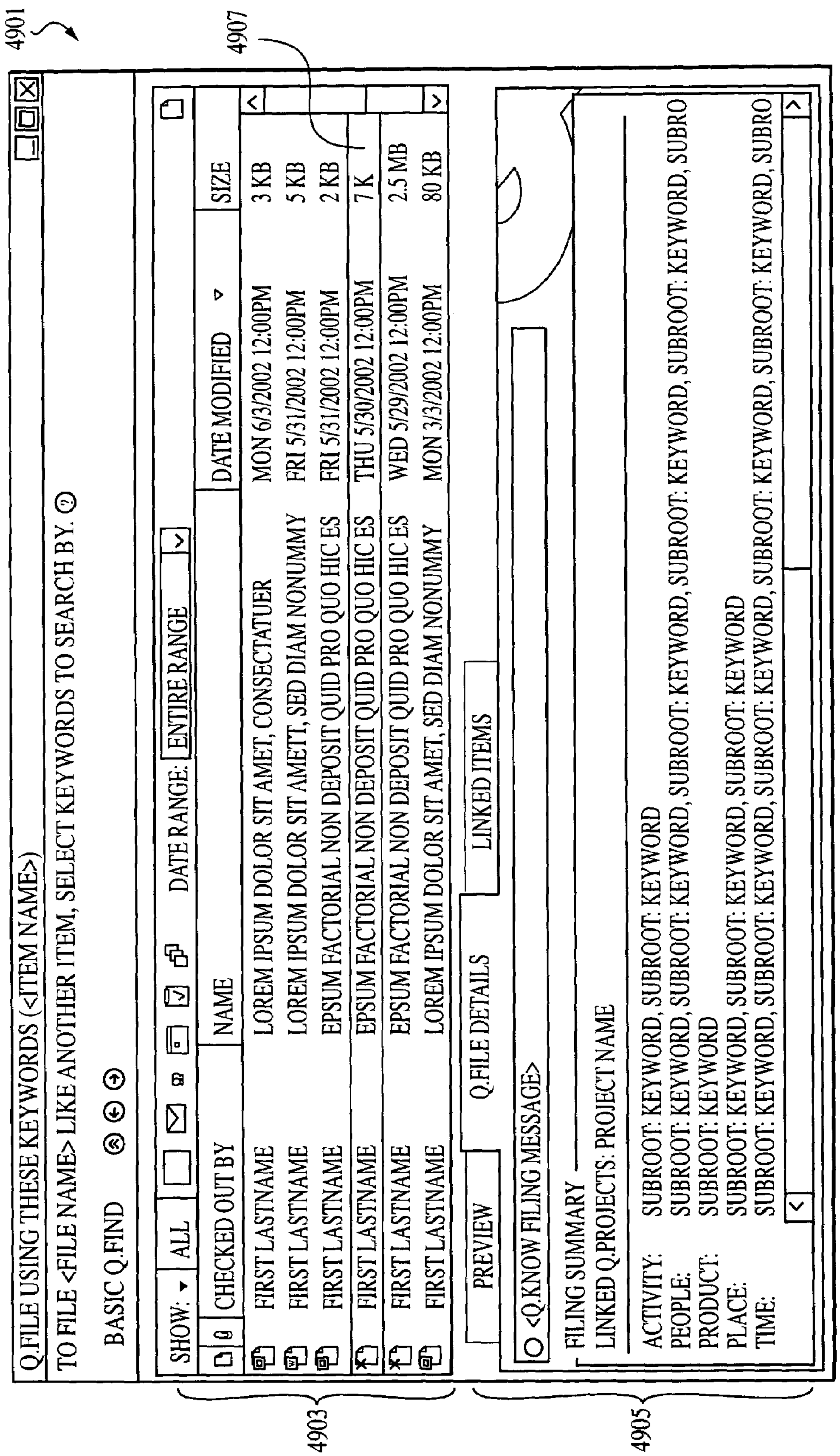

FIG. 49 illustrates an example user interface for filing an item using specified keywords, according to one or more embodiments of the present invention.

FIG. 50 is a flow chart illustrating initial tag scenarios for filing an item, according to one or more embodiments of the present invention.

Figure 51A:
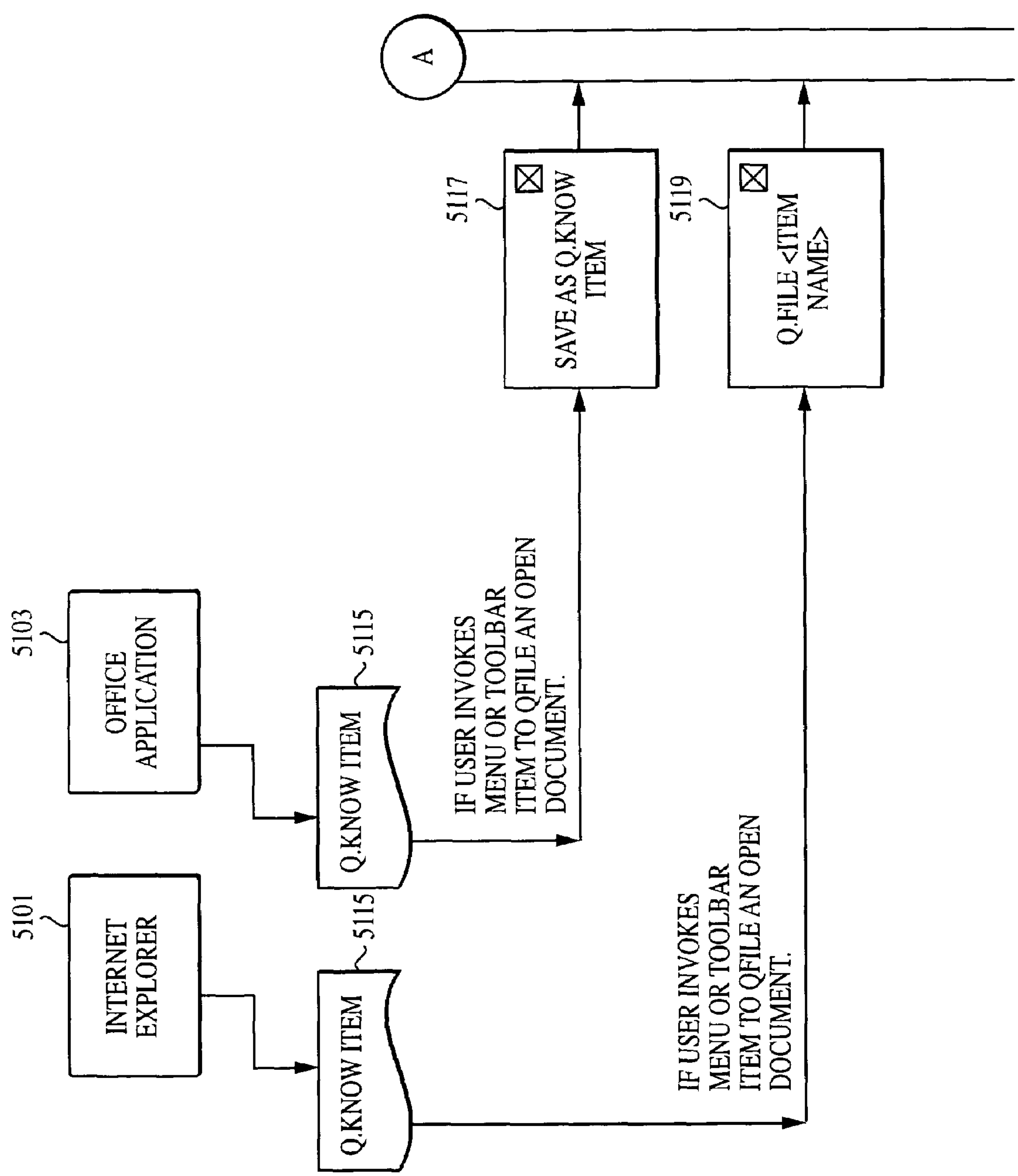
Figure 51B:
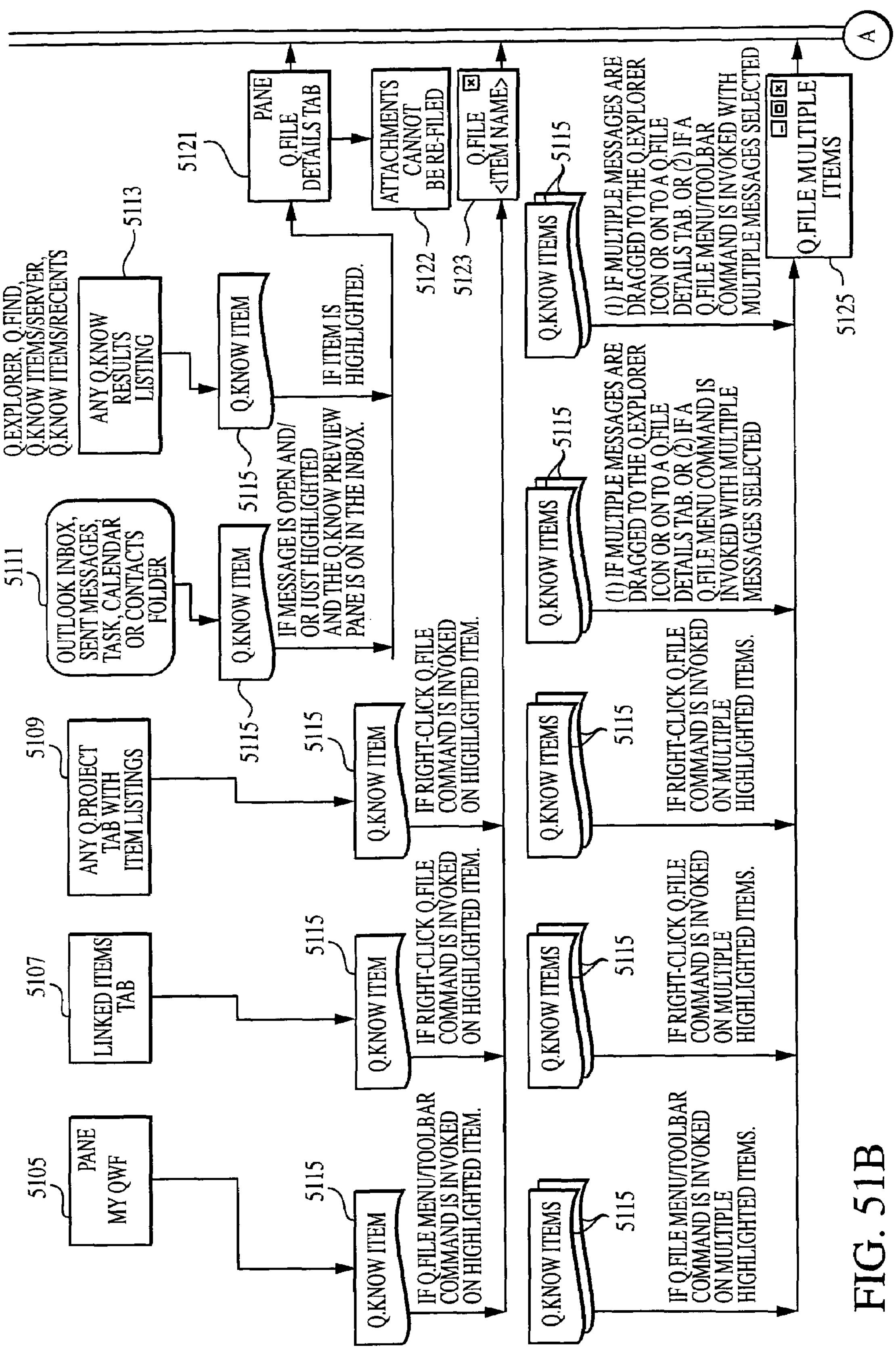

FIGS. 51A-B are a flow chart illustrating re-tag scenarios for filing an item, according to one or more embodiments of the present invention.

Figure 52:
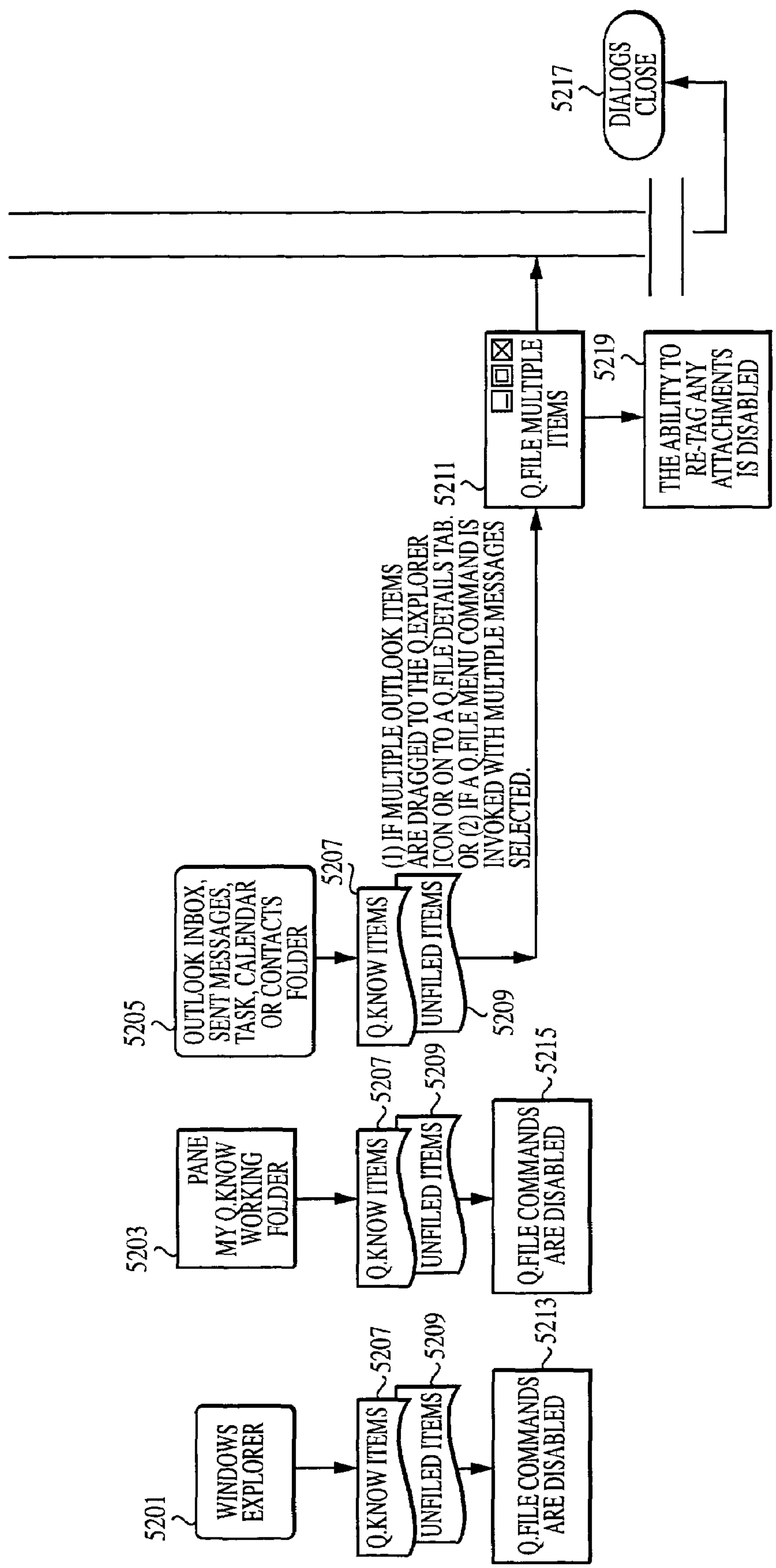

FIG. 52 is a flow chart illustrating handling of mixed items known to the system and unfiled “items”, according to one or more embodiments of the present invention.

Figure 53:
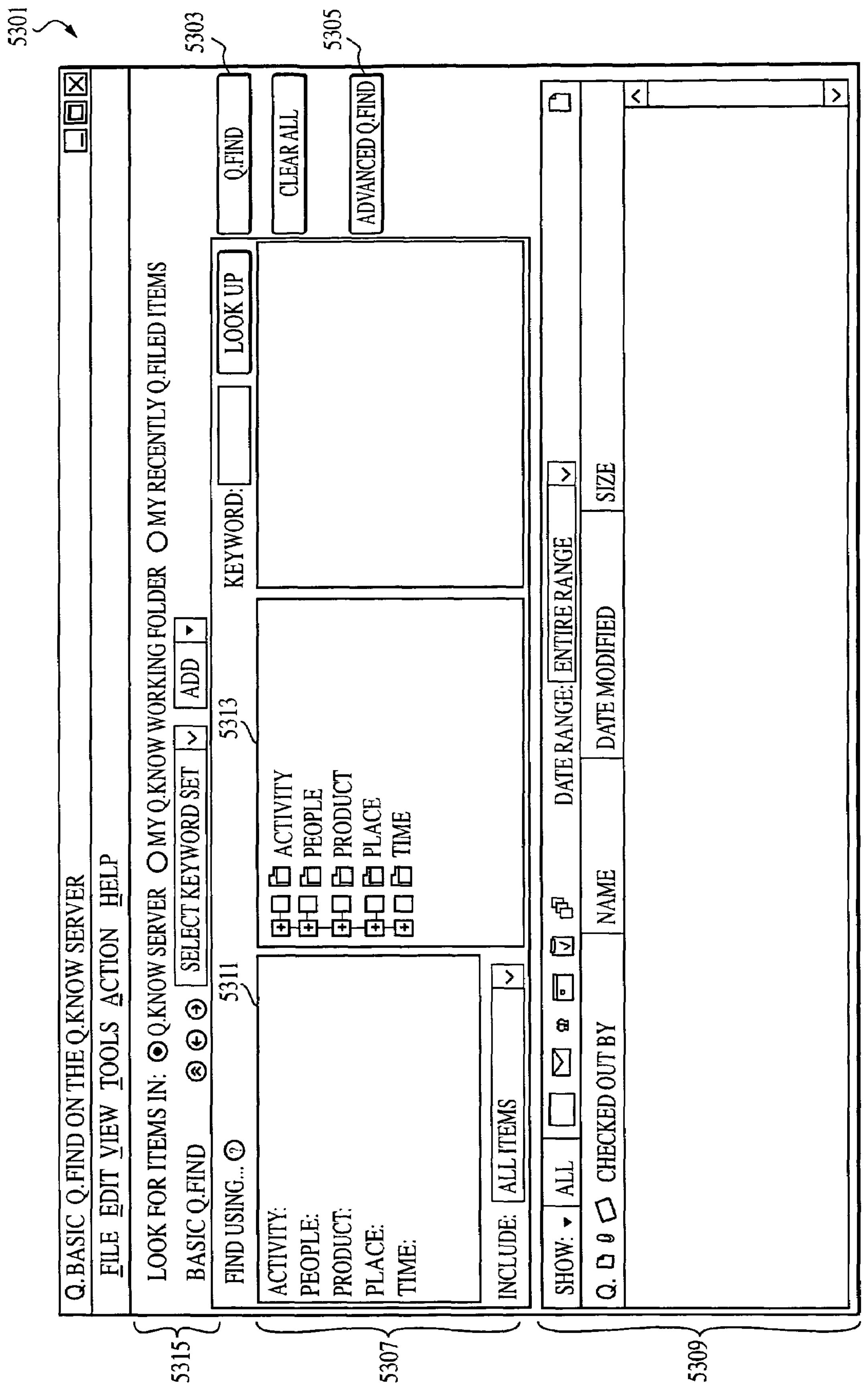

FIG. 53 illustrates an example user interface for a basic process of searching for items that have been stored via classes, using keywords, according to one or more embodiments of the present invention.

Figure 54:
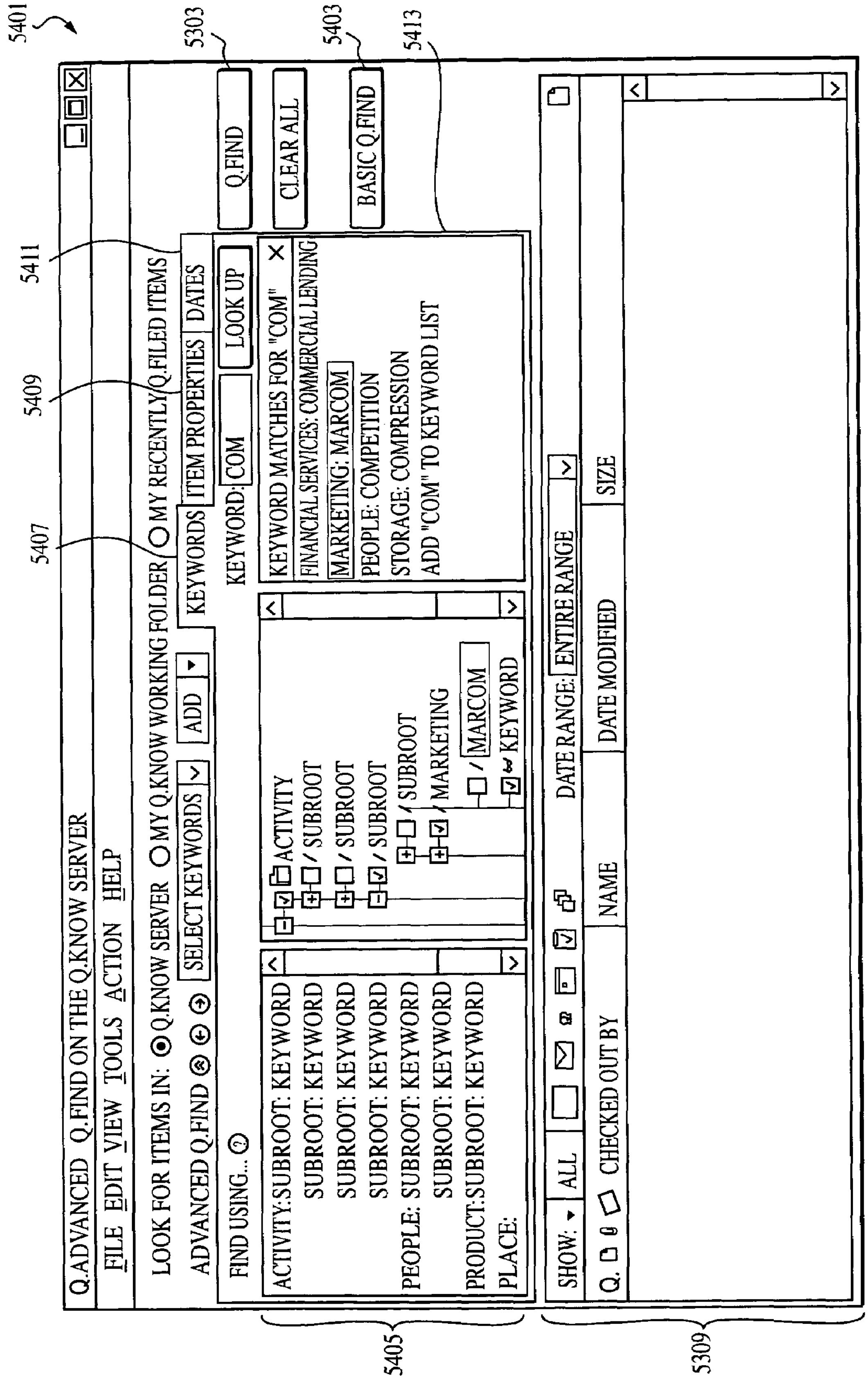

FIG. 54 illustrates an example user interface for an advanced process of finding items that have been stored, using subroot and keywords in classes, according to one or more embodiments of the present invention.

Figure 55:
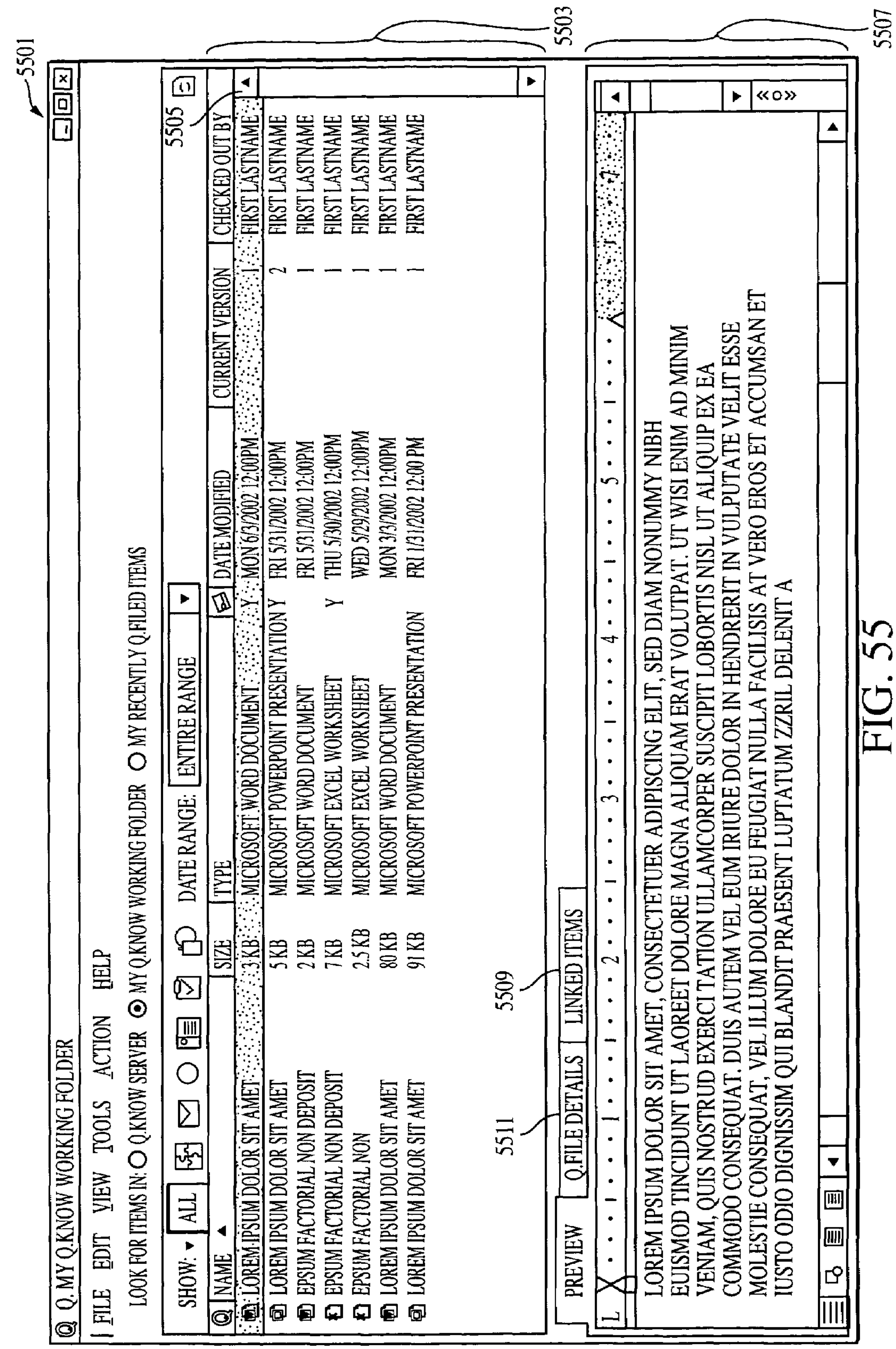

FIG. 55 illustrates an example user interface for showing a working folder listing contents of the working folder, according to one or more embodiments of the present invention.

Figure 56:
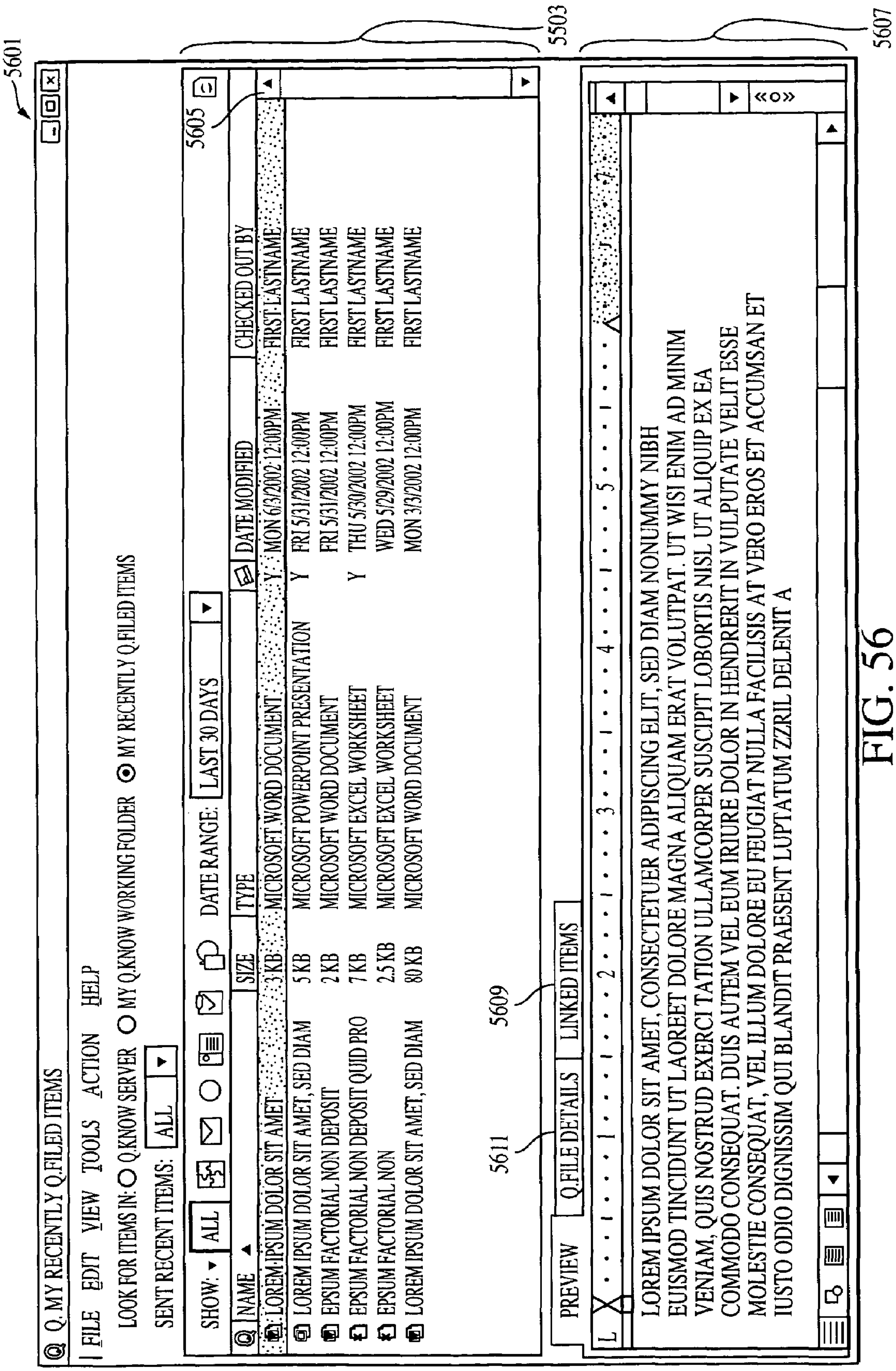

FIG. 56 illustrates an example user interface for listing items recently filed by the user, according to one or more embodiments of the present invention.

Figure 57:
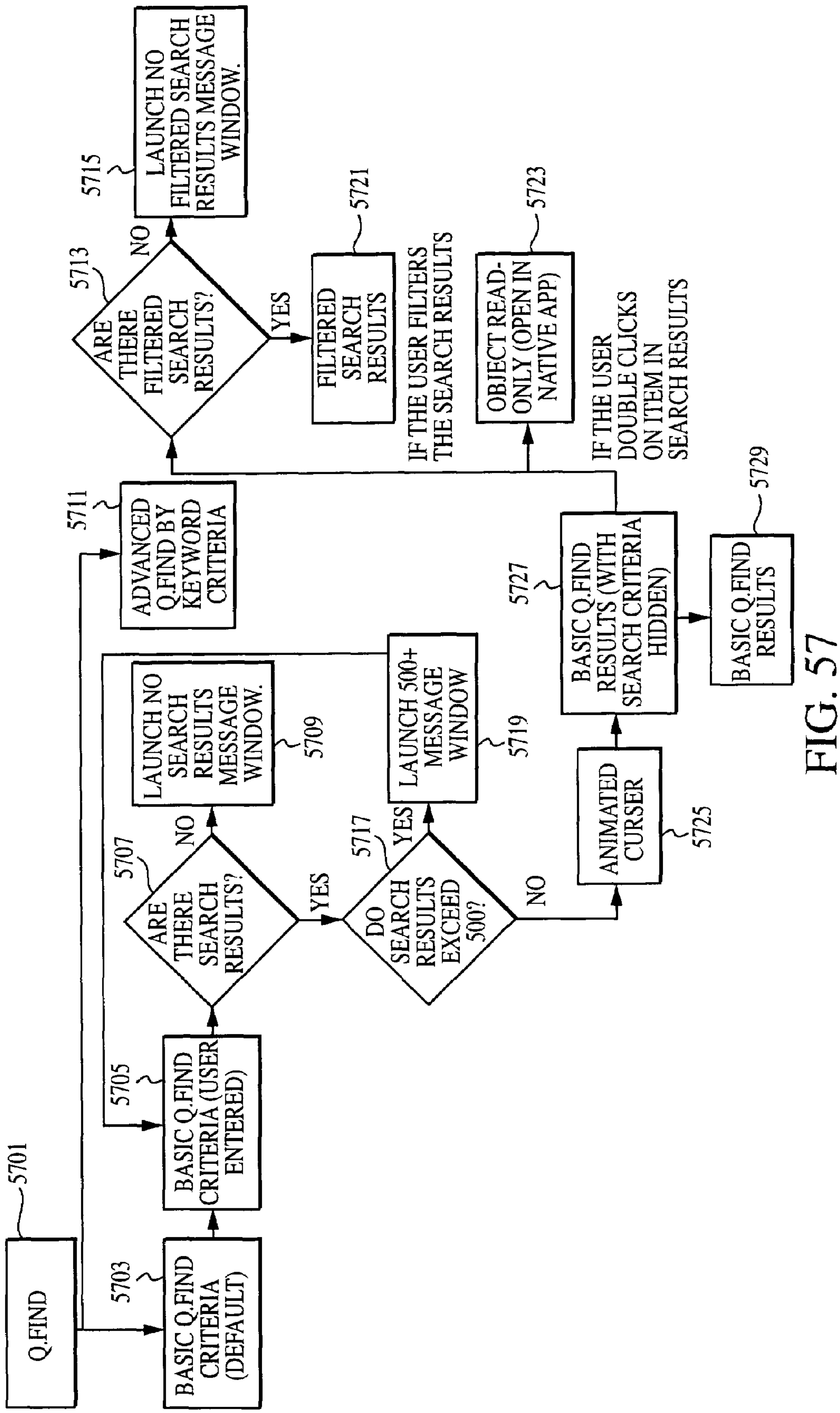

FIG. 57 is a flow chart illustrating a basic process for finding items that have been stored via classes, using keywords, according to one or more embodiments of the present invention.

Figure 58:
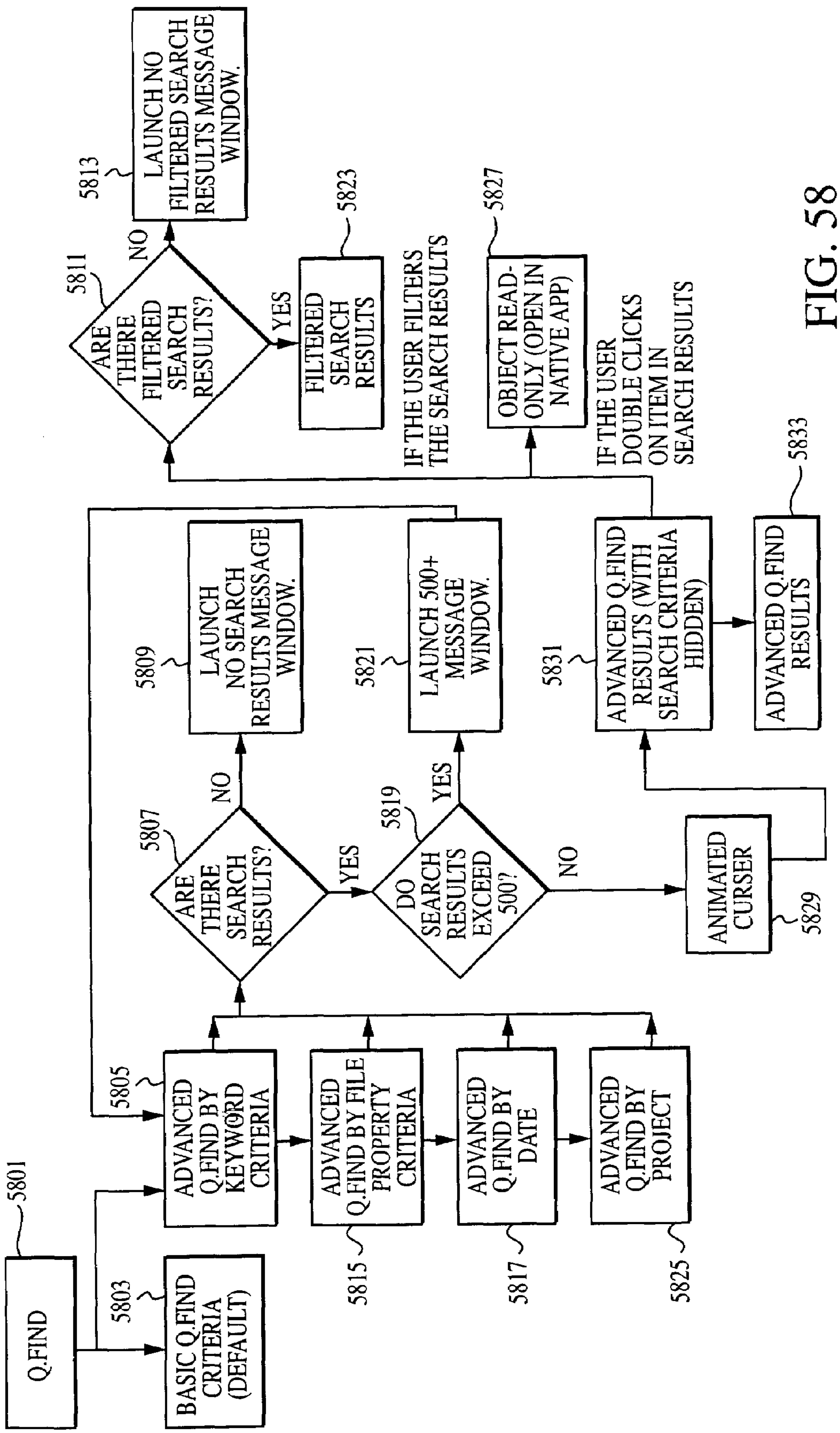

FIG. 58 is a flow chart illustrating an advanced process for finding items that have been stored via classes using keywords, file property, date, and/or project, according to one or more embodiments of the present invention.

Figure 59:
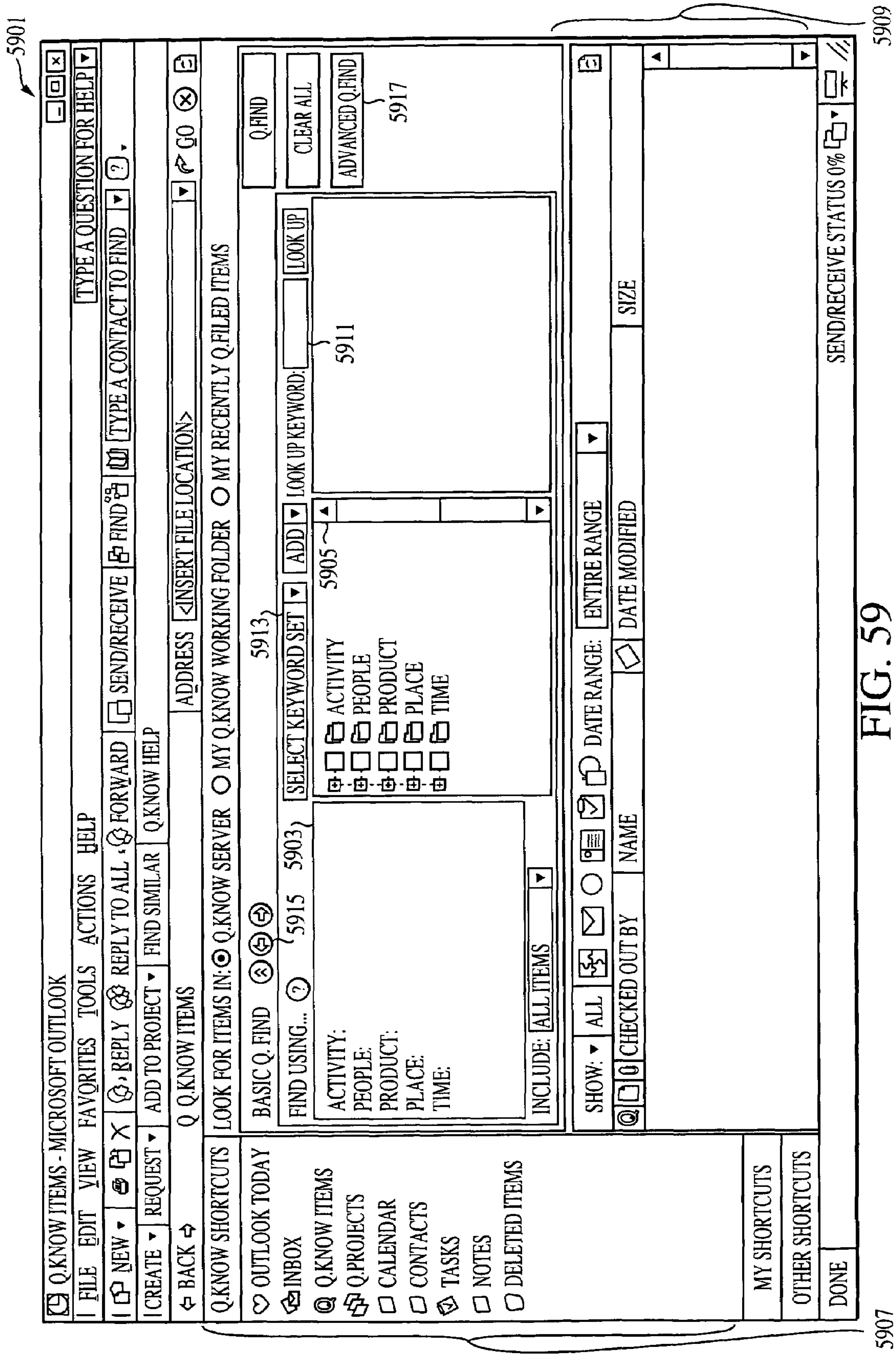

FIG. 59 illustrates an example user interface for finding items, including listing previous searches and search results, according to one or more embodiments of the present invention.

Figure 60:
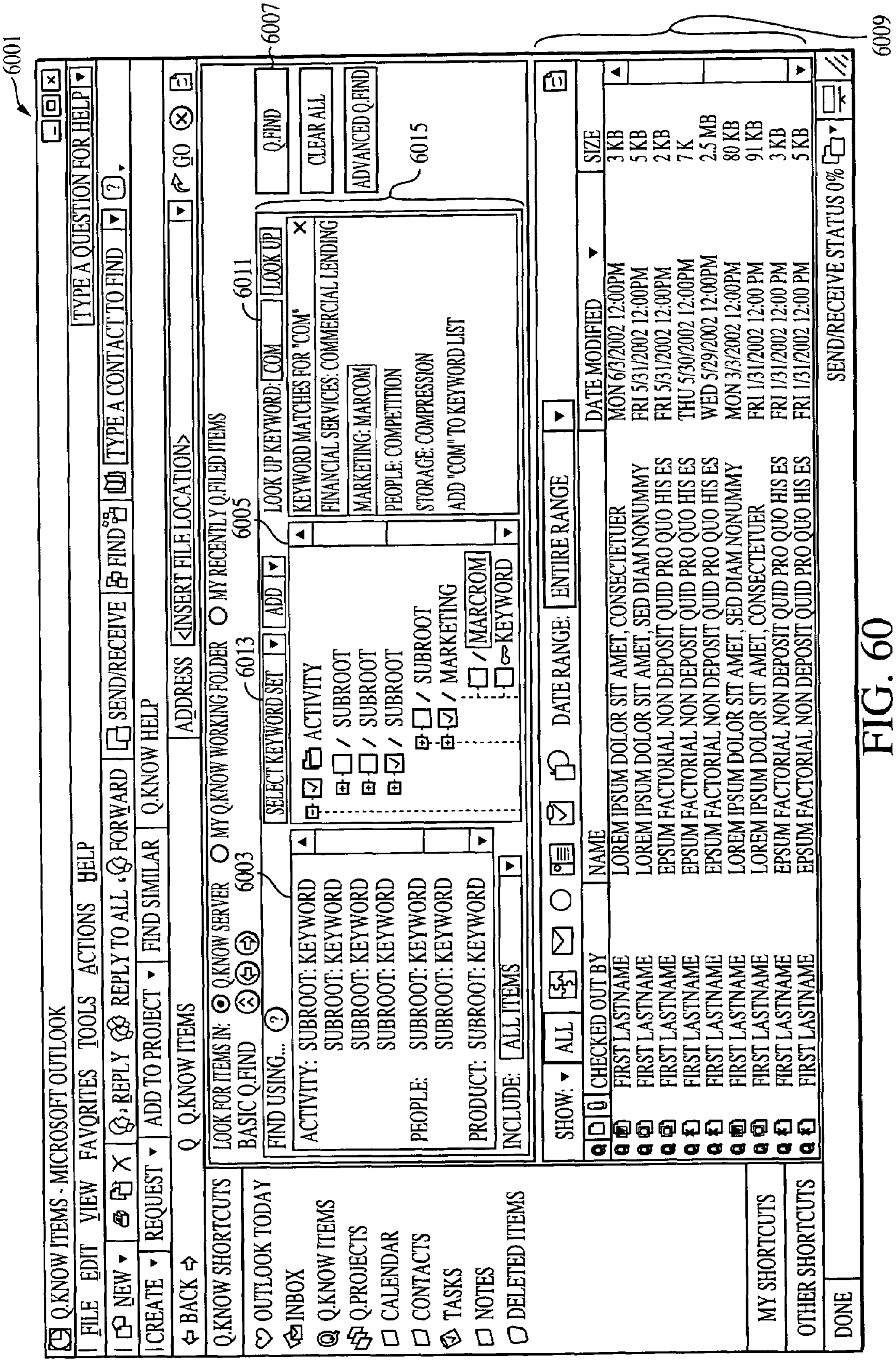

FIG. 60 illustrates an example user interface for interacting with the user to obtain keyword search criteria, according to one or more embodiments of the present invention.

Figure 61:
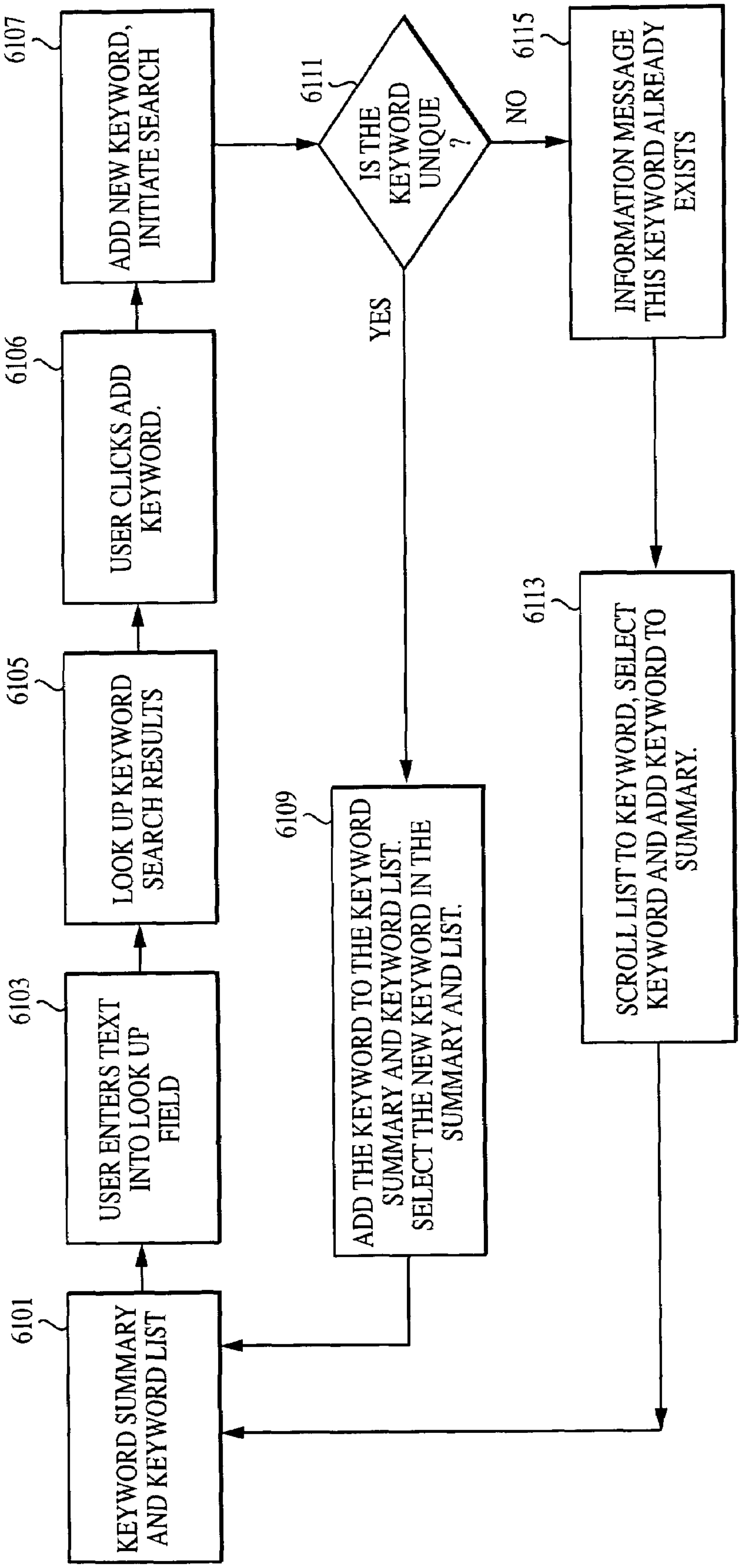

FIG. 61 is a flow chart illustrating adding a new keyword to a class, for use in indexing and retrieving items, according to one or more embodiments of the present invention.

Figure 62:
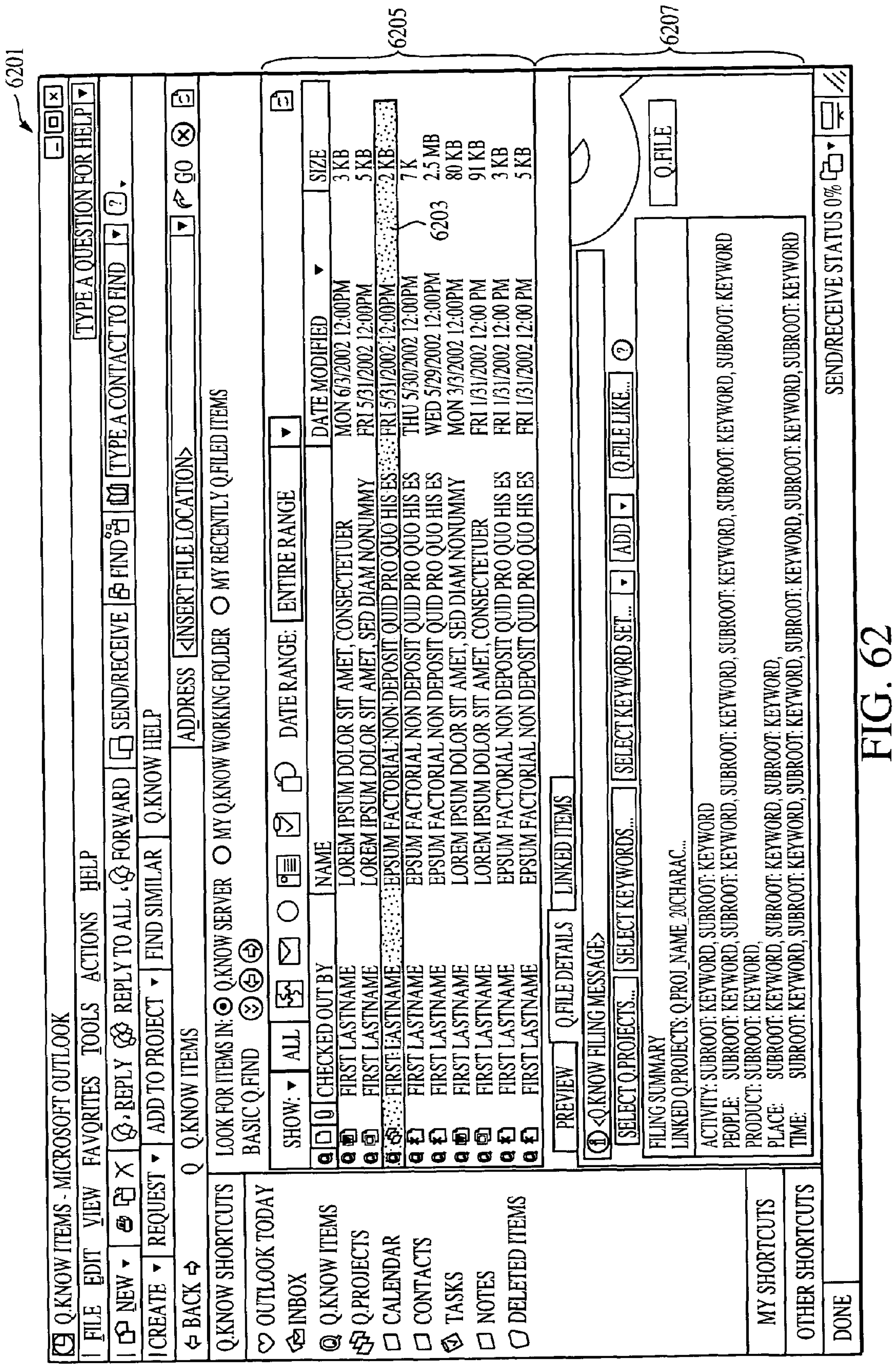

FIG. 62 illustrates an example user interface showing search results from a basic process for finding items, with search criteria hidden, according to one or more embodiments of the present invention.

Figure 63:
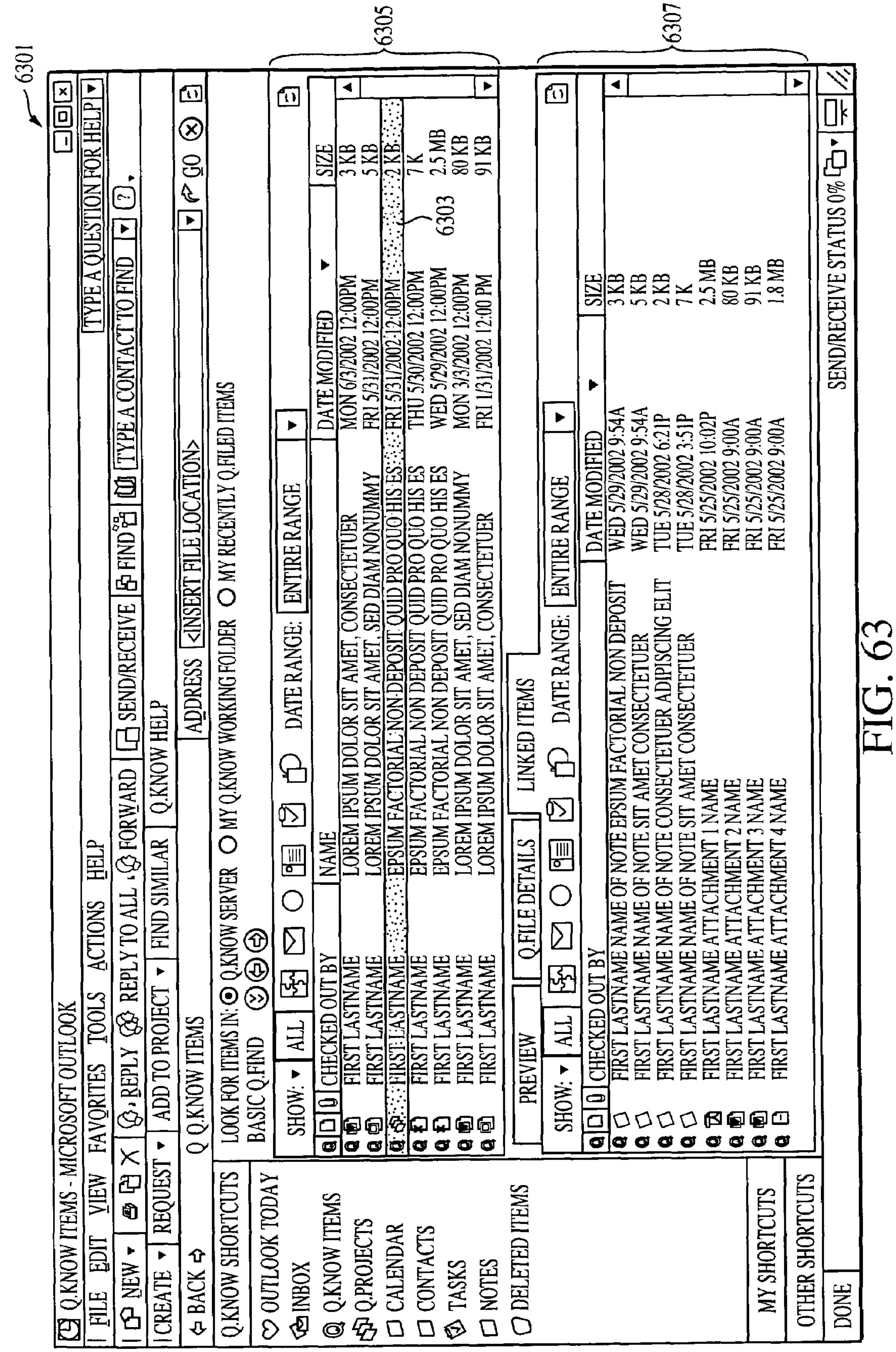

FIG. 63 illustrates an example user interface showing a user access of a linked item from the current item, according to one or more embodiments of the present invention.

Figure 64:
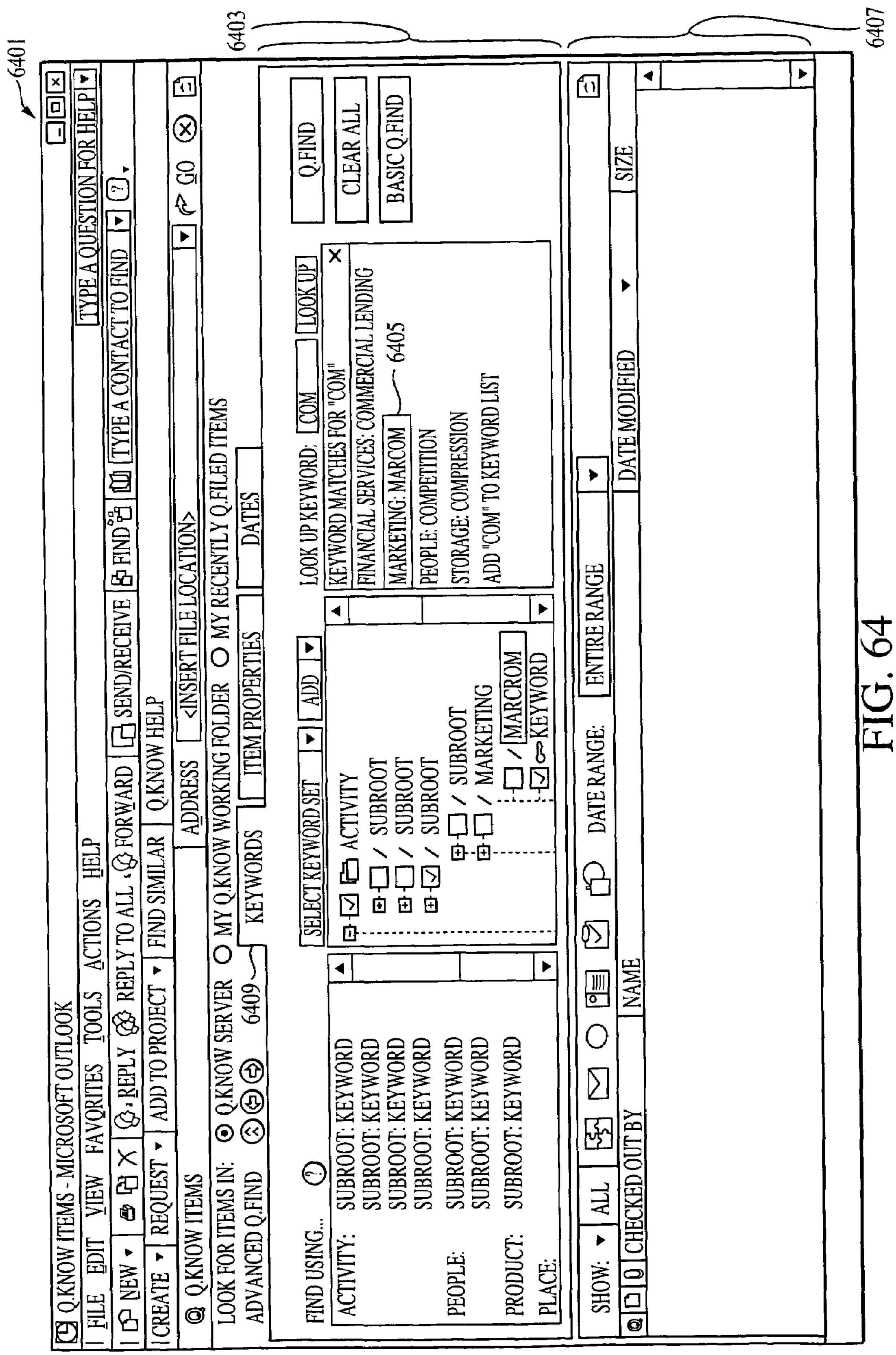

FIG. 64 illustrates an example user interface showing search results from an advanced process for finding items, according to one or more embodiments of the present invention.

Figure 65:
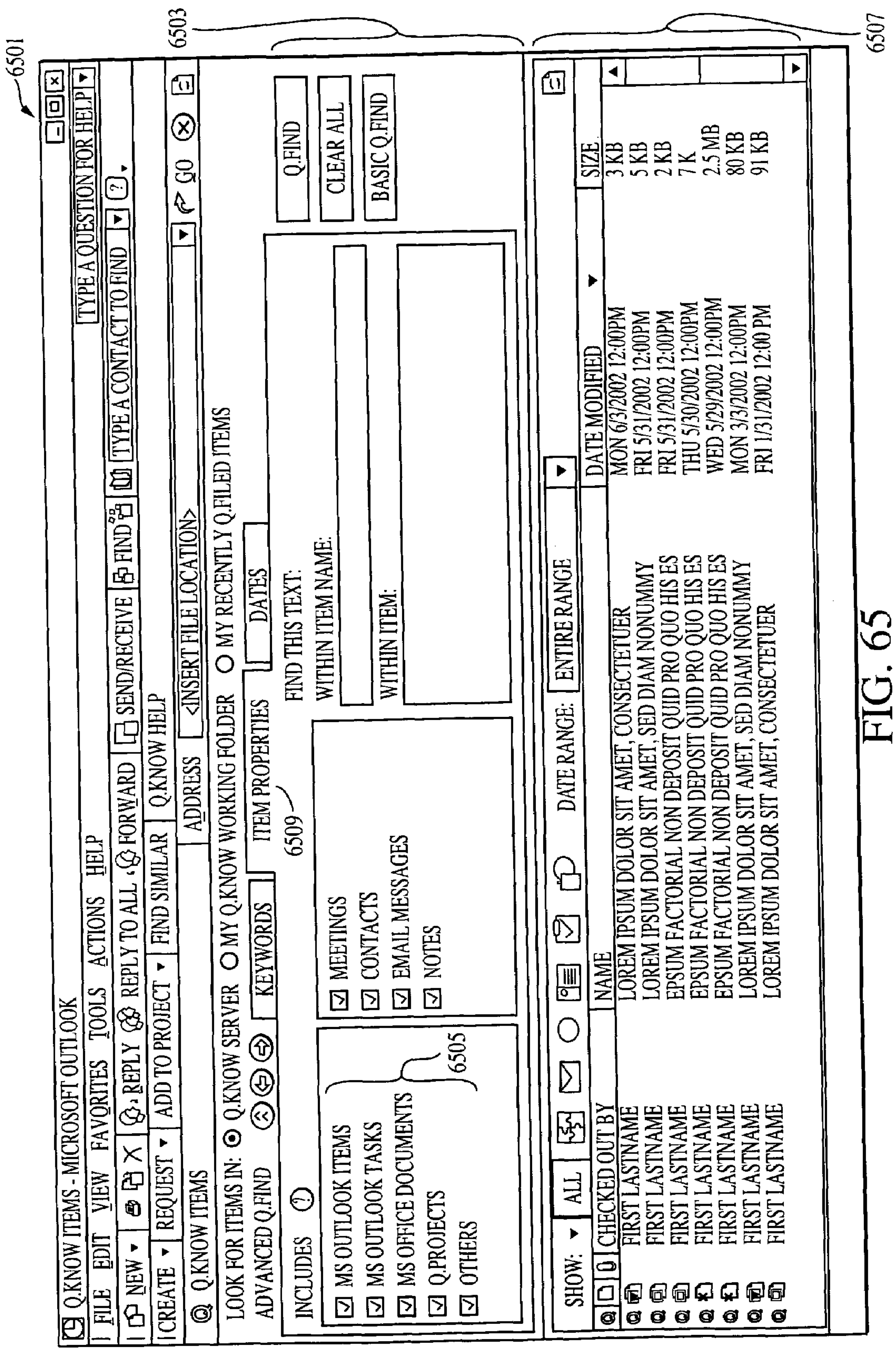

FIG. 65 illustrates an example user interface showing search results from an advanced process for finding items via file properties, according to one or more embodiments of the present invention.

Figure 66:
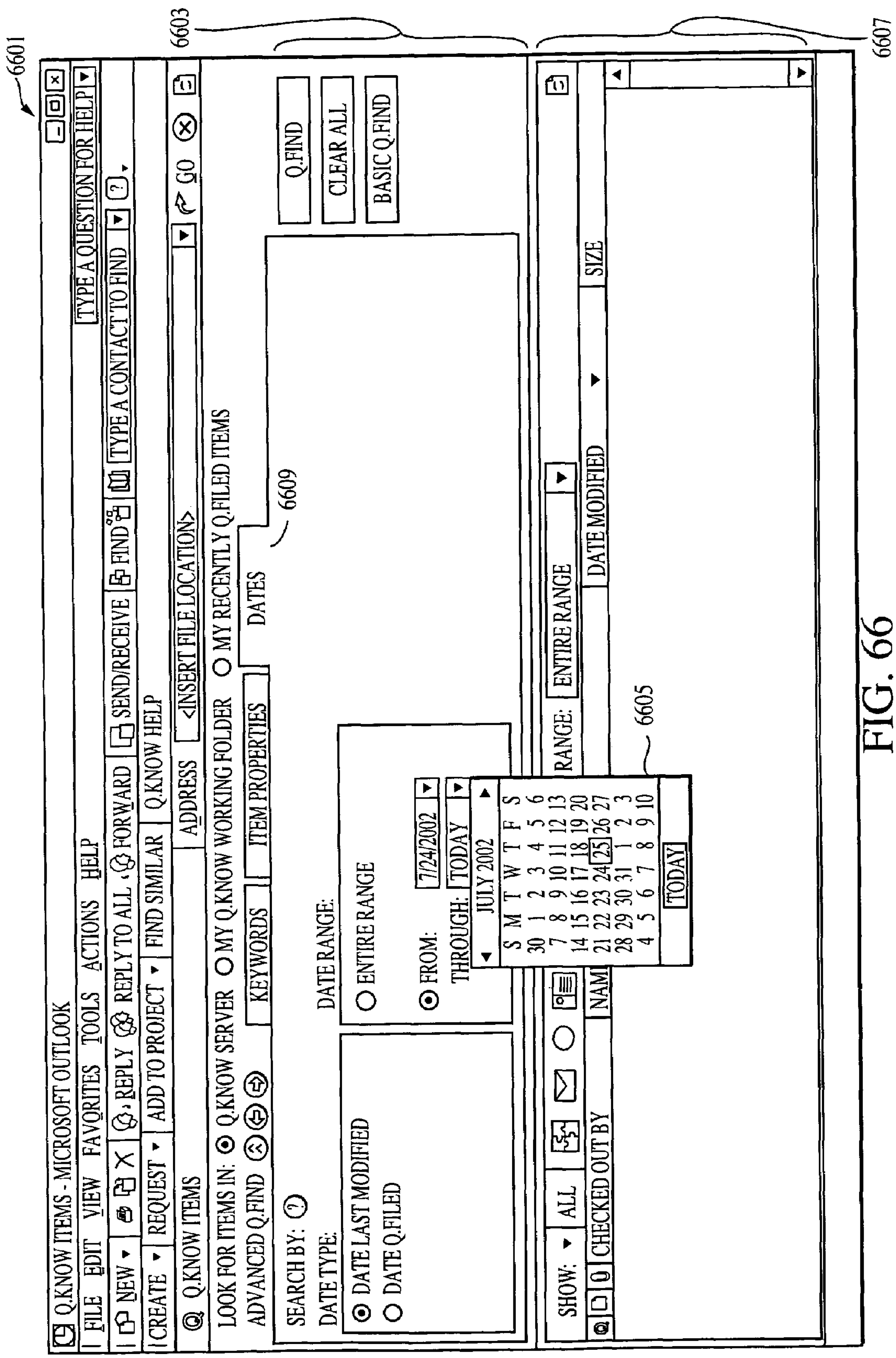

FIG. 66 illustrates an example user interface showing search results from an advanced process for finding items via date criteria, according to one or more embodiments of the present invention.

Figure 67:
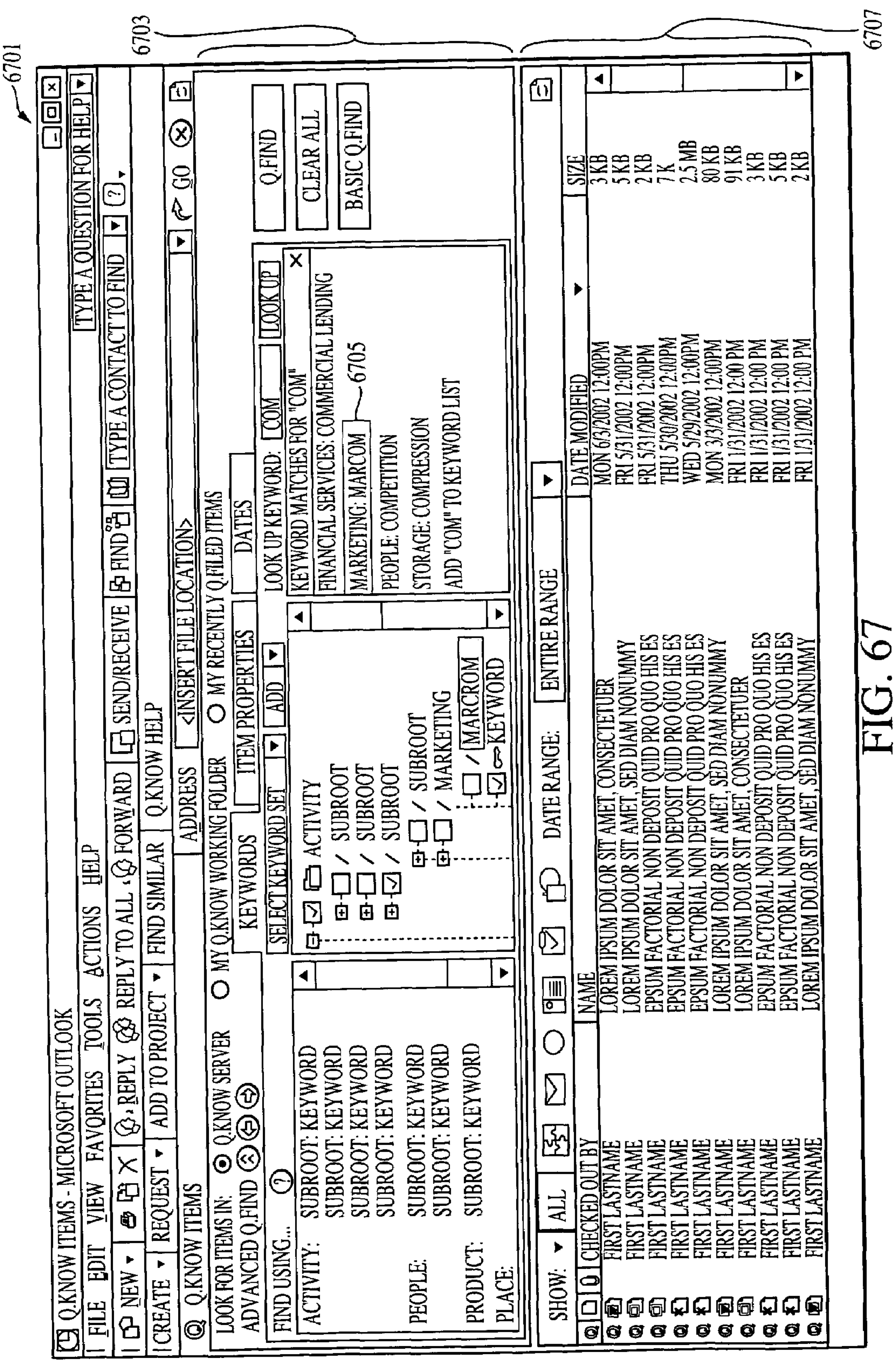

FIG. 67 illustrates an example user interface showing search results from an advanced process for finding items, according to one or more embodiments of the present invention.

Figure 68:
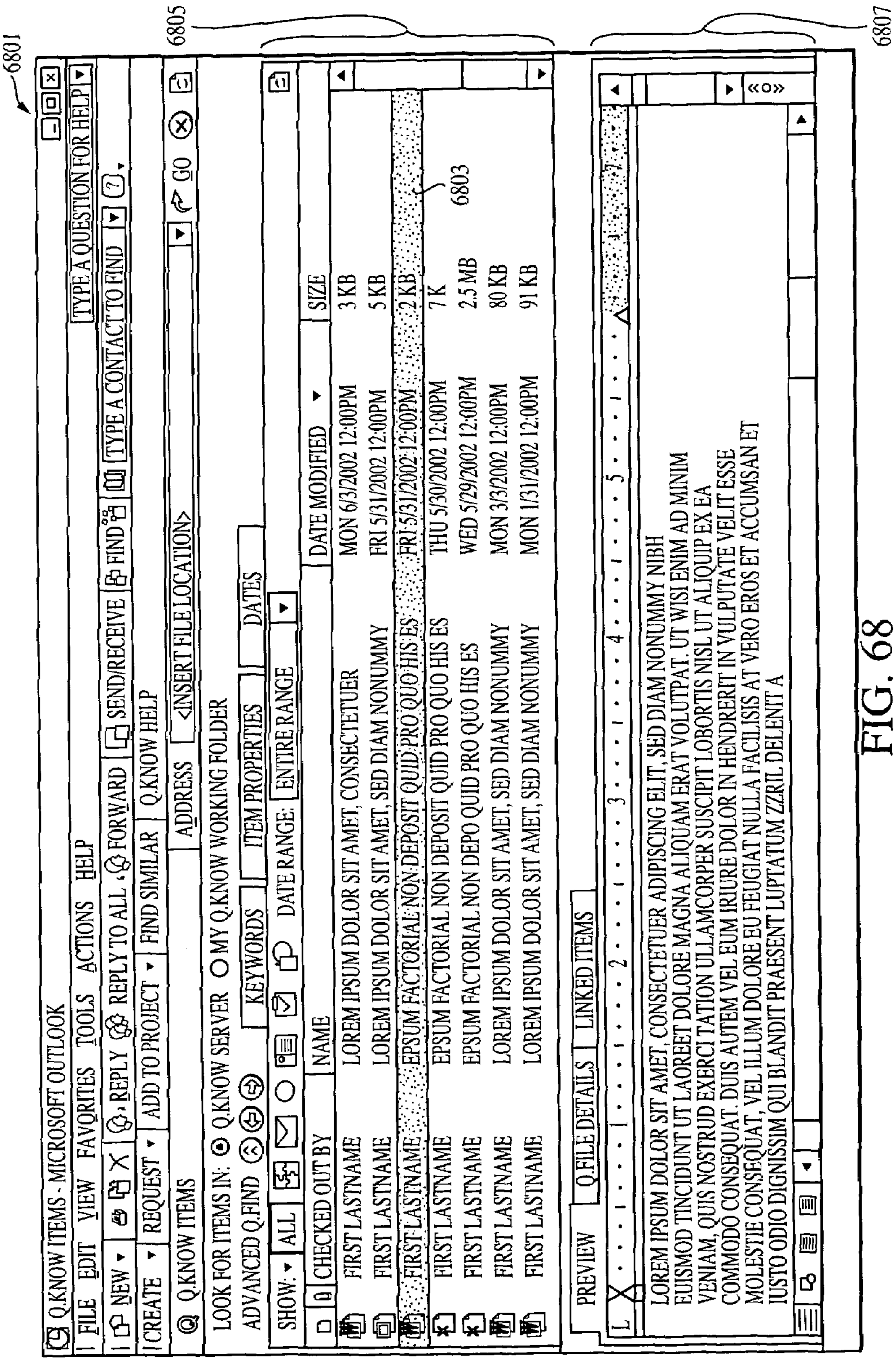

FIG. 68 illustrates an example user interface showing search results from an advanced process for finding items, with search criteria hidden, according to one or more embodiments of the present invention.

Figure 69:
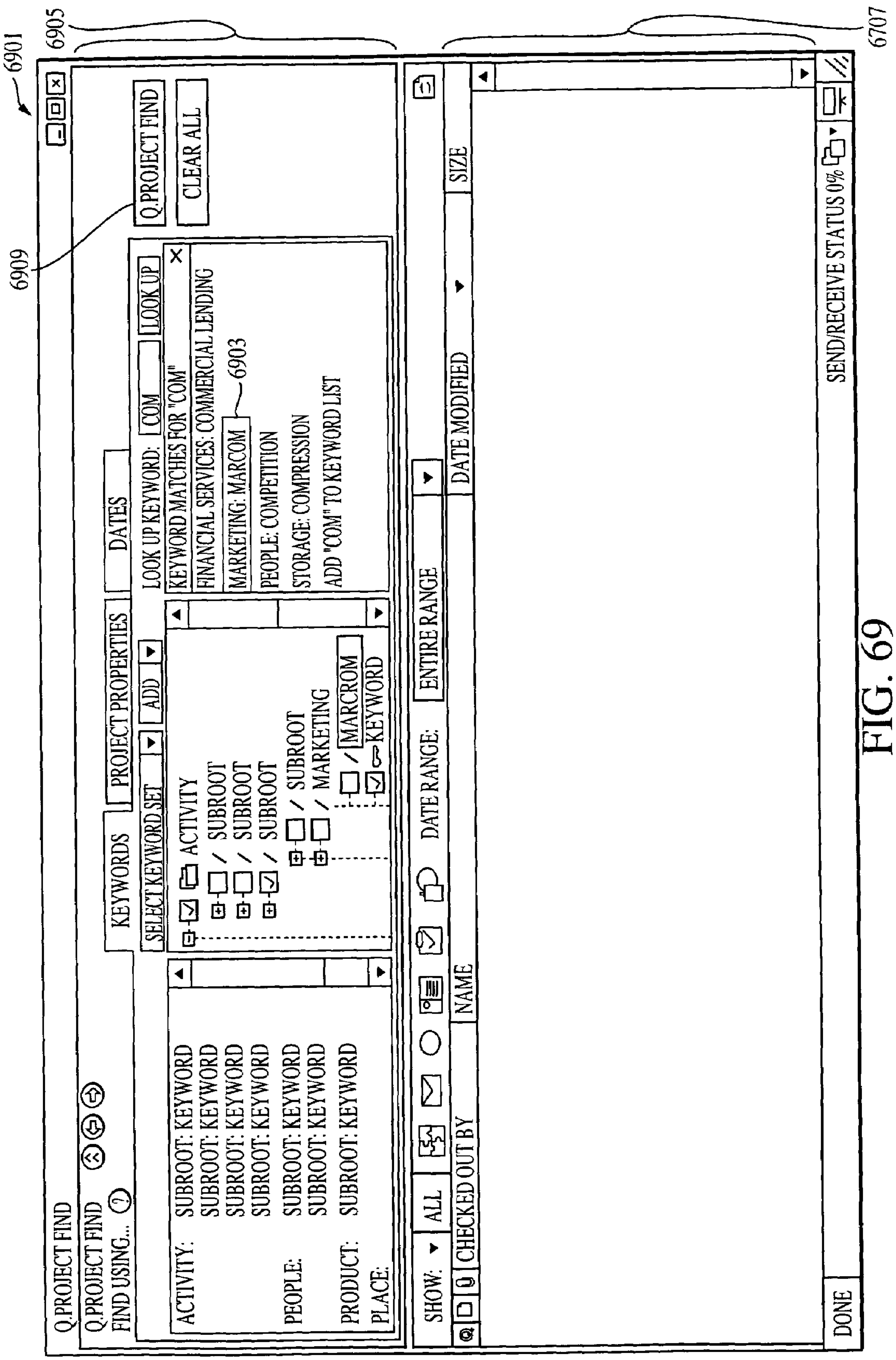

FIG. 69 illustrates an example user interface showing search results from an advanced process for finding projects, according to one or more embodiments of the present invention.

Figure 70:
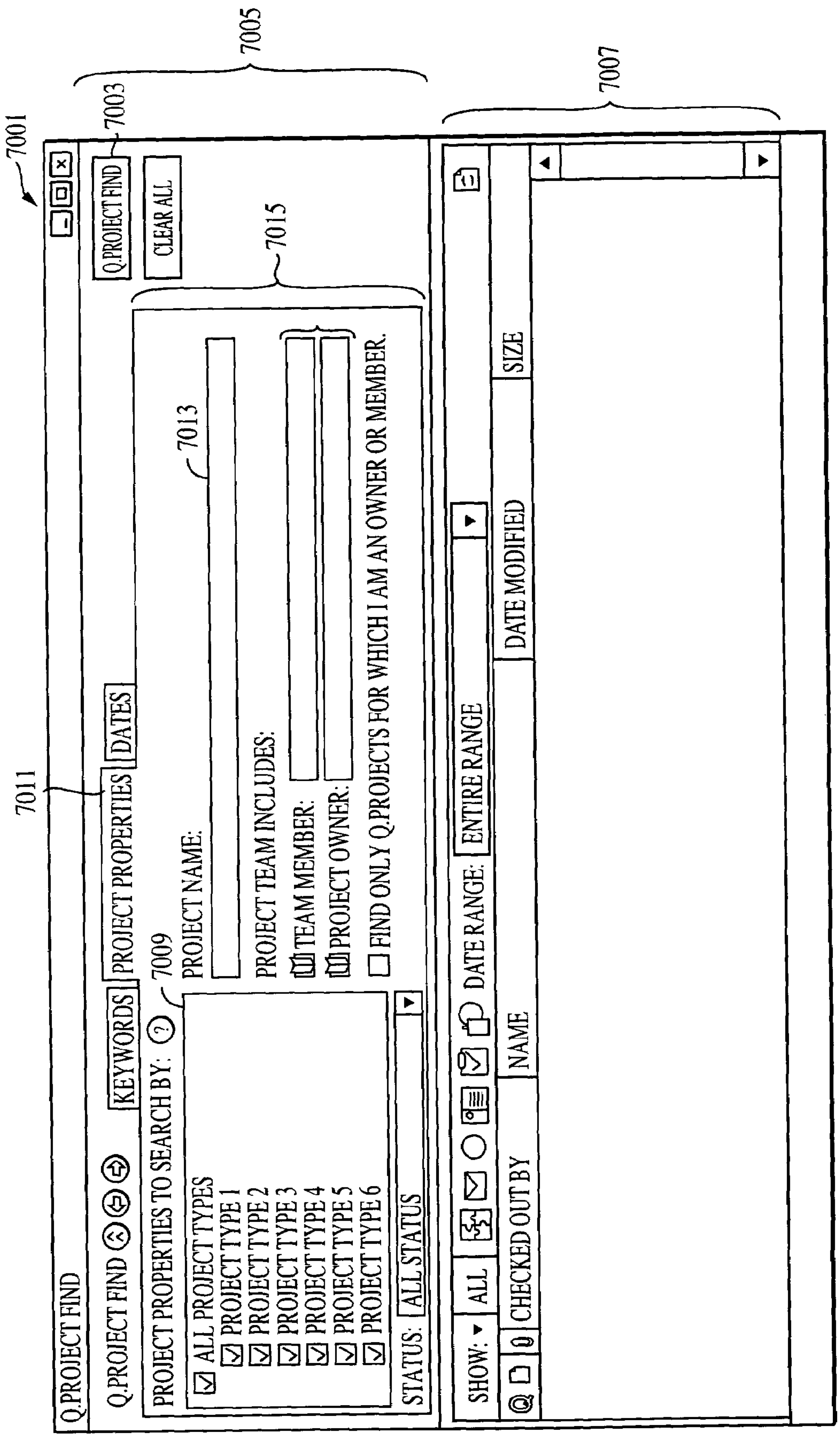

FIG. 70 illustrates an example user interface showing search results from an advanced process for finding projects via project property search criteria, according to one or more embodiments of the present invention.

Figure 71:
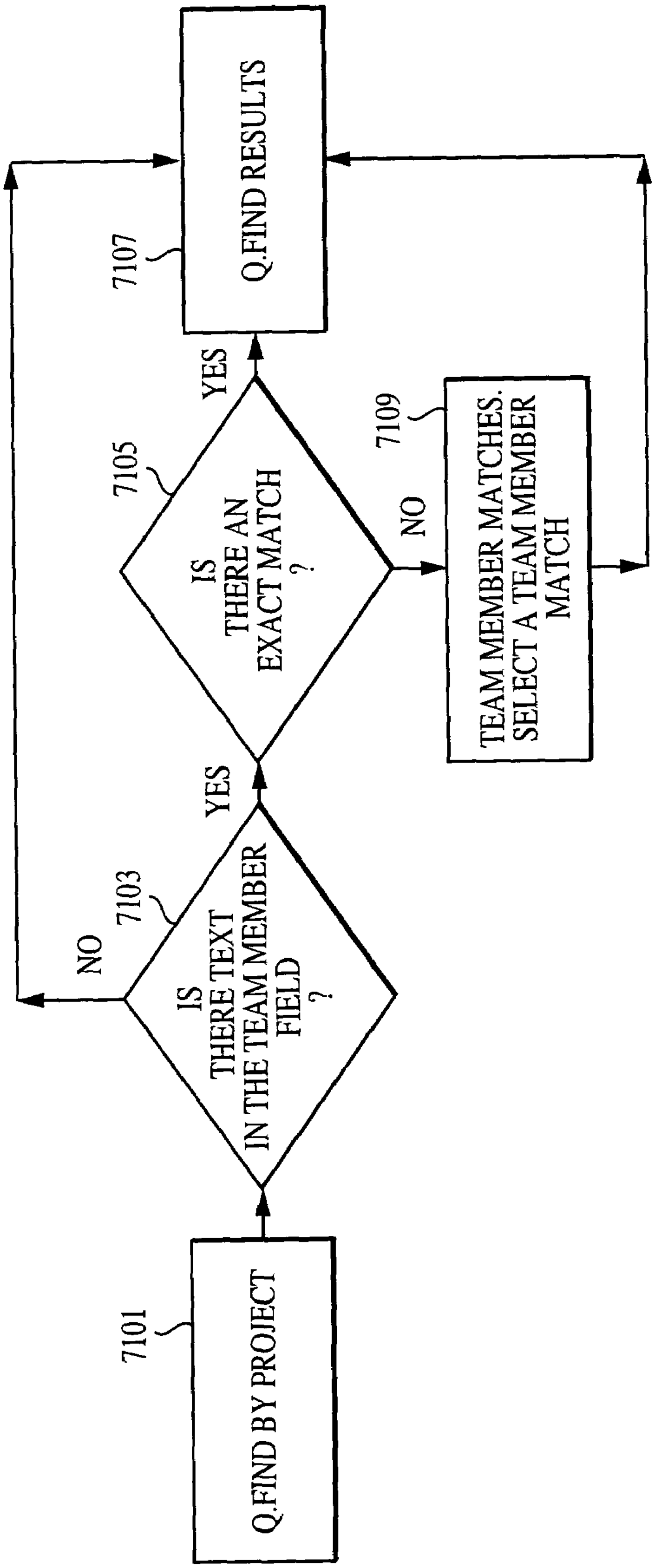

FIG. 71 is a flow chart illustrating an example of find an item within a project, according to one or more embodiments of the present invention.

Figure 72:
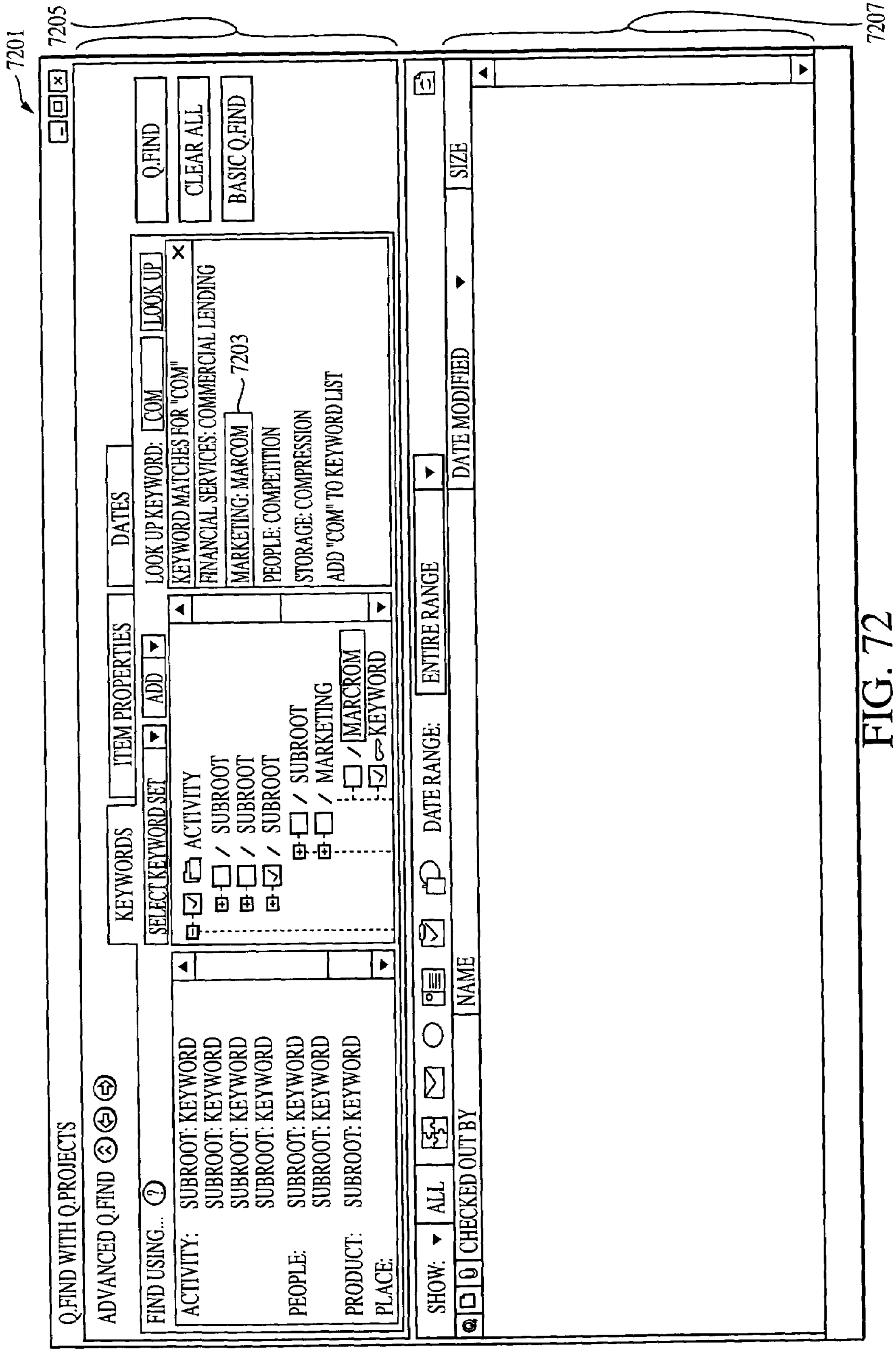

FIG. 72 illustrates an example user interface showing search results from an advanced process for finding items via linked items of selected projects, according to one or more embodiments of the present invention.

Figure 73:
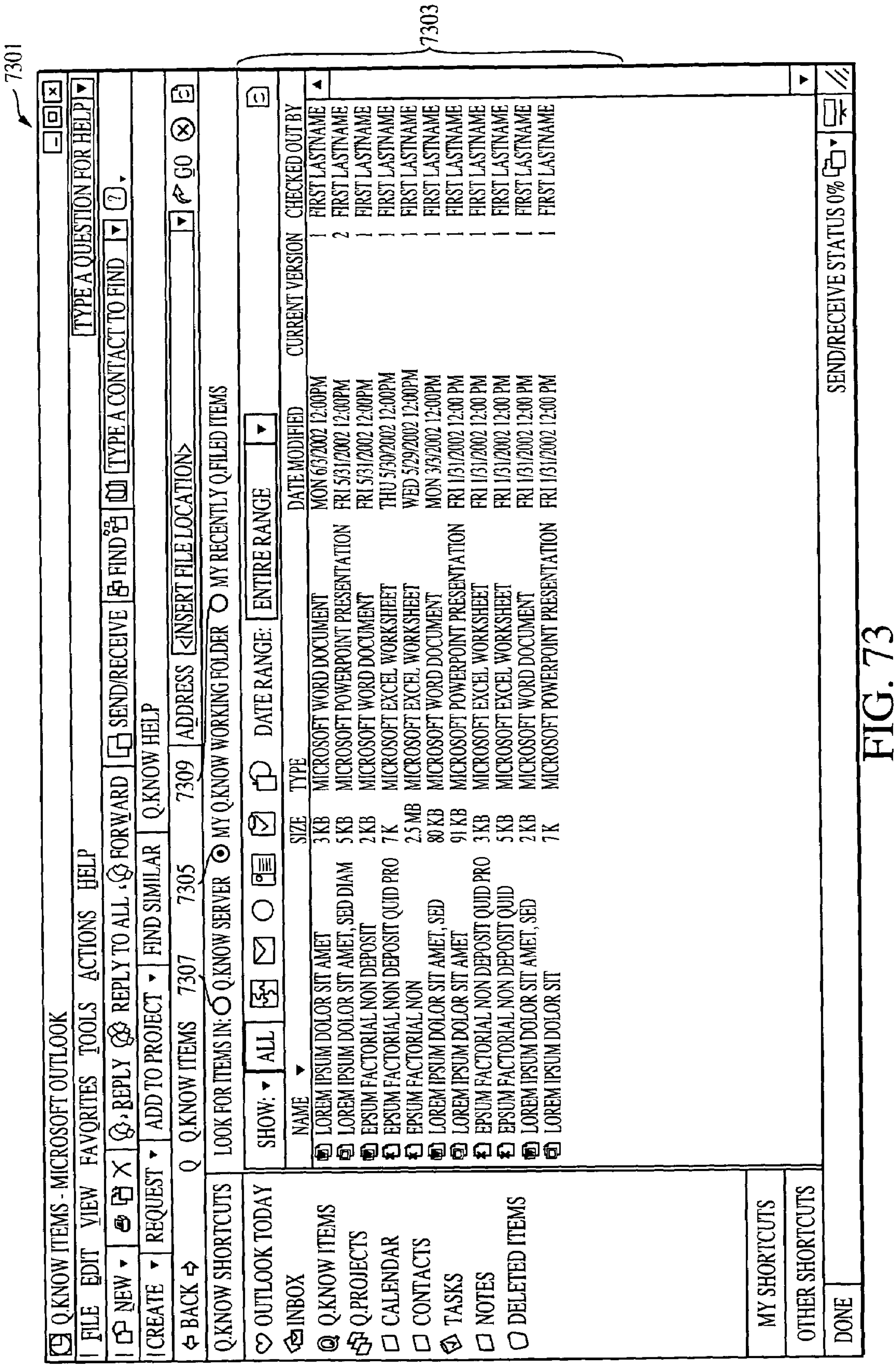

FIG. 73 illustrates an example user interface showing the working folder as a default location in which to search, according to one or more embodiments of the present invention.

Figure 74A:
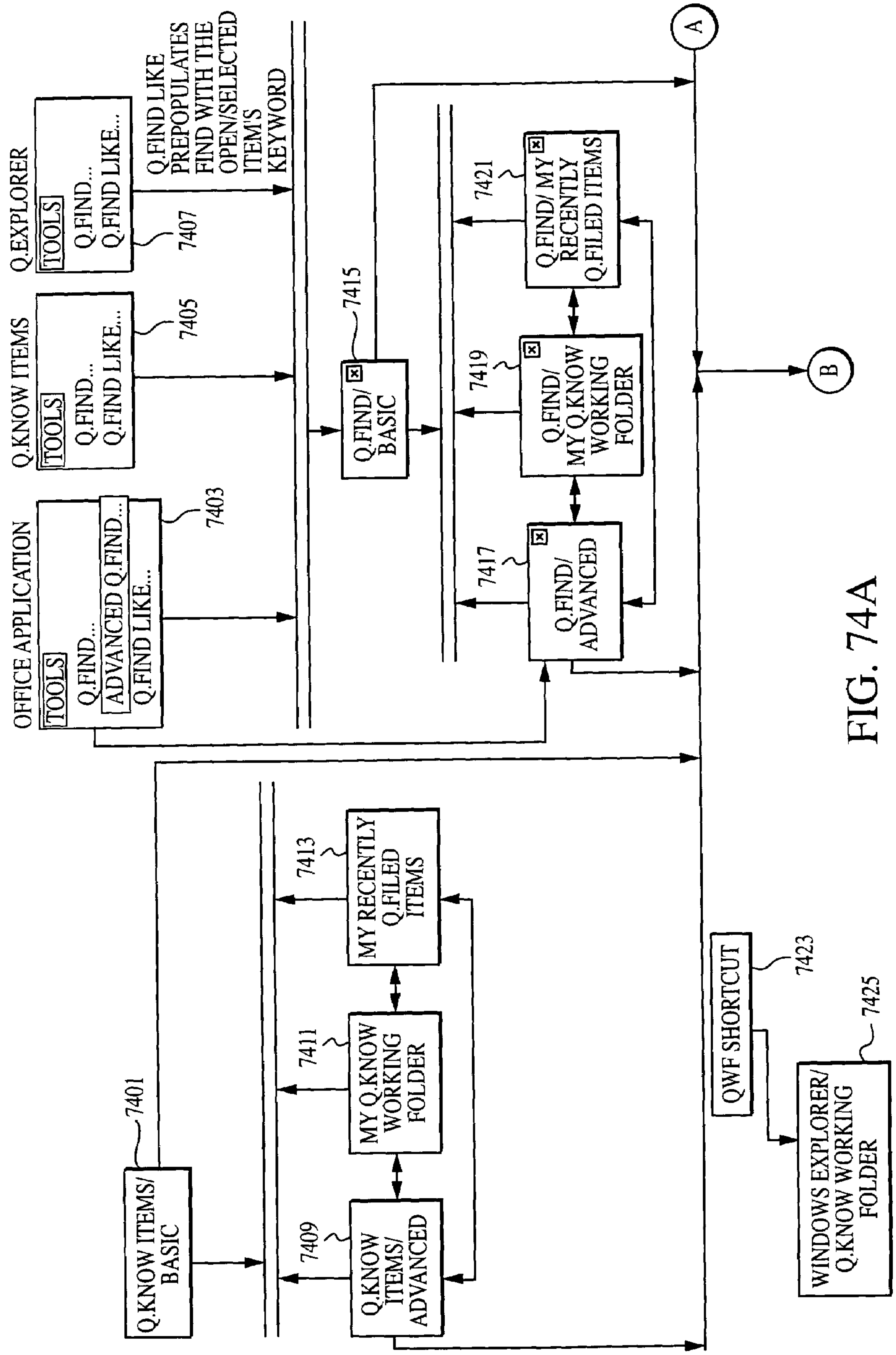
Figure 74B:
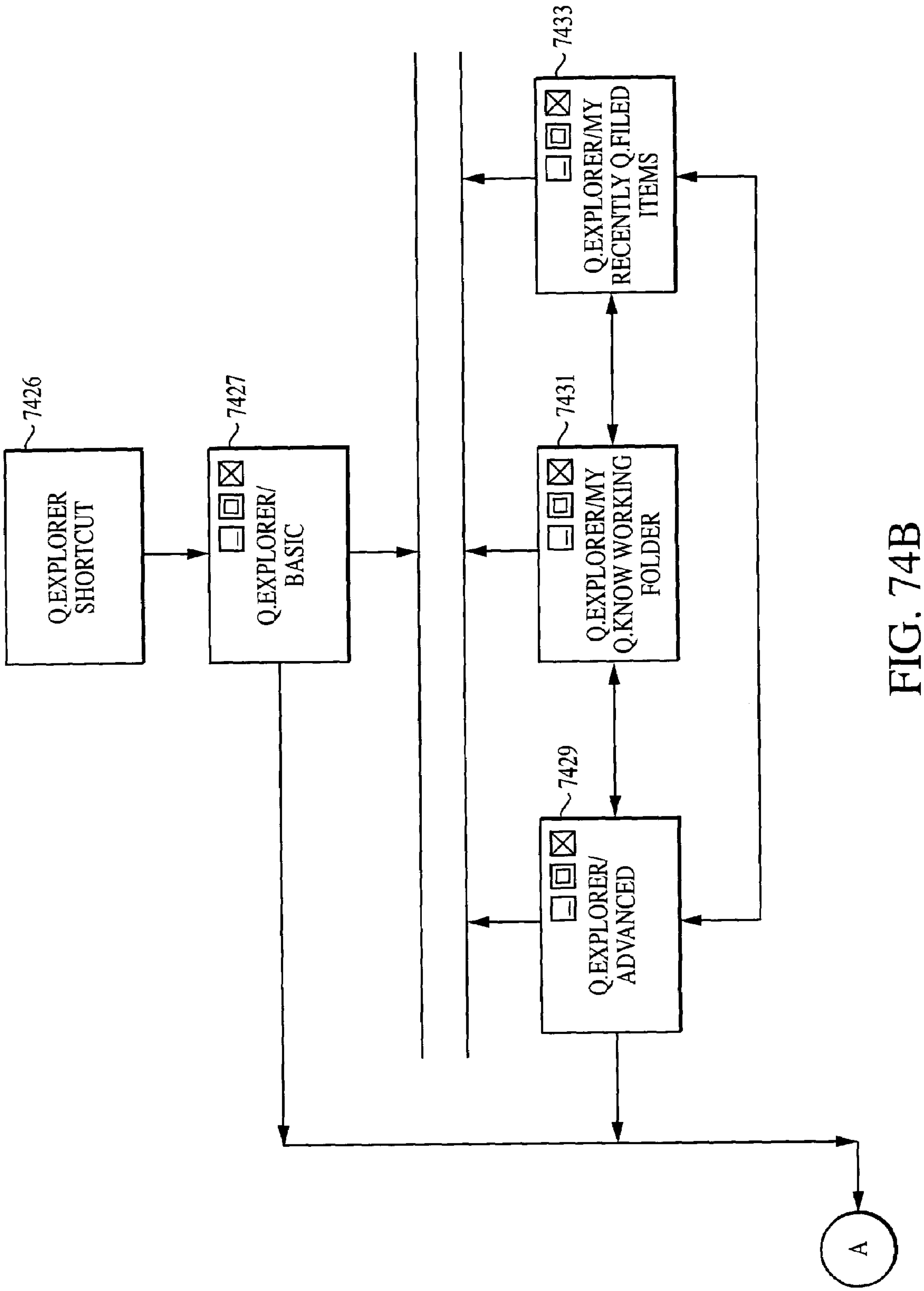
Figure 74C:
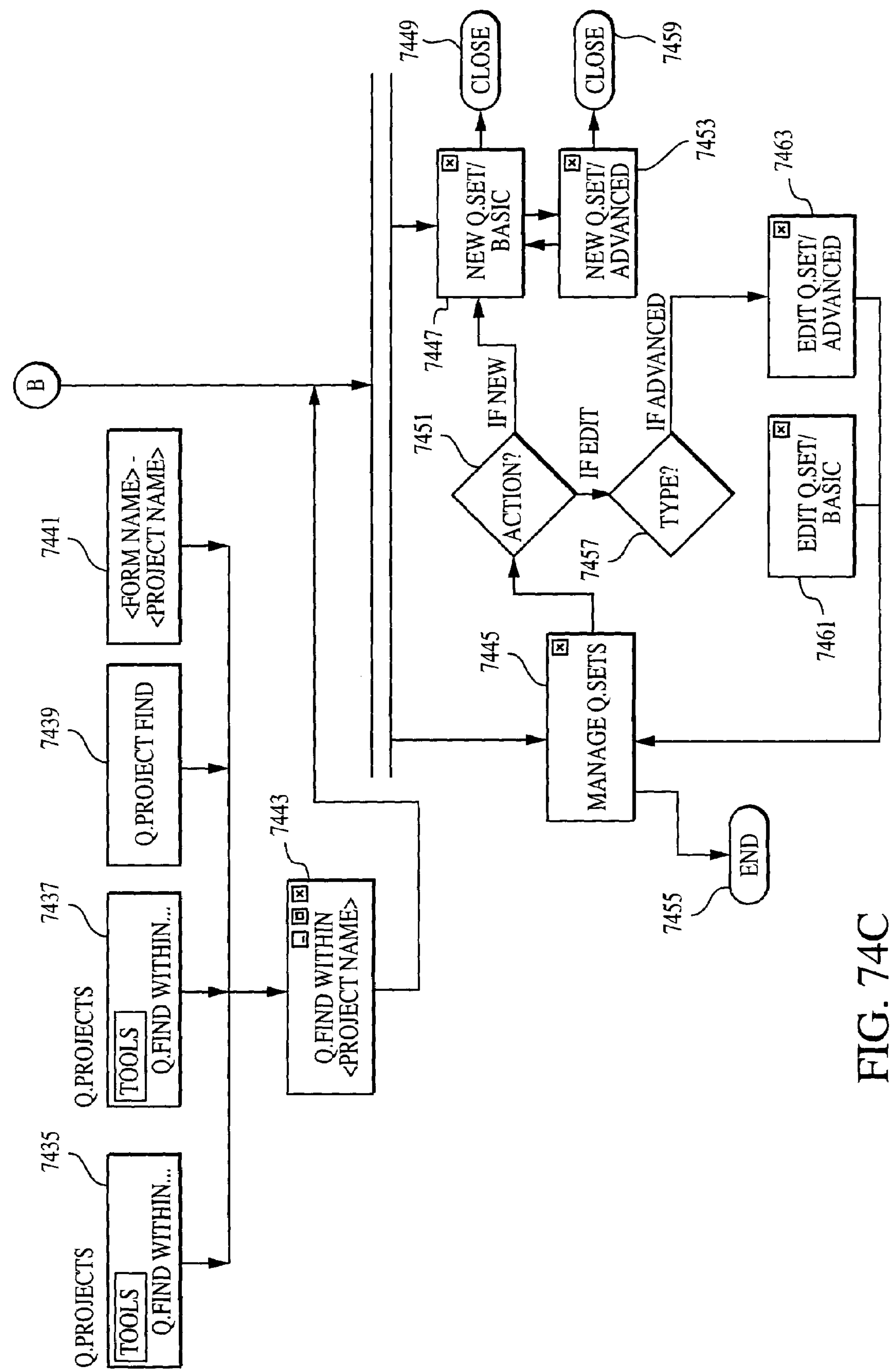

FIGS. 74A-C are a flow chart illustrating an example process for finding an item, according to one or more embodiments of the present invention.

Figure 75:
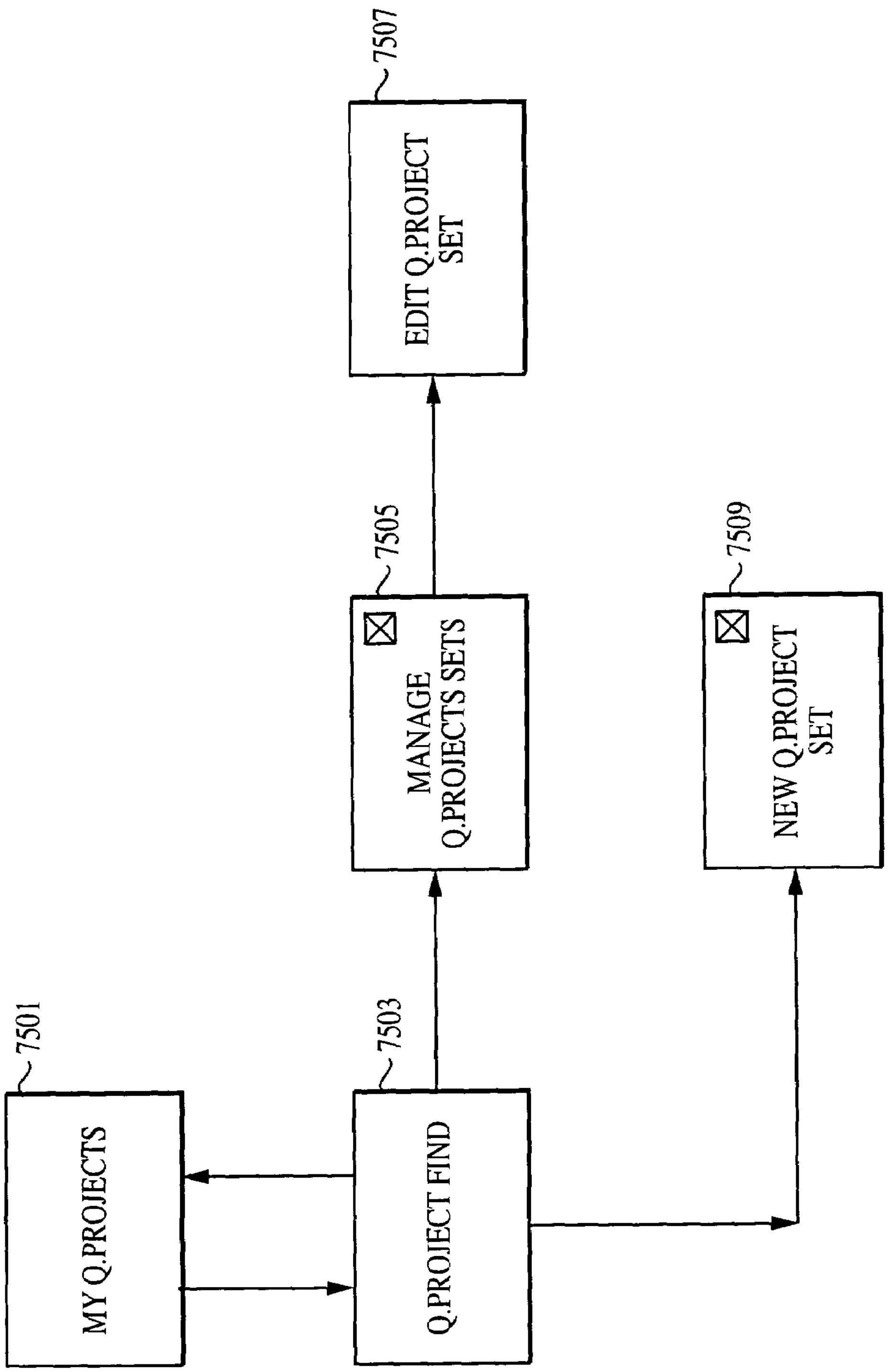

FIG. 75 is a flow chart illustrating an example process for selecting whether to manage projects and/or project sets, according to one or more embodiments of the present invention.

Figure 76:
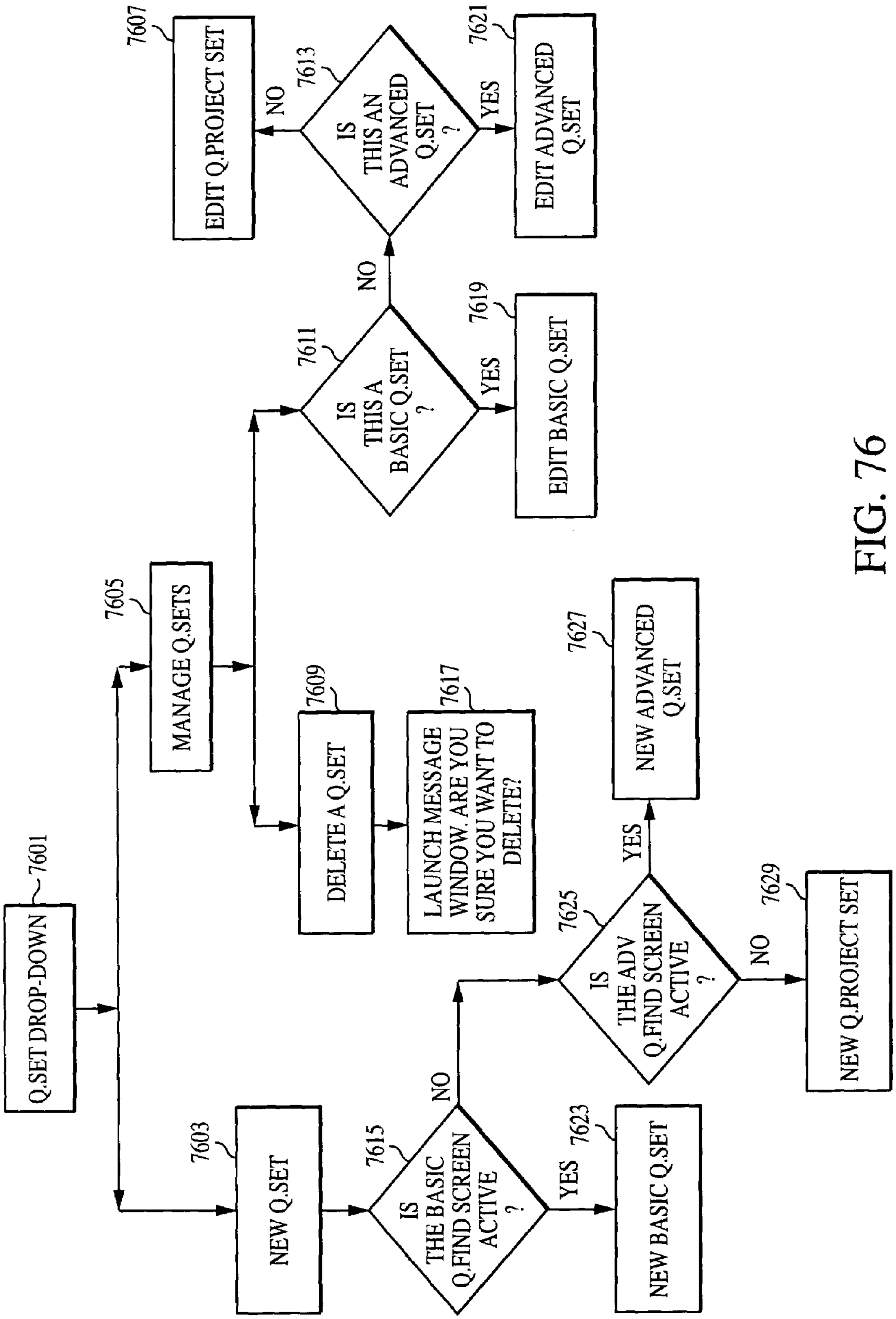

FIG. 76 is a flow chart illustrating an example process for managing linked sets and project sets, according to one or more embodiments of the present invention.

Figure 77:
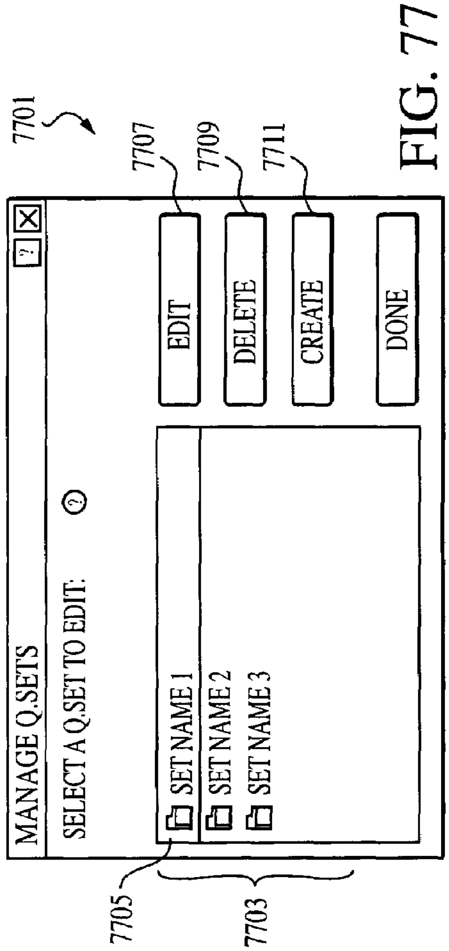

FIG. 77 illustrates an example user interface showing selection of a linked set of items to edit, according to one or more embodiments of the present invention.

Figure 78:
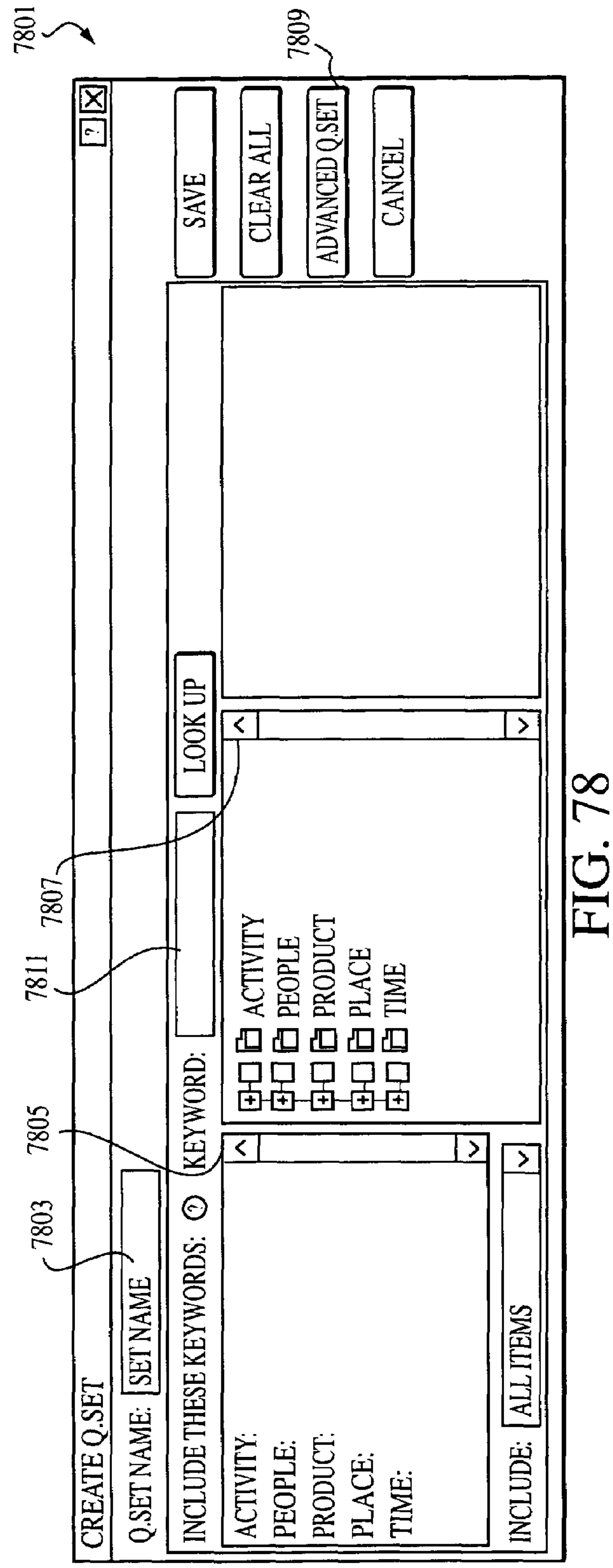

FIG. 78 illustrates an example user interface showing basic creation of a linked set, according to one or more embodiments of the present invention.

Figure 79:
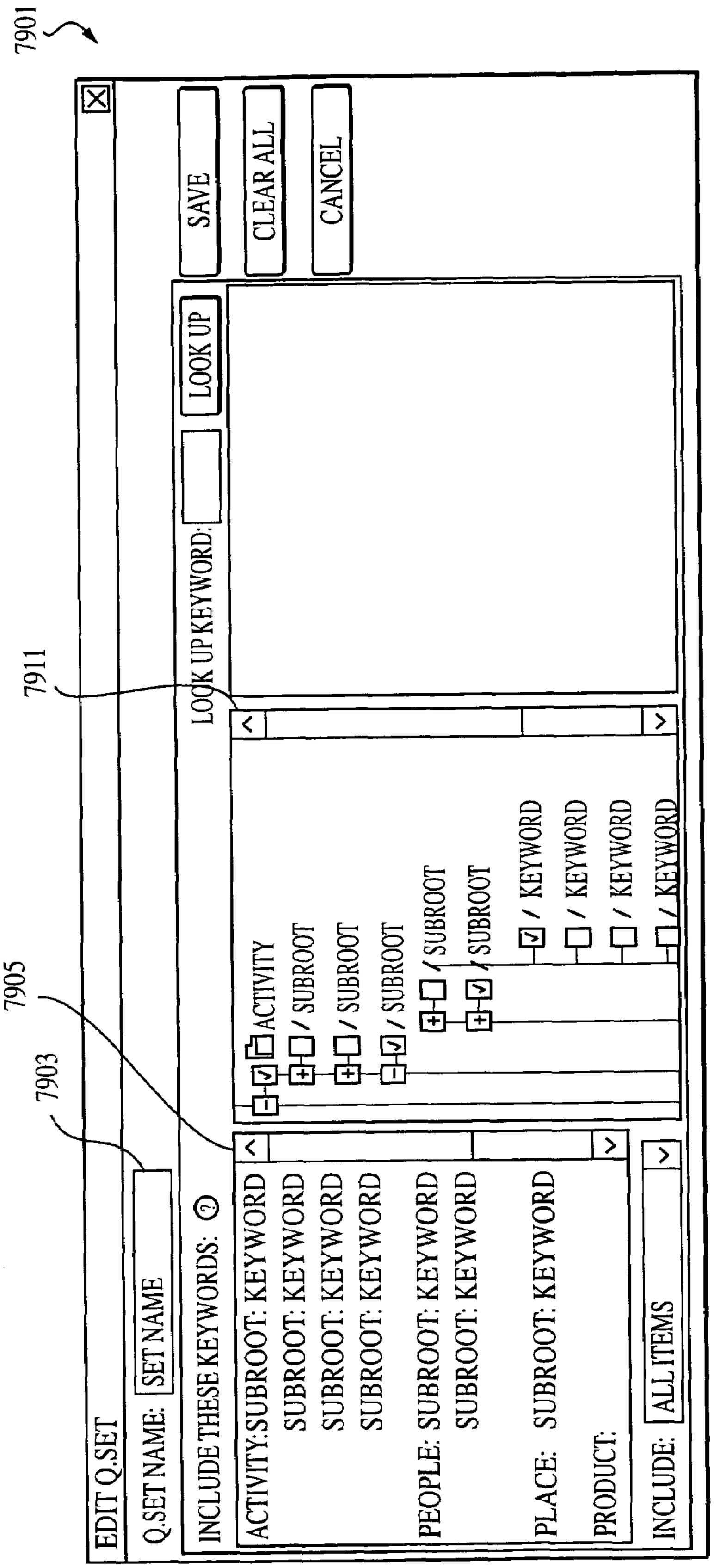

FIG. 79 illustrates an example user interface showing basic editing of a linked set, according to one or more embodiments of the present invention.

Figure 80:
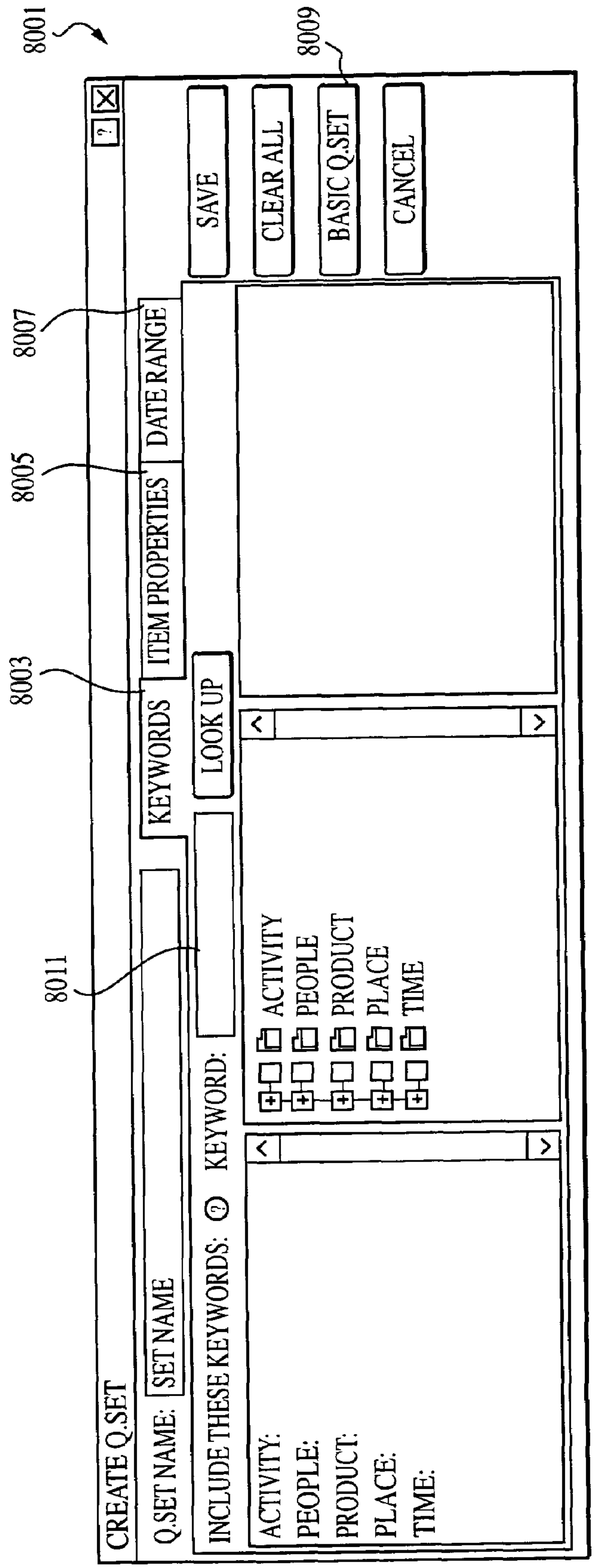

FIG. 80 illustrates an example user interface showing advanced creation of a linked set, including keyword specification, item property specification, and date range, according to one or more embodiments of the present invention.

Figure 81:
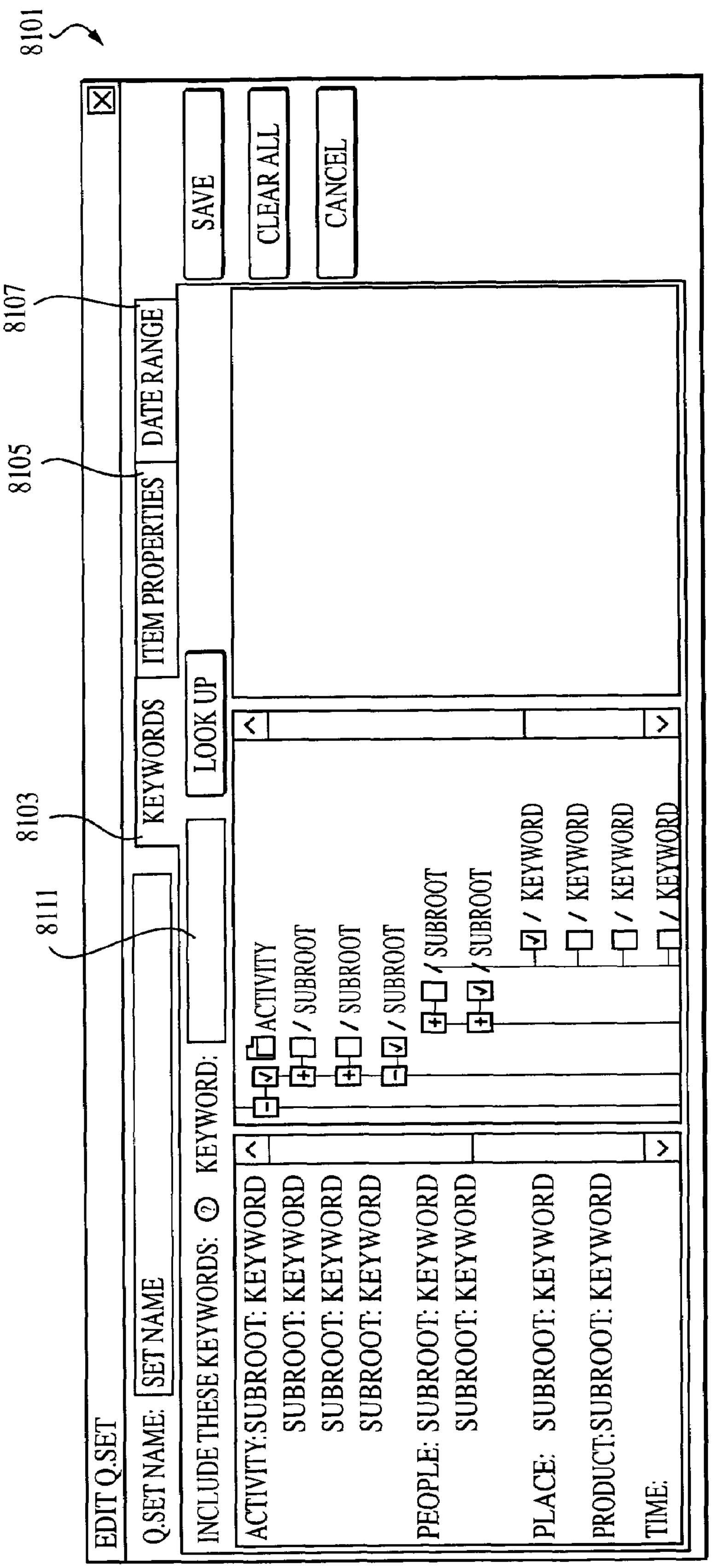

FIG. 81 illustrates an example user interface showing advanced editing of a linked set, according to one or more embodiments of the present invention.

Figure 82:
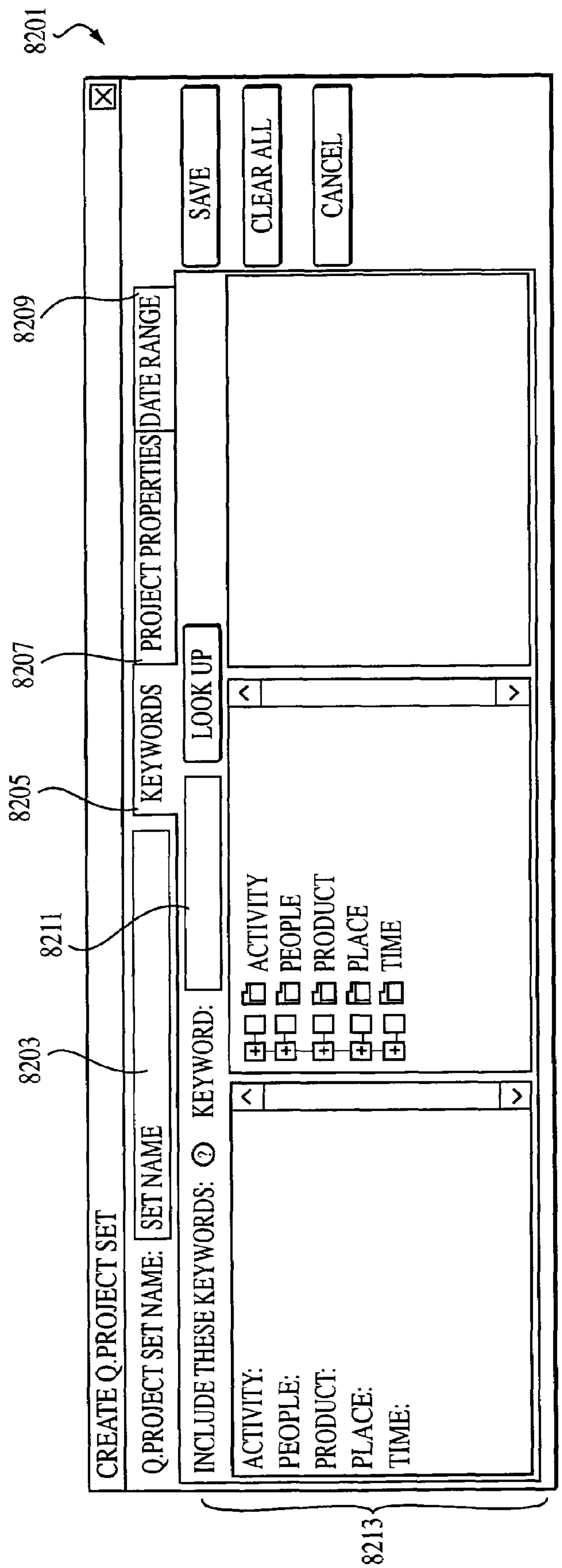

FIG. 82 illustrates an example user interface showing creation of a project set, according to one or more embodiments of the present invention.

Figure 83:
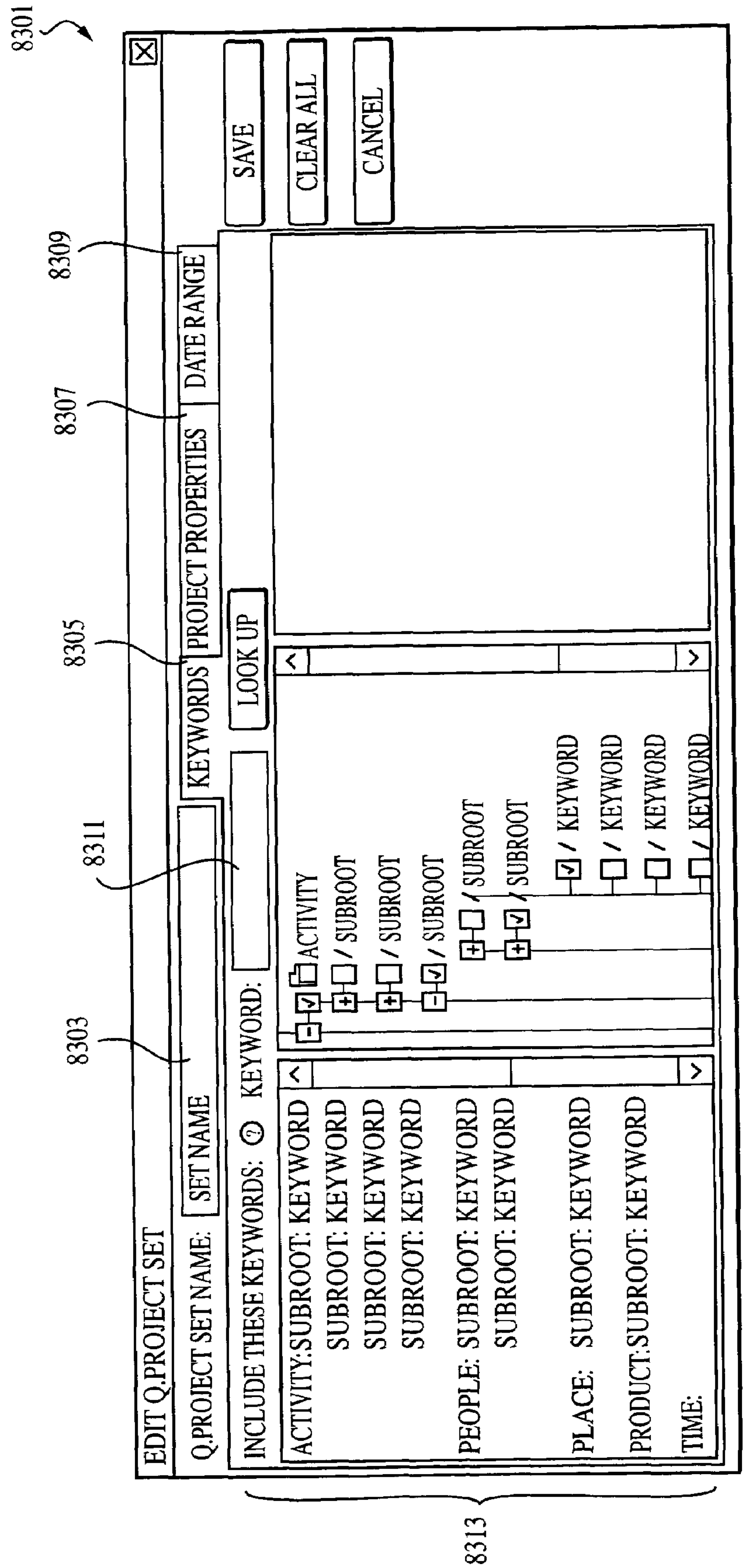

FIG. 83 illustrates an example user interface showing editing of a project set, according to one or more embodiments of the present invention.

Figure 84:
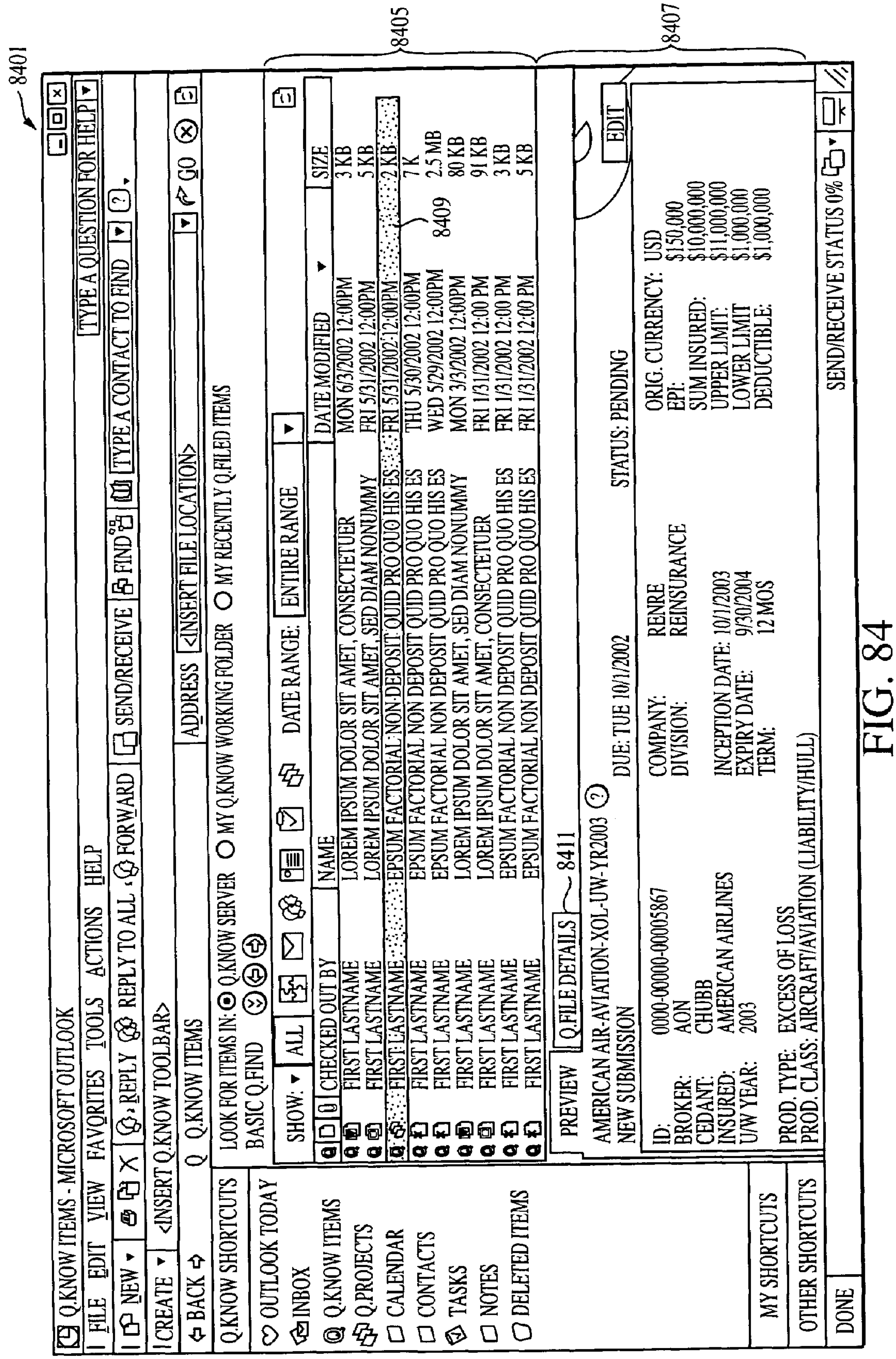

FIG. 84 illustrates an example user interface showing a preview of a selected item retrieved via a basic find process, according to one or more embodiments of the present invention.

Figure 85:
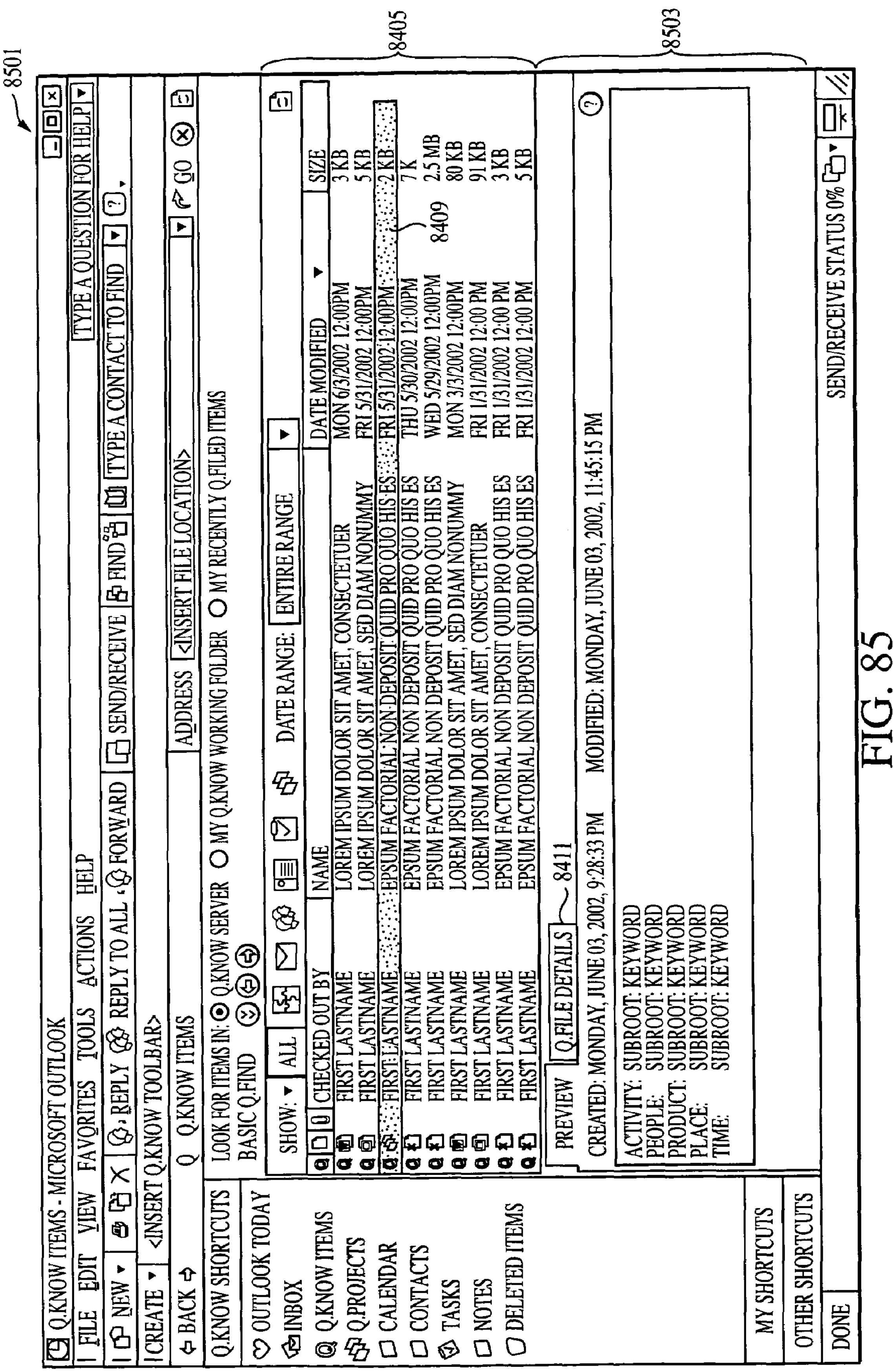

FIG. 85 illustrates an example user interface showing a detailed list of classes, etc. for the selected item retrieved via a basic find process, according to one or more embodiments of the present invention.

Figure 86:
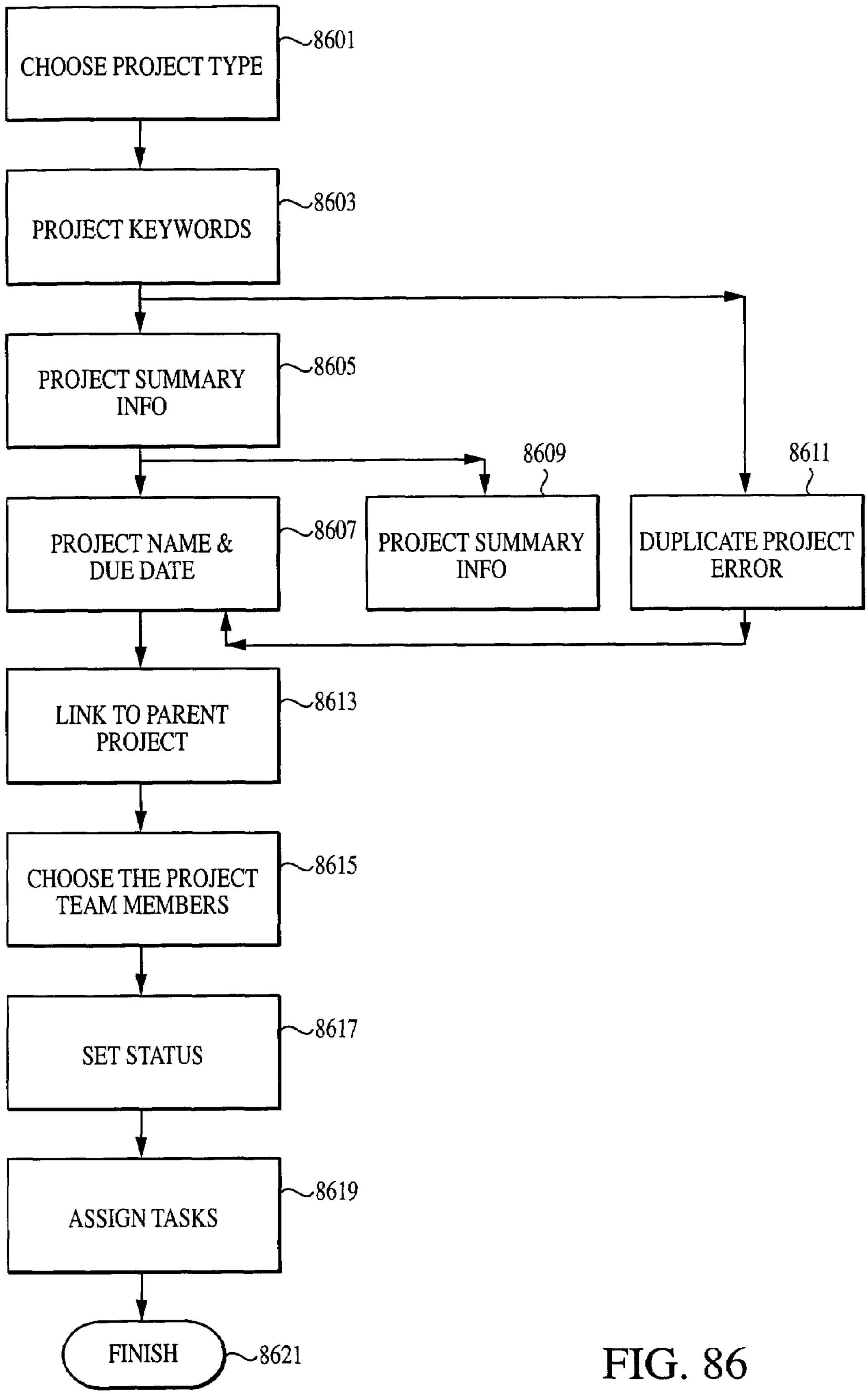

FIG. 86 is a flow chart illustrating an example process for managing projects, according to one or more embodiments of the present invention.

Figure 87:
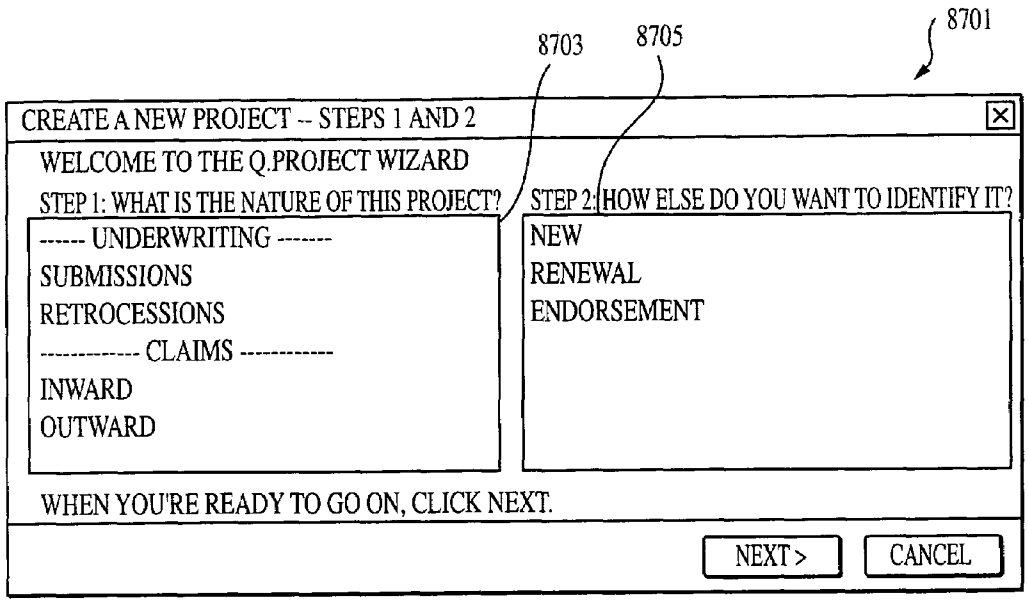

FIG. 87 illustrates an example user interface showing initial steps in creation of a new project, according to one or more embodiments of the present invention.

Figure 88:
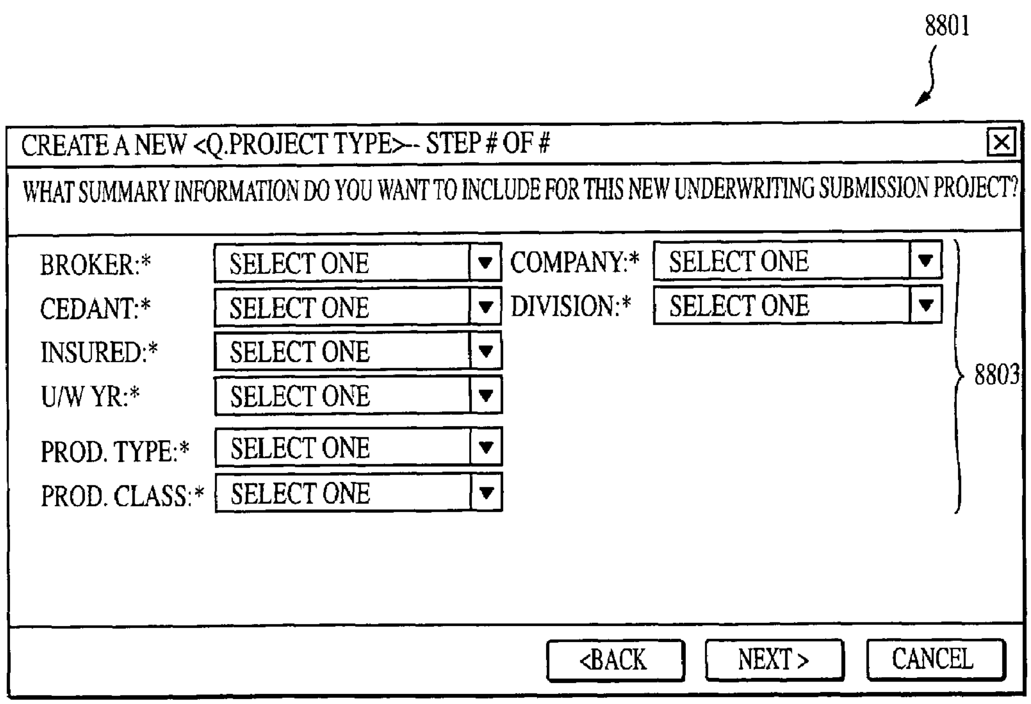

FIG. 88 illustrates an example user interface showing collection of summary information for the new project, according to one or more embodiments of the present invention.

Figure 89:
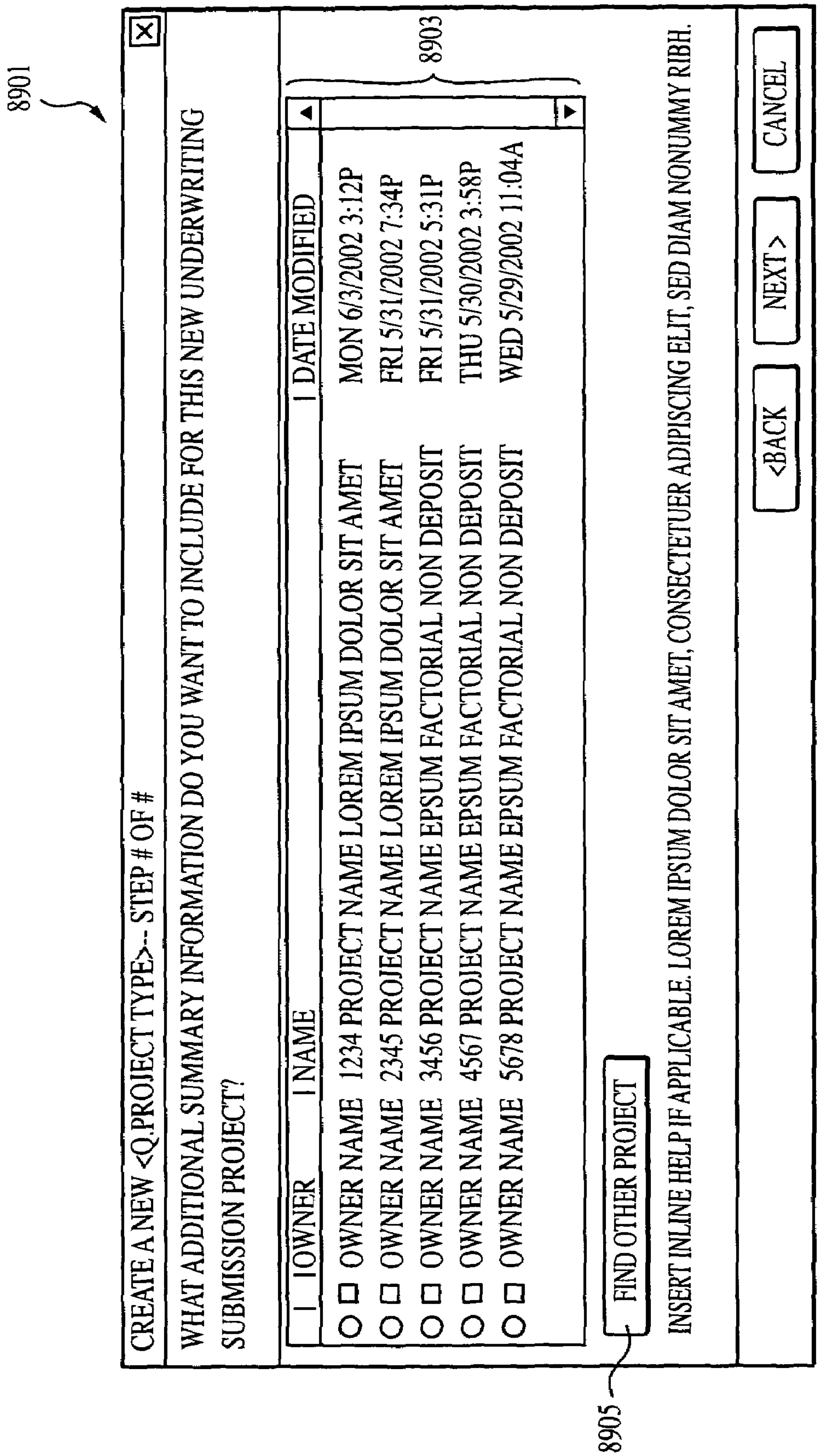

FIG. 89 illustrates an example user interface showing collection of first additional summary information for the new project, according to one or more embodiments of the present invention.

Figure 90:
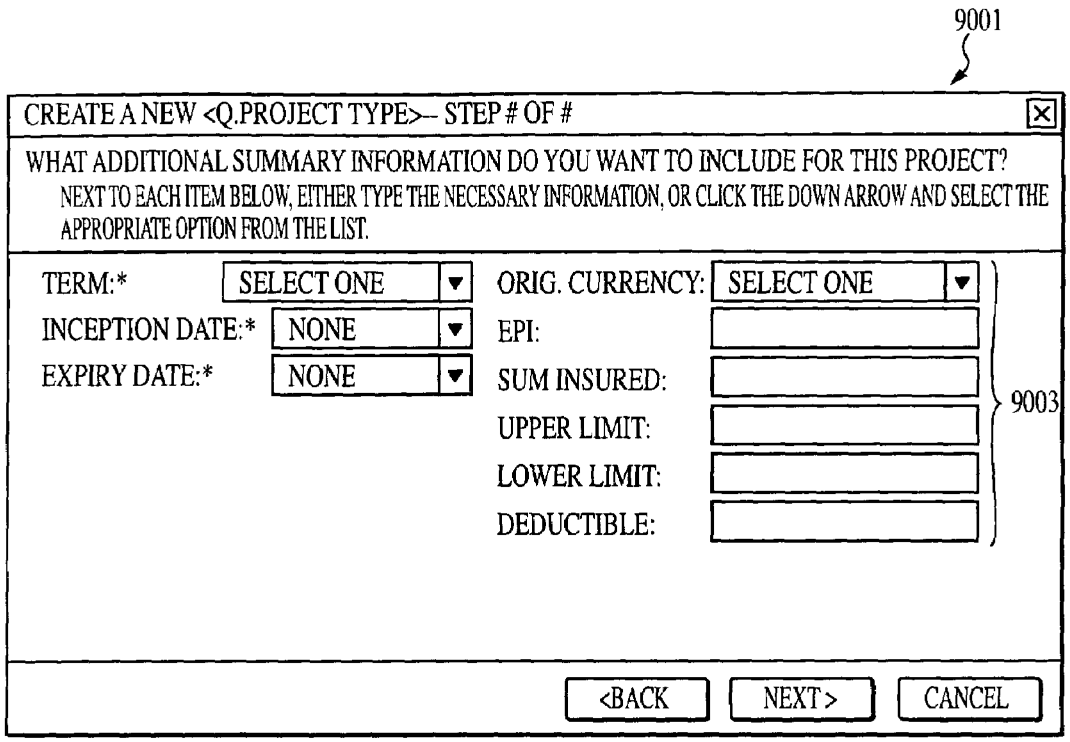

FIG. 90 illustrates an example user interface showing collection of second addition summary information for the new project, according to one or more embodiments of the present invention.

Figure 91:
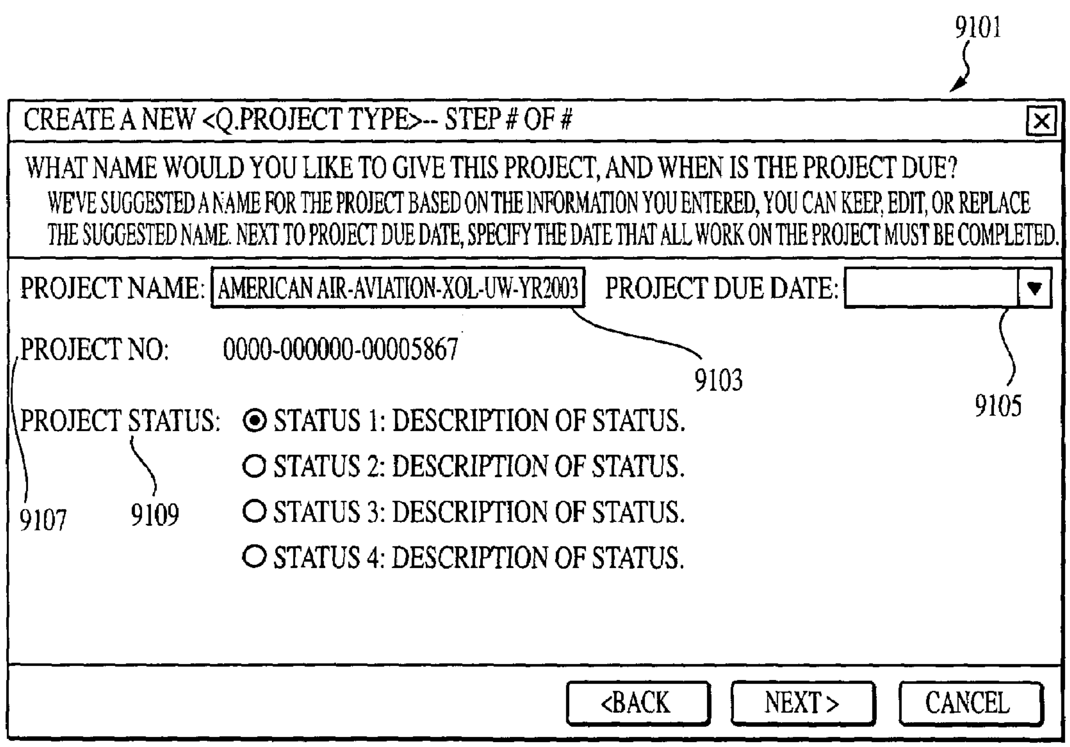

FIG. 91 illustrates an example user interface for assigning a name, due date, project, number, and status for the new project, according to one or more embodiments of the present invention.

Figure 92:
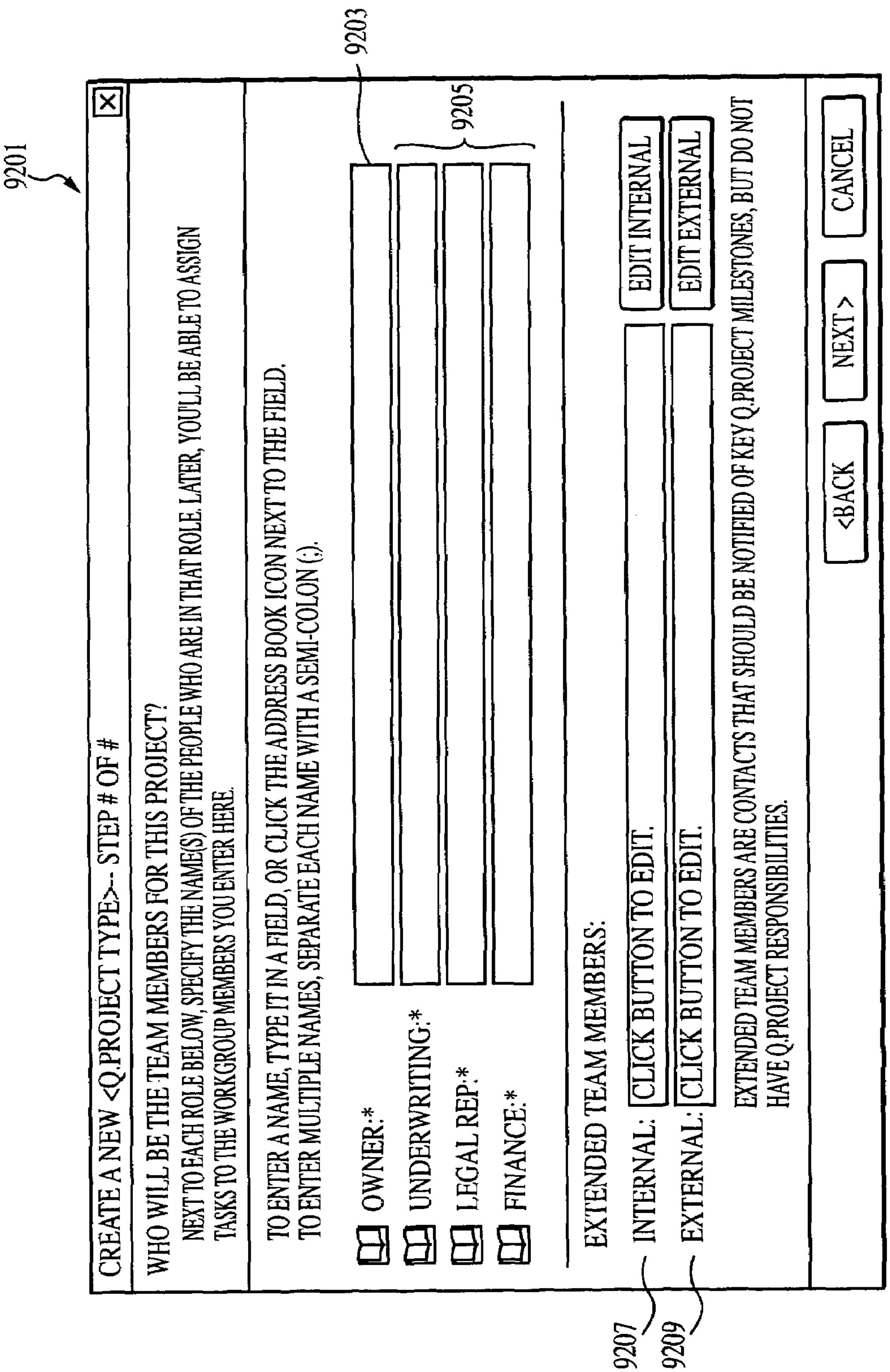

FIG. 92 illustrates an example user interface for assigning team members for the new project, according to one or more embodiments of the present invention.

Figure 93:
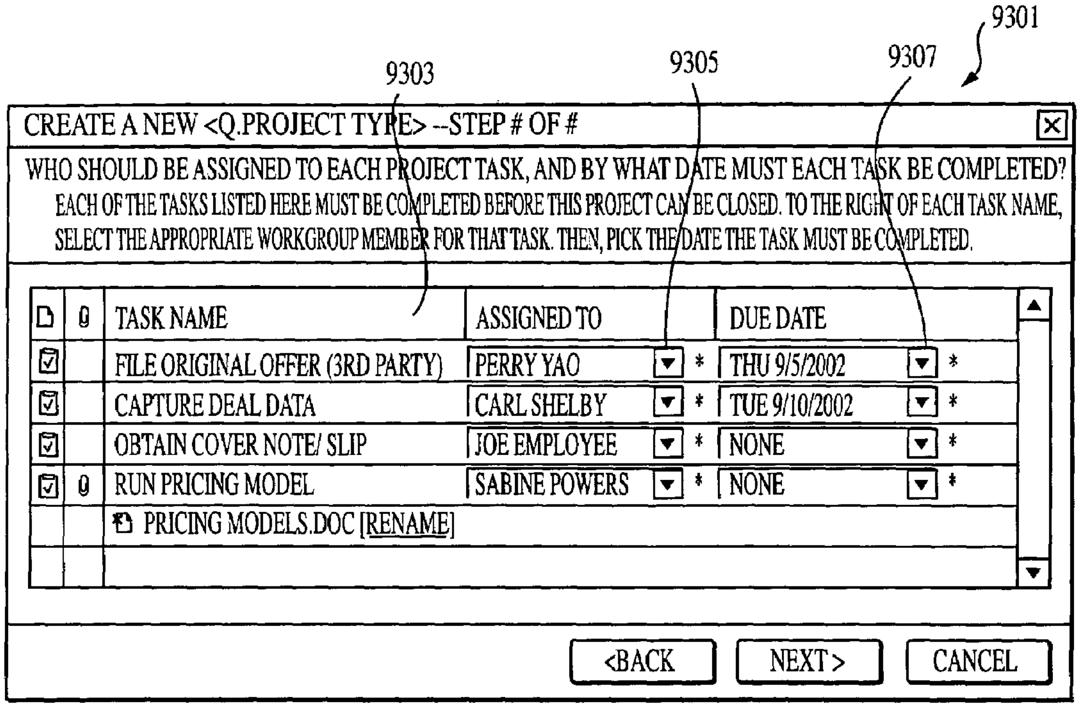

FIG. 93 illustrates an example user interface for assigning project tasks and due dates to team members, according to one or more embodiments of the present invention.

Figure 94:
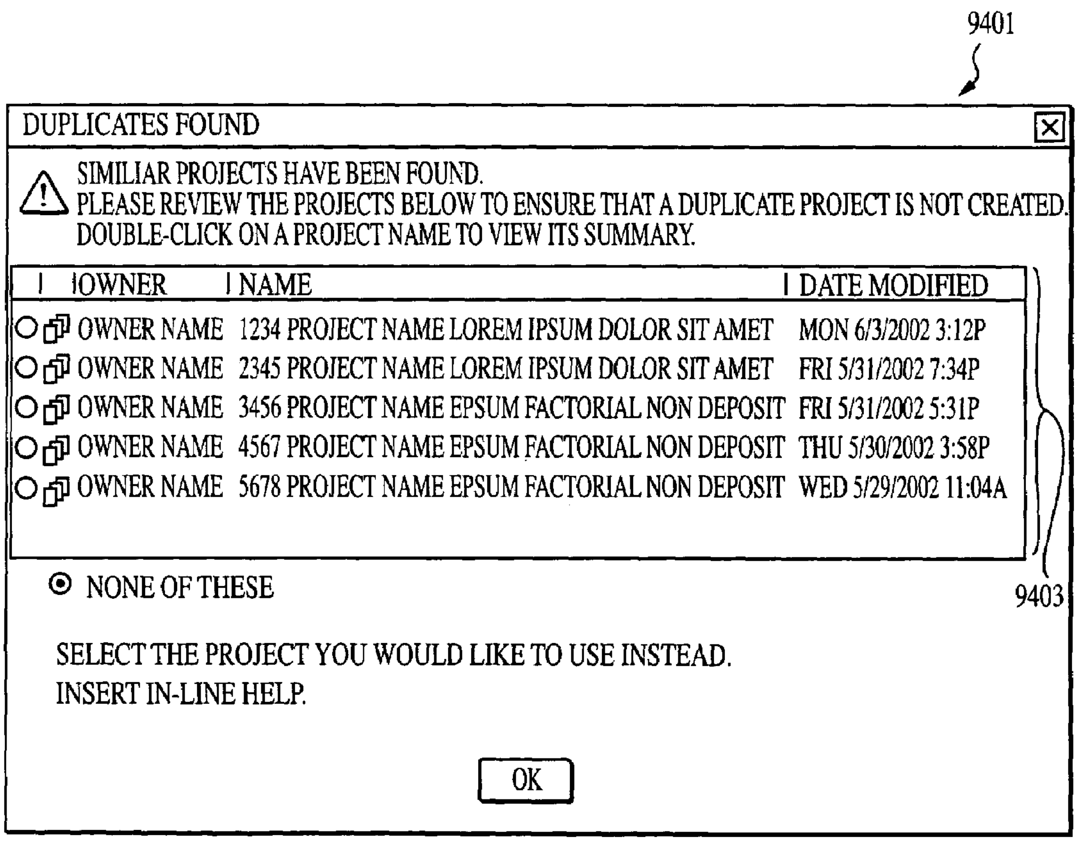

FIG. 94 illustrates an example user interface notifying the user of similar projects according to one or more embodiments of the present invention.

Figure 95:
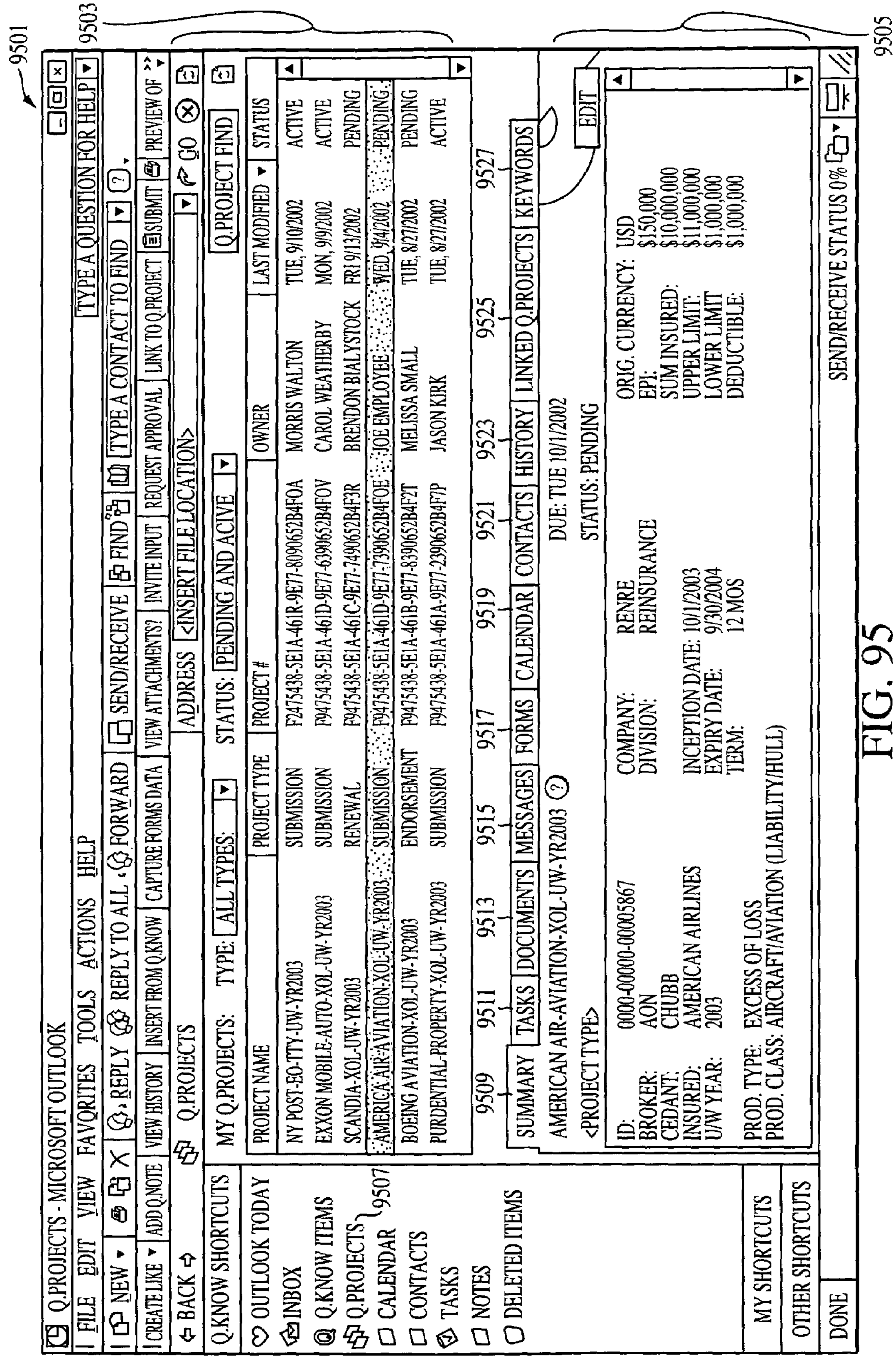

FIG. 95 illustrates an example user interface showing a project retrieved through a project search, via Outlook interface, according to one or more embodiments of the present invention.

Figure 96:
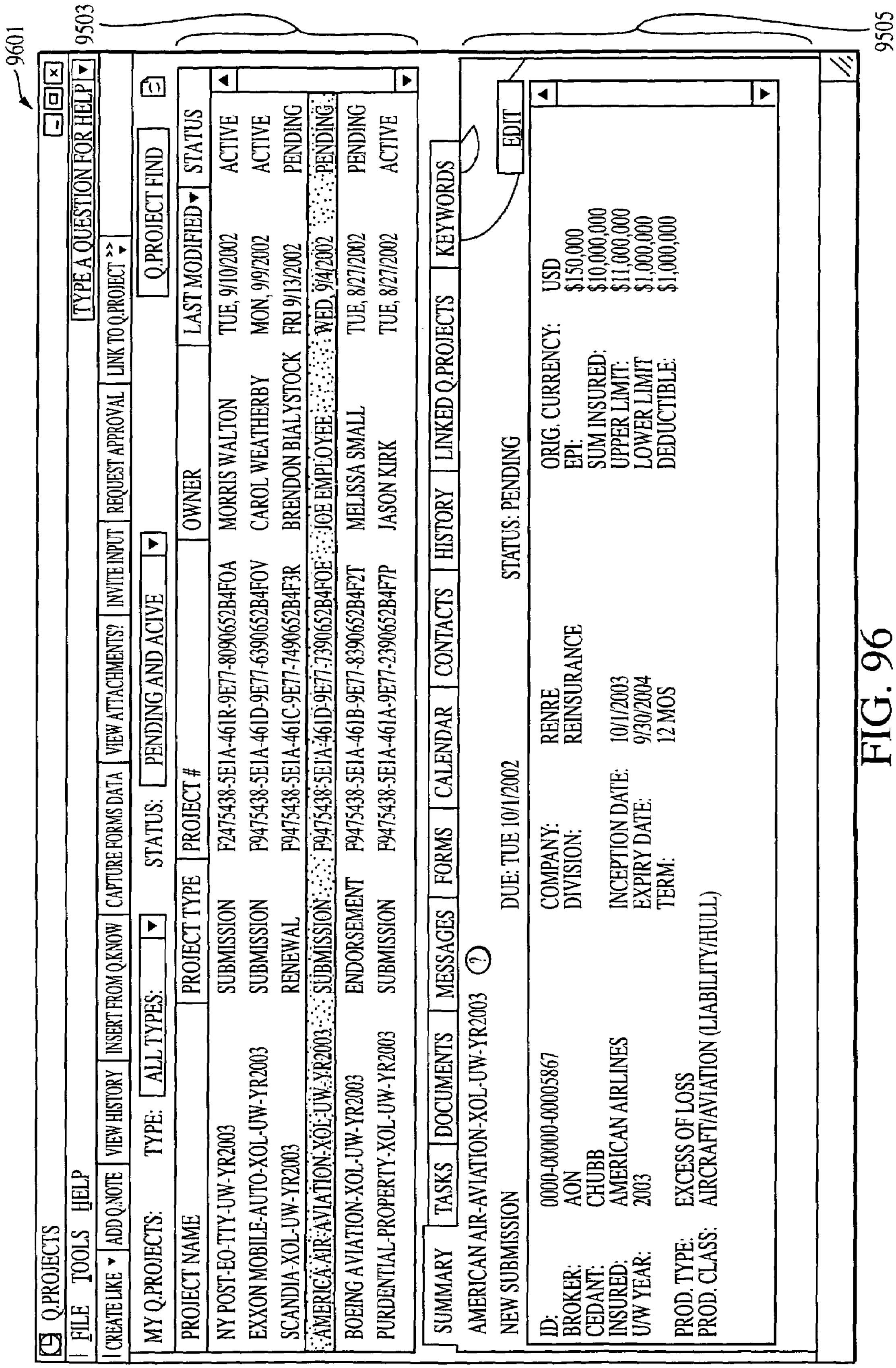

FIG. 96 illustrates an example user interface showing a retrieved project, according to one or more embodiments of the present invention.

Figure 97:
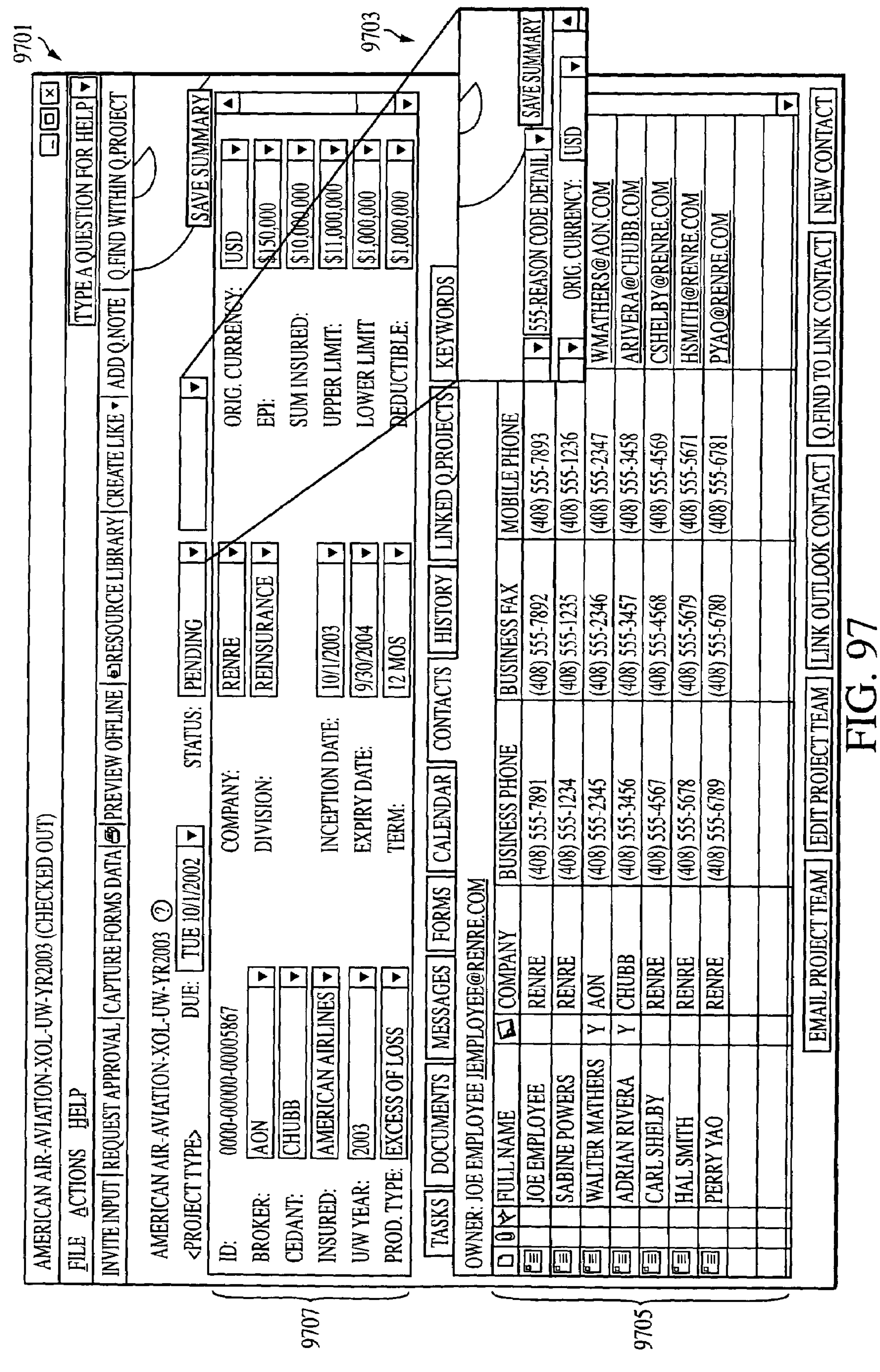

FIG. 97 illustrates an example user interface showing a project, with summary of associated contacts, according to one or more embodiments of the present invention.

Figure 98:
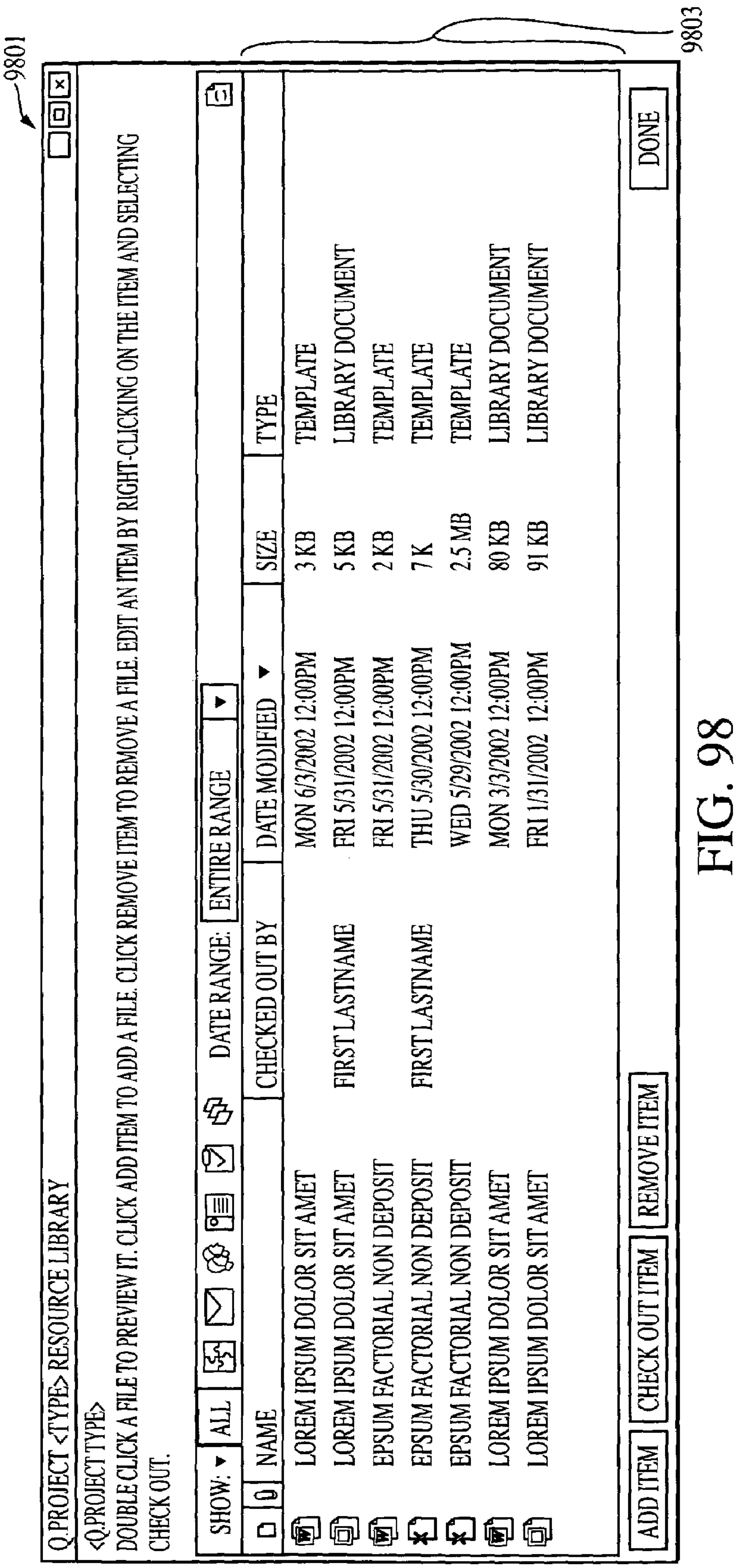

FIG. 98 illustrates an example user interface showing a resource library, according to one or more embodiments of the present invention.

Figure 99:
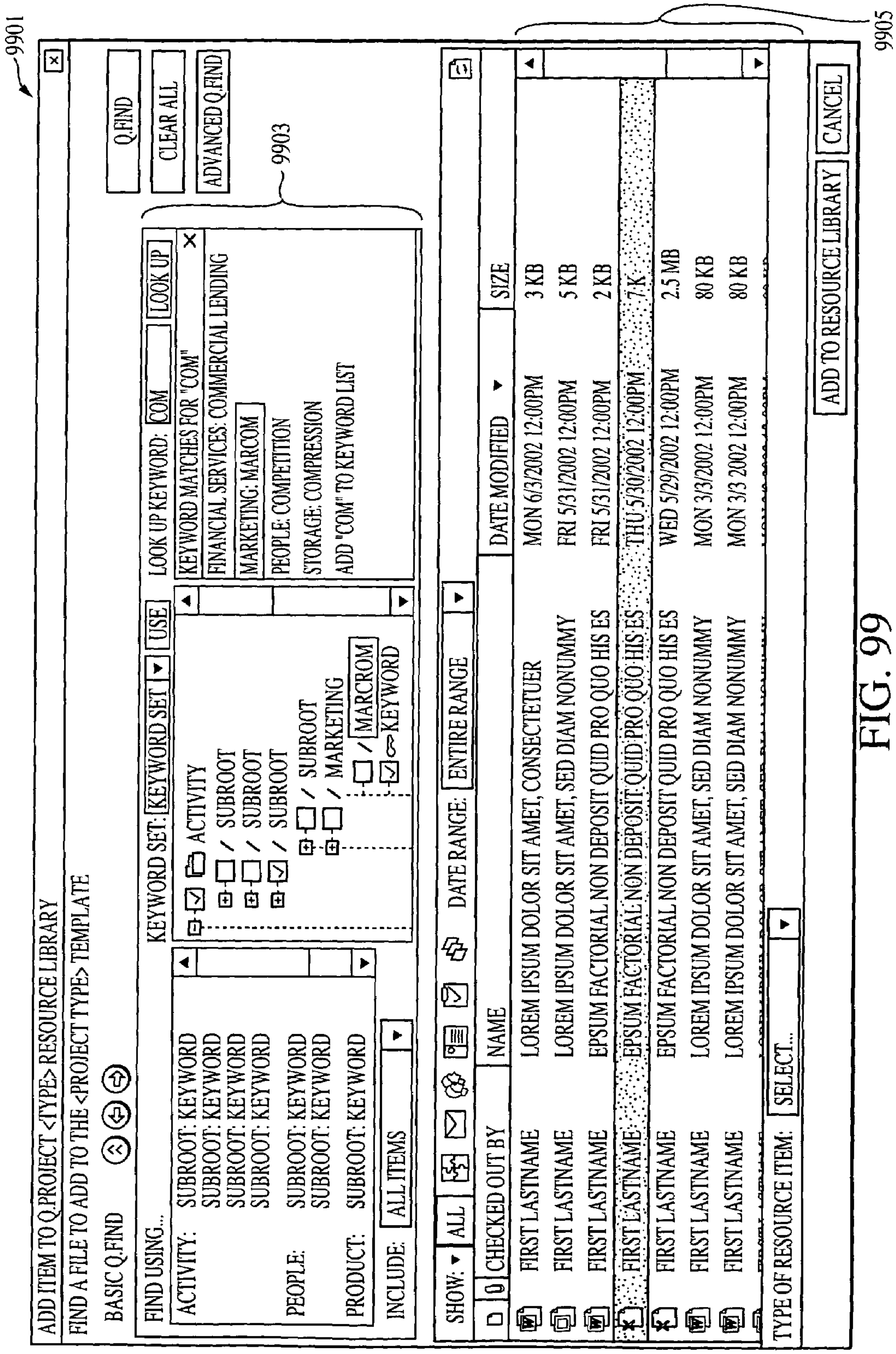

FIG. 99 illustrates an example user interface showing the addition of an item to the resource library, according to one or more embodiments of the present invention.

Figure 100:
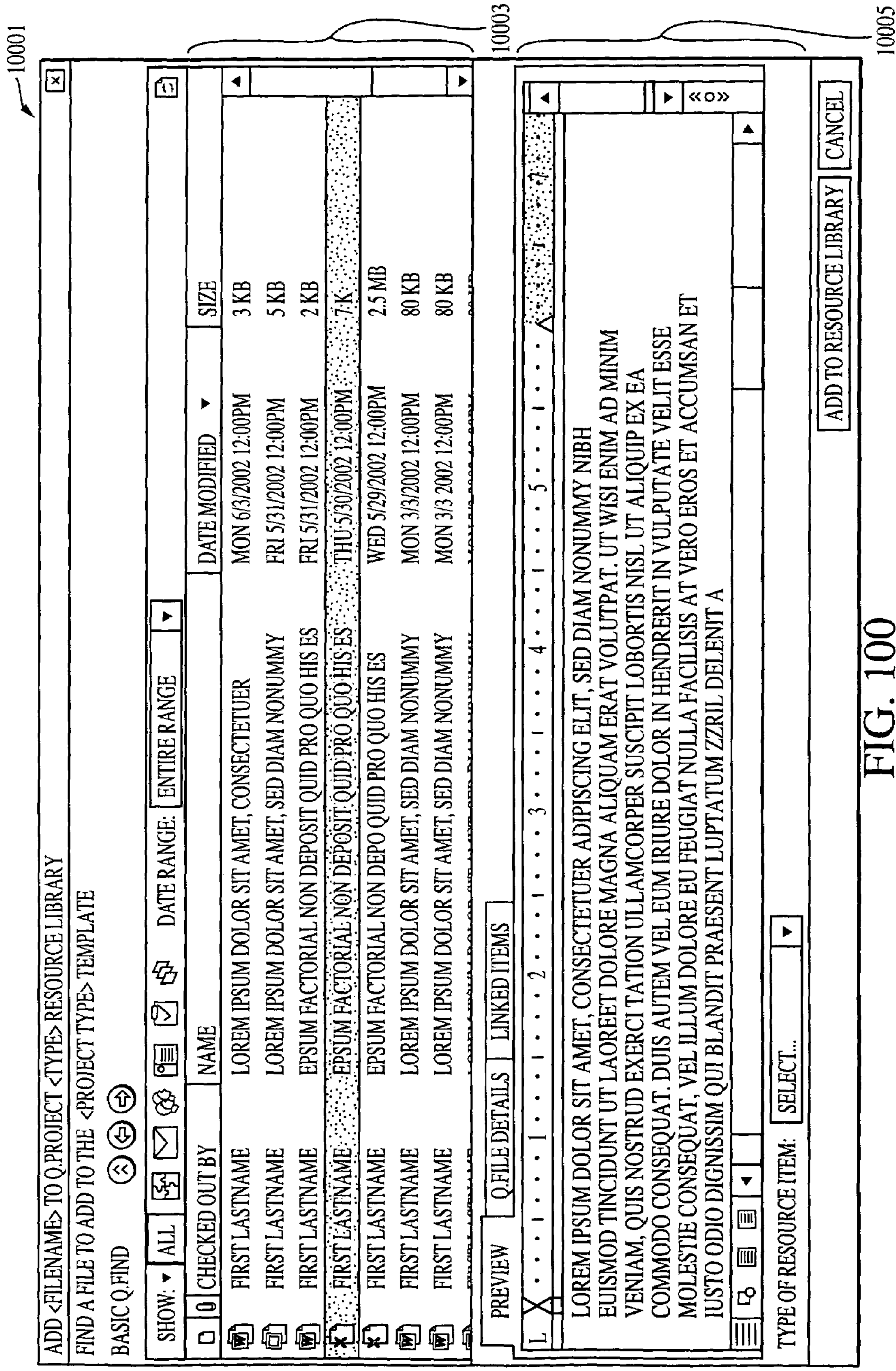

FIG. 100 illustrates an example user interface for listing and selecting an item to be added to the resource library, according to one or more embodiments of the present invention.

Figure 101:
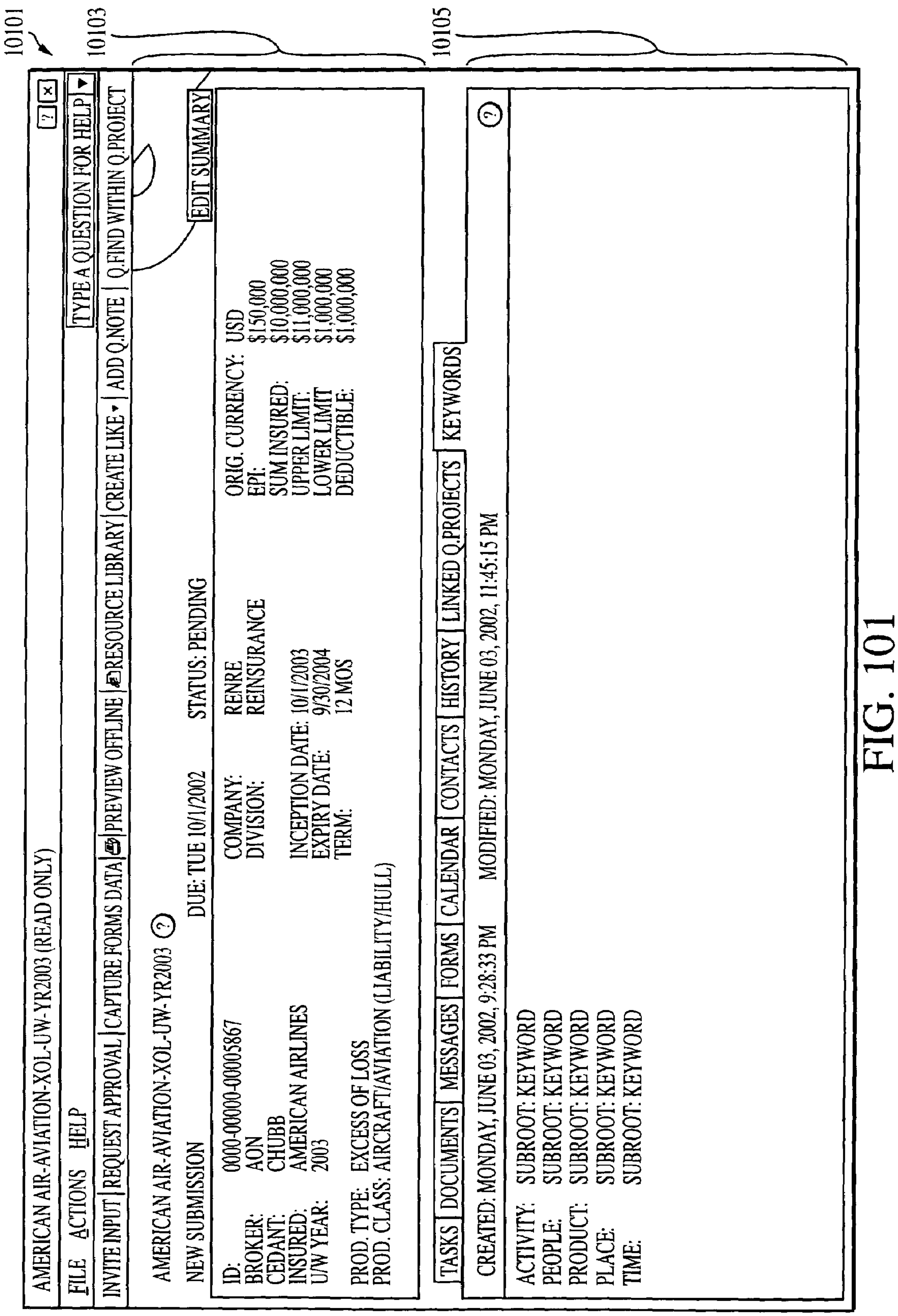

FIG. 101 illustrates an example user interface listing the keywords assigned to the classes for the selected project, according to one or more embodiments of the present invention.

Figure 102:
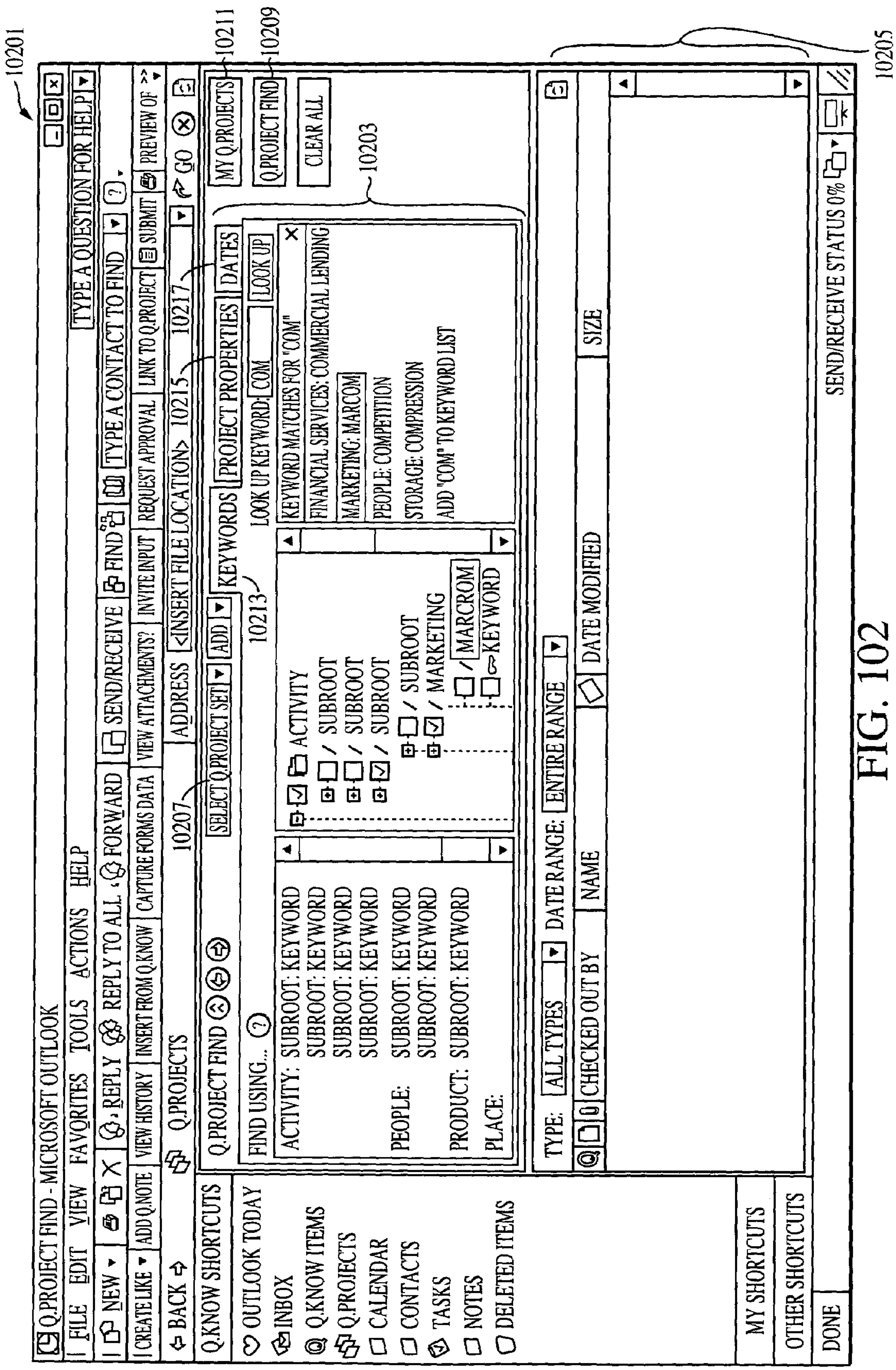

FIG. 102 illustrates an example user interface showing specification of keywords for classes for locating a candidate project or project set, according to one or more embodiments of the present invention.

Figure 103:
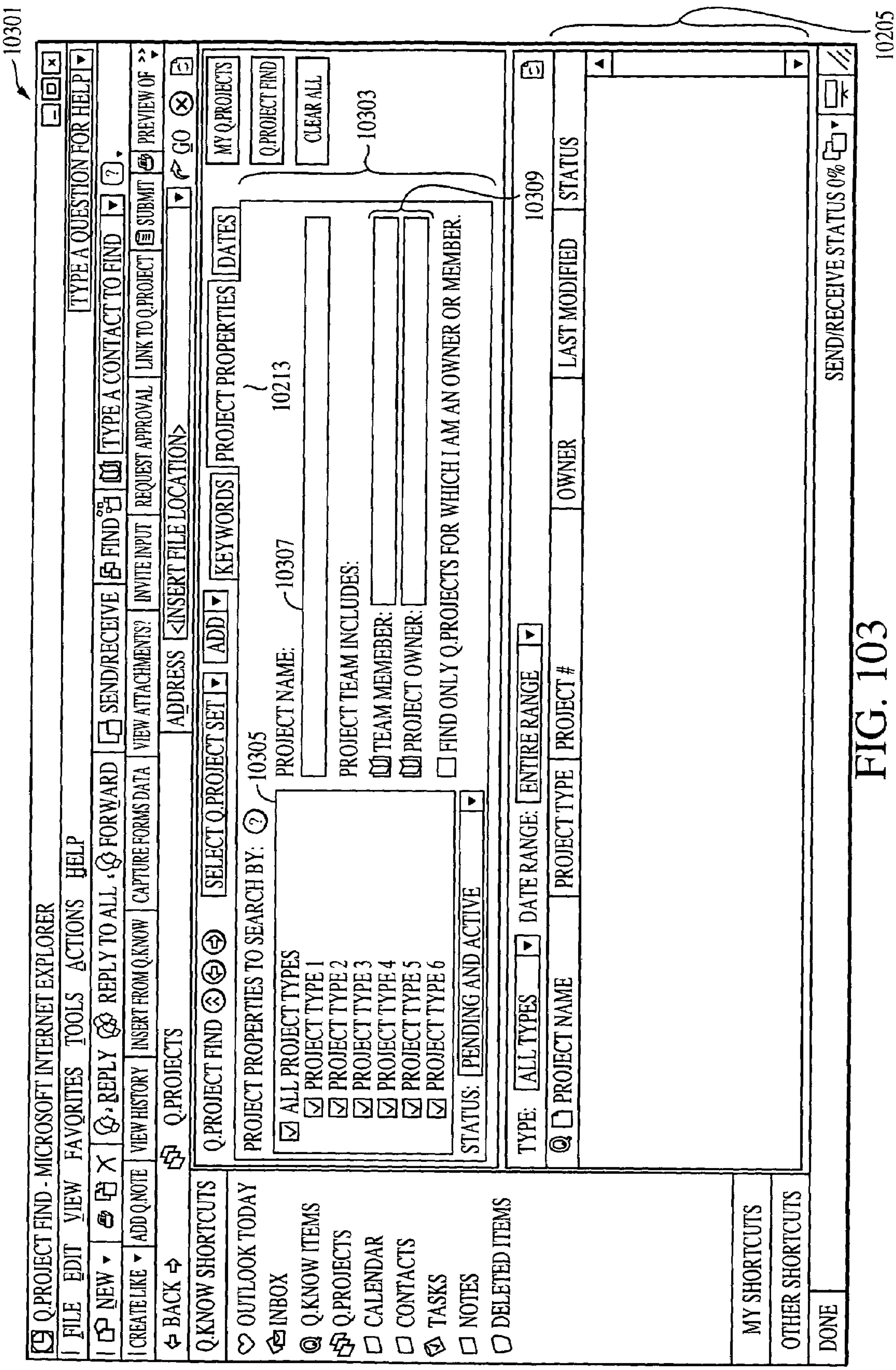

FIG. 103 illustrates an example user interface showing specification of project properties for locating a candidate project or project set, according to one or more embodiments of the present invention.

Figure 104:
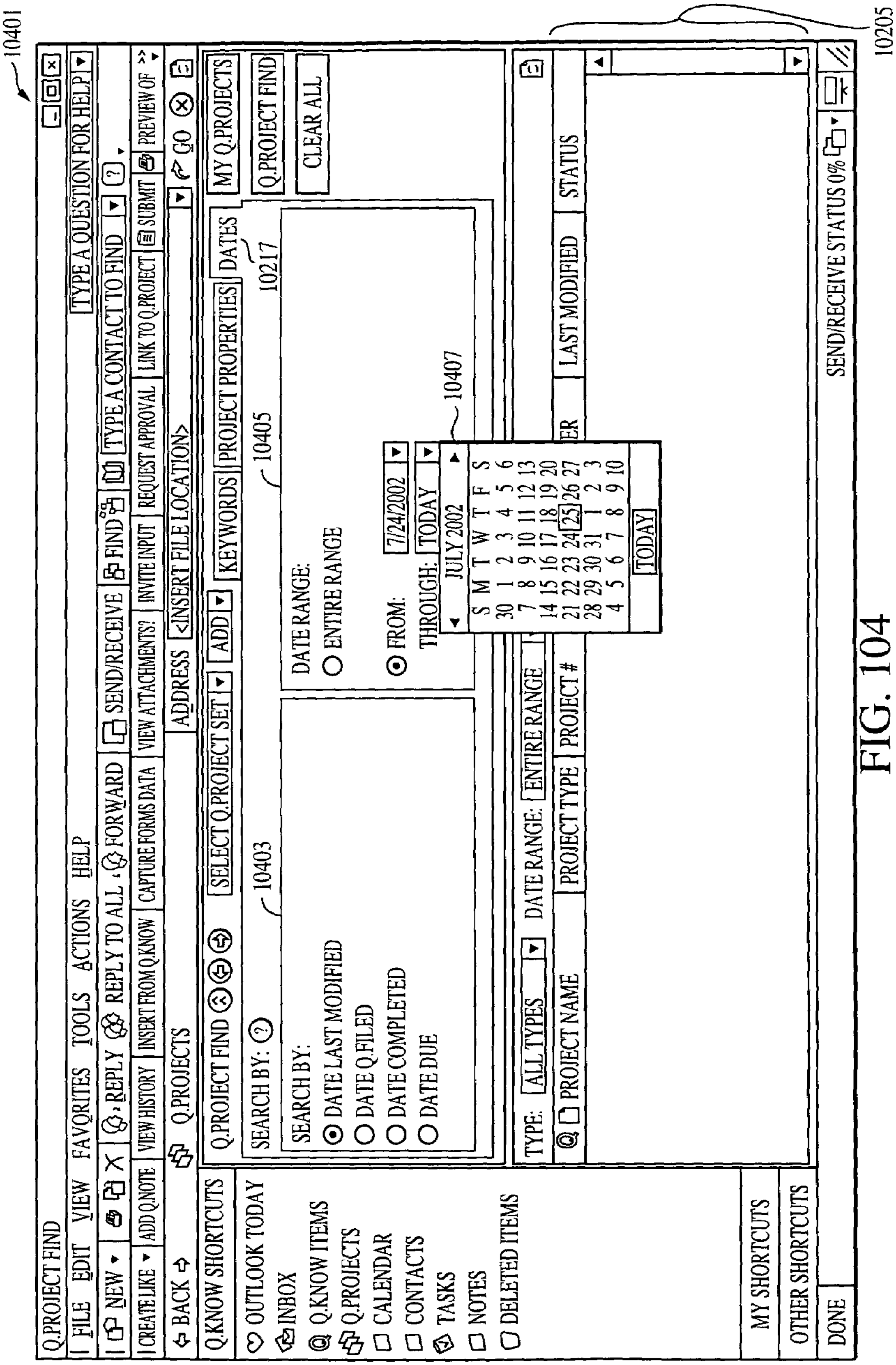

FIG. 104 illustrates an example user interface showing specification of date characteristics for locating a candidate project or project set, according to one or more embodiments of the present invention.

Figure 105:
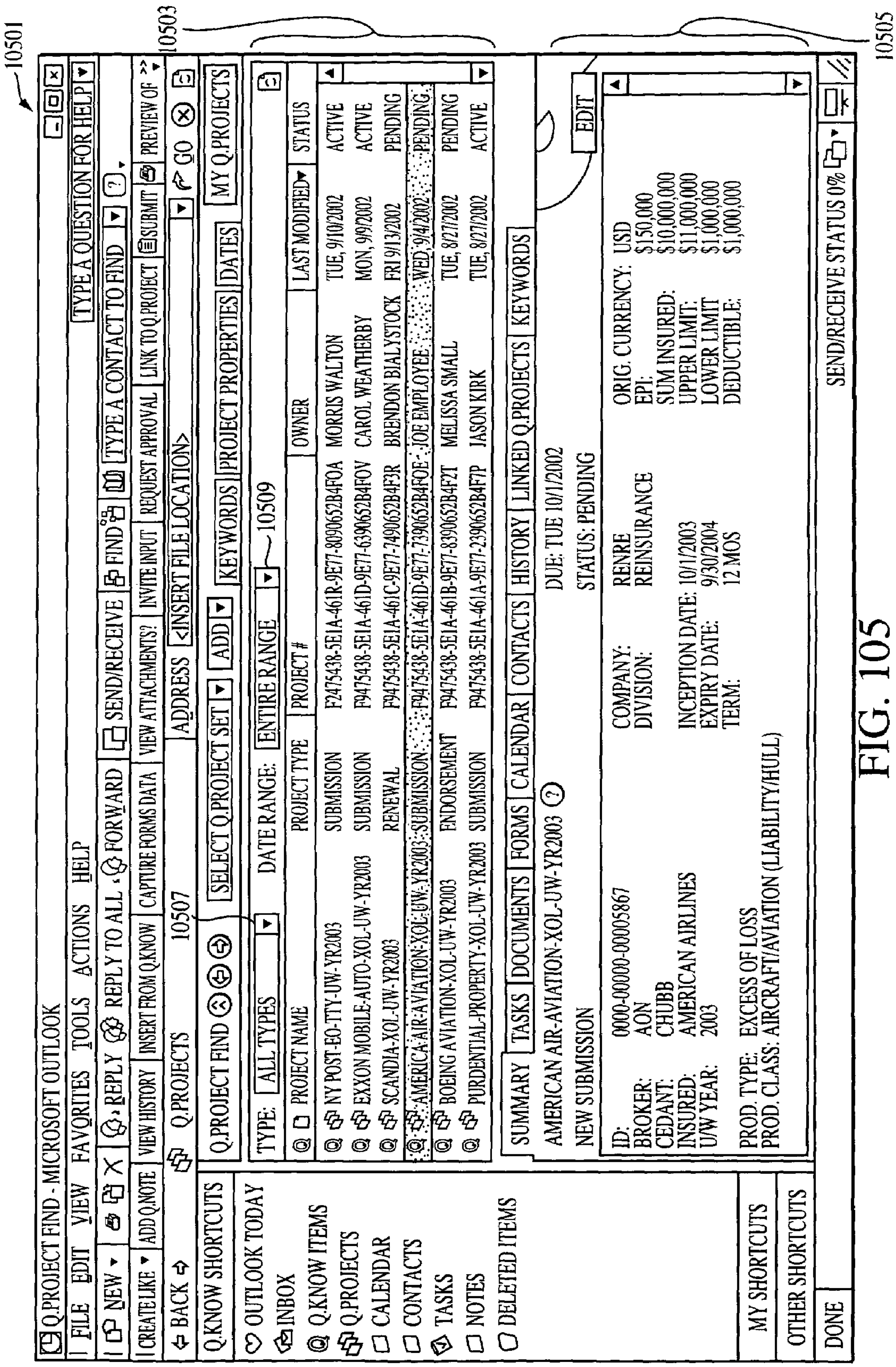

FIG. 105 illustrates an example user interface showing a listing of located candidate projects, according to one or more embodiments of the present invention.

Figure 106:
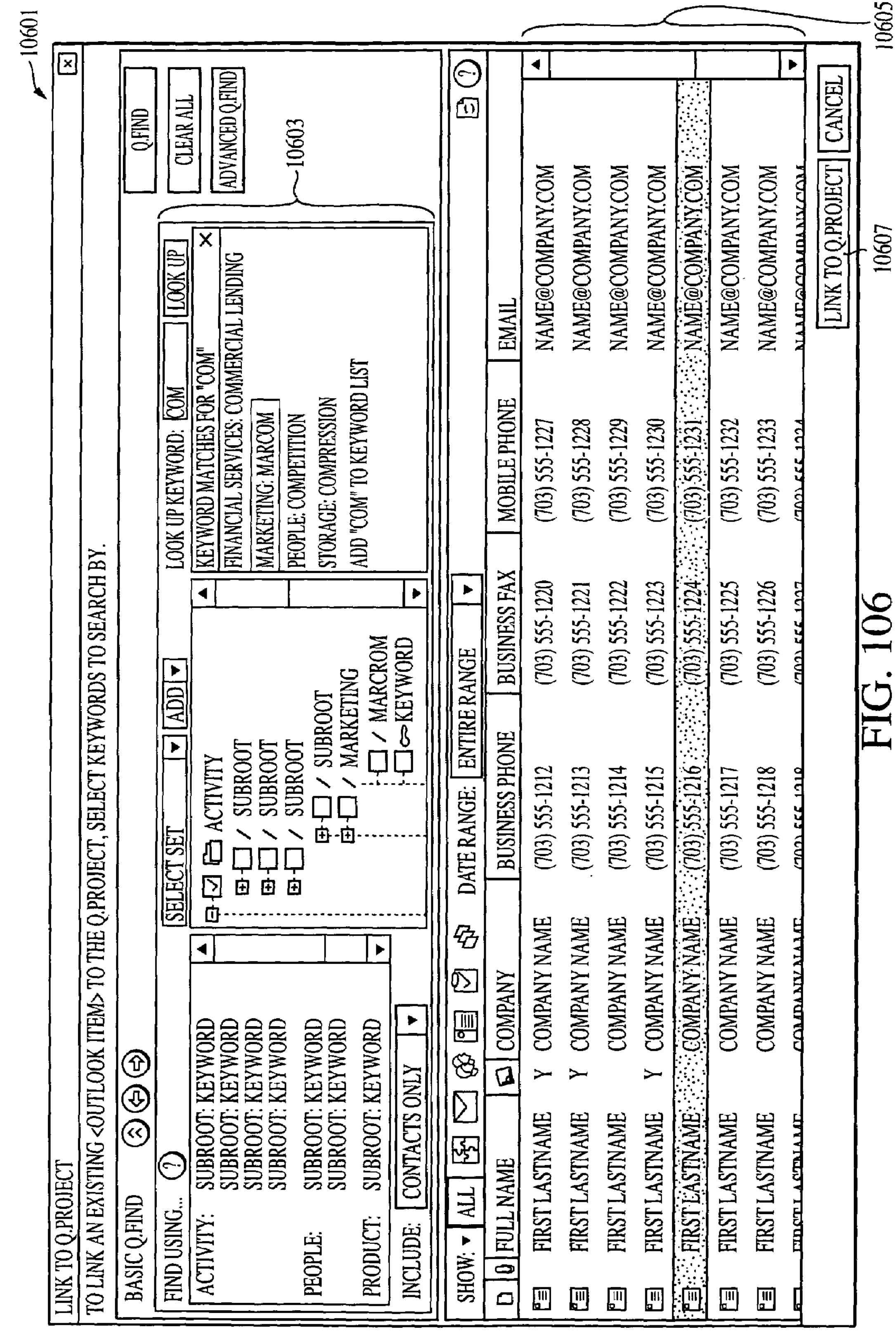

FIG. 106 illustrates an example user interface showing specification of search criteria for filed items, to be located as candidates for linking to a project, according to one or more embodiments of the present invention.

Figure 107:
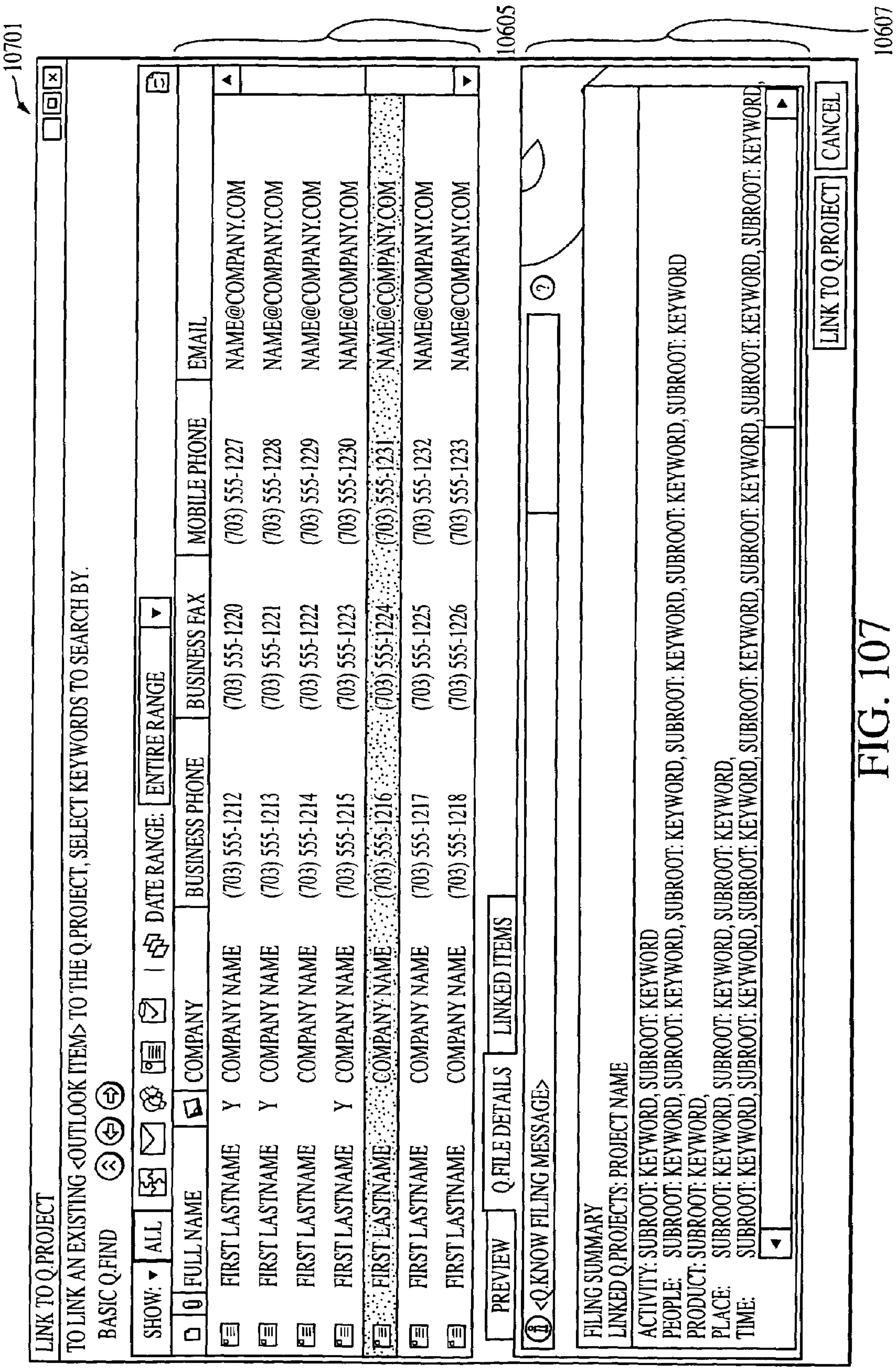

FIG. 107 illustrates an example user interface showing a listing of located non-filed items as candidates for linking to a project, according to one or more embodiments of the present invention.

Figure 108:
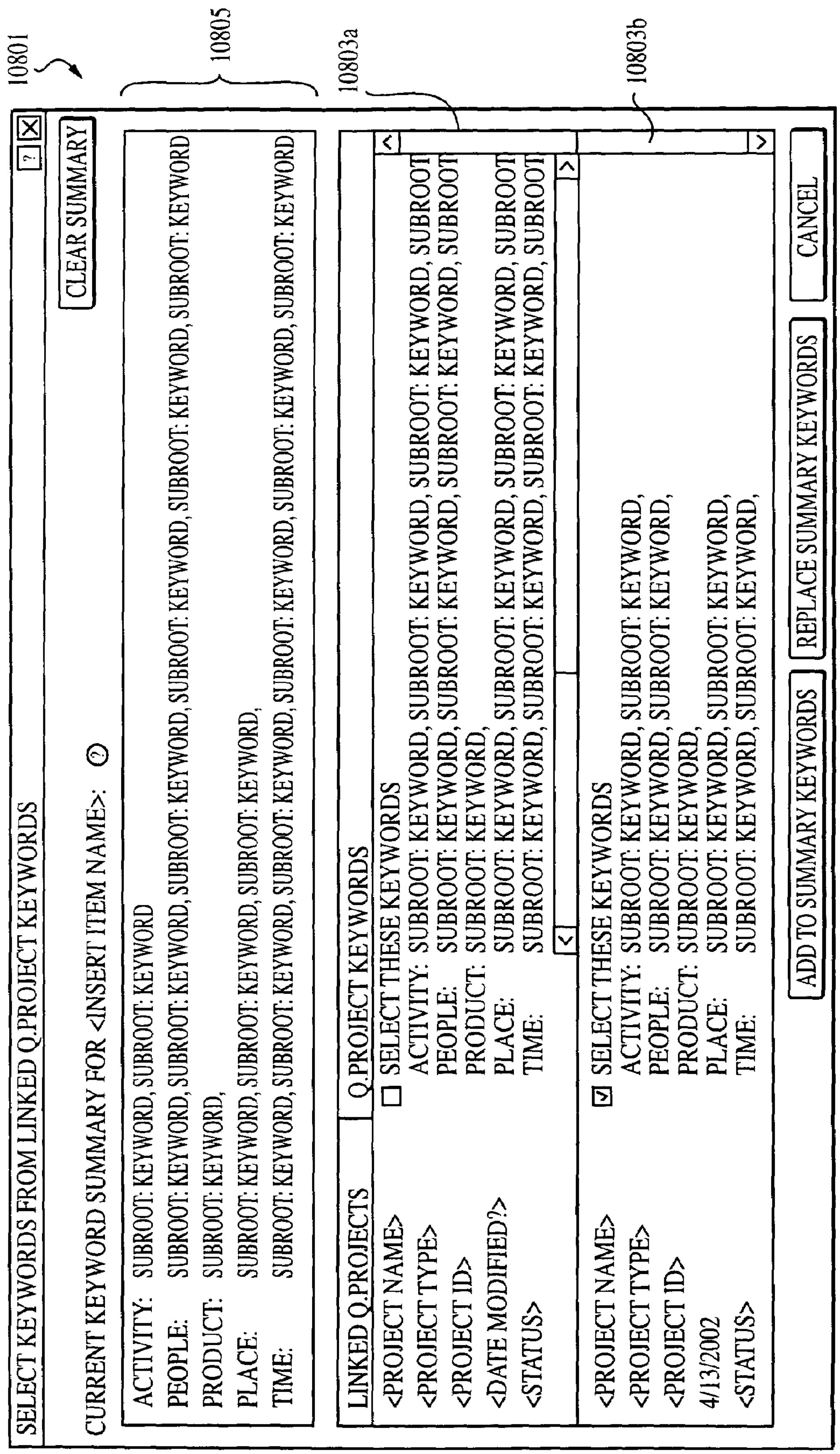

FIG. 108 illustrates an example user interface showing a selection of keywords from keywords assigned to linked projects, according to one or more embodiments of the present invention.

Figure 109:
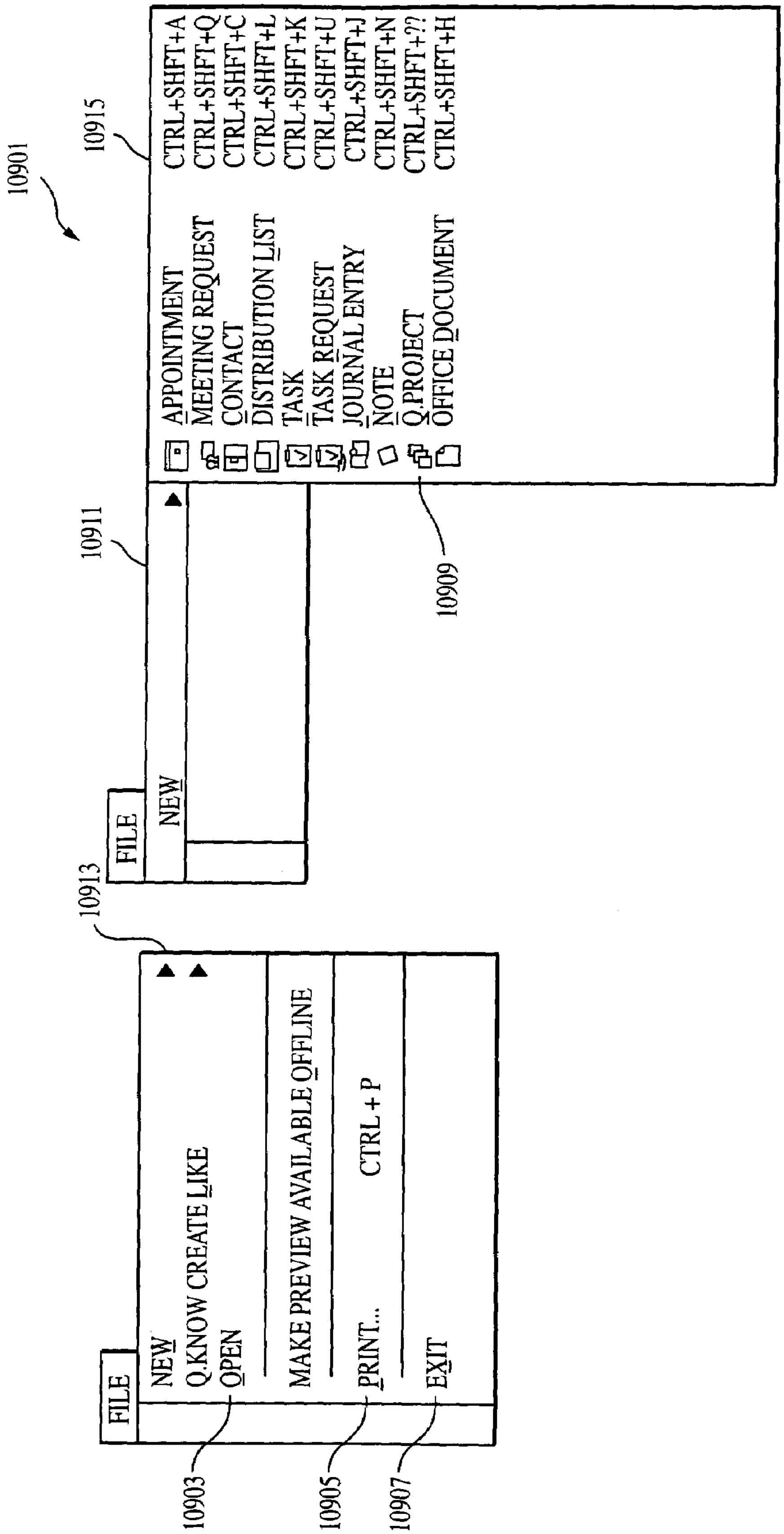

FIG. 109 illustrates an example user menu for opening an item in its native application and/or creating a new project, according to one or more embodiments of the present invention.

Figure 110:
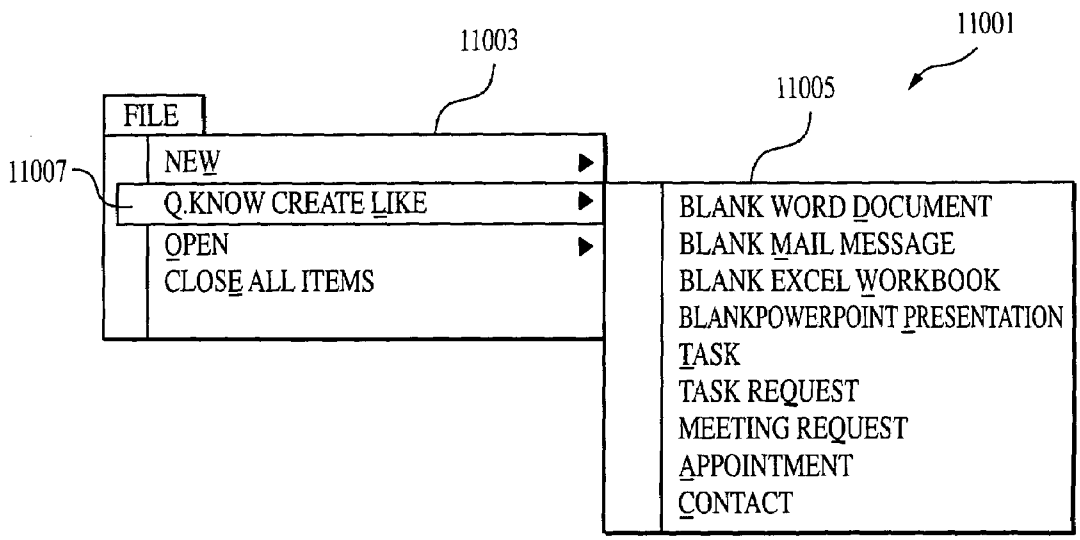

FIG. 110 illustrates an example user menu for creating a new item in its native application and utilizing classes and keywords from a selected item, according to one or more embodiments of the present invention.

Figure 111:
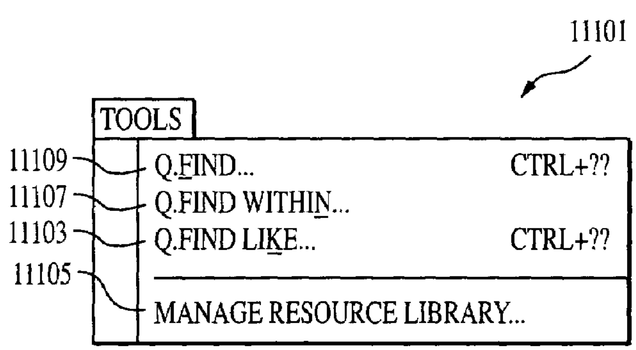

FIG. 111 illustrates an example user menu for selecting a different retrieval, according to one or more embodiments of the present invention.

Figure 112:
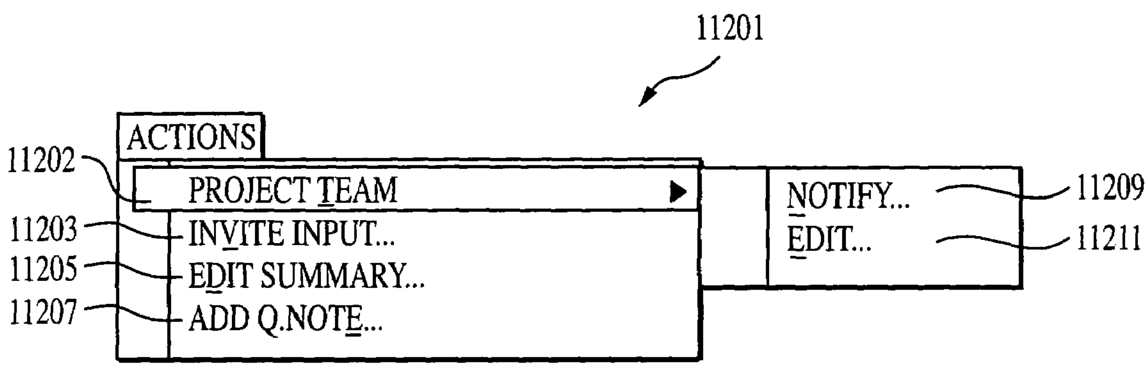

FIG. 112 illustrates an example user menu for acting on a team of users assigned to a project, according to one or more embodiments of the present invention.

Figure 113:
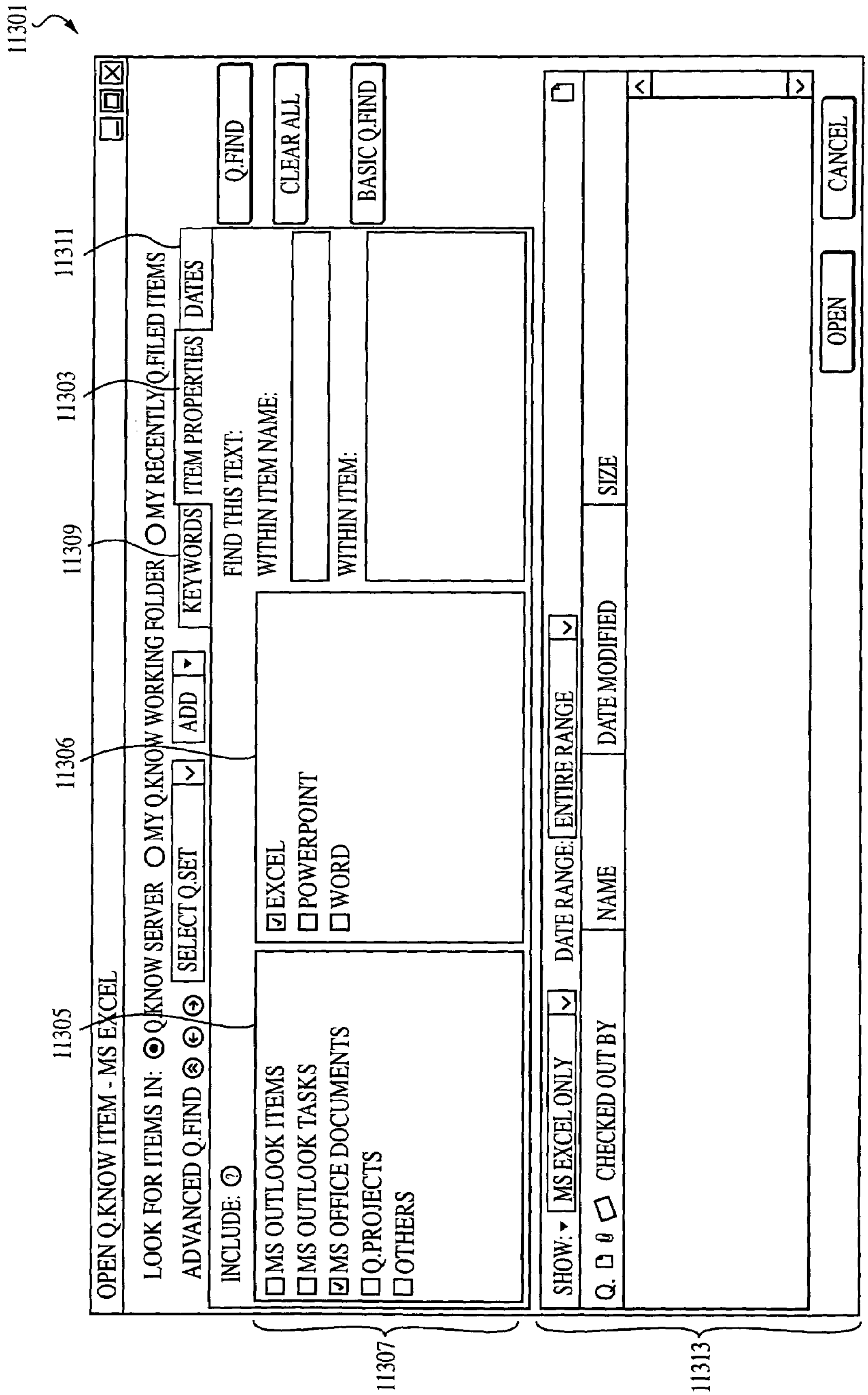

FIG. 113 illustrates an example user interface for use in locating items with specified item properties, according to one or more embodiments of the present invention.

Figure 114:
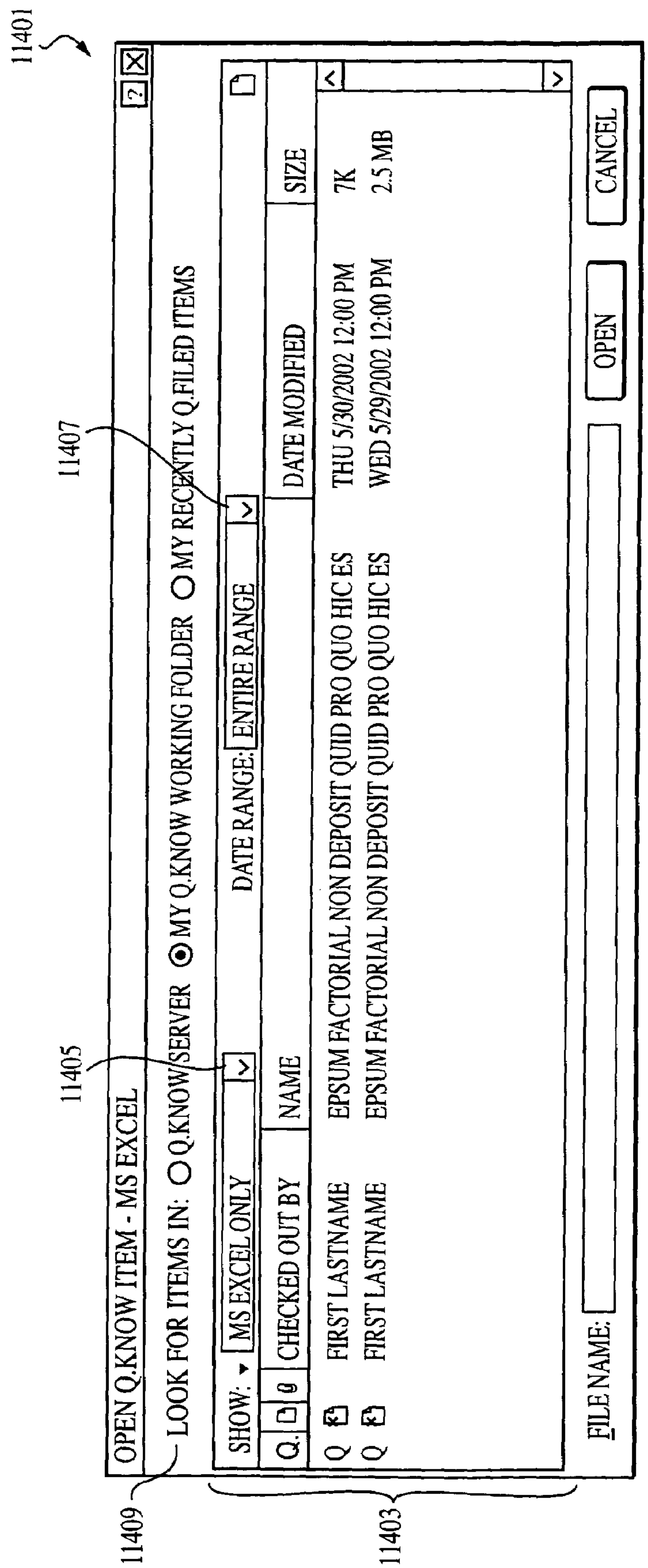

FIG. 114 illustrates an example user interface listing located items, for use in selecting an item to open, according to one or more embodiments of the present invention.

Figure 115:
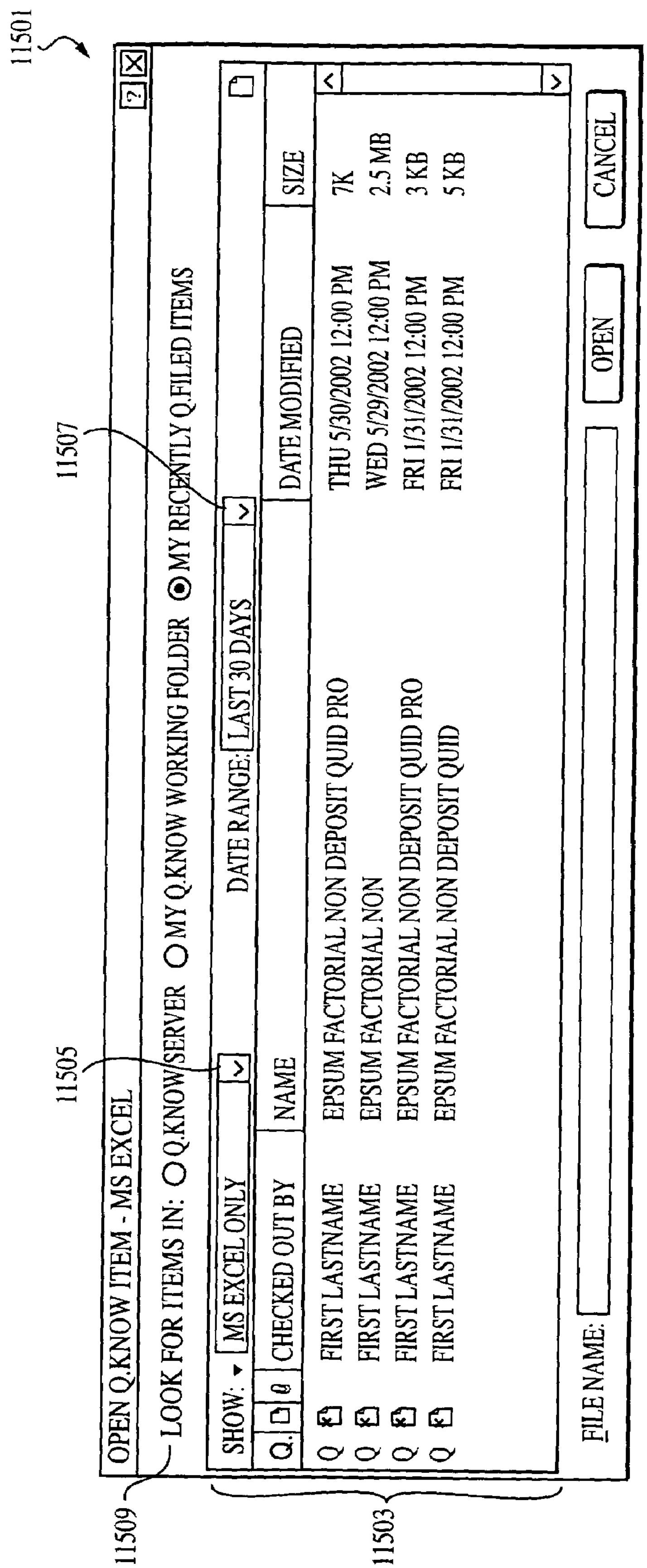

FIG. 115 illustrates another example user interface listing located items, for use in selecting an item to open, according to one or more embodiments of the present invention.

Figure 116:
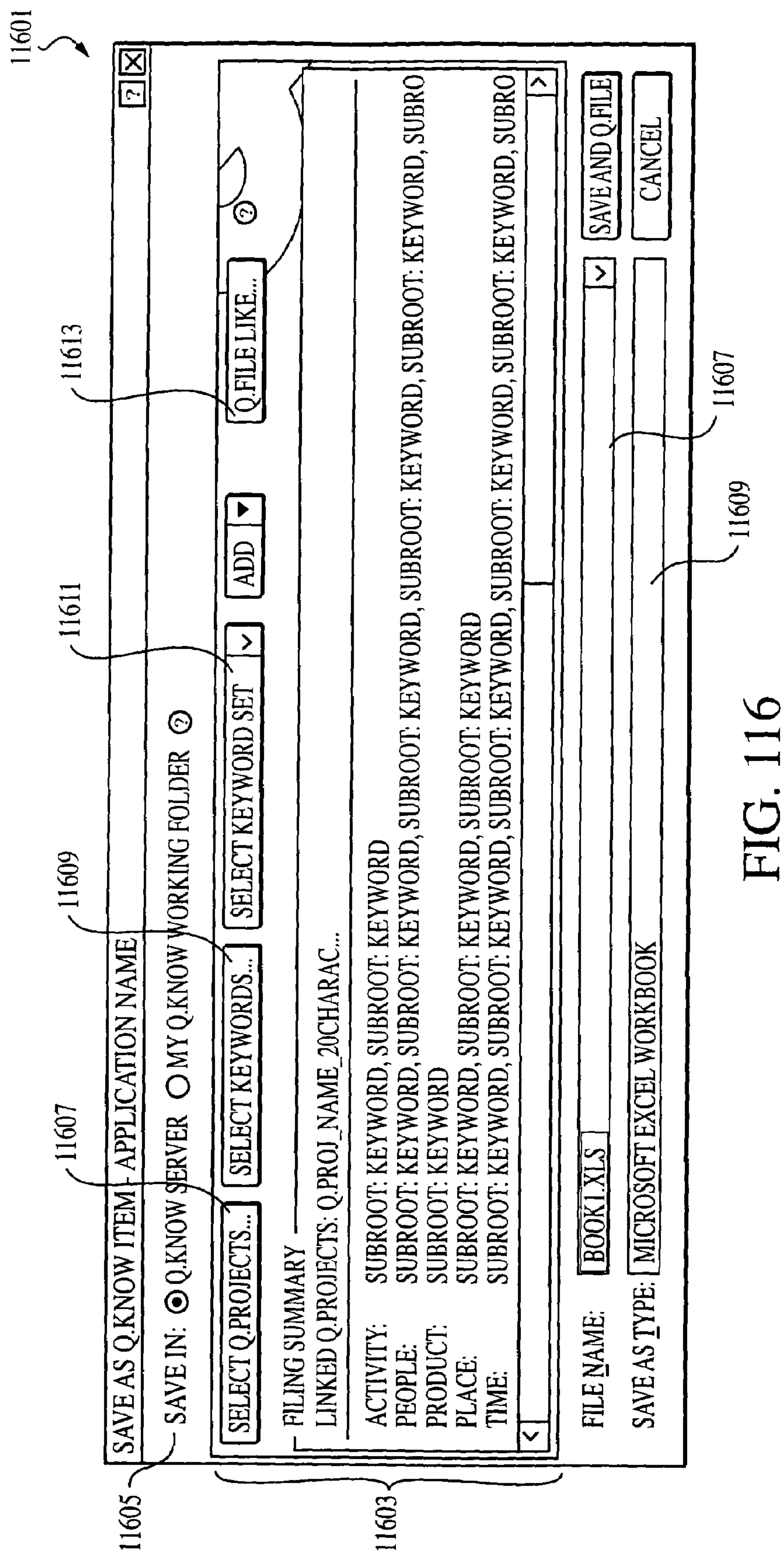

FIG. 116 illustrates an example user interface for listing a summary of the selected item and saving the selected item including selecting a project and keywords for classes to be associated with the selected item, according to one or more embodiments of the present invention.

Figure 117:
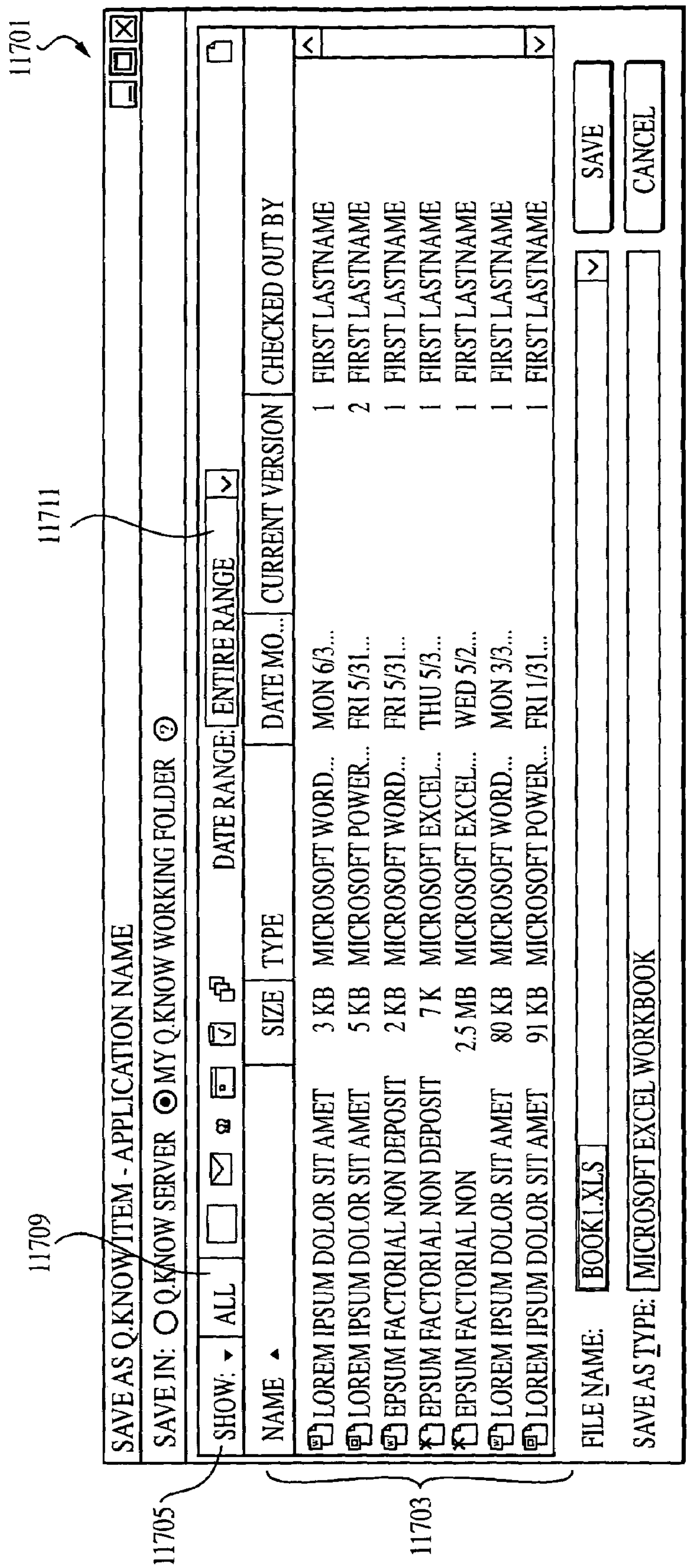

FIG. 117 illustrates an example user interface for listing items saved in the user's working folder, according to one or more embodiments of the present invention.

Figure 118:
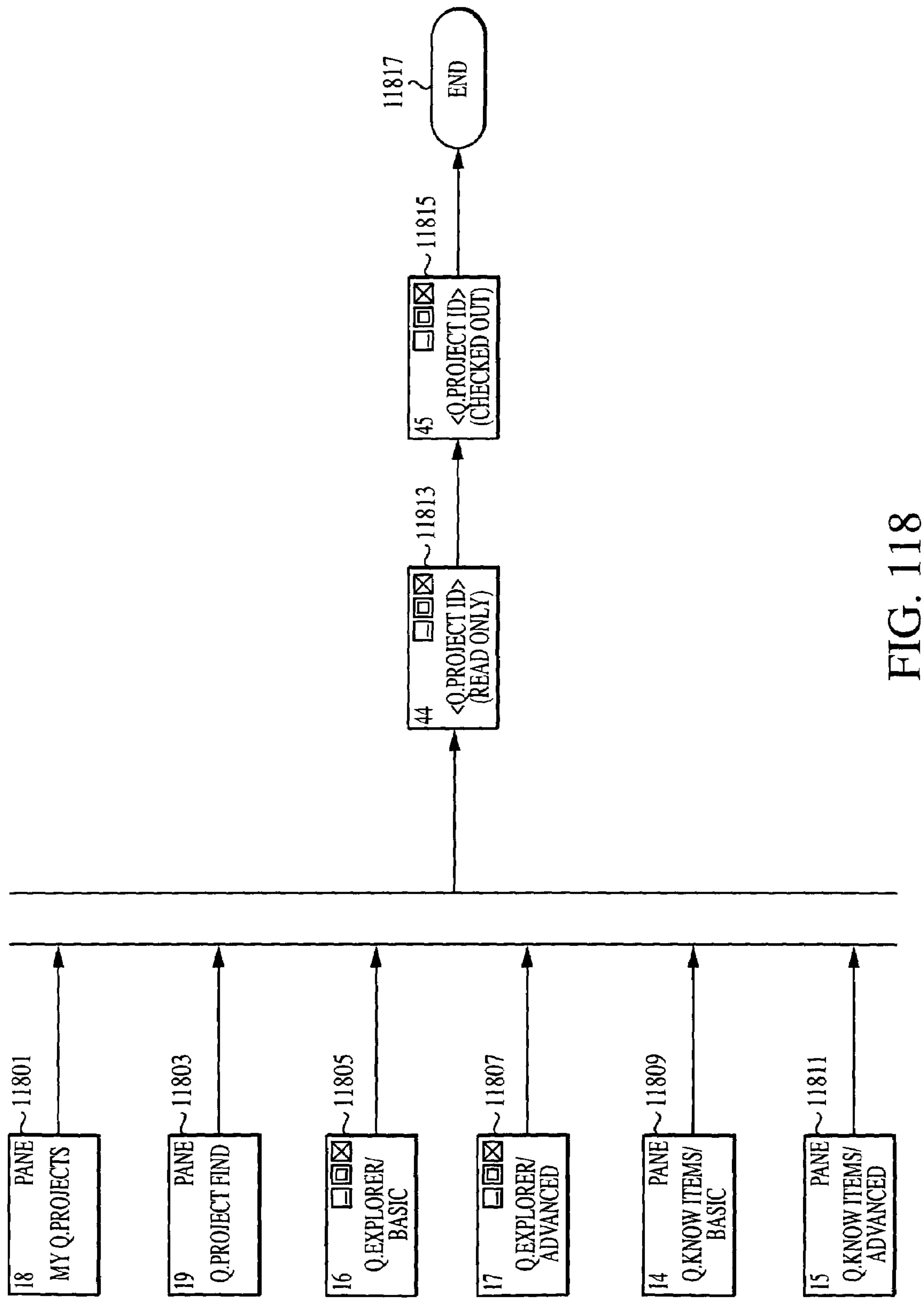

FIG. 118 is a flow chart illustrating a process for editing of a project summary, according to one or more embodiments of the present invention.

Figure 119:
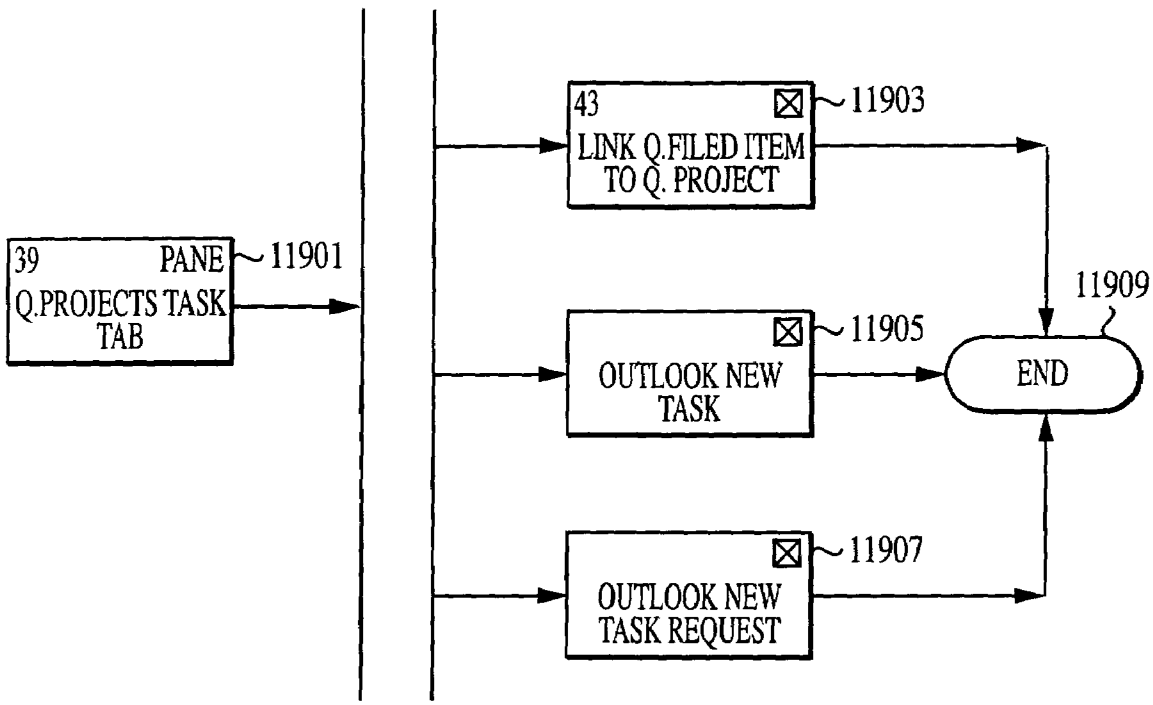

FIG. 119 illustrates a flow chart illustrating a process for linking a task to a project, according to one or more embodiments of the present invention.

Figure 120:
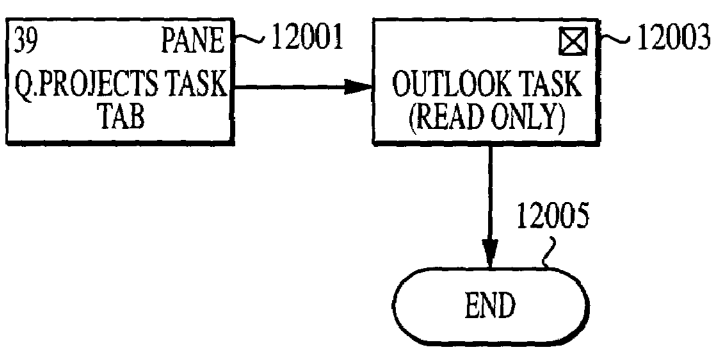

FIG. 120 illustrates a flow chart illustrating a process for viewing a task linked to a project, according to one or more embodiments of the present invention.

Figure 121:
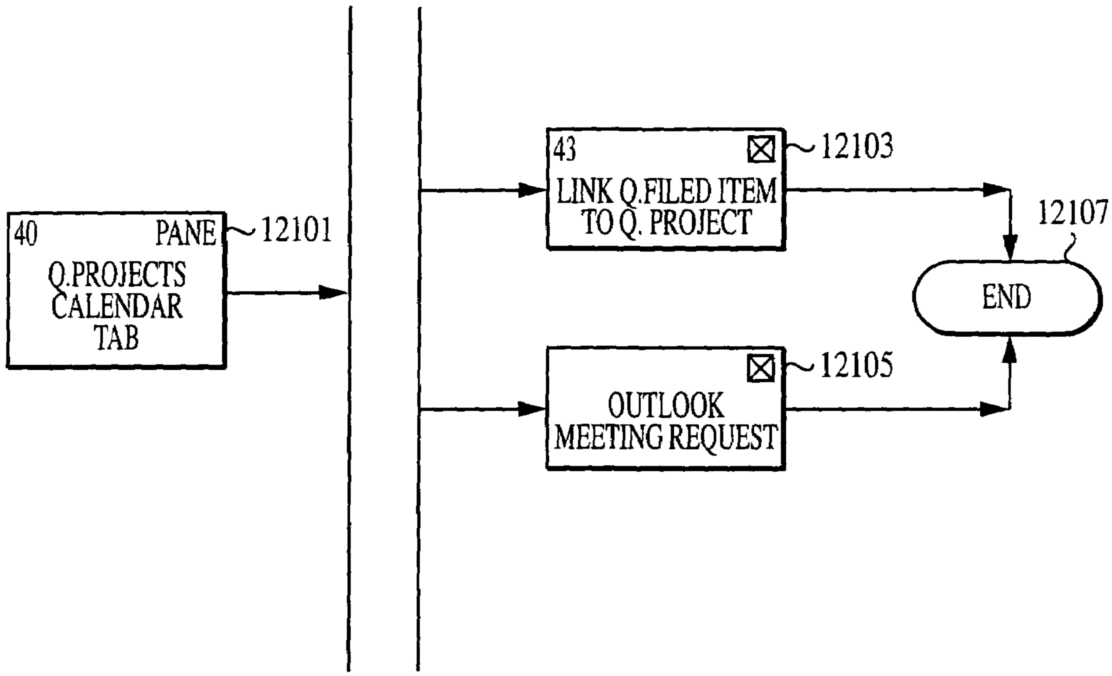

FIG. 121 illustrates a flow chart illustrating a process for linking a meeting to a project, according to one or more embodiments of the present invention.

Figure 122:
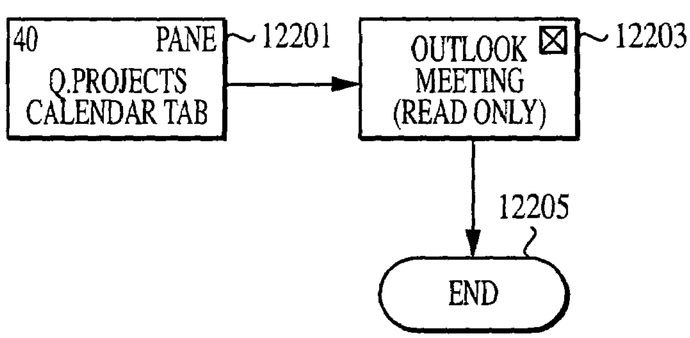

FIG. 122 illustrates a flow chart illustrating a process for viewing a meeting linked to a project, according to one or more embodiments of the present invention.

Figure 123:
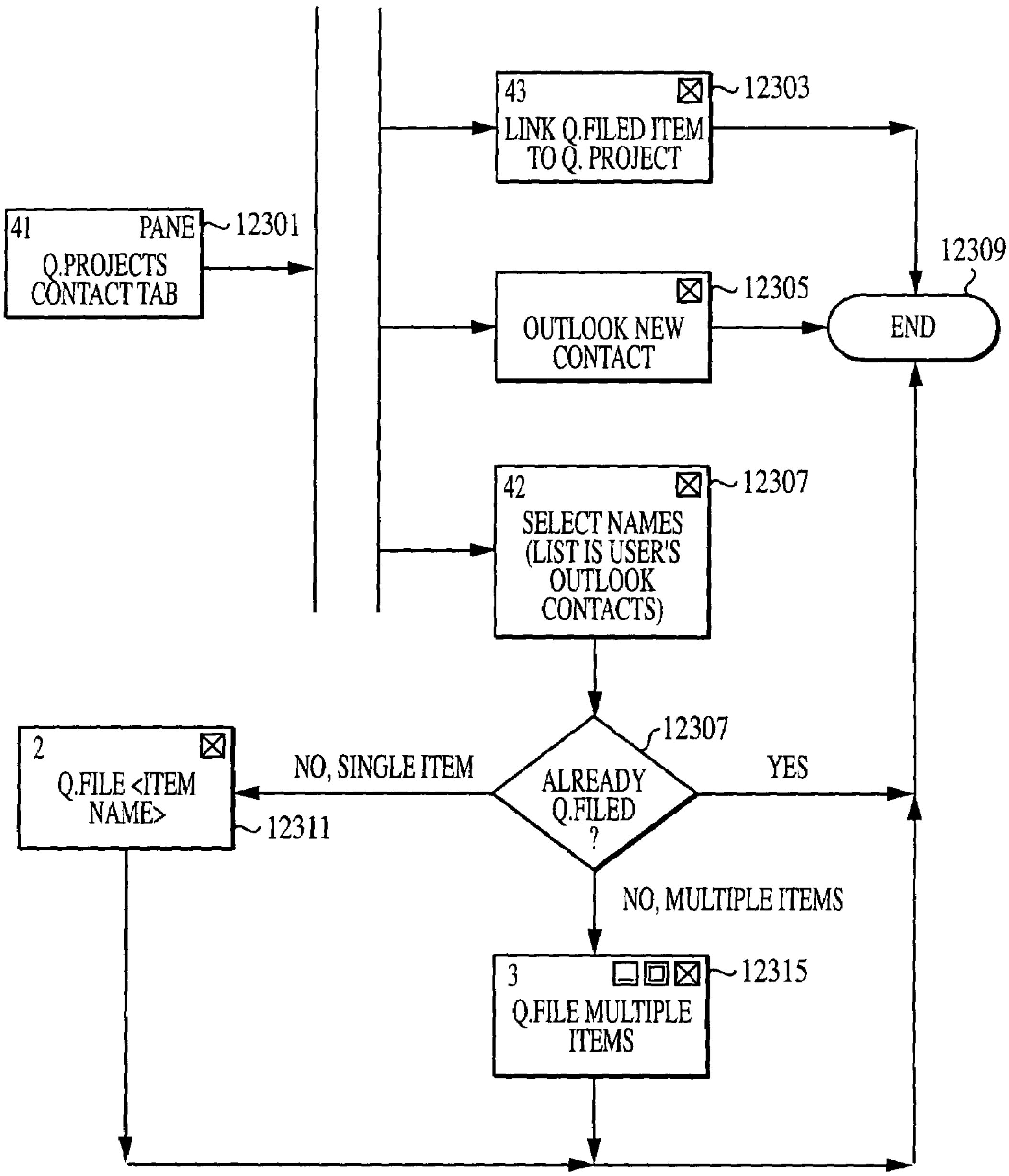

FIG. 123 illustrates a flow chart illustrating a process for linking a contact to a project, according to one or more embodiments of the present invention.

Figure 124:
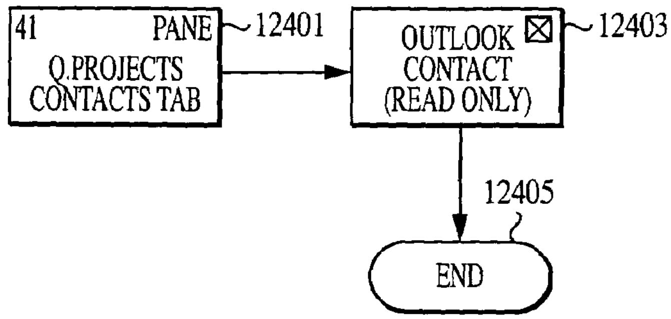

FIG. 124 illustrates a flow chart illustrating a process for viewing a contact linked to a project, according to one or more embodiments of the present invention.

Figure 125:
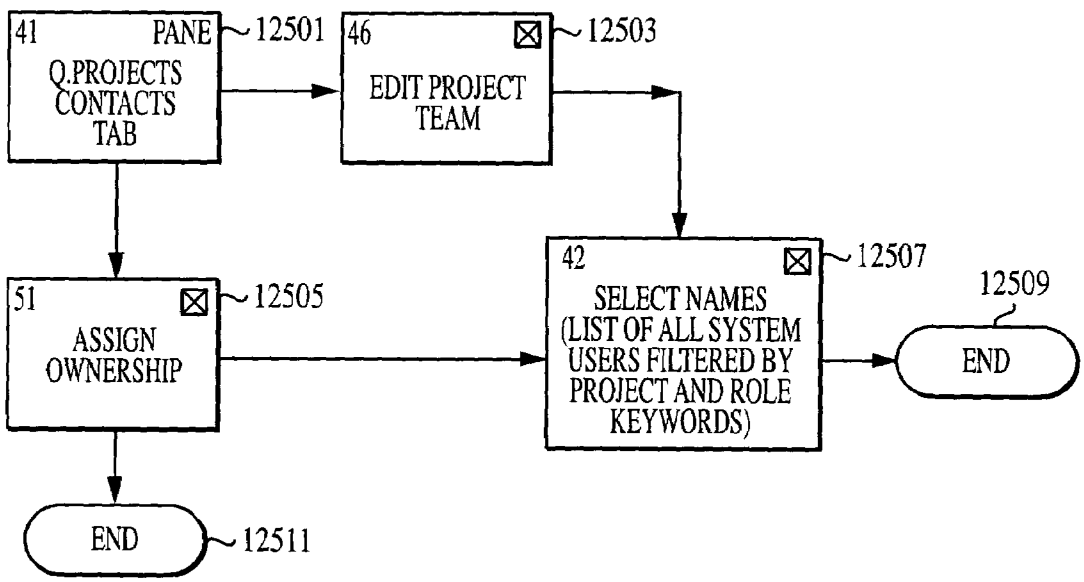

FIG. 125 is a flow chart illustrating a process for editing a project team utilizing contacts, according to one or more embodiments of the present invention.

Figure 126:
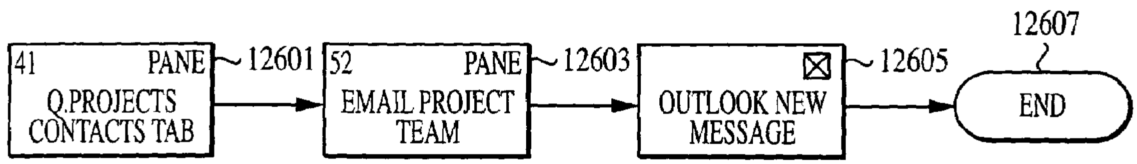

FIG. 126 is a flow chart illustrating a process for sending an e-mail to a selected project team, according to one or more embodiments of the present invention.

Figure 127:
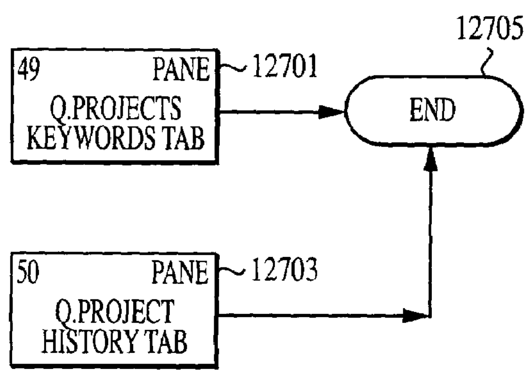

FIG. 127 is a flow chart illustrating a process for viewing keywords for classes associated with a project, and/or for viewing a history of the project, according to one or more embodiments of the present invention.

Figure 128:
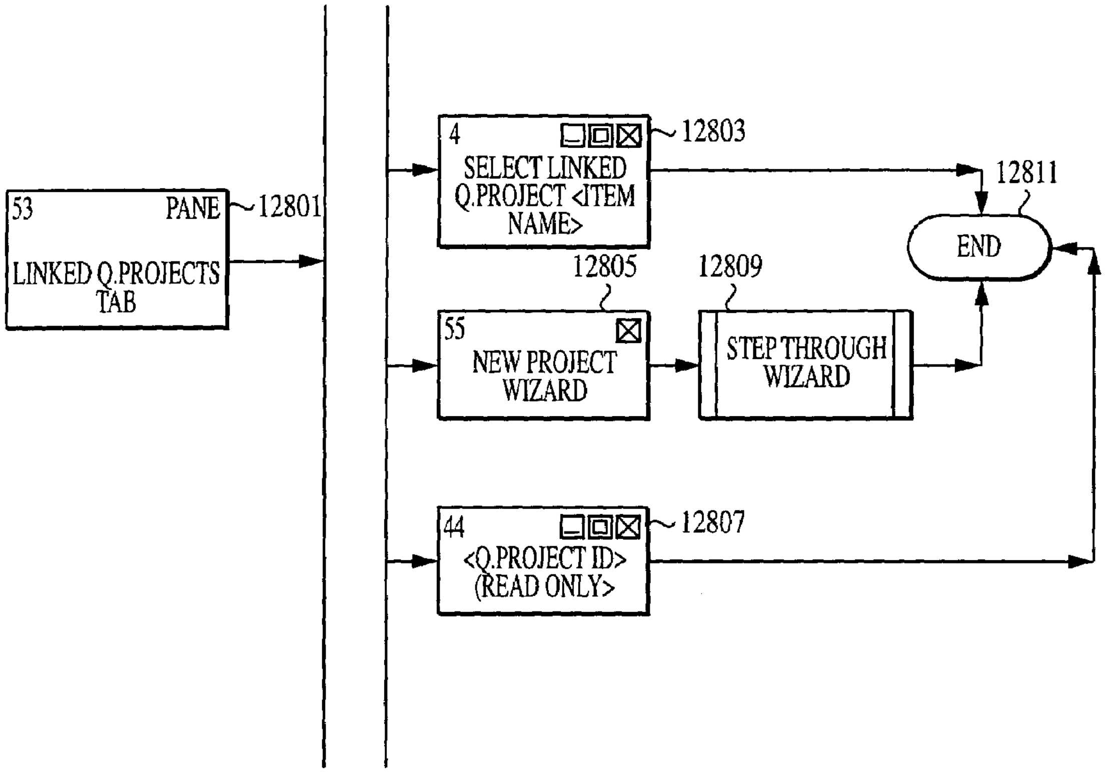

FIG. 128 is a flow chart illustrating a process for viewing, adding, and/or creating linked projects, according to one or more embodiments of the present invention.

Figure 129:
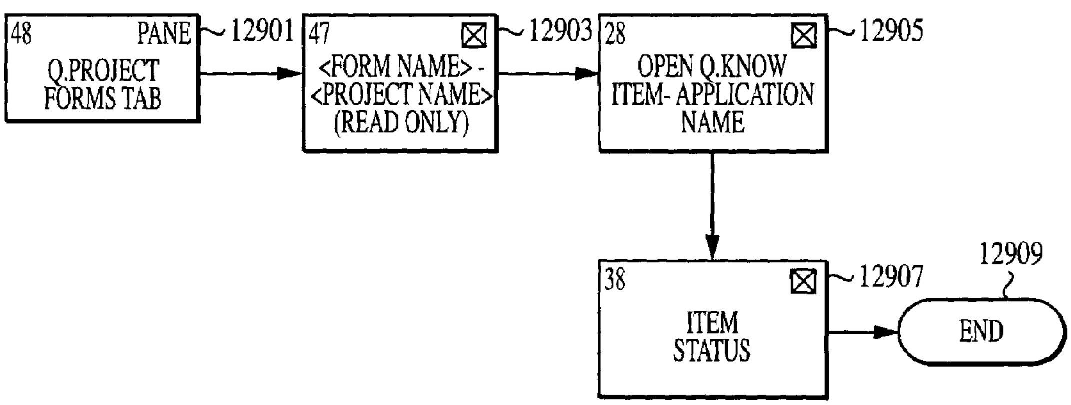

FIG. 129 is a flow chart illustrating a process for inputting data into forms for items to be opened under native applications, according to one or more embodiments of the present invention.

Figure 130:
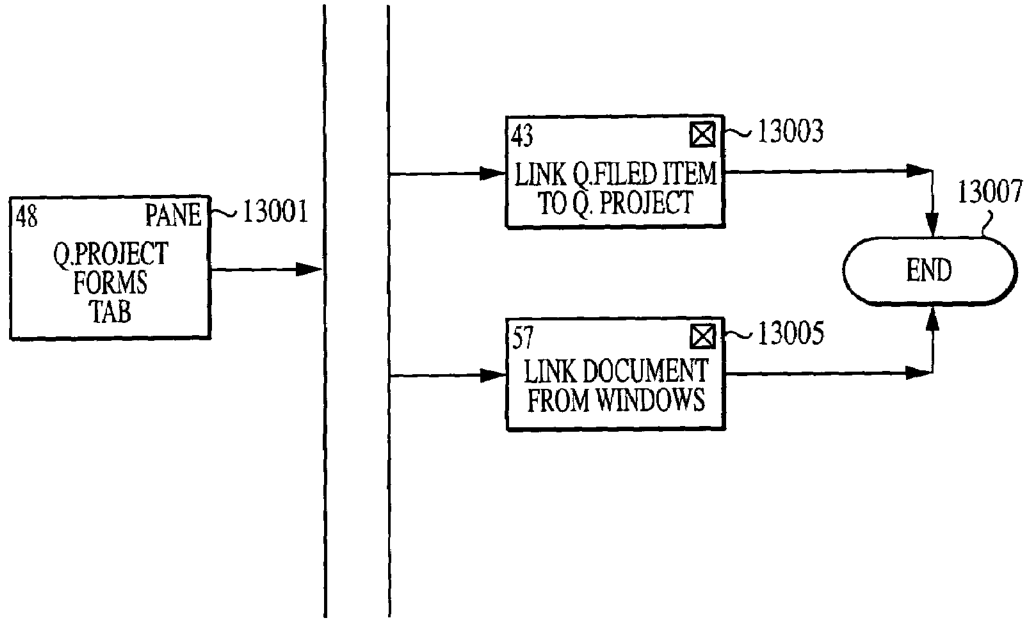

FIG. 130 is a flow chart illustrating a process for linking a document from windows and/or for linking a filed item to a project, according to one or more embodiments of the present invention.

Figure 131:
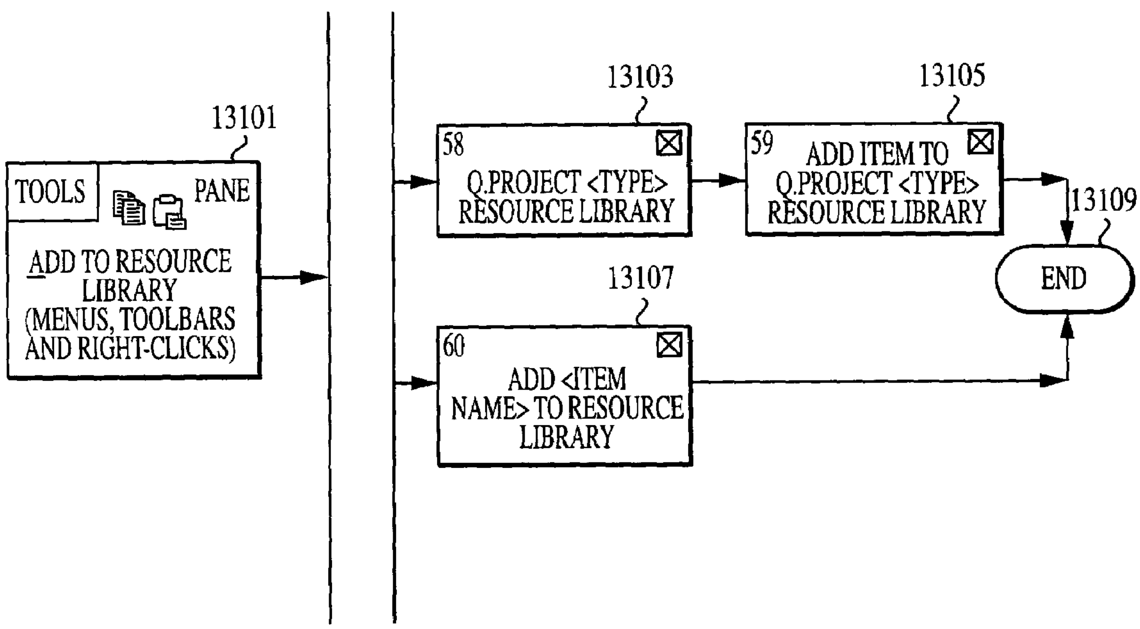

FIG. 131 is a flow chart illustrating a process for adding an item to a project's resource library, according to one or more embodiments of the present invention.

Figure 132:
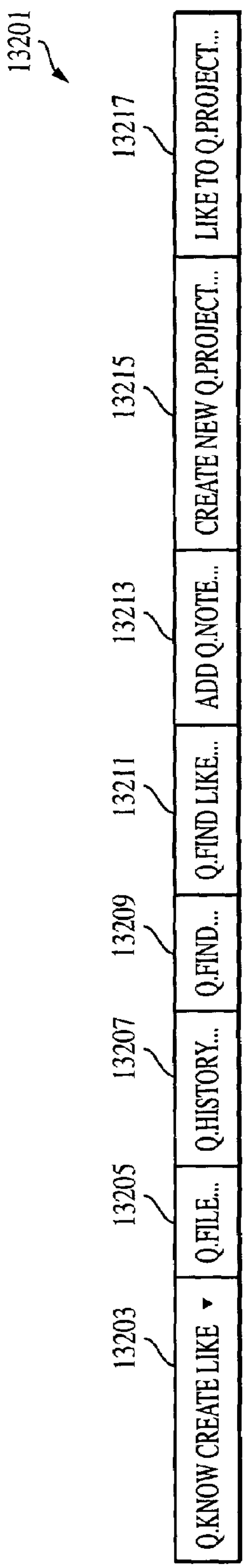

FIG. 132 illustrates an example items toolbar for use in connection with Outlook, according to one or more embodiments of the present invention.

Figure 133:
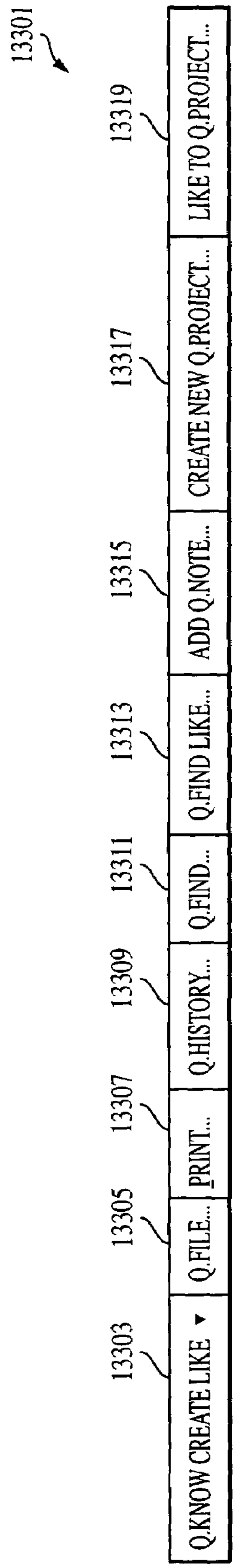

FIG. 133 illustrates an example items toolbar for use in connection with an explorer, according to one or more embodiments of the present invention.

Figure 134:
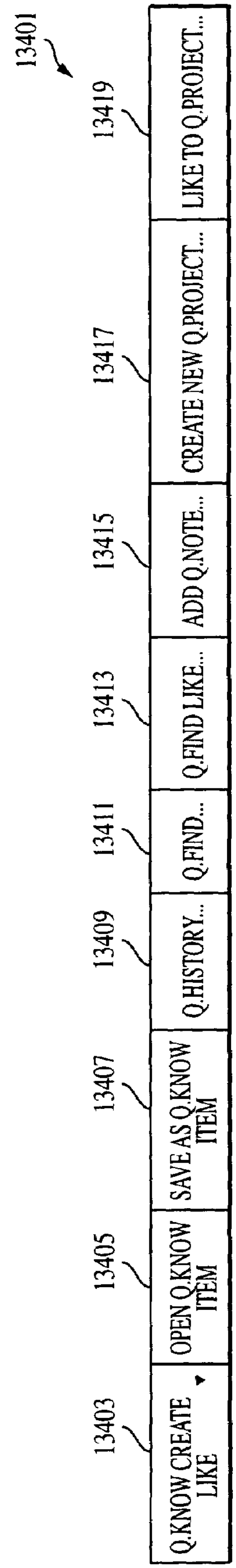

FIG. 134 illustrates an example items toolbar for use in connection with native applications, according to one or more embodiments of the present invention.

Figure 135:
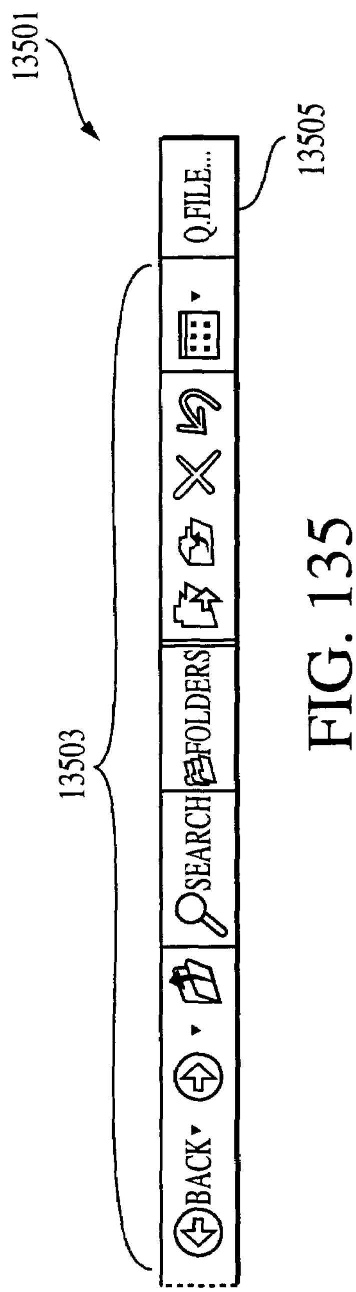

FIG. 135 illustrates an example items toolbar for use in connection with Windows Explorer, according to one or more embodiments of the present invention.

Figure 136:
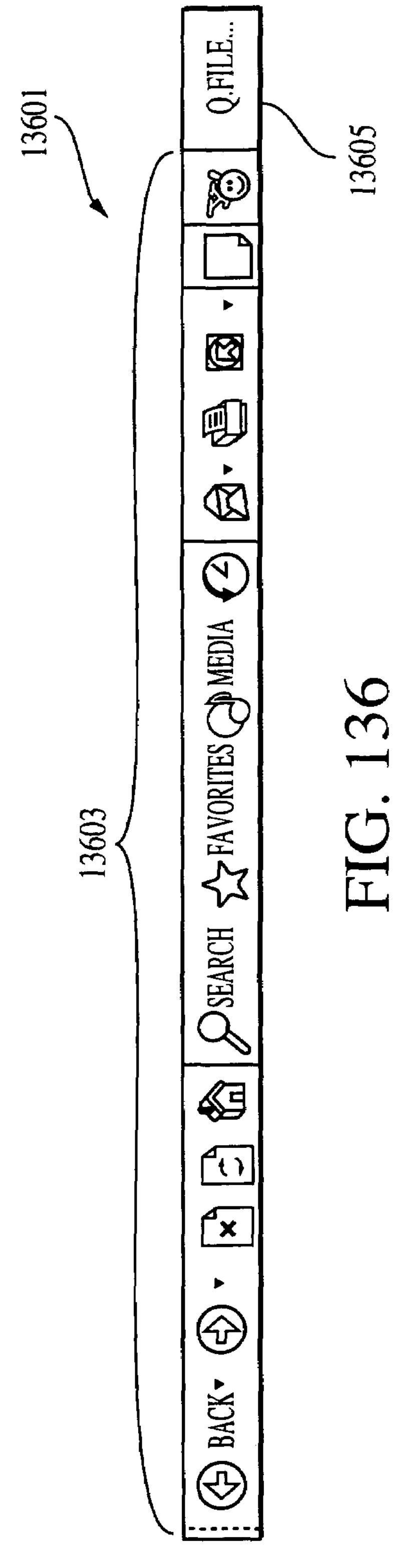

FIG. 136 illustrates an example items toolbar for use in connection with Internet Explorer, according to one or more embodiments of the present invention.

Figure 137:
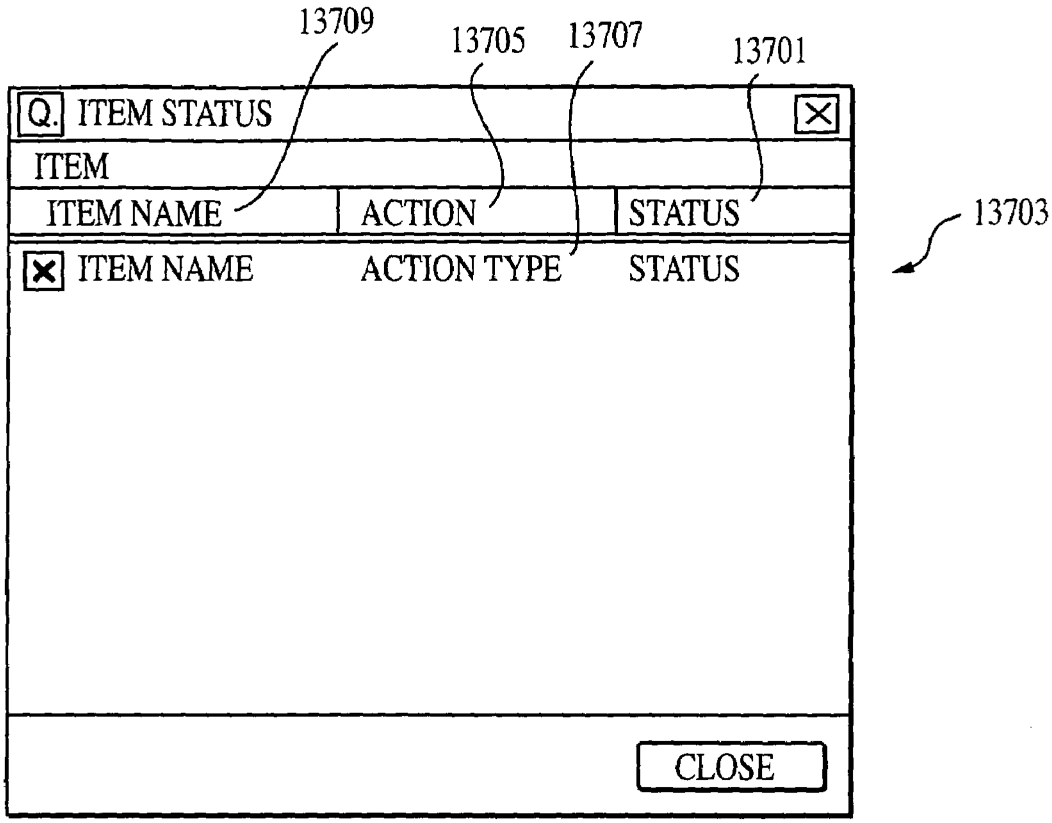

FIG. 137 illustrates an example message for use in indicating the status of progress in processing an item, according to one or more embodiments of the present invention.

Figure 138:
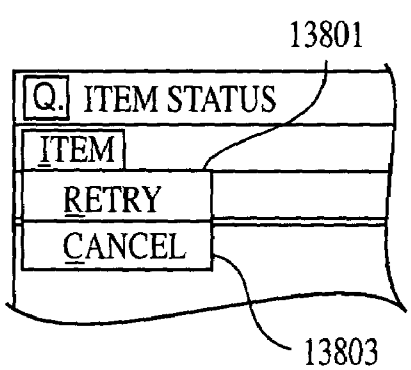

FIG. 138 illustrates an example user interface for use in instructing the system to retry and/or cancel an action on an item being processed, according to one or more embodiments of the present invention.

Figure 139:
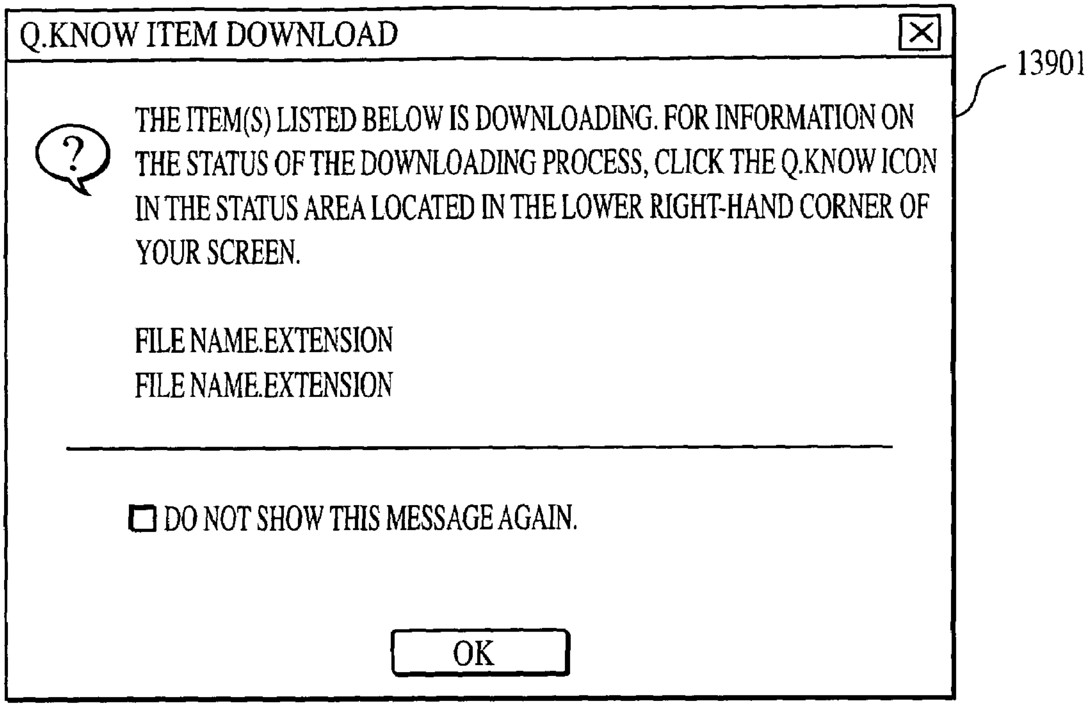

FIG. 139 illustrates an example message for use in indicating that an item is being downloaded by the system, according to one or more embodiments of the present invention.

Figure 140:
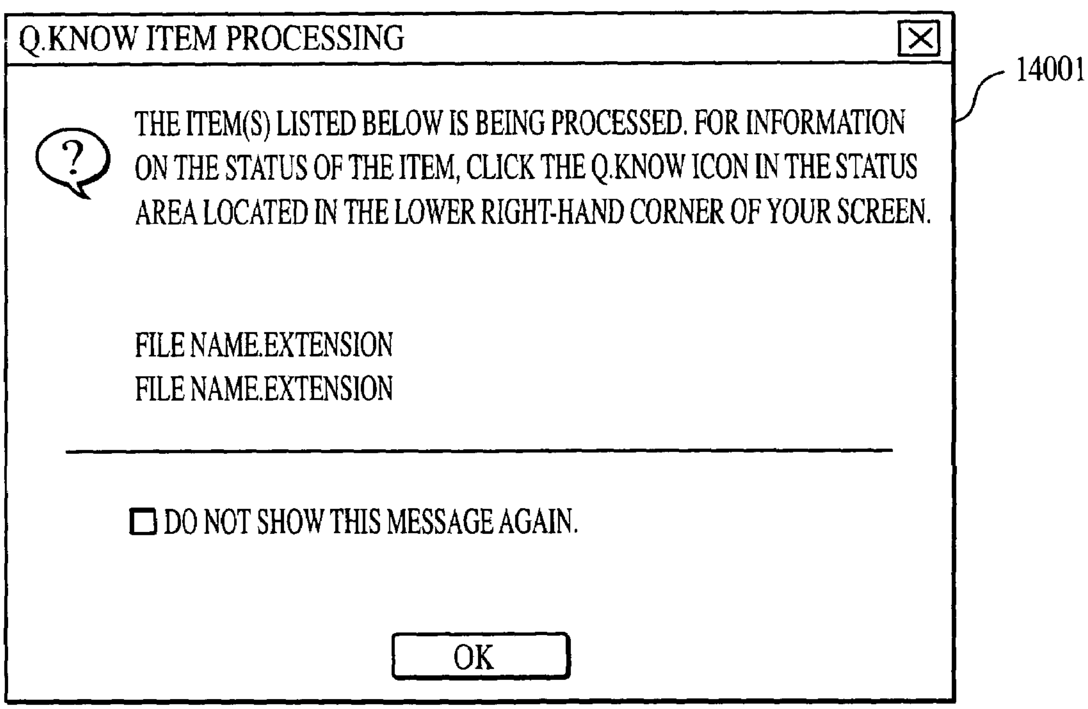

FIG. 140 illustrates an example message for use in indicating that an item is being processed by the system, according to one or more embodiments of the present invention.

Figure 141:
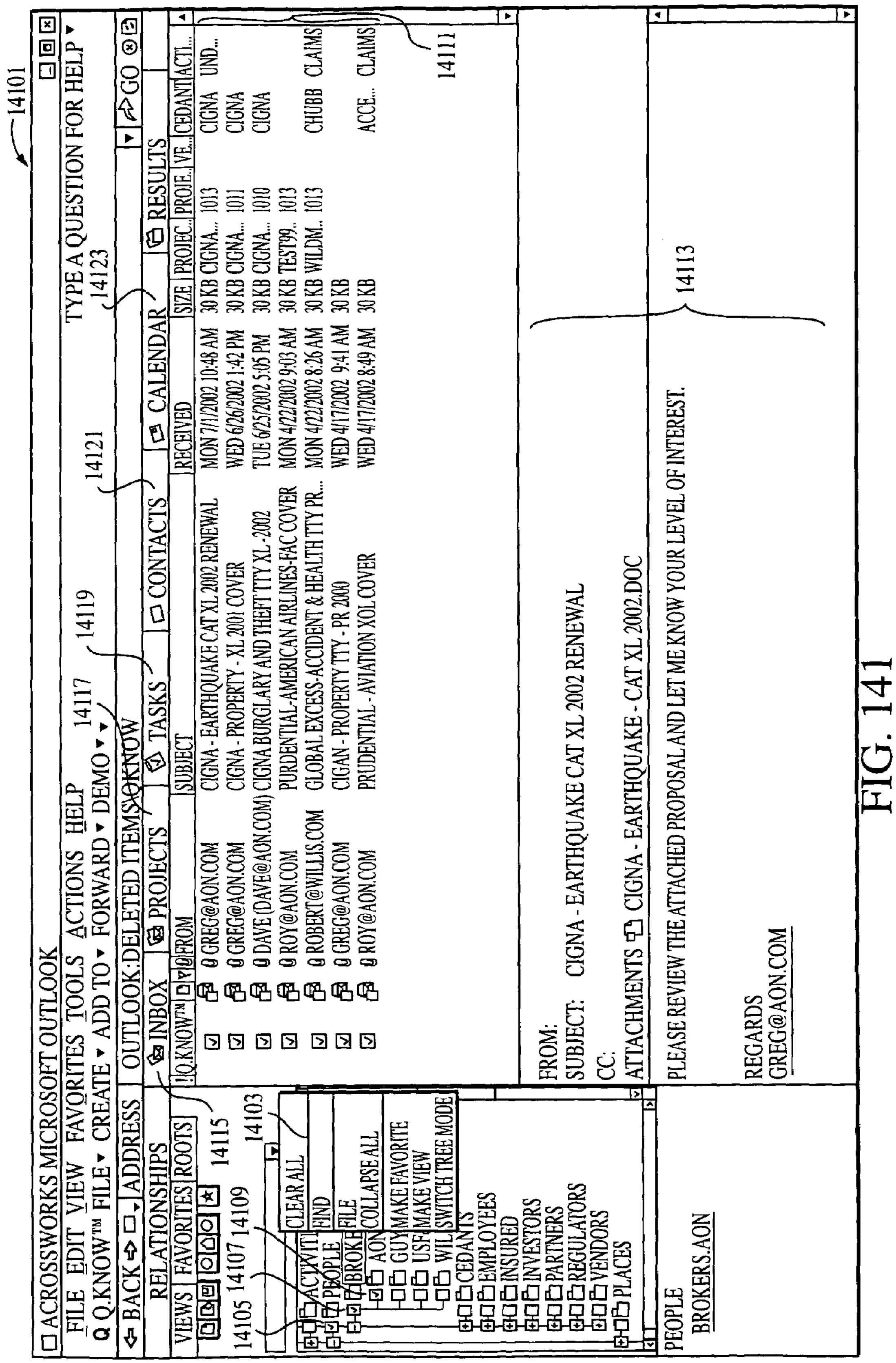

FIG. 141 illustrates an example user interface listing e-mail in an inbox as items, according to one or more embodiments of the present invention.

Figure 142:
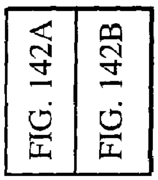
Figure 142A:
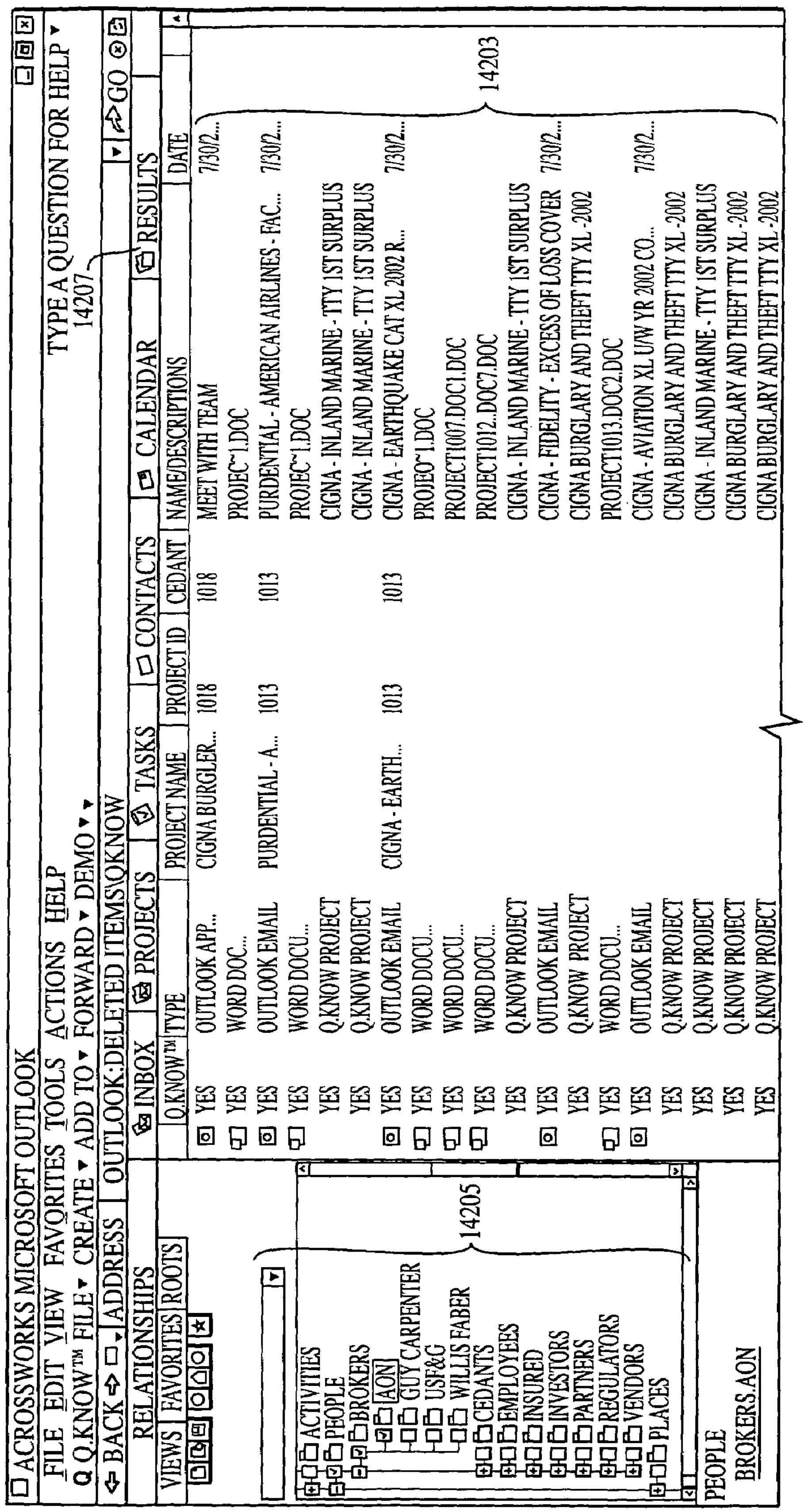
Figure 142B:
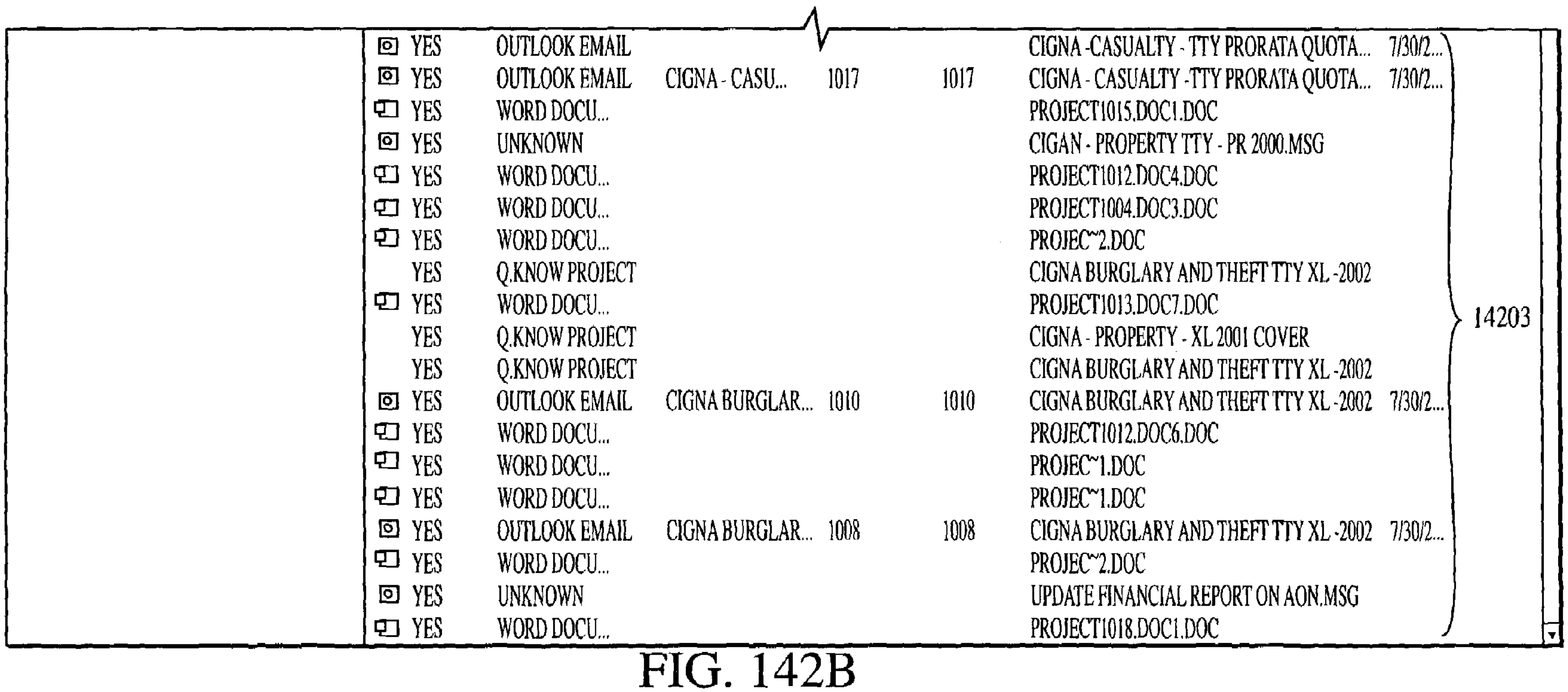

FIG. 142 illustrates an example user interface listing results from finding items with specified keywords in specified classes, according to one or more embodiments of the present invention.

Figures 143, 143A:
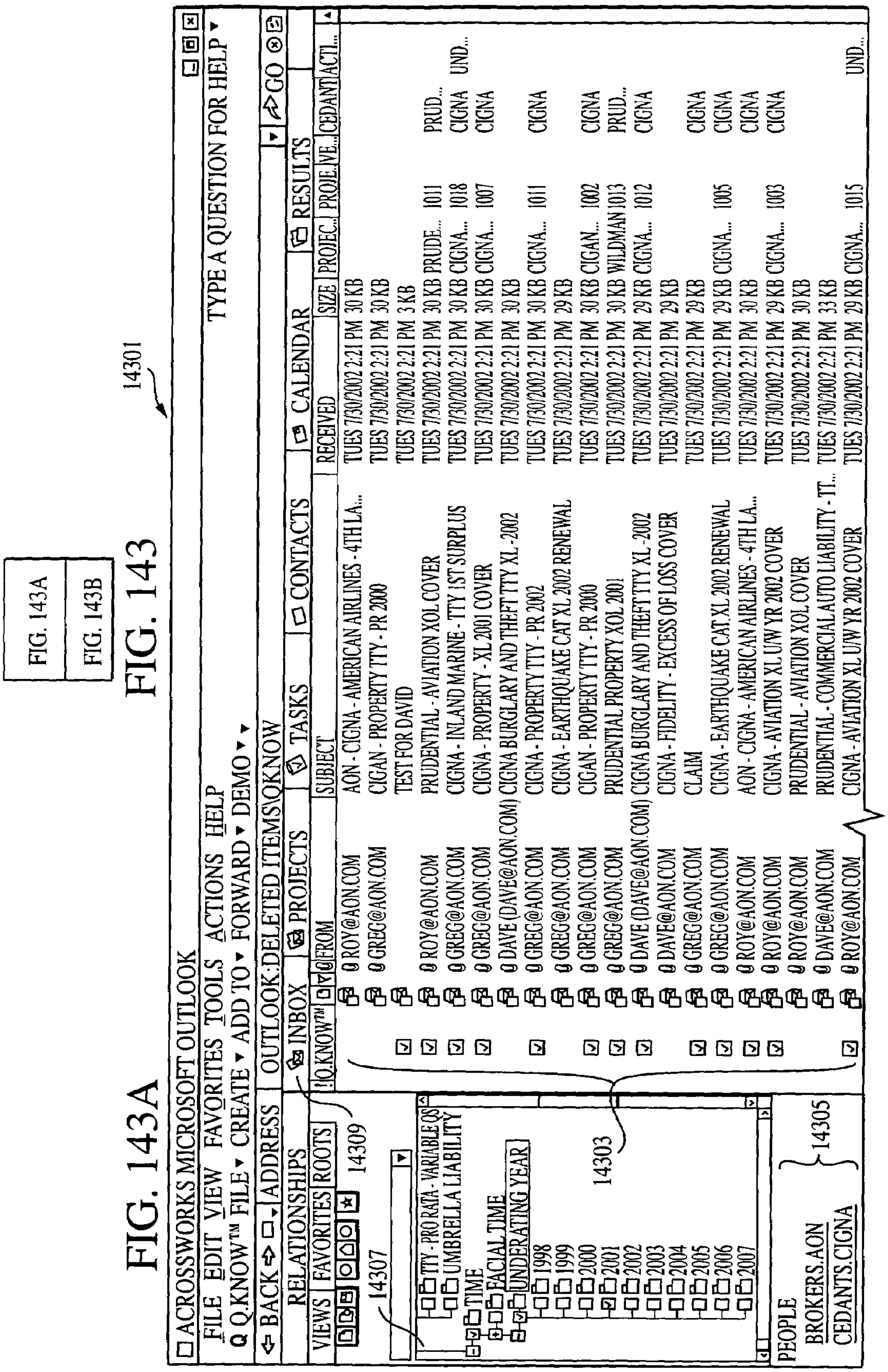
Figure 143B:
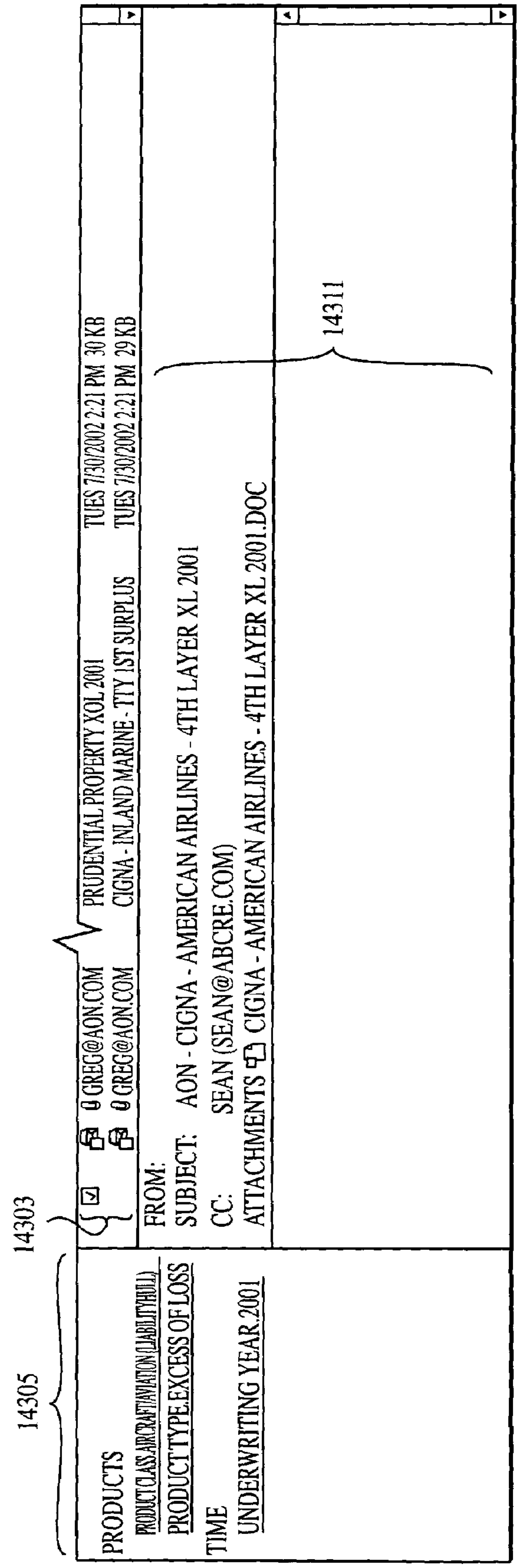

FIG. 143 illustrates an example user interface listing e-mail in an inbox as items, based on finding specified keywords in specified classes, according to one or more embodiments of the present invention.

Figures 144, 144A:
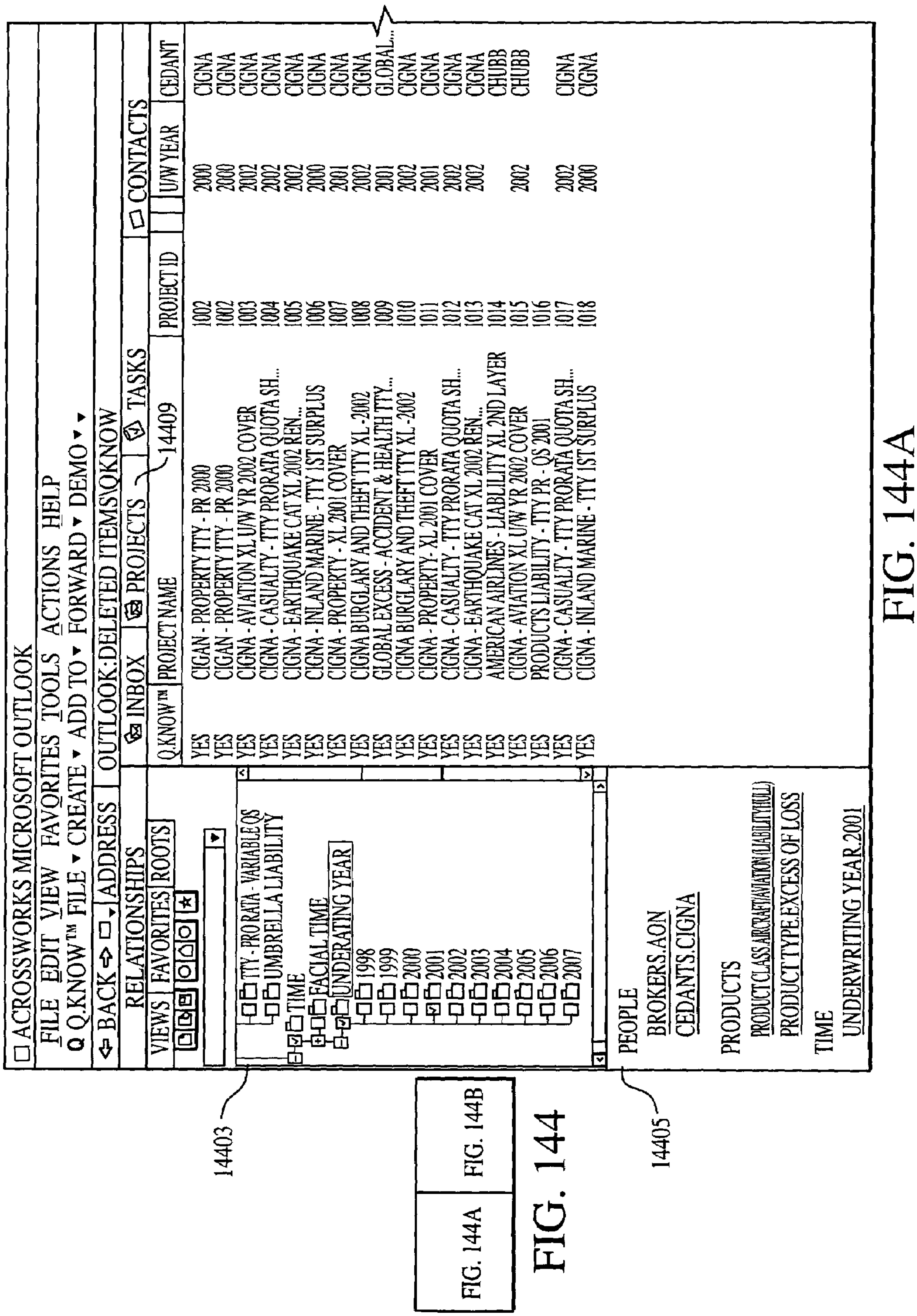
Figure 144B:
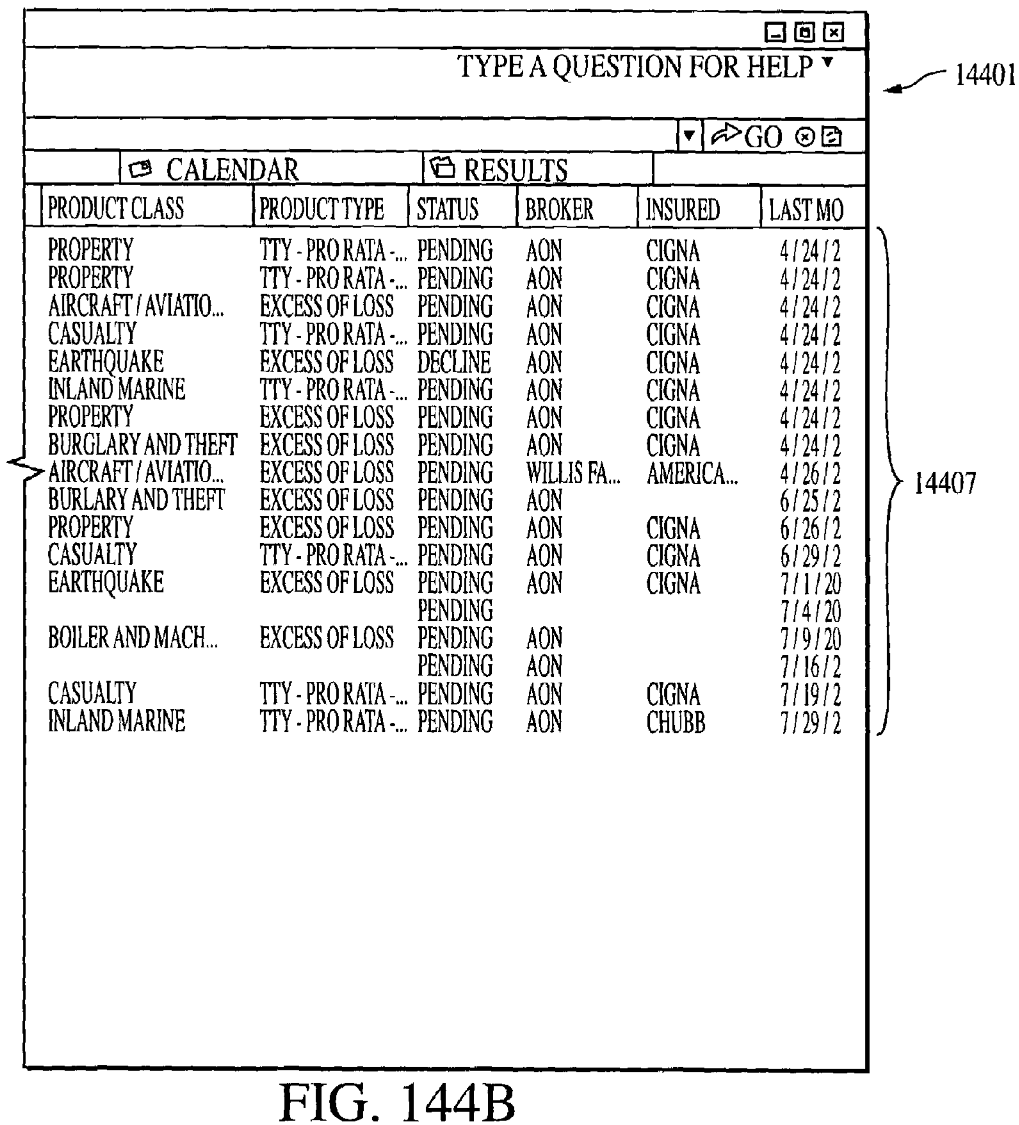

FIG. 144 illustrates an example user interface listing projects as items, based on finding specified keywords in specified classes, according to one or more embodiments of the present invention.

Figure 145:
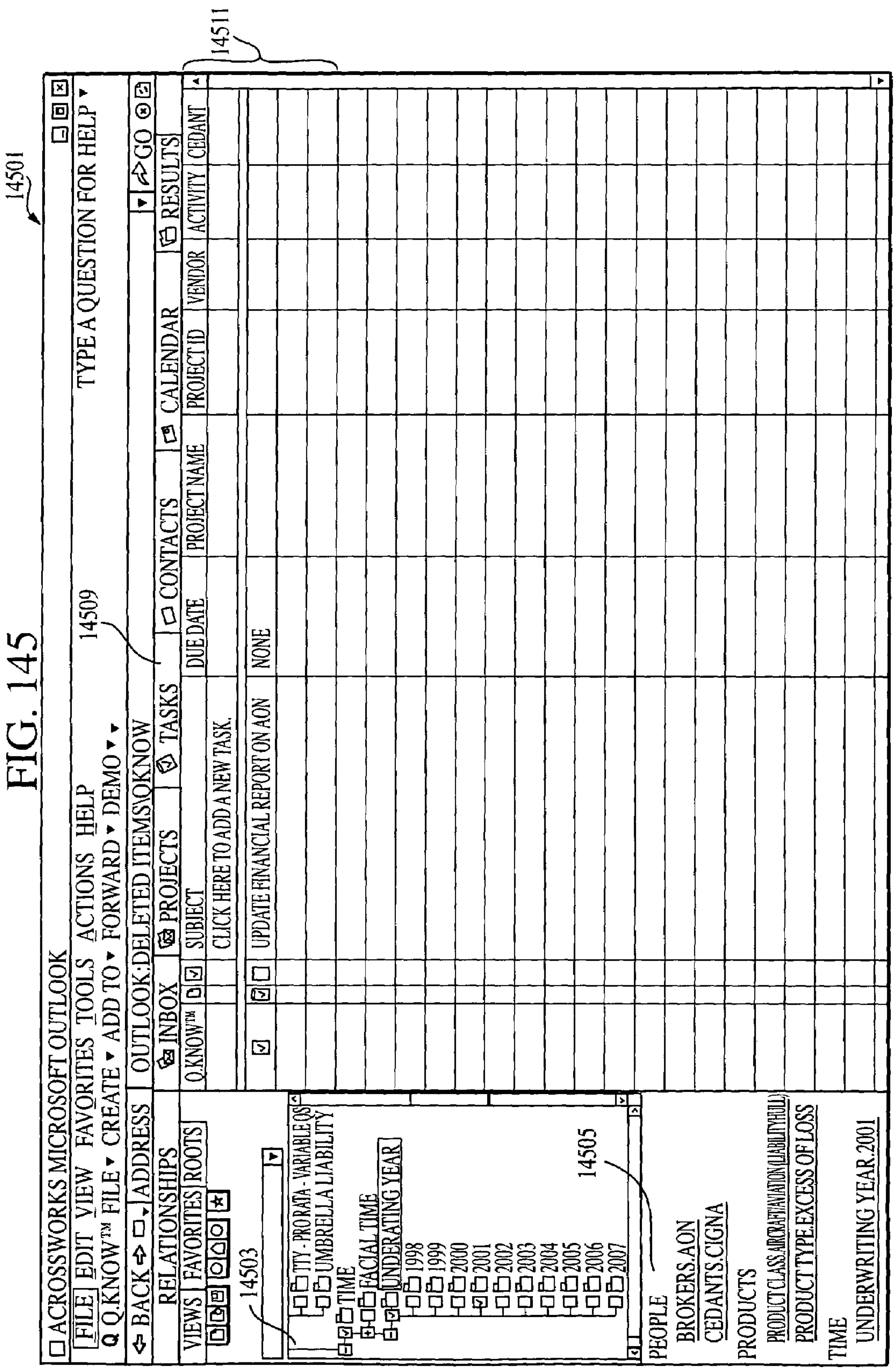

FIG. 145 illustrates an example user interface listing tasks as items, based on finding specified keywords in specified classes, according to one or more embodiments of the present invention.

Figure 146:
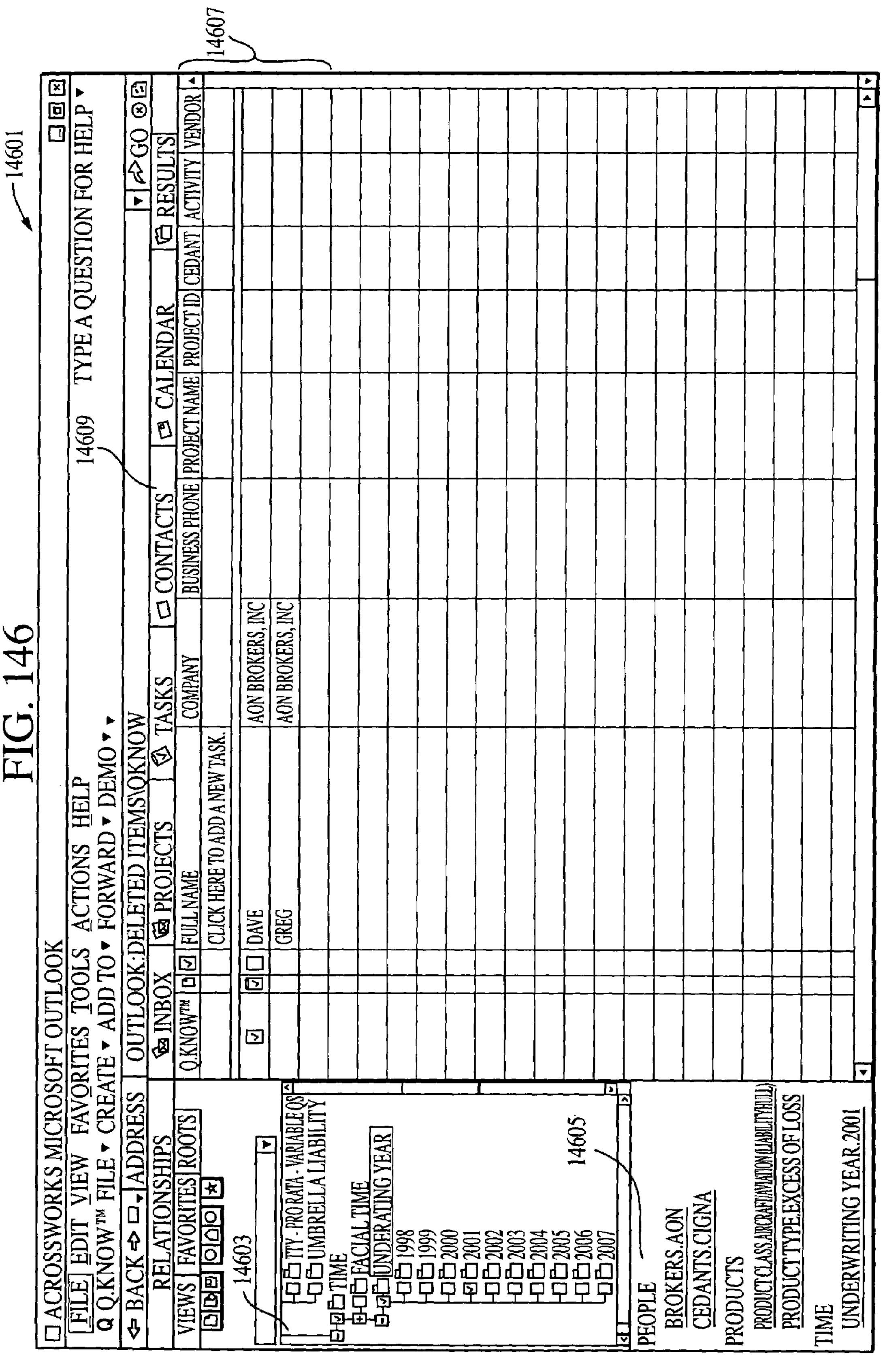

FIG. 146 illustrates an example user interface listing contacts as items, based on finding specified keywords in specified classes, according to one or more embodiments of the present invention.

Figure 147:
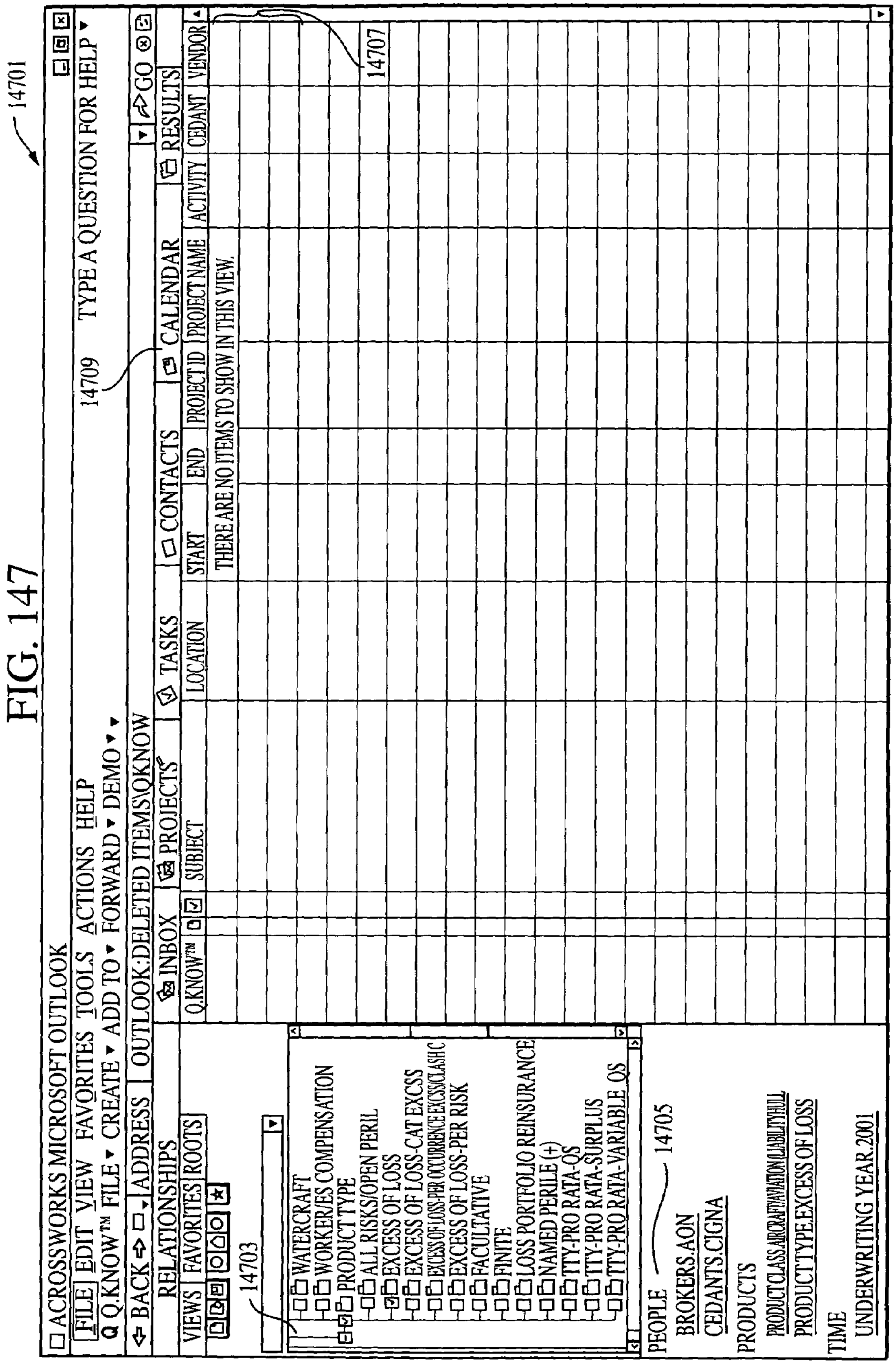

FIG. 147 illustrates an example user interface listing specified meetings as items, based on finding specified keywords in specified classes, according to one or more embodiments of the present invention.

Figure 148A:
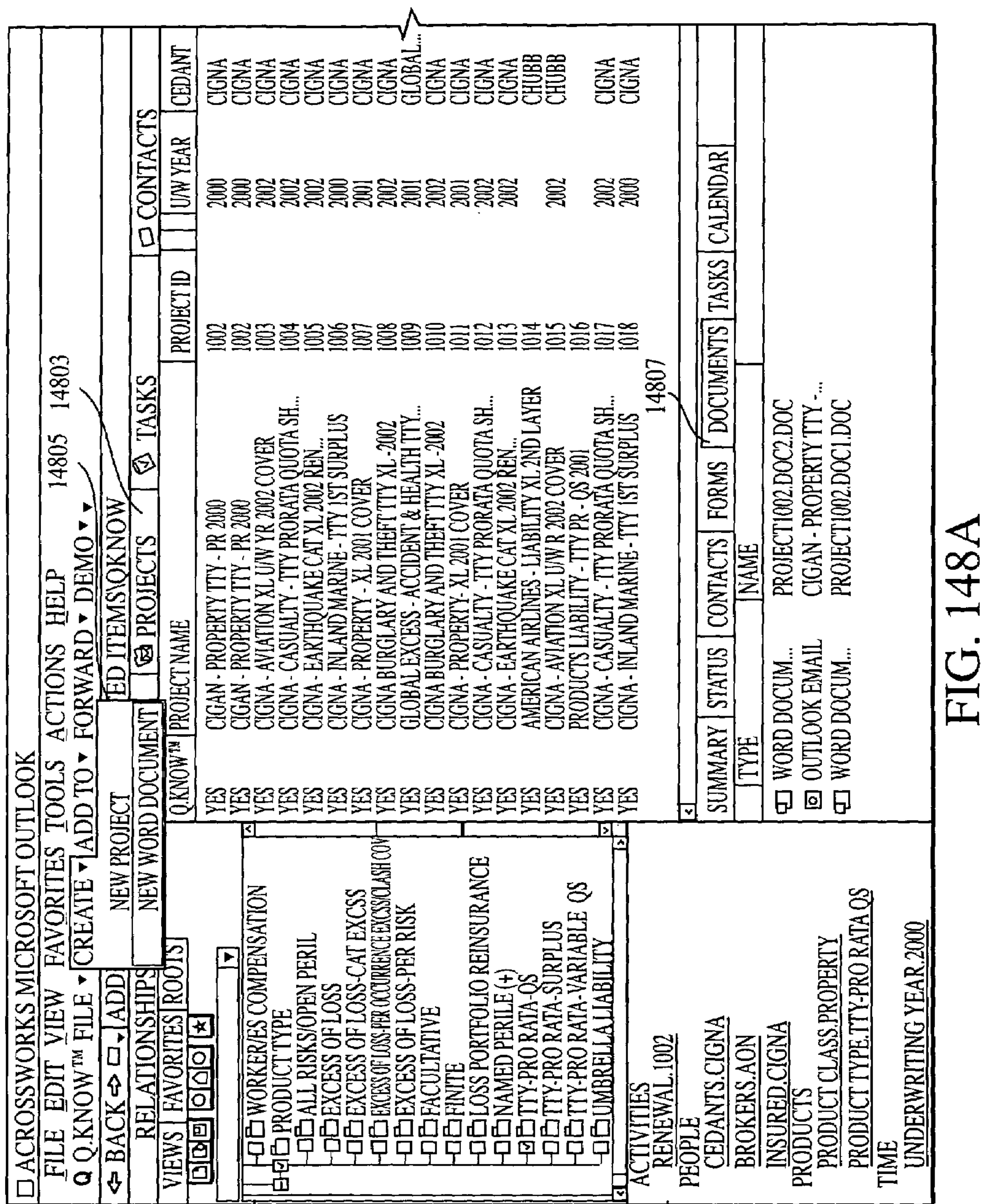
Figure 148:
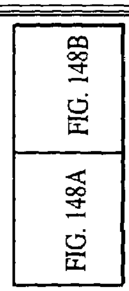

FIG. 148 illustrates an example user interface for creating a new document to include with a project, with specified keywords in specified classes, according to one or more embodiments of the present invention.

Figure 149:
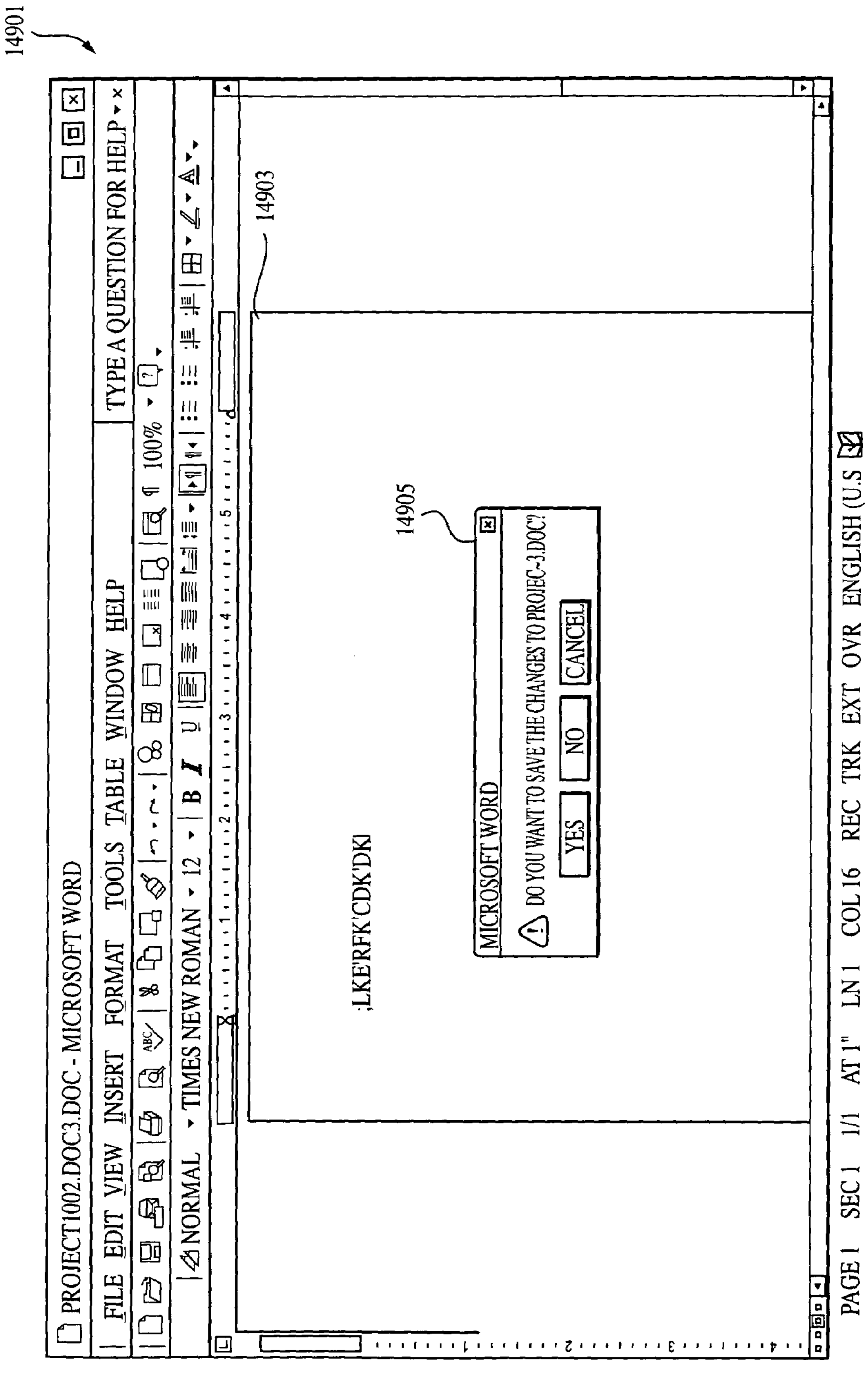

FIG. 149 illustrates an example user interface showing a message to confirm changes to a new document created in connection with FIG. 148, to be stored as part of a project, according to one or more embodiments of the present invention.

Figure 150A:
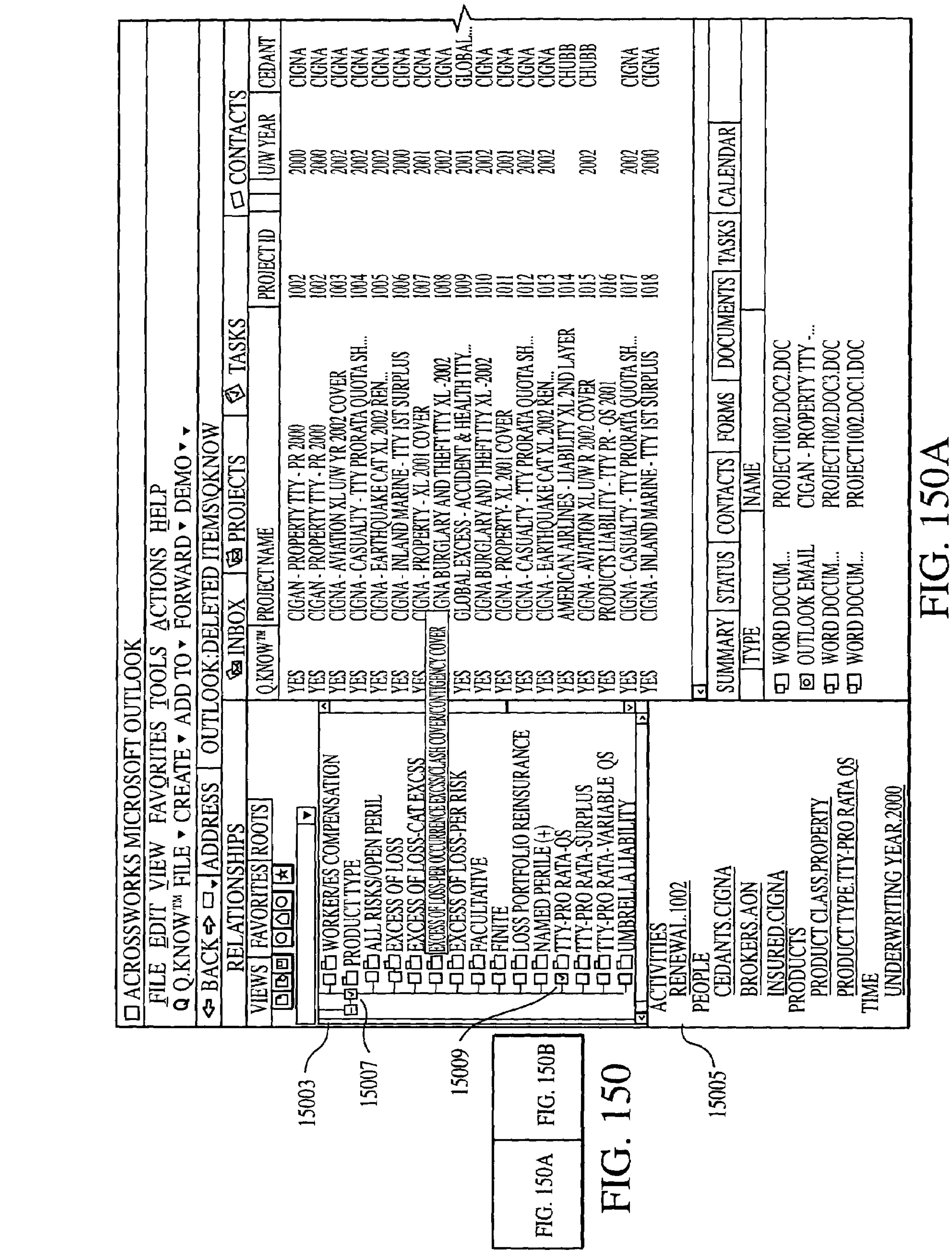

FIG. 150 illustrates an example user interface showing interfacing with a user to obtain class specifications for a search and retrieval, according to one or more embodiments of the present invention.

Figure 151:
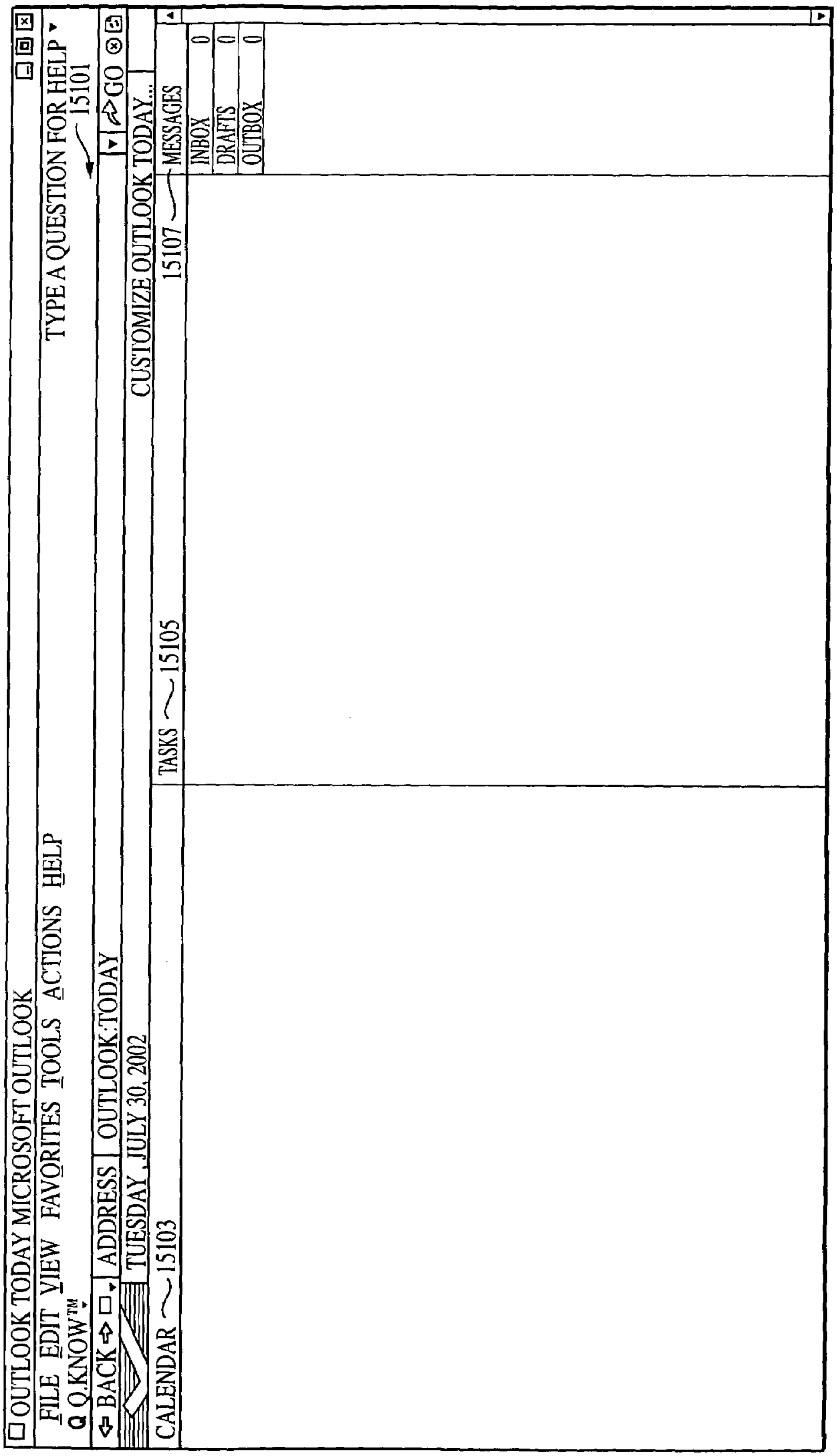

FIG. 151 illustrates an example user interface showing a summary for the Outlook interface, according to one or more embodiments of the present invention.

Figure 152:
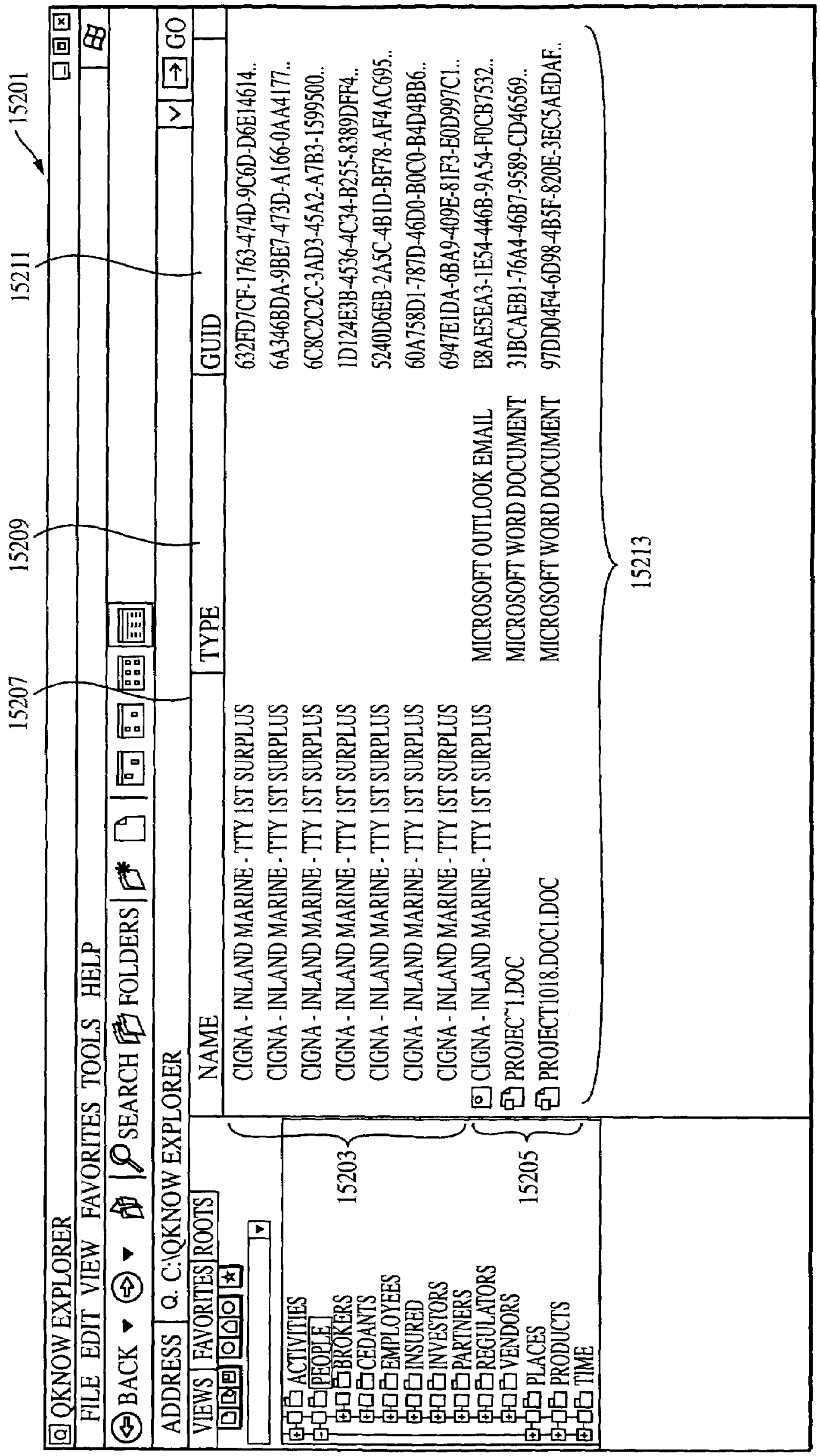

FIG. 152 illustrates an example user interface showing a summary list of items retrieved via an explorer, according to one or more embodiments of the present invention.

Figure 153:
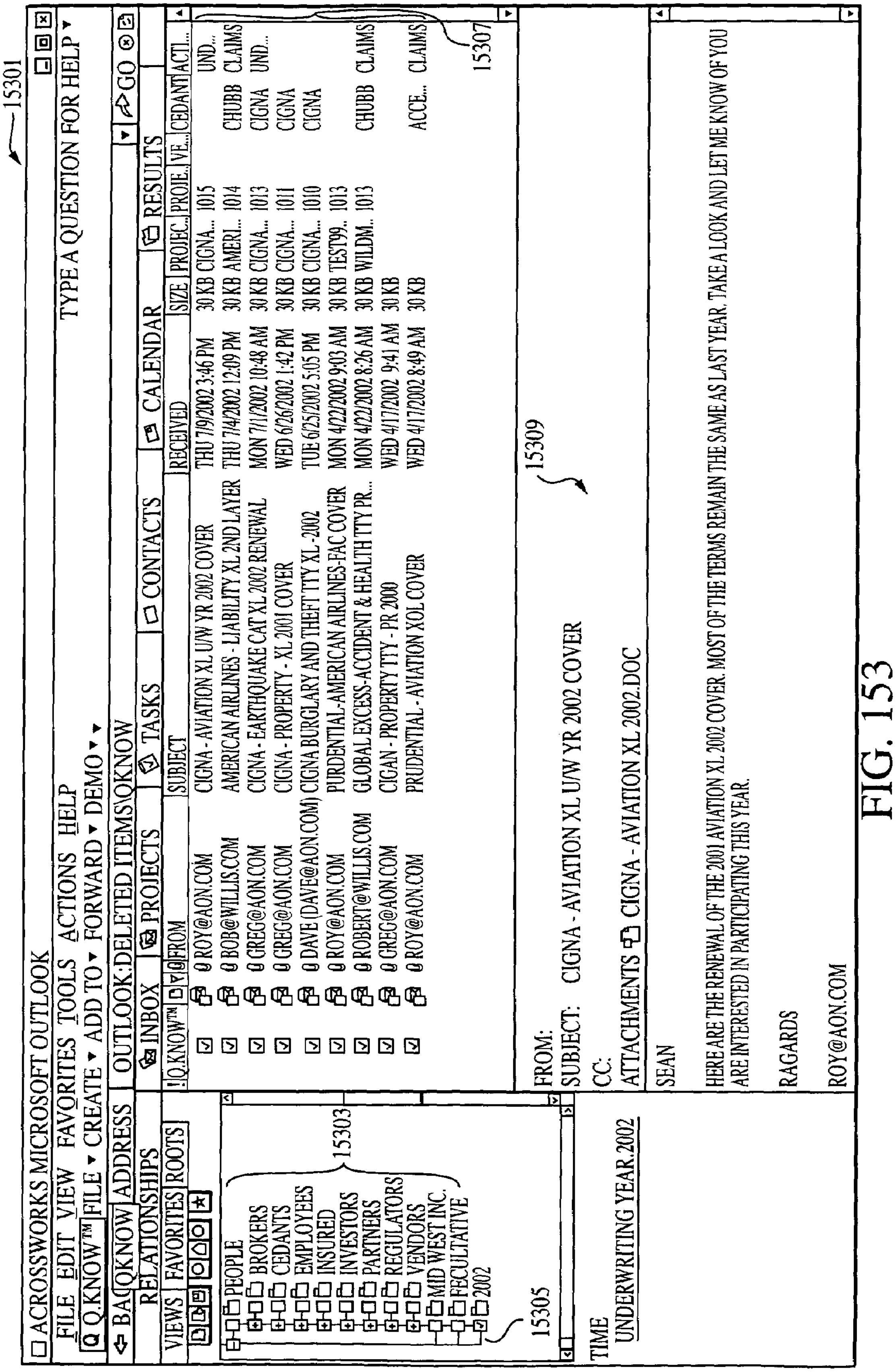

FIG. 153 illustrates an example user interface showing a summary list of candidate classes (relationships) and candidate time for searching and retrieving e-mail in an inbox, and a display of a selected item, according to one or more embodiments of the present invention.

Figure 154:
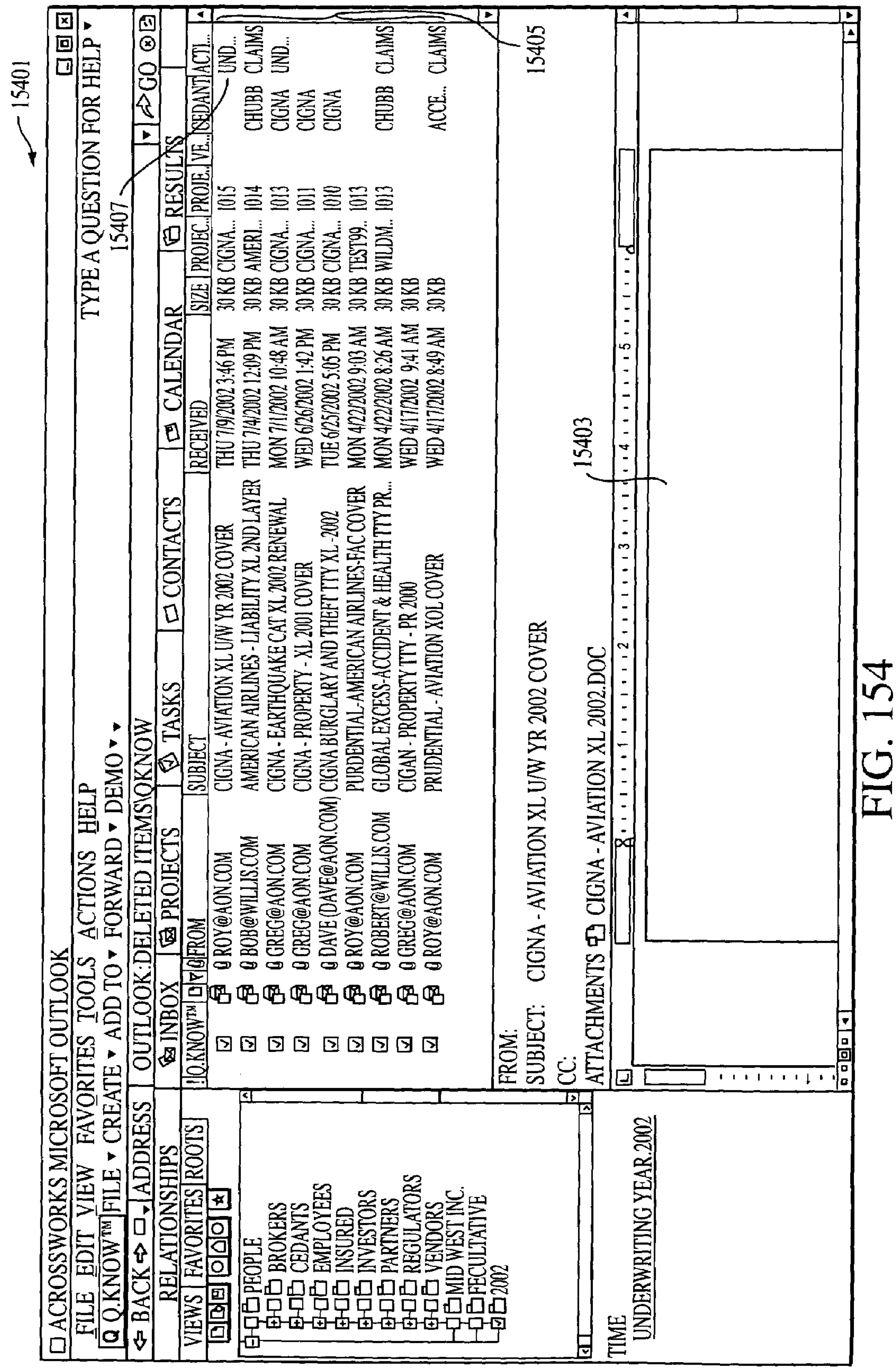

FIG. 154 illustrates an example user interface showing a display of an attachment to the selected item, according to one or more embodiments of the present invention.

Figure 155B:
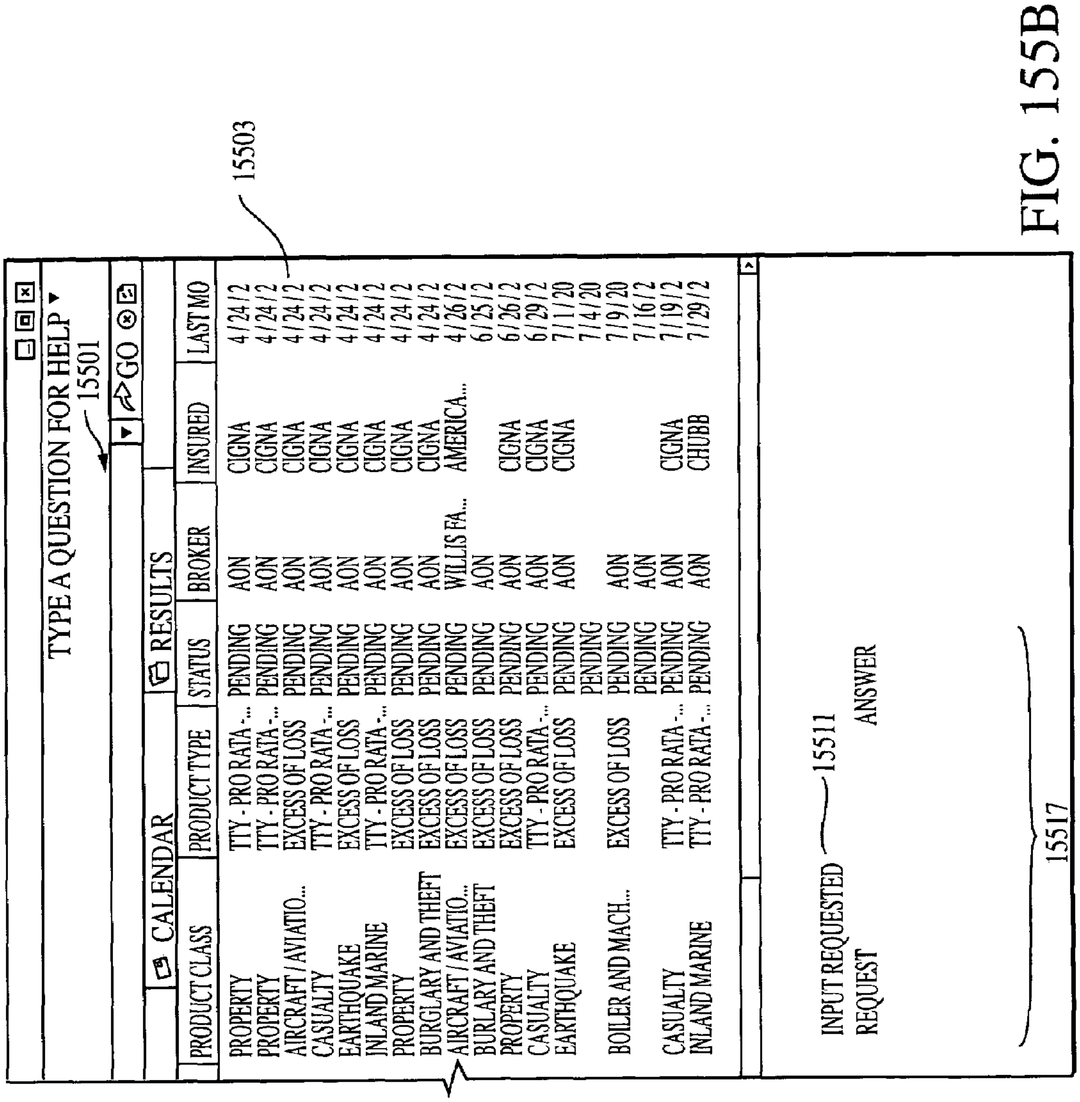

FIG. 155 illustrates an example user interface showing a display of documents required in connection with the selected project, according to one or more embodiments of the present invention.

Figures 156, 156A:
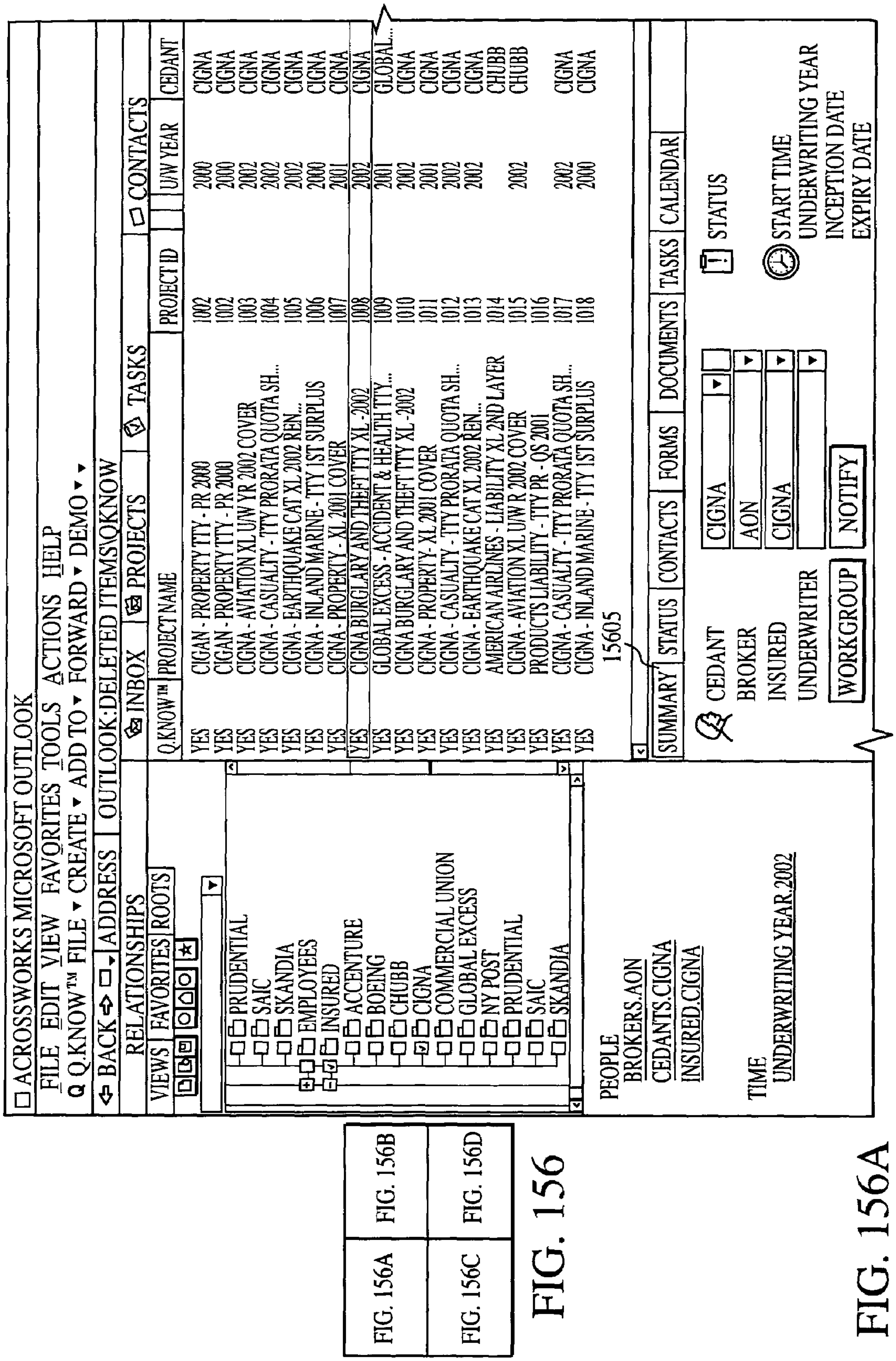
Figure 156B:
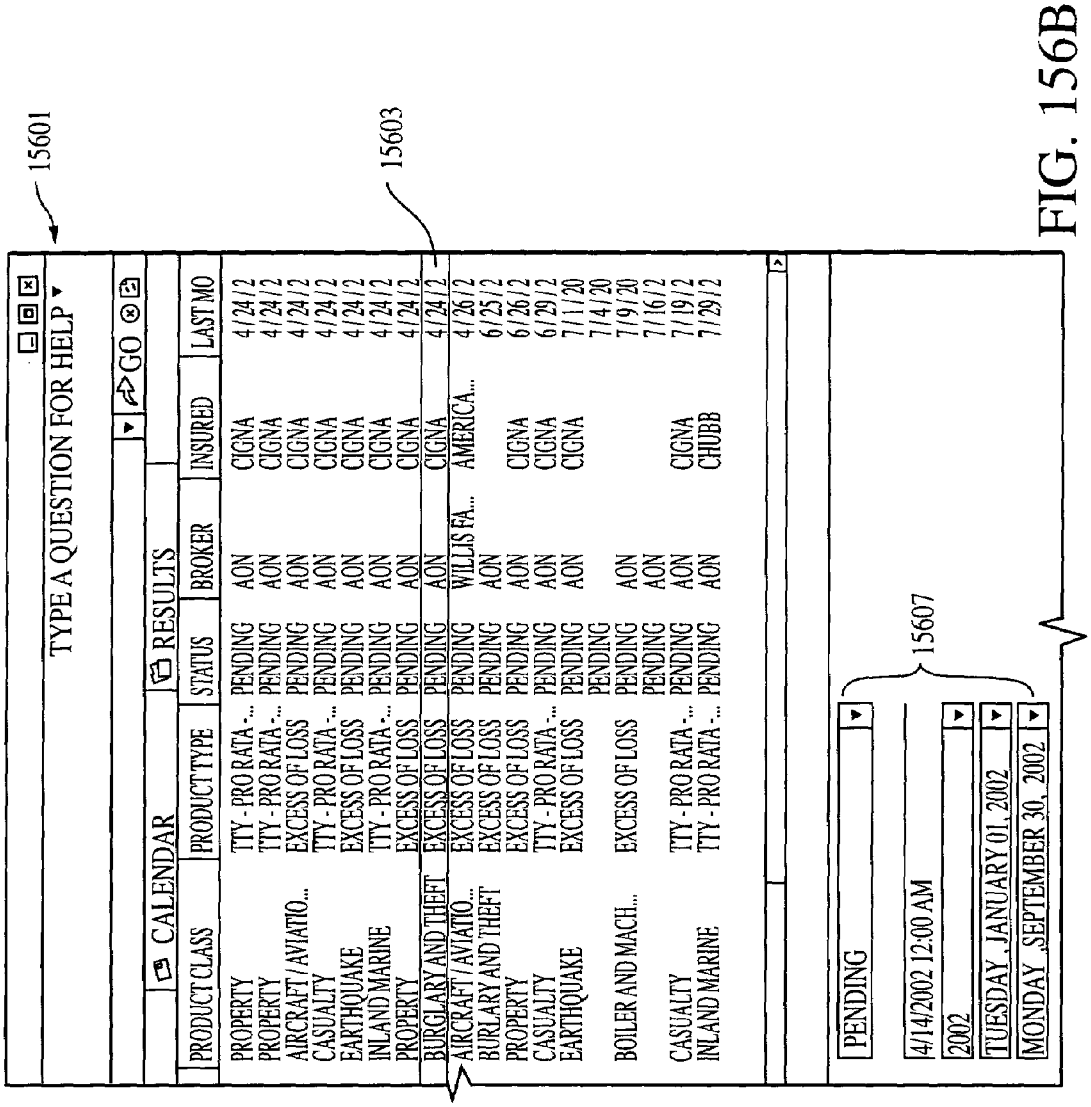
Figure 156C:
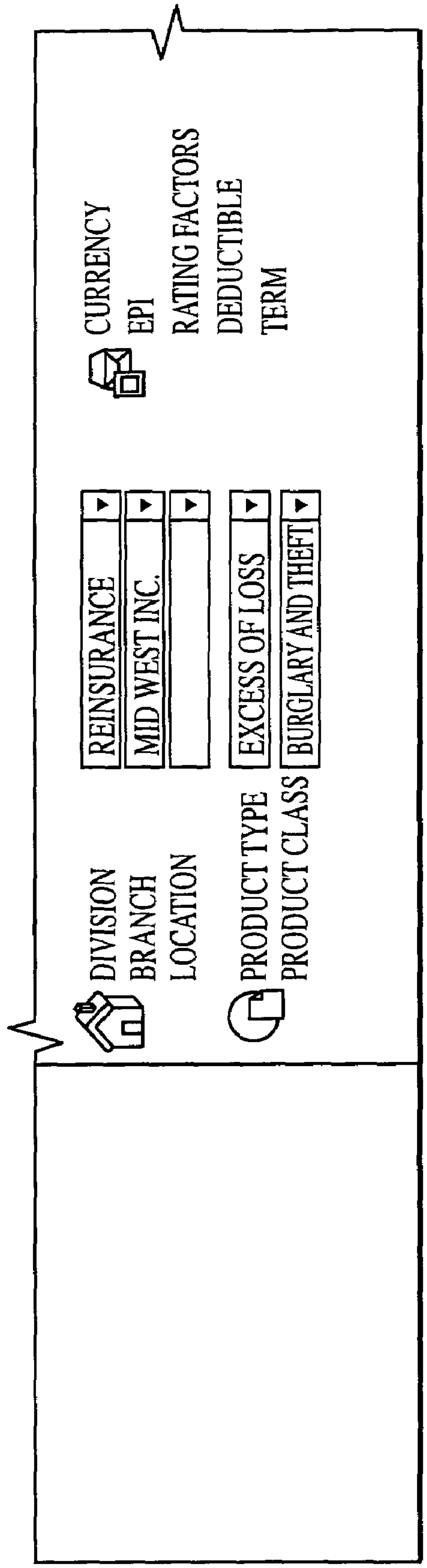
Figure 156D:
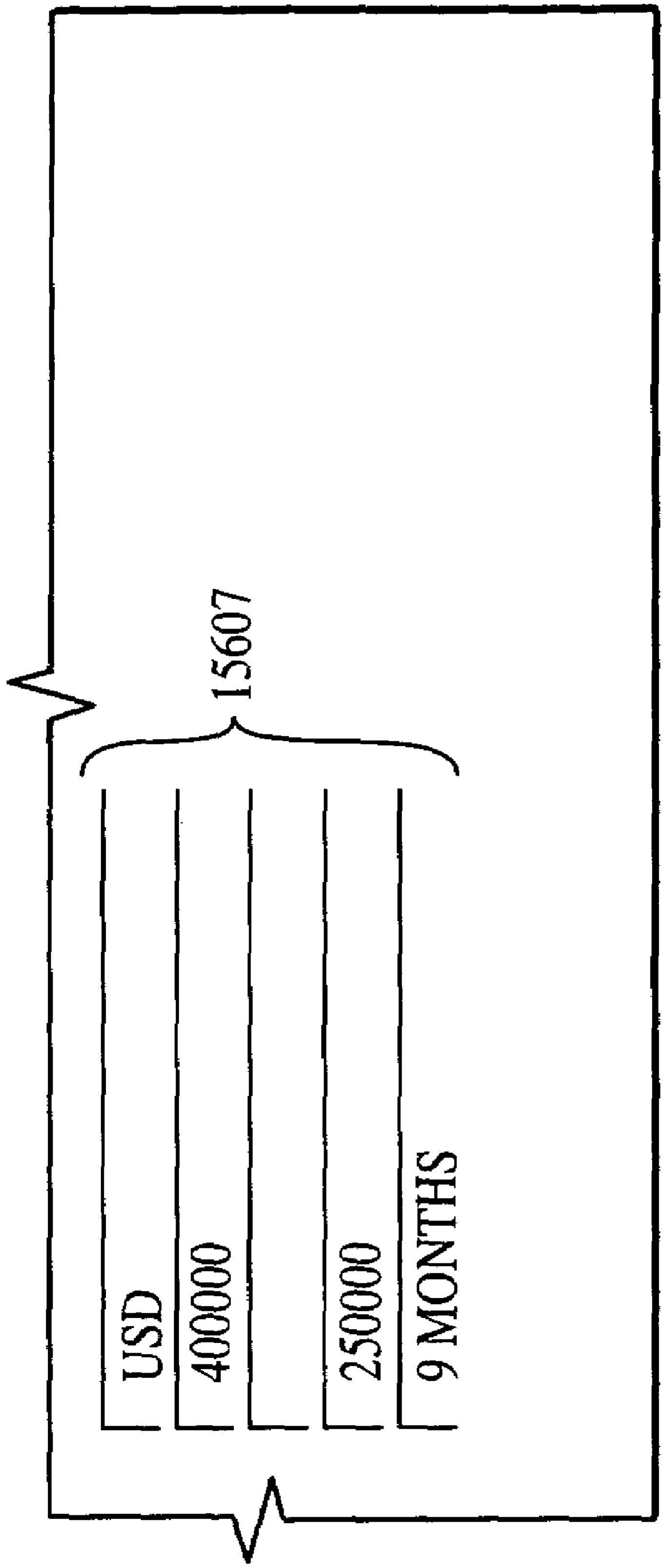

FIG. 156 illustrates an example user interface showing a display of a summary profile for a selected project, according to one or more embodiments of the present invention.

Figure 157A:
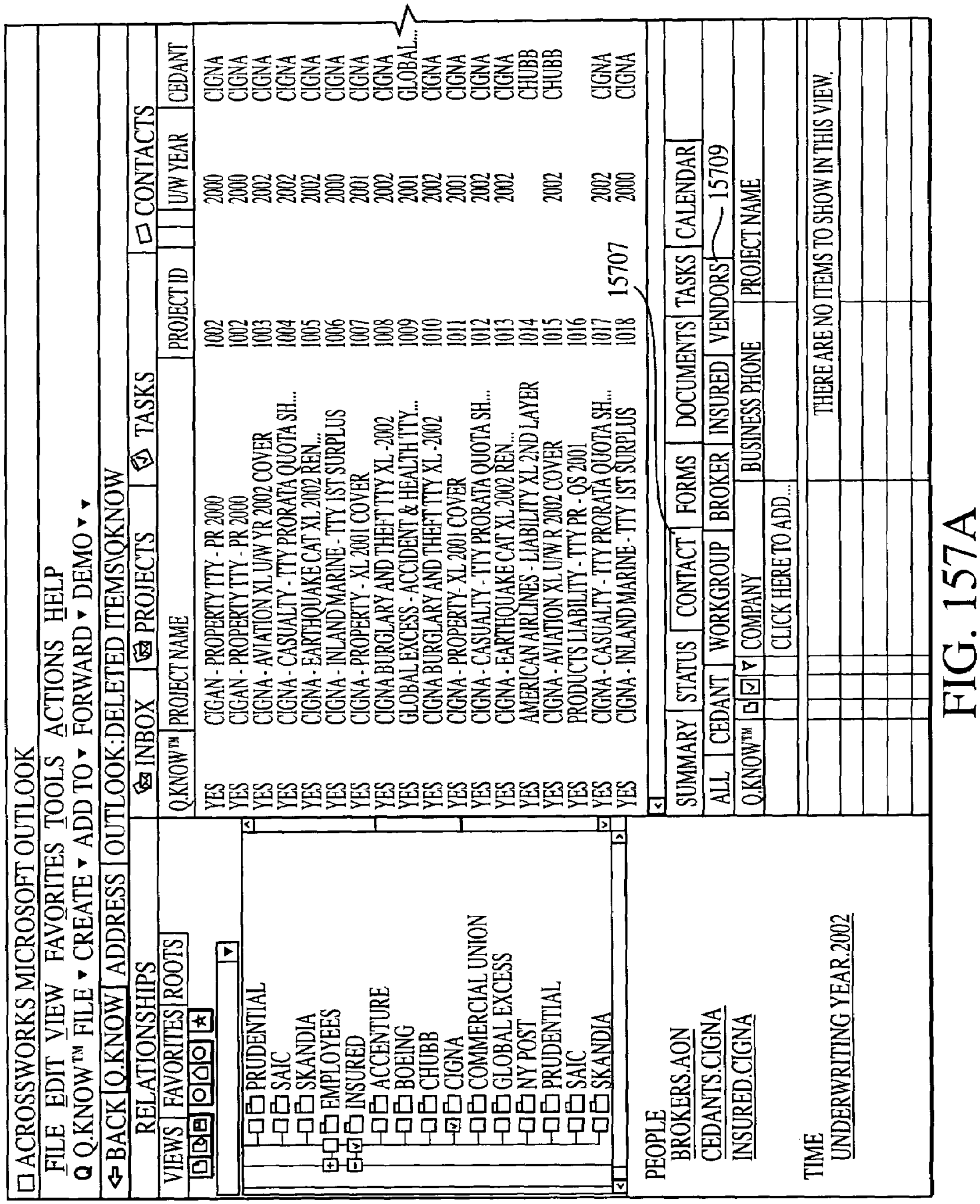
Figure 157:
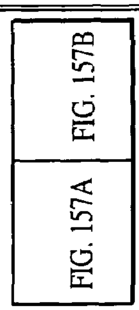
Figure 157B:
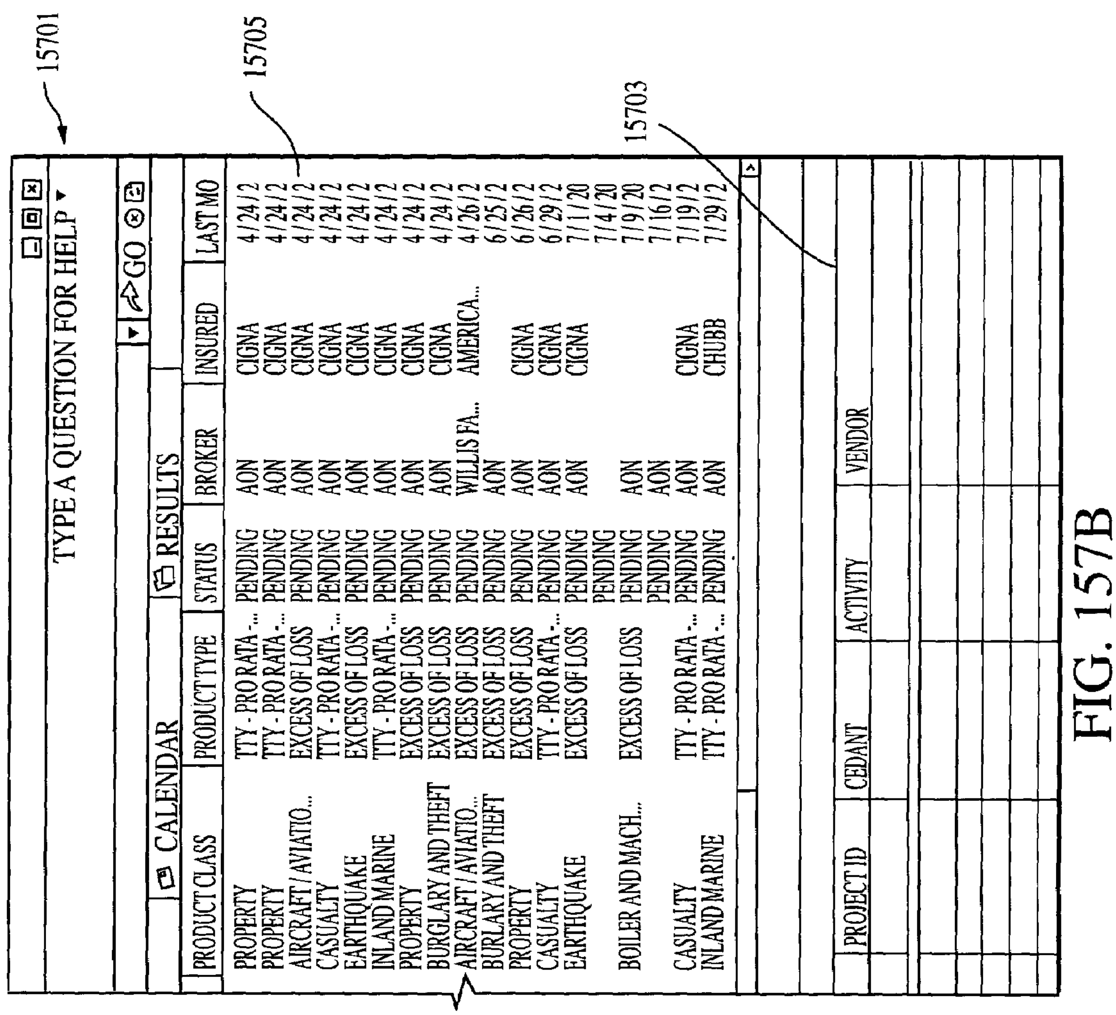

FIG. 157 illustrates an example user interface showing a display of contacts constituting a work group, linked to the selected project, according to one or more embodiments of the present invention.

Figure 158B:
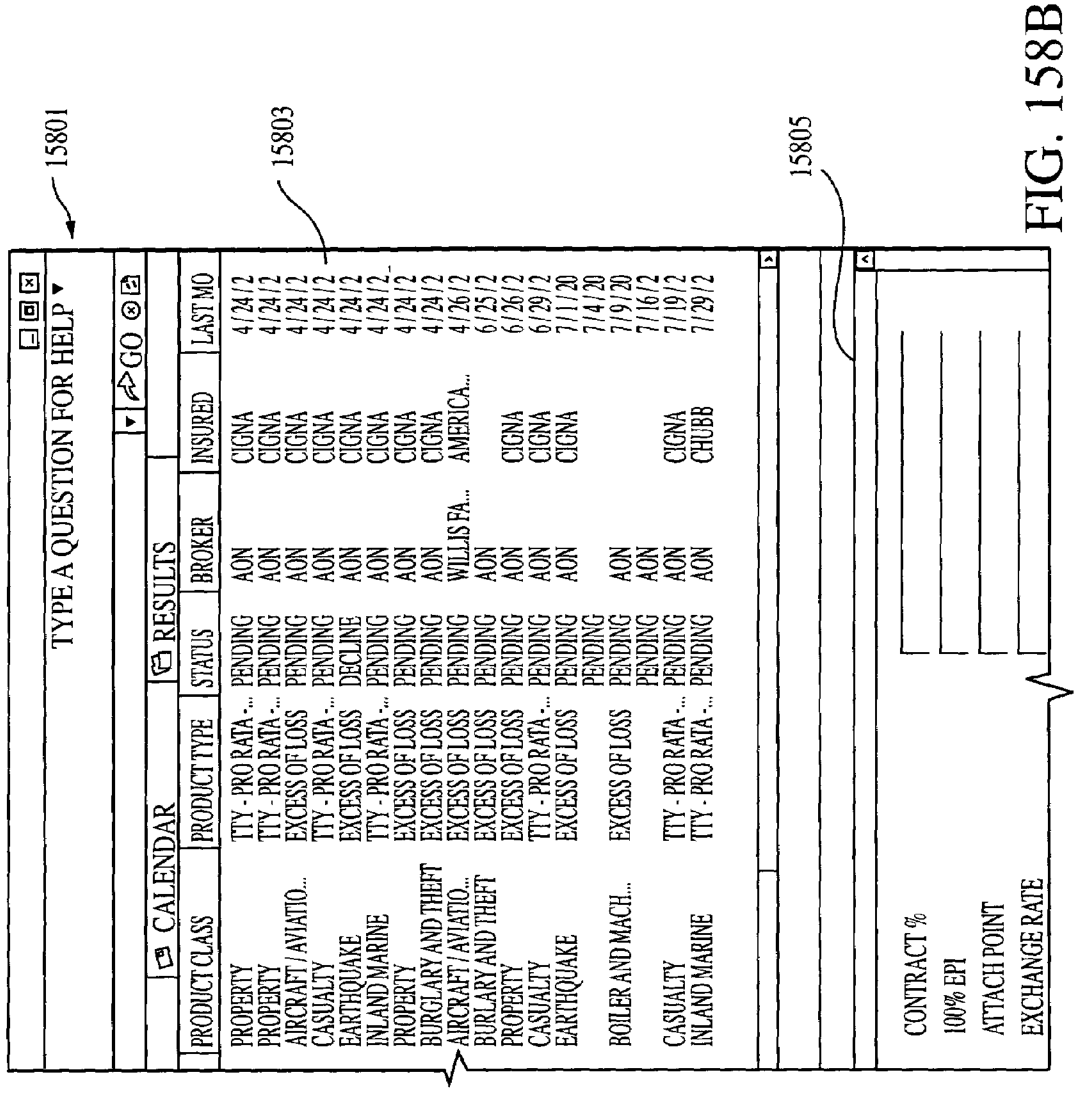
Figure 158C:
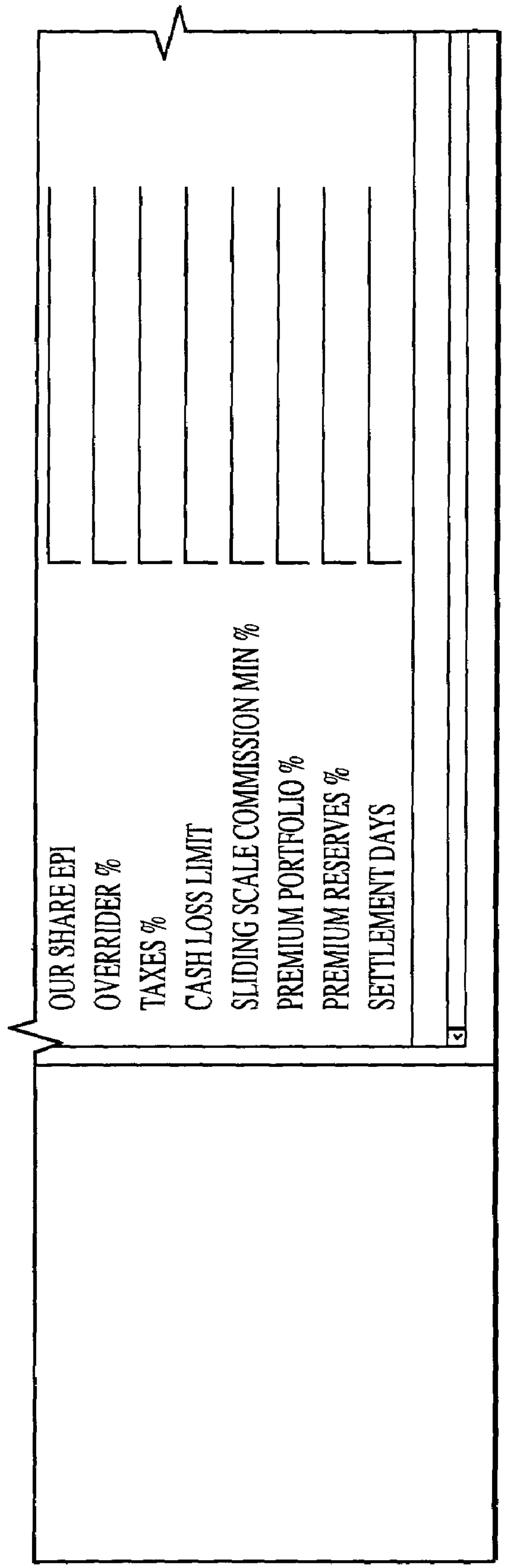
Figure 158D:
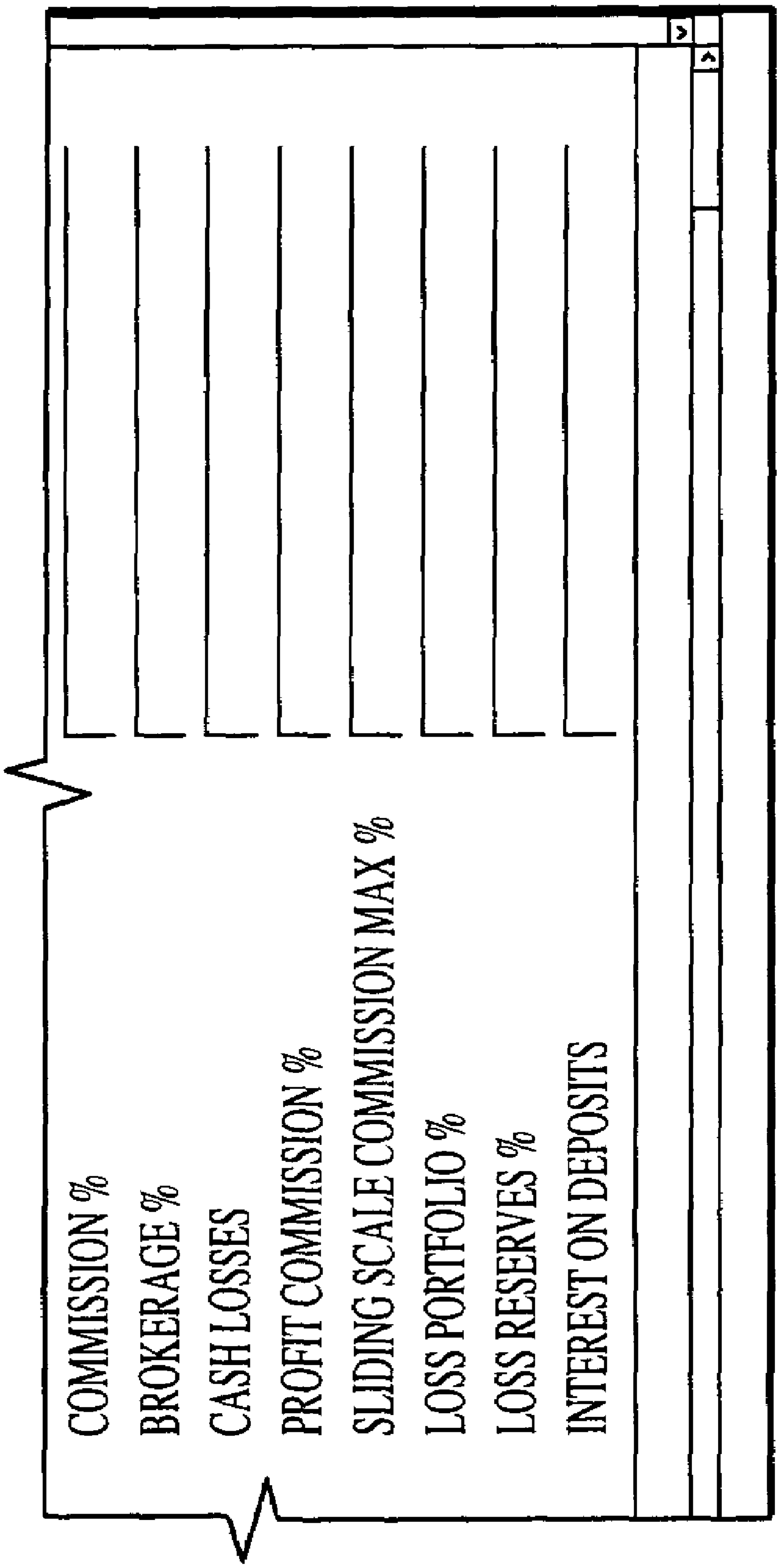

FIG. 158 illustrates an example user interface showing a display of industry-specific data entry forms associated with the selected project, corresponding with, and connecting to a legacy system, according to one or more embodiments of the present invention.

Figure 159A:
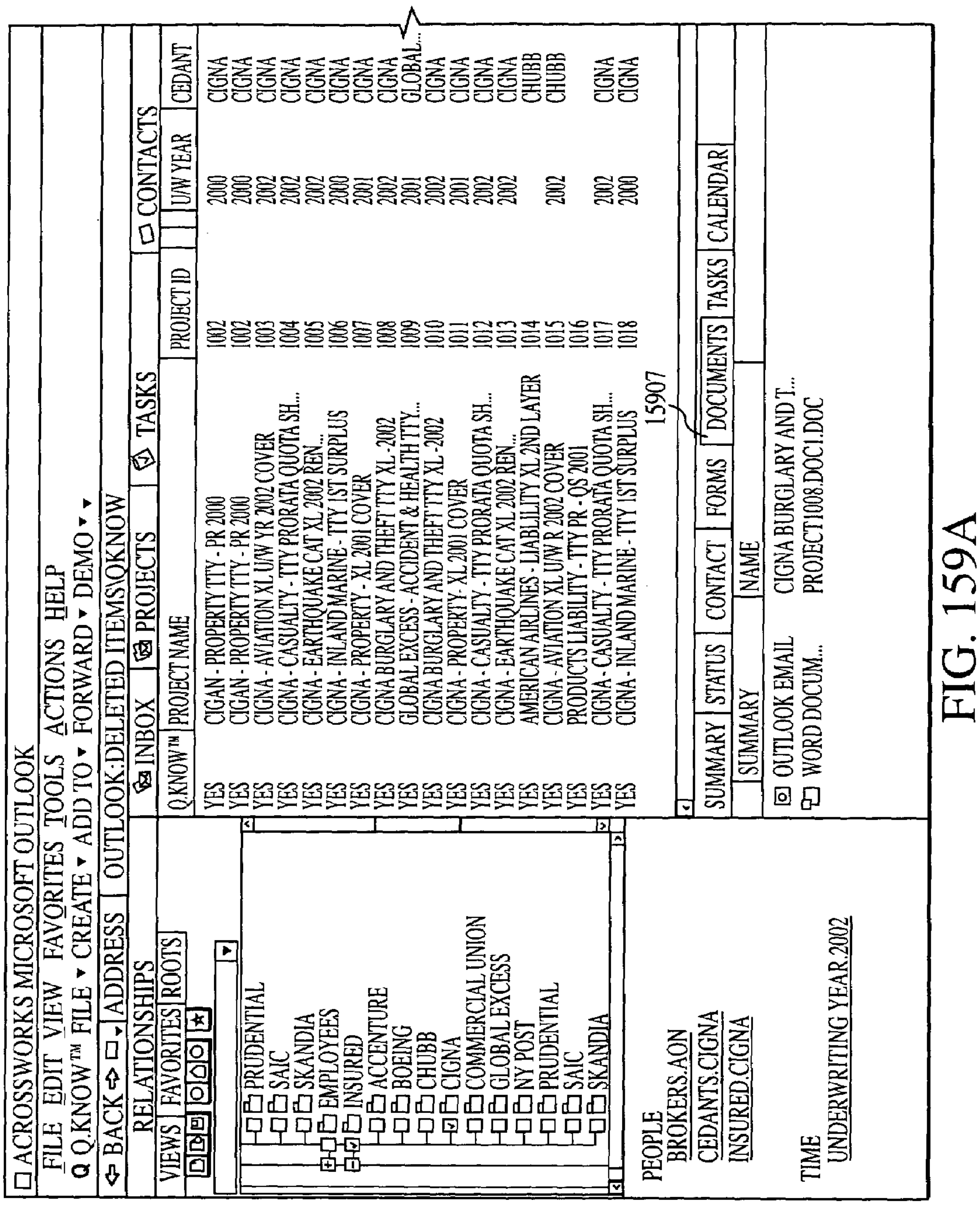
Figure 159:
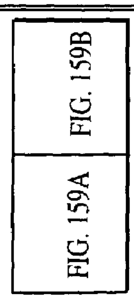
Figure 159B:
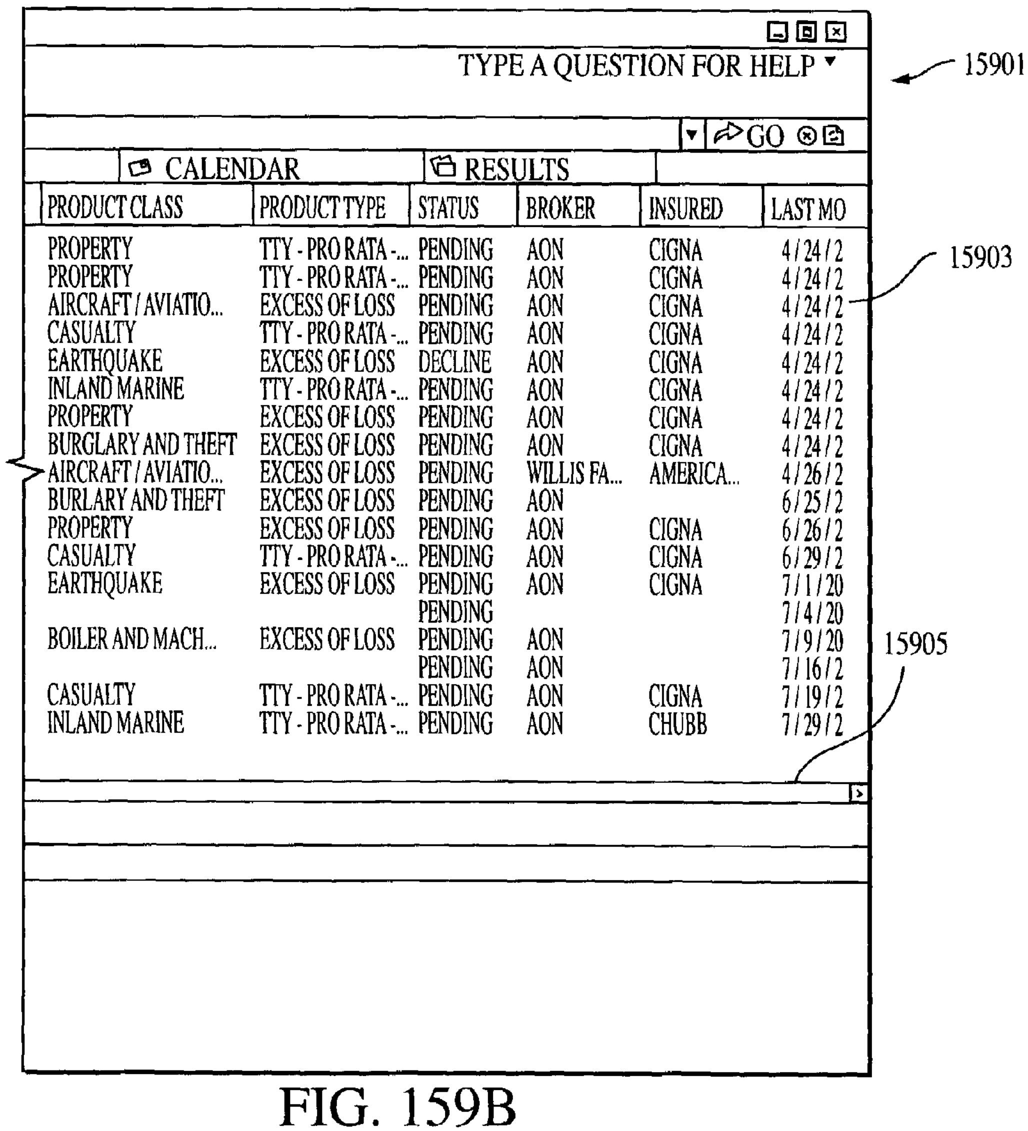

FIG. 159 illustrates an example user interface showing a listing of filed items (document and email) associated with a project, according to one or more embodiments of the present invention.

Figure 160:
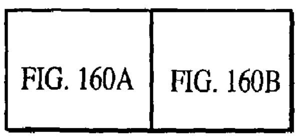
Figure 160A:
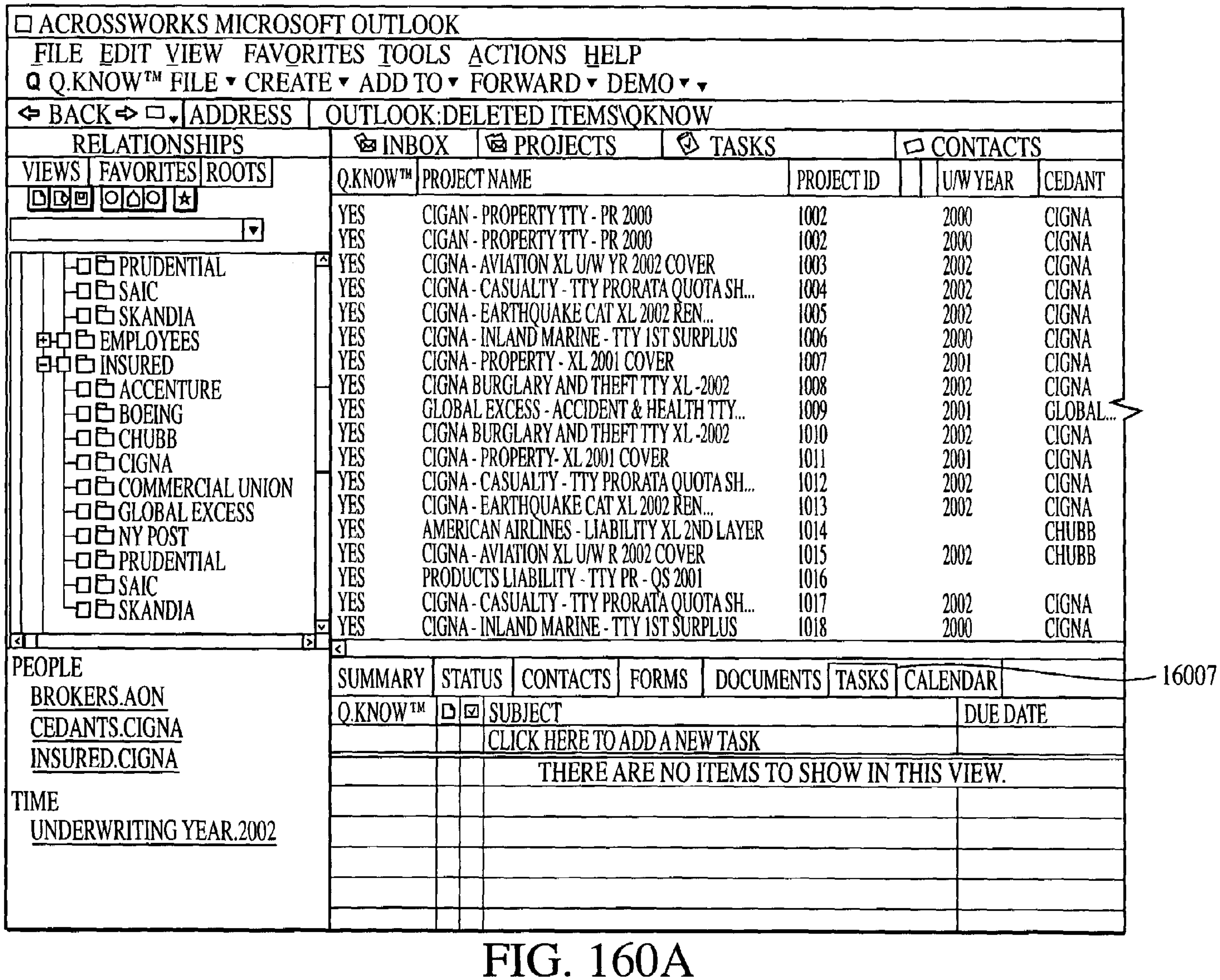
Figure 160B:
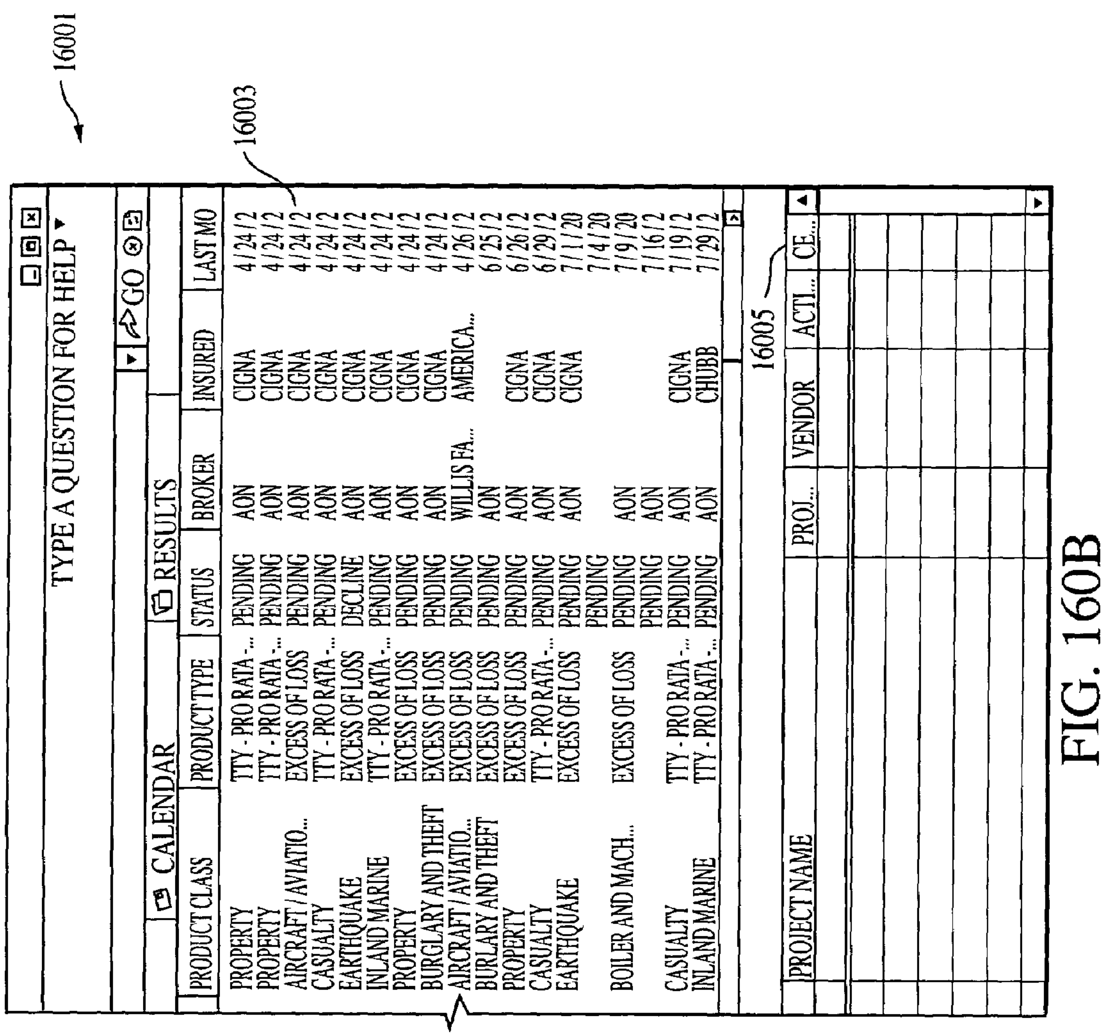

FIG. 160 illustrates an example user interface showing a listing of filed tasks associated with a project, according to one or more embodiments of the present invention.

Figure 161:
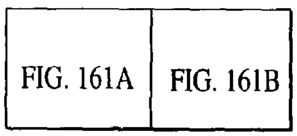
Figure 161A:
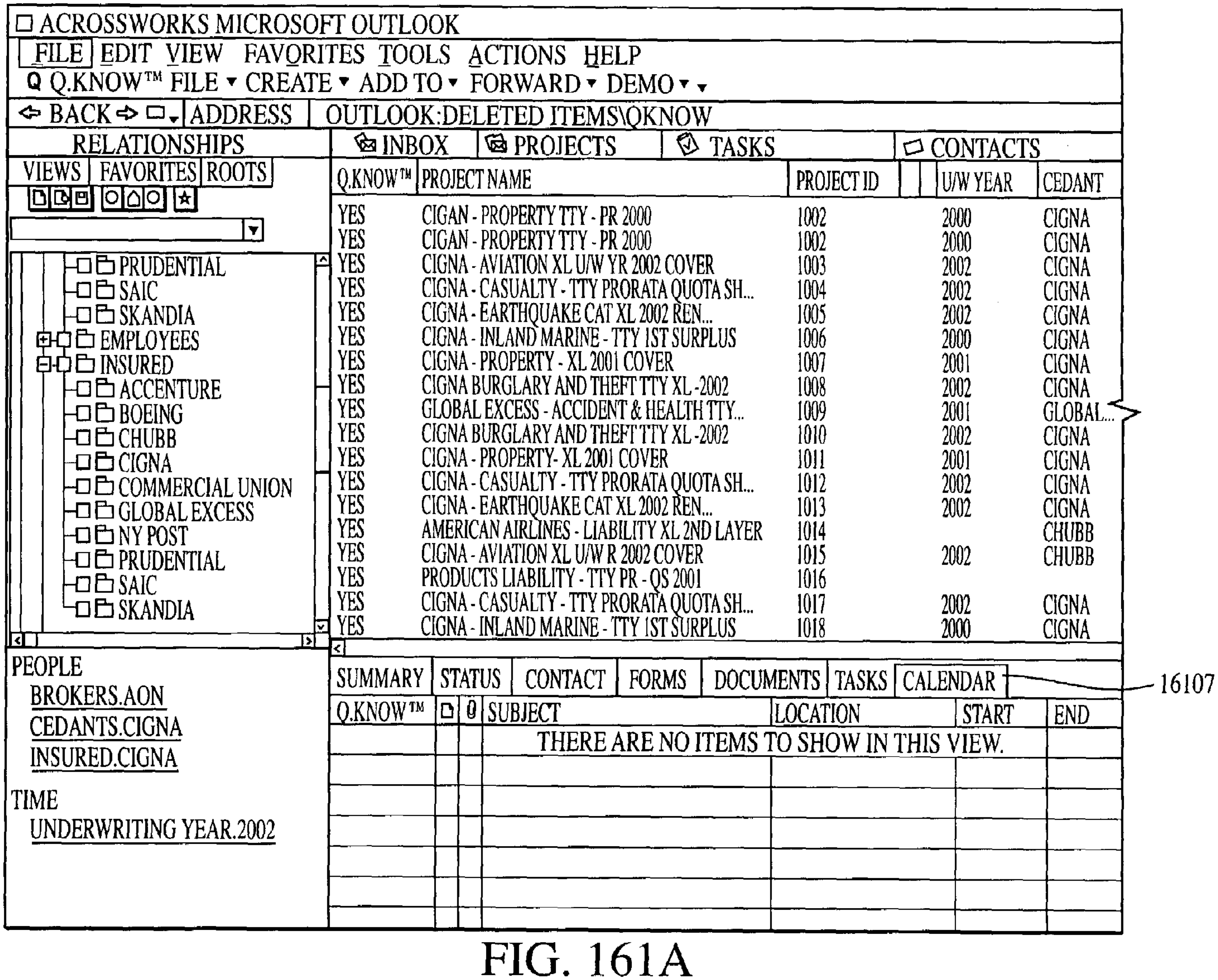
Figure 161B:
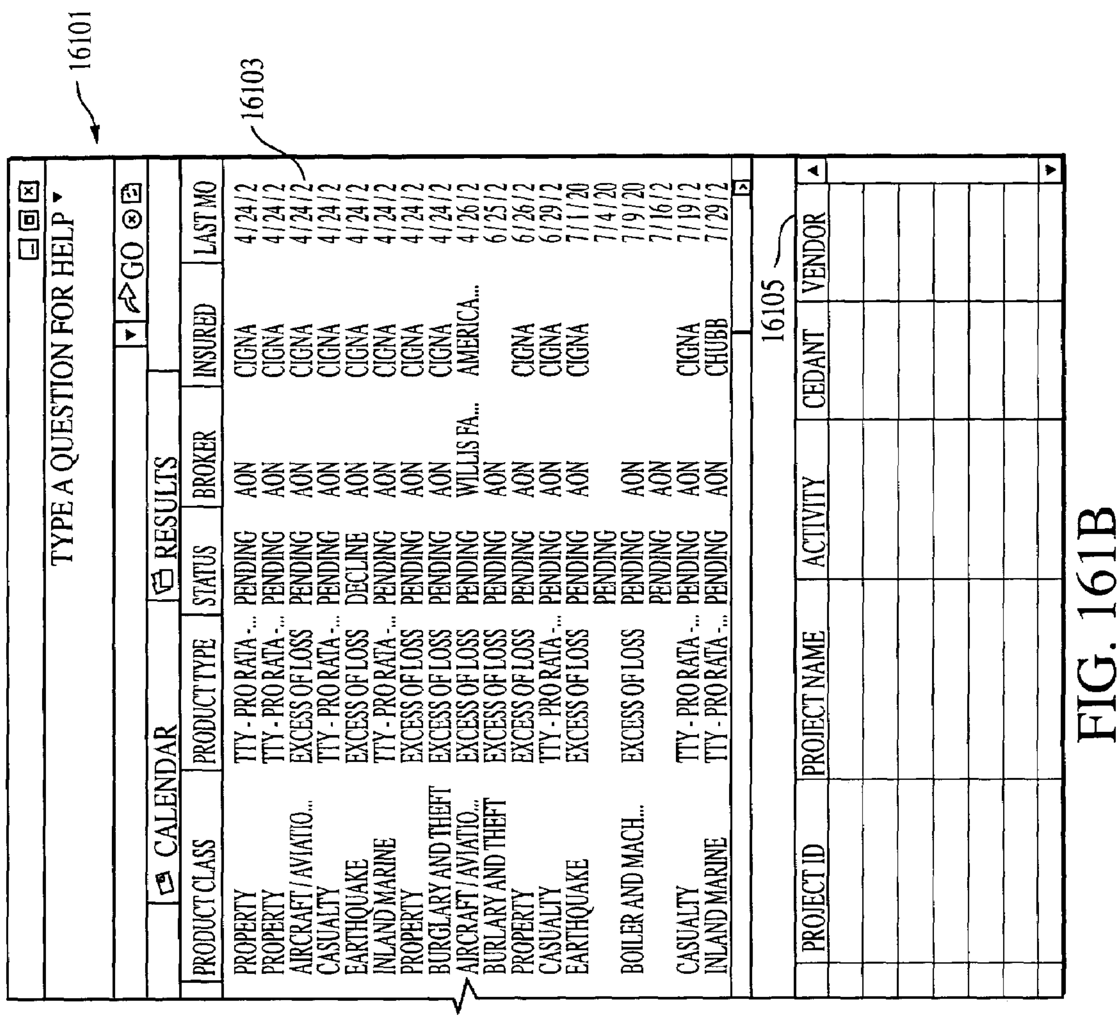

FIG. 161 illustrates an example user interface showing a listing of filed meetings associated with a project, according to one or more embodiments of the present invention.

Figure 162:
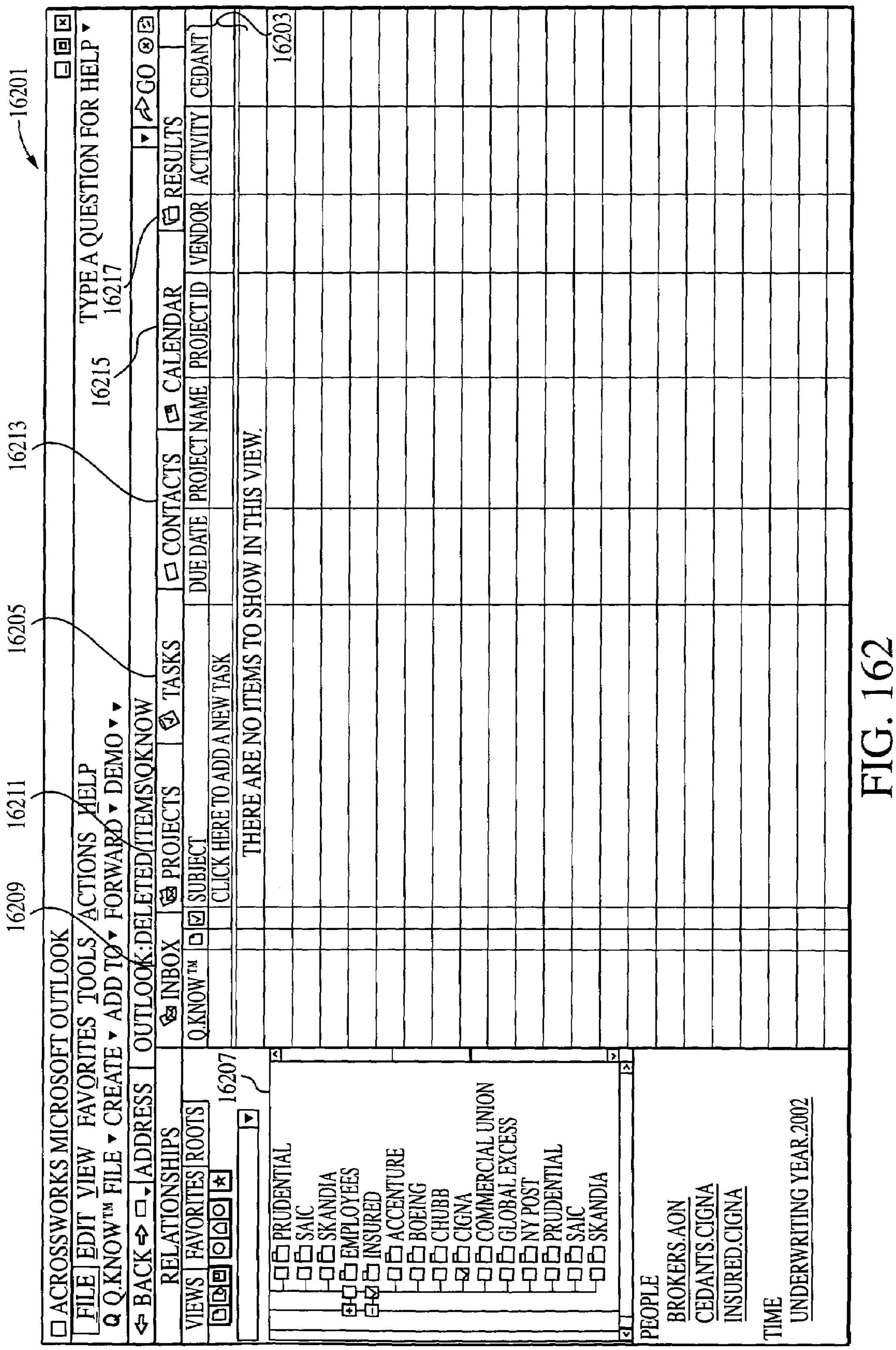

FIG. 162 illustrates an example user interface showing a listing of tasks corresponding to specified relationships (classes, references and/or keywords), according to one or more embodiments of the present invention.

Figures 163, 163A:
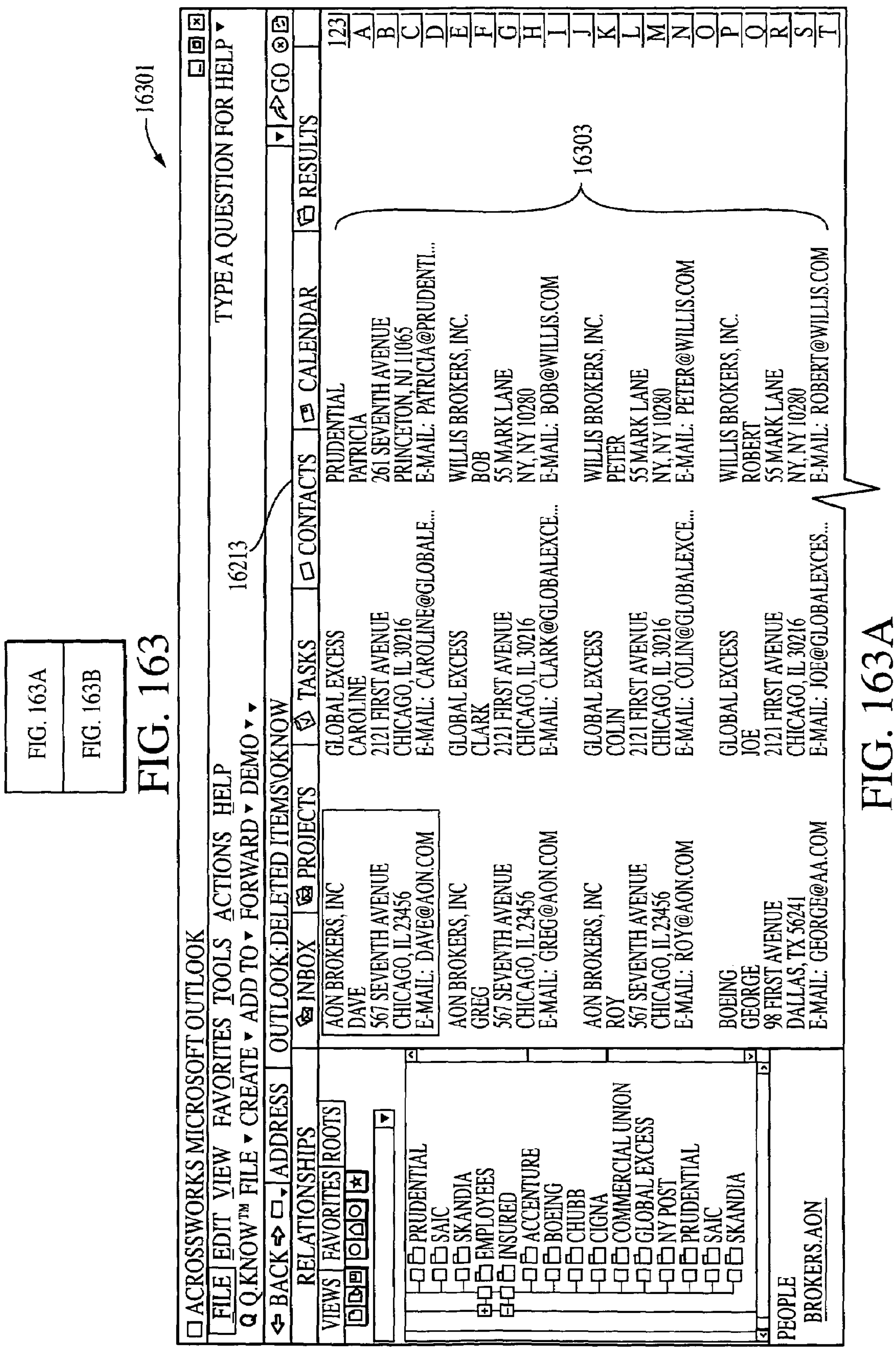
Figure 163B:
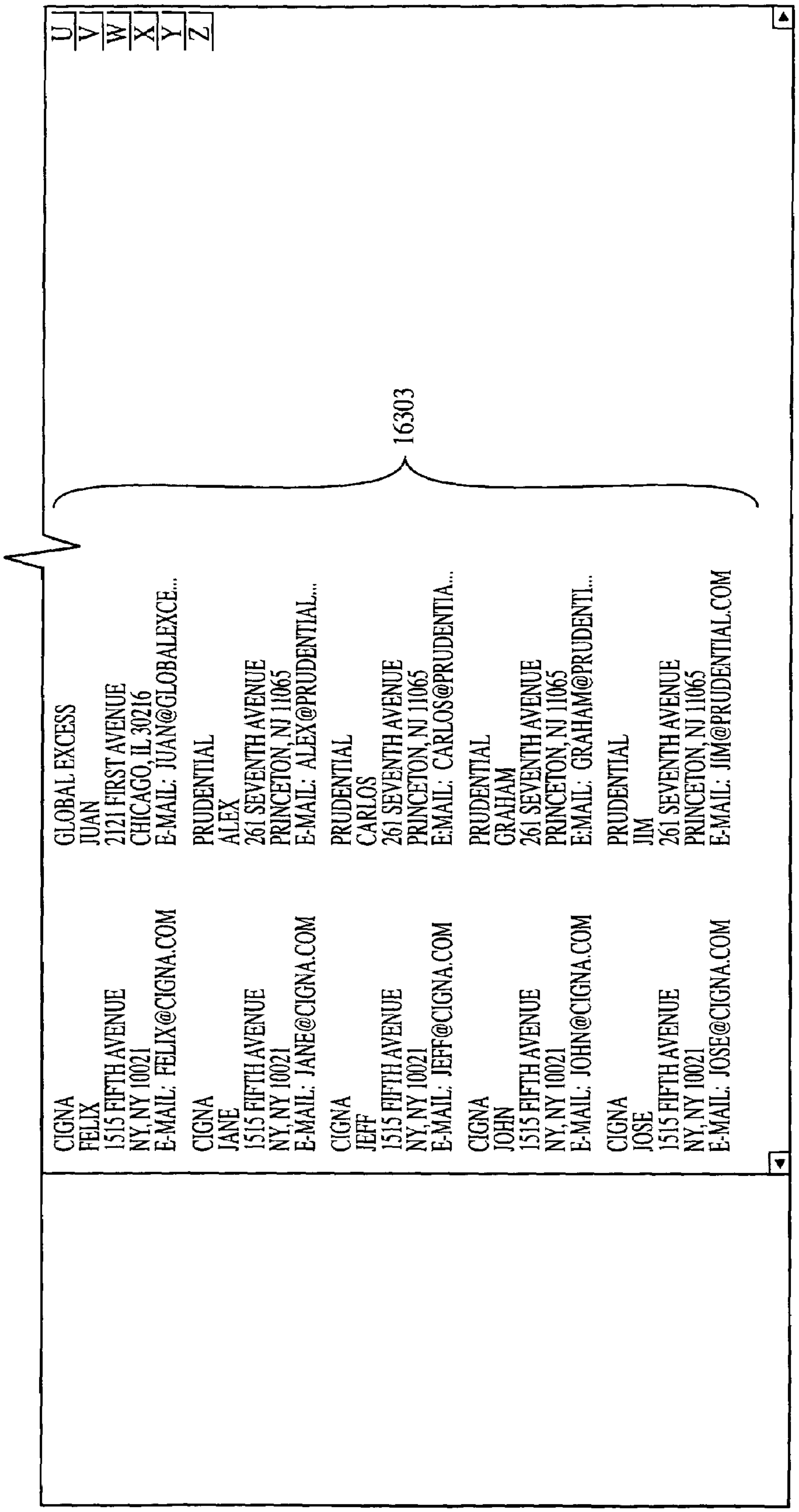

FIG. 163 illustrates an example user interface showing a listing of contacts corresponding to specified relationships (classes, references and/or keywords), according to one or more embodiments of the present invention.

Figure 164:
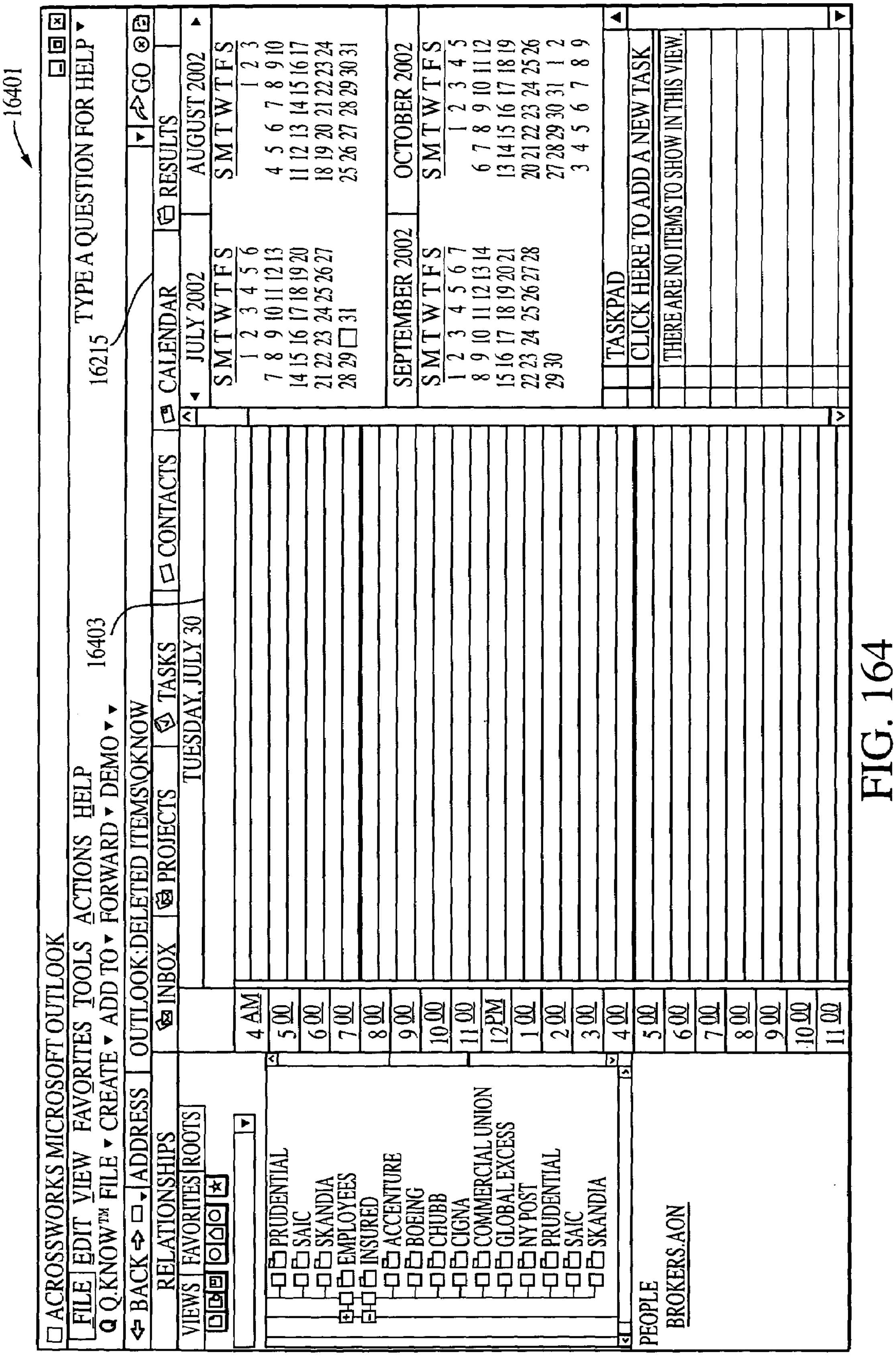

FIG. 164 illustrates an example user interface showing a listing of meetings corresponding to specified relationships (classes, references and/or keywords), according to one or more embodiments of the present invention.

Figure 165:
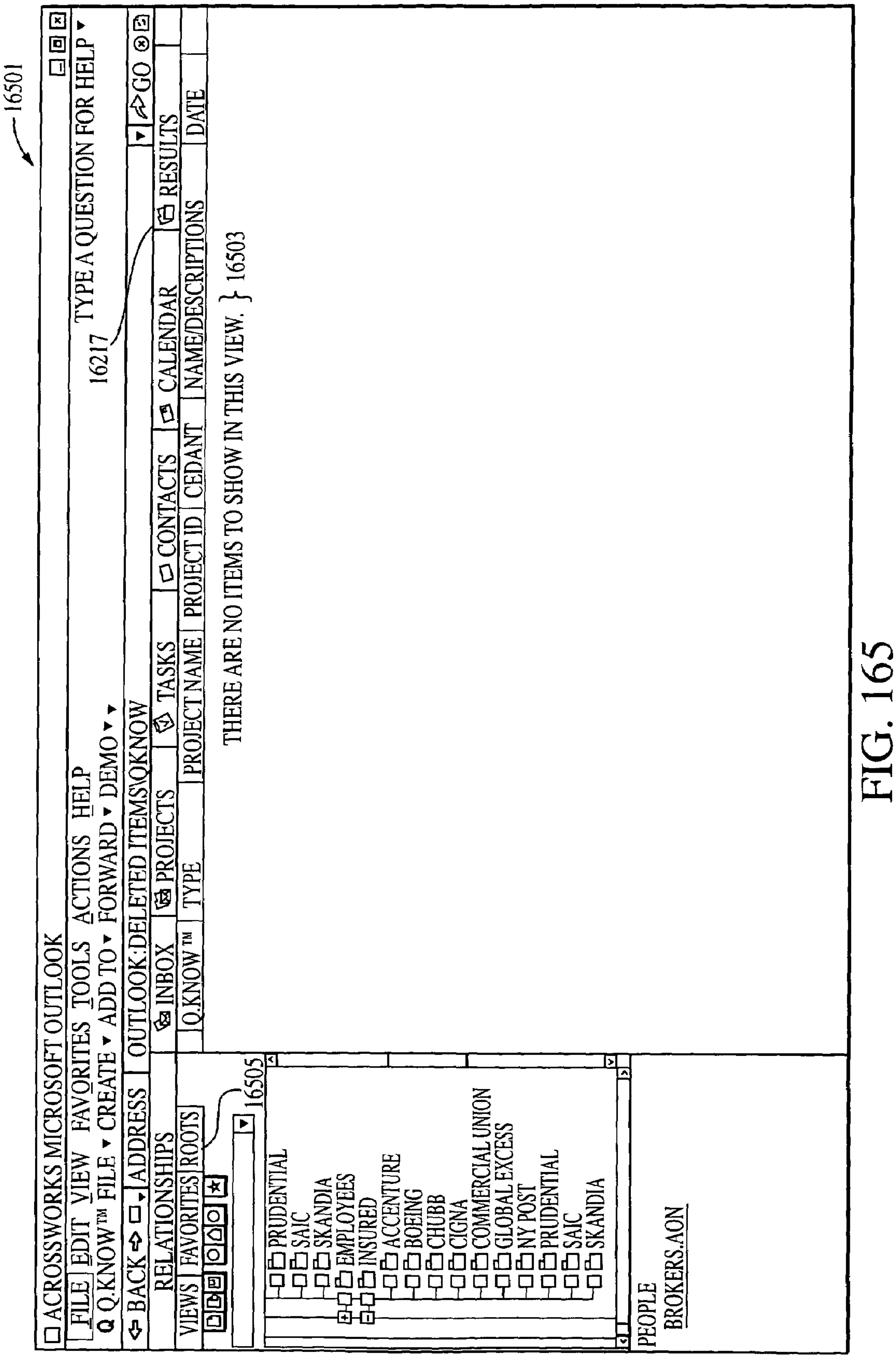

FIG. 165 illustrates an example user interface showing a listing of results corresponding to specified roots (classes) and references (keywords), according to one or more embodiments of the present invention.

Figure 166:
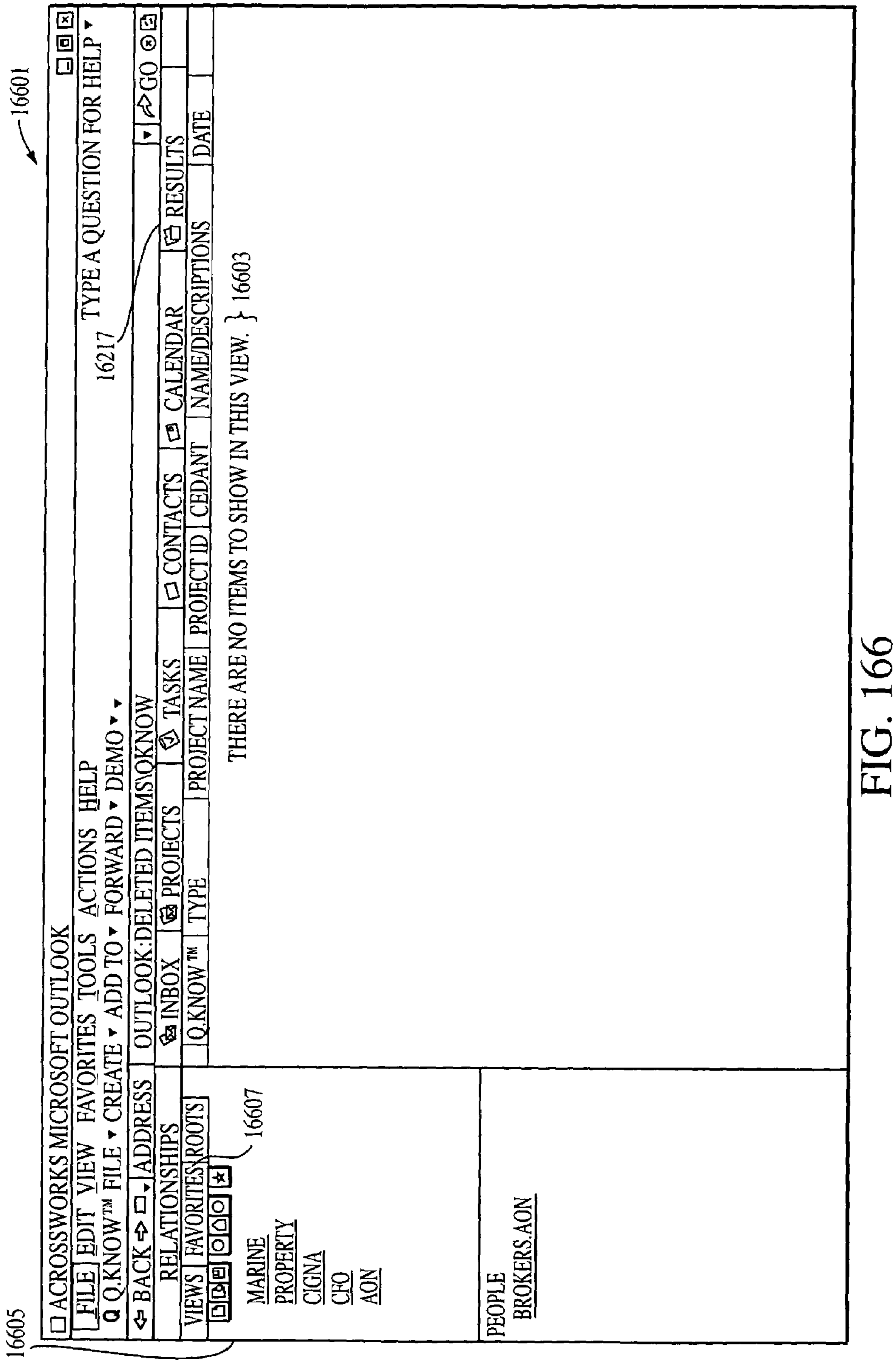

FIG. 166 illustrates an example user interface showing a listing of projects corresponding to specified favorites and references (keywords), according to one or more embodiments of the present invention.

Figure 167:
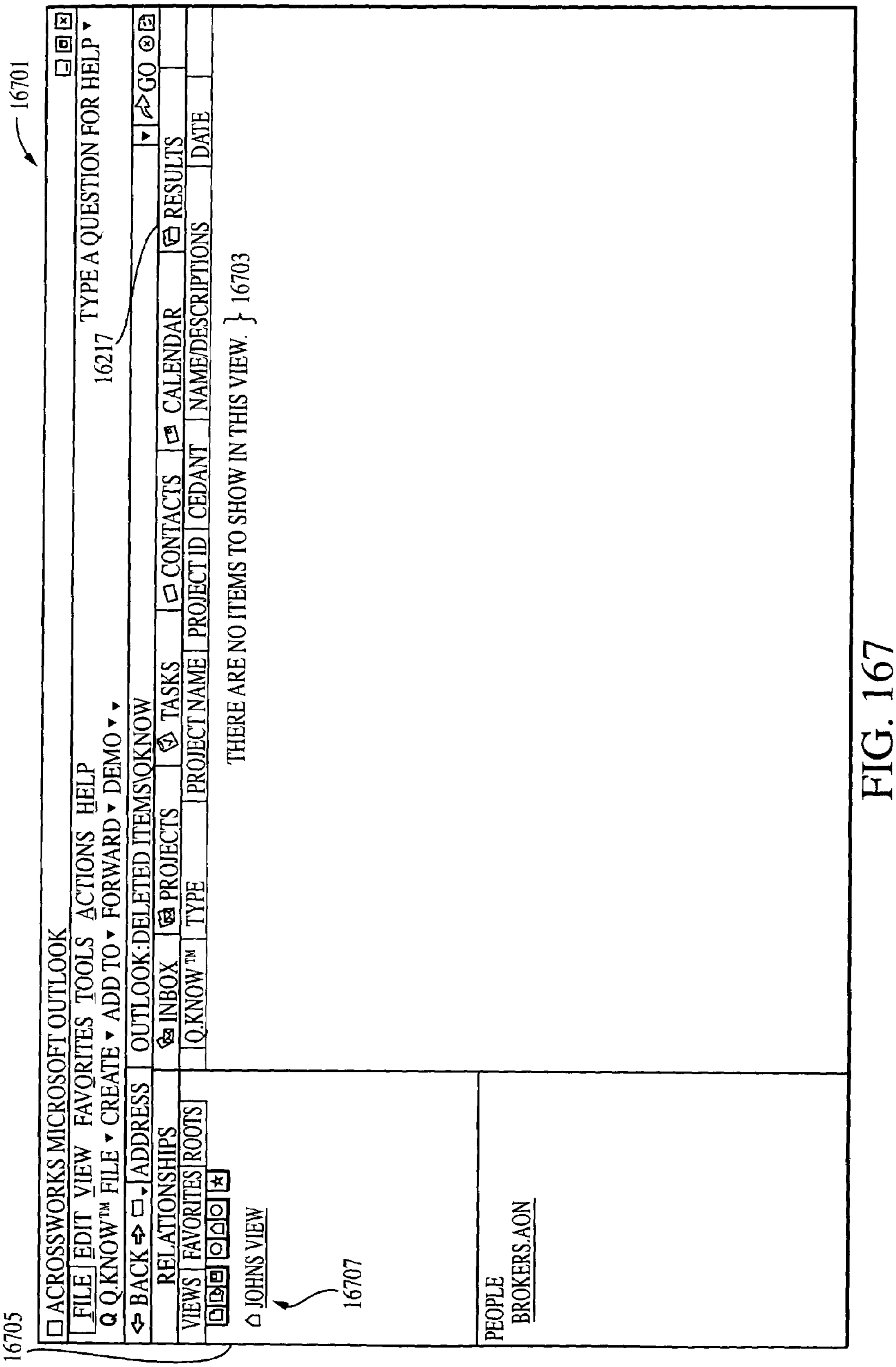

FIG. 167 illustrates an example user interface showing a listing of results corresponding to specified views and references (keywords), according to one or more embodiments of the present invention.

Figure 168:
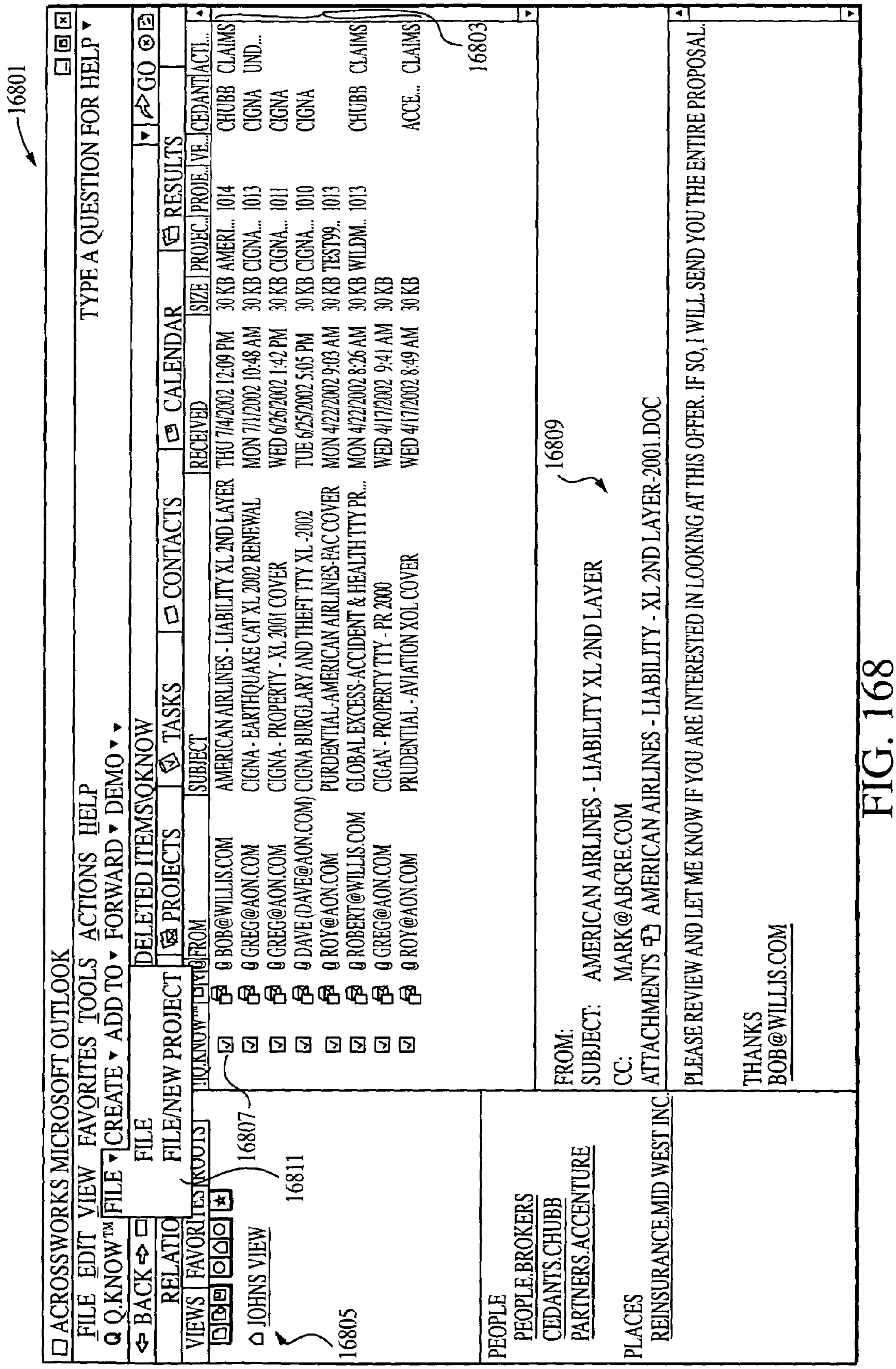

FIG. 168 illustrates an example user interface showing a listing of e-mail in an inbox corresponding to specified view, to be filed, together with a display of a selected e-mail, according to one or more embodiments of the present invention.

Figure 169:
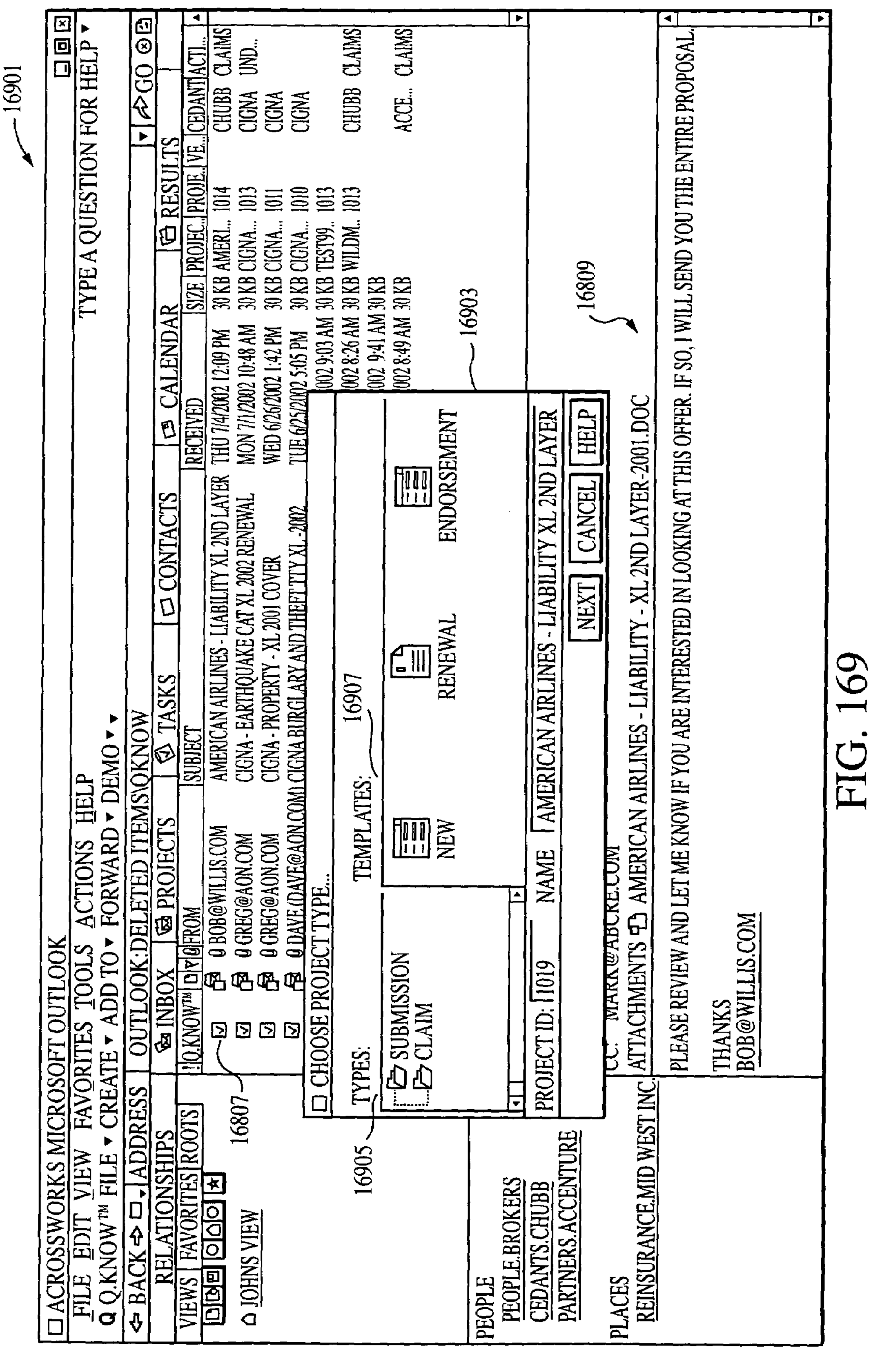

FIG. 169 illustrates an example user interface showing a selection of a project type for use in connection with filing the selected e-mail, according to one or more embodiments of the present invention.

Figure 170:
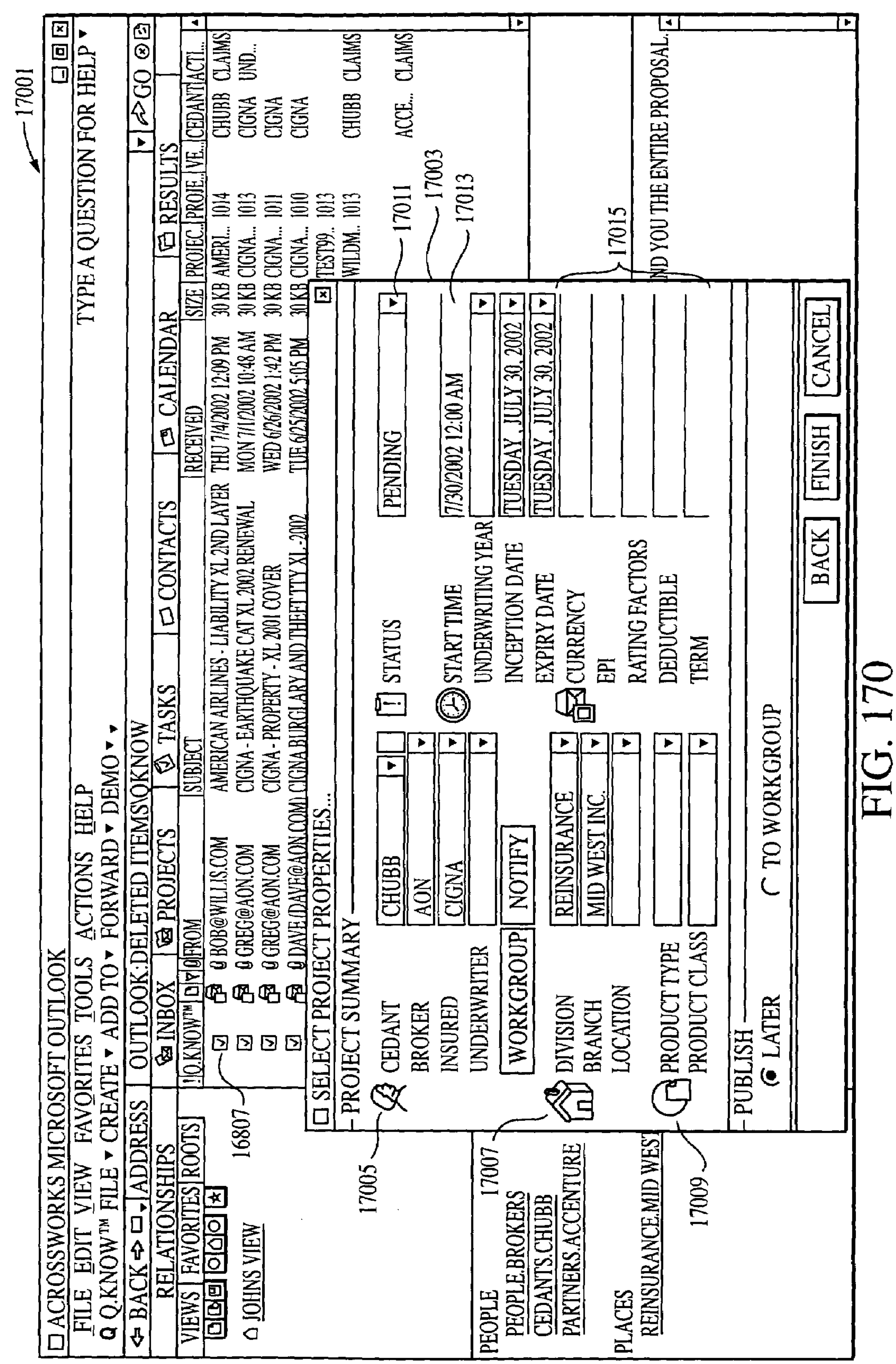

FIG. 170 illustrates an example user interface showing obtaining project properties by use of a work group for use in connection with filing the selected e-mail, according to one or more embodiments of the present invention.

Figure 171:
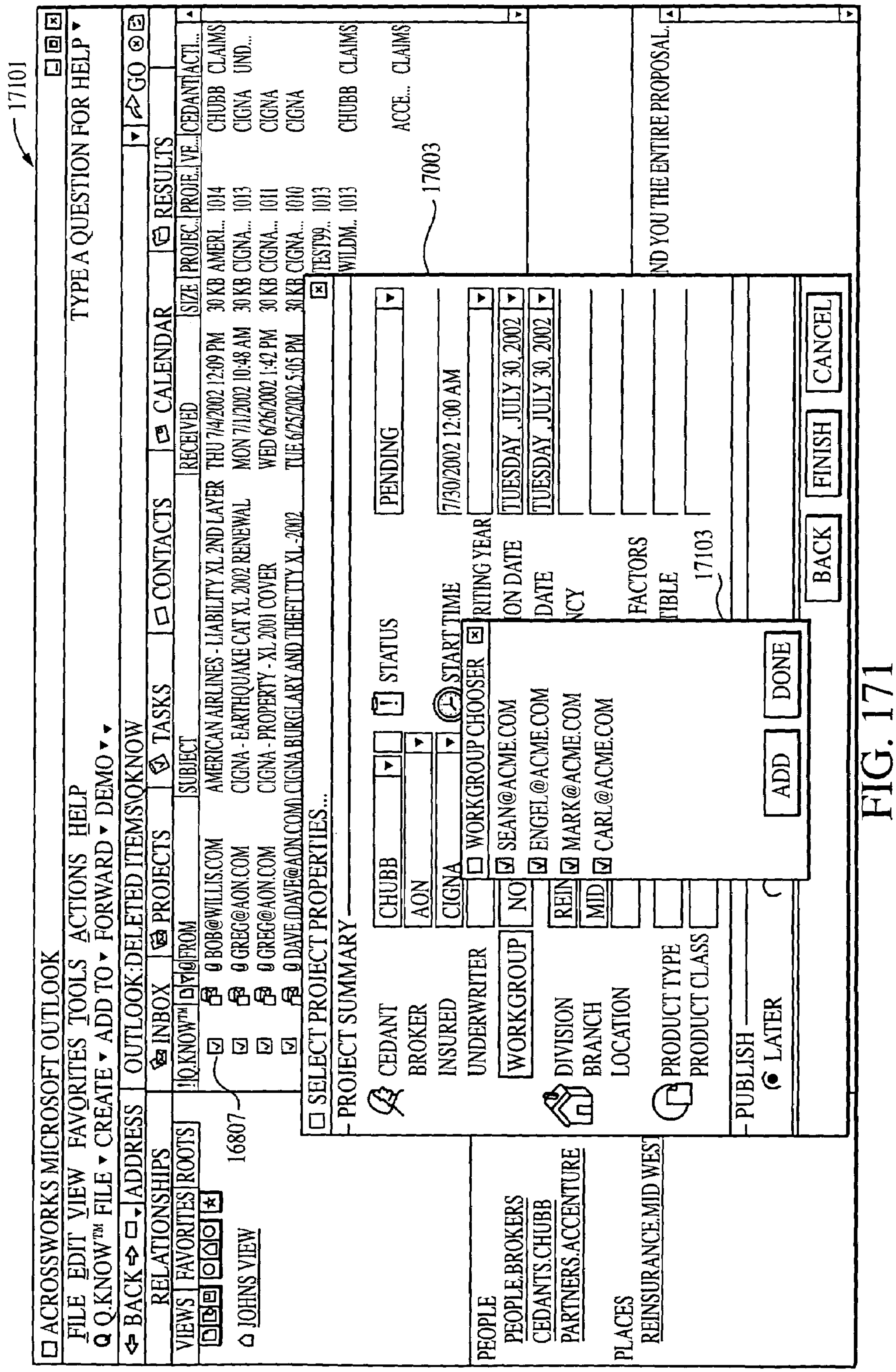

FIG. 171 illustrates an example user interface showing further specification of project properties with customizable fields for use in connection with filing the selected e-mail, according to one or more embodiments of the present invention.

Figure 172:
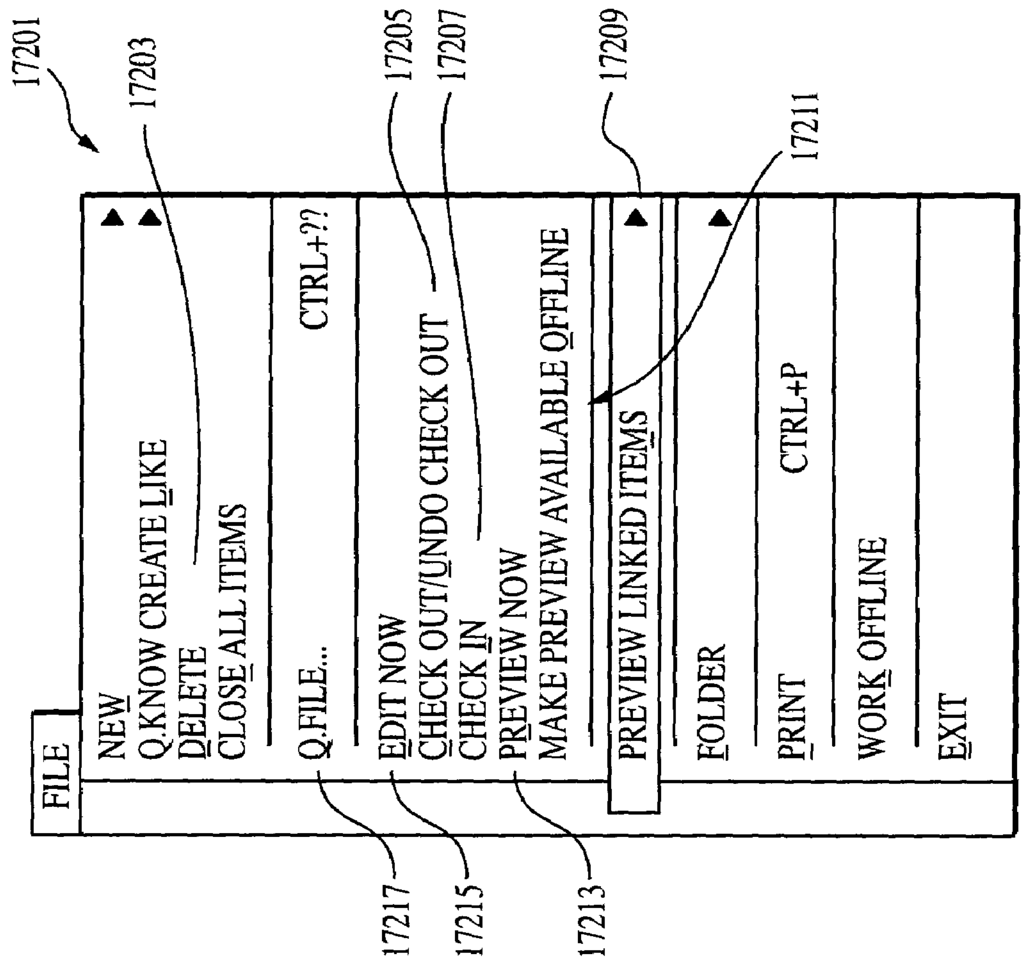

FIG. 172 illustrates an example user menu for filing/retagging a selected item, checking in/out a selected item and opening/deleting an editable item, according to one or more embodiments of the present invention.

Figure 173:
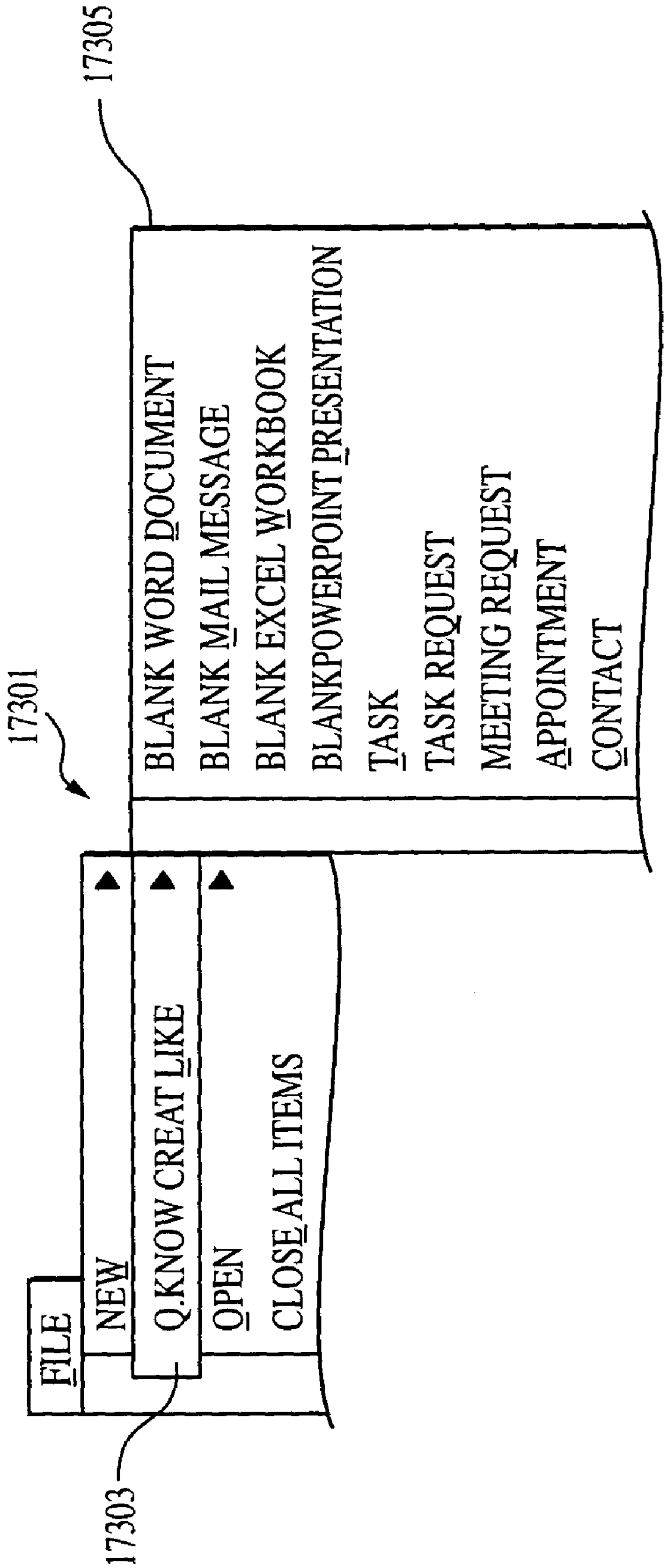

FIG. 173 illustrates an example user menu for creating a new item with tags from a selected item, according to one or more embodiments of the present invention.

Figure 174:
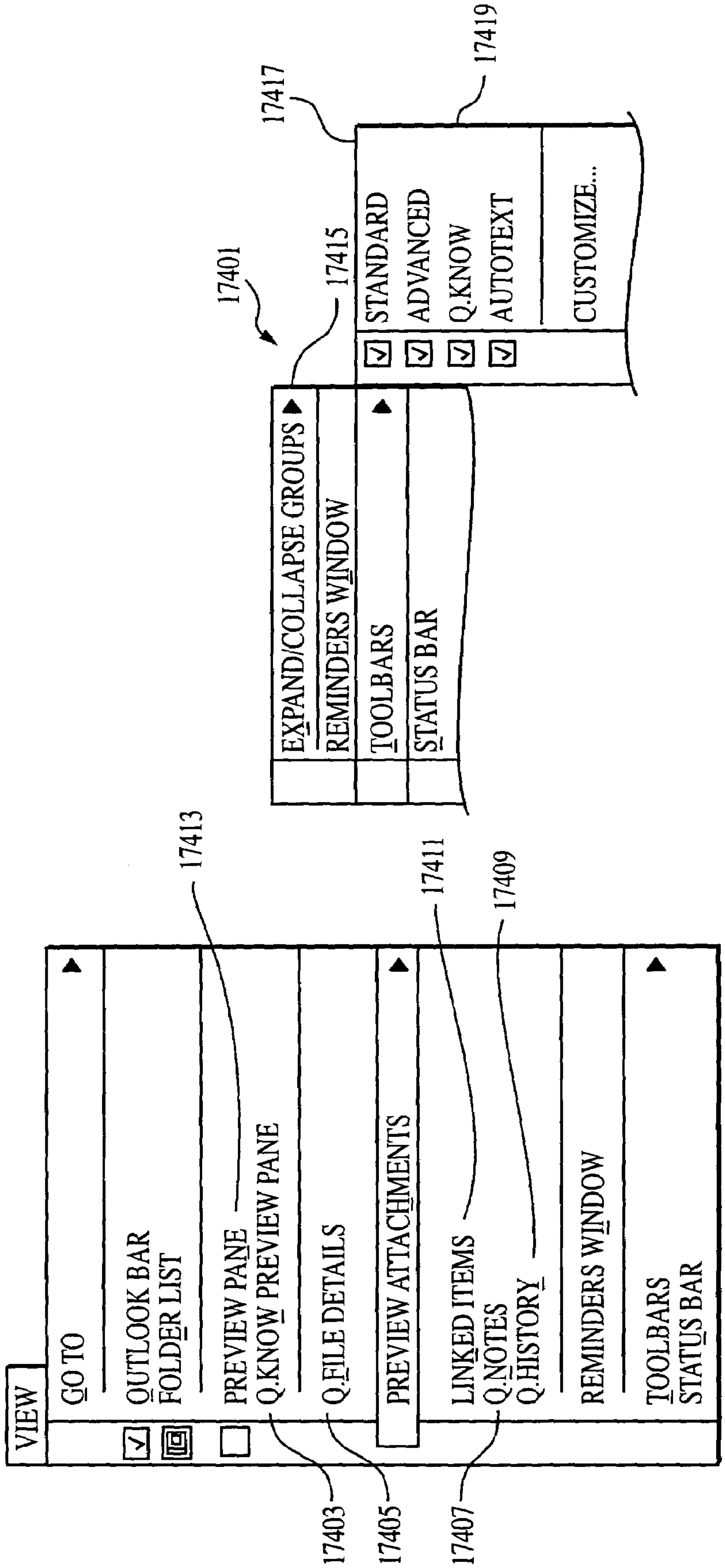

FIG. 174 illustrates an example user menu for previewing a selected item, including notes, history, linked items, and/or attachments, according to one or more embodiments of the present invention.

Figure 175:
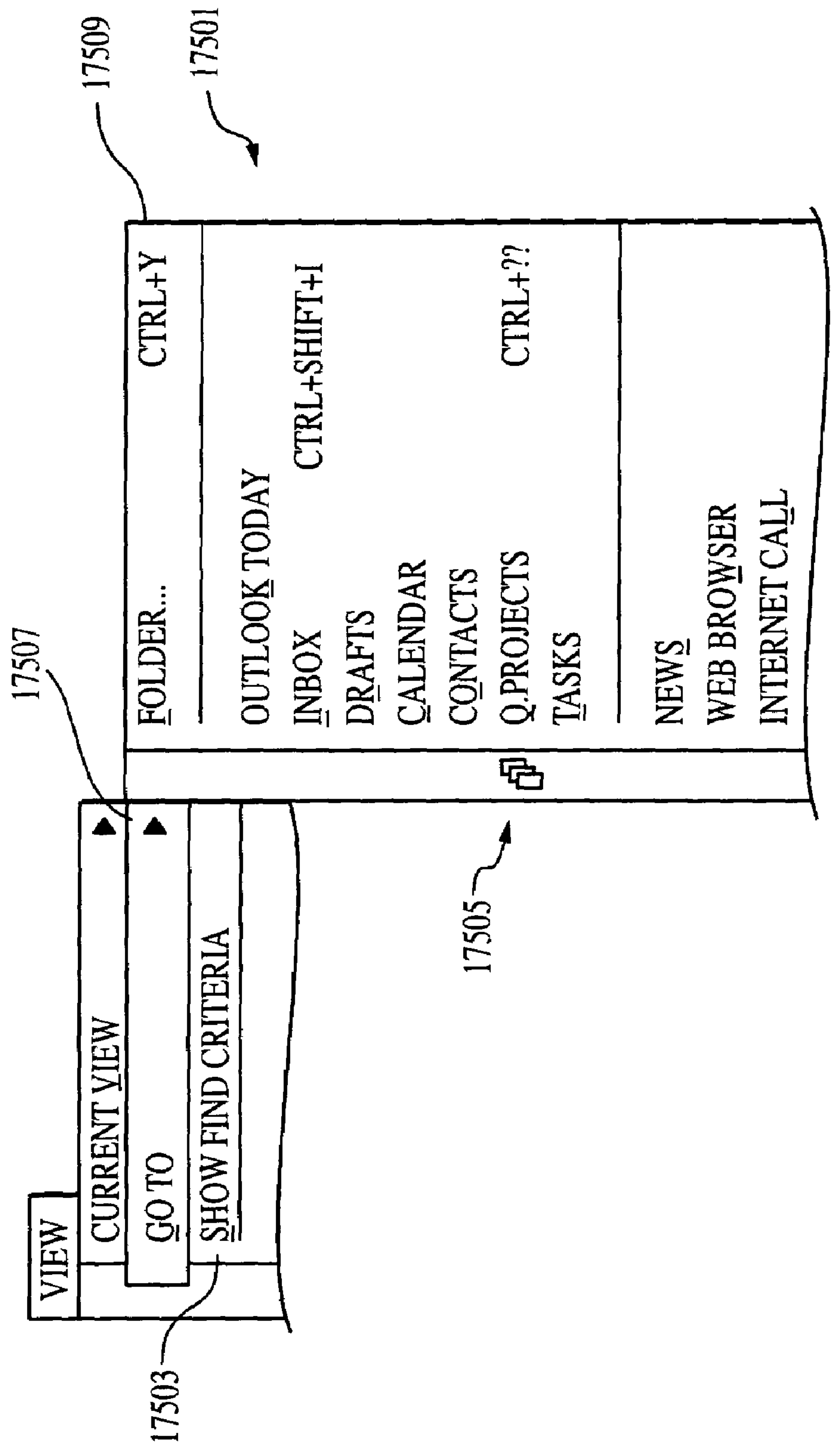

FIG. 175 illustrates an example user menu for finding/opening a specified project in the Outlook frame, according to one or more embodiments of the present invention.

Figure 176:
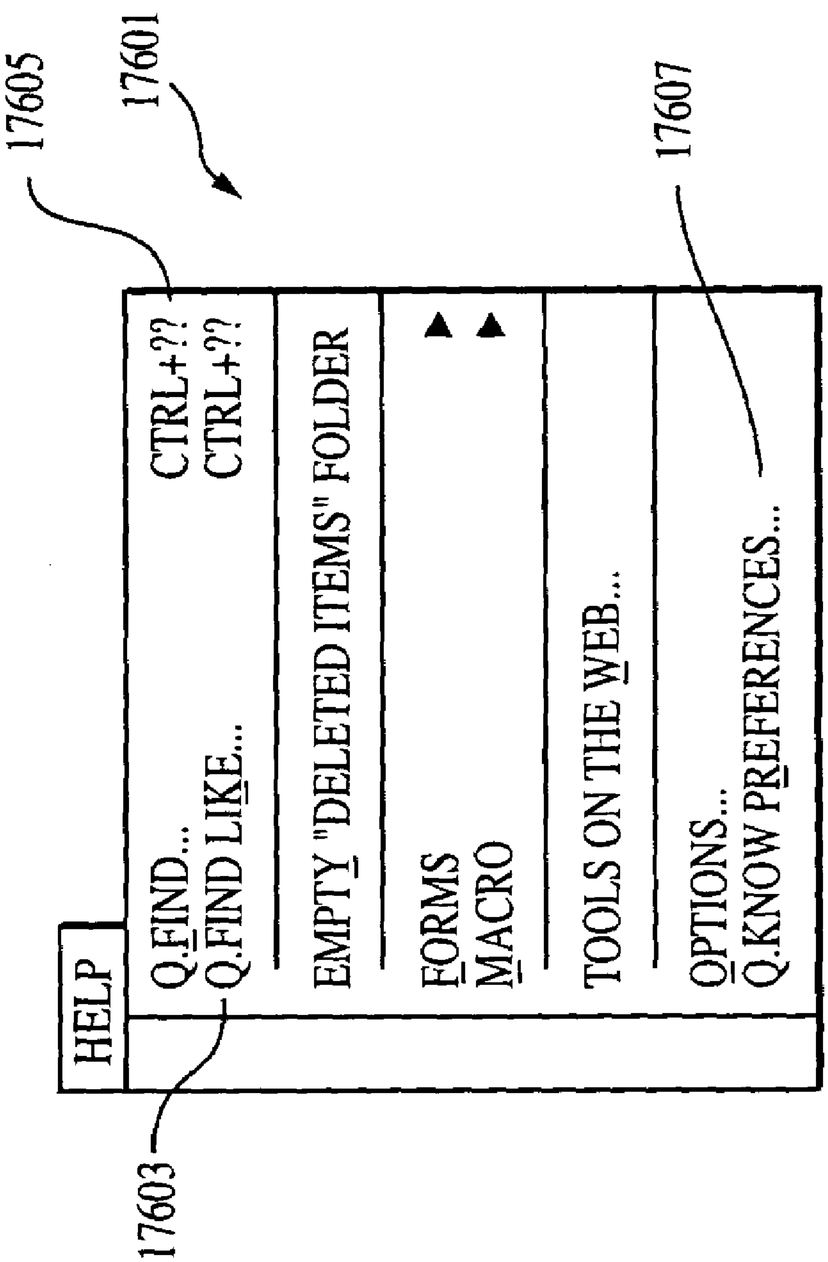

FIG. 176 illustrates an example initial user menu for finding a specified item based on one or more keywords, according to one or more embodiments of the present invention.

Figure 177:
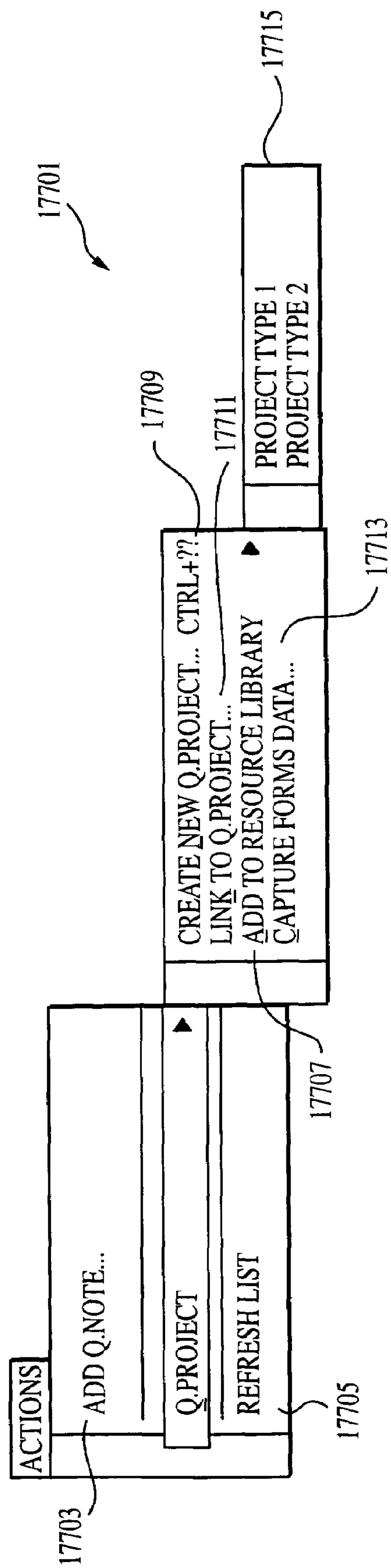

FIG. 177 illustrates an example user menu for performing project actions (create new, link, etc.), according to one or more embodiments of the present invention.

Figure 178:
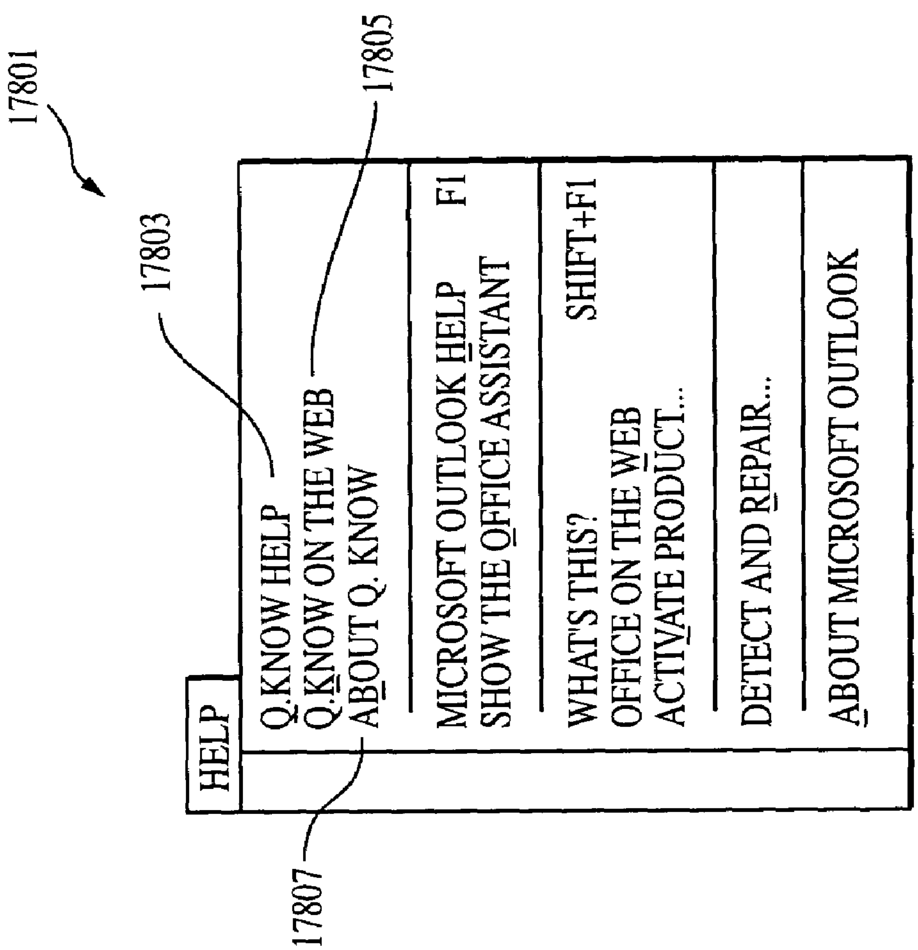

FIG. 178 illustrates an example user menu for displaying help information about the system within Outlook, according to one or more embodiments of the present invention.

Figure 179:
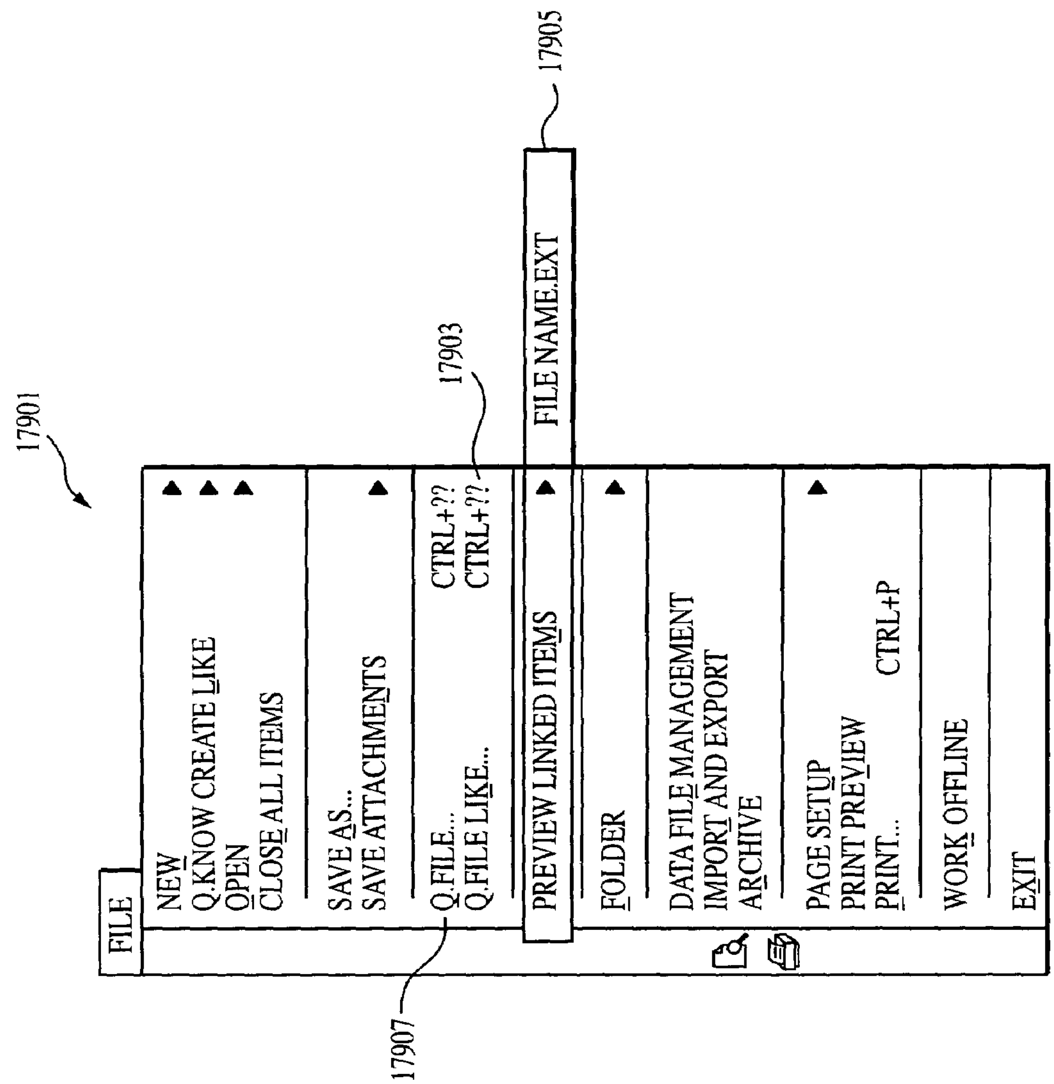

FIG. 179 illustrates an example user menu for previewing items linked to a selected item, according to one or more embodiments of the present invention.

Figure 180:
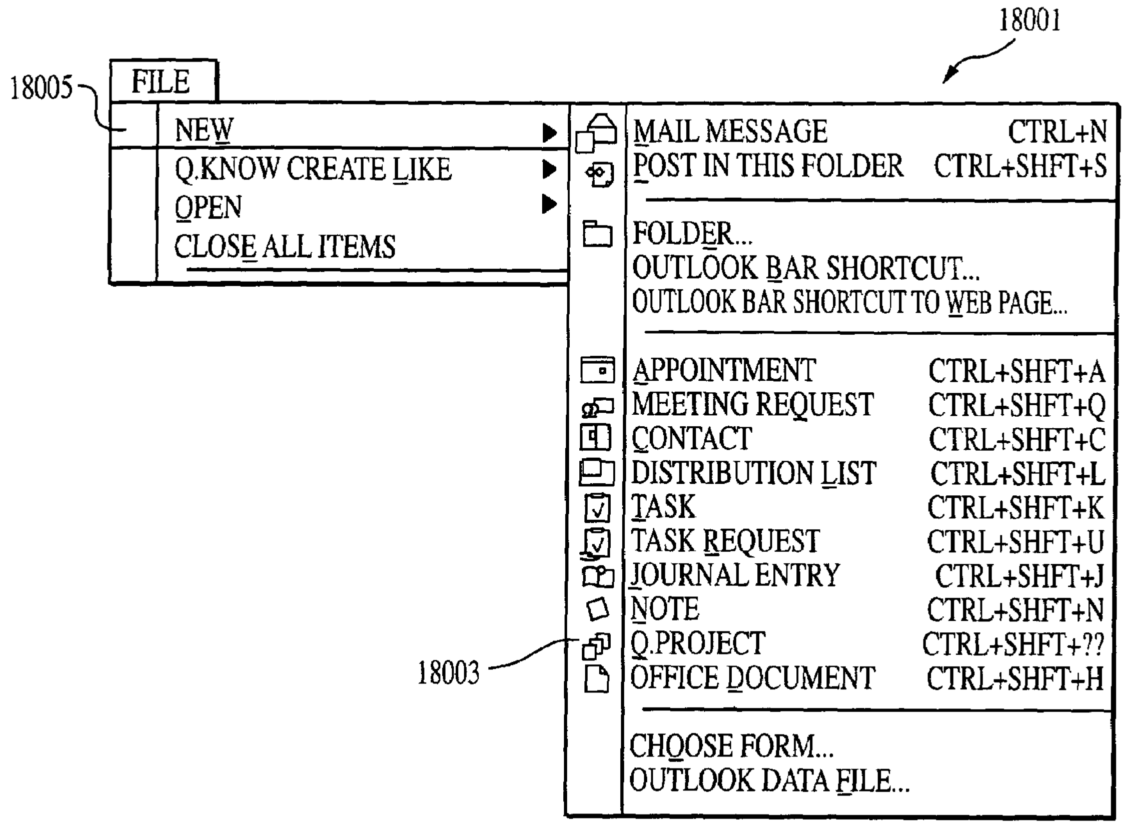

FIG. 180 illustrates an example user menu for creating a new project within Outlook, according to one or more embodiments of the present invention.

Figure 181:
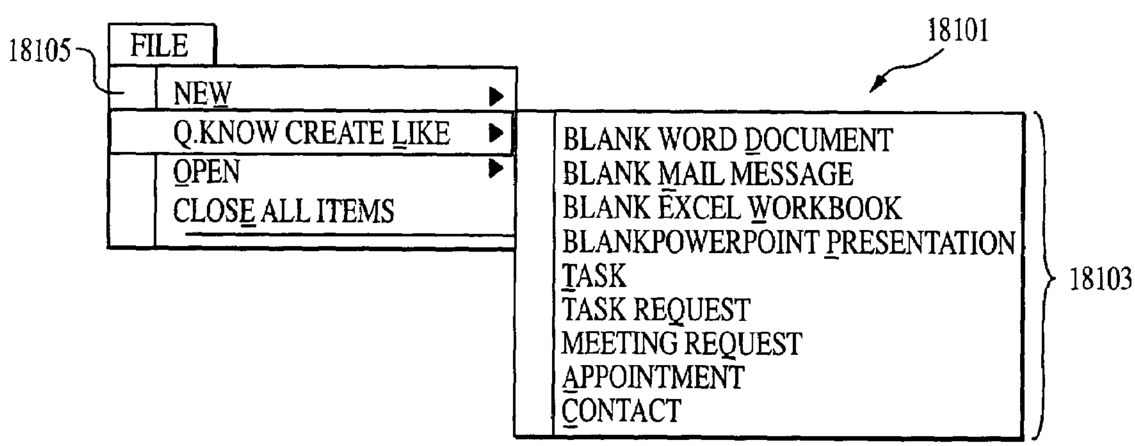

FIG. 181 illustrates an example user menu for creating a new item incorporating tags from a pre-existing e-mail message, according to one or more embodiments of the present invention.

Figure 182:
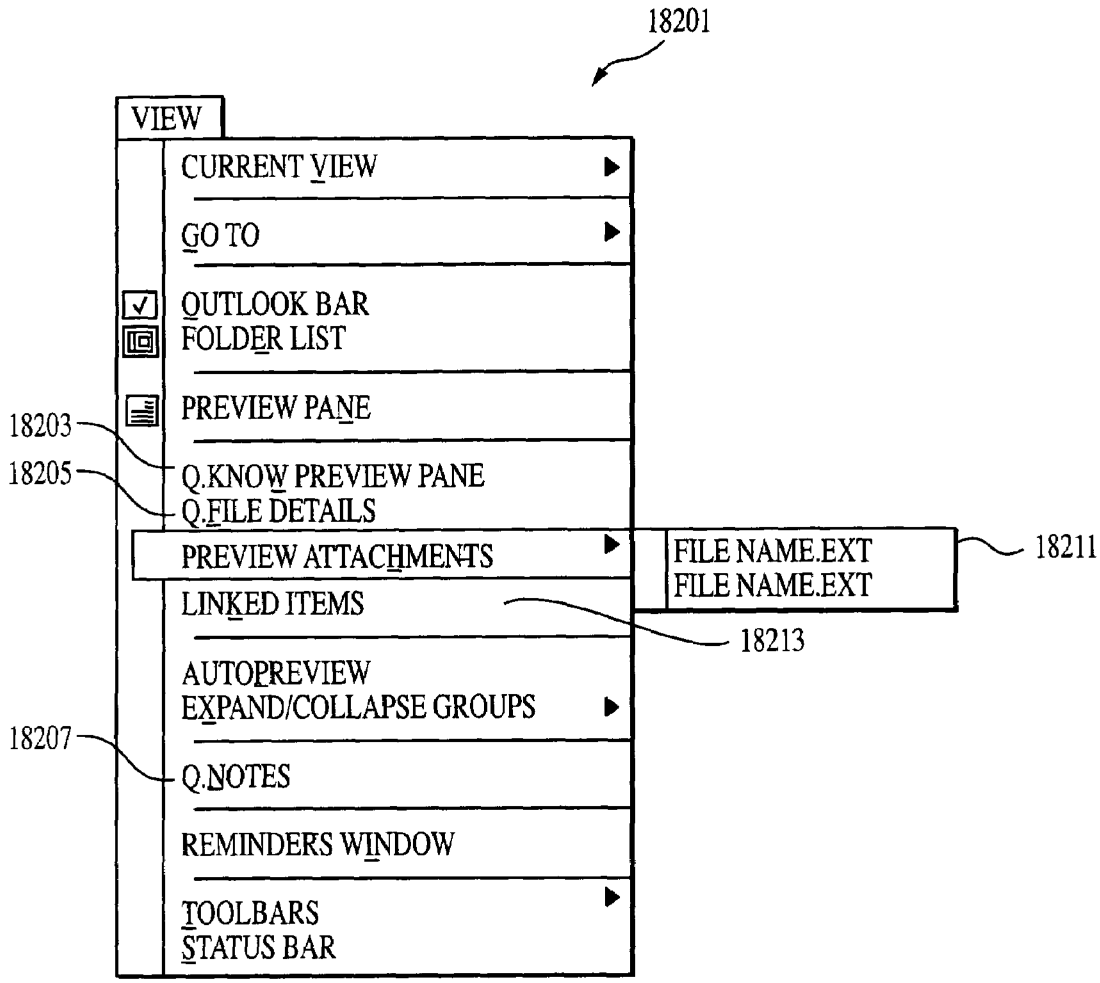

FIG. 182 illustrates an example user menu for previewing attachments linked to a selected item, according to one or more embodiments of the present invention.

Figure 183:
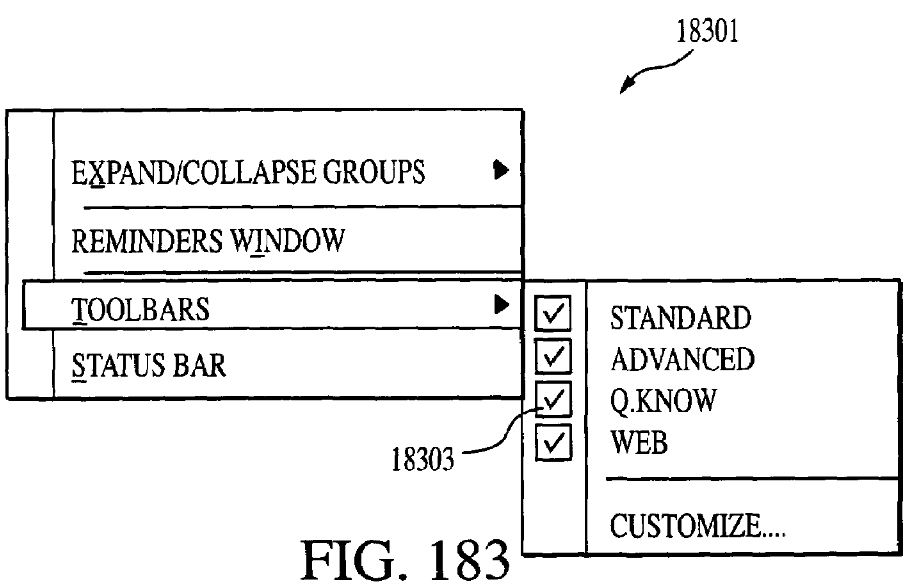

FIG. 183 illustrates an example user menu for adding and/or deleting toolbar access for use in connection with the present invention, according to one or more embodiments of the present invention.

Figure 184:
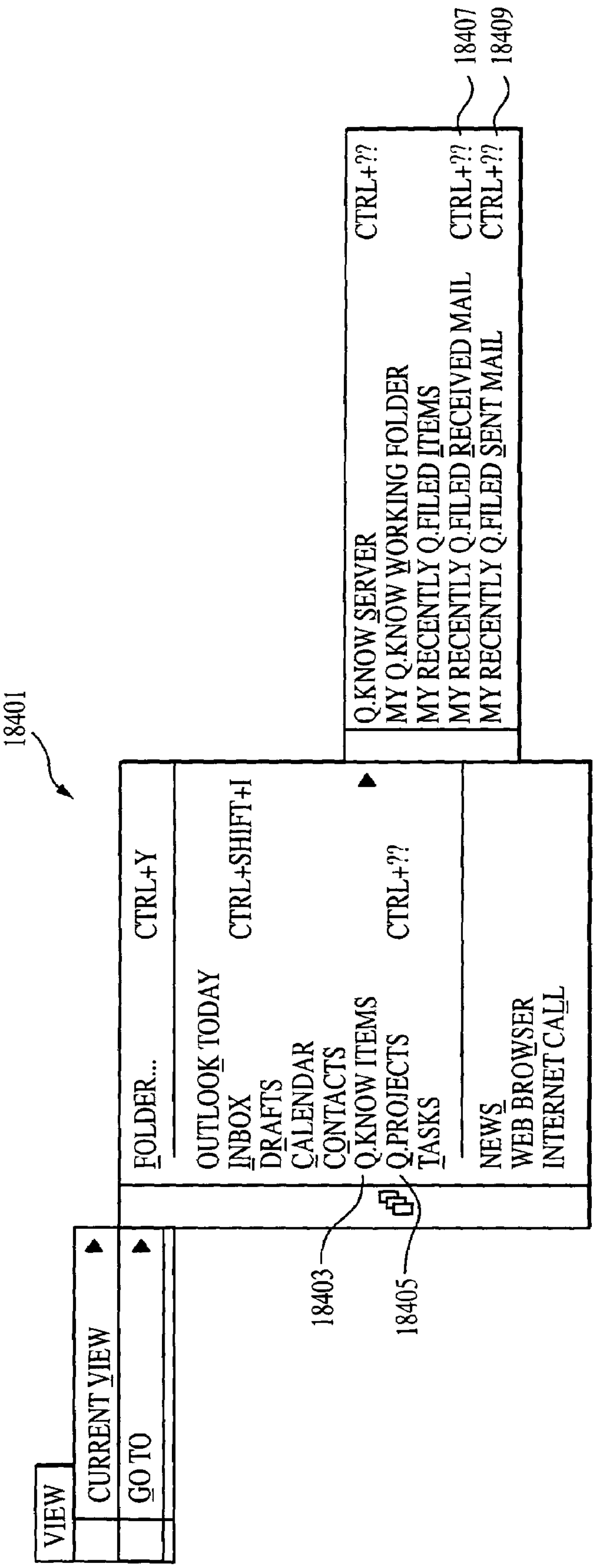

FIG. 184 illustrates an example user menu for using in selecting and going to a selected item, according to one or more embodiments of the present invention.

Figure 185:
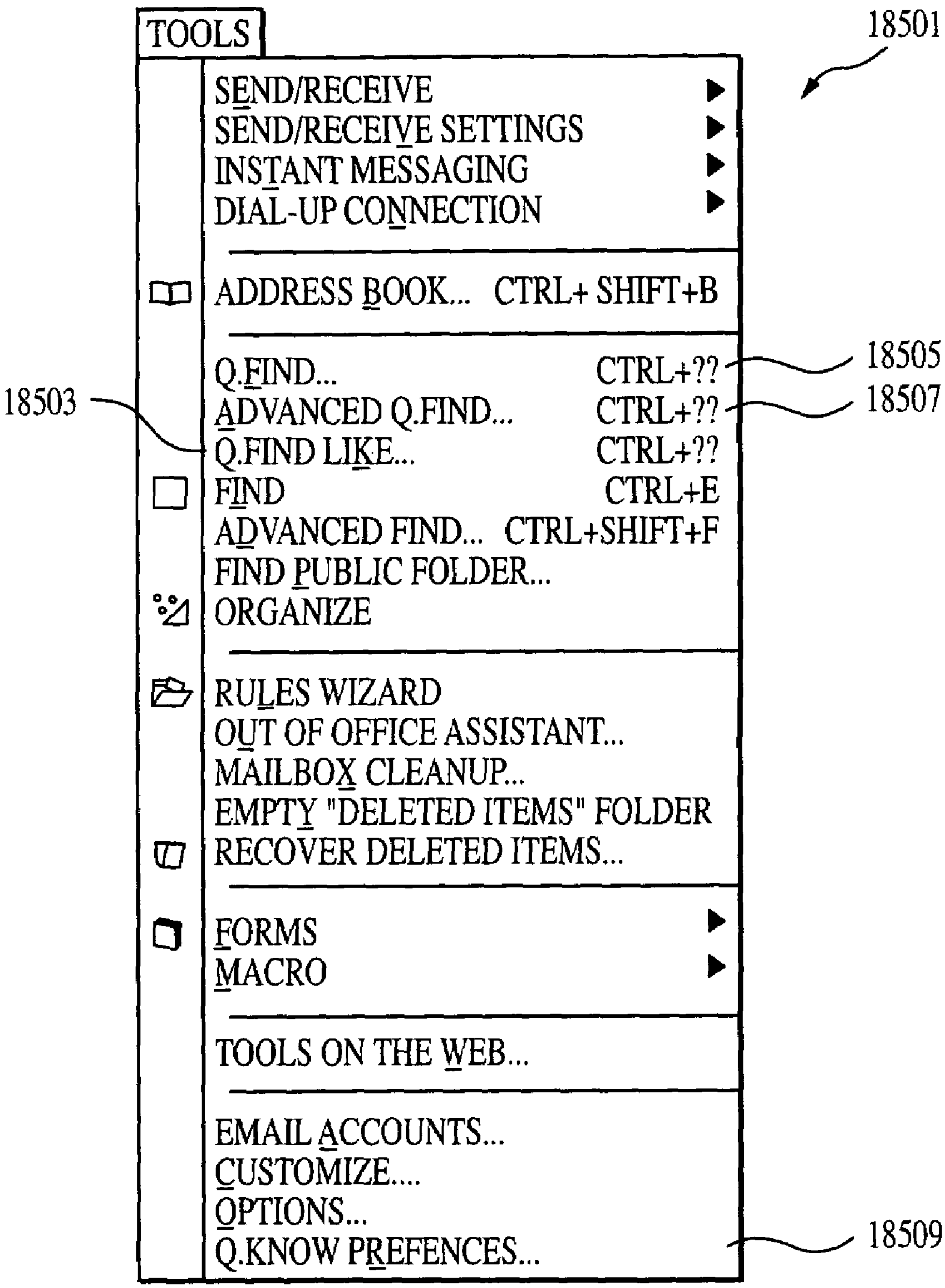

FIG. 185 illustrates an example user menu for use in performing a retrieval incorporating search criteria from a selected item, according to one or more embodiments of the present invention.

Figure 186:
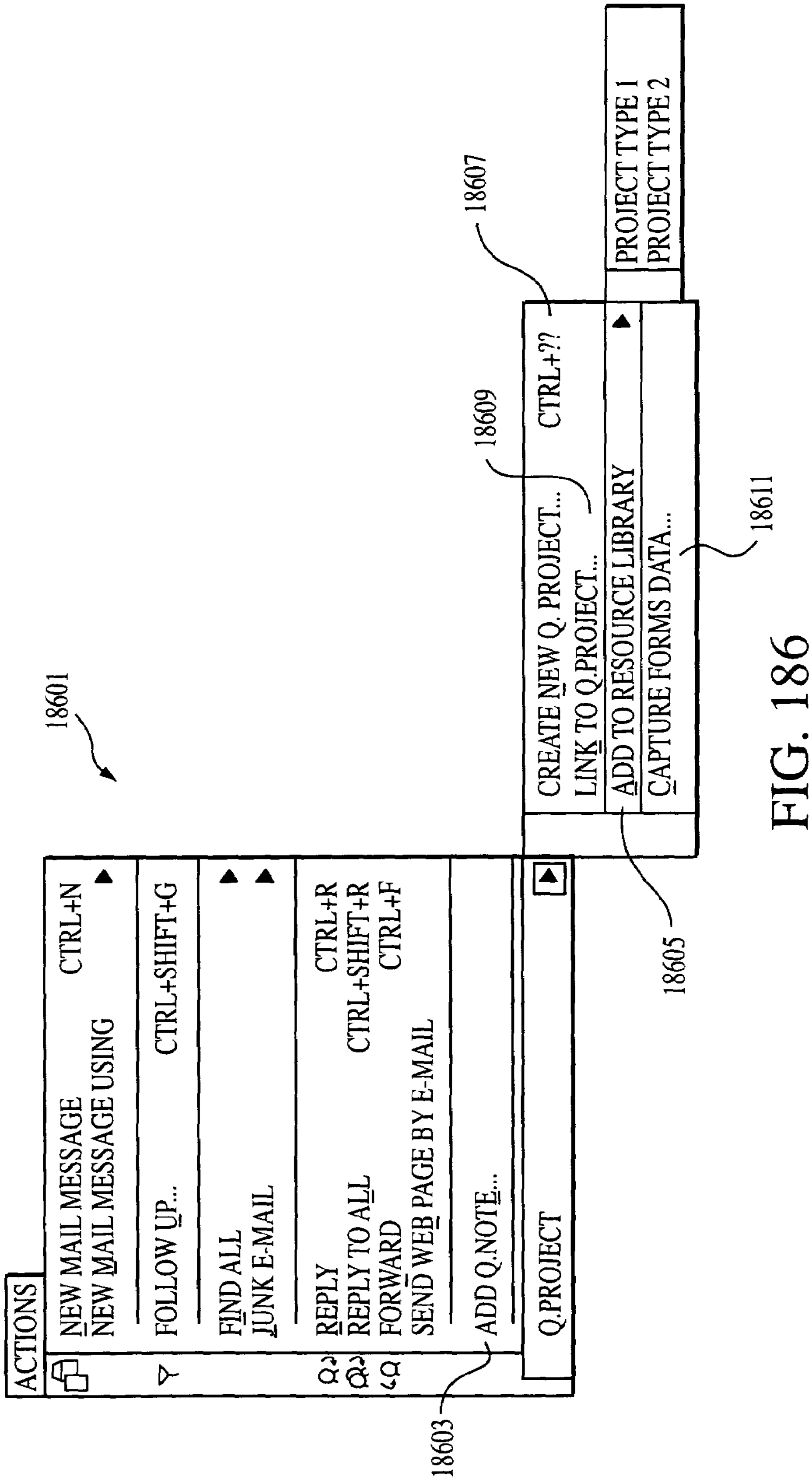

FIG. 186 illustrates an example user menu for use in creating and/or linking a project, according to one or more embodiments of the present invention.

Figure 187:
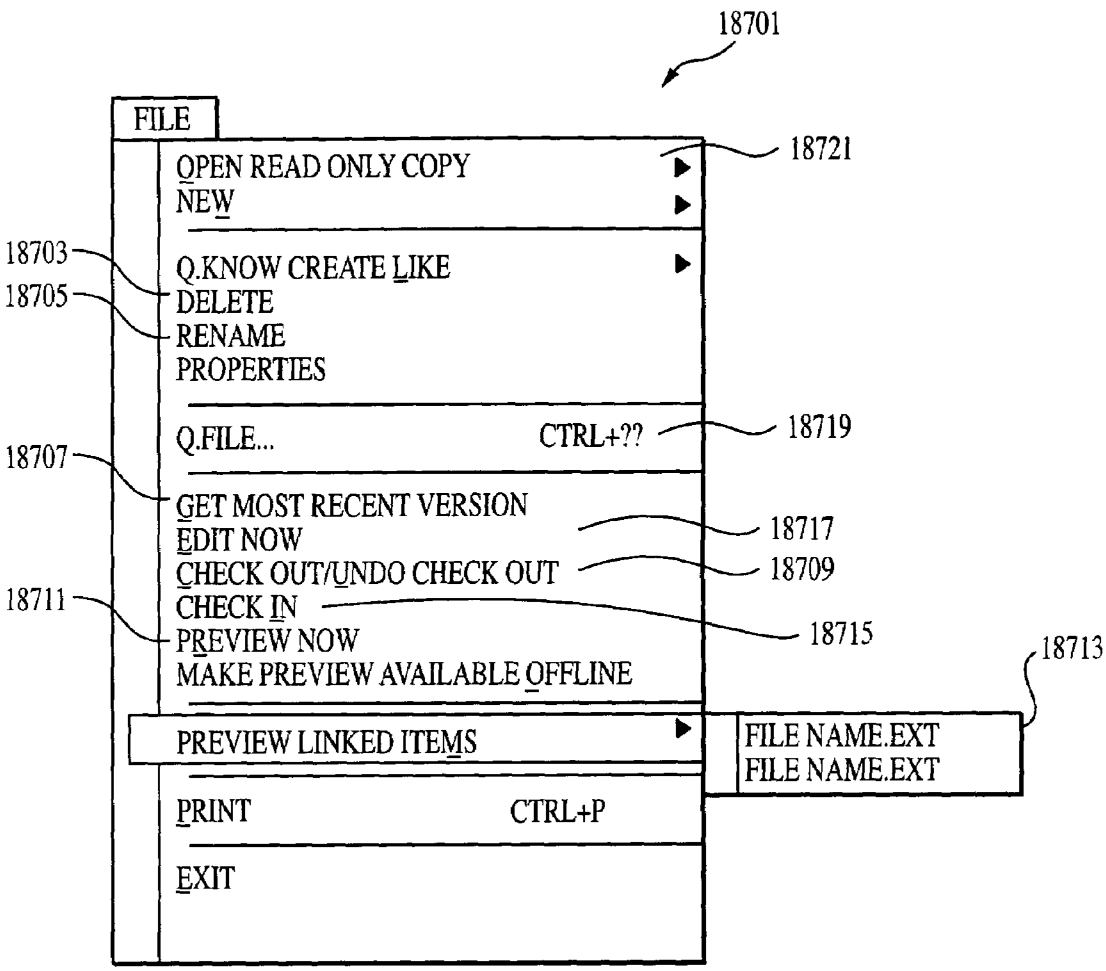

FIG. 187 illustrates an example user menu for use in previewing selected linked items, according to one or more embodiments of the present invention.

Figure 188:
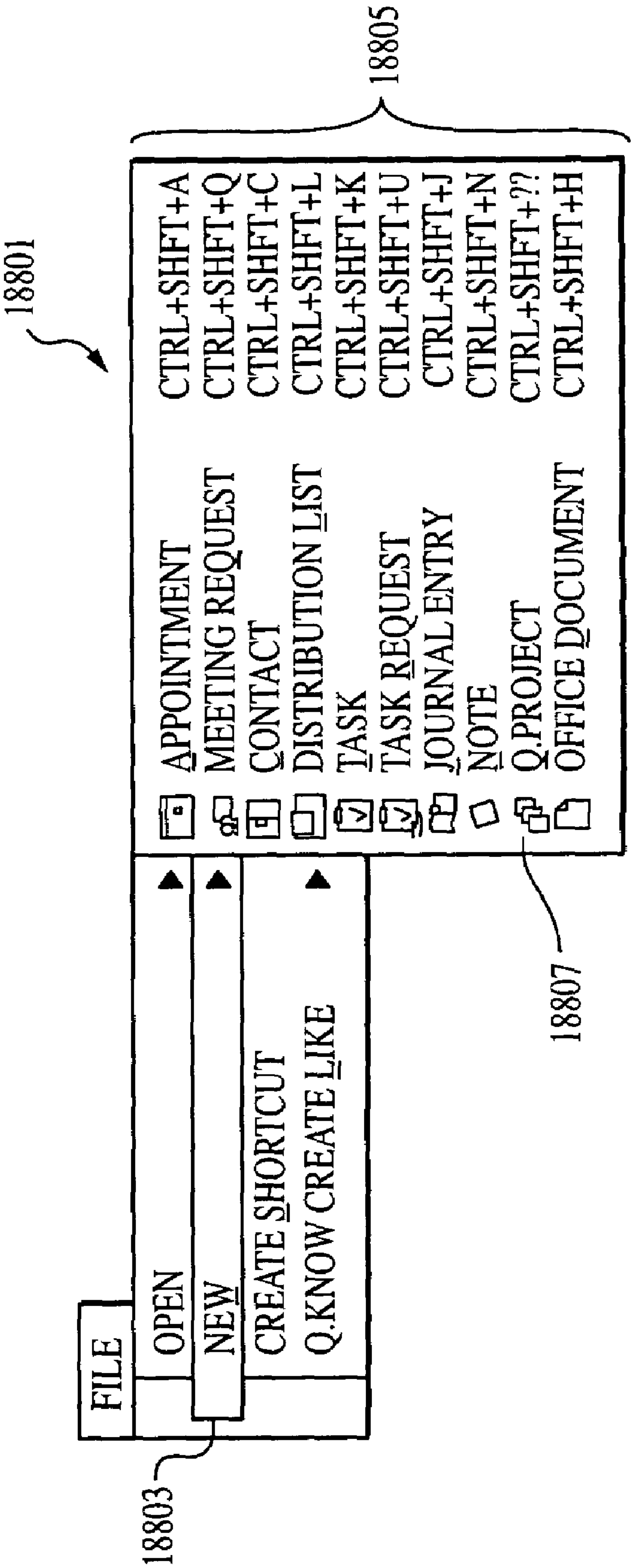

FIG. 188 illustrates an example user menu for use in creating new projects from within native applications, according to one or more embodiments of the present invention.

Figure 189:
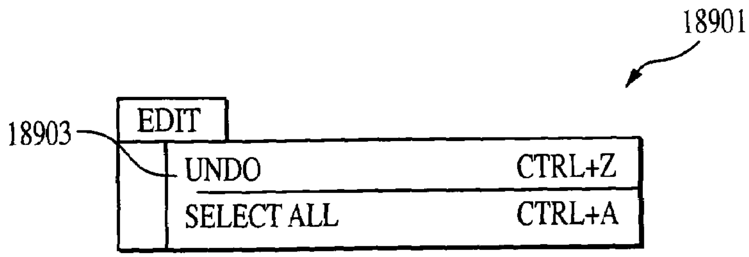

FIG. 189 illustrates an example user menu for use in undoing a change initiated by the user, according to one or more embodiments of the present invention.

Figure 190:
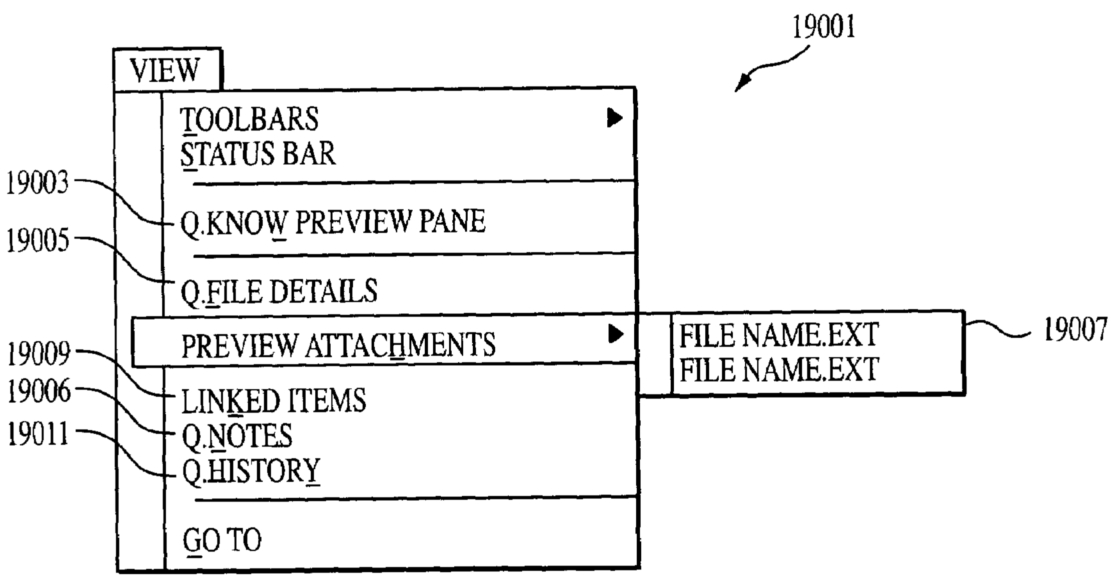

FIG. 190 illustrates an example user menu for use in previewing attachments, notes, linked items, and history of a selected item, according to one or more embodiments of the present invention.

Figure 191:
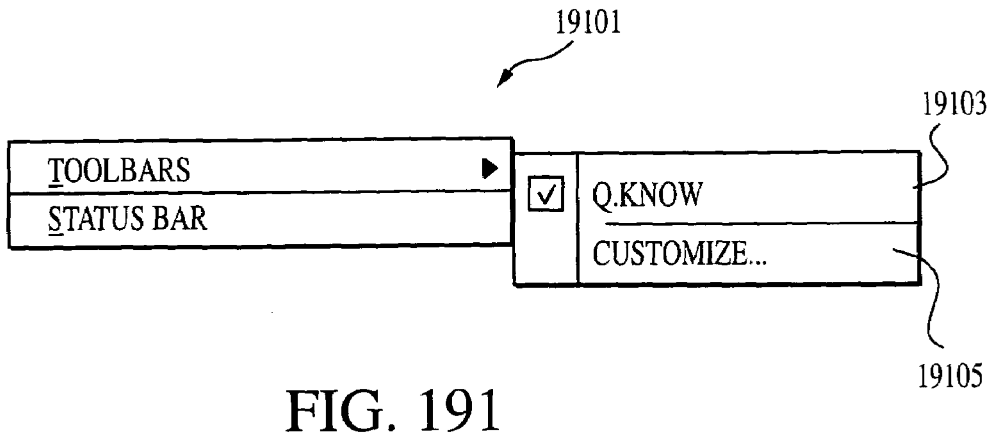

FIG. 191 illustrates an example user menu for use in adding/deleting explorer toolbar access, according to one or more embodiments of the present invention.

Figure 192:
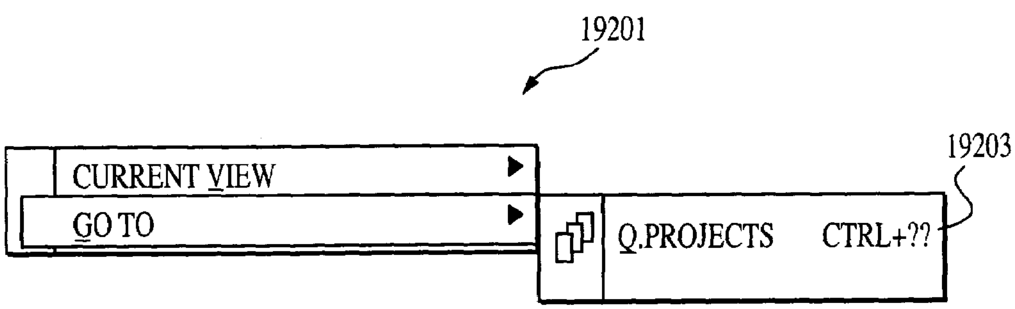

FIG. 192 illustrates an example user menu for use in going to a selected project, according to one or more embodiments of the present invention.

Figure 193:
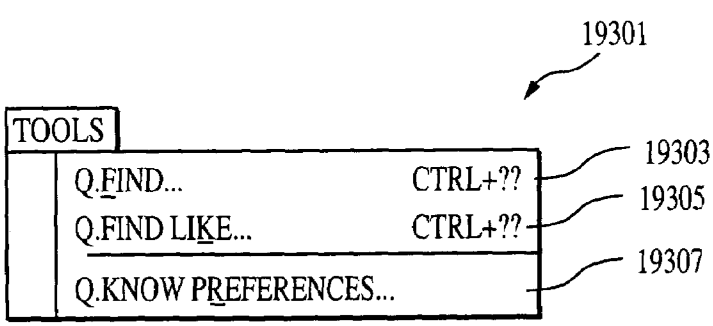

FIG. 193 illustrates an example user menu for use in performing one of several retrievals of items, according to one or more embodiments of the present invention.

Figure 194:
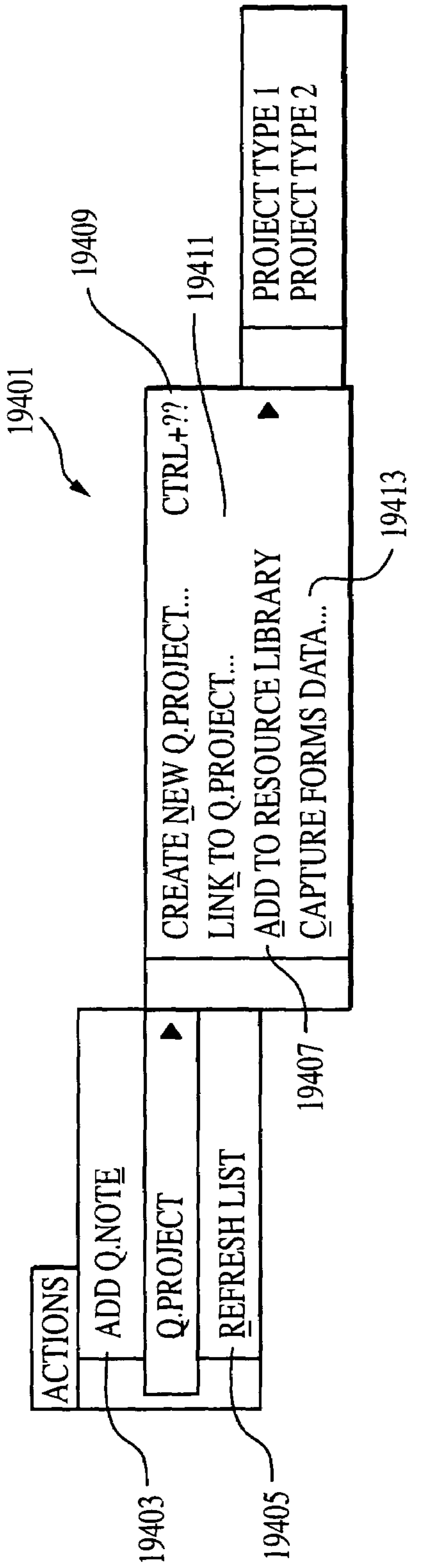

FIG. 194 illustrates an example user menu for use in creating a new project and/or linking items to a project and/or adding an item to a resource library, according to one or more embodiments of the present invention.

Figure 195:
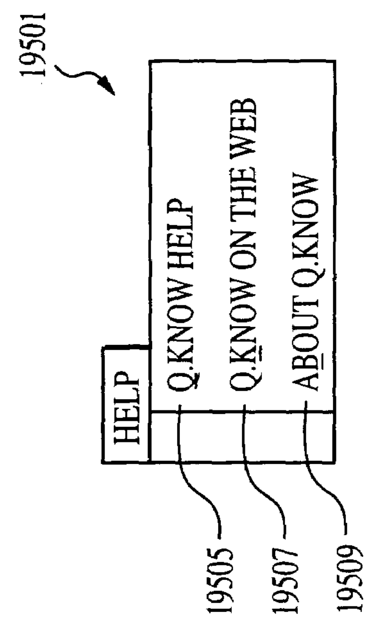

FIG. 195 illustrates an example user menu for use in displaying "help" information, according to one or more embodiments of the present invention.

Figure 196:
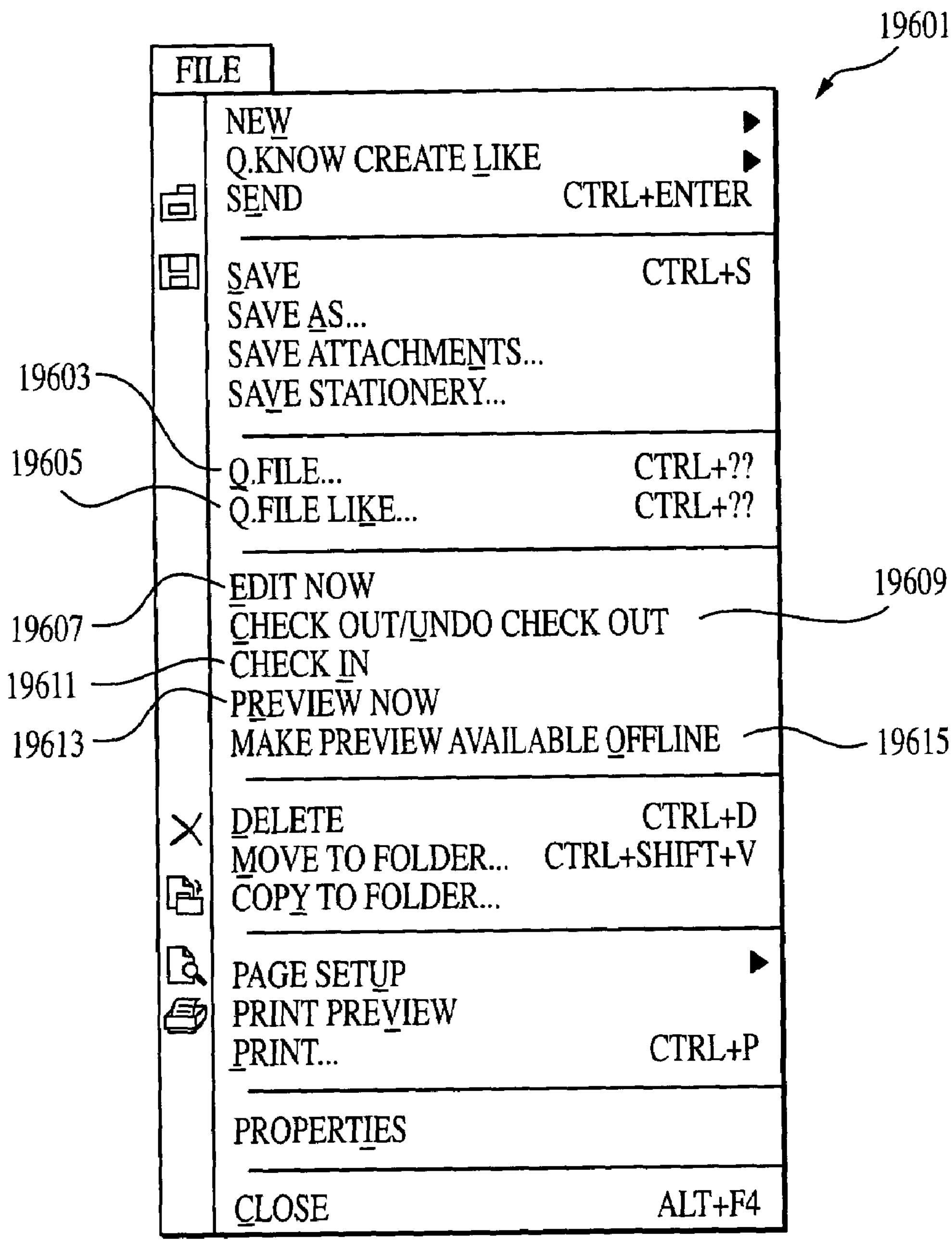

FIG. 196 illustrates an example top-level user menu for use in selecting an item, checking an attachment to the item in/out, etc., according to one or more embodiments of the present invention.

Figure 197:
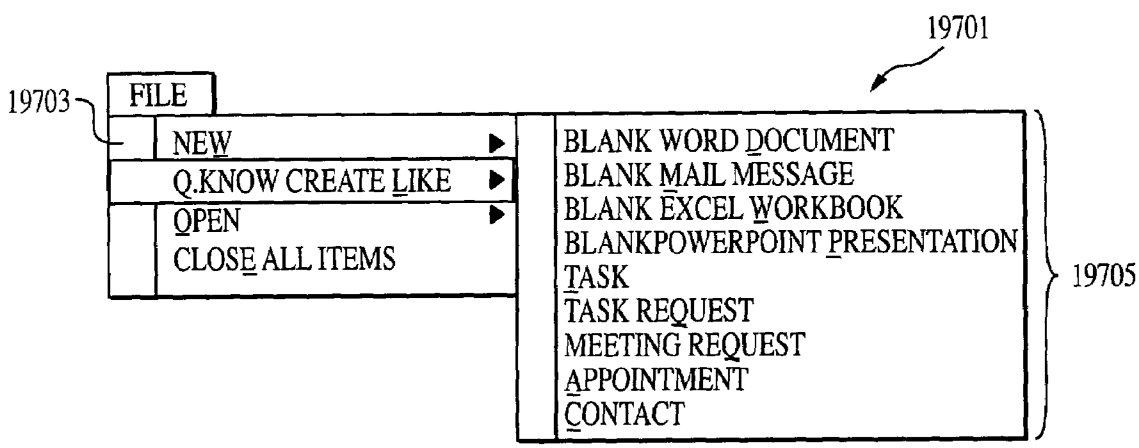

FIG. 197 illustrates an example user menu for creating a new item with tags from a selected e-mail message, according to one or more embodiments of the present invention.

Figure 198:
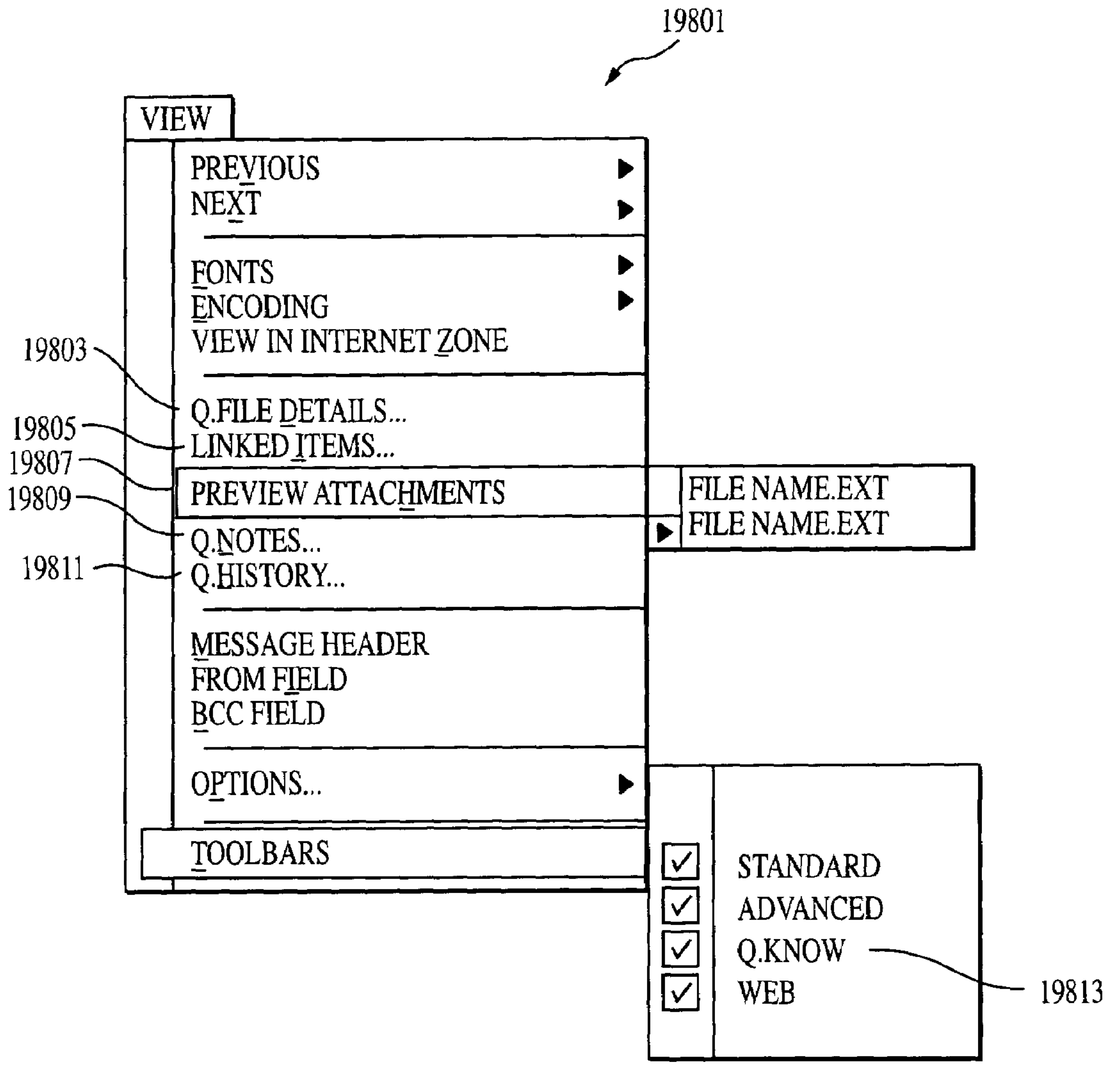

FIG. 198 illustrates an example user menu for opening a preview of attachments to a selected item, and for turning on toolbar access, according to one or more embodiments of the present invention.

Figure 199:
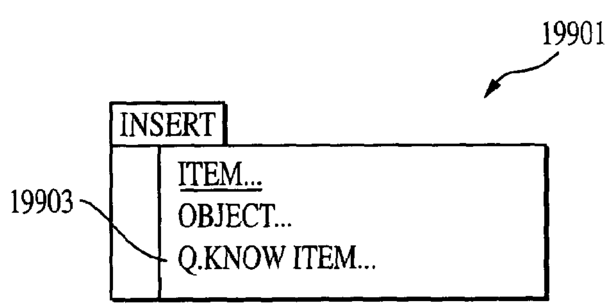

FIG. 199 illustrates an example user menu for inserting an item, according to one or more embodiments of the present invention.

Figure 200:
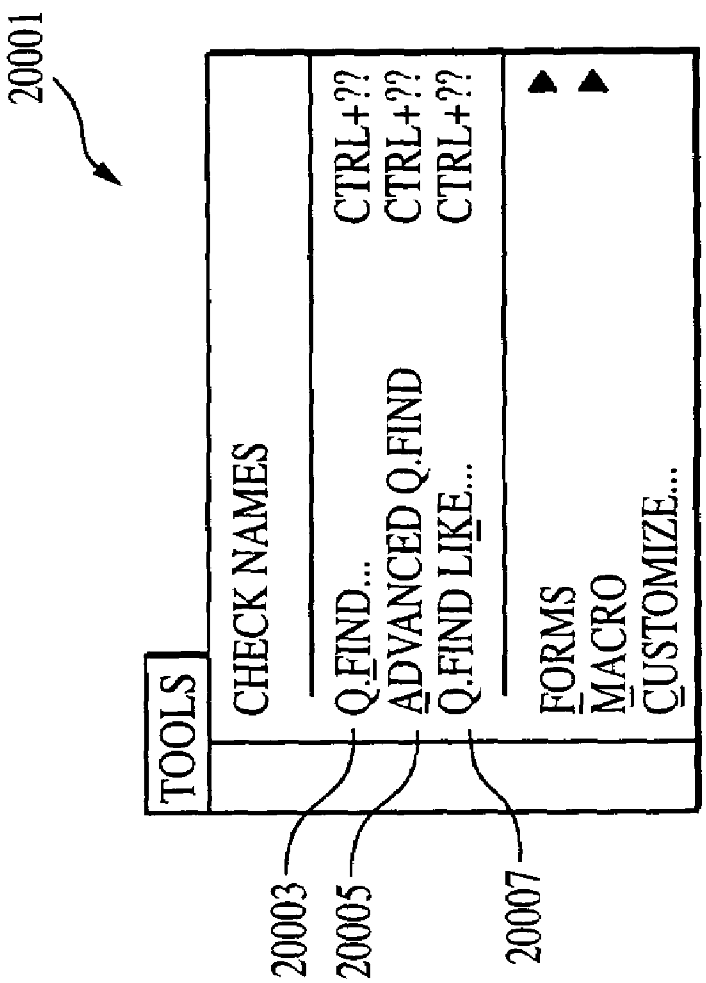

FIG. 200 illustrates an example user menu for performing one of several retrievals of items based on keywords, according to one or more embodiments of the present invention.

Figure 201:
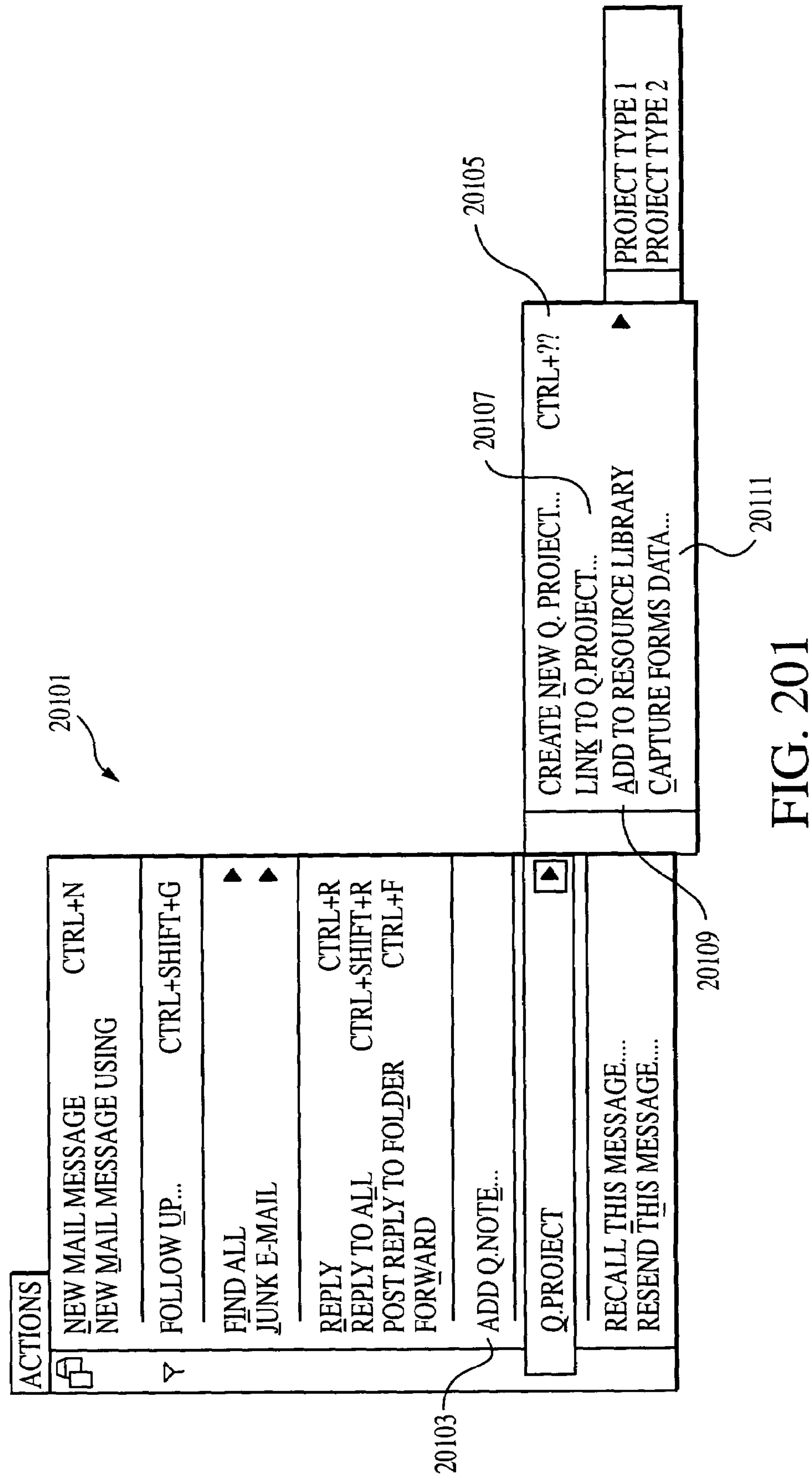

FIG. 201 illustrates an example user menu for performing actions on a project, according to one or more embodiments of the present invention.

Figure 202:
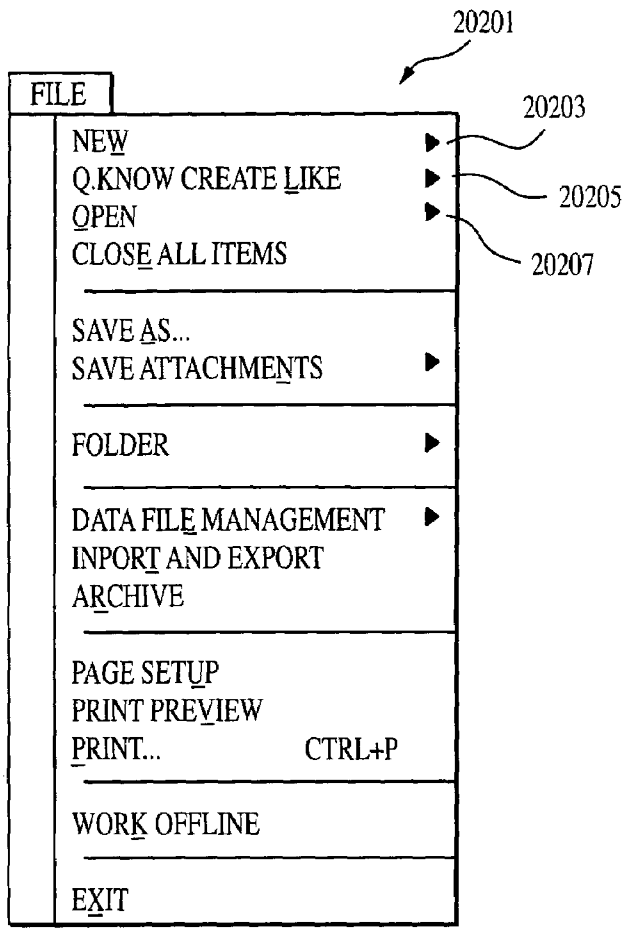

FIG. 202 illustrates an example user menu for creating/opening an item, according to one or more embodiments of the present invention.

Figure 203:
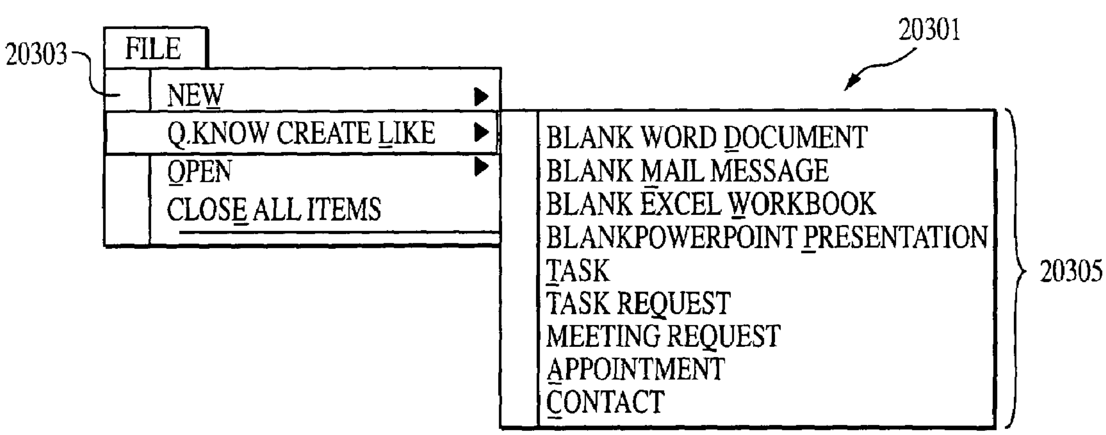

FIG. 203 illustrates an example user menu for creating an item with tags populated from a selected project, according to one or more embodiments of the present invention.

Figure 204:
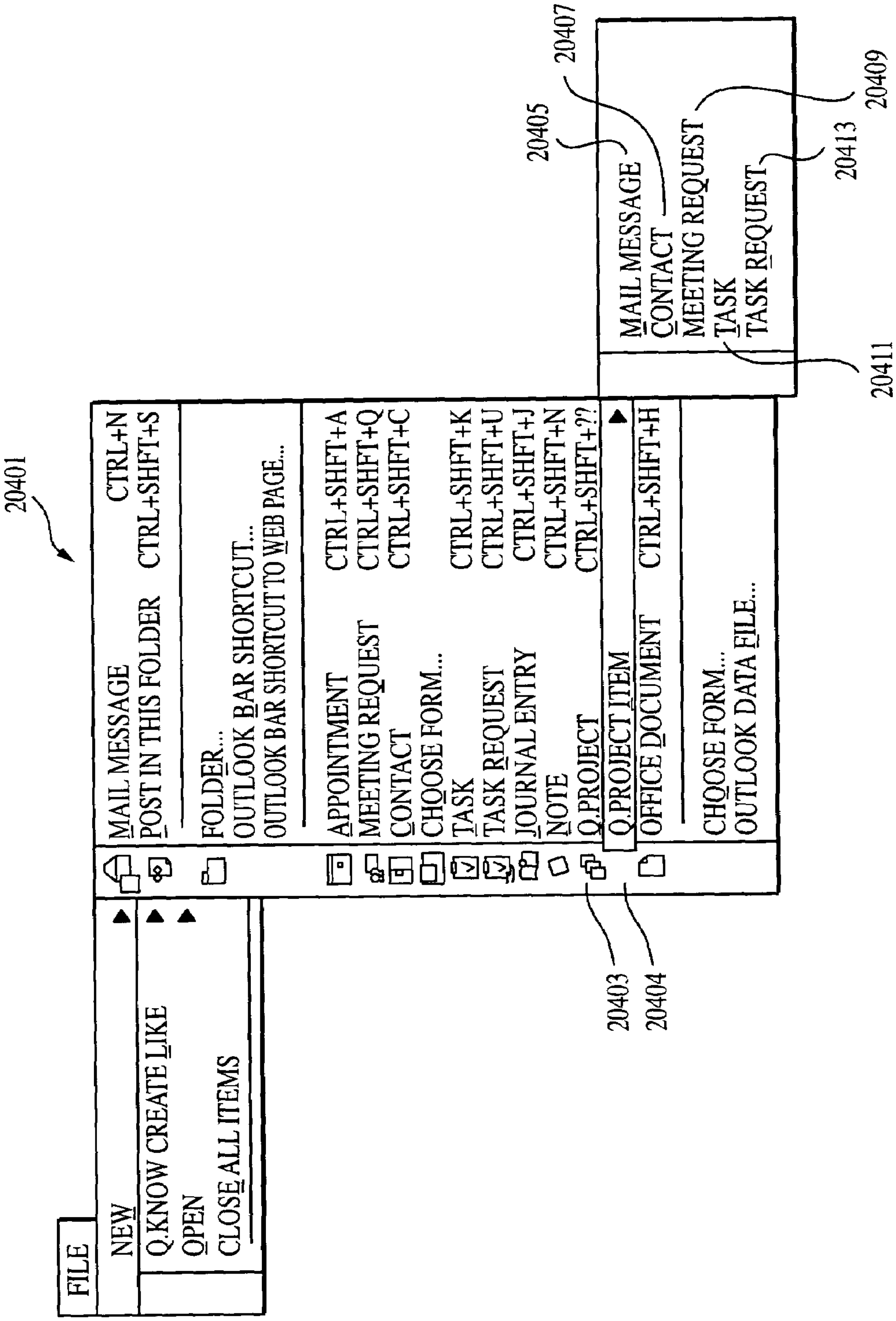

FIG. 204 illustrates an example user menu for creating a new item for native applications, within a project, according to one or more embodiments of the present invention.

Figure 205:
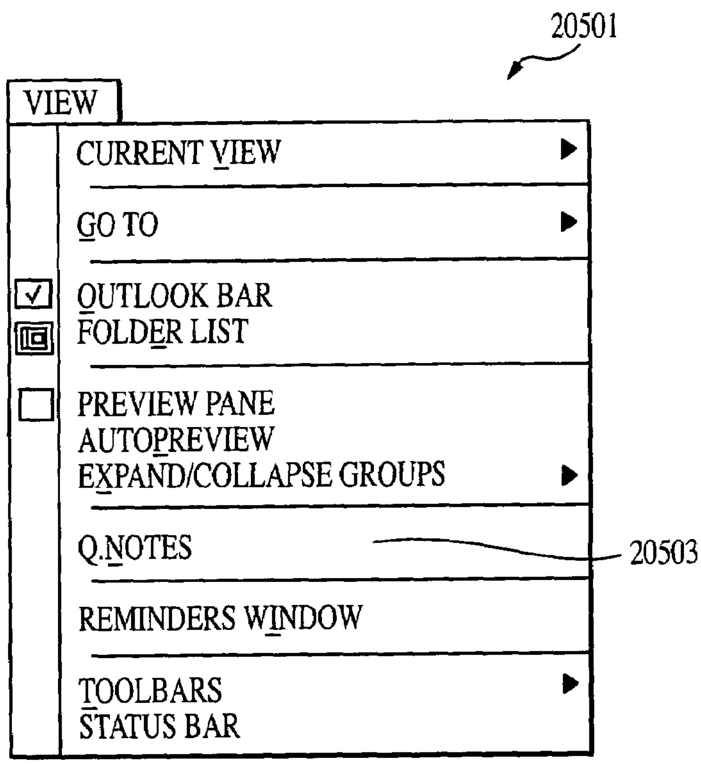

FIG. 205 illustrates an example user menu for viewing notes attached to items, according to one or more embodiments of the present invention.

Figure 206:
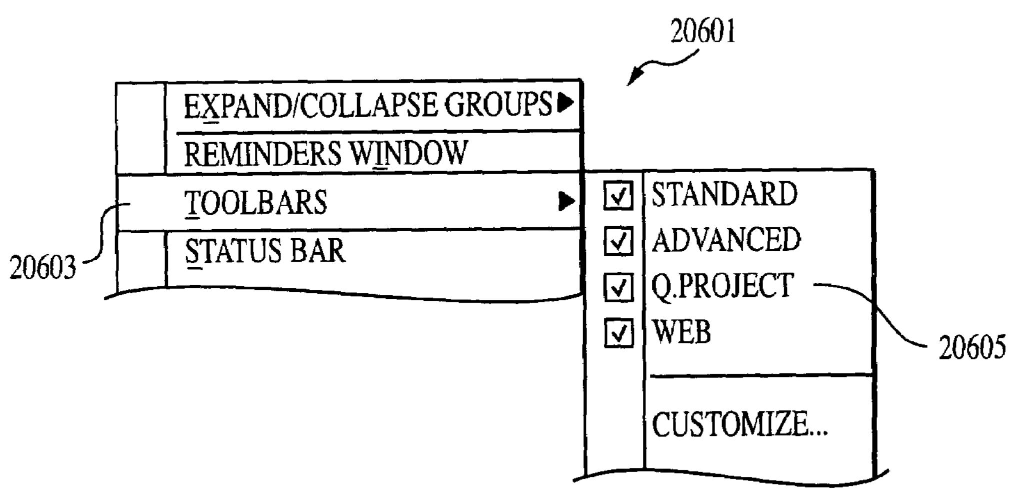

FIG. 206 illustrates an example user menu for adding and/or deleting a project toolbar, according to one or more embodiments of the present invention.

Figure 207:
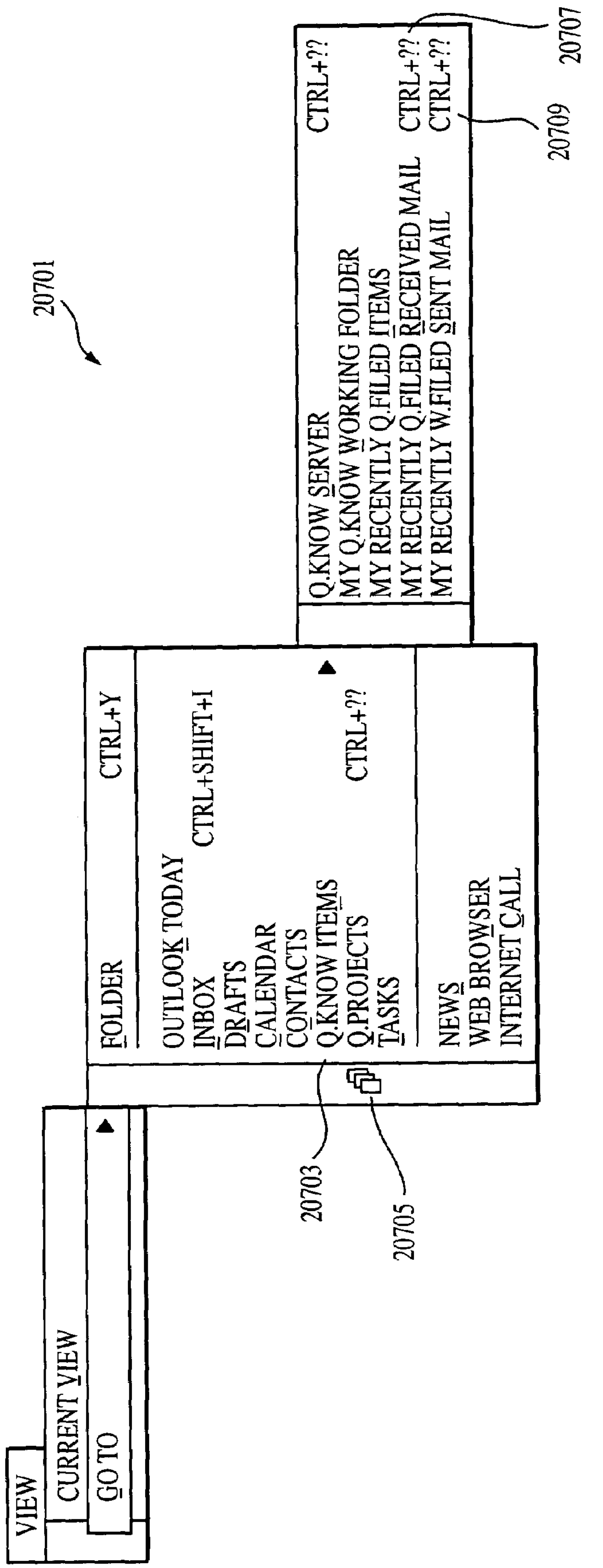

FIG. 207 illustrates an example user menu for selecting a specific item in a specific storage area e.g. working folder or recently filed, and going to the selected item, according to one or more embodiments of the present invention.

Figure 208:
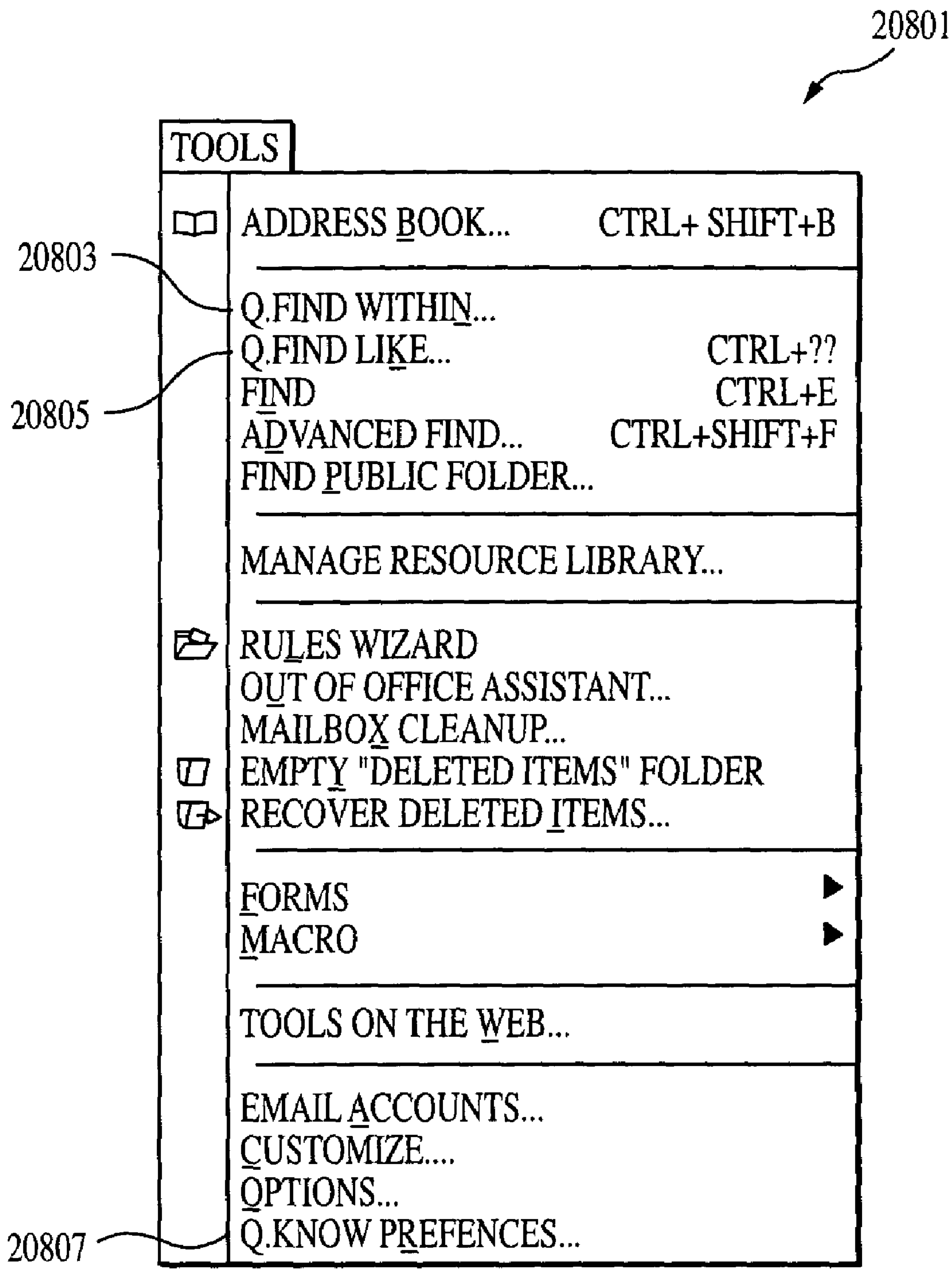

FIG. 208 illustrates an example user menu for performing various specific retrievals of items, according to one or more embodiments of the present invention.

Figure 209:
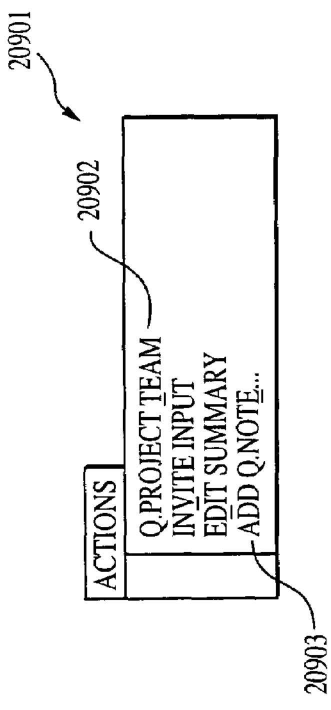

FIG. 209 illustrates an example user menu for performing actions for members of a project team, according to one or more embodiments of the present invention.

Figure 210:
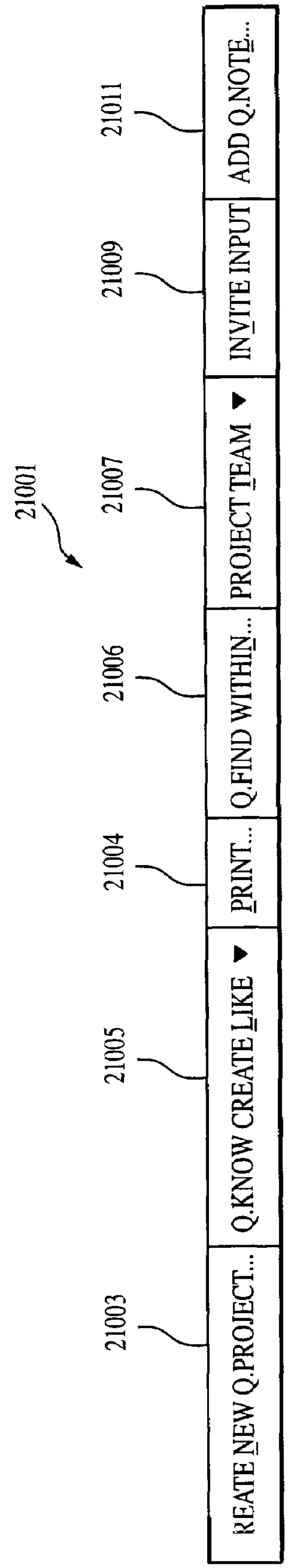

FIG. 210 illustrates an example project toolbar incorporating create project, create a new item with tags like a project, search for items within a project, and project team listing, according to one or more embodiments of the present invention.

Figure 211:
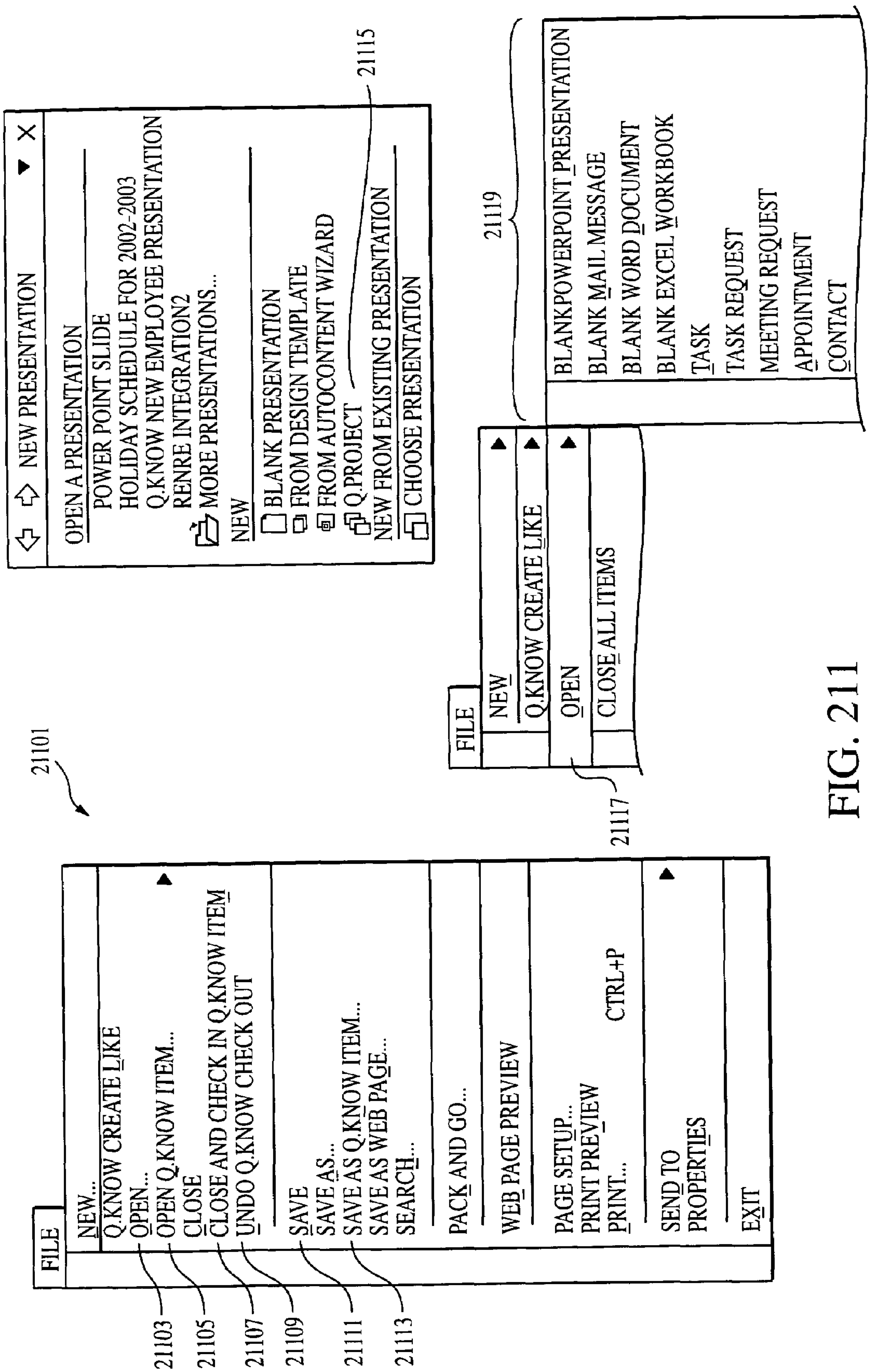

FIG. 211 illustrates an example user menu for handling items in connection with a PowerPoint native application, according to one or more embodiments of the present invention.

Figure 212:
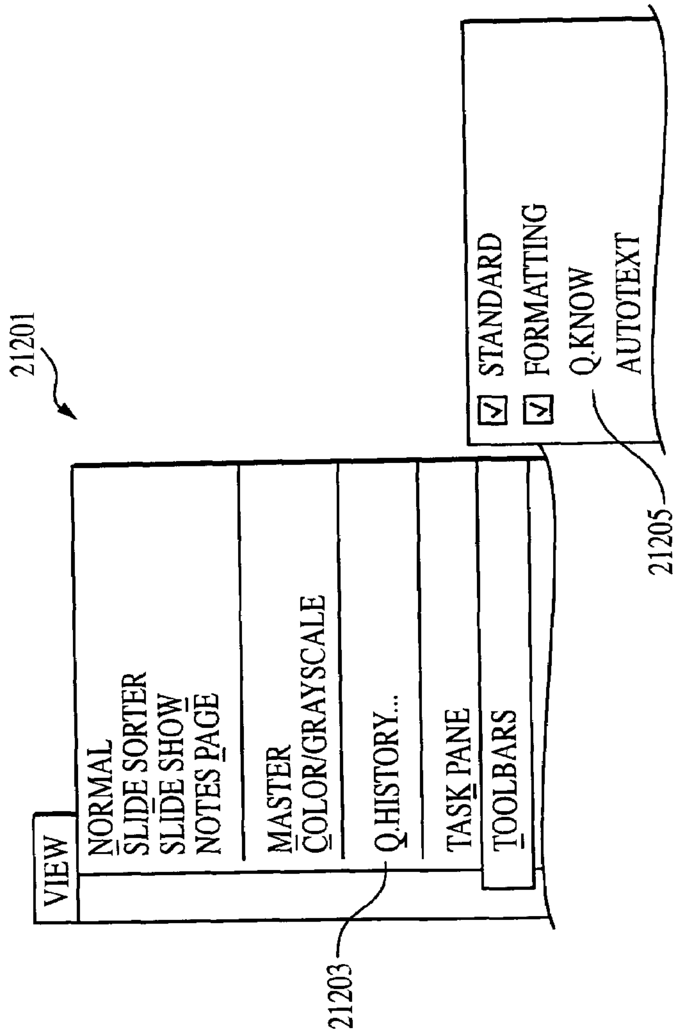

FIG. 212 illustrates an example user menu for opening a toolbar extension from within PowerPoint, according to one or more embodiments of the present invention.

Figure 213:
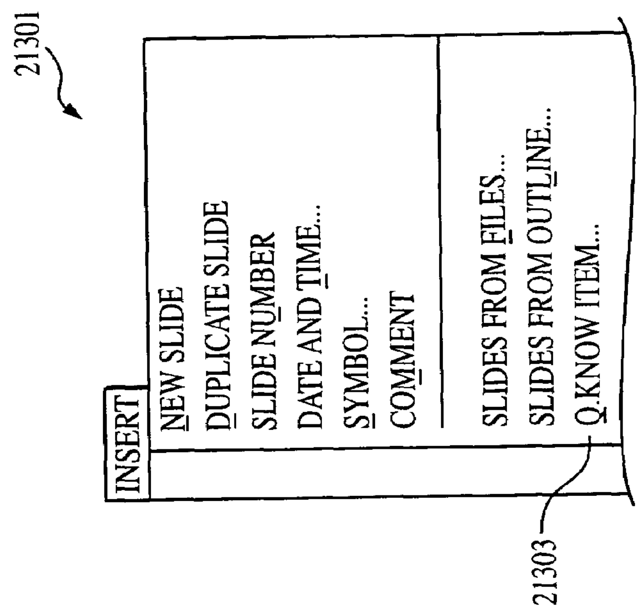

FIG. 213 illustrates an example user menu for dialoguing with the present invention from a native PowerPoint, according to one or more embodiments of the present invention.

Figure 214:
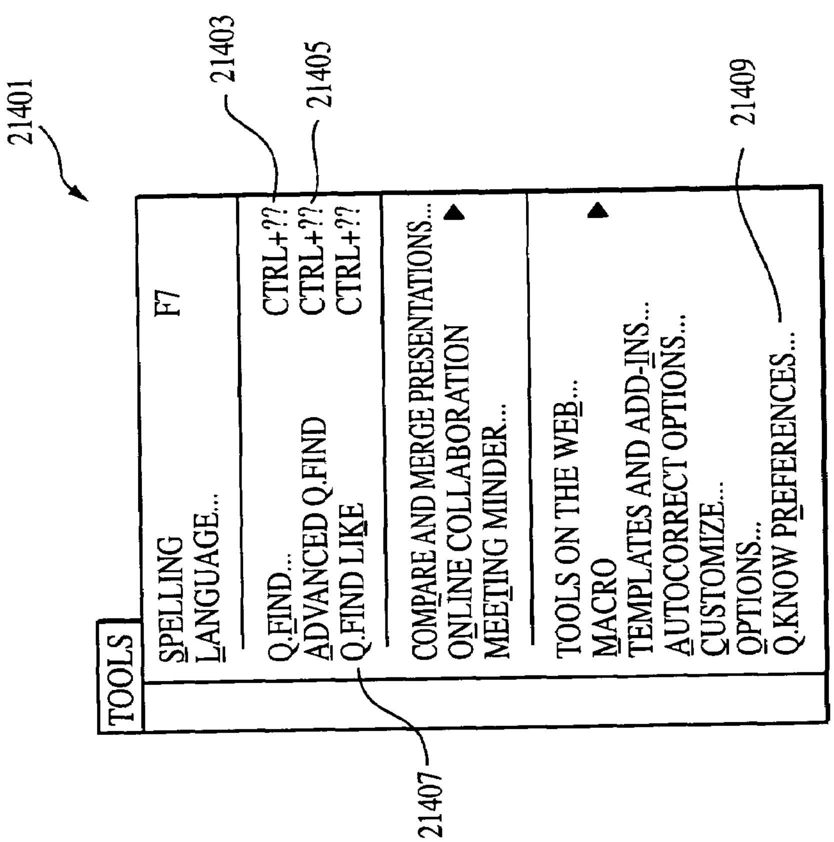

FIG. 214 illustrates an example user menu for finding items from a PowerPoint menu, according to one or more embodiments of the present invention.

Figure 215:
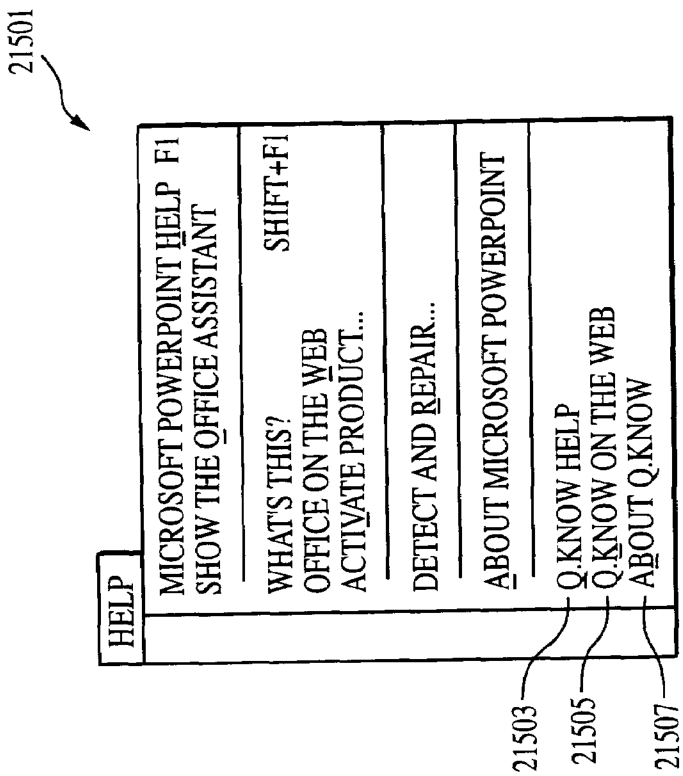

FIG. 215 illustrates an example user menu for display help information from a PowerPoint menu, according to one or more embodiments of the present invention.

Figure 216:
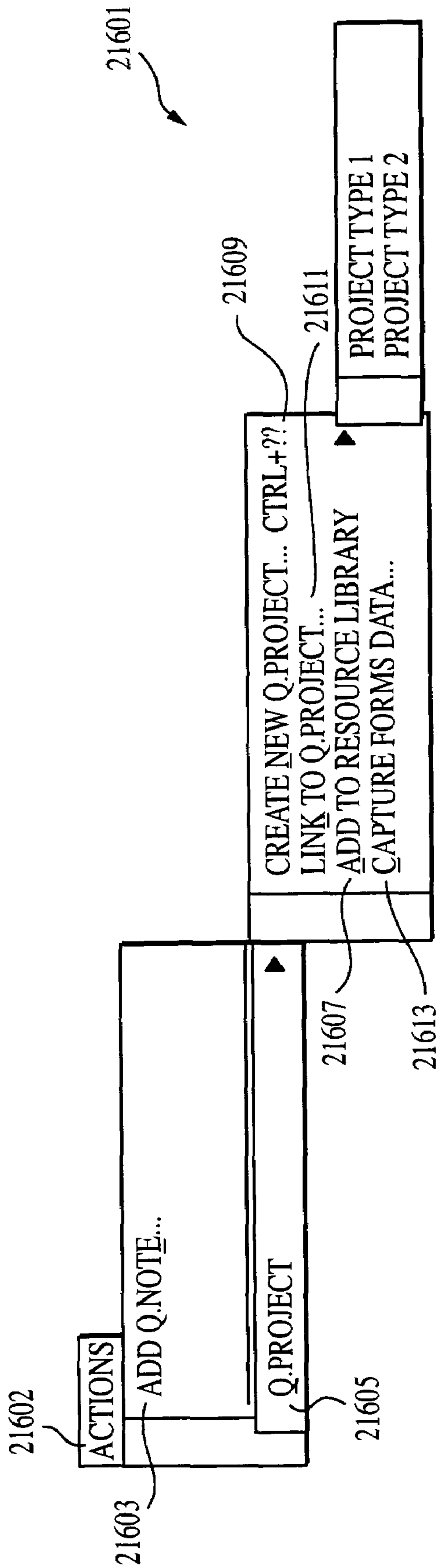

FIG. 216 illustrates an example user menu for creating a new project, linking to a project, etc., from a PowerPoint native application, according to one or more embodiments of the present invention.

Figure 217:
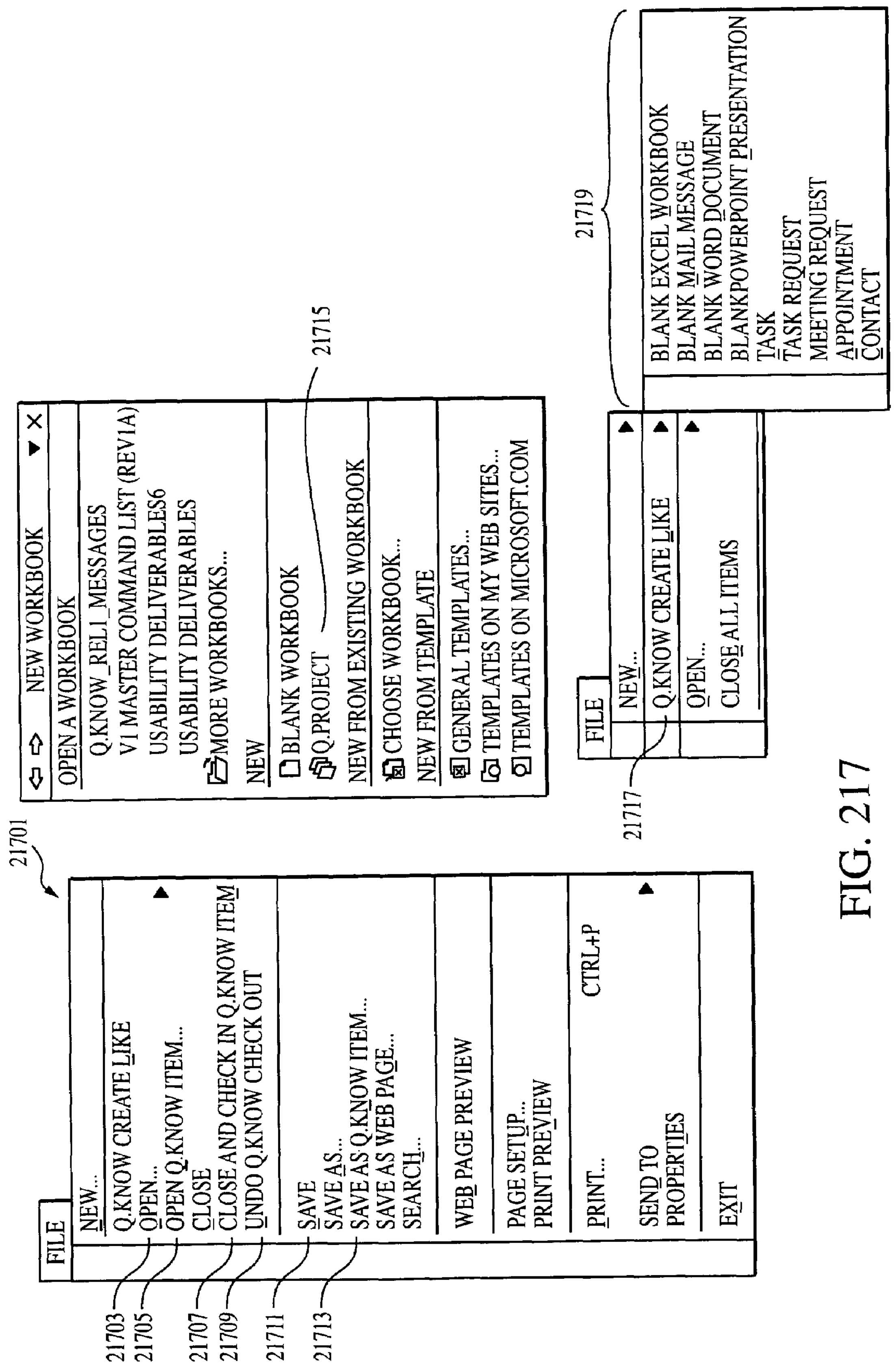

FIG. 217 illustrates an example user menu for handling items in connection with an Excel native application, according to one or more embodiments of the present invention.

Figure 218:
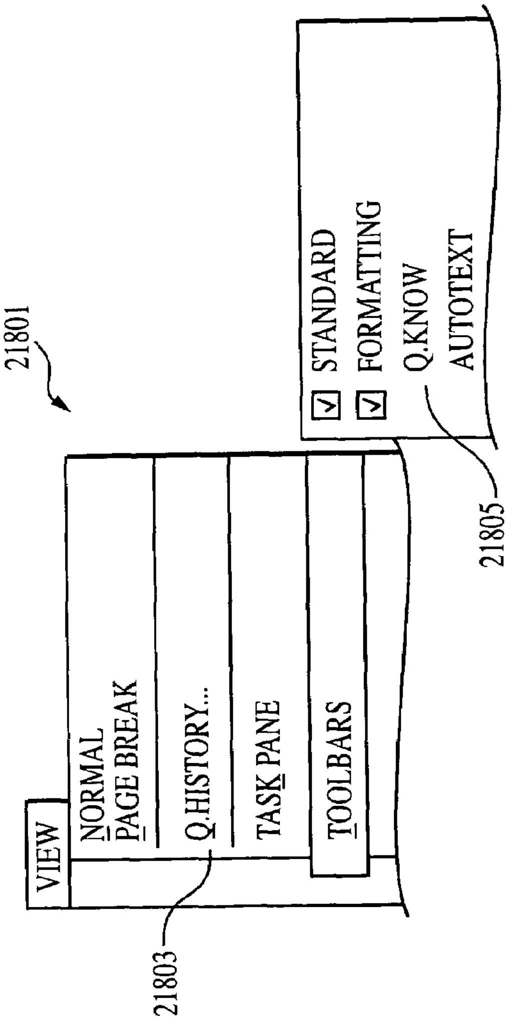

FIG. 218 illustrates an example user menu for enabling/disabling toolbars for use with an Excel native application, according to one or more embodiments of the present invention.

Figure 219:
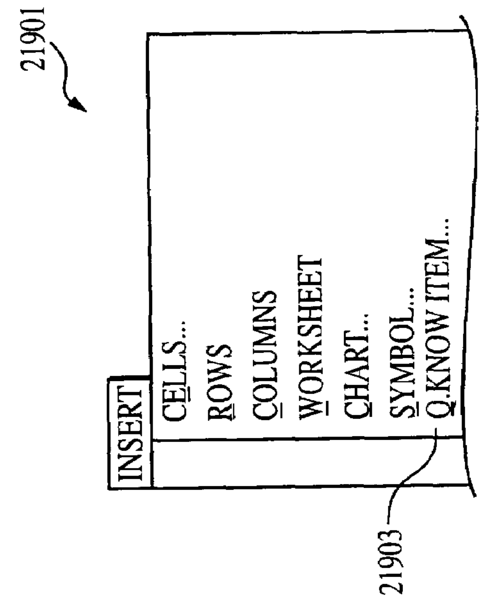

FIG. 219 illustrates an example user menu for inserting an item from an Excel native application, according to one or more embodiments of the present invention.

Figure 220:
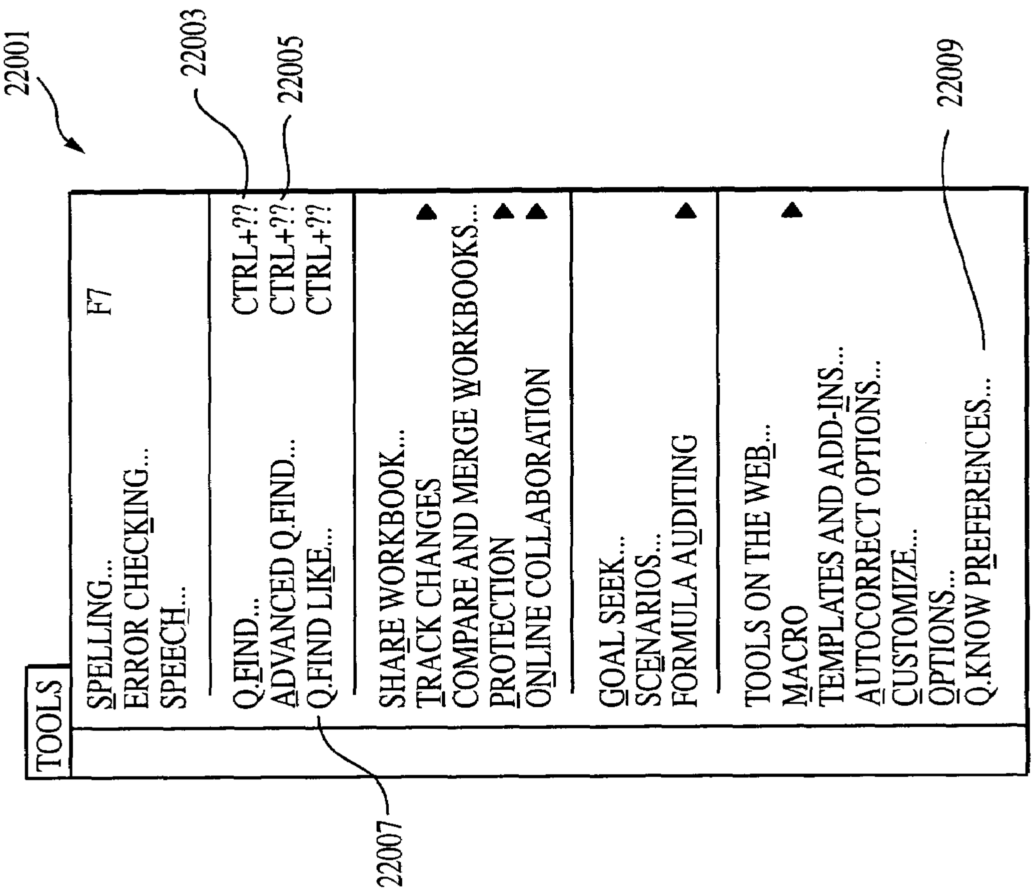

FIG. 220 illustrates an example user menu for finding items from an Excel native application, according to one or more embodiments of the present invention.

Figure 221:
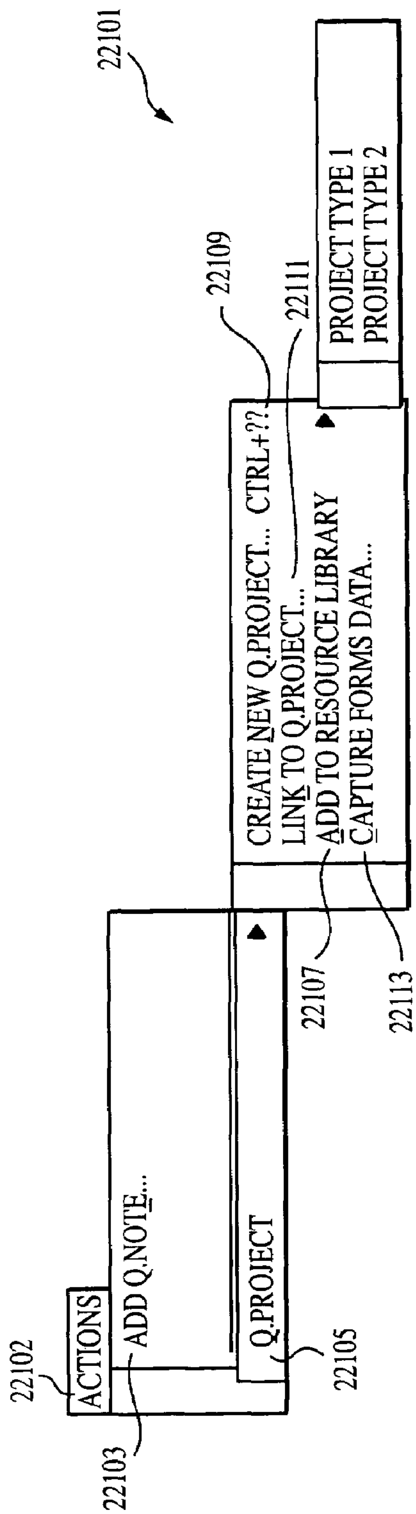

FIG. 221 illustrates an example user menu for creating a new project, linking to a project, etc., from an Excel native application, according to one or more embodiments of the present invention.

Figure 222:
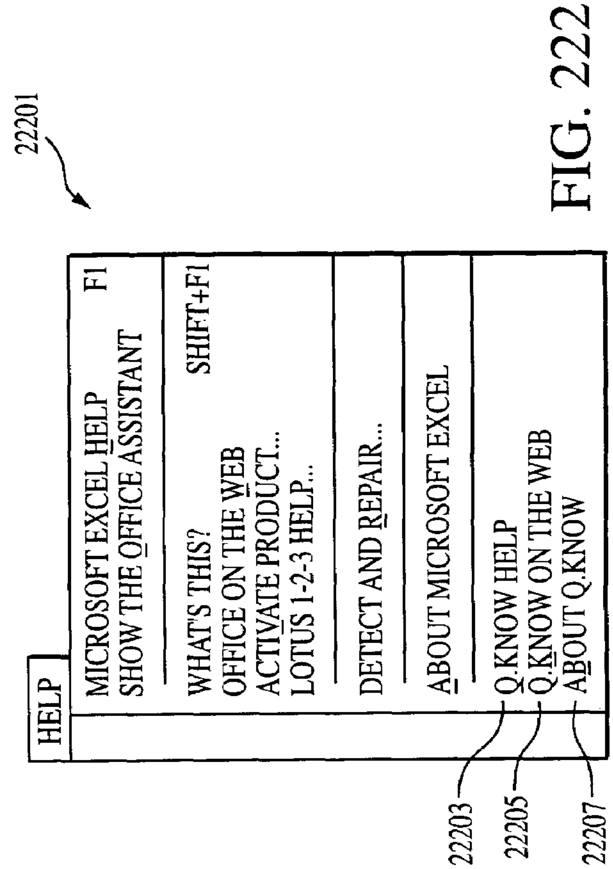

FIG. 222 illustrates an example user menu for displaying help information from an Excel native application, according to one or more embodiments of the present invention.

Figure 223:
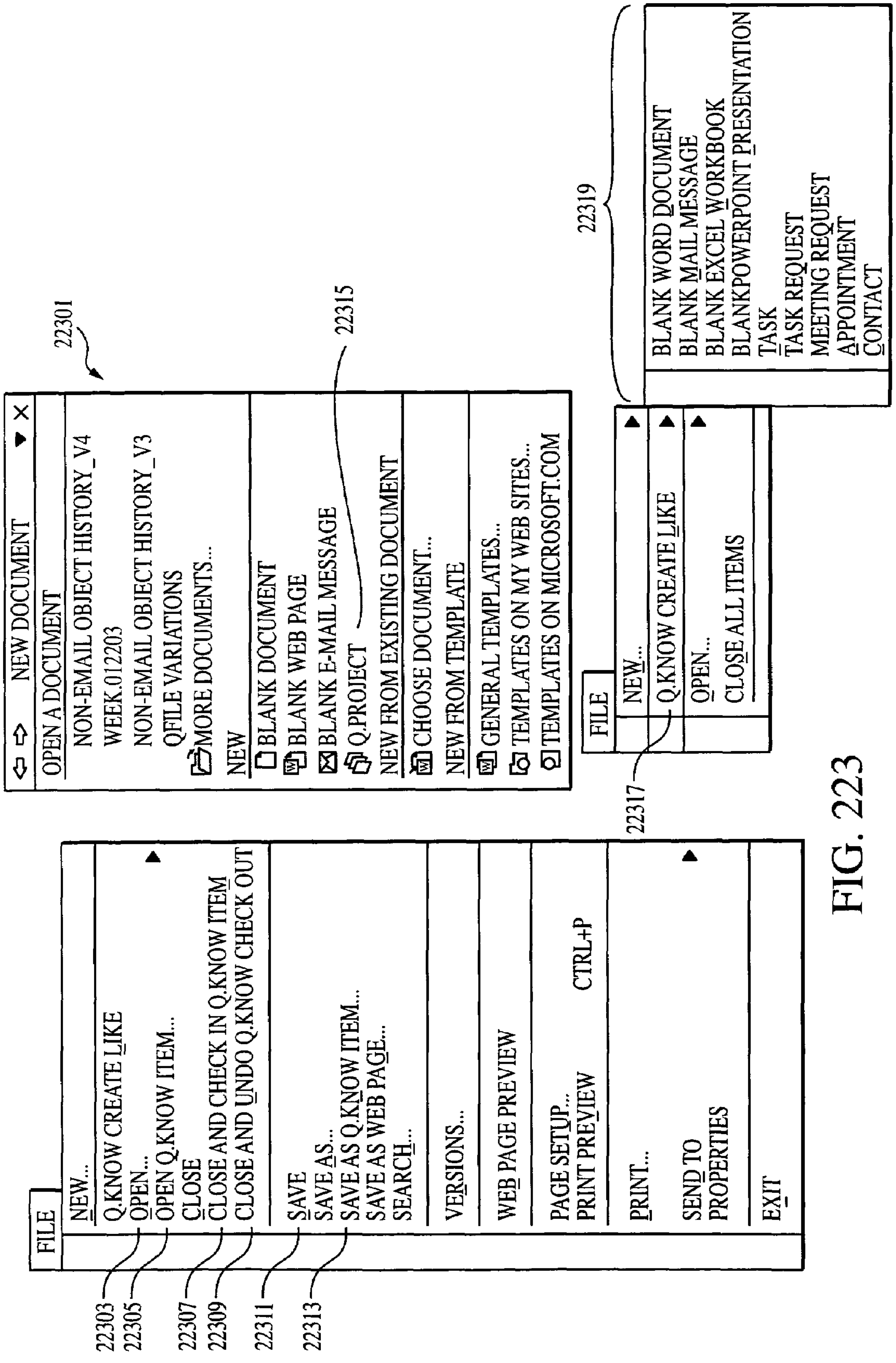

FIG. 223 illustrates an example user menu for handling items in connection with a Word native application, according to one or more embodiments of the present invention.

Figure 224:
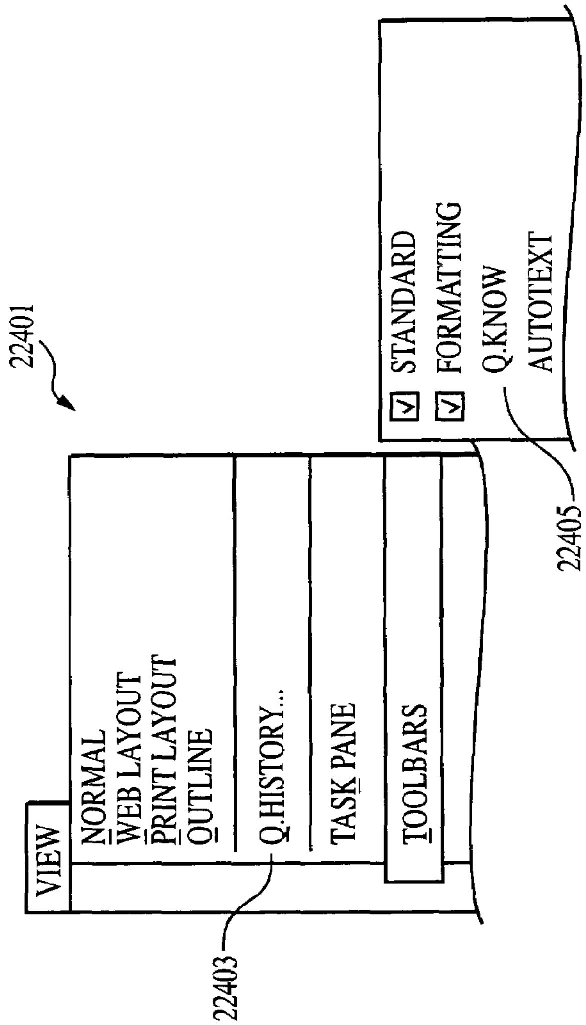

FIG. 224 illustrates an example user menu for enabling/disabling toolbars for use with a Word native application, according to one or more embodiments of the present invention.

Figure 225:
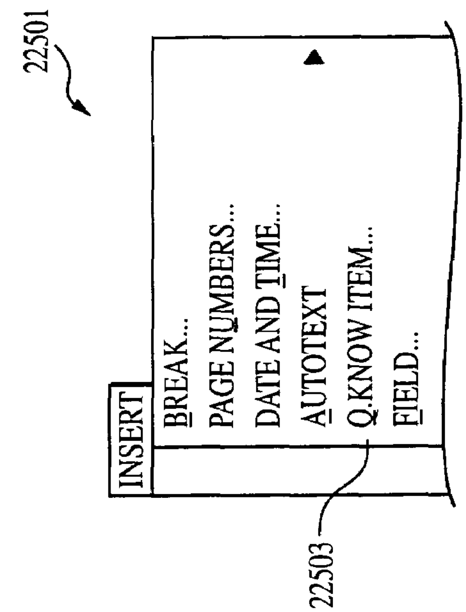

FIG. 225 illustrates an example user menu for inserting an item from a Word native application, according to one or more embodiments of the present invention.

Figure 226:
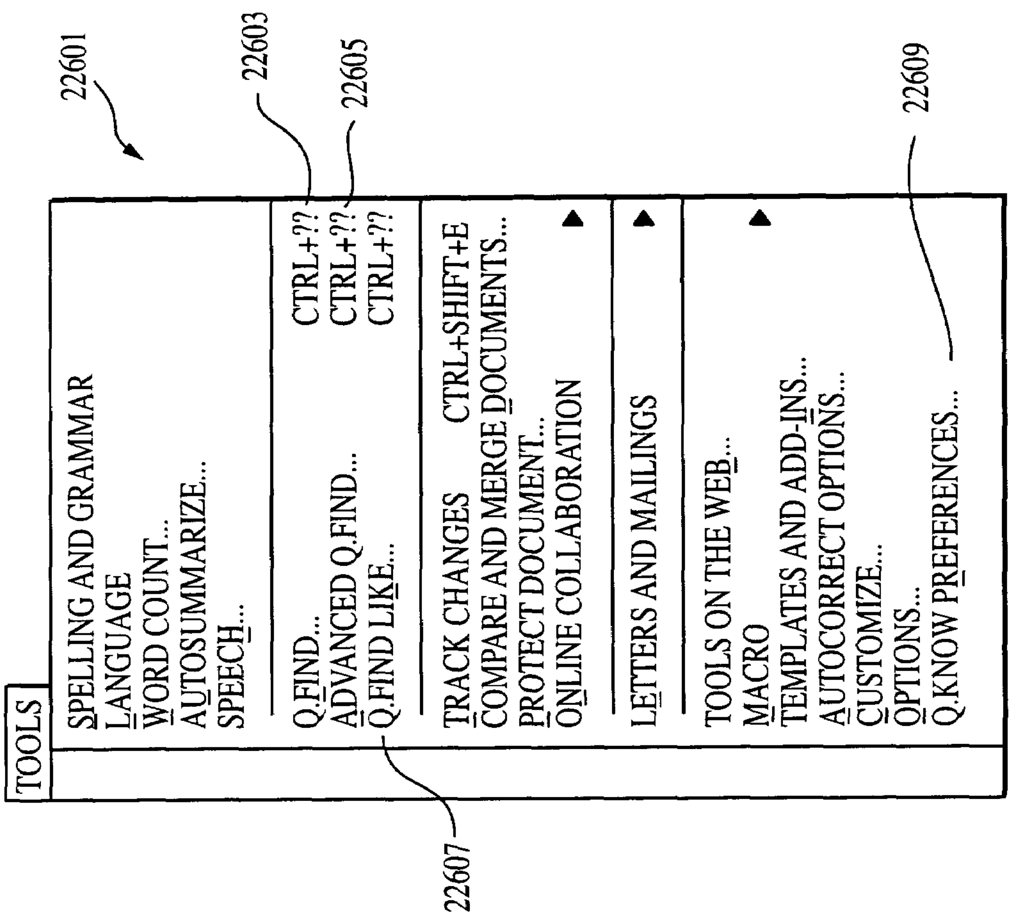

FIG. 226 illustrates an example user menu for finding items from a Word native application, according to one or more embodiments of the present invention.

Figure 227:
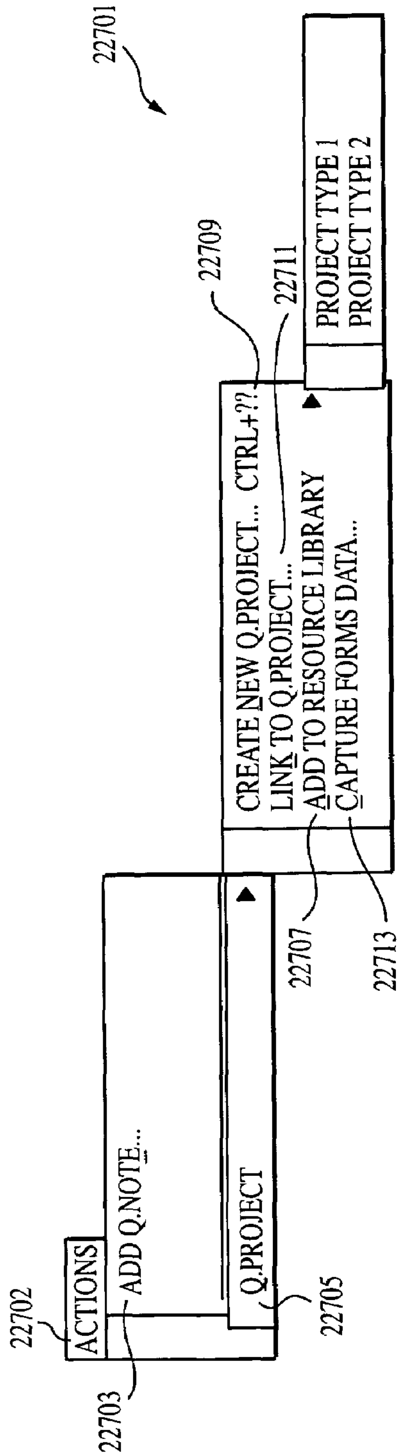

FIG. 227 illustrates an example user menu for creating a new project, linking to a project, etc., from a Word native application, according to one or more embodiments of the present invention.

Figure 228:
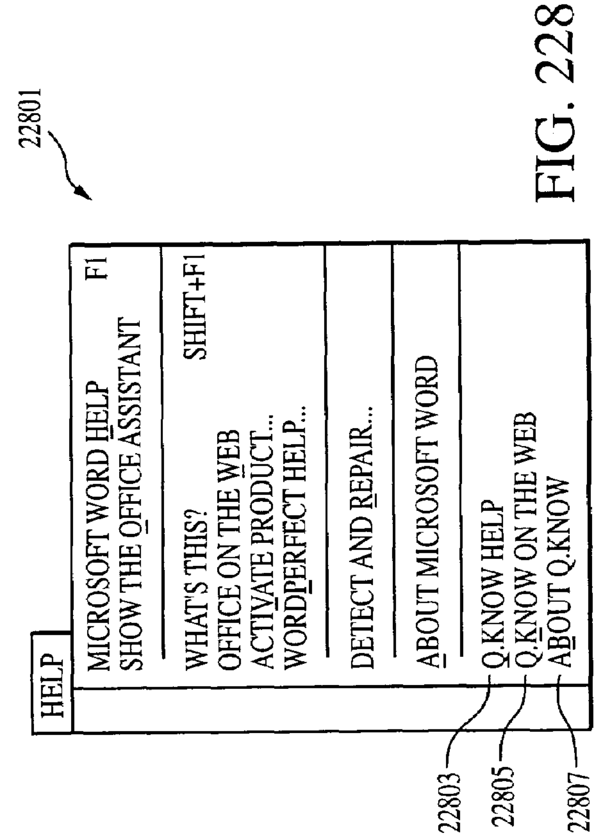

FIG. 228 illustrates an example user menu for displaying help information from a Word native application, according to one or more embodiments of the present invention.

Figure 229:
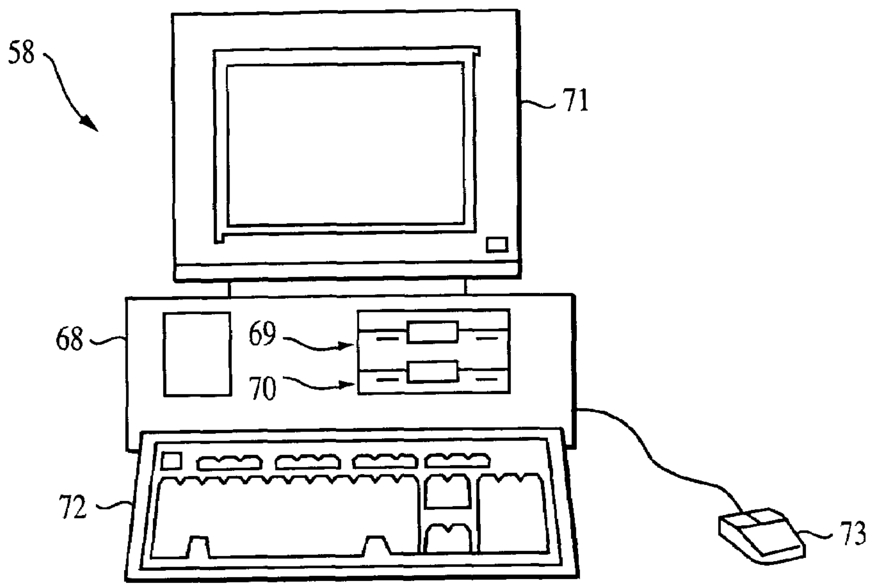

FIG. 229 illustrates a block diagram of a computer used in connection with a computer implemented embodiment of the present invention.

Figure 230:
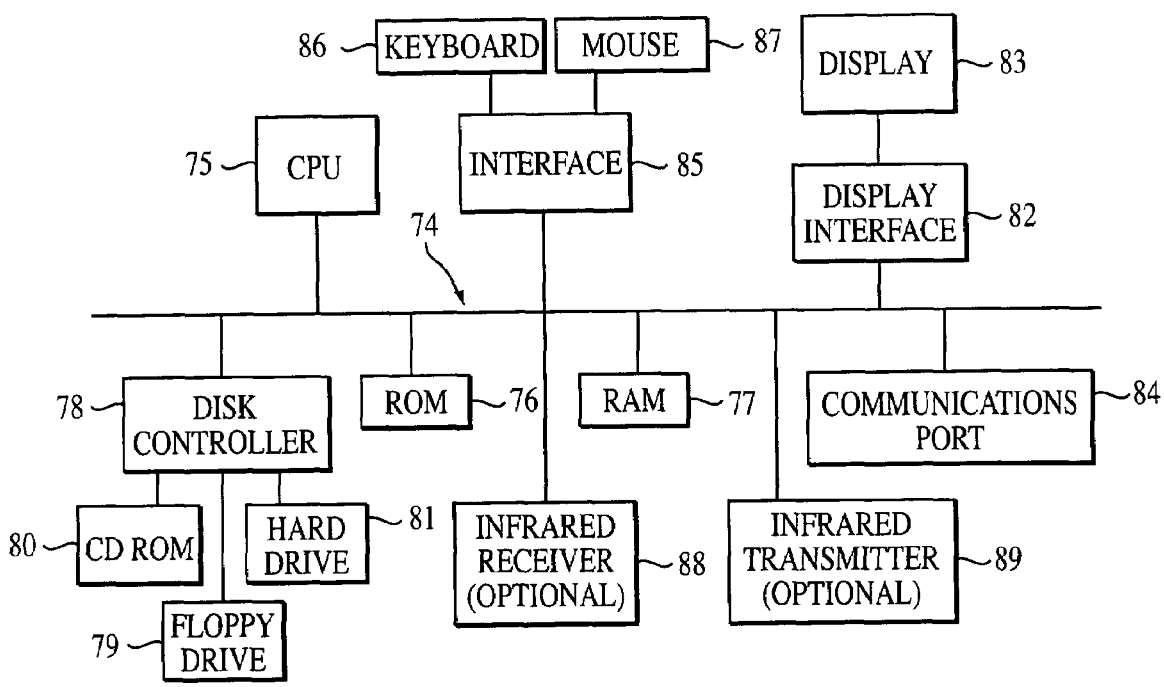

FIG. 230 illustrates a block diagram of the internal hardware of the computer of FIG. 229.

Figure 231:
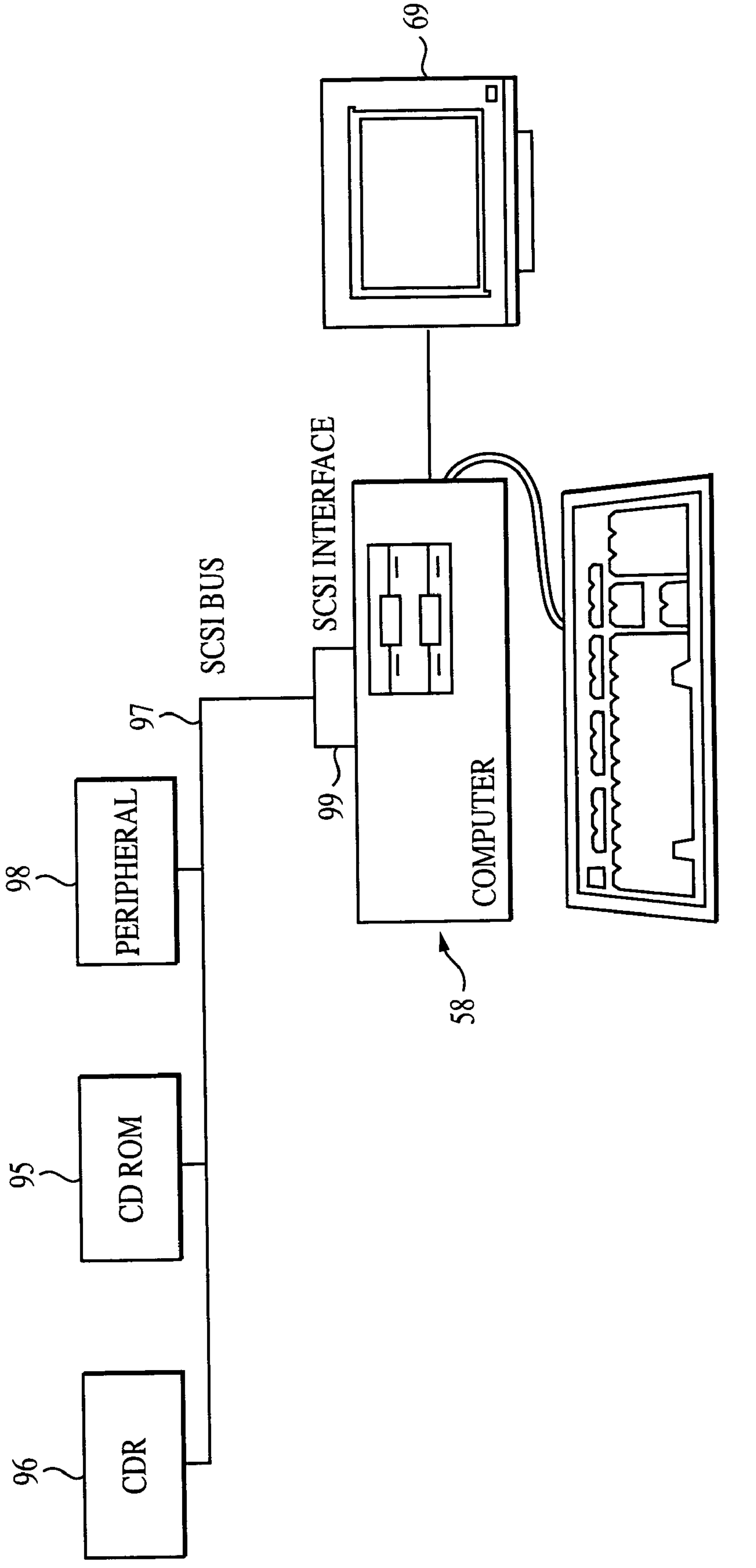

FIG. 231 illustrates a block diagram of an alternative computer of a type suitable for carrying out the present invention.

Figure 232A:
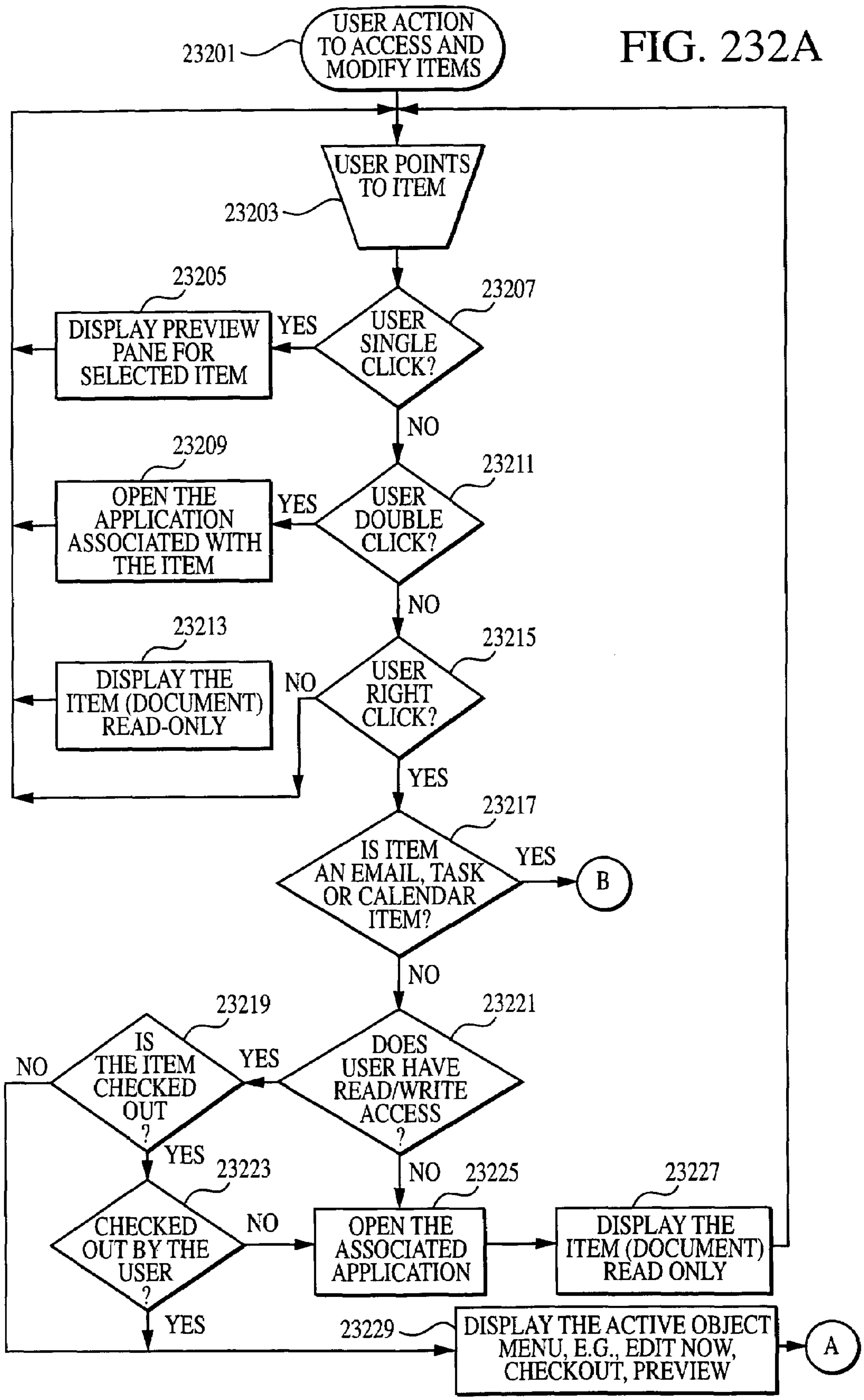
Figure 232B:
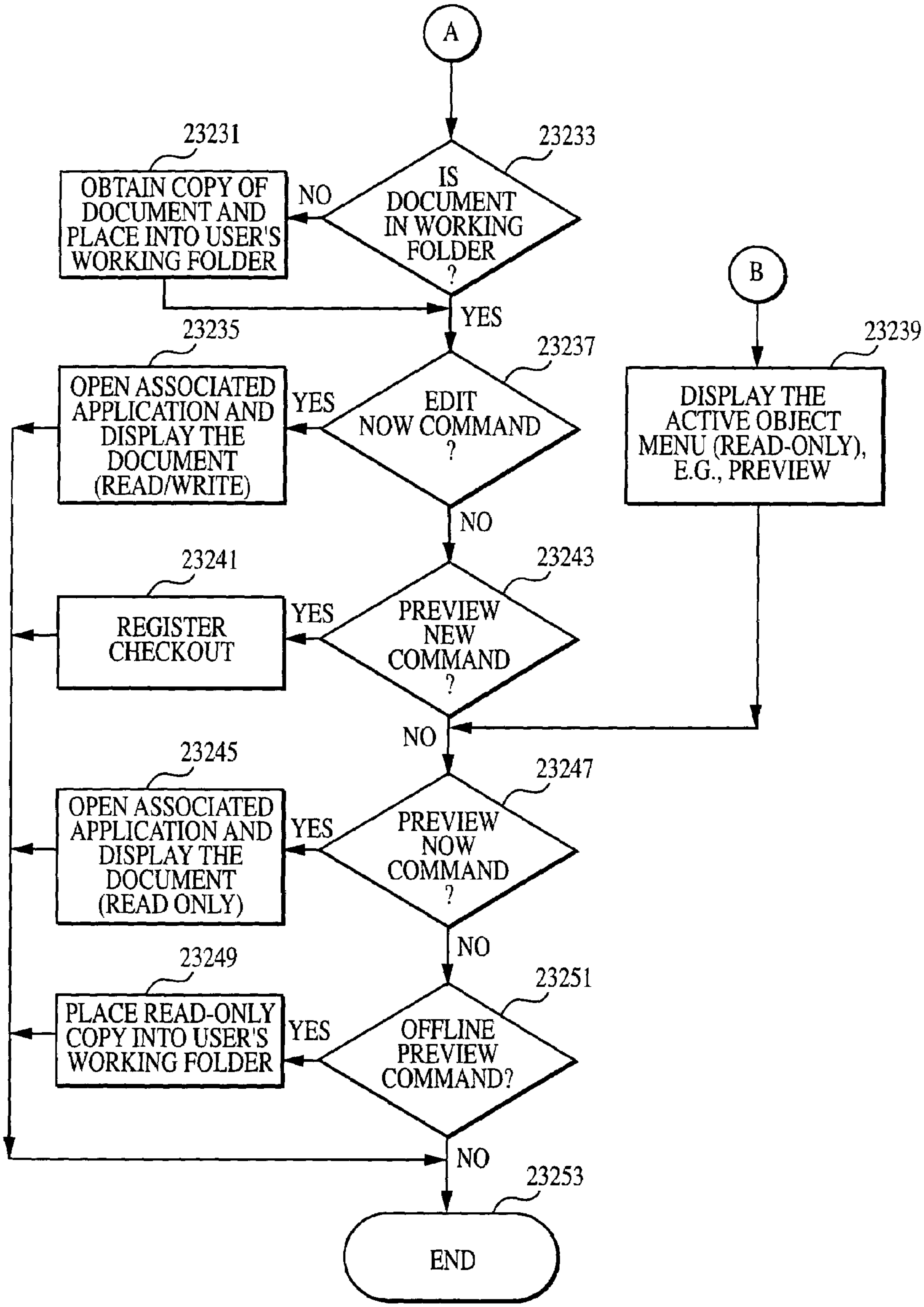

FIGS. 232A-B are a flow chart illustrating an example for processing user actions to access and modify selected items.

Figure 233:
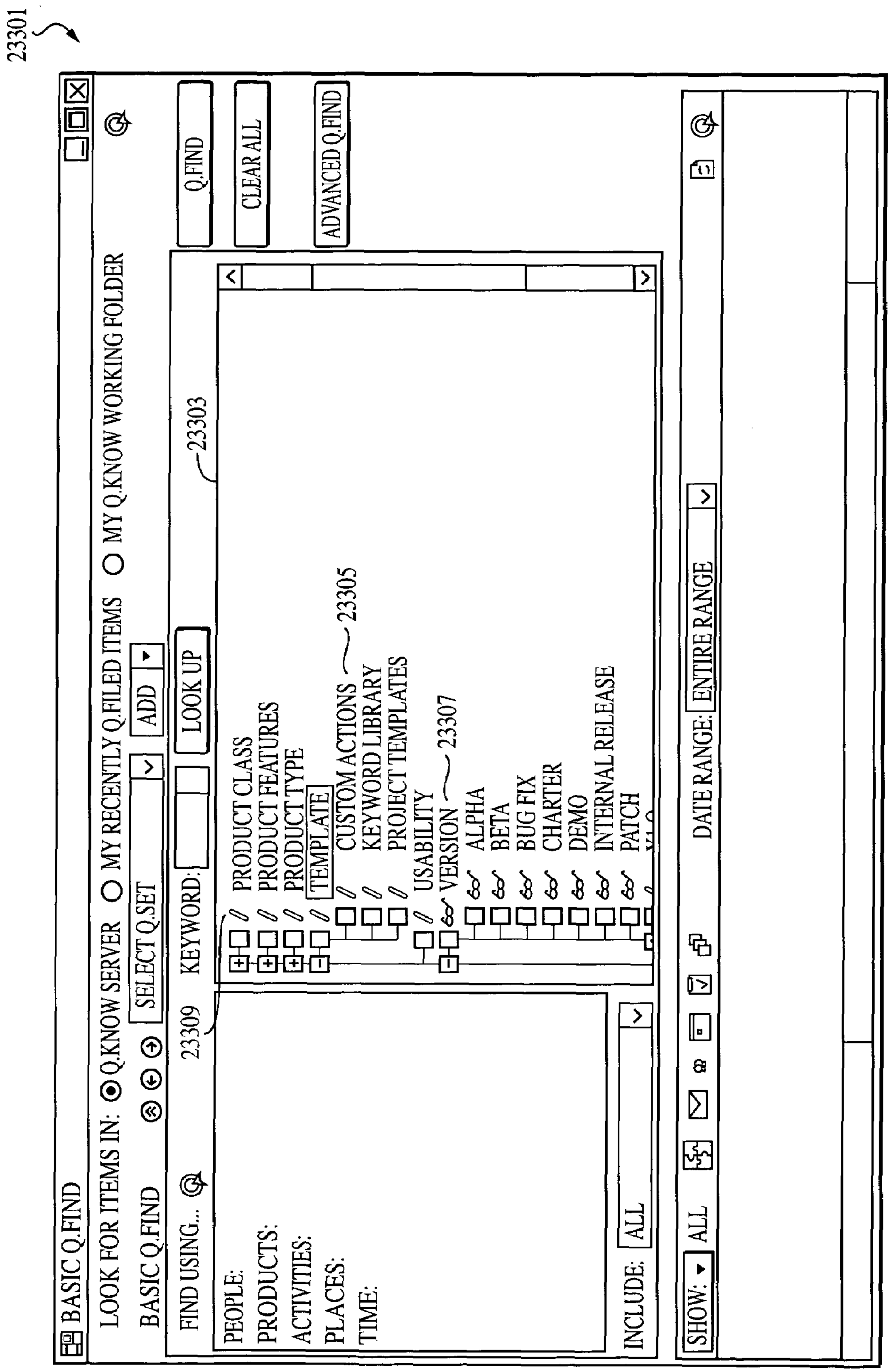

FIG. 233 illustrates an example user interface showing example access rights, used in connection with layered access of one or more embodiments of the present invention.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

The present invention provides for filing and retrieving content and integrates into existing native applications, while making relevant electronic information and documents available, including, for example, e-mail. Further, one or more aspects of the present invention relates such information and documents across several categories including but not limited to people, places, products, activities, context, and timeframe.

FIG. 5 provides a functional illustration of a deal-centric work-space according to one or more aspects of the present invention. One or more aspects of the present invention leverage thought process common to most people, i.e., the ability to state things that an item relates to. An integrated, deal-centric workspace bridges the relationships and information that drive projects or transactions. This allows efficient handling of the activities associated with a deal, as well as optionally other deal-related information such as notifications based on changing status. By understanding the context of information, the present invention enables users to quickly act upon information for faster and more efficient processing.

In the example of FIG. 5, various transactions need to be performed within one or more industries 501*a-e*. By way of example, the industries could include finance, reinsurance, insurance, and/or commercial lending. Alternative industries could include, e.g., real estate, pharmaceuticals, government, etc. Any of several activities 503*a-d* are typically performed by users on items, e.g., documents, e-mail, etc., provided and/or generated in connection with each transaction within the various industries. In the illustration of FIG. 5, the activities include find, manage, act, and report/audit. In the present example, the relationships 505*a-e* include people, time, place, activity, and product. Optionally, the invention prompts the user or provides defaults to take actions that are most relevant to the task or information at hand.

One or more embodiments of the present invention classify, manage and store particular items of interest. In the present example, the relationships are used as the classes. The classes could include more, fewer, and/or other classes, in order to expediently represent relationships within an industry or particular types of transactions or projects. Further, the specific classes identified herein are not required to be denominated exactly as designated herein. For example, "actors" may reflect the relationship "people."

One or more aspects of the present invention optionally provide that the deal management functionality and other activities are incorporated into the filing system, to produce what is effectively a shared, dynamic workspace. The workspace optionally includes direct access to, for example, a project's status and deal-specific documents (and/or other items), in one place. Hence, project milestones are easily checked. Moreover, compliance is a result of regular work habit. This is because one or more aspects of the present invention provide that the entire "auditable" history of a transaction is automatically recorded and readily retrieved just by operation of the present invention, which requires little or no variation from existing typical use of communication platforms and/or native applications.

The present invention provides contextual access to business information. FIG. 6 provides a functional illustration of manually organizing information for retrieval across multiple categories. In this example, information is divided into five classes 601 of relationships. Each of the classes 601 includes several folders 603, 605, 607, 609, 611. For example, classes for time, products, place, people, and projects includes folders for, respectively, time periods 603, product names 605, countries 607, people 609, and activities 611. Extending this example further, a client folder 609 (of the people class 601) includes company names 613. A document that needs to be filed may be tagged, to note a relationship to, e.g., a particular product name 605, particular company names 613, a particular time period 603, particular countries 607, and/or a particular activity.

The multi-dimensional associative filing system according to the present invention brings order to documents, e-mail messages, contacts, meetings, and other related information. One or more aspects of the present invention are based on tagging each item with relevant keywords. For example, a Word document may be tagged with keywords that relate to it, such as the client's name, the product or service provided by the company, the time frame, and/or the name of the user's department, and then indexed and stored. Finding that document at a later time may include a search based on one or more relevant keywords.

Reference is now made to FIG. 7 which is an illustration of an example of a computer-based system 701 for use in connection with classifying, indexing or retrieving a communication or project or other item through associative filing. The computer based system 701 includes various components to provide tools for users to manage items. Items may be any cohesive piece of electronic information, generally (but not always) acted on by one or more native applications. Items include, e.g., e-mail 721, documents 725, meeting appointments 729, tasks 733, contacts 737, faxes 741, files (not illustrated), reports (not illustrated), etc. Native applications include, by way of example, an e-mail application 719, a word processor application 723, a calendar application 727, a task application 731, a contacts application 735, a facsimile application 739, and other applications 743 acting on other items 745. In this example, items of various types may be stored and retrieved by the components Q.file 703 and Q.find 705. The component Q.projects 707 offers project team members a shared view of project status as well as shared access to items. A report/history component 709 offer the user various reports and history of items. Optionally, other components may be included to produce other actions 711. A user 713 interfaces with the system 701, for example via a conventional user interface such as Outlook, Windows, and/or other interfaces 715. Further, the system 701 accesses communications via a network such as the Internet 716. In the present example, a database of items 717 is stored remotely and accessed via the Internet 716.

Reference is now made to FIG. 8, a block diagram illustrating a network for use in connection with the associative filing and the computer based system 801, such as illustrated in FIG. 7. Several computer based systems 801, each having their own set of user interfaces 803 such as Outlook and Windows, communicate with a company network 807. The items database 717 in this example is provided via an items server 805, also connected to the company network 807. Further, one or more of the computer based systems 801 may communicate remotely with the company network 807, such as via the Internet 715. Optionally, remote access is provided via a firewall 809.

Reference is now made to FIG. 9, a block diagram illustrating assigning classes 901 and/or projects 903 to an item 905. The present example again uses five classes, although one or more embodiments of the present invention provide that the classes are user-definable. The classes include activities 907, people 909, places 913, products 915, and/or time 917, as well as any other company-specific classes 911 if desired. Keywords 919, 921, 923, 925, 927 are optionally included for one or more classes. Information from one or more classes is associated, such as through tags, with the item 905. Optionally, one or more projects 903 is associated with the item 905. Associating an item with a project optionally causes the item to inherit characteristics from the project, e.g., the item inherits the project's keywords. In the present example, the system includes project A 931 and project B 929; project A 931 is associated with the item 905. Multiple items may be associated with projects. According to one or more aspects of the present invention, a filed item may be retrieved by searching for it based not only on keywords, but also based on a project with which it is associated. Although the illustration shows one-way links, alternative embodiments are possible such as, e.g., two-way links.

Classes for items, and keywords within classes are preferred for classifying, indexing or retrieving an item. The keywords act as labels with which electronic documents and other items are tagged. The keywords associate items with the related business people, business-related activities, company locations, company products/services, and fiscally relevant timeframes, for example. As an example, a document is tagged with keywords that represent the purpose of the document, the department that produced it, the subject matter, etc. When an item is tagged with keywords and then stored, it is filed and available to be retrieved via one or more embodiments of the present invention.

Keywords are organized into categories and sub-categories that are meaningful for the user's industry, company, and daily business transactions. Classes preferably include the categories of activities, people, places, products, and time. The activities class includes job functions within the user's organization, company departments, and personnel, for example. The people class includes people and organizations external to the user's company with whom the company works, does business, and/or competes, e.g., other companies, vendors, partners, brokers, and contractors. The places class includes the logical, physical and geographic locations in which the user's company does business. The products or objects class includes generally objects, such as the products, services or objects, whether tangible or intangible, to which something relates, such as objects that are the subject of a communication, situation, and the like, and/or objects that a company buys, sells, licenses, uses and/or services. The time class includes the relevant fiscal, periodic, and other functional measures of time, such as fiscal year, calendar year or underwriting year.

An optional keyword summary is provided to a user in appropriate instances to assist in determining keywords, and contains categorized keywords. A keyword summary can include, e.g., keywords that have already been assigned to a filed item; suggested keywords for an item that has not yet been filed; and keywords that a user selects as search criteria. The keyword list is a company-defined and managed, expandable and contractible list that is organized by the classes. The user may select keywords from several places, including the keyword summary. Optionally, a system administrator can control access (e.g., read and/or write) to certain keywords to certain users and user groups; and/or can provide certain users or user groups with the right to add keywords to the keyword list. Optionally, keyword access is used to restrict user access to items tagged with those restricted keywords; for example, if an item is tagged with one keyword for which the user has read-only access, the user can only read the tagged item, and if the user has no access to the keyword, the user cannot access the item. Optionally, the restricted keyword no-access feature is overridden by read-only access when a user is explicitly sent an item via, e.g., e-mail.

FIGS. 10A-B are a flow chart illustrating an example process for initially determining classes 1001 to be assigned to items in the system. Here, at step 1003 the initial system includes default classes for associative filing: activities, people, places, products and time. At step 1005, the system determines whether a system administrator wishes to remove a default class. If so, at step 1007 the system interacts with the administrator to determine which default classes to remove; and at step 1009, the system removes the selected classes from the default classes. At step 1011, the system interacts with the administrator to determine whether the administrator wishes to add an industry-specific class. If so, at step 1013, the system interacts with the administrator to determine which industry-specific class to add, and at step 1015 the system adds the selected industry-specific class. At step 1017, the system determines whether the administrator wishes to add a company-specific class. If so, then at step 1019 the system interacts with the administrator to define the company-specific class; and at step 1021, the system adds the defined company-specific class. At step 1023, the system determines whether the administrator wishes to add user-defined classes. If so, then at step 1025, the system interacts with the administrator to determine the range of the user-defined classes 1052; and at step 1027 the system adds the user-defined classes. At step 1029, the system stores the default classes, industry-specific classes (if any), company-specific classes (if any) and user-defined classes (if any) as available classes, for further use in associative filing according to the invention. Optionally, access to keywords can be limited to particular users. At step 1031, processing ends.

FIG. 11 is a flow chart illustrating an example process of populating candidate keywords for classes 1101. At step 1103, having obtained an item, the system provides the item to the user display. At step 1105, the system displays the available classes to the user. At step 1107, the system determines whether any keywords are associated with the item's classes. If so, at step 1109, the system displays the keywords associated with the item for the corresponding classes. At step 1111, the system interacts with the user and determines whether the user added any keywords to the item's classes. If so, at step 1113, the system adds the keywords added by the user as available keywords for the corresponding available class; and at step 1117, the system adds the keywords added by the user as keywords associated with the item for the indicated classes corresponding to the item. Optionally, an item may have other items attached to it, such as a Word document attached to an e-mail. Hence, at step 1121, the system determines whether any other item(s) is attached to the current item, and if not, processing ends 1123. Otherwise, at step 1119 the system gets the item(s) attached to the current item; at step 1115, the system adds the keywords for the attached item to the keywords for the item; and loops back to step 1103. Optionally, the keywords are stored in an index server. Optionally, a keyword may be renamed. Optionally, access to keywords may be limited to specified users.

FIG. 12 is a flow chart illustrating an example process of indexing an item 1201 relative to classes associated with the item. Here, the user is working on an item that may need to be indexed. At step 1203, the system obtains keywords relative to the classes for the current item. At step 1205, the system determines whether the item is already stored in the items database. If so, then the item index needs to be updated, but the item does not require further storing. At step 1211, the system determines whether keywords were newly added for one or more classes of the current item. At step 1215, the system stores any newly added keywords for each class, in a keywords list for each class. At step 1219, the system indexes the stored item to the stored newly added keywords for each class. On the other hand, if the item is not already stored in the items database, at step 1209, the system stores the item in the items database. The items database can be located on local internal drives, local external drives, network attached storage (NAS), a storage area network (SAN), etc. The items are preferably zipped before storage. At step 1213, the system stores any new keywords for any class in a keyword list for each class. At step 1217, the system indexes the stored item to the stored keywords for each class. Then at step 1223, the system determines whether an other item(s) is attached to the current item. If not, processing ends at step 1225. Otherwise, the system attends to indexing the attached item(s) by getting the attached item(s) at step 1221 and looping back to step 1203.

Reference is now made to FIG. 13, a flow chart illustrating an example process of retrieving items 1301 based on retrieval criteria such as classes, date, and/or project. At step 1303, the system interacts with the user to determine the retrieval criteria, such as a keyword in one or more classes, a date or date range in one or more appropriate classes, and/or one or more projects. At step 1305, the system searches a keyword list associated with the specified classes for the keyword criteria, searches the date ranges for the specified classes, and/or searches the project index for the specified project(s). At step 1309, the system determines whether there is an index to an item that satisfies one or more search criteria. If not, the system informs the user that no search items were located at step 1307, and then ends processing at step 1323. Otherwise, at step 1311 the system retrieves data characterizing the located items that satisfied the search criteria. At step 1313, the system lists the located items, and interacts with the user to select one or more of the located items, to be retrieved. At step 1315, the system determines whether any item was selected, and if not, ends processing at step 1323. Otherwise, at step 1317, the system retrieves the selected item and displays it to the users. At step 1319, the system determines whether an item is attached to the current item, and if so, at step 1321, the system retrieves data characterizing the attached item and displays the data for the attached item to the user. At step 1323, processing ends.

One or more embodiments of the present invention produce an intuitive user interface. In this manner, the user is provided with faster and easier document filing, retrieval and sharing. Further, the user may have access to the right information, at the right time, in the context and language of the user's business. FIG. 14 is an illustration of one example of a user interface 1401 for classifying, indexing or retrieving a communication, document, item, or project through associative filing. The user no longer needs to disperse business information across folders and subfolders on the computer, network drivers and/or in Outlook folders. Moreover, the user does not need to be concerned with where to file a document that relates to multiple topics, how to file documents or email messages in an appropriate business context, and/or where the most current versions of shared documents are located. In the present example, the user interface 1401 includes tabs for various actions to perform on items, e.g., create 1403, submit required document 1405, find items within a project 1407, run reports 1409, forward a project 1411, and request approval 1413. Administrative tabs are also included, e.g., to begin a global toolbar 1415, and to access help 1437. The user of this example created a new item with a title 1433. Optionally, an identifier 1417 is assigned by the present invention. The user has also provided keywords for various classes associated with the new item, e.g., activities (insuring, reinsuring, brokering) (not illustrated); time 1423 (e.g., underwriting year, inception date, expiry date, term); people 1419, 1425 (broker, cedant, insured or company, division); and user defined classes of financial characteristics 1429 (currency, sum insured, upper limit, lower limit, deductible). Tabs 1431 are also provided for accessing various types of items and commands, e.g., documents, forms, calendar, contacts, tasks, history, and item filing. Here, the relevant contacts 1435 filed as items are displayed.

According to one or more embodiments of the present invention, integration is specifically provided with native applications including, for example, Microsoft Outlook, Word, Excel, PowerPoint, and Internet Explorer. Commands utilized in operation of the present invention preferably are made available from native applications. Reference is now made to FIG. 15, a flow chart illustrating an extension of Outlook to allow the user to interface via their native application interface. The present invention may be accessed via the Outlook shortcuts bar, the folders list, the toolbar, and the Outlook menus. Furthermore, Microsoft Office items are directly supported, according to one or more embodiments of the present invention. This flow chart illustrates how the inbox and Outlook integration screens relate to each other, according to one or more embodiments of the present invention. Accordingly, Outlook Today 1501 includes an inbox 1503, a calendar 1505, contacts 1507, drafts function folder 1509, sent items folder 1511, Q.Project® 1513, Q.find 1515, notes 1517, and/or tasks 1519. The inbox 1503 includes an inbox tab 1521 and recently filed inbox items 1523. Recently filed inbox items 1523 further includes a list of messages filed as items 1525, which itself further includes a keyword details tab for messages 1527 and message linked items 1529. The Calendar 1505 includes a new meeting 1531, and a meeting filed as an item 1533. The meeting filed as an item further includes a keyword details tab for the filed meetings 1535, keyword details tab for linked items for the same 1537, and personal (e.g., unfiled) meetings 1539. The contacts 1507 includes new contacts 1541, and tasks filed as items 1543. The tasks filed as items further includes a keyword details tab for filed contacts 1545, tab for linked items 1547, and personal contacts 1549. The drafts function folder 1509 checks whether the item has copies of attachments that are outdated 1551, and if so, if the user opens an item that has attachments that have more recent versions at step 1553, the system inquires whether the user wants to update all outdated attachments with most recent versions. The system lists such messages 1555. The sent items folder 1511 includes a sent tab 1557 and a recently filed sent items tab 1559. The recently filed sent items tab includes filed messages 1561, which in turn includes a keyword details tab for messages 1563 and a message linked items tab 1565. The tasks 1519 includes new task 1567, tasks filed as items 1569, and personal tasks 1575. The filed tasks 1569 includes a keyword details tab for filed tasks 1571 and a tab for linked items of filed tasks 1573.

FIG. 16 illustrates an example user interface 1601 showing an email 1615 in an Outlook inbox 1619 to be used as an item. Here, the user interface 1601 includes an items shortcut 1605 and a projects shortcut 1607 in the Outlook shortcuts bar 1603. One or more status columns 1609*a*, 1609*b* are added to the usual inbox display; here the status reflects whether the e-mail is or is not filed as an item (Q/NQ), and the type of project to which the e-mail is linked. The optional tab for displaying recently filed items 1611 is included. Optionally, the user can instruct the system to not file the item 1613. The email 1615 is displayed in a preview screen 1617.

FIG. 17 illustrates an example user interface 1601 showing an attachment to the item of FIG. 16, according to one or more embodiments of the present invention. The user interface of this example allows the user to manage and file their incoming messages 1615. A file details tab 1701 allows the user to view details of the file, while a linked items tab 1703 allows the user to managed linked items. Here, the linked items tab 1703 is inactive since the item has not yet been filed. The lower pane 1707 allows the user to manage and file the incoming message. One or more "attachment" buttons 1705 allow the user to preview attachments.

FIG. 18 illustrates an example user interface 1801 showing classes assigned to the item of the FIG. 16, according to one or more embodiments of the present invention. The user has selected an e-mail 1821 in the inbox as the item, and selected the details tab 1803. The details tab 1803 provides the options of selecting projects 1811, keywords 1813, a keyword set 1815, new keywords to be added 1817, or "like" items 1819. Here, the user has selected keywords, and so keywords associated with the appropriate classes 1807 are provided. Once the user has selected the keywords for the desired classes, the user may instruct the system to file 1809 the item.

FIG. 19 illustrates an example user interface 1901 showing a summary of items linked to the item of FIG. 16. A linked items tab 1903 provides a list of the items 1905 that are linked to the current item. One or more of the linked items may be selected. Optionally, on this and other user interfaces, selected items may be accessed via drag and drop.

FIG. 20 illustrates an example user interface 2001 showing handling of the e-mail 2003 as an unfiled personal item. The "do not file" button 2005 is selected. The unfiled item is displayed in the preview pane 2007. Previewing items in the inbox allows the user to view the content of the item without having to open it in a new window. Optionally, a preview mode is provided with appropriate user interfaces so that the user may view the filed item details, linked items, and/or attachments associated with the item, without the need to open the filed, linked or attached item in a new window.

FIG. 21 illustrates an example user interface 2101 showing a preview of the e-mail 2103 as an item in the inbox, accessed via a recently filed tab 2105. The recently filed tab 2105, accessed from the inbox, displays a list of e-mails 2107 recently filed as items. The selected e-mail 2103 in the list is displayed in the preview pane 2109.

FIG. 22 illustrates an example user interface 2201 showing a history of recently filed items in the sent area of Outlook. A tab 2203 is provided to access a list 2205 of Outlook sent e-mails that have been filed as items.

FIG. 23 illustrates an example user interface 2301 showing composition of a new e-mail. Here, the user launched the "compose new message" action. The standard compose messages screen 2303 is displayed. FIG. 24 illustrates an example user interface 2401 showing a summary of the classes and keywords for assignment 2403 to the new e-mail as an item. Here, the user launched the "send message" action which triggered the "file details" tab 2405, to allow the user to set filing information prior to sending the e-mail. In the present example, no keywords are suggested unless the message is created from a "create like" command, or is related to an already-filed item. Optionally, settings in the file details tab do not apply to attachments to the e-mail.

Reference is now made to FIG. 25, a flow chart illustrating one example of a process for composing a new message via a standard Outlook interface. This flow chart illustrates a method according to one or more embodiments of the present invention for composing a new message, as well as how the screens in FIGS. 26-29 relate to each other. At step 2501, the user clicks the "new message" tab. At step 2503, the user composes a new message (a standard Outlook screen). The user may click save at step 2505, whereupon the message is saved to a local draft folder; or the user clicks send 2507. The system determines whether there are attachments to the message at step 2509. If there are attachments, the system provides keyword suggestions for the message (with attachments) at step 2511. Then the system provides keyword suggestions for the attachments at step 2519. At step 2521, if the user clicks keyword categories or keywords, then at step 2527 the user edits keywords, and clicks OK at step 2529. If the user clicks send, at step 2523, the system loops to step 2509. If the user clicks "do not file" 2525, the system provides keyword suggestions for the message (to be stored as personal) at step 2531. On the other hand, if there are no attachments, then at step 2512, the system provides keyword suggestions for the message. If the user clicks keyword categories or keywords at step 2513, then at step 2533 the user edits keywords, and clicks OK at step 2535. If the user clicks send, at step 2515, the system sends the e-mail. If the user clicks "do not file" 2517, the system provides keyword suggestions for the message (to be stored as personal) at step 2537.

FIG. 26 illustrates an example user interface 2601 presenting candidate keywords to a user for assigning classes to unfiled attachments. In this example, the user has clicked on an attachment 2603 in the selected item, and candidate keywords 2607 are presented for the selected item. The "give unfiled attachment" check box 2605 is selected, so that the user cannot change the keywords for the attachments. FIG. 27 illustrates an example user interface 2701 showing a confirmation of keywords selected via a project assignment for the new message. The user may use this screen to select keywords for filing the message 2703 prior to sending. Keywords are suggested 2705 for filing.

FIG. 28 illustrates an example user interface 2801 showing a top level confirmation of suggested keywords for unfiled items attached to the new message 2803. The message and attachments will be stored as personal. FIG. 29 illustrates an example user interface 2901 showing a confirmation of the suggested keywords 2905 for an individual item attached to the new message 2903 that is to be sent.

Reference is now made to FIG. 30 a flow chart illustrating one example of a process for creating a new item via Outlook, with keyword suggestions. At step 3001, the user clicks on the new Outlook item. At step 3003, the system creates a new Outlook item. At step 3005, the user clicks "save and close". At step 3009, the system determines whether the "private" check box is selected. If so, processing proceeds to step 3031 (described below). At step 3007, the system determines whether there are any attachments. If not, the system displays keyword suggestions for the item at step 3015. If the user chooses to select keywords, select projects, or specifies text, the system files the item with those keywords at step 3013. If the user clicks save, the system files the item with the suggested keywords at step 3017. If the user indicates that the item should not be filed at step 3019, the system provides keyword suggestions for a non-filed, personal Outlook item at step 3021. On the other hand, if there are attachments, the user creates a new Outlook item through, e.g., a list or calendar view. Then, at step 3011, the system provides keyword suggestions corresponding to the item, and at step 3023 the system provides keyword suggestions for the attachments. If the user chooses to select keywords, select projects, or specifies text, the system files the item with those keywords at step 3025. If the user clicks save, the system files the item with the suggested keywords at step 3027. If the user indicates that the item should not be filed at step 3029, the system provides keyword suggestions for a non-filed, personal Outlook item at step 3031.

FIG. 31 provides an example user interface 3101 showing a presentation of candidate keywords 3105 to a user for assigning to classes for attachments 3103 to the item. Here, a check box 3107, if selected, instructs the system to give the unfiled attachments the same information as the filed item. The file button 3109 instructs the system to file the item and/or attachment. FIG. 32 illustrates an example user interface 3201 showing a confirmation of candidate keywords 3207 selected via a project assignment, and a selection of keywords 3203 for the item. FIG. 33 illustrates an example user interface 3301 showing a confirmation that there are no attachments 3303 to the current item, where the current item is not to be filed. Instead of providing a file button, a save button 3309 is provided to save the item and attachments in the native application. FIG. 34 illustrates an example user interface 3401 showing a confirmation of the suggested keywords 3403 for a current item 3405, where there are no attachments. The file button 3409 is provided to save the item.

FIG. 35 illustrates example user interfaces 3501, 3503, 3505, illustrating an opened Outlook task, Outlook appointment, and Outlook contact, respectively, to be treated as unfiled items. In each example, the "do not file" checkbox 3507 is selected, so that each item will be unfiled. FIG. 36 illustrates an example of user interfaces 3601, 3603, 3605 for an opened filed item which is an Outlook task, Outlook appointment, and Outlook contact. In the example user interface, a filing summary 3607, including, e.g., linked projects and keywords, is provided for the opened filed item. The interface also provides command buttons 3609 for access to associative filing commands.

One or more embodiments of the present invention permit filing of multiple items, such as from a local machine, multiple messages in an inbox, multiple previously filed items in a search results list, etc. Optionally, the present invention handles multiple items of mixed Outlook and/or other types. Optionally, the present invention restricts refiling of an already-filed item and/or assigning different classes/projects between an item and its attachments, including where such items are in a grouping of multiple items.

Reference is now made to FIG. 37, illustrating an example user interface 3701 showing the selection of class information in the filing of multiple items (optionally the same) or individual items. Dealing with items in multiples is useful, for example, when managing legacy items (e.g., Outlook content that existed prior to installation of the computer version of the system), and using the same keywords for items in the group. In the present example, the e-mail item 3703 includes an attachment 3705. When the item is already filed, the classes of the item are assigned to the attachment; optionally the attachment's tags are editable. The "give all items" checkbox 3707 (as described previously) is checked. The filing summary 3709 (described previously) for the selected items is displayed, beginning with the first item, for filed items; if the item is not filed, the filing summary 3709 does not provide information.

FIG. 38 illustrates an example user interface 3801 showing the filing of an item 3803, e.g., an outgoing e-mail, with multiple attachments 3805. The optional "give unfiled" button 3807 is selected, giving any unfiled attachments the same information as the item to which they are attached. A button 3811 is provided to file and send the item and any attachments. An unfiled attachment or unfiled item includes, e.g., legacy content (e.g., pre-existing Word documents), or e-mail messages received from a user outside the system, according to the present invention. Optionally, this and other user interfaces visually differentiates unfiled and/or filed items.

FIG. 39 illustrates an example user interface 3901 showing the filing of an attached item 3905 as well as the original unfiled message 3903. The optional "give unfiled" button 3907 is not selected; the optional "file all items separately" button 3911 is selected to file the items individually. There is provided a "do not file" button 3913, 3917 for the attached item and for the original message. The file summary 3909 for the current item, i.e., the attached item, is displayed. The "file and send" button 3915 is provided.

FIG. 40 illustrates an example user interface 4001 showing the filing of an item 4003 with multiple attachments, including a first attachment 4005, as in FIG. 38, and not sending the item. The optional "give unfiled" button 4007 is selected, giving any unfiled attachments the same information as the item to which they are attached. The filing summary 4009 is also provided. A "file" command button 4015 is provided to file the item and any attachments. Optionally, there is provided the "do not file" button 4013.

FIG. 41 illustrates an alternative example user interface 4101 showing the filing of multiple items to have the same classes and linked projects. A group of items 4103 is selected; the group may include different types, e.g., contact, PowerPoint file, Word file, etc. A filing summary 4109 for the first selected item in the group 4103 is provided. The optional "add file information to each item" button 4107 is selected, to cause the same keywords selected to be appended to existing keywords of each item in the group. The "file" command button 4111 is provided to file the items in the group.

Reference is now made to FIG. 42, a flow chart illustrating an example of the processes of filing an item via Q.File. In the present example, the user has clicked on a message in the Inbox. At step 4201, the system determines whether the message is filed. If so, at step 4213, the filed message is opened with the preview tab, enabling the preview pane. At steps 4215, the filed message is further opened with the linked tab, and with the Q.File tab, enabling link commands and the "file" command button. If the message is not filed, at step 4203 the unfiled message is opened with the preview tab. At step 4205, the user verifies that all project links assigned to the message are correct, and if not, the system interacts with the user to edit the project links at step 4207. Otherwise, at step 4209, the user verifies that all keywords are correct, and if not at step 4211 the system interacts with the user to select the keywords at step 4211. Then, at step 4219, the system determines whether the current item has any unfiled attachments. If not, the item is filed at step 4220 and processing terminates. Otherwise, at step 4221, the system files the attachments. At step 4223, the user determines whether the attachments are to be filed the same as the message. If so, at step 4230, the user may instruct the system to file the attachments. Otherwise, at step 4225, the user verifies that the project is correct, and if not, the system interacts with the user to edit the project information at step 4227. Further, at step 4229, the user verifies that the keywords are correct, and if not, at step 4229, the system interacts with the user to select the keywords. Otherwise, if the keywords for the attachment are correct, processing proceeds to step 4230.

FIG. 43 illustrates an example user interface 4301 for filing of an otherwise unfiled item 4303. The filing summary 4305 of the item 4303 is provided in the file pane. In this case, a project and keywords 4307 are suggested to which the item may be linked.

FIG. 44 illustrates an example user interface 4401 for drag and drop filing of multiple items. Drag and drop allows the user to quickly file groups of items. The user may select, drag and drop one or more items onto the file tab 4403, the system files or re-files the drag and dropped item(s) with the listed keyword and project link information in the filing summary 4405.

FIG. 45 illustrates an example user interface 4501 for selecting and/or editing keywords in a keyword summary 4502 for a selected item. In the present example, keywords may be listed by classes 4511, listed in a directory (keyword list) 4507, and/or listed as search results 4509. Classes include, e.g., activity 4505, people 4504, and product 4503. This window may be launched when the user is to select a keyword.

FIG. 46 illustrates an example user interface 4601 for selecting a project to which to link the item, launched when the user is to select a project. In the present example, the keyword summary 4602 is inherited from the keywords displayed when this window is launched. The project summary 4603 provides a list of candidate projects with the keywords, from which the user may select a project 4605 to which the item is linked.

FIG. 47 illustrates an example user interface 4701 for selecting keywords to assign to an item, to enable the user to file an item "like" an other item. Keywords for the current item are listed in a keyword summary 4703, and result items having those keywords are listed in an items list 4705. The user may select one of the listed result items 4707, causing the project and keyword information of the selected result item to be displayed. The user may instruct the system to use the keywords information 4709 of the selected result item to replace the keywords for the original item.

FIG. 48 illustrates an example user interface 4801 for selecting one or more projects and updating the existing keyword filing information of an item with the keywords of the projects. Candidate keywords are listed in the keyword summary 4803, and projects with those keywords are listed in the projects summary 4805. The user may select one or more projects to link to; and may select keywords 4809 from one or more of the linked projects.

FIG. 49 illustrates an example user interface 4901 for filing an item using specified keywords utilizing the preview pane. Keywords for the current item are listed in a keyword summary 4903, and the first item having those keywords is listed in the preview pane 4905. The user may select one of the listed result items 4907, and may instruct the system to use the keywords information (shown in the preview pane 4905) of the selected result item to replace the keywords for the original item.

Reference is now made to FIGS. 50A-E, 51A-B, and 52, illustrating one or more embodiments of the process of filing an item. These figures address a process for initially tagging various items (FIGS. 50A-E), re-tagging items already tagged (FIGS. 51A-B), and mixing filed and unfiled multiple items (FIG. 52).

FIGS. 50A-E are a flow chart illustrating initial tag scenarios for filing an item. In the illustrated example, the user obtains one or more items which have not yet been tagged, such as through a native application, e.g., My QWF 5001, Internet Explorer 5003, Office application 5005, Windows Explorer 5007, Outlook task, calendar or contacts folder 5009, and Outlook mail folder 5011. If the item is a document 5013 (from My QWF) or a web page 5015 (from Internet Explorer), and if the user invokes the "file" command button for the item, then at step 5025 the system proceeds to file the item. If the item is a document 5013 (from an Office application 5005), and if the user invokes the "save as item" command, then at step 5023 the system proceeds to save the item. If the items are mixed documents 5015 (from Windows Explorer 5007), and if a single item is dragged to, e.g., the designated icon or tab, then at step 5029 the system proceeds to file the item. On the other hand, if multiple items are dragged, then at step 5031 the system proceeds to file the multiple items. If the item is a non-message Outlook item 5017 (from Outlook task, calendar or contacts folders), and if this (i) is the initial save of the item or (ii) is a legacy item, then at step 5029 the system proceeds to file the item. On the other hand, if multiple items are dragged or selected, then at step 5031 the system proceeds to file the multiple items. If the item is a received message 5019 (from the Outlook mail folder), opened, and if the preview pane is on, then at step 5027 the system proceeds to provide the details tab; if the message has attachments, at step 5029 the system proceeds to file the attachments. Otherwise, if the received message is open or highlighted and the preview pane is off, or if the message is dragged, then at step 5029 the system proceeds to file the item. Further, if there is a multiple item message that is dragged or multiple attachments to the current message, then at step 5031 the system proceeds to file the multiple items. If the item is a sent message 5021 (from the Outlook mail folder), not filed or legacy, and if the preview pane is on, then at step 5027 the system proceeds to provide the details tab; if the message has attachments, at step 5029 the system proceeds to file the attachments. Otherwise, if the received message is open or highlighted and the preview pane is off, or if the message is dragged, then at step 5029 the system proceeds to file the item. Further, if there is a multiple item not filed message that is dragged or multiple attachments to the current message, then at step 5031 the system proceeds to file the multiple items. If the item is an outgoing message 5035 (from the Outlook mail folder), and if the user selects to send the message, then at step 5033 the item is filed and sent. Otherwise, if the originating message is not yet a filed item, then at step 5037 the system proceeds to file and send the originating message.

Figure 50A:
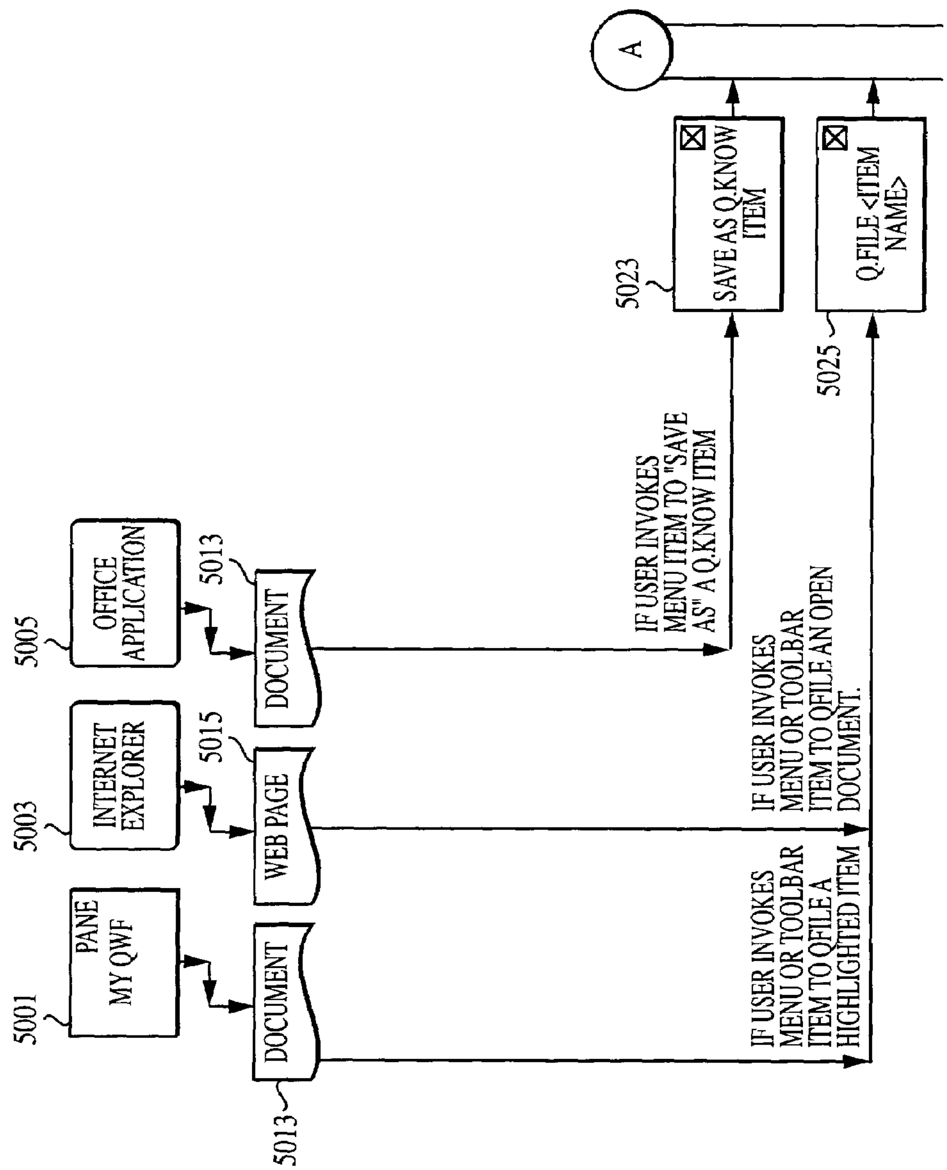
Figure 50B:
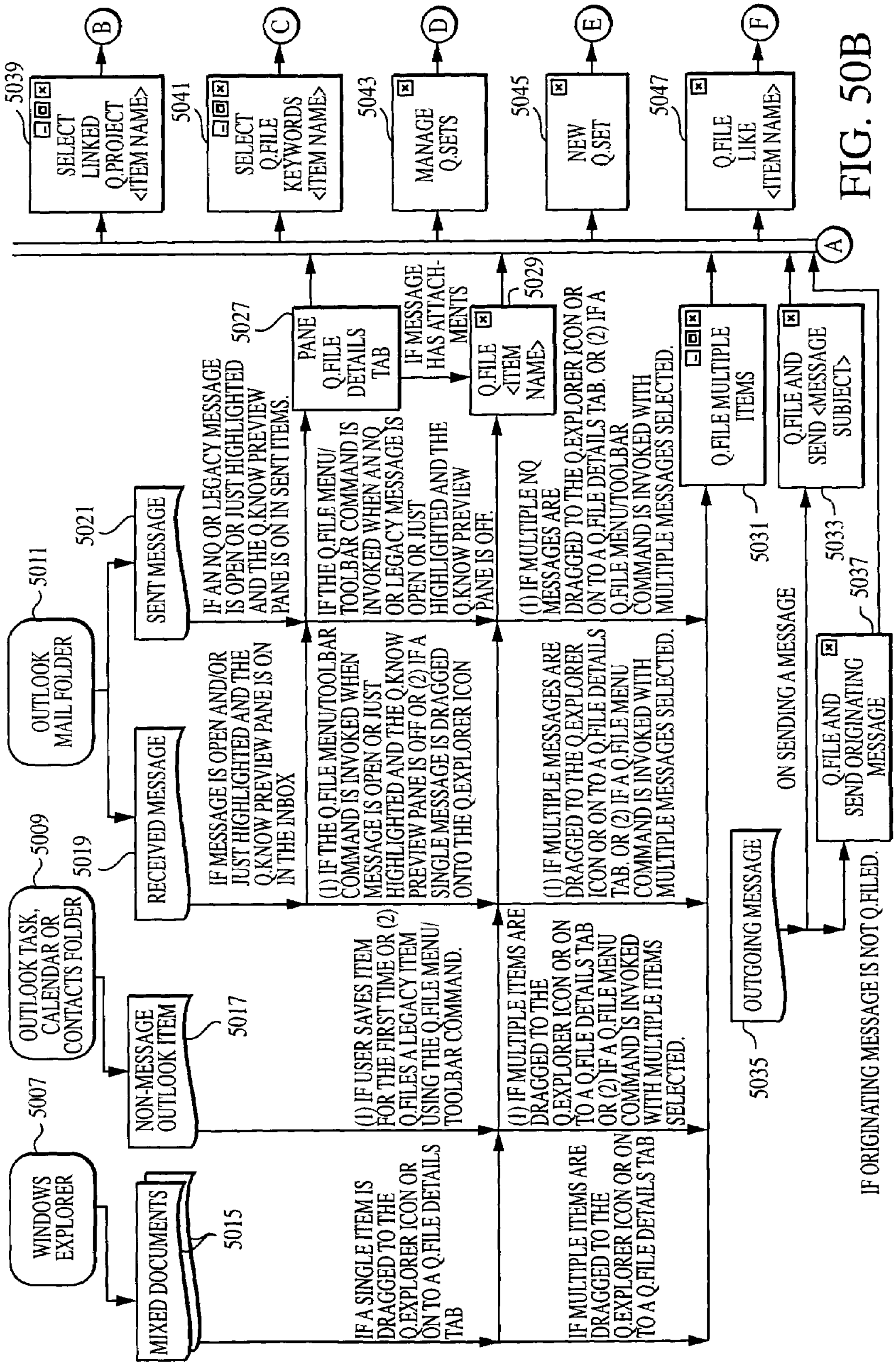
Figure 50C:
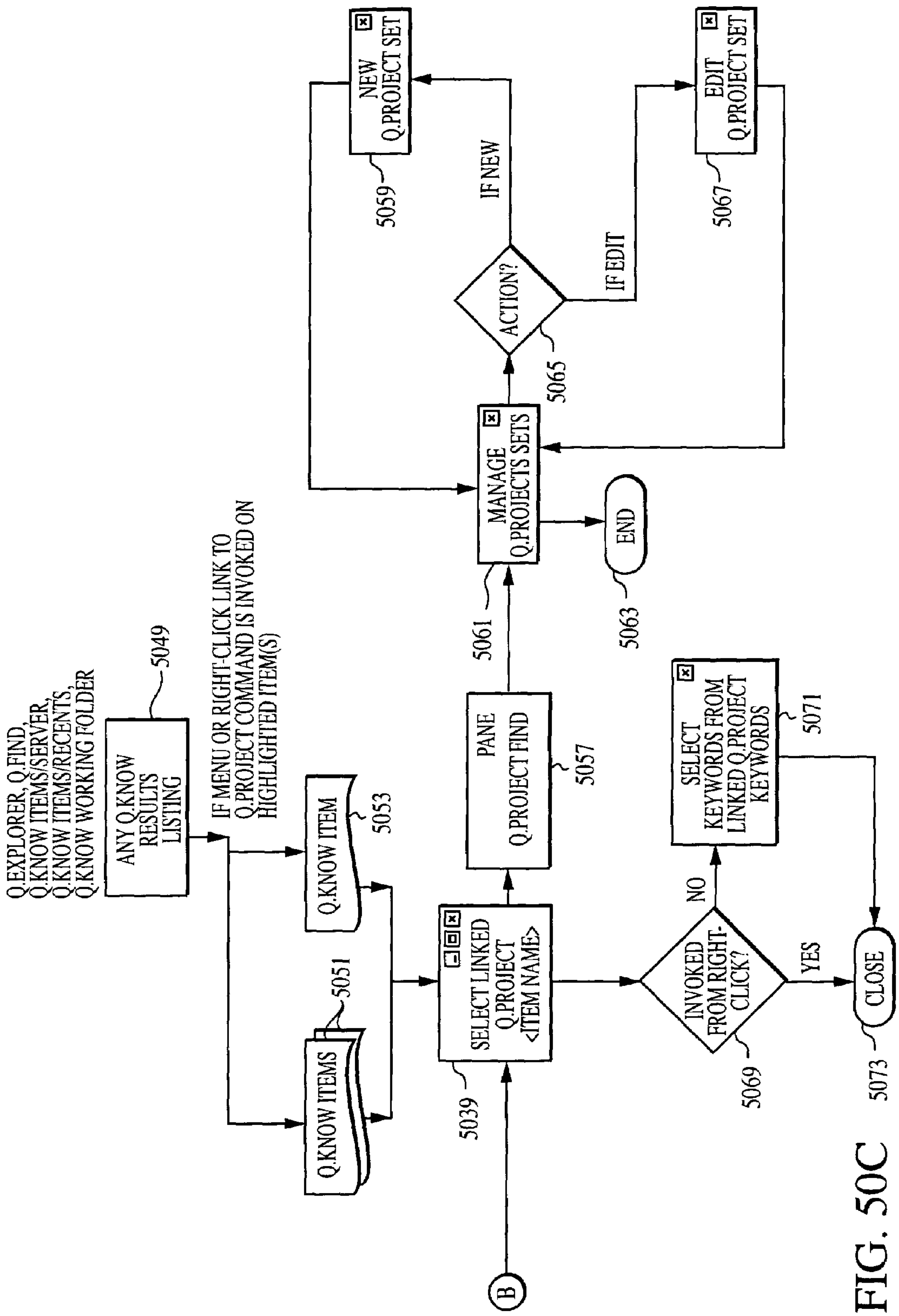

Still referring to FIGS. 50A-E, once the user has determined to file, file and send, and/or save the item, then the user may select from various commands. These commands include to select a linked project 5039, to select keywords 5041, to manage keyword sets 5043, to create a new keyword set 5045, and to file like another item 5047. Reference is now made to FIG. 50C. The system may alternatively arrive at selecting a linked project 5039 via any results listing at step 5049, from which the user has selected multiple items 5051 or a single item 5053. If the link projects 5039 was invoked in a particular manner, e.g., via a right click 5069, then another window is provided for step 5071, selecting keywords from linked project keywords; the linked projects window closes at step 5073. Then, the system proceeds to find the selected project 5057. Then, optionally the system manages the project sets at step 5061, or processing ends at step 5063 if instructed by the user. If an action is selected at step 5065, and if the action is "new project set", then at step 5059, the system creates a new project set. If the selected action is "edit", then at step 5067, the system edits the selected project set.

Figure 50D:
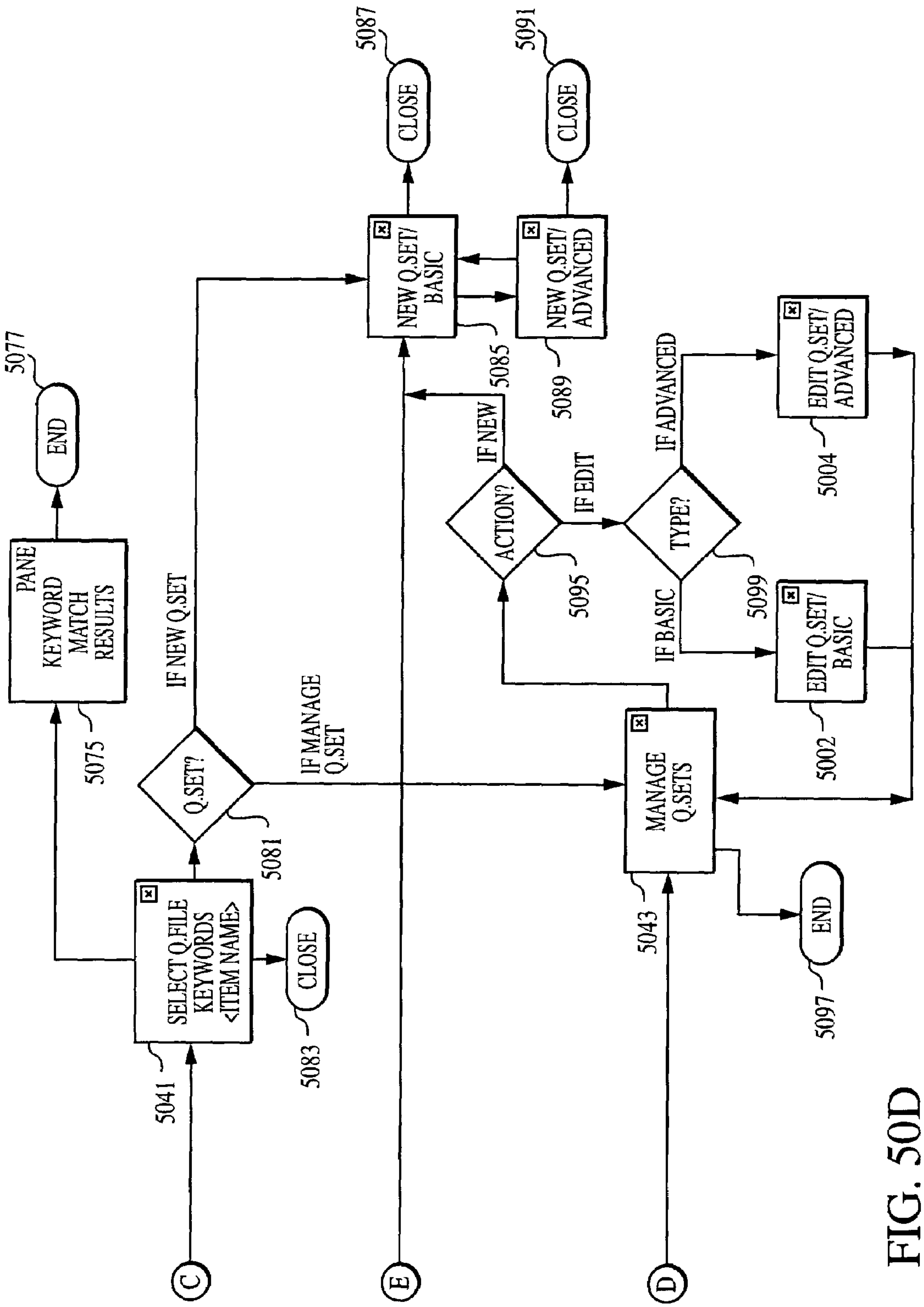

Reference is now made to FIG. 50D, showing selecting file keywords step 5041. The user may select to close step 5083, or to obtain keyword match results, step 5075 ending at step 5077, or to perform keyword set actions 5081. According to one or more embodiments of the present invention, one or more keyword sets may be created and then applied collectively. A keyword set is a collection of keywords and/or optionally other properties that may be used as search criteria. Keyword sets may be created, edited, selected, and/or deleted. If the user selects a new keyword set at any appropriate screen, the system proceeds to create a new keyword set, either basic (step 5085) or advanced (step 5089). Processing then ends at step 5087 and 5091, respectively. If the user selects to manage keyword sets, step 5043, then the user select to end processing step 5097. If the user selects an action 5095, the system checks whether the user selected to create a new keyword set and if so proceeds to step 5058 (described above), or to edit the keyword set. At step 5099, if the type of edit is basic, then at step 5002, the user performs basic keyword set edits. If the type of edit is advanced, then at step 5004 the user performs advanced keyword set edits.

Figure 50E:
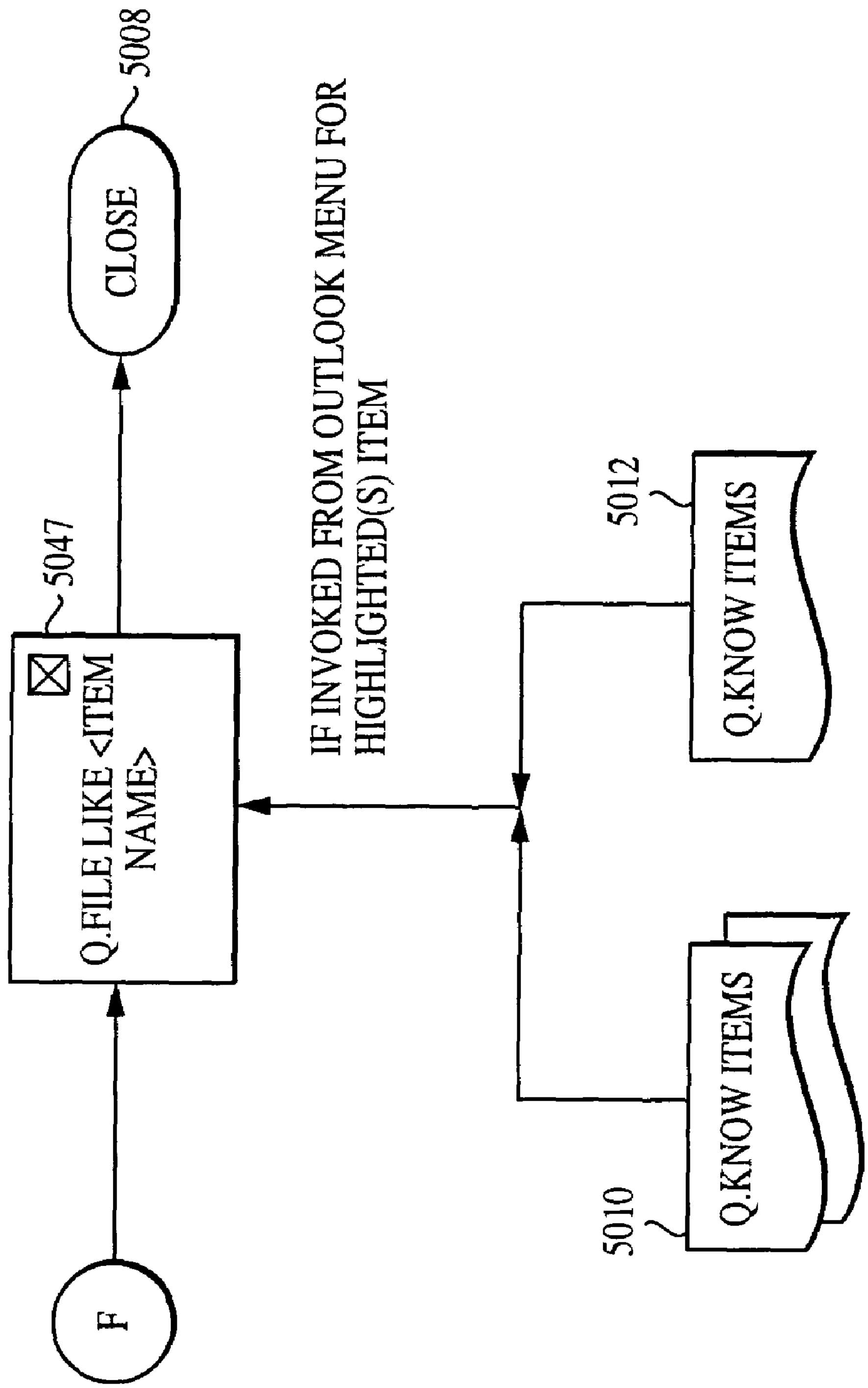

Reference is now made to FIG. 50E, showing the file like step 5047. The user may close if desired at step 5008 from the file like processing. File like processing step 5047 alternatively may be invoked from multiple items 5010, and a single item 5012.

FIGS. 51A-B are a flow chart illustrating re-tag scenarios for filing a previously filed item. In this example, an item 5115 is selected from Internet Explorer 5101. If the item is open and if the user invokes filing of the item, then at step 5119 the system files the item. If the item 5115 is selected from an Office application 5103, if the item is open, and if the user invokes filing of the item, then at step 5117 the system saves the item as a filed item. The item 5115 may alternatively be filed by the system at step 5123 in the following example situations: in My QWF 5105, linked items tab 5107, or any project tab with items listings 5109, the user invokes the filing. The item 5115 may result in the details tab being provided at step 5121, and no refiling of attachments at step 5122, in the following example situations: in Outlook inbox, sent messages, task, calendar, contacts folder, and any results listing, the item is opened or highlighted. Where there are multiple items 5115, filing multiple items, step 5125, may be invoked in the following situations: from My QWF 5105, linked items tab 5107, any project tab 5109, Outlook inbox, sent message, task, calendar or contacts folder 5111, and any results listing 5113, where filing is invoked on multiple selected items; and from Outlook inbox etc. 5111 and Results listing 5113 where multiple items are dragged and dropped.

FIG. 52 is a flow chart illustrating handling of mixed items known to the system and unfiled "items". In the present example, at steps 5213 and 5215, the system disables the ability to file known filed items 5207 mixed with unfiled items 5209 from Windows Explorer 5201 and the working folder 5203. If known filed items 5207 mixed with unfiled items 5209 are selected from Outlook inbox, sent messages, tasks, calendar or contacts folder 5205, then at step 5211 the system files the multiple items. At step 5219, the system disables the ability to re-tag any attachment. The user dialog closes at step 5217.

Because keywords are related to a user's company, industry, department colleagues, work group colleagues, and organizational members, items can be retrieved quickly, accurately, and consistently. One or more embodiments of the present invention return any other items tagged with specified keywords, enabling a user to view and retrieve other related items. A basic find process utilizes keywords, whereas an advanced find process utilizes a combination of various attributes such as keywords, file properties, and/or date ranges. FIGS. 53-56, described in more detail below, illustrate example user interfaces for alternative methods of finding items.

FIG. 53 illustrates an example user interface 5301 for a basic process of searching for items that have been stored via classes, using one or more keywords associated with it. The system provides basic keyword search criteria 5307, for example listing candidate keywords for classes 5311, and a directory of keywords for classes 5313. Items resulting from the search are listed in a results list 5309. The storage which is searched for the items 5315 can be designated, e.g., the main server, a working folder, and/or recently filed items. A button is provided to initiate the search 5303. A button is provided to proceed to advanced search criteria 5305.

FIG. 54 illustrates an example user interface 5401 for an advanced process of finding items that have been stored, using subroot and keywords in classes and other advanced criteria. In addition to the keyword search 5407 functions described in connection with FIG. 53, the system provides a search using item properties 5409 and/or date criteria 5411. Further, the keyword searches 5405 can include roots and subroots of keywords, and can search for keyword matches of partial words 5413. The user can search by one, some or all of the keywords. A keyword within a given hierarchy of roots and subroots can be used to search hierarchically by its parent and/or grandparent. A button is provided to proceed to basic search criteria 5413.

FIG. 55 illustrates an example user interface 5501 for showing a working folder listing contents of the working folder. A display summarizing items in the working folder 5503 is provided, along with a preview pane 5507 of a selected item 5505. Optional tabs are included for providing filing details 5511 and showing linked items 5509.

FIG. 56 illustrates an example user interface 5601 for listing items recently filed by the user. A display summarizing recently filed items 5603 is provided, along with a preview pane 5607 of a selected item 5605. Optional tabs are included for providing filing details 5611 and showing linked items 5609.

FIGS. 57-75 provide examples of retrievals of items, utilizing one or more embodiments of the present invention. Reference is now made to FIG. 57, a flow chart illustrating a basic process for finding items, step 5701. At step 5703, the user selects a "basic" find. At step 5705, the system interacts with the user to obtain the find criteria, and retrieves the search results. At step 5707, the system determines whether there are search results. If there are no search results, then at step 5709, the system launches the "no search results" message. Otherwise, at step 5707, the system checks whether the search results exceed a maximum. If so, then at step 5719, the system displays an error message, e.g. "500+" search results. Otherwise, an animated cursor is launched at step 5725; the results are displayed at steps 5727 and 5729. If the user clicks on an item in the search results, the item is opened in the native application at step 5723. If the user selects to filter the search results, then at step 5713, the system checks whether there are filtered search results, and if not, launches a "no filtered search results" error message at step 5715. Otherwise, at step 5721, the system, displays the filtered search results. Alternatively, at the main "find" menu, if the user selects an advanced search, at step 5711, the system proceeds with an advanced search (described in detail in connection with FIG. 58).

FIG. 58 is a flow chart illustrating an advanced process for finding items that have been stored, step 5801. If the user selects a "basic" find, step 5803, the system proceeds with a basic search (described above). Otherwise, the system performs one of several alternative searches using different criteria, for example: step 5805, find by keyword criteria; step 5815, find by file property criteria; step 5817, find by date; and/or step 5825, find by project. After searching for items meeting the search criteria, at step 5807, the system determines whether there are search results. If there are no search results, then at step 5809, the system launches the "no search results" message. Otherwise, at step 5819, the system checks whether the search results exceed a maximum. If so, then at step 5821, the system displays an error message, e.g. "500+" search results. Otherwise, an animated cursor is launched at step 5829; the results are displayed at steps 5831 and 5833. If the user clicks on an item in the search results, the item is opened in the native application at step 5827. If the user selects to filter the search results, then at step 5811, the system checks whether there are filtered search results, and if not, launches a "no filtered search results" error message at step 5813. Otherwise, at step 5823, the system, displays the filtered search results.

FIG. 59 illustrates an example user interface 5901 for a basic find of items listing previous searches and search results. The user interface 5901 includes a keyword criteria pane 5903, containing the keyword parameters of the search; a keyword list pane 5905 containing a tree of keywords for the user; a shortcuts bar 5907 into certain aspects of the present invention; and a search results pane 5909 containing search results based on selections in the search criteria panes. Also, a lookup keyword field 5911 allows a user to find an existing keyword by text. A keyword sets drop down 5913 contains lists of keywords, e.g., user selected keywords. Back and forward navigation arrows 5915 are provided so the user can navigate through collections of previous search criteria and filing summaries. An advanced find button 5917 is provided to jump to the advanced find page.

FIG. 60 illustrates an example user interface 6001 for interacting with the user to obtain keyword search criteria. The user may select one or more keywords in the keyword criteria pane 6003, keyword list pane 6005, keyword set drop down 6013, and/or keyword lookup pane 6015 from the keyword lookup field 6011. In response to the "find" command button 6007, the system retrieves as search results, those items responsive to the search criteria. The search results are displayed in a search results pane 6009.

FIG. 61 is a flow chart illustrating adding a new keyword to a class, for use in indexing and retrieving items. At step 6101, the system displays the keyword summary and keyword list. At step 6103, the user enters text into the look up field, and clicks the look up field. At step 6105, the system looks up the keyword search results. At step 6101, the user indicated to add a keyword. At step 6107, the system adds the new keyword, and initiates a search for the new keyword. At step 6111, if the keyword is unique, then at step 6109 the system adds the keyword to the keyword summary and keyword list; and selects the new keyword in the summary and list. Otherwise, if the keyword is not unique, then at step 6115, a message is displayed to that effect; and at step 6113, the keyword summary and keyword list are scrolled to the selected keyword.

FIG. 62 illustrates an example user interface 6201 showing search results from a basic process for finding items, with search criteria hidden. Here, a user has selected an item 6203 listed in the search results pane 6205. A file details pane 6207 is displayed for the selected item 6203, showing its file details.

FIG. 63 illustrates an example user interface 6301 showing a user access of a linked item from the current item 6303. Here, the user has selected an item 6303 in the search results pane 6305. A linked items pane 6307 is displayed for the selected item, listing the items to which the selected item is linked.

FIG. 64 illustrates an example user interface 6401 showing search results from an advanced process for finding items via keywords 6409. Here, the user has selected a keyword 6405 in the keyword pane 6403 (previously described). Items that meet the selected keyword criteria are displayed as search results in the search results pane 6407.

FIG. 65 illustrates an example user interface 6501 showing search results from an advanced process for finding items via item properties 6509. In this example, the user has selected multiple item properties 6505 in the item properties pane 6503. Item properties 6505 include by way of example, file type, native application types, and/or text string within the name or content of the item. Items that include the selected item properties are displayed as search results in the search results pane 6507.

FIG. 66 illustrates an example user interface 6601 showing search results from an advanced process for finding items via date criteria 6609. In this example, items are selected by specifying date types, dates and/or date ranges in the dates pane 6603. A pop-up calendar 6605 may be displayed to help in selecting dates. Items that have the specified date criteria are displayed as search results in the search results pane 6607.

FIG. 67 illustrates an example user interface 6701 showing search results from an advanced process for finding items via keywords. The keywords pane 6703 with the selected keyword 6705 search criteria is displayed. Also, a list of search items satisfying the search criteria is displayed in the search results pane 6707.

FIG. 68 illustrates an example user interface 6801 showing search results from an advanced process for finding items, with search criteria hidden. The search results pane 6805 is displayed. The preview pane 6807 displays a preview of the selected item 6803 from the search results.

FIG. 69 illustrates an example user interface 6901 showing search results from an advanced process for finding items via project association. The keywords pane 6905 is displayed with the selected keyword 6903 search criteria. A list of projects satisfying the search criteria is displayed in the search results pane 6907. A "project find" command button 6909 is provided to initiate the search.

FIG. 70 illustrates an example user interface 7001 showing search results from an advanced process for finding items via project property search criteria 7011. In this example, the user has selected multiple project properties 7009, 7013 and 7015 in the project properties pane 7005. Item properties include by way of example, project type 7009, project name 7013, and/or project team members/owners 7015. Candidate project types, project names, and/or project team members/owners are optionally automatically populated from corresponding stored lists. Items that include the selected project properties are displayed as search results in the search results pane 7007. The user may initiate the search via the "project find" button 7003.

FIG. 71 is a flow chart illustrating an example of finding an item via project search criteria. When a find by project, step 7101 is initiated, at step 7103 the system determines whether there is text in the team member field. If so, at step 7105 the system determines whether there is a match between text in the team member field and stored team members. If there is no match, then at step 7109 the system interacts with the user to have the user select a team member. In any event, the system applies the selected criteria to find the item, at step 7107.

FIG. 72 illustrates an example user interface 7201 showing search results from an advanced process for finding items via linked items of selected projects. The user may select one or more keywords 7203 in the keyword pane 7205 (discussed previously). In response to the "find" command, the system retrieves as search results, those items responsive to the search criteria. The search results are displayed in a search results pane 7207.

FIG. 73 illustrates an example user interface 7301 showing the working folder 7305 as a default location in which to search. The system may be directed to search for items in various storage locations, such as, the main items server 7307, the user's working folder 7305, and/or the user's recently filed items (e.g., in the last 30 days) 7309. Located items are displayed in the search results pane 7303.

Example processes for finding a project or finding items including a project are illustrated in FIGS. 74A-C and 75. Reference is now made to FIGS. 74A-C, a flow chart illustrating an example process for finding an item associated with a project, according to one or more embodiments of the present invention. At step 7401, the system displays a basic item find page, from which a user may select an advanced items search step 7409, a basic working folder search step 7411, and/or a basic recently filed items search step 7413. Alternatively, from the Office application 7403, the user may select a command for a basic find, an advanced find, or a "find like"; from the items page 7405 the user may select a command for a basic find, or a "find like;" and from the Q.Explorer page 7407 the user may select a command for a basic find, or a "find like." Then, the system displays a basic item find page 7415, from which a user may select an advanced items search step 7417, a basic working folder search step 7419, and/or a basic recently filed items search step 7421. Further, a shortcut bar 7423 may provide access from, e.g., Windows Explorer, to the user's working folder 7425. From Q.Explorer 7427, the system displays a basic item find page, from which a user may select an advanced items search step 7429, a basic working folder search step 7431, and/or a basic recently filed items search step 7433. Further, a shortcut bar 7426 may provide access from, e.g., Q.Explorer, to the basic find process. A user may alternatively instruct the system to find an item within a project, step 7443. Find within may be invoked from projects 7435, project 7437, project find 7439 and/or a selected project 7441. From the foregoing, a user may choose to manage sets of projects, step 7445, and/or to create a new set of projects, step 7447. From manage sets step 7445, if the user selects an action at step 7451, if the action is "new", then the system proceeds to a new set, step 7447. The user may instead use an advanced process to create a new set, step 7453. On the other hand, if the action was type, step 7457, the system proceeds to an advanced edit of the set of projects, step 7463, or alternatively a basic edit of the set, step 7461. Processing then ends, steps 7455, 7449, 7459.

Reference is now made to FIG. 75, a flow chart illustrating an example process for selecting whether to manage projects and/or project sets. At step 7501, the system displays a projects page, and at step 7503, the system displays a project find page. The user may readily switch between these pages. From the project find page, the user may select to manage project sets, step 7505, or to create a new project set, step 7509. From the manage project sets, step 7505, the user may select to edit project sets, step 7507.

One or more embodiments of the invention utilize sets in connection with items and projects. Sets allow the user to quickly load commonly used search criteria combinations into the search criteria and/or the filing summary. Basic sets contain basic information, e.g., keyword and item type settings. Advanced sets contain, e.g., the foregoing, plus item properties and date range settings. Sets can also be applied to the process of finding projects; project sets contain, e.g., keyword, project properties, and date range settings. FIGS. 77-85 are exemplary screens describing a process for using, creating, editing and deleting a set.

Reference is now made to FIG. 76, a flow chart illustrating an example process for managing linked sets and project sets. At step 7601, a set drop down is provided. From the drop down, the user may select to manage sets, step 7605, or to create a new set, step 7603. If the user selects to create a new set, and if the basic find screen is up, at step 7615, then the system proceeds to create a new basic set, step 7623. If the advanced find screen is active at step 7625, then the system proceeds to create a new set using advanced procedures, step 7627. Otherwise, the system proceeds to create a new project set, step 7629. If the user selects to manage sets, step 7605, then if the user indicates to delect a set, step 7609, at step 7617 the system obtains confirmation of the deletion. If the user selects to manage a set, then at step 7611 the system determines whether the set is basic. If so, the system proceeds at step 7619 to edit the basic set. If the set is not basic, the system determines a step 7613 whether the set is advanced. If the set is not advanced, the system proceeds to edit the project set at step 7607. If it is advanced, then at step 7621, the system proceeds to an advanced edit of the set.

FIG. 77 illustrates an example user interface 7701 showing selection of a set of items to manage. This is a drop down menu 7703 of sets, from which the user selects a set 7705 to manage. Control buttons 7707, 7709, 7711 allow the user to edit, delete, and/or create a set, respectively.

FIG. 78 illustrates an example user interface 7801 showing basic creation of a set, and may be invoked, e.g., from the screen of FIG. 77. The keyword summary 7805, keyword list 7807 and keyword text 7811 are provided. The set is given a name 7803 or other identifier. The user may select the advanced set 7809 button to proceed to the advanced set process instead.

FIG. 79 illustrates an example user interface 7901 showing basic editing of a set. Again, the interface includes, e.g., a set name 7905, keyword summary, and keyword list 7807, although these provide the ability to edit and/or save changes.

FIG. 80 illustrates an example user interface 8001 showing advanced creation of a set, including keyword specification, item property specification, and date range. The advanced set creation includes the properties of the basic set creation described in connection with FIG. 78. According to at least one embodiment of the present invention, an advanced set can operate in connection with keywords 8003, file properties 8005, date range settings 8007, and optional search text 8011. The user may select the basic 8009 button to proceed to the basic process instead.

FIG. 81 illustrates an example user interface 8101 showing advanced editing of a set. The advanced edit includes the properties of the basic edit described in connection with FIG. 79. According to at least one embodiment of the present invention, an advanced set can operate in connection with keywords 8103, file properties 8105, date range settings 8107, and optional search text 8111.

FIG. 82 illustrates an example user interface 8201 showing creation of a project set. According to at least one embodiment of the present invention, a project set can include keywords 8205, project properties 8207 (such as project owner and/or team member), a date range 8209, and/or search text 8211. The keywords are displayed in a keyword panel 8213. Any or all of the fields may be provided in connection with the creation of a project set.

FIG. 83 illustrates an example user interface 8301 showing editing of a project set. According to at least one embodiment of the present invention, a project set can include keywords 8305, project properties 8307 (such as project owner and/or team member), a date range 8309, and/or search text 8311. The keywords are displayed in a keyword panel 8313. Any or all of these fields for a project set may be edited.

FIG. 84 illustrates an example user interface 8401 showing a preview of a selected item retrieved via a basic project find process. A search results pane 8405 lists items satisfying the search criteria, included a selected item 8409. The preview pane 8407 allows the user to preview the selected item. Alternatively, in this example, the user may select a file details tab 8411. FIG. 85 illustrates an example user interface 8501 showing the file details pane 8503 under the file details tab 8411. The file details may include, e.g., a detailed list of keywords for the selected item 8405.

FIGS. 86-94 illustrate an example flow and user interfaces for creating a new project. Reference is now made to FIG. 86, a flow chart illustrating an example process for managing projects. In this example, the user interface screens operate as a wizard. At step 8601, a project type wizard interacts with the user to choose the project type. At step 8603, a wizard assists the user in selecting project keywords. If the project is a duplicate, a duplicate project error message is provided at step 8611. At step 8605, a wizard interacts with the user to determine the project summary information. At steps 8607 and 8609, respectively, wizards interact with the user to obtain a project name and due date, or project summary information. At step 8613, a wizard interacts with the user to determine a link to a parent project. At step 8615, a wizard interacts with the user to choose the project team members. At step 8617, a wizard interacts with the user to determine and set status of the project. At step 8619, a wizard interacts with the user to assign various tasks to selected project team members 8619. At step 8621, processing is finished. Optionally, the new project is opened in a new window.

The several interfaces of this example relating to creating a new project may be gone through step by step. FIG. 87 illustrates an example user interface 8701 showing initial steps in creation of a new project. This screen is launched, for example, when a user initially creates a new project. A first menu 8703 displays the type of projects to which the user has access. A second menu 8705 displays sub-projects of the selected project type. Optionally, some or all information in further interfaces is pre-populated, for example if dictated by a project type.

FIG. 88 illustrates an example user interface 8801 showing collection of summary information for the new project. In this example, project keywords 8803 are selected or entered, allowing the user to partially describe the project. This may be implemented, for example, as popdown fields, text fields, etc. FIG. 89 illustrates an example user interface 8901 showing collection of additional summary information for the new project. This example screen is launched if the project type requires linking to another project, as for example a parent project. Consider the example where an insurance claim (project type) is defined as being linked to a submission or policy (parent project). In the present example, the link requirement causes this additional screen to be launched. An additional information window 8903 displays information appropriate to the other project, for the user's selection. The user may optionally find another project 8905, and potentially select that other project to link to as well.

FIG. 90 illustrates an example user interface 9001 showing collection of further summary information for the new project. In this example, the remainder of the project summary is entered. This screen (and others if appropriate) are customizable by the user. An additional information field 9003 is provided for entering the other information for the new project. FIG. 91 illustrates an example user interface 9101 for assigning a name 9103, due date 9105, project number 9107, and status 9109 for the new project. The selections, and the selectable options for the selections, may be determined by a system administrator.

FIG. 92 illustrates an example user interface 9201 for assigning team members for the new project. This screen allows the user to select those users that will be involved with the project. The owner field 9203 indicates the individual who owns the project. Optionally, the interface requires one or more additional team members 9203. In this example, this project type requires additional team members 9203 from underwriting, legal, and finance. An internal extended team members field 9207 and an external extended team members field 9209 allows the user to select internal and external contacts that are involved with the project. FIG. 93 illustrates an example user interface 9301 for assigning project tasks and due dates to team members, according to one or more embodiments of the present invention. One or more project tasks 9303 are displayed. A team member 9305 to which the project task is assigned is selectable, as well as a due date 9307 for the project task.

FIG. 94 illustrates an example user interface 9401 notifying the user of similar projects. If the system finds that there is already a project that has a similar name and similar filing information, this screen optionally is launched, in order to prevent a duplicate project from being created. In the present example, the duplicate project field 9403 lists five potential duplicates. The user may select and switch to a pre-existing project if desired.

FIGS. 95-97 illustrate various examples of user interfaces for showing projects. FIG. 95 illustrates an example user interface 9501 showing a project retrieved through "projects", via an Outlook interface. This interface may be launched, for example, by a user initiating the projects application, such as by clicking on an icon 9507. A first pane 9503 displays a list of projects that the user owns or is a team member of. A second pane 9505 displays a preview of the selected project from the first pane 9503. Here, the preview is provided as a summary tab 9509. Other tabs may be selected to view the information within them, e.g., tasks 9511, documents 9513, messages 9515, forms 9517, calendar 9519, contacts 9521, history 9523, linked projects 9525, and/or keywords 9527. Optionally, the user may open or edit a selected project.

FIG. 96 illustrates an example user interface 9601 showing the retrieved project with a first pane 9503 listing projects that the user owns or is a team member of, and a second pane 9505 displaying a preview of the selected project. This user interface is launched, for example, from a desktop icon, and is opened in its own window.

FIG. 97 illustrates an example user interface 9701 showing a project summary. Each type of project is correlated to a summary, and optionally is customizable by a system administrator. In the present example, the summary is appropriate for the reinsurance industry. The example user interface 9701 includes a customizable field 9703, a preview pane 9705 (here open to the contacts tab), and the summary pane 9707. The summary pane 9707 optionally is editable.

FIGS. 98-100 relate to a "resource library," which provides a library of document templates available to different project types. This series of screens allows a user to add, remove, and edit documents in the resource library. FIG. 98 illustrates an example user interface 9801 showing a list of files 9803 in the resource library. A listed file may be selected to remove, edit, or check out. A checked-out file may be opened in its native application. FIG. 99 illustrates an example user interface 9901 showing the addition of an item to the resource library. This interface allows a user to find an item to add to the resource library, and to select the type of resource document that it should be. As shown in the present example, the item may be searched for such as by keywords 9903, and the results of the search are listed 9905. An item in the search results may be added to the resource library. FIG. 100 illustrates an example user interface 10001 for listing and selecting an item to be added to the resource library. The results of the search are listed 10003, and a preview of the selected item is displayed in the preview pane 10005.

FIG. 101 illustrates an example user interface 10101 listing the keywords assigned to the classes for the selected project. This interface allows the user to view the keyword information of the project. Here, the current project summary is displayed in the summary pane 10103, and the keywords are displayed in the preview pane 10105.

FIGS. 102-105 illustrate an example of project find functionality. Projects may be found by their various attributes. In the example of FIGS. 102-105, projects may be located by keywords 10213, project properties 10215, and/or various date ranges 10217. FIG. 102 illustrates an example user interface 10201 showing specification of keywords for classes for locating a project or project set. Specification of keywords as search criteria for projects optionally may be done for items. Here, there is provided a keyword pane 10203, and a results list pane 10205 for listing the search results. A select dropdown 10207 allows the user to apply a set of search criteria. Optionally, toggle buttons are provided to related functionality, such as projects main screen 10211, and project find 10209.

FIG. 103 illustrates an example user interface 10301 showing specification of project properties for locating a project or project set. Here, the user has selected a search based on project properties 10213. A project properties pane 10303 is provided, with various search criteria to be selected. Here the search criteria include selectable project types 10305, project name 10307, and/or project team members/owners 10309. FIG. 104 illustrates an example user interface 10401 showing specification of date characteristics for locating a project or project set. Here, the user has selected a search based on dates 10217. The dates of choice are specified by the user. In this example, the user specifies the date or date range 10405, and the information having the date (e.g., date last modified, date filed, date completed, date due). A date pop-up window 10407 is advantageously used for specifying dates.

FIG. 105 illustrates an example user interface 10501 showing a listing of located projects, such as resulting from a search illustrated in FIGS. 102-104. Here, the results pane 10503 lists the search results. The listed results may be filtered, for example by project type 10507 and/or date range 10509. The preview pane 10505 displays information on the selected project in the search results.

FIGS. 106-108 illustrate example interfaces allowing a user to link an item to a project. FIG. 106 illustrates an example user interface 10601 showing a specification of search criteria for filed items, to be located as candidates for linking to a project. This example interface allows the user to link an existing item to a project. Optionally, it is accessed from a document, contact, task, calendar and/or other item tabs. A keyword pane 10603 is provided, and may be populated by the user. A search results lists pane 10605 is provided, listing candidate result items for potential linkage to the current project. The user selects one or more of the result items, and then selects the link to project button 10607 to cause the item(s) to be linked to the project.

FIG. 107 illustrates an example user interface 10701 showing a listing of located filed items as candidates for linking to a project. Here, the search criteria of FIG. 106 are collapsed. The search results lists pane 10605 is displayed, together with a preview pane 10607, here showing the file details for the selected item.

FIG. 108 illustrates an example user interface 10801 showing a selection of keywords from keywords assigned to linked projects. This example interface allows a user to update the existing keyword filing information of the item, with the keywords of the project(s) to which it is being linked. A keyword pane 10805 displays the item's current keyword summary. The keywords for the projects to which the item is to be linked (two in this example) are summarized in the project summary panes 10803*a*, 10803*b*. Keywords from the project(s) may readily be added to the item.

FIGS. 109-112 provide example user menus for project file operations. FIG. 109 illustrates an example user menu 10901 for opening an item in its native application and/or creating a new project. A drop down menu 10913 provides available commands. The "open" command 10903 opens the selected item, in the appropriate native application. The "make preview available" command 10905 operates as a system tray notification, for the selected item. The "print" command 10907 opens the project print wizard. If selected, the "new" command 10911 provides a pull-down menu 10915 of items that may be created, including in this example a project 10909. If the user selects the creation of a new project 10909, a new project wizard is launched.

FIG. 110 illustrates an example user menu 11001 for creating a new item in its native application and utilizing classes and keywords from a selected item for the new item. A drop down menu 11003 provides available commands. Here, an item is already selected, and the user selects the "create like" command 11007. A pull down menu 11005 lists candidate item types. Each item type listed in the menu opens the appropriate native application, and optionally tags the new item with the same tags as the selected item. According to one or more embodiments of the present invention, an item may be classified, indexed and/or retrieved using "create like," "file like," or "find like" commands. For example, a user may create a Word document incorporating the same keywords as an item (e.g., an e-mail message) that has been filed. Further, optionally projects can inherit the keywords and project properties of an item or project.

FIG. 111 illustrates an example user menu 11101 for selecting different types of retrieval. The pulldown menu provides the options of finding an item 11109, finding an item like a selected item 11103, and finding an item within a project 11107. Optionally, a command is provided to manage the resource library 11105.

FIG. 112 illustrates an example user menu 11201 for acting on a team of users assigned to a project. A project is selected for this menu to be active. The menu provides actions including project team 11202 for the selected project. The project team action allows the user to notify the project team 11209, for example via an e-mail, and edit the project team 11211. Also provided are an "invite input" wizard 11203 for the selected project; an edit summary action 11205, to open and edit the selected project; and an add note action 11207, to add a note to the selected project.

FIGS. 113-117 illustrate examples of Windows extensions. The Excel native application is used as an example native application, though the principles can be applied to other native applications. Additions to Windows include, for example, open item, save and file, and save and check in. FIG. 113 illustrates an example user interface 11301 for use in locating items with specified item properties. This example illustrates a screen opened from Microsoft Excel, allowing the user to open an Excel document. Search criteria may include keywords 11309, item properties 11303, and dates 11311. In this example, item properties are used as search criteria. Example properties include the document type 11305, the native application 11306, and/or text within the item name or item 11307. Items may be searched for in various locations, for example, the main item server, the user's working folder, and/or the user's recently filed items. Results would be listed in the results pane 11313.

FIG. 114 illustrates an example user interface 11401 listing located items, for use in selecting an item to open. Various locations may be specified for the search 11409. Search results are listed in the results pane 11403. The results may be filtered, for example limited to a file type 11405 and/or limited to a date range 11407.

FIG. 115 illustrates another example user interface 11501 listing located items, for use in selecting an item to open. Various locations may be specified for the search 11509. Search results are listed in the results pane 11503, and may be filtered, in this example by file type 11505 and/or date range 11507.

FIG. 116 illustrates an example user interface 11601 for listing a summary of the selected item and saving the selected item including selecting a project 11607, keywords 11609, keywords sets 11611, and/or filing "like" a previous item. The item may be saved in various locations 11605, e.g., the main server and/or the working folder. A file summary pane 11603 is provided to display the current item keywords. The item may be filed with a file name 11607, and with a file type 11609.

FIG. 117 illustrates an example user interface 11701 for listing items saved in various locations 11705, for example, in the user's working folder. The results may be filtered by type 11709 and/or date range 11711. A results pane 11703 displays the optionally filtered search results from which one or more items to be saved are selected.

FIGS. 118-131 are flow charts illustrating a variety of project-oriented tools. FIG. 118 is a flow chart illustrating a process for editing a project summary. A project edit may be launched from any of several points. In the present example, a selected project may be edited from: projects, step 11801; find, step 11803; explorer/basic, step 11805; explorer/advanced, step 11807; items/basic, step 11809; and/or items/advanced, step 11811. A user may edit a project in a read-only mode, step 11813, or check out the project, step 11815, in order to edit. Processing ends at step 11817.

FIG. 119 is a flow chart illustrating a process for linking a task to a project. The user is in the task tab, step 11901. From the task tab, the user selects to link a filed item to the selected project, step 11903. Alternatively, the user may request a new Outlook task, step 11905, or send a new Outlook task request, step 11907. Processing ends at step 11909.

FIG. 120 is a flow chart illustrating a process for viewing a task linked to a project. From the Projects task tab, step 12001, a user selects the task, step 12003, which is displayed (read only). Processing ends at step 12005.

FIG. 121 is a flow chart illustrating a process for linking a meeting to a project. From the project calendar tab, step 12101, a user selects to link a filed item (a selected meeting) to a project, step 12103. Alternatively, the user selects the Outlook meeting request, step 12105. Processing ends at step 12107.

FIG. 122 shows a flow chart illustrating a process for viewing a meeting linked to a project. From the projects calendar tab, the user selects a meeting, step 12203, which is displayed (read only). Processing ends at step 12205.

FIG. 123 depicts a flow chart illustrating a process for linking a contact to a project. From the projects contacts tab, step 12301, the user chooses to link a filed item to the current project, step 12303. Alternatively, the user selects a new Outlook contact, step 12305. As a further alternative, the user selects names for the contacts, step 12307, such as from the user's Outlook contacts. At step 12313, the system determines whether the contact is already filed. If not, and if there is a single item, then at step 12311, the system files the contact item. If not, and if there are multiple items, then at step 12315, the system files the multiple contact items. If already filed, the system does nothing. Processing ends at step 12309.

FIG. 124 is a flow chart illustrating a process for viewing a contact linked to a project. From the projects contacts tab, step 12401, the user selects a contact, which is displayed read only, step 12403. Processing ends at step 12405.

FIG. 125 is a flow chart illustrating a process for editing a project team utilizing contacts. From the projects contacts tab, the user chooses to edit the project team, step 12503. Alternatively, the user selects to assign ownership of the selected project, step 12505. The system then interacts with the user to select the names, step 12507. Optionally, the list of users proposed as candidates is derived by filtering the system users by project and role keywords. Processing ends at steps 12509, 12511.

FIG. 126 is a flow chart illustrating a process for sending an e-mail to a selected project team. From the projects contacts tab, step 12601, the user selects to email the project team, step 12603, for the selected project. At step 12605, the system interacts with the user to create a new e-mail message to be sent to the team members for the selected project. Processing ends at step 12607.

FIG. 127 is a flow chart illustrating a process for viewing keywords for classes associated with a project, and/or for viewing a history of the project. From the projects keywords tab, block 12701, the user selects to display a project history, step 12703. The history is displayed. Processing ends at step 12705.

FIG. 128 is a flow chart illustrating a process for viewing, adding, and/or creating linked projects. From the linked projects tab, step 12801, the user chooses to select a linked project, step 12803. Alternatively, the user selects the new project wizard, step 12805, which steps the user through the wizard, step 12809. As a further alternative, the user selects a project, step 12807, which is displayed (read only). Processing ends at step 12811.

FIG. 129 is a flow chart illustrating a process for inputting data into forms for items to be opened in native applications. From the project forms tab, step 12901, the user selects a form name and/or a project name, step 12903. At step 12905, the system opens the selected form (item) in its appropriate native application. At step 12907, the system displays the item status. Processing ends at step 12909.

FIG. 130 is a flow chart illustrating a process for linking a document from Windows and/or for linking a filed item to a project. From the project forms tab, step 13001, the user selects to link a filed item to the selected project, step 13003. Alternatively, the user selects to link a document from the Windows application, step 13005. Processing ends at step 13007.

FIG. 131 is a flow chart illustrating a process for adding an item to a project's "resource library." In the present example, the user has selected the tools menu, and further selects to add to the resource library, step 13101. From there, the user selects to manage the resource library, step 13103; at step 13105, the system interacts with the user to add the selected item to the resource library. Processing ends at step 13109.

FIGS. 132-136 are example toolbars for use in connection with various applications, to provide extensions for accessing various functions of the present invention. Toolbars may be context-sensitive to the folder. The behavior of a button in the toolbar may be similar or identical to that in a counterpart menu. Icons or text may be provided. FIG. 132 illustrates an example items toolbar 13201 for use in connection with Outlook. The toolbar accommodates one or more functions provided by one or more embodiments of the present invention. Here, the toolbar includes the create like function 13203, the file function 13205, the history function 13207, the find function 13209, the find like function, 13211, the add note function 13213, the create new project function 13215, and the link to project function 13217.

FIG. 133 illustrates an example items toolbar 13301 for use in connection with an explorer. Here, the toolbar includes the create like function 13303, the file function 13305, the print function 13307, the history function 13309, the find function 13311, the find like function, 13313, the add note function 13315, the create new project function 13317, and the link to project function 13319.

FIG. 134 illustrates an example items toolbar 13401 for use in connection with native applications. Here, the toolbar includes the create like function 13403, the open item function 13405, the save as item function 13407, the history function 13409, the find function 13411, the find like function, 13413, the add note function 13415, the create new project function 13417, and the link to project function 13419.

FIG. 135 illustrates an example items toolbar 13501 for use in connection with Windows Explorer. The standard Windows Explorer toolbar 13503 includes a button 13505 to access the functionality of the present invention. FIG. 136 illustrates an example items toolbar 13601 for use in connection with Internet Explorer. The standard Internet Explorer toolbar 13603 includes a button 13605 to access the functionality of the present invention.

FIGS. 137-140 provide examples of system tray notification for file uploads and downloads. FIG. 137 illustrates an example message for use in indicating the status of progress in processing an item. In the present example, status is displayed for listed items 13709. Status may include, for example, action 13705, for which appropriate action types 13707 include check out, preview now, make preview available offline, edit now, file, check in, and/or undo check out. Status may also include the status 13701, for which appropriate status types 13703 include in progress, complete, and/or unsuccessful. FIG. 138 illustrates an example user interface for use in instructing the system to retry 13801 and/or cancel 13803 an action on an item being processed. FIG. 139 illustrates an example message 13901 for use in indicating that an item is being downloaded by the system. FIG. 140 illustrates an example message 14001 for use in indicating that an item is being processed by the system.

FIGS. 141-171 provide additional examples of operation of an alternative embodiment of the present invention, used in connection with a simulated insurance business. (For clarity, elements that are illustrated in more than one example interface may not be referred to after having been discussed.) FIG. 141 illustrates an example user interface 14101 listing e-mail in an inbox as items. Here, the user performed a find function 14103 on items. The selected search criteria include "people" 14107 of the type broker 14107, with the name AON 14109. Search results are listed in the search results window 14111. The types of items may be accessed under tabs for inbox 14115, projects 14117, tasks 14119, contacts 14121, and/or calendar 14123. Information characterizing the selected item appears in the preview pane 14113.

FIG. 142 illustrates an example user interface 14201 listing results from finding items with specified keywords in specified classes. The results tab 14207 provides a results list 14203 listing the combined search results for all located items of all types. This example interface includes the keyword display 14205 with the search criteria.

FIG. 143 illustrates an example user interface 14301 listing e-mail in an inbox as items, based on finding specified keywords in specified classes. The keywords in multiple classes are displayed in a keyword pane 14307 and a keyword summary pane 14305. The inbox tab 14309 accesses a results page 14303 listing the inbox items that meet the search criteria. Information on the selected (or first) item is displayed in a preview pane 14311.

FIG. 144 illustrates an example user interface 14401 listing projects as items, based on finding specified keywords in specified classes. The keywords in multiple classes are displayed in a keyword pane 14403 and a keyword summary pane 14405. The projects tab 14409 accesses a results pane 14407 listing the projects that meet the search criteria.

FIG. 145 illustrates an example user interface 14501 listing tasks as items, based on finding specified keywords in specified classes. The keywords in multiple classes are displayed in a keyword pane 14503 and a keyword summary pane 14505. The tasks tab 14509 accesses a results pane 14511 listing the tasks (if any) that meet the search criteria.

FIG. 146 illustrates an example user interface 14601 listing contacts as items, based on finding specified keywords in specified classes. The keywords in multiple classes are displayed in a keyword pane 14603 and a keyword summary pane 14605. The contacts tab 14609 accesses a results pane 14607 listing the contacts that meet the search criteria.

FIG. 147 illustrates an example user interface 14701 listing specified meetings as items, based on finding specified keywords in specified classes. The keywords in multiple classes are displayed in a keyword pane 14703 and a keyword summary pane 14705. The calendar tab 14709 accesses a results pane 14707 listing the calendar items (if any) that meet the search criteria. Here, no calendar items met the search criteria.

FIG. 148 illustrates an example user interface 14801 for creating a new document to include with a project, with specified keywords in specified classes. Here, the user has selected the projects tab 14803, showing a results pane 14813. The search criteria are shown in the keyword pane 14809 and the keyword summary pane 14811. The documents tab 14807 is selected, displaying information on documents associated with the selected project. Here, the user has selected the "create new Word document" command 14805. FIG. 149 illustrates an example user interface 14901 showing a confirmation message after a new document is created in accordance with FIG. 148. The native application opened the document 14903; the user entered text; and selected the "save" command in the native application. The native application confirms that the revisions are to be saved 14905.

FIG. 150 illustrates an example user interface 15001 showing interfacing with a user to obtain class specifications for a search and retrieval. Here, the keyword pane 15003 includes check boxes for classes 15007, and for candidate keywords 15009 for each class that the user may access. The keyword summary pane 15005 summarizes the search criteria that the user selects.

FIG. 151 illustrates an example user interface 15101 showing a summary for the Outlook interface. Here, the summary includes the calendar items 15103, tasks items 15101, and messages 15107. In the present example, the calendar, tasks and messages are empty.

FIG. 152 illustrates an example user interface 15201 showing a summary list of items retrieved via an explorer. Here, the summary pane 15213 lists items 15203 and projects 15205. Information on the results includes the name of the item or project 15207, the type of the item or project 15209, and a global identifier (GUID) 15211 that uniquely identifies the item.

FIG. 153 illustrates an example user interface 15301 showing a summary list of candidate classes (relationships) and candidate time for searching and retrieving e-mail in an inbox, and a display of a selected item. Among the search criteria that are provided in this example, the user may select one or more relationships 15303 and a time 15305. Items in the inbox meeting the search criteria are listed in a results pane 15307. The first (or selected) item in the results pane is displayed in the preview pane 15309.

Referring now to FIG. 154, an example user interface 15401 illustrates that the user has selected an item 15407 in the results lists 15405. The selected item includes one or more attachments. The interface provides a display of the attachment 15403 to the selected item 15407.

FIG. 155 illustrates an example user interface 15501 showing a display of documents 15505 required in connection with the selected project. The project that is selected 15503 was previously defined as requiring documents 15507, requiring approval 15509, and/or has input requested 15511. In the present example, check boxes 15513, 15515, 15517 are provided to indicate the required documents, and whether steps have been taken to procure the documents, approval and/or input. Additional tabs are provided to display project summary 15519, contacts associated with a project 15523, forms for a project 15525, documents associated with a project 15527, tasks associated with a project 15529, and/or calendar items associated with a project 15531.

FIG. 156 illustrates an example user interface 15601 showing a display of summary profile 15607 for a selected project 15603. If the summary tab is selected, the project summary for the selected project is displayed. The summary indicates the classes and associated keywords for the selected project.

FIG. 157 illustrates an example user interface 15701 showing a display of contacts constituting a work group, linked to the selected project 15705. A listing of contacts is provided 15703, when the contacts tab 15707 is selected. Contacts may be further broken down 15709 if preferred.

FIG. 158 illustrates an example user interface 15801 showing a display of industry-specific data entry forms 15805 associated with the selected project 15803, corresponding with and/or connecting to a legacy system. In this example, the system administrator customized these forms to accommodate information of the legacy system.

FIG. 159 illustrates an example user interface 15901 showing a listing of filed items (document and email) 15905 associated with a selected project 15903. This display may be accessed via, for example, a documents tab 15907.

FIG. 160 illustrates an example user interface 16001 showing a listing of filed tasks 16005 associated with a selected project 16003. This display may be accessed via, for example, a tasks tab 16007.

FIG. 161 illustrates an example user interface 16101 showing a listing of filed meetings 16105 associated with a selected project 16103. This display may be accessed via a calendar tab 16107.

Reference is now made to FIGS. 162-167, which omit the results pane of the previous figures. These figures include tabs for the inbox 16209, projects 16211, tasks 16205, contacts 16213, calendar 16215 and/or results 16217. FIG. 162 illustrates an example user interface 16201 showing a listing of filed tasks 16203 (if any) corresponding to specified relationships 16207, such as classes, references, and/or keywords. FIG. 163 illustrates an example user interface 16301 showing a listing of contacts 16303 corresponding to specified relationships. FIG. 164 illustrates an example user interface 16401 showing a listing of meetings 16403 corresponding to specified relationships. FIG. 165 illustrates an example user interface 16501 showing a listing of results 16503 corresponding to specified roots (classes) 16505 and references (keywords). FIG. 166 illustrates an example user interface 16601 showing a listing of projects 16603 corresponding to specified favorites 16607 and references (keywords) 16605. FIG. 167 illustrates an example user interface 16701 showing a listing of results 16703 corresponding to specified keyword sets 16706 and references (keywords) 16705.

FIGS. 167-171 illustrate an example sequence for selection of an e-mail, and filing of the e-mail with a project. FIG. 168 illustrates an example user interface 16801 showing a listing of e-mail 16803 in an inbox corresponding to a keyword set 16805. The "file" command 16811 may be used with the e-mail. A display of a selected e-mail 16807 is provided in the preview pane 16809. FIG. 169 illustrates an example user interface 16901 showing a selection of a project type 16903 for use in connection with filing the selected e-mail 16807. Here, the project type can include not only the type 16905, but also a template 16907 for a generic type of project. FIG. 170 illustrates an example user interface 17001 showing further specification of project properties 17003 with customizable fields 17015 for use in connection with filing the selected e-mail 16807. In the present example, the user can specify project properties including people 17005, places 17007, products 17009, status 17011 and time 17013. FIG. 171 illustrates an example user interface 17101 showing the selection of a workgroup members 17103 for use in connection with creating a new project 16807. The workgroup specifies the users that are associated with the particular project.

Reference is now made to FIGS. 172-178, illustrating various aspects of one or more embodiments of the items file menu. FIG. 172 illustrates an example user menu 17201 for filing/retagging a selected item, checking in/out a selected item, and opening/deleting an editable item. The "delete" command 17203 deletes the selected item. The "check out/undo check out" command 17205 checks out the selected item, but optionally does not open it. The "check in" command 17207 checks in the selected item. The "preview linked items" command 17209 opens the linked item as read-only in its native application. The "make preview available offline" command 17211 opens a read-only off line version of the selected item. The "preview now" command 17213 opens a read-only version of the selected item in its native application. The "edit now" command 17215 checks out the selected item and opens an editable version in its native application. The "file" command 17217 opens the selected item in a preview pane.

FIG. 173 illustrates an example user menu 17301 for creating a new item with tags from a selected item. The "create like" command 17303 causes the menu item and cascade 17305 to be displayed. Each menu item opens the appropriate native application (e.g., Word, Outlook e-mail, Excel, etc.) and tags the new item with the same tags as the selected item.

FIG. 174 illustrates an example user menu 17401 for previewing a selected item, including notes, history, linked items, and/or attachments. The "preview pane" command 17403 toggles the preview pane on and off. The "file details" command 17405 opens the preview pane to the file details tab. The "notes" command 17407 opens the selected item's notes windows. The "history" command 17409 opens a non-e-mail object history window. The "linked items" command 17411 opens the preview pane to the linked items tab. The "preview pane" command 17413 is optionally disabled, preventing the user from choosing between the Microsoft pane and the preview pane. When the expand/collapse groups menu choice 17415 is selected, the preview pane also includes the attachments. The toolbars menu 17417 includes the Q.Know® "toolbar" command 17419, causing the Q.Know toolbar to be added/deleted.

FIG. 175 illustrates an example user menu 17501 for finding/opening a specified project in the Outlook frame. A "show find criteria" command 17503 toggles hiding/showing the find criteria. The "go to" command 17505 causes the applications menu 17509 to be displayed, including the "projects" command 1505 to open the projects inside the Outlook frame.

FIG. 176 illustrates an example initial user menu 17601 for finding a specified item based on one or more keywords. Included are the "find" command 17605 and the "find like" command 17603, as well as the "preferences" command 17607 to open the preferences dialog.

FIG. 177 illustrates an example user menu 17701 for performing project actions (create new, link, etc.). Here, the user may select the "add note" command 17703, which opens the add note window for the selected message. Also provided is the "refresh list" command 17705, to refresh the list being viewed. Also provided is the "add to resource library" command 17707, to add the selected message and/or attachments to the selected resource library 17715. Also provided is a "create new project" command 17709, which opens the new project wizard. Further, there is provided a "link to project" command 17711, to open and linked the selected project. Further, there is provided a "capture forms data" command 17713, to open a dialog to select a project and form.

FIG. 178 illustrates an example user menu 17801 for displaying help information about the system within Outlook. The menu in this example provides a "help" command 17803, to open help information related to use of the present invention. Also provided is a "web" command 17805, to link to a website support page. Further, an "about" command 17807 opens the about window.

Reference is now made to FIGS. 179-186, illustrating various inbox file menus adapted to the present invention, according to one or more embodiments thereof. FIG. 179 illustrates an example user menu 17901 for previewing items linked to a selected item, according to one or more embodiments of the present invention. Selecting the "file" command 17907 opens the preview pane for the selected item. Selecting the "file like" command 17903 opens the file like window for the selected item. The preview "linked items" command 17905 opens the linked item as read-only in its native application.

FIG. 180 illustrates an example user menu 18001 for creating a new project within Outlook. Selecting the "new" command 18005 causes a display of various documents or entries that may be created, including items and projects. Selection of the project button 18003 launches the new project wizard.

FIG. 181 illustrates an example user menu 18101 for creating a new item incorporating tags from a pre-existing selected e-mail message. Selection of the "create like" button 18105 causes a menu cascade 18103 for the "like" items that may be created. In the present example, there are provided blank Word documents, blank Mail messages, blank Excel items, blank PowerPoint presentations, a task, a task request, a meeting request, an appointment, and a contact.

FIG. 182 illustrates an example user menu 18201 for previewing attachments linked to a selected item. Selection of the preview pane button 18203 toggles the preview pane on and off. Selection of the file details button 18205 opens the preview pane to the details tab. Selection of the notes button 18207 opens the email notes window, if a message is selected and if the message has notes. Selection of one or more attachments to the selected item 18211 opens the preview pane with the selected attachment displayed, if the selected item has one or more attachments. Selection of the "linked items" command 18213 opens the preview pane to the linked items tab.

FIG. 183 illustrates an example user menu 18301 for adding and/or deleting toolbar access for use in connection with the present invention. Selection of the "Q.Know" command adds or deletes the toolbar providing access to functionality of the present invention.

FIG. 184 illustrates an example user menu 18401 for using in selecting and going to a selected item. Selection of the "items" command 18403 opens the Items application inside the Outlook frame. Selection of the "projects" command 18405 opens the projects application inside the Outlook frame. Selection of the "my recently filed received mail" command 18407 opens the recently filed received mail. Selection of the "my recently filed sent mail" command 18409 opens the recently filed sent mail.

FIG. 185 illustrates an example user menu 18501 for performing a retrieval incorporating search criteria from a selected item. Selection of the "find like" command 18503 opens the find like application; keywords of the selected item are pre-populated in the search criteria. Selection of the "find" command 18505 opens the find application in the explorer mode. Selection of the "advanced find" command 18507 opens the advanced find application in the explorer mode. Selection of the "preferences" command 18509 opens the preferences dialog.

FIG. 186 illustrates an example user menu 18601 for use in creating and/or linking a project. Selection of the "add note" command 18603 opens the "add note" application for the selected message. Selection of the "add to resource library" command 18605 adds the selected message and/or attachments to the selected resource library. Selection of the "create new project" command 18607 opens the new project wizard. Selection of the "link to project" command 18609 opens the select linked project application, for the selected message. Selection of the "capture forms data" command 18611 opens a dialog to select the project and form, for the selected message or attachment.

FIGS. 187-195 provides illustrations of example user menus for an explorer file, edit, view, tools, action, and help menus. FIG. 187 illustrates an example user menu 18701 for use in previewing selected linked items. The "delete" command 18703 moves the selected item(s) to the recycle bin. The "rename" command 18705 opens the item in, for example, a preview pane in order to rename it. The "get most recent version" command 18707, the "edit now" command 18717, and the "check out" command 18709 check out the most recent version of the selected item, and open an editable version of it in the item's native application. The "file" command 18719 opens the preview pane for the item. The "check in" command 18715 checks in the selected item. The "preview now" command 18711 opens a read-only version of the selected item in its native application. The "preview linked items" command 18713 opens the selected linked item as read-only in its native application.

FIG. 188 illustrates an example user menu 18801 for use in creating a new project from within a native application. Selecting the "new" command 18803 causes a display of various structures that may be created, including items and projects 18805. Selection of the project button 18807 launches the new project wizard.

FIG. 189 illustrates an example user menu 18901 for use in undoing a change initiated by the user. When the "undo" command 18903 is selected, the system undoes the change, if any, that was made by the user.

FIG. 190 illustrates an example user menu 19001 for use in previewing attachments, notes, linked items, and/or history of a selected item. Selecting the "preview pane" command 19003 toggles the preview pane on or off. Selecting the "file details" command 19005 opens the preview pane in the details pane, for the selected item. The "notes" command 19006 results in opening the object's notes window, for the selected item. The "preview attachments" command 19007 results in opening the preview pane with the selected attachment displayed therein. The "linked items" command 19009 results in opening the preview pane to the linked items tab for the selected item. The "history" command 19011 opens history for the object, preferably the non-e-mail history.

FIG. 191 illustrates an example user menu 19101 for use in adding/deleting explorer toolbar access. In this example, selecting the "Q.Know®" command 19103 results in adding or deleting the extended explorer toolbar. Selecting the "customize" command 19105 opens a dialog to allow the addition of menu items to the extended explorer toolbar. FIG. 192 illustrates an example user menu 19201 for use in going to a selected project. The "go to" command 19203 opens the selected project in a window or, for example, in the Outlook frame. FIG. 193 illustrates an example user menu 19301 for use in performing one of several retrievals of items. The "find" command 19303 results in opening the find application in a new window. The "find like" command 19305 results in opening the find like application, with pre-populated keywords based on the selected item. The "preferences" command 19307 results in initiating the preferences dialog.

FIG. 194 illustrates an example user menu 19401 for use in creating a new project and/or linking items to a project and/or adding an item to a resource library. The "add note" command 19403 opens the add note window for the selected message. The "refresh list" command 19405 refreshes the list being viewed, to include, for example, find results, linked items, etc. The "add to resource library" command 19407 adds the selected message and/or attachments to the selected resource library. The "create new project" command 19409 opens the new project wizard. The "link to project" command 19411 opens the "select linked project" application. The "capture forms data" command 19413 opens a dialog to select a document with which to populate a form.

FIG. 195 illustrates an example user menu 19501 for use in displaying "help" information. The "help" command 19505 opens the help application for use of an embodiment of the present invention. The "web" command 19507 links to an on-line website support page, for the operating embodiment of the present invention. The "about" command 19509 opens the about window.

Reference is now made to FIGS. 196-201, illustrating examples of file, view, insert, tools, and actions menus for an open message. Other means may be provided, e.g., a "help" menu. FIG. 196 illustrates an example top-level user menu 19601 for use in selecting an item, checking an attachment to the item in/out, etc. The "file" command 19603 opens the preview pane for the selected item. The "file like" command 19605 opens the "file like" application for the selected message. The "edit now" command 19607 checks out the selected attachment and opens an editable version in its native application. The "check out/undo check out" command 19609 checks out the selected attachment and optionally does not open it; undo checks the document in without changes. The "check in" command 19611 checks in the selected attachment. The "preview now" command 19613 opens a read-only version of the selected document in its native application. The "make preview available offline" command 19615 opens an offline version of the selected message and any selected attachment.

FIG. 197 illustrates an example user menu 19701 for creating a new item with tags from a selected e-mail message. Selection of the "create like" command 19703 causes a menu cascade 19705 for the items "like" that may be created. In the present example, there are provided blank Word documents, blank Mail messages, blank Excel items, blank PowerPoint presentations, a task, a task request, a meeting request, an appointment, and a contact. Each menu item opens the appropriate native application and tags the new item with the same tags as the selected message in the in box.

FIG. 198 illustrates an example user menu 19801 for opening a preview of attachments to a selected item, and for turning on a toolbar. Selecting the "file details" command 19803 opens the preview pane in the details pane, for the selected item. The "notes" command 19809 results in opening the object's notes window, for the selected item. The "preview attachments" command 19807 results in opening the preview pane with the selected attachment displayed therein. The "linked items" command 19805 results in opening the preview pane to the linked items tab for the selected item. The "history" command 19811 opens history for the object. The toolbar cascades to a command for adding or deleting the extended toolbar 19813.

FIG. 199 illustrates an example user menu 19901 for inserting an item. The "item" command 19901 opens the "insert item" dialog.

FIG. 200 illustrates an example user menu 20001 for performing one of several retrievals of items based on keywords. The "find" command 20003 results in opening the find application in the explorer application. The "advanced find" command 20005 results in opening the "advanced find" application in the explorer application. The "find like" command 20007 results in opening the find like application, with pre-populated keywords based on the selected item.

FIG. 201 illustrates an example user menu 20101 for performing actions on an e-mail message. The "add note" command 20103 opens the "add note" application for the selected message. The "create new project" command 20015 opens the new project wizard. The "link to project" command 20107 opens the select linked project application for the selected message. The "add to resource library" command 20109 adds the selected message and/or attachments to the selected resource library. The "capture forms data" command 20111 opens a dialog to select a document with which to populate a form.

Reference is now made to FIGS. 202-210 illustrating example user menus for edit, view, tools, and actions, in Outlook. FIG. 202 illustrates an example user menu 20201 for creating/opening an item. The "new" command 20203 initiates the creation of a new item in a selected native application. The "create like" command 20205 initiates the creation of a new item pre-populated with keywords like the selected item. The "open" command 20207 opens the selected item in an editable mode in its native application.

FIG. 203 illustrates an example user menu 20301 for creating an item with tags populated from a selected project. The "create like" command 20303 creates a new item with properties of a selected item. A menu cascade presents candidate types of items, e.g., blank Word document, blank mail message, blank Excel workbook, blank PowerPoint presentation, task, task request, meeting request, appointment, and/or contact. Each menu item opens the corresponding native application and tags the new item with the same tags as the selected message.

FIG. 204 illustrates an example user menu 20401 for creating a new item for native applications, within a project. The user has selected the "new" command, and among the candidates to be created are a project 20403, and a project item 20404. Selecting the "project" command 20403 launches the new project wizard. Selecting the "project item" command 20404 opens a menu cascade interacting with the user to determine the type of item. Here, the type of items includes a mail message 20405, a contact 20407, a meeting request 20409, a task 20411, and/or a task request 20413. Selection of the type of item invokes the appropriate "create new" application, and causes the new item to be tagged with keywords of the project.

FIG. 205 illustrates an example user menu 20501 for viewing notes attached to items. Selection of the "notes" command 20503 invokes the e-mail notes application, for displaying one or more notes attached to the selected item. FIG. 206 illustrates an example user menu 20601 for adding and/or deleting a project toolbar. Selection of the "toolbars" command 20603 causes a display of the toolbar options including adding/deleting the toolbar with the project extension 20605.

FIG. 207 illustrates an example user menu 20701 for selecting a specific item in a specific storage area, such as a working folder or recently filed items, and going to the selected item. The "go to" command displays the locations that may be searched, including the items server and the projects. Selecting the "projects" command 20705 opens the projects application inside the Outlook frame. Selecting the "items" command 20703 opens the items inside the Outlook frame. The user is prompted for the location to search for the item or project, e.g., the main server, the working folder, recently filed items, recently filed received mail 20707, and/or recently filed sent mail 20709. Selecting the mail commands 20707, 20709 includes any filtering that is active.

FIG. 208 illustrates an example user menu 20801 for performing various specific retrievals of items. The "find within" command 20803 opens the find within application. The "find like" command 20805 opens the find like application; keywords of the selected item are pre-populated in the search criteria. The "preferences" command 20807 opens the preferences dialog.

FIG. 209 illustrates an example user menu 20901 for performing actions on a project. The "project team" button 20902 invokes the project team application, for members of a project team associated with the selected project. The "add note" command 20903 opens the "add note" window.

FIG. 210 illustrates an example project toolbar 21001 incorporating create project, create a new item with tags like a prior project, search for items within a project, and project team listing. The toolbar can be extended to include menu buttons to one or more functions provided by one or more embodiments of the present invention. In the illustration, menu buttons include "create new project" 21003, "create like" 21005, "print" 21004, "find within" 21006, "project team" 21007, "invite input" 21009, and "add note" 21011.

Reference is now made to FIGS. 211-216 illustrating examples of file, view, insert, tools, actions, and help menus for PowerPoint. FIG. 211 illustrates an example user menu 21101 for handling items in connection with a PowerPoint. The "open" command 21103 opens the native application (e.g., a new presentation for PowerPoint). The standard PowerPoint menu cascade permits the user to open a new presentation; the standard menu optionally is extended to include access to at least some of the invention's functionality, e.g., a "project" command 21115 to launch the new project wizard. The "open item" command 21105 opens the appropriate native application for the selected item. The "close and check in item" command 21107 closes the item and checks it back in. The "undo check out" command 21109 closes and checks the item in without changes. The "save" command 21111 saves the item, for example into the main items server. The "save as item" command 21113 opens the "save as item" dialog. The "create like" command 21117 initiates the creation of a new item with fields pre-populated like the selected item. A menu cascade 21119 presents candidate types of items, e.g., blank Word document, blank mail message, blank Excel workbook, blank PowerPoint presentation, task, task request, meeting request, appointment, and/or contact. Each menu item opens the corresponding native application and tags the new item with the same tags as the selected item.

FIG. 212 illustrates an example user menu 21201 for opening the history view and enabling the toolbar within PowerPoint. The "history" command 21203 opens the history, preferably for non-email items. The "toolbar" command includes enabling the extension 21205 providing access to functionality of at least some of the present invention.

FIG. 213 illustrates an example user menu for dialoguing 21301 with the present invention from a PowerPoint native application. The PowerPoint "insert" menu is extended to include the "item" command 21303 to open the "insert item" dialog.

FIG. 214 illustrates an example user menu 21401 for finding items from a PowerPoint menu. Selection of the "find" command 21403 opens the find application in the explorer mode. Selection of the "advanced find" command 21405 opens the advanced find application in the explorer mode. Selection of the "find like" command 21407 opens the find like application; keywords of the selected item are pre-populated in the search criteria. Selection of the "preferences" command 21409 opens the preferences dialog.

FIG. 215 illustrates an example user menu 21501 for displaying help information from a PowerPoint menu. The "help" command 21503 opens the help application for use of an embodiment of the present invention. The "web" command 21505 links to an on-line website support page, for the operating embodiment of the present invention. The "about" command 21507 opens the about window.

FIG. 216 illustrates an example user menu 21601 for creating a new project, linking to a project, etc., from a PowerPoint native application. The "actions" cascade menu 21602 of the native application includes, in one or more embodiments of the present invention, an "add note" command 21603 that opens the "add note" application for the selected message. The "project" command 21605 accesses various project functions. The "create new project" command 21609 opens the new project wizard. The "link to project" command 21611 opens the select linked project application for the selected message. The "add to resource library" command 21607 adds the selected message and/or attachments to the selected resource library. The "capture forms data" command 21613 opens a dialog to select a document with which to populate a form.

Reference is now made to FIGS. 217-222, illustrating example user menus for use in connection with Excel, for various commands including file, view, insert, tools, actions, and help. FIG. 217 illustrates an example user menu 21701 for handling items in connection with an Excel native application. The "open" command 21703 opens the native application (e.g., a new workbook for Excel). The standard Excel menu cascade permits the user to open a new workbook; the standard menu optionally is extended to include access to at least some of the invention's functionality, e.g., a "project" command 21715 to launch the new project wizard. The "open item" command 21705 opens the appropriate native application for the selected item. The "close and check in item" command 21707 closes the item and checks it back in. The "undo check out" command 21709 closes and checks the item in without changes. The "save" command 21711 saves the item, for example into the main items server. The "save as item" command 21713 opens the "save as item" dialog. The "create like" command 21717 initiates the creation of a new item with fields pre-populated like the selected item. A menu cascade 21719 presents candidate types of items, e.g., blank Word document, blank mail message, blank Excel workbook, blank PowerPoint presentation, task, task request, meeting request, appointment, and/or contact. Each menu item opens the corresponding native application and tags the new item with the same tags as the selected item.

FIG. 218 illustrates an example user menu 21801 for opening the history view and enabling/disabling toolbars for use with an Excel native application. The "history" command 21803 opens the history, preferably for non-email items. The "toolbar" command includes enabling the extension 21805 providing access to functionality of at least some of the present invention.

FIG. 219 illustrates an example user menu 21901 for inserting an item from an Excel native application. The Excel "insert" menu is extended to include the "item" command 21903 to open the "insert item" dialog.

FIG. 220 illustrates an example user menu 22001 for finding items from an Excel native application. Selection of the "find" command 22003 opens the find application in the explorer mode. Selection of the "advanced find" command 22005 opens the advanced find application in the explorer mode. Selection of the "find like" command 22007 opens the find like application; keywords of the selected item are pre-populated in the search criteria. Selection of the "preferences" command 22009 opens the preferences dialog.

FIG. 221 illustrates an example user menu 22101 for creating a new project, linking to a project, etc., from an Excel native application. The "actions" cascade menu 22102 of the native application includes, in one or more embodiments of the present invention, an "add note" command 22103 that opens the "add note" application for the selected message. The "project" command 22105 accesses various project functions. The "create new project" command 22109 opens the new project wizard. The "link to project" command 22111 opens the select linked project application for the selected message. The "add to resource library" command 22107 adds the selected message and/or attachments to the selected resource library. The "capture forms data" command 22113 opens a dialog to select a document with which to populate a form.

FIG. 222 illustrates an example user menu 22201 for displaying help information from an Excel native application. The "help" command 22203 opens the help application for use of an embodiment of the present invention. The "web" command 22205 links to an on-line website support page, for the operating embodiment of the present invention. The "about" command 22207 opens the about window.

Reference is now made to FIGS. 223-228, illustrating example user menus for file, view, insert, tools, actions, and help in Word. FIG. 223 illustrates an example user menu 22301 for handling items in connection with a Word file menu native application. The "open" command 22303 opens the native application (e.g., a new document for Word). The standard Word menu cascade permits the user to open a new document; the standard menu optionally is extended to include access to at least some of the invention's functionality, e.g., a "project" command 22315 to launch the new project wizard. The "open item" command 22305 opens the appropriate native application for the selected item. The "close and check in item" command 22307 closes the item and checks it back in. The "undo check out" command 22309 closes and checks the item in without changes. The "save" command 22311 saves the item, for example into the main items server. The "save as item" command 22313 opens the "save as item" dialog. The "create like" command 22317 initiates the creation of a new item with fields pre-populated like the selected item. A menu cascade 22319 presents candidate types of items, e.g., blank Word document, blank mail message, blank Excel workbook, blank PowerPoint presentation, task, task request, meeting request, appointment, and/or contact. Each menu item opens the corresponding native application and tags the new item with the same tags as the selected item.

FIG. 224 illustrates an example user menu 22401 for opening the history view and enabling/disabling toolbars for use with a Word native application. The "history" command 22403 opens the history, preferably for non-email items. The "toolbar" command includes enabling the extension 22405 providing access to functionality of at least some of the present invention.

FIG. 225 illustrates en example user menu 22501 for inserting an item from a Word native application. The Word "insert" menu is extended to include the "item" command 22503 to open the "insert item" dialog.

FIG. 226 illustrates an example user menu 22601 for finding items from a Word native application. Selection of the "find" command 22603 opens the find application in the explorer mode. Selection of the "advanced find" command 22605 opens the advanced find application in the explorer mode. Selection of the "find like" command 22607 opens the find like application; keywords of the selected item are pre-populated in the search criteria. Selection of the "preferences" command 22609 opens the preferences dialog.

FIG. 227 illustrates an example user menu 22701 for creating a new project, linking to a project, etc., from a Word native application. The "actions" cascade menu 22702 of the native application includes, in one or more embodiments of the present invention, an "add note" command 22703 that opens the "add note" application for the selected message. The "project" command 22705 accesses various project functions. The "create new project" command 22709 opens the new project wizard. The "link to project" command 22711 opens the select linked project application for the selected message. The "add to resource library" command 22707 adds the selected message and/or attachments to the selected resource library. The "capture forms data" command 22713 opens a dialog to select a document with which to populate a form.

FIG. 228 illustrates an example user menu 22801 for displaying help information from a Word native application. The "help" command 22803 opens the help application for use of an embodiment of the present invention. The "web" command 22805 links to an on-line website support page, for the operating embodiment of the present invention. The "about" command 22807 opens the about window.

It should be understood that the invention is described in connection with logical groupings of functions or resources. One or more of these logical groupings may be omitted from one or more embodiments, and still remain within the scope of the present invention. Likewise, functions may be grouped differently, combined, or augmented without parting from the scope of the invention. Similarly the present description may describe various databases or collections of data and information. One or more groupings of the data or information may be omitted, distributed, combined, or augmented, or provided locally and/or remotely without departing from the scope of the invention.

One or more embodiments of the present invention provide for an adaptive tree approach to searching. Utilizing an adaptive tree approach, the user may browse, but very accurately, so that a null list of search results is avoided.

Each keyword selected by the user narrows the list of subsequent keywords that may be selected. Thus, all items found in response to the search criteria are common to all keywords selected during this browse/search. There is no need to display an error message such as "no items found".

One or more approaches to the "adaptive keywords" discovery metaphor provides:

(1) The user selects the first keyword from a full list of keywords for the user.

(2) Subsequently, the available keywords for subsequent selection adapt, that is, only the subset of keywords which have a relationship to the first keyword (for example, through tagging of items and projects), will be presented to the user.

For example, suppose there are 26 keywords, A . . . Z. Optionally, as in this example, only keywords the user has access to are included. Keyword F is selected as the first keyword in this discovery (find). Consider that F is a tag on four items as follows:

| | |
|---|---|
| item 1 | tags B F Q |
| item 2 | tags F G Q |
| item 3 | tags F G K Y Z |
| item 4 | tags F S T X |

All the keywords on all those items are the valid adapted set of keywords to now present. Hence, when F is the first keyword selected by the user, the following adapted set of candidate keywords will be available, from which the user may select the second keyword:

B G K Q S T X Y Z

As keywords are added in this manner, the adaptive set of keywords diminishes, to show those keywords with relationships to all of the already selected keywords.

To continue the example, suppose that keyword G is selected next. The present example simply deals with keywords at this stage; the user has not yet asked the system to list items. Optionally, the system automatically lists items as the user selects keywords; or manually lists items upon user request. Having selected another keyword, the system determines all keywords which are associated with documents (or other items) tagged with both F and G. Only items 2 and 3 are tagged with both keywords, so the resulting subset of applicable keywords to present (from which a third keyword can be selected), is:

K Q Y Z

Once the user has selected one or more keywords in this manner, they can "find" and retrieve the items associated with all the listed keywords, in the usual manner.

In summary, one or more methods for extracting the adapted set of keywords includes querying the system for all documents (or other items) which are tagged with the currently selected keywords; creating a superset list of all keywords on the current set of documents; removing the keyword(s) already selected; and presenting the adapted set to the user for further selection.

Optionally, the documents (and other items) included are those to which the user has access. Optionally, the search is provided as one of several search/browse types.

FIGS. 232A-B provide an example of handling user mouse-click actions for accessing and modifying selected items 23201. At step 23203, the user points to an item, using, e.g., a mouse, and selects an item. In this example, the selection is done via single click (to preview), double click (to open read-only), or right click (to perform various edit actions), although different methods may be used to select an item. At step 2307, the system checks whether the user single clicked. If so, at step 23205, the system displays the preview pane for the selected item, and returns to the top. At step 23211, the system checks whether the user double clicked. If so, at step 23209, the system opens the application associated with the item, at step 23213, the system displays the item (such as a document) with read-only permission, and returns to the top. At step 23215, the system checks whether the user right-clicked. If not, the system loops to the top. Otherwise, at step 23217, the system checks whether the item is an e-mail, task, or calendar item.

If the item is not an e-mail, task or calendar item, then at step 23221, the system checks whether the user has read/write access. If so, at step 23219, then the system checks whether the item is checked out. If it is checked out, then at step 23223, the system checks whether the item is checked out by the user. If the item is checked out by someone other than the user, or if the user does not have read/write access, then at step 23225 the system opens the associated native application, and at step 23227 the system displays the item with read-only permission. On the other hand, if the user has read/write access or has checked out the item, then at step 23229, the system displays the active object menu, including actions such as "edit now," "check out," and "preview." At step 23233, the system checks whether the document is in the user's working folder. If not, at step 23231, the system obtains a copy of the document and places it into the user's working folder. At step 23237, the system determines whether the command is the "edit now" command. If so, then at step 23235, the system opens the associated native application and displays the document with read/write permission. At step 23243, the system determines whether the command is "check out and edit". If so, then at step 23241, the system registers the check out. At step 23247, the system determines whether the command was "preview." If so, then at step 23245, the system opens the associated native application and displays the document with read only permission. At step 23251, the system determines whether the command was "offline preview." If so, then at step 23249, the system, places a read-only copy of the item into the user's working folder.

If the item is an e-mail, task or calendar item, then at step 23239, the system displays a read-only version of the active object menu, including actions such as "preview." Processing continues with step 23247, described above.

A copy of the document (or other type of item) may be obtained from the items database in any appropriate manner. According to one example, items are searched utilizing information in the items database index. The items database index optionally includes a portion or all of the searchable information. The items database includes information characterizing an item, optionally including information to locate the item in a database used by its corresponding native application. Information that is displayed to the user characterizing an item is derived from the items database index, and if necessary, from the information in the items database itself. The retrieval of items is accomplished, according to one or more embodiments of the present invention, by utilizing the items database index and optionally the items database in order to locate the item in the database for the corresponding native application. In order to run the native application with the selected item (located in accordance with the present invention), the system provides the native application with the expected information for locating the selected item in the native application's database.

FIG. 229 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 229, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Alternatively, referring to FIG. 231, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

FIG. 230 illustrates a step diagram of the internal hardware of the computer of FIG. 229. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

A project accommodates a wide variety of transactions, documents, and documentation: Word documents, pricing, all the models (Excel spreadsheets), presentations, tasks (what has to happen to get the deal done), contacts, e-mail, meetings, audio and video files, and any type of other electronic information that is applied to this project or transaction. FIG. 6, previously described, illustrates certain aspects of various documents that are associated with a transaction and subsequently placed or indexed in a folder. FIG. 7 provides examples of items such as, e.g., e-mail 721, documents, 725, etc. grouped within projects 707.

Tools or features are provided by one or more embodiments of the present invention to unfold, manage, and/or traverse the contents of the project. For example, having opened the project, the user can drill down further, such as by requesting, e.g., just Office documents, all e-mails, only e-mails in the last 30 days, or just e-mails regarding a particular company. One or more aspects of the present invention allow the user to quickly view all predecessor and successor projects, (e.g., related transactions). The user can also filter through the many components of a project by different means, e.g., by specific item type or by a search of the entire contents of the project by any or all possible attributes of those contents (e.g., keywords, object type, date or date range, etc.).

The user that creates a project (or another user) may be designated as an "owner." The owner would be likely to have primary responsibility for the project, and thus is likely to have access to most or all aspects of the project and its contents. Optionally, one or more team members have subsidiary responsibility for certain aspects of the project. Specific access permissions may be set by keywords. According to one or more embodiments of the present invention, access permissions are not set by status on the project team.

A designated user has in one embodiment a substantially or completely unified view of a project, provided by one or more aspects of the present invention. The designated user might be supervising multiple projects, for example, an underwriter, CEO or CFO of the firm. For example, the supervisory user can see every transaction to which they have access, and can drill down into various transactions and view summaries and/or details, etc. In the insurance industry, for example, the question might arise, "have we done any underwriting of aircraft risk through the broker XYZ?" The user could put in retrieval criteria including, XYZ and aircraft risk. The system retrieves each e-mail, legal document, pricing model, etc. for XYZ and aircraft risk. Accordingly, one or more embodiments of the present invention allow (i) viewing and sorting projects for which the user is an owner or team member and (ii) searching for additional projects based on specific criteria, including for example keywords, project parameters (e.g., owner, team members, name, project status, etc.) and dates (e.g., due dates, completed dates, last modified dates, created on dates, etc.).

As another example, under the contacts tab are the teams that are working on the selected project. A user could e-mail the project team, or e-mail parts of the project to selected members of the project team. The user clicks on a particular project, and the system responds with a list of documents linked to the project. From within the selected project, a user selects certain documents, and e-mails those to a team member to solicit feedback. The new e-mail is advantageously tied to or associated with the selected project.

Optional linked projects allow a user to link projects and transactions that are related as well. Consider also for example that a user, in a selected project, sets up an Excel spreadsheet with a new pricing model. The system links the spreadsheet to the selected project. Another user has access to the project, including the spreadsheet, and may review the progress via, e.g., Office or Outlook.

Linked projects allow a user to link projects and transactions that are related, as in the case of successor and predecessor projects. Through project templates (programmatic code which defines the logic of a particular project type), the invention prompts the user to choose a predecessor project type when creating a new project and defines duplicate checking of similar projects.

One or more embodiments of the present invention provide a means for a user to dynamically tag an item as it enters the system (e.g., via e-mail) or as it is created. The user may choose as tags a vernacular important to their business, or can choose not to manually file the item. In any event, context is provided to content, and the context is used by various project tools and, for example, to retrieve the item in the future.

An optional feature is to find a document based on any tag, within at least one particular project. For example, a supervisory-level user wants to review all the activity and transactions that are occurring in a particular project. The user can search within the project, for example by specifying search criteria (e.g., a set of words), and the system will search every document, every spreadsheet, etc., within the selected project. The search results will return the results listing items that satisfy the search criteria. Optionally, a set of project search criteria are stored for further re-use, and may be further customized by a user. This may be particularly useful where there are, e.g., red flag words associated with each transaction in a particular business.

One or more aspects of the present invention provide a means to connect, in real-time, a dynamic group of people who have some connection to a particular transaction. At various points in a transaction, the people who are in the organization who presently deal with the transaction can be included as members of the project. Each person dealing with the transaction who is a member of the project has real-time access to documents that relate to that transaction. A document can exist in more than one project and access to that object can be gained, e.g., through searching or otherwise finding the object, assuming the user has the appropriate keywords-based access rights. The team for a particular project is optionally dynamic; users can be added and/or subtracted from the project team as desired. Access to the project itself and items in the project may be based on keyword access. Accordingly, optionally, a team member has access to particular documents in the project based only on keyword permission appropriate to that individual and/or his or her role on the project or in the company.

Consider another example where a user has numerous e-mails relating to a project. Another user that is part of the project team for the project can automatically access those e-mails, as well as documents, calendar, etc. linked to the particular project. When an outside user is tagged as belonging to a project, such as by linking their contact information to the project, further e-mails from the outside user suggest keywords and project links with which to tag the e-mails. Alternatively, such further e-mails from the outside user could be automatically tagged with such keywords and project links. If a user in the system sends, e.g., a legal document to an outside user, and the outside user e-mails it back, the system identifies the document as belonging to a particular project, and optionally further identifies the document as the original legal document.

One or more aspects of the present invention advantageously provide optional layered access. For example, one or more levels of peer groups may be provided within an organization. While one or more individuals within a single or multiple peer groups may have permission to see the same projects, a particular user's keyword-level permission (e.g., read, read-write, no access) can limit them from seeing all or portions of the content linked to these projects, such that the same project appears to have different content when viewed by different users. Permission to review a project and associated items can be granted to one or more peer groups. Thus, a user within a certain peer group can access a project (for example, without being a team member), and review, e.g., most recent e-mails.

The foregoing figures illustrate one or more aspects of one or more embodiments of the present invention. For example, users may be provided an interface to view documents, tasks, meetings (and/or other items) linked to the project, optionally including various searching features, sorting features, filtering features, opening item content, and linking items to the project. Another interface may be provided to view projects linked to the project, to provide various historical records on the project, and to view recent items in a project. Other tools and/or interfaces may be provided to interact with team members on a project. Useful tools include, for example, assigning tasks to a team member, sending one or more selected items in a project to specified team members, and obtaining input optionally on selected items from specified team members. Multiple project types can be created, and particular projects can then be created to take on user-determined attributes of their assigned project types. Optionally, a resource library is created for particular types of projects. The resource library is a set of pre-defined documents for a particular project type. It may be defined to include, e.g., notices and guidelines for how to use the project type (business guidelines and process information and resources). It may contain standard templates a company uses for that project type (e.g., standard letter template, pricing model template, etc.).

According to one or more embodiments of the present invention, a project template is implemented as an object library, i.e., a set of programmatically defined code, where a project type defines the project in terms of how it is created, who is on the team, any related business logic including tasks and status options, notifications, forms, and resource library material.

Optionally, a project of the designated type has forms. A form allows information to be input via manual entry, copy/paste from other documents/forms, and/or data/information from other computer systems. The programmatic definition and related connectivity to other data sources are defined in the project templates.

Optionally, items that are associated with a project are automatically assigned a context for the project. Optionally, various notes can be attached to the project itself.

FIG. 233 is an example user interface 23301 showing example access rights, used in connection with layered access. In this example, the keyword list pane 23303 includes a keyword tree, which has been unfolded. The tree shows branches 23307 and leaves 23305. An icon 23309 is provided denoting the access rights. In this example, keyword branches and/or leaves are listed if the user has read/write access or read only access. The system administrator may configure access to the keywords in the keyword list. For example, access to certain keywords can be limited to specific personnel, allowing only the specified personnel to use and view the items tagged with such keywords. For example, a subset of keywords can be set up to be used only by a peer group denominated the executive management personnel, and users of the peer group can be added/deleted as desired. Other users have no access to keywords or items tagged with keywords to which they have no access. Optionally, where an item has keywords that provide the user with conflicting access, the most restrictive access controls are applied to the user. For example, a user has read only access to an item returning both read/write access and read only access for different keywords connected thereto.

As another example, assume that the Word Document named "AlphaPlan.doc" is associatively filed with the keywords "August", "XYZ Inc.", and "Alpha". Further assume for the purposes of this example that the keyword list includes the following keywords and permissions:

1. "August", representing the fiscal month which is also a month in which a merger is to take place. The user in this example has read/write access to items tagged with this keyword.
2. "XYZ Inc.", the name of a current customer and a company participating in the merger. The user has read-only access to items tagged with this keyword.
3. "Alpha", the internal code name for the merger. Users belonging to the peer group named "executive managers" only have read/write access to items or projects tagged with this keyword. The user is not a member of the peer group "excessive managers" and has no access to items tagged with this keyword.

When the user performs a search for "August" or "XYZ Inc." this document will not appear in the search results due to the "Alpha" keyword. When a user in the execute managers peer group performs the same search, the "AlphaPlan.doc" document will be listed in the search results.

One or more embodiments of the present invention may be useful for financial services industries and applications. For example, the invention may be particularized for, for example, the insurance and/or reinsurance markets, mortgages, investment banking, asset management, and/or commercial lending. These and other industries and applications may have users with the following characteristics: transacting a large volume of high value deals; emphasis is placed on cross-functional communication and collaboration; the value and risk associated with each transaction has a significant bottom-line impact; and/or the user needs real-time management of liability and/or risk exposure.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the system according to the invention may be implemented with other native applications not described herein. Also, two or more native application programs discussed herein may be combined, and/or a native application program feature may be divided or even omitted, and still remain within the scope of the present invention.

Further, the invention is intended for use in connection with all types of electronic information, whether structured or unstructured, including the examples of electronic data, documentation and information discussed herein.

As another example, the system according to the invention may include a general purpose computer, or a specially programmed special purpose computer. The user may interact with the system via e.g., a dumb terminal, a personal computer, a PDA, a mobile phone, over the Internet, an intranet, a local network, etc. The invention may be implemented as a distributed computer system rather than a single computer. Similarly, the communications link may be a dedicated link, a modem over a POTS line, and/or any other method of communicating between computers and/or users. Moreover, the processing could be controlled by a software program on one or more computer systems or processors, or could even be partially or wholly implemented in hardware.

The user interfaces may be developed in connection with an HTML display format. Although HTML is utilized in the illustrated examples, it is possible to utilize alternative technology for displaying information, obtaining user instructions and for providing user interfaces. The invention has been discussed in connection with particular examples. However, the principles apply equally to other examples and/or realizations. Naturally, the relevant data may differ, as appropriate.

Further, this invention has been discussed in certain examples as if it is made available to a single user. The invention may be used by numerous users, if preferred. The system used in connection with the invention may rely on the integration of various components including, as appropriate and/or if desired, hardware and software servers, database engines, and/or other content providers. The configuration may be, preferably, network-based and uses the Internet as a primary interface with the user.

The system according to one or more embodiments of the invention may store collected information and/or indexes to information in a database. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the computer system in FIG. 229 is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The many features and advantages of the embodiments of the present invention are apparent from the detail specification, and thus, it is intended by the appended claims to cover all such features and advantages of the invention that fall within the true spirit and scope of the invention. Further, since numerous modifications and variations may readily occur to those skilled in the art, it is not desired to limit the invention to the exact construction and operation illustrated and described, and accordingly, all suitable modifications and equivalents may be resorted to, falling within the scope of the invention.

What is claimed is:

1. In a computer-implemented system, a method for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said method comprising at least one of the sequential, non-sequential, and sequence independent steps of:

(A) classifying the plurality of items in a plurality of classes, wherein the classes are selected from: activities, people, places, objects, and time;

(B) associating at least one user with at least one reference, wherein the at least one user is indicated as having at least one access level of a plurality of access levels, wherein the at least one reference includes at least one of: a unique identifier, a keyword, a root term, a portion of a keyword, and a plurality of words;

(C) determining retrieval criteria including the at least one reference for at least one class of interest selected from the plurality of classes;

(D) associating the at least one reference with at least one of at least one item and at least one project, and at least one of: removing the at least one user from the at least one reference, adding the at least one user to the at least one reference, and assigning at least one user in at least one group associated with the at least one project;

(E) retrieving the at least one of the at least one item and at least one project associated with the at least one reference;

(F) associating a plurality of users, including the at least one user, with at least one group, and assigning the at least one group access level to the at least one of the at least one item and the at least one project;

(G) responsive to the at least one user, providing information representative of the at least one of the at least one item and the plurality of items in the at least one project associated with the at least one of the least one reference and the at least one group; and (H) providing the at least one item to the at least one user with the at least one access level corresponding to the at least one reference associated therewith.

2. The method of claim 1, the plurality of access levels including at least two of: read access, read-write access, and no access.

3. The method of claim 1, wherein the at least one access level corresponds to a most restrictive access of the at least one reference.

4. The method of claim 1, wherein the at least one project further includes at least one owner, and wherein at least one user is assigned as the at least one owner, wherein the at least one owner is provided access to the plurality of items in the at least one project regardless of the access level.

5. The method of claim 1, further comprising the step of denying access to at least one other user wherein at least one of the at least one reference and the at least one project are not associated with the at least one other user.

6. The method of claim 1, further comprising the step of displaying at least a portion of the representative information.

7. The method of claim 1, further comprising at least one of selecting the at least one project and listing the plurality of items in the project, and responsive to a selection of at least one of the plurality of items, displaying information characterizing the item, via a native application cooperating therewith.

8. The method of claim 1, wherein the at least one item is one of: a communication, a document, a transaction, an e-mail, a task, a meeting, a contact, a message, an image, music, a note item in a massaging and collaboration application, video, a multimedia file, an other native application content, and a project.

9. The method of claim 8, wherein the document is at least one of: a text document, an image document, a resolved universal resource locator (URL), a bitmap document, and a digitized document.

10. The method of claim 1, wherein the plurality of items cooperate with at least one native application associated therewith.

11. The method of claim 10, wherein the at least one native application includes at least one of: massaging and collaboration application, presentation graphics application, spreadsheet application, word processing application, graphical file management application, graphical web browser, portable document converter and reader, and file archiver and compressor.

12. The method of claim 1, wherein the at least one project is assigned to one of a plurality of project types, and a plurality of classes are associated with a plurality of items, wherein at least two items of the plurality of items have different corresponding native applications; further comprising determining at least one reference for at least one class, associating the determined at least one reference with the at least one class for at least one item, associating the at least one item with the at least one project, displaying information characterizing the at least one project and the at least one item associated therewith, selecting the at least one item thereof and opening the at least one item in a native application corresponding thereto.

13. In a computer-based system, a method for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said method comprising at least one of the sequential, non-sequential, and sequence independent steps of:

(A) associating at least one user with at least one reference, wherein the at least one user is indicated as having at least one of read access, read-write access and no access; wherein the at least one reference includes at least one of: a keyword, a root term, a portion of a keyword, and a plurality of words, wherein the at least one reference includes at least one of: a unique identifier, a keyword, a root term, a portion of a keyword, and a plurality of words;

(B) associating the at least one reference with at least one of at least one item and at least one project;

(C) associating a plurality of users, including the at least one user, with at least one group, and assigning the at least one group to at least one of the at least one item and the at least one project;

(D) responsive to the at least one user, providing information representative of at least one of the at least one item and the plurality of items in the at least one project associated with the at least one of the least one reference and the at least one group;

(E) wherein the at least one item is provided to the at least one user with an access level corresponding to a most restrictive access of the plurality of references associated therewith;

(F) wherein the at least one project further includes at least one owner, and wherein at least one user is assigned as the at least one owner, wherein the at least one owner is provided access to the plurality of items in the at least one project regardless of the access level associated therewith;

(G) denying access to at least one other user wherein at least one of the at least one reference and the at least one project are not associated with the at least one other user; and (H) at least one of selecting the at least one project and listing the plurality of items in the project, and responsive to a selection of at least one of the plurality of items, displaying information characterizing the item, via a native application cooperating therewith.

14. The method of claim 13, wherein the plurality of items are classified in a plurality of classes, further comprising the step of determining retrieval criteria including the at least one reference for at least one class of interest selected from the plurality of classes, and retrieving the at least one of the at least one item and at least one project associated with the at least one reference.

15. The method of claim 13, further comprising the step of displaying at least a portion of the representative information.

16. A computer readable storage medium comprising instructions being read by at least one computer, for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said instructions for implementing at least one of the sequential, non-sequential, and sequence independent steps of:

(A) associating at least one user with at least one reference, wherein the at least one user is indicated as having at least one access level of a plurality of access levels, wherein the at least one reference includes at least one of: unique identifier, a keyword, a root term, a portion of a keyword, and a plurality of words;

(B) associating the at least one reference with at least one of at least one item and at least one project;

(C) associating a plurality of users, including the at least one user, with at least one group, and assigning the at least one group access level to the at least one of the at least one item and the at least one project;

(D) responsive to the at least one user, providing information representative of the at least one of the at least one item and the plurality of items in the at least one project associated with the at least one of the least one reference and the at least one group;

(E) providing the at least one item to the at least one user with the at least one access level corresponding to the at least one reference associated therewith; and (F) at least one of selecting the at least one project and listing the plurality of items in the project, and responsive to a selection of at least one of the plurality of items, displaying information characterizing the item, via a native application cooperating therewith.

17. The medium of claim 16, wherein the at least one access level corresponds to a most restrictive access of the at least one reference.

18. A computer-implemented system for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said system comprising:

(A) means for associating at least one user with at least one reference wherein the at least one user is indicated as having at least one access level of a plurality of access levels, wherein the at least one reference includes at least one of: a unique identifier, a keyword, a root term, a portion of a keyword, and a plurality of words;

(B) means for associating the at least one reference with at least one of at least one item and at least one project;

(C) means for associating a plurality of users, including the at least one user, with at least one group, and assigning the at least one group access level to the at least one of the at least one item and the at least one project;

(D) means, responsive to the at least one user, for providing information representative of the at least one of the at least one item and the plurality of items in the at least one project associated with the at least one of the least one reference and the at least one group;

(E) means for providing the at least one item to the at least one user with the at least one access level corresponding to the at least one reference associated therewith; and (F) means for at least one of selecting the at least one project and listing the plurality of items in the project, and responsive to a selection of at least one of the plurality of items, displaying information characterizing the item, via a native application cooperating therewith.

19. The system of claim 18, wherein the at least one access level corresponds to a most restrictive access of the at least one reference.

20. In a computer-based system, a method for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said method comprising at least one of the sequential, non-sequential, and sequence independent steps of:

(A) associating at least one user with at least one reference, wherein the at least one user is indicated as having at least one of read access, read-write access and no access; wherein the at least one reference includes at least one of: a unique identifier, a keyword, a root term, a portion of a keyword, and a plurality of words, wherein the at least one reference includes at least one of: a keyword, a root term, a portion of a keyword, and a plurality of words;

(B) associating the at least one reference with at least one of at least one item and at least one project, wherein the at least one project is assigned to one of a plurality of project types, and a plurality of classes are associated with a plurality of items, wherein at least two items of the plurality of items have different corresponding native applications;

(C) determining at least one reference for at least one class, associating the determined at least one reference with the at least one class for at least one item, associating the at least one item with the at least one project, displaying information characterizing the at least one project and the at least one item associated therewith, selecting the at least one item thereof and opening the at least one item in a native application corresponding thereto;

(D) associating a plurality of users, including the at least one user, with at least one group, and assigning the at least one group to at least one of the at least one item and the at least one project;

(E) responsive to the at least one user, providing information representative of at least one of the at least one item and the plurality of items in the at least one project associated with the at least one of the least one reference and the at least one group, wherein the at least one item is provided to the at least one user with an access level corresponding to a most restrictive access of the plurality of references associated therewith, wherein the at least one project further includes at least one owner, and wherein at least one user is assigned as the at least one owner, wherein the at least one owner is provided access to the plurality of items in the at least one project regardless of the access level associated therewith; and (F) re-associating the at least one user with the at least one reference, wherein the re-associating further comprises at least one of: removing the at least one user from the at least one reference, adding the at least one user to the at least one reference, and reassigning at least one user in at least one group associated with the at least one project.

21. In a computer-based system, a method for at least one of controlling access, overseeing, and managing at least one of electronic information including at least one of structured and unstructured electronic data, documentation, and other information, a plurality of items comprising the electronic information, and of a plurality of projects comprising at least a portion of the plurality of items, said method comprising at least one of the sequential, non-sequential, and sequence independent steps of:

(A) associating at least one user with at least one reference, wherein the at least one user is indicated as having at least one of read access, read-write access and no access; wherein the at least one reference includes at least one of: a unique identifier, a keyword, a root term, a portion of a keyword, and a plurality of words, wherein the at least one reference includes at least one of: a keyword, a root term, a portion of a keyword, and a plurality of words;

(B) associating the at least one reference with at least one of at least one item and at least one project, (C) associating a plurality of users, including the at least one user, with at least one group, and assigning the at least one group to at least one of the at least one item and the at least one project;

(D) responsive to the at least one user, providing information representative of at least one of the at least one item and the plurality of items in the at least one project associated with the at least one of the least one reference and the at least one group, wherein the at least one item is provided to the at least one user with an access level corresponding to a most restrictive access of the plurality of references associated therewith, wherein the at least one project further includes at least one owner, and wherein at least one user is assigned as the at least one owner, wherein the at least one owner is provided access to the plurality of items in the at least one project regardless of the access level associated therewith; and (E) denying access to at least one other user wherein at least one of the at least one reference and the at least one project are not associated with the at least one other user (F) selecting the at least one project and listing the plurality of items in the project, and responsive to a selection of at least one of the plurality of items, displaying information characterizing the item, via a native application cooperating therewith; and (G) re-associating the at least one user with the at least one reference, wherein the re-associating further comprises at least one of: removing the at least one user from the at least one reference, adding the at least one user to the at least one reference, and reassigning at least one user in at least one group associated with the at least one project.

* * * * *